US009827517B2

(12) United States Patent
Vecitis et al.

(10) Patent No.: US 9,827,517 B2
(45) Date of Patent: Nov. 28, 2017

(54) ELECTROCHEMICAL CARBON NANOTUBE FILTER AND METHOD

(75) Inventors: Chad D. Vecitis, Somerville, MA (US); Kirsten Van Fossen, Moorestown, NJ (US)

(73) Assignee: President and Fellows of Harvard College, Cambridge, MA (US)

( * ) Notice: Subject to any disclaimer, the term of this patent is extended or adjusted under 35 U.S.C. 154(b) by 1535 days.

(21) Appl. No.: 13/439,073

(22) Filed: Apr. 4, 2012

(65) Prior Publication Data
US 2012/0234694 A1 Sep. 20, 2012

Related U.S. Application Data

(63) Continuation-in-part of application No. 13/358,248, filed on Jan. 25, 2012.
(Continued)

(51) Int. Cl.
*B01D 35/06* (2006.01)
*B01D 39/20* (2006.01)
*B82Y 30/00* (2011.01)

(52) U.S. Cl.
CPC ......... *B01D 35/06* (2013.01); *B01D 39/2055* (2013.01); *B82Y 30/00* (2013.01); *B01D 2239/065* (2013.01)

(58) Field of Classification Search
CPC ................ B01D 35/06; B01D 39/1692; B01D 39/2055; B01D 61/425; B01D 2239/065;
(Continued)

(56) References Cited

U.S. PATENT DOCUMENTS 2,334,790 A * 11/1943 Roffy ............... B01D 35/06
204/248
5,043,048 A * 8/1991 Muralidhara ........ B01D 61/425
204/518
(Continued)

FOREIGN PATENT DOCUMENTS

WO 2010069052 A1 6/2010
WO WO 2010126686 A2 * 11/2010 ......... B01D 39/2055

OTHER PUBLICATIONS

Tilak and Conway, Overpotential decay behavior—I.Complex electrode reactions involving adsorption. Electrochim. Acta 1976, 21 (10), 745-752.
(Continued)

*Primary Examiner* — Steven A. Friday
(74) *Attorney, Agent, or Firm* — Nixon Peabody LLP; David S. Resnick; David F. Crosby

(57) ABSTRACT

A filtration apparatus and filtration method can be used to reduce at least one contaminant (e.g., organic molecules, ions and/or biological microorganisms) in an aqueous fluid. The filtration apparatuses and methods of the invention can separate at least one contaminant from an aqueous fluid and/or oxidize at least one contaminant. In operation, an aqueous fluid is flowed through a filtration apparatus comprising a porous carbon nanotube filter material at an applied voltage. In some embodiments, the filtration apparatus described herein can be used for dead-end filtration. In some embodiments, the filtration apparatus described herein can be used for cross-over filtration.

14 Claims, 119 Drawing Sheets
(79 of 119 Drawing Sheet(s) Filed in Color)

Related U.S. Application Data

(60) Provisional application No. 61/436,031, filed on Jan. 25, 2011.

(58) Field of Classification Search
CPC ......... B01D 2311/2684; B01D 2321/22; C02F 1/4691
See application file for complete search history.

(56) References Cited

U.S. PATENT DOCUMENTS

| | | | | |
|---|---|---|---|---|
| 5,332,485 | A | * | 7/1994 | Thompson ............... B03C 5/02 204/665 |
| 5,584,981 | A | | 12/1996 | Turner et al. |
| 5,636,437 | A | | 6/1997 | Kaschmitter et al. |
| 5,958,242 | A | * | 9/1999 | Fennell ................. B01D 35/06 204/554 |
| 2003/0089237 | A1 | * | 5/2003 | Jagtoyen ................. A61L 9/16 96/108 |
| 2003/0136728 | A1 | * | 7/2003 | Jagtoyen ............ B01D 39/2062 210/502.1 |
| 2004/0012913 | A1 | | 1/2004 | Andelman |
| 2005/0249917 | A1 | * | 11/2005 | Trentacosta ....... B01D 39/1692 428/137 |
| 2009/0131858 | A1 | * | 5/2009 | Fissell ................. B01D 61/145 604/57 |
| 2009/0143227 | A1 | * | 6/2009 | Dubrow ............... B01D 39/083 502/406 |

OTHER PUBLICATIONS

Tiraferri et al., Covalent Binding of Single-Walled Carbon Nanotubes to Polyamide Membranes for Antimicrobial Surface Properties. ACS Appl. Mater. Interfaces 3, (8), 2869-2877.

Tong et al. Fabrication and high electrocatalytic activity of three-dimensional porous nanosheet PT/boron-doped diamond hybrid film. J. Phys. Chem. C 2009, 113 (31), 13787-13792.

Tsai et al., Treatment of perfluorinated chemicals by electro-microfiltration, Environ. Sci. Technol. 2010, 44, 7914-7920.

Vecitis et al., Electrochemical carbon nanotube filter for adsorption, desorption, and oxidation of aqueous dyes and anions. J. Phys. Chem. C 2011, 115 (9), 3621-3629.

Vecitis et al., Electrochemical multiwalled carbon nanotube filter for viral and bacterial removal and inactivation. Environ. Sci. Technol. 2011, 45 (8), 3672-3679.

Vecitis et al., Electronic-Structure-Dependent Bacterial Cytotoxicity of Single-Walled Carbon Nanotubes. ACS Nano 4, 2010, (9), 5471-5479.

Vinodgopal et al., Electrochemically assisted photocatalysis. TiO2 particulate film electrodes for photocatalytic degradation of 4-chlorophenol, J. Phys. Chem. 1993, 97, 9040-9044.

Wang et al., Multiwalled carbon nanotubes coated fibers for solid-phase microextraction of polybrominated diphenyl ethers in water and milk samples before gas chromatography with electron-capture detection J. Chromatogr. A 2006, 1137, 8-14.

Wang et al., Electrocatalytic oxidation of norepinephrine at a glassy carbon electrode modified with single wall carbon nanotubes Electroanal. 2002, 14 (3), 225-230.

Wang and Musameh, Carbon nanotube/teflon composite electrochemical sensors and biosensors, Anal. Chem. 2003, 75 9), 2075-2079.

Wang et al., Boron-doped carbon nanotubes serving as a novel chemical sensor for formaldehyde, J. Phys. Chem. B 2006, 110 (37), 18267-18271.

Wang et al., Effect of surface oxygen containing groups on the catalytic activity of multi-walled carbon nanotube supported Pt catalyst. Appl. Catal., B:Environmental 2010, 101 (1-2), 21-30.

Wang et al., Durability investigation of carbon nanotube as catalyst support for proton exchange membrane fuel cell. J. Power Sources 2006, 158 (1), 154-159.

Wardman, P. Reduction potentials of one-electron couples involving free radicals in aqueous solution. J. Phys. Chem. Ref. Data 1989, 18 (4), 1637-1755.

Weiss et al., A comparison of electrochemical degradation of phenol on boron doped diamond and lead dioxide anodes. Journal of Applied Electrochemistry 2008, 38, (3), 329-337.

Welch et al., Electrochemical determination of nucleic acid diffusion coefficients through noncovalent association of a redox-active probe, J. Phys. Chem. 1995, 99 (30), 11757-11763.

Wen et al., In situ growth of mesoporous SnO2 on multiwalled carbon nanotubes: A novel composite with porous-tube structure as anode for lithium batteries. Adv. Funct. Mater. 2007, 17 (15), 2772-2778.

Wiggins-Camacho et al., Effect of nitrogen concentration on capacitance, density of states, electronic conductivity, and morphology of N-doped carbon nanotube electrodes, J. Phys. Chem. C 2009, 113 (44), 19082- 19090.

Winterbourn and Metodiewa, Free Radic. Biol. Med. 1999, 27:322-328. Reactivity of biologically important thiol compounds with superoxide and hydrogen peroxide.

Wu L. et al. "Poly(vinylidene fluoride)/polyethersulfone blend membranes: Effects of solvent sort, polyethersulfone and polyvinylpyrrolidone concentration on their properties and morphology" Journal of Membrane Science (2006) 285: 290-298.

Wu and Zhou, Partial degradation of phenol by advanced electrochemical oxidation process. Environmental Science & Technology 2001, 35, (13), 2698-2703.

Yang et al., Improvement of electrochemical wastewater treatment through mass transfer in a seepage carbon nanotube electrode reactor, Environ. Sci. Technol. 2009, 43 (10), 3796-3802.

Yang et al., Competitive adsorption of naphthalene with 2,4-dichlorophenol and 4-chloroaniline on multiwalled carbon nanotubes. Environ. Sci. Technol. 2010, 44 (8), 3021-3027.

Ye et al., Hydrogen adsorption and cohesive energy of single-walled carbon nanotubes, Appl. Phys. Lett. 1999, 74, 2307-2309.

Yuan et al., Deposition of silver nanoparticles on multiwalled carbon nanotubes grafted with hyperbranched poly (amidoamine) and their antimicrobial effects, J. Phys. Chem. C 2008, 112, 18754-18759.

Zhang et al., Controllable synthesis and highly efficient electrocatalytic oxidation performance of SnO2/CNT core- shell structures, Appl. Surf. Sci. 2009, 255 (9), 4907-4912.

Zhang et al., Interaction of mass transport and reaction kinetics during electrocatalytic CO oxidation in a thin-layer flow cell. J Phys Chem C 2011, 115 (2), 468-478.

Zhang et al., Adsorption of aromatic compounds by carbonaceous adsorbents: a comparative study on granular activated carbon, activated carbon fiber, and carbon nanotubes, Environ. Sci. Technol. 2010, 44 (16), 6377-6383.

Zhang et al., Preparation and electrocatalytic application of high dispersed Pt nanoparticles/ordered mesoporous carbon composites, Electrochim. Acta 2011, 56 (17), 5849-5854.

Zhao et al., Construction and high performance of a novel modified boron-doped diamond film electrode endowed with superior electrocatalysis. J. Phys. Chem. C 2010, 114 (13), 5906-5913.

Zhi, J.-F. et al. 'Electrochemical incineration of organic pollutants on boron-doped diamond electrode. Evidence for direct electrochemical oxidation pathway'. J. Phys. Chem. B 2003, 107 (48), 13389-13395.

Zodrow, K. et al. Polysulfone ultrafiltration membranes impregnated with silver nanoparticles show improved biofouling resistance and virus removal. Water Res. 2009, 43, 715-723.

Magnuson et al., Regulation of fatty acid biosynthesis in *Escherichia coli*, Microbiol. Rev. 1993, 57, 522-542.

Martinez-Huitle and Brillas, Electrochemical alternatives for drinking water disinfection. Angew. Chem., Int. Ed. 2008, 47 (11), 1998-2005.

Masheter et al., J. Mater. Chem. 2007, 17 (25), 2616-2626. Investigating the reactive sites and the anomalously large changes in surface pKa values of chemically modified carbon nanotubes of different morphologies.

(56) References Cited

OTHER PUBLICATIONS

Matsunaga et al., Electrochemical sterilization of bacteria adsorbed on granular activated carbon, FEMS Microbiol. Lett. 1992, 93:255-260.

Matsunaga et al., Disinfection of drinking water by using a novel electrochemical reactor employing carbon-cloth electrodes, Appl. Environ. Microbiol. 1992, 58:686-689.

Matsunaga et al., Electrochemical disinfection of bacteria in drinking water using activated carbon fibers, Biotechnol. Bioeng. 1994, 43:429-433.

Matsunaga and Namba, Anal. Chem. 1984, 56, 798-801. Detection of microbial cells by cyclic voltammetry.

Matyasovszky et al., Kinetic study of the electrochemical oxidation of salicylic acid and salicylaldehyde using UV/Vis spectroscopy and multivariate calibration. J. Phys. Chem. A 2009, 113 (33), 9348-9353.

Maximous N. et al. Preparation, characterization and performance of Al2O3/PES membrane for wastewater filtration Journal of Membrane Science (2009) 341:67-75.

Mckenzie and Marken, Direct electrochemistry of nanoparticulate Fe2O3 in aqueous solution and adsorbed onto tin-doped indium oxide. Pure Appl. Chem. 2001, 73 (12), 1885-1894.

Mengoli and Musiani, Protective coatings on iron by anodic oxidation of phenols in oxalic acid medium, Electrochim. Acta 1986, 31 (2), 201-210.

Moon et al., High-yield purification process of single-walled carbon nanotubes. J. Phys. Chem. B 2001, 105 (24):5677-5681.

Morita et al., Disinfection potential of electrolyzed solutions containing sodium chloride at low concentrations, J. Virol. Methods 2000, 85:163-174.

Mrowetz et al., Oxidative power of nitrogen-doped TiO2 photocatalysts under visible illumination. J. Phys. Chem. B 2004, 108 (45), 17269-17273.

Mukhopadhyay et al., Electrochemical Li insertion in B-doped multiwall carbon nanotubes, J. Electrochem. Soc. 2002, 149 (1), A39-A44.

Neta et al., Rate constants for reactions of inorganic radicals in aqueous solution, J. Phys. Chem. Ref. Data 1988, 17(3), 1027-1284.

Ohnuki et al., J. Electroanal. Chem. 1983, 158 (1), 55-67. Permselectivity of films prepared by electrochemical oxidation of phenol and amino-aromatic compounds.

Oturan et al., Cold incineration of chlorophenols in aqueous solution by advanced electrochemical process electro- fenton. Effect of number and position of chlorine atoms on the degradation kinetics, J. Phys. Chem. A 2009, 113, 10988-10993.

Oturan et al., Metomyl degradation by electro-fenton and electro-fenton-like processes: a kinetics study of the effect of the nature and concentration of some transition metal ions as catalyst, J. Phys. Chem. A 2010, 114, 10605-10611.

Pan and Xing, Adsorption mechanisms of organic chemicals on carbon nanotubes. Environ. Sci. Technol. 2008, 42 (24), 9005-9013.

Panizza and Cerisola, Direct and mediated anodic oxidation of organic pollutants. Chem. Rev. 2009, 109 (12), 6541-6569.

Panizza and Cerisola, Removal of colour and COD from wastewater containing acid blue 22 by electrochemical oxidation. J. Hazard. Mater. 2008, 153 (1-2), 83-88.

Pantano et al., Mechanics of deformation of single- and multi-wall carbon nanotubes. J. Mech. Phys. Solids 2004, 52 (4), 789-821.

Park et al., Solar-powered production of molecular hydrogen from water. J. Phys. Chem. C 2008, 112 (4), 885-889.

Park et al., Electrochemical water splitting coupled with organic compound oxidation: The role of active chlorine species. J. Phys. Chem. C 2009, 113 (18), 7935-7945.

Park et al., Solar-powered electrochemical oxidation of organic compounds coupled with the cathodic production of molecular hydrogen. J. Phys. Chem. A 2008, 112 (33), 7616-7626.

Park and Choi, TiO2-nafion photoelectrode hybridized with carbon nanotubes for sensitized photochemical activity, J. Phys. Chem. C 2009, 113, 20974-20979.

Peigney et al., Specific surface area of carbon nanotubes and bundles of carbon nanotubes. Carbon 2001, 39 (4), 507-514.

Pelegrini et al., Photoassisted electrochemical degradation of organic pollutants on a DSA type oxide electrode: Process test for a phenol synthetic solution and its application for the E1 bleach kraft mill effluent. Environmental Science & Technology 2001, 35, (13), 2849-2853.

Peng et al., Mater. Lett. 2005, 59, 399-403. Ceria nanoparticles supported on carbon nanotubes for the removal of arsenate from water.

Polcaro et al., Characterization of a stirred tank electronchemical cell for water disinfection processes, Electrochim. Acta 2007, 52:2595-2602.

Polcaro et al., Electrochemical treatment of wastewater containing phenolic compounds: oxidation at boron-doped diamond electrodes. Journal of Applied Electrochemistry 2003, 33, (10), 885-892.

Rajeshwar, K., Electrochemistry and the environment. J. Appl. Electrochem. 1994, 24 (11), 1077-1091.

Rauscher et al., Effects of Hydrogen Sulfide and Temperature on Passivation Behaviour of Titanium. Corrosion Science 1990, 31, 255-260.

Redlich et al., B-C-N nanotubes and boron doping of carbon nanotubes, Chem. Phys. Lett. 1996, 260 (3-4), 465-470.

Rinzler et al., Large-scale purification of single-wall carbon nanotubes: Process, product, and characterization. Appl. Phys. A 1998, 67 (1), 29-37.

Rodrigo et al., Use of conductive-diamond electrochemical oxidation for wastewater treatment. Catalysis Today, 2010, 151 (1-2), 173-177.

Santos et al., Catalytic wet oxidation of phenol: Kinetics of phenol uptake. Environmental Science & Technology 2001, 35, (13), 2828-2835.

Santos et al., Evolution of toxicity upon wet catalytic oxidation of phenol. Environmental Science & Technology 2004, 38, (1), 133-138.

Schoen et al., High speed water sterilization using one-dimensional nanostructures, Nano Lett. 2010, 10, 3628-3632.

Sharifian and Kirk, Electrochemical Oxidation of Phenol. Journal of the Electrochemical Society 1986, 133, (5), 921-924.

Shi et al., Purification of single-wall carbon nanotubes. Solid State Commun. 1999, 112 (1), 35-37.

Sinha and Yeow, Carbon nanotubes for biomedical applications. IEEE Trans. Nanobiosci. 2005, 4 (2), 180-195.

Smith et al., Colloidal properties of aqueous suspensions of acid-treated, multi-walled carbon nanotubes. Environ. Sci. Technol. 2009, 43 (3), 819-825.

Sondi and Salopek-Sondi, J Colloid Interface Sci. 2004, 275:177-182. Silver nanoparticles as antimicrobial agent: a case study on *E. coli* as a model for Gram-negative bacteria.

Srivastava et al., Carbon nanotube filters, Nat. Mater. 2004, 3, 610-614.

Stucki et al., Electrochemical waste water treatment using high overvoltage anodes. Part II: Anode performance and applications. J. Appl. Electrochem. 1991, 21 (2), 99-104.

Tahar et al., Electrochemical polymerisation of phenol in aqueous solution on a Ta/PbO2 anode. Journal of Applied Electrochemistry 2009, 39, (5), 663-669.

Tahar and Savall, Mechanistic aspects of phenol electrochemical degradation by oxidation on a Ta/PbO2 anode. Journal of the Electrochemical Society 1998, 145, (10), 3427-3434.

Tahar and Savall, Electrochemical removal of phenol in alkaline solution. Contribution of the anodic polymerization on different electrode materials. Electrochimica Acta 2009, 54, (21), 4809-4816.

Aider, M. et al. Electromigration of Chitosan D-Glucosamine and Oligomers in Dilute Aqueous Solutions. J. Agric. Food Chem. 2006, 54 (17), 6352-6357.

Al-Johani, H. and Salam, M. A. Kinetics and thermodynamic study of aniline adsorption by multi-walled carbon nanotubes from aqueous solution. J. Colloid Interface Sci. 2011, 360 (2), 760-767.

Albert, J. et al. End-User Preferences for and Performance of Competing POU Water Treatment Technologies among the Rural Poor of Kenya. Environ. Sci. Technol. 2010, 44, 4426-4432.

(56) References Cited

OTHER PUBLICATIONS

Alexeyeva, N. et al. Electroreduction of oxygen on nitrogen-doped carbon nanotube modified glassy carbon electrodes in acid and alkaline solutions. J. Electroanal. Chem. 2010, 648 (2), 169-175.
Bandow, S. et al. Variable-Range Hopping Conduction in the Assembly of Boron-Doped Multiwalled Carbon Nanotubes. J. Phys. Chem. C 2007, 111 (32), 11763-11766.
Banks, C. E. et al. Electrocatalysis at graphite and carbon nanotube modified electrodes: edge-plane sites and tube ends are the reactive sites. Chem. Commun. 2005, 7, 829-841.
Bard, A. J. and Fox, M.A. Artificial Photosynthesis: Solar Splitting of Water to Hydrogen and Oxygen. Accounts Chem. Res. 1995, 28, 141-145.
Bermejo, M. R. et al. Electrochemistry of terbium in the eutectic LiCI-KCI. Electrochim. Acta 2008, 53 (16), 5106-5112.
Borras, N. et al. Degradation of Atrazine by Electrochemical Advanced Oxidation Processes Using a Boron-Doped Diamond Anode. J. Phys. Chem. A 2010, 114 (24), 6613-6621.
Brady-Estevez, A.S. et al. Multiwalled Carbon Nanotube Filter: Improving Viral Removal at Low Pressure. Langmuir 2010, 26 (18), 14975-14982.
Brady-Estevez, A. S. et al. A single-walled-carbon-nanotube filter for removal of viral and bacterial pathogens. Small 2008, 4 (4), 481-484.
Brady-Estevez, A. S. et al. 'Impact of solution chemistry on viral removal by a single-walled carbon nanotube filter'. Water Res. 2010, 44, 3773-3780.
Brett, C. M. A. et al. 'On the adsorption and electrochemical oxidation of DNA at glassy carbon electrodes'. J. Electroanal. Chem. 1994, 366 (1-2), 225-231.
Britto, P. J. et al. 'Carbon nanotube electrode for oxidation of dopamine'. Bioelectrochem. Bioenerg. 1996, 41 (1), 121-125.
Cai, Y.-Q. et al. 'Multi-walled carbon nanotubes as a solid-phase extraction adsorbent for the determination of chlorophenols in environmental water samples'. J. Chromatogr. A 2005, 1081, 245-247.
Canizares, P. et al. 'Combined adsorption and electrochemical processes for the treatment of acidic aqueous phenol wastes'. Journal of Applied Electrochemistry 2004, 34, (1), 111-117.
Canizares, P. et al. 'Electrochemical oxidation of aqueous phenol wastes using active and nonactive electrodes'. Journal of the Electrochemical Society 2002, 149, (8), D118-D124.
Carriazo, J. et al. 'Catalytic wet peroxide oxidation of phenol by pillared clays containing Al—Ce—Fe'. Water Research 2005, 39, 16), 3891-3899.
Carroll, D. L. et al. 'Effects of Nanodomain Formation on the Electronic Structure of Doped Carbon Nanotubes'. Phys. Rev. Lett. 1998, 81 (11), 2332-2335.
Chen, L.-C. and Chou, T.-C. 'Kinetics of Photodecolorization of Methyl Orange Using Titanium Dioxide as Catalyst'. Ind. Eng. Chem. Res. 1993, 32 (7), 1520-1527.
Cheng, I. F. et al. 'Electrochemical dechlorination of 4-chlorophenol to phenol'. Environmental Science & Technology 1997, 31, 4), 1074-1078.
Cho, H.H. et al. 'Influence of surface oxides on the adsorption of naphthalene onto multiwalled carbon nanotubes'. Environ. Sci. Technol. 2008, 42 (8), 2899-2905.
Cho, H. H. et al. 'Sorption of aqueous Zn[II] and Cd[II] by multiwall carbon nanotubes: The relative roles of oxygen containing functional groups and graphenic carbon'. Langmuir 2010, 26 (2), 967-981.
Colmati, F. et al. 'Surface structure effects on the electrochemical oxidation of ethanol on platinum single crystal electrodes'. Faraday Discuss. 2008, 140, 379-397.
Comninellis, C. and Pulgarin, C. 'Electrochemical Oxidation of Phenol for Wastewater Treatment Using SnO2 Anodes'. Journal of Applied Electrochemistry. 1993, 23, (2), 108-112.
Comninellis, CH. and Pulgarin, C. 'Anodic oxidation of phenol for waste water treatment' J. Appl. Electrochem. 1991, 21 (8), 703-708.

Conway, B. E. and Tilak, B. V. 'Interfacial processes involving electrocatalytic evolution and oxidation of H2, and the role of chemisorbed H'. Electrochim. Acta 2002, 47 (22-23), 3571-3594.
Csonka, L.N. 'Physiological and Genetic Responses of Bacteria to Osmotic Stress', Microbiol. Rev. 1989, 53, 121-147.
Czerw, R. et al. 'Identification of Electron Donor States in N-Doped Carbon Nanotubes'. Nano Lett. 2001, 1 (9), 457-460.
Da Fonseca, C. et al. 'Characterization of Titanium Passivation Films by in Situ AC Impedance Measurements and XPS Analysis'. Journal of Electroanalytical Chemistry. 1994, 379, (1-2), 173-180.
Datsyuk, V. et al. 'Chemical oxidation of multiwalled carbon nanotubes'. Carbon. 2008, 46 (6), 833-840.
Deng, C. et al. 'Direct electrochemistry of glucose oxidase and biosensing for glucose based on boron-doped carbon nanotubes modified electrode'. Biosens. Bioelectron. 2008, 23 (8), 1272-1277.
Di, Z.-C. et al. 'Chromium adsorption by aligned carbon nanotubes supported ceria nanoparticles'. Chemosphere 2006, 62, 861-865.
Drees, K.P. et al. 'Comparative electrochemical inactivation of bacteria and bacteriophage'. Water Res. 2003, 37, 2291-2300.
Ebbesen, T. W. et al. 'Electrical conductivity of individual carbon nanotubes'. Nature. 1996, 382 (6586), 54-56.
Elimelech, M. 'The global challenge for adequate and safe water'. J. Water Supply: Res Technol.-AQUA. 2006, 55.1, 3.
Enache, T. A. et al. 'Phenol and para-substituted phenols electrochemical oxidation pathways'. Journal of Electroanalytical Chemistry. 2011, 655, (1), 9-16.
Enami, S. et al. 'Proton availability at the air/water interface'. J. Phys. Chem. Lett. 2010, 1 (10), 1599-1604.
Enami, S. et al. 'Superacid chemistry on mildly acidic water'. J. Phys Chem. Lett. 2010, 1 (24), 3488-3493.
Esplugas, S. et al. 'Comparison of different advanced oxidation processes for phenol degradation'. Water Research. 2002, 36, (4), 1034-1042.
Faergeman, N.J. and Knudsen, J. 'Role of long-chain fatty acyl-CoA esters in the regulation of metabolism and in cell signalling'. Biochem. J. 1997, 323, 1-12.
Fan, Y. et al. 'Identifying and counting point defects in carbon nanotubes'. Nat. Mater. 2005, 4 (12), 906-911.
Fang, Q. et al. 'MS2 Inactivation by Chloride-Assisted Electrochemical Disinfection'. J. Environ. Eng.-ASCE. 2006, 132, 13-22.
Finklea, H. O. et al. 'Passivation of Pinholes in Octadecanethiol Monolayers on Gold Electrodes by Electrochemical Polymerization of Phenol'. Langmuir 1990, 6 (2), 371-376.
Frayret, C. et al. 'Titanium dissolution-passivation in highly chloridic and oxygenated aqueous solutions—Reaction mechanism extended to supercritical water conditions'. Journal of the Electrochemical Society 2004, 151, (10), B543-B550.
Frayret J. P. and Caprani, A. 'Anodic Behaviour of Titanium in Acidic Chloride Containing Media (HCI-NaCI). Influence of the Constituents of the Medium -III. Analysis of the Electrochemical Impedance. General Dissolution -Passivation Mechanism'. Electrochimica Acta. 1982, 27, (3), 391-399.
Fugetsu, B. et al. 'Caged Multiwalled Carbon Nanotubes as the Adsorbents for Affinity-Based Elimination of Ionic Dyes'. Environ. Sci. Technol. 2004, 38, 6890-6896.
Fujihara, S. et al. 'Hydrothermal routes to prepare nanocrystalline mesoporous SnO2 having high thermal stability'. Langmuir. 2004, 20 (15), 6476-6481.
Gao et al., Chem. Phys. Let. 1999, 307, 153-157. Electrochemical intercalation of single-walled carbon nanotubes with lithium.
Gao and Vecitis, Electrochemical Carbon Nanotube Filter Oxidative Performance as a Function of Surface Chemistry. Environmental Science & Technology 45, (22), 9726-9734 (2011).
Gao et al., "Mechanism of enhanced electrochemical oxidation of 2,4-dichlorophenoxyacetic acid with in situ microwave activated boron-doped diamond and platinum anodes," Phys. Chem. A 2009, 113, 10466-10473.
Gattrell and Kirk, "A Study of Electrode Passivation during Aqueous Phenol Electrolysis." Journal of the Electrochemical Society 1993, 140, (4), 903-911.

(56) References Cited

OTHER PUBLICATIONS

Girishkumar et al., "Carbon nanostructures in portable fuel cells: Single-walled carbon nanotube electrodes for methanol oxidation and oxygen reduction." J. Phys. Chem. B 2004, 108 (52), 19960-19966.
Gooding et al., "Protein electrochemistry using aligned carbon nanotube arrays," J. Am. Chem. Soc. 2003, 125, 9006-9007.
Graham, D., "Characterization of physical adsorption systems. III. The separate effects of pore size and surface acidity upon the adsorbent capacities of activated carbons," J. Phys. Chem. 1955, 59, 896-900.
Gui et al., "Soft, highly conductive nanotube sponges and composites with controlled compressibility," ACS Nano 4, 2010, 2320-2326.
Guldi et al., "CNT-CdTe versatile donor-acceptor nanohybrids." J. Am. Chem. Soc. 2006, 128 (7), 2315-2323.
Hagans et al., "Electrochemical oxidation of phenol using boron-doped diamond electrodes." Journal of the Electrochemical Society 2001, 148, (7), E298-E301.
Han and Tachikawa, "Electrochemical determination of thiols at single-wall carbon nanotubes and PQQ modified electrodes," Front. Biosci. 2005, 10, 931-939.
Hinds et al., "Aligned multiwalled carbon nanotube membranes," Science 2004, 303, 62-65.
Hu et al., "Removal of Aqueous Phenol by Adsorption and Oxidation with Doped Hydrophobic Cryptomelane-Type Manganese Oxide (K-OMS-2) Nanofibers." Journal of Physical Chemistry C 2010, 114, (21), 9835-9844.
Hu et al., "Dna functionalized single-walled carbon nanotubes for electrochemical detection." J. Phys. Chem. B 2005, 109 (43), 20072-20076.
Hu et al., "Nitric acid purification of single-walled carbon nanotubes." J. Phys. Chem. B 2003, 107 (50), 13838-13842.
Hu et al., "Synthesis of hierarchically porous carbon monoliths with highly ordered microstructure and their application in rechargeable lithium batteries with high-rate capability," Adv. Funct. Mater. 2007, 17 (12), 1873-1878.
Hyung and Kim, "Natural organic matter (NOM) adsorption to multi-walled carbon nanotubes: effect of NOM characteristics and water quality parameters," Environ. Sci. Technol. 2008, 42 (12), 4416-4421.
Iijima, S., "Helical microtubules of graphitic carbon." Nature 1991, 354 (6348), 56-58.
Iniesta et al., "Electrochemical oxidation of phenol at boron-doped diamond electrode." Electrochim. Acta 2001, 46 (23), 3573-3578.
Jeong et al., "The role of reactive oxygen species in the electrochemical inactivation of microorganisms," Environ. Sci. Technol. 2006, 40, 6117-6122.
Jung et al., "Effect of molecular weight of polymeric additives on formation, permeation properties and hypochlorite of treatment asymmetric polyacrylonitrile membranes." Journal of Membrane Science (2004) 243:45-57.
Kang et al., "Single-walled carbon nanotubes exhibit strong antimicrobial activity," Langmuir 2007, 23, 8670-8673.
Kang et al., "Antibacterial effects of carbon nanotubes: Size does matter " Langmuir 2008, 24 (13), 6409-6413.
Kang et al., "Physicochemical determinants of multiwalled carbon nanotube bacterial cytotoxicity." Environ. Sci. Technol. 2008, 42 (19), 7528-7534.
Katz and Willner, "Biomolecule-functionalized carbon nanotubes: applications in nanobioelectronics," ChemPhysChem 2004, 5 (8), 1084-1104.
Kelly, E. J., "Anodic Dissolution and Passivation of Titanium in Acidic Media III Chloride Solutions." Journal of the Electrochemical Society 1979, 126, (12), 2064-2075.
Kim et al., "Raman and IR spectroscopy of chemically processed single-walled carbon nanotubes." J. Am. Chem. Soc. 2005, 127 (44), 15437-15445.
Kim et al., "Iron oxide/carbon black (Fe2O3/CB) composite electrode for the detection of reduced nicotinamide cofactors using an amperometric method under a low overpotential," Biosens. Bioelectron. 2010, 25 (5), 1160-1165.
Kim and Park, "Light-harvesting multi-walled carbon nanotubes and CdS hybrids: Application to photocatalytic hydrogen production from water." Energy Environ. Sci. 2011, 4 (3), 685-694.
Koep et al., "A photolithographic process for investigation of electrode reaction sites in solid oxide fuel cells," Solid State Ionics 2005, 176 (1-2), 1-8.
Kongkanand et al., "Single wall carbon nanotube scaffolds for photoelectrochemical solar cells. Capture and transport of photogenerated electrons," Nano Lett. 2007, 7, 676-680.
Kotz et al., "Electrochemical waste water treatment using high overvoltage anodes. Part 1: Physical and electrochemical properties of SnO2 anodes." J. Appl. Electrochem. 1991, 21 (1), 14-20.
Krawczyk and Skowronski, "Modification of expanded graphite resulting in enhancement of electrochemical activity in the process of phenol oxidation." Journal of Applied Electrochemistry 2010, 40, (1), 91-98.
Kundu et al., "Electrocatalytic activity and stability of nitrogen-containing carbon nanotubes in the oxygen reduction reaction." J. Phys. Chem. C 2009, 113 (32), 14302-14310.
Lee et al., "Selective electron- or hole-transport enhancement in bulk-heterojunction organic solar cells with N- or B-doped carbon nanotubes," Adv. Mater. 2011, 23 (5), 629-633.
Li et al., "Preparation and characterization of multiwalled carbon nanotube-supported platinum for cathode catalysts of direct methanol fuel cells," J. Phys. Chem. B 2003, 107, 6292-6299.
Li et al., "Novel three-dimensional electrodes: Electrochemical properties of carbon nanotube ensembles." J. Phys. Chem. B 2002, 106 (36), 9299-9305.
Li et al., "Constructing stake structured TiO2-NTs/Sb-doped SnO2 electrode simultaneously with high electrocatalytic and photocatalytic performance for complete mineralization of refractory aromatic acid." J. Phys. Chem. C 2009, 113 (6), 2375-2383.
Li et al., "Compression-modulated tunable-pore carbon-nanotube membrane filters," Small 2007, 3, 595-599.
Li et al., "Reaction pathways and mechanisms of the electrochemical degradation of phenol on different electrodes." Water Research 2005, 39, (10), 1972-1981.
Li et al., "Effects of mixed solvents and PVDF types on performance of PVDF microporous membranes." Journal of Applied Polymer Science (2010) 115:2277-2287.
Liang et al., "Inactivation of Microcystis aeruginosa by continuous electrochemical cycling process in tube using Ti/RuO2 electrodes," Environ. Sci. Technol. 2005, 39, 4633-4639.
Lim et al., "Environmental remediation and conversion of carbon dioxide (CO2) into useful green products by accelerated carbonation technology," Int. J. Environ. Res. Public Health 2010, 7 (1), 203-228.
Lin and Xing, "Adsorption of phenolic compounds by carbon nanotubes: Role of aromaticity and substitution of hydroxyl groups." Environ. Sci. Technol. 2008, 42 (19), 7254-7259.
Lin et al., "Catalytic wet air oxidation of phenol by various CeO2 catalysts." Water Research 2002, 36, (12), 3009-3014.
Lin et al., "Strong effect of precursor preparation on the morphology of semicrystalline phase inversion poly(vinylidene fluoride) membranes," Journal of Membrane Science, 274:64-72 (2006).
Liu et al., "Sharper and faster "Nano Darts" kill more bacteria: A study of antibacterial activity of individually dispersed pristine single-walled carbon nanotube," ACS Nano 2009, 3, 3891-3902.
Liu et al., "Preparation of Al—Ce hybrid adsorbent and its application for defluoridation of drinking water," J. Hazard. Mater. 2010, 179 (1-3), 424-430.
Liu et al., "Microbial fuel cell with an azo-dye-feeding cathode." Appl. Microbiol. Biotechnol. 2009, 85 (1), 175-183.
Liu et al., "Highly ordered TiO2 nanotube arrays with controllable length for photoelectrocatalytic degradation of phenol," J. Phys. Chem. C 2008, 112, 253-259.
Liu et al. "Progress in the production and modification of PVDF membranes" Journal of Membrane Science (2011) 375:1-27.
Luo et al., "Investigation of the electrochemical and electrocatalytic behavior of single-wall carbon nanotube film on a glassy carbon electrode," Anal. Chem. 2001, 73 (5), 915-920.

(56) References Cited

OTHER PUBLICATIONS

Pagani et al., "Competing mechanisms and scaling laws for carbon nanotube scission by ultrasonication", PNAS 109 (29):11599-11604 (2012).

* cited by examiner

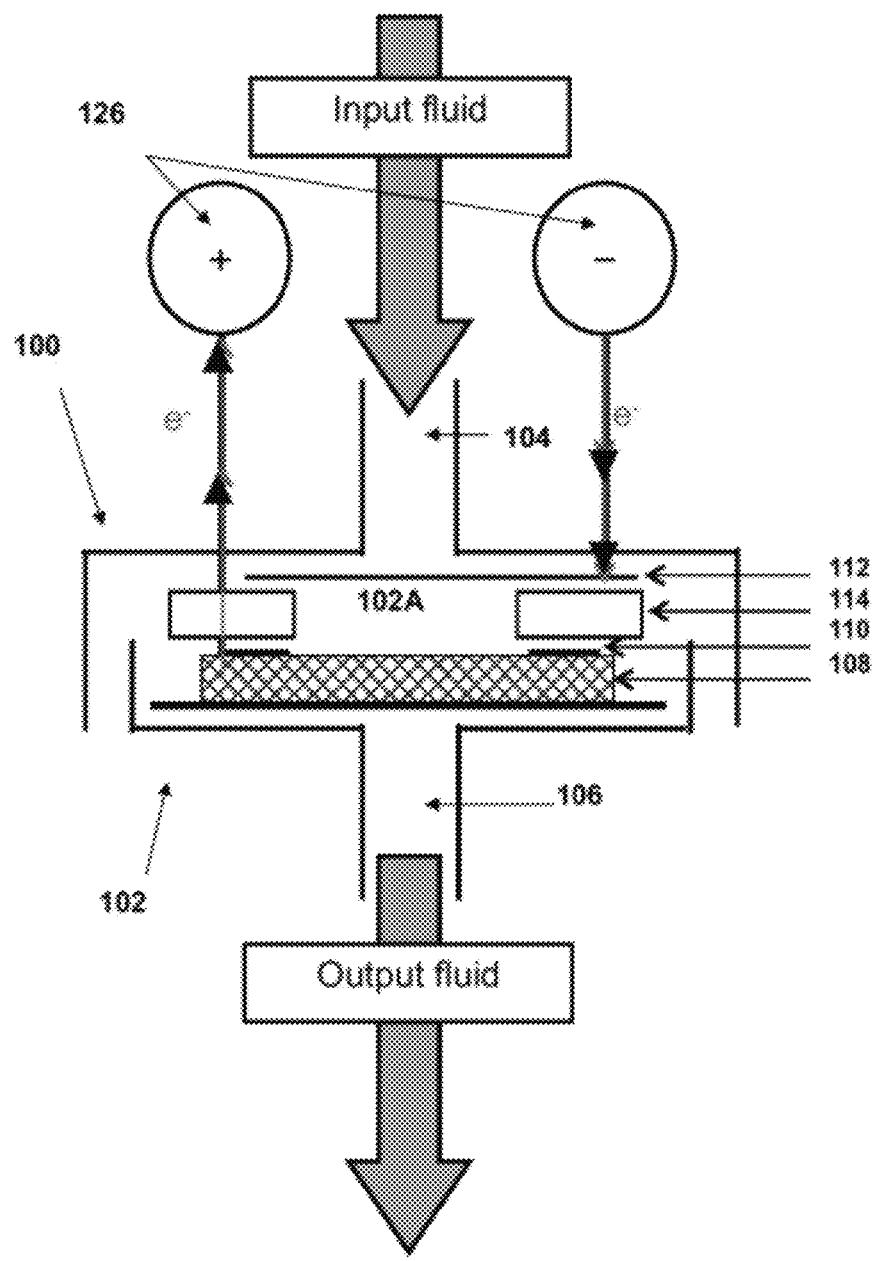

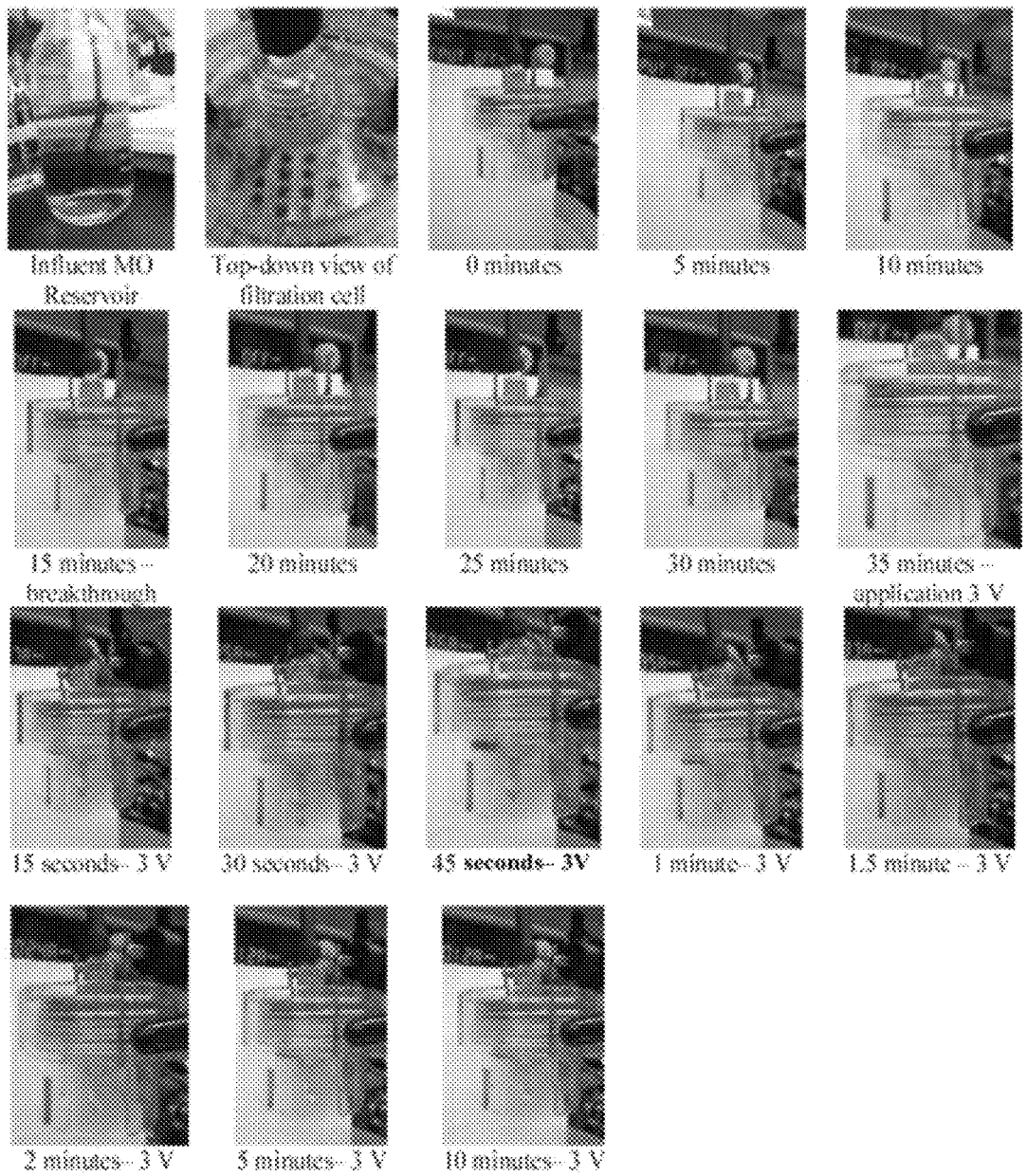

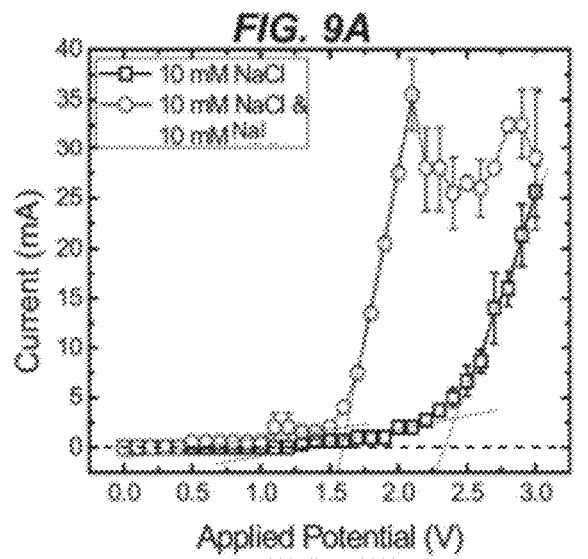
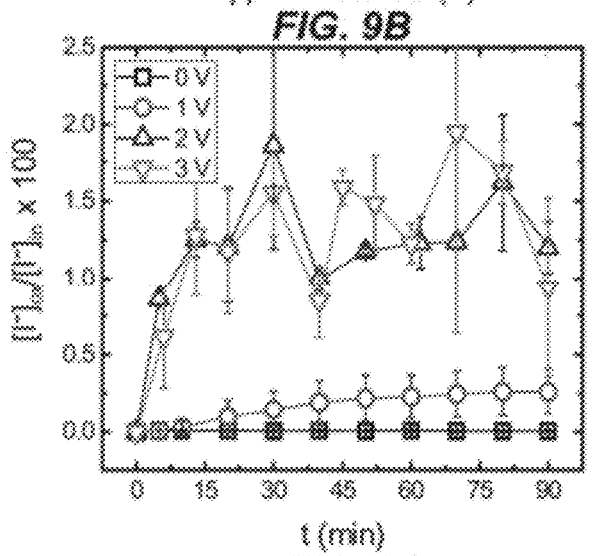
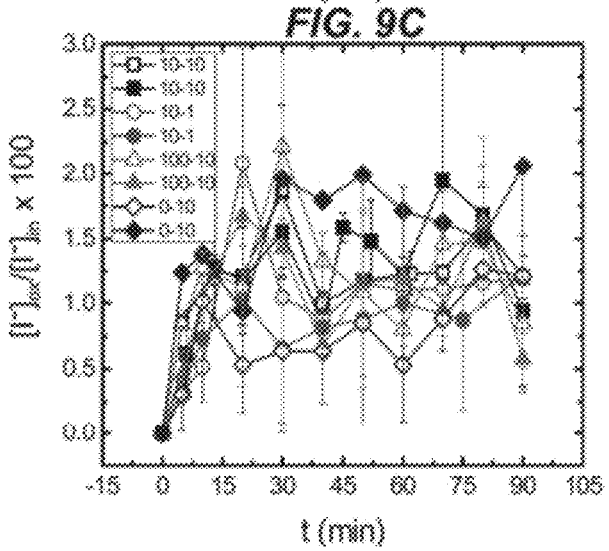

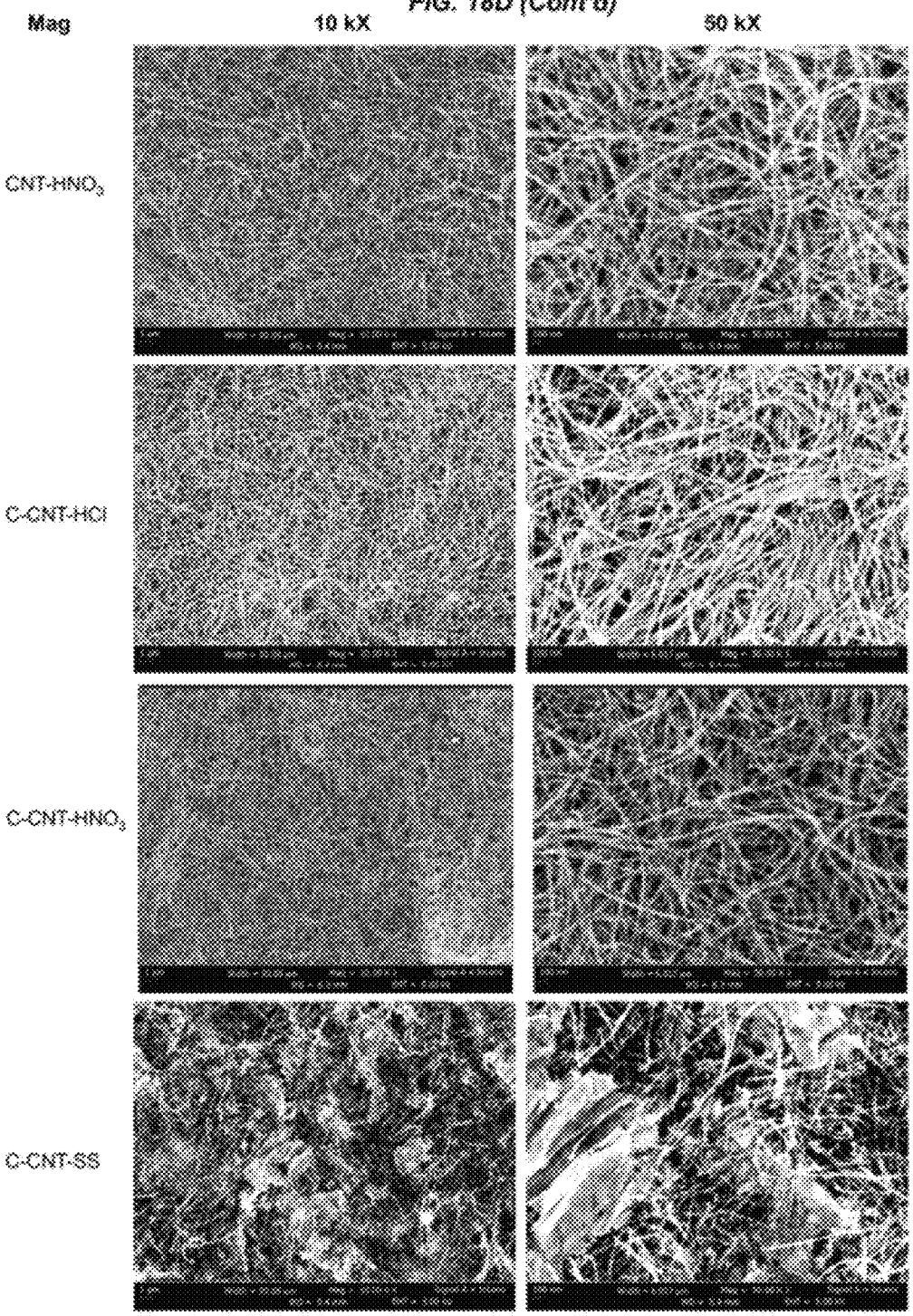

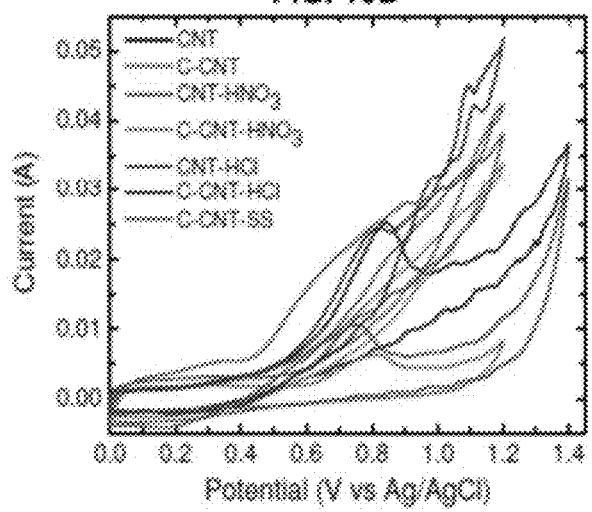
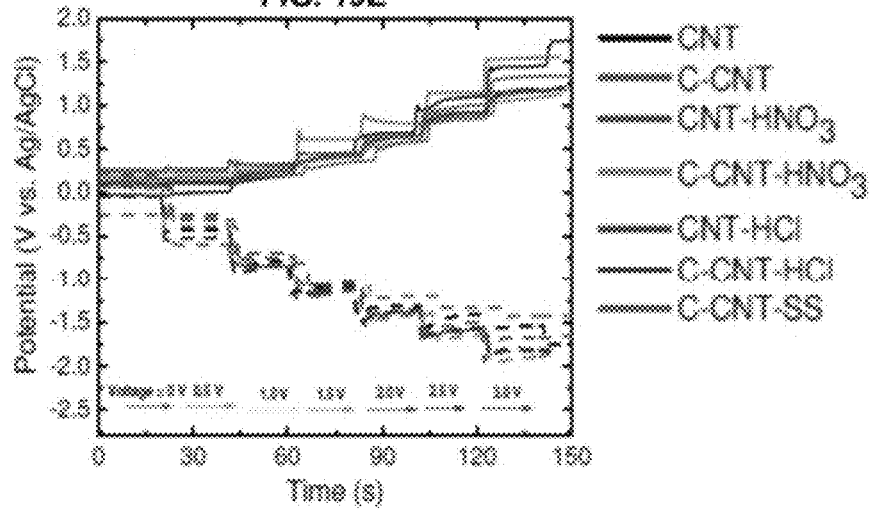
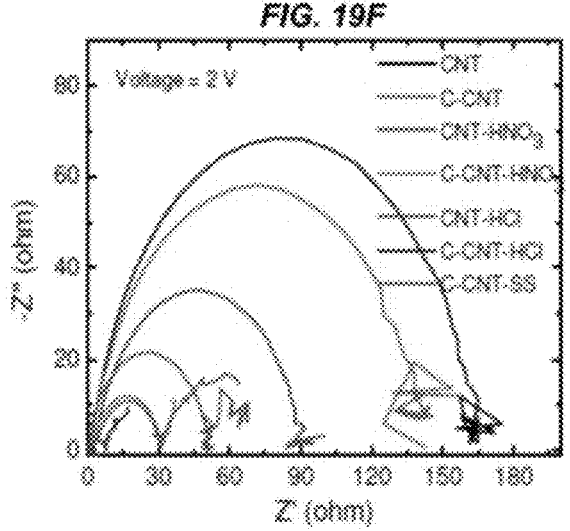

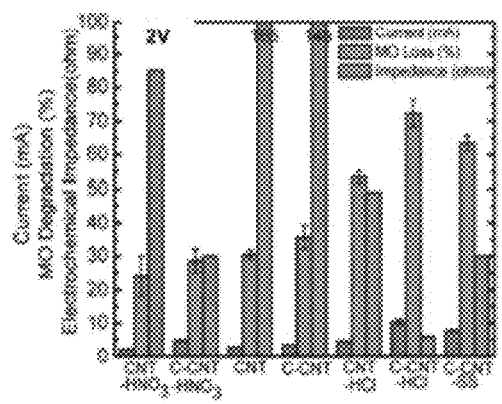
FIG. 20A
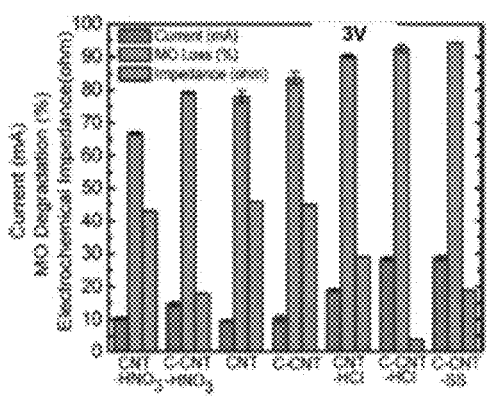
FIG. 20B
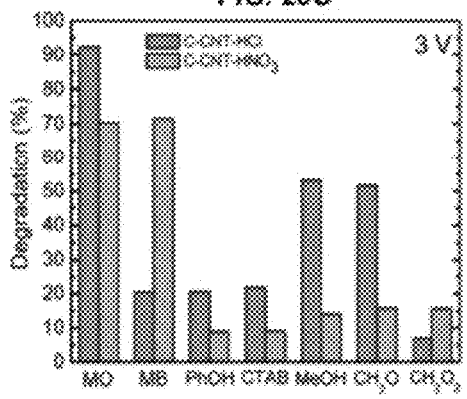
FIG. 20C
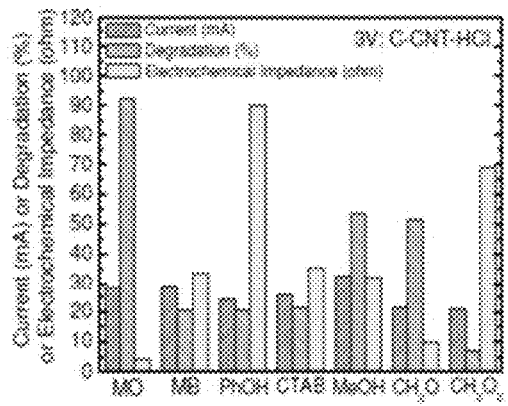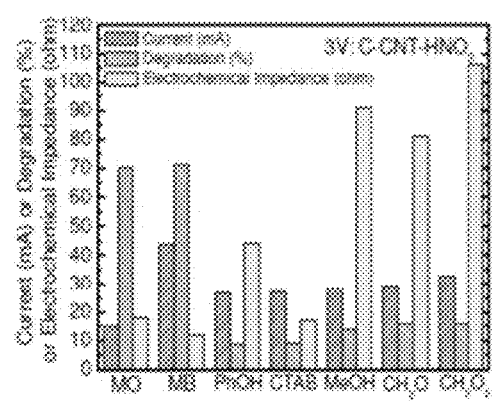
FIG. 20D

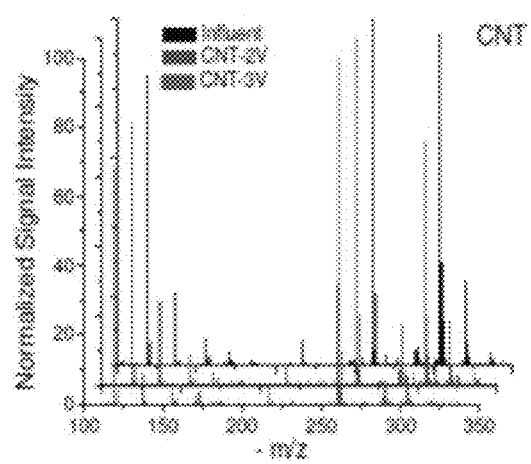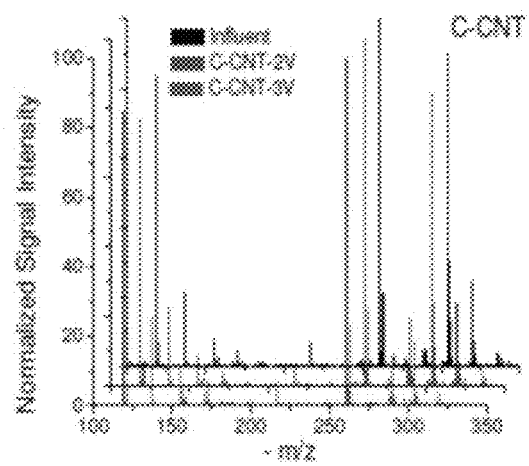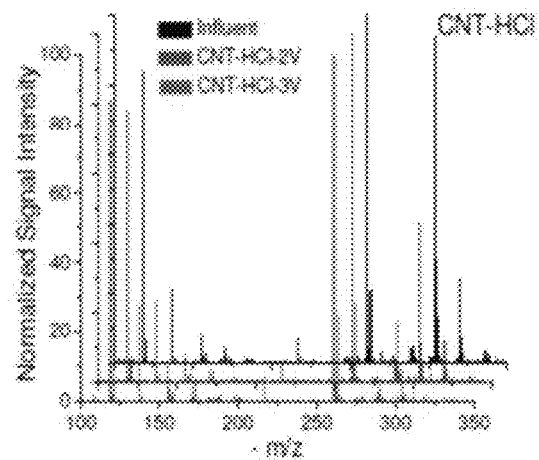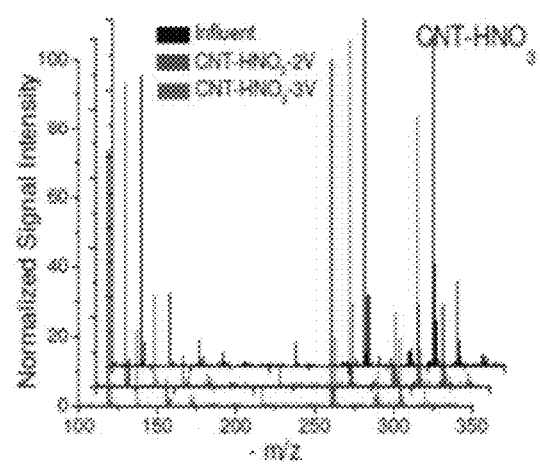

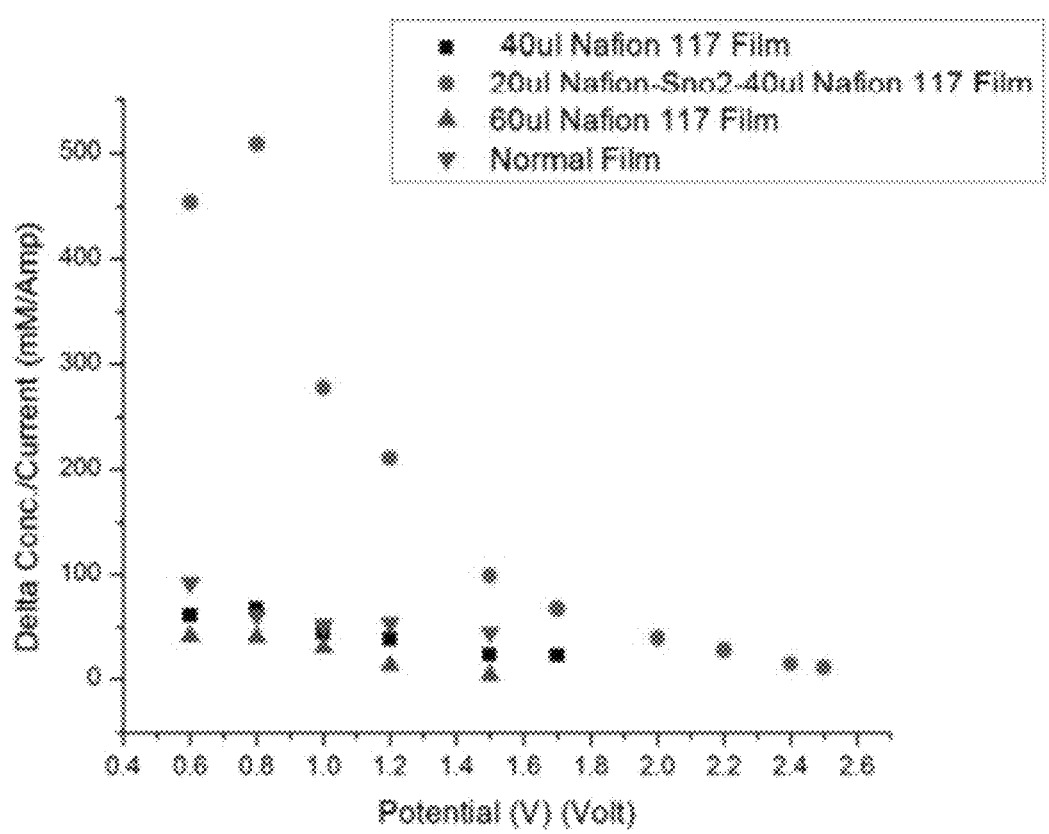

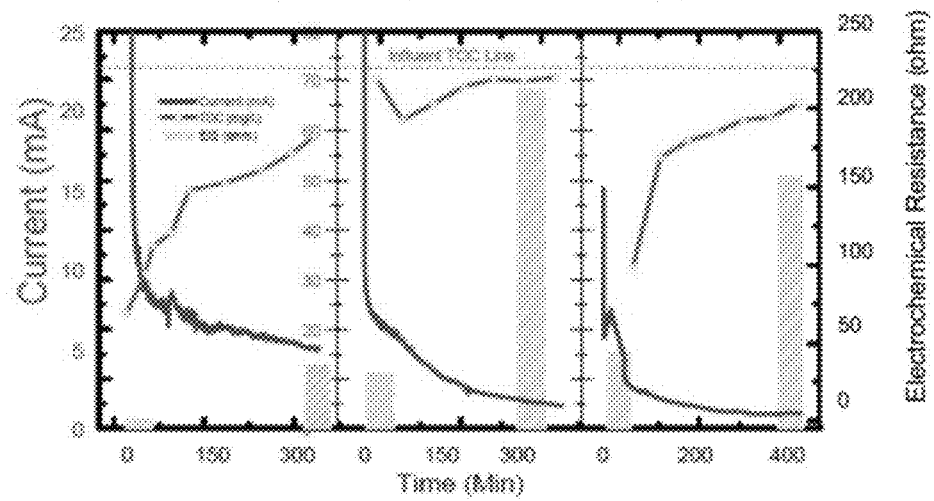
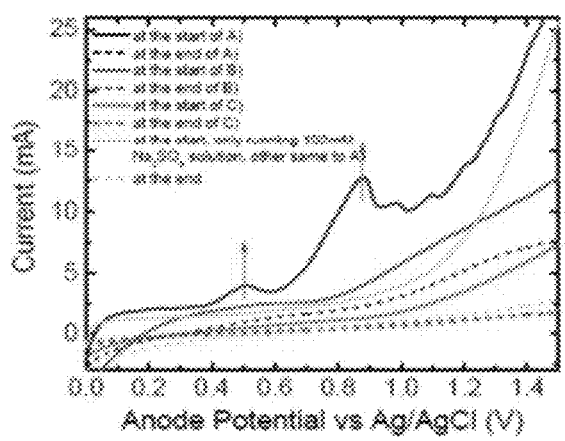
FIG. 27A  FIG. 27B  FIG. 27C
FIG. 27D
FIG. 27E

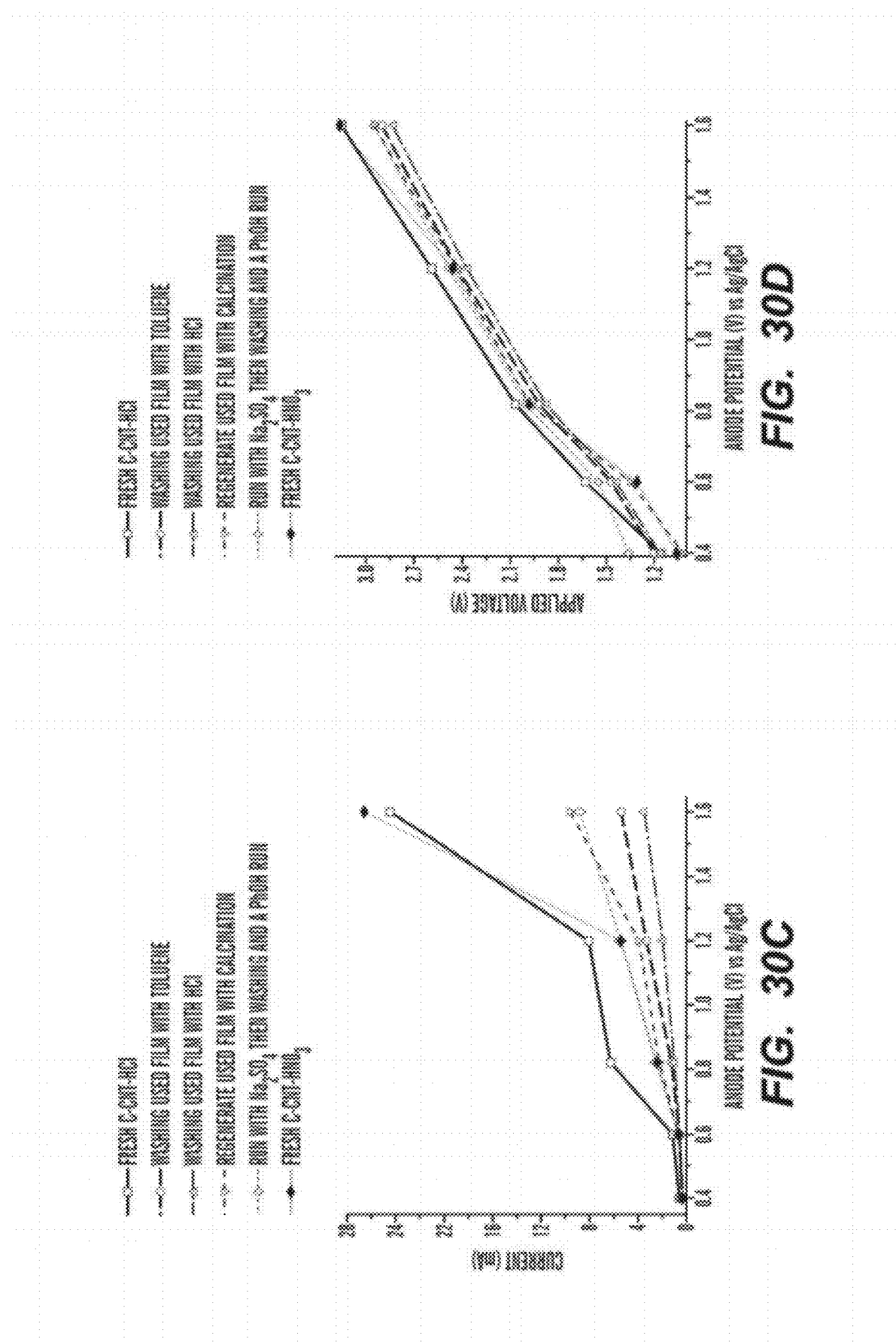

FIG. 32E (Cont'd)
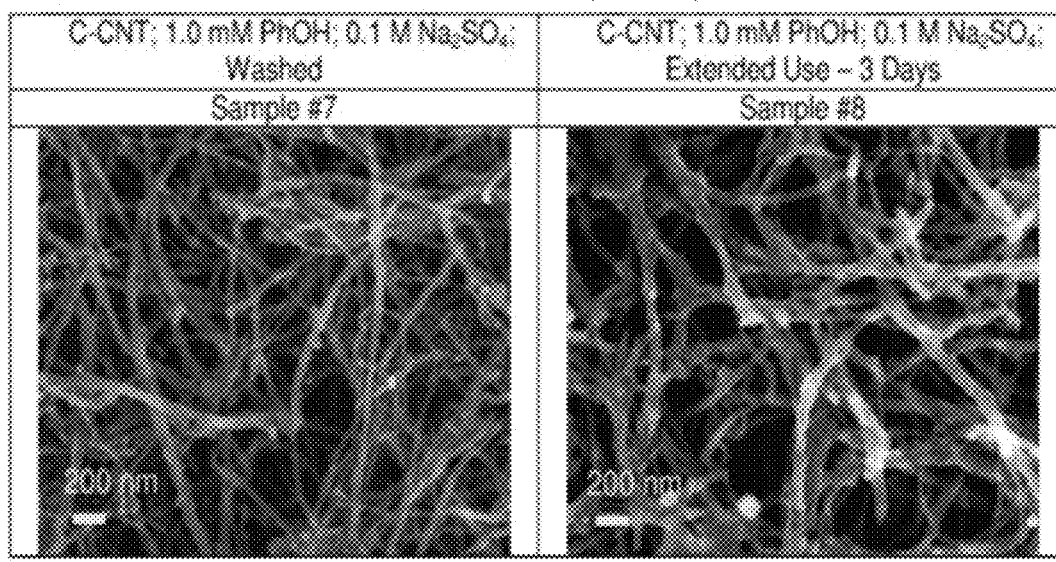
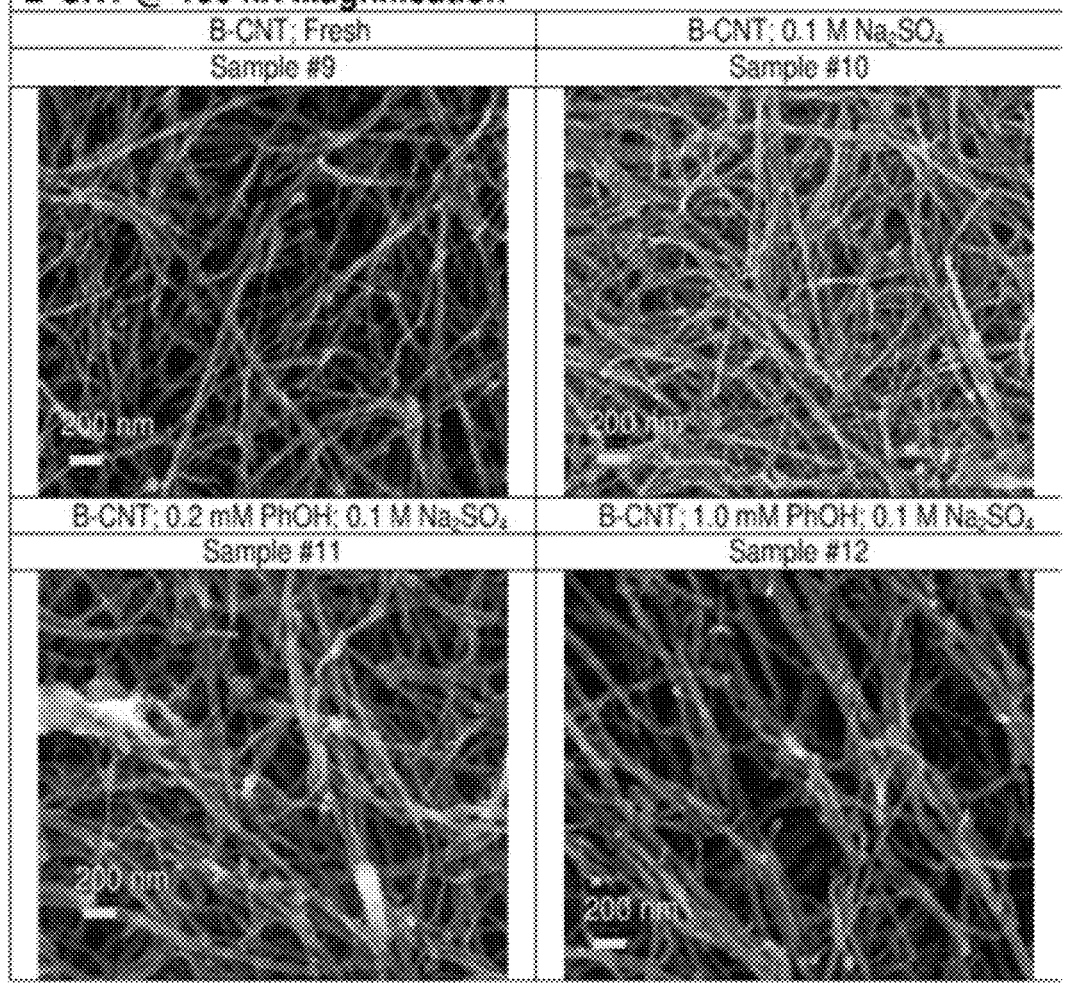

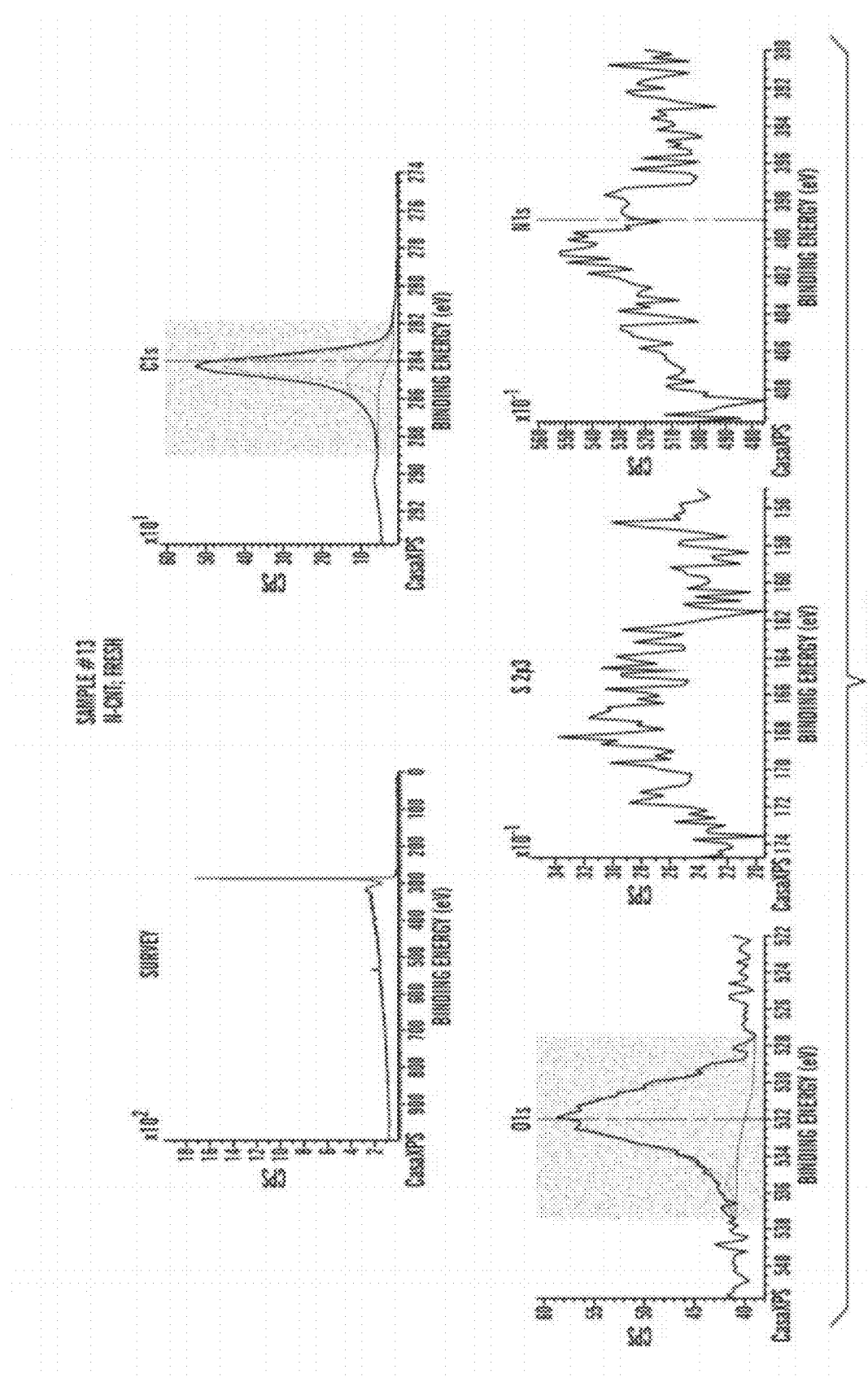

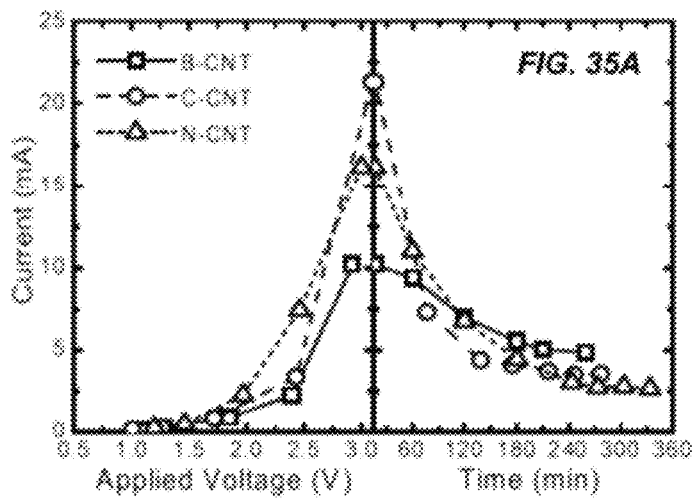
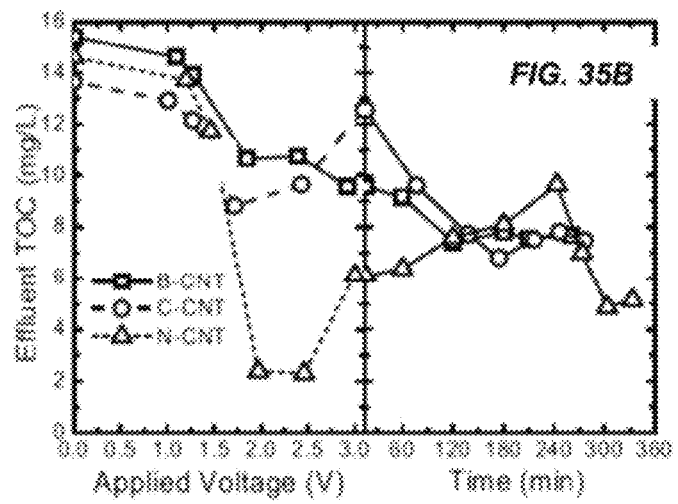
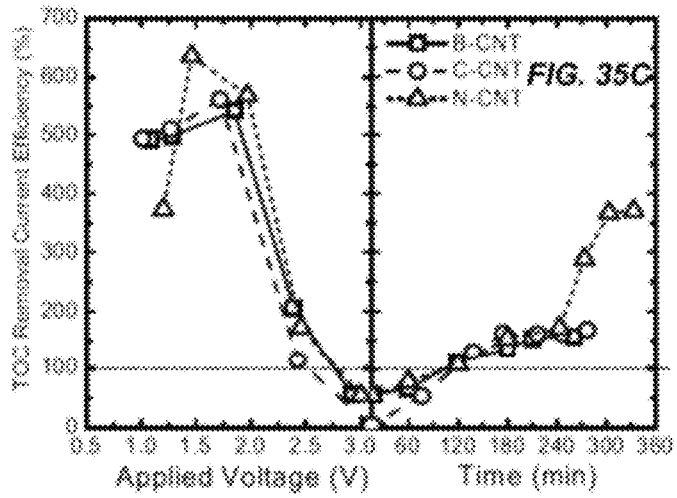

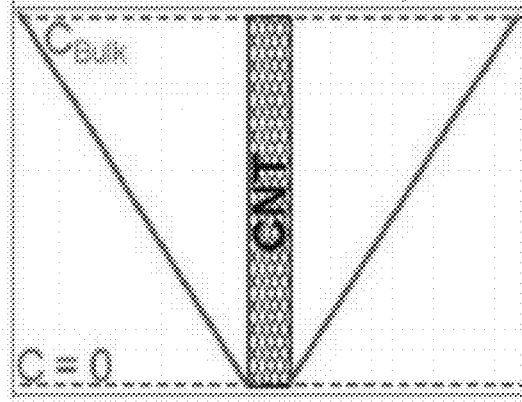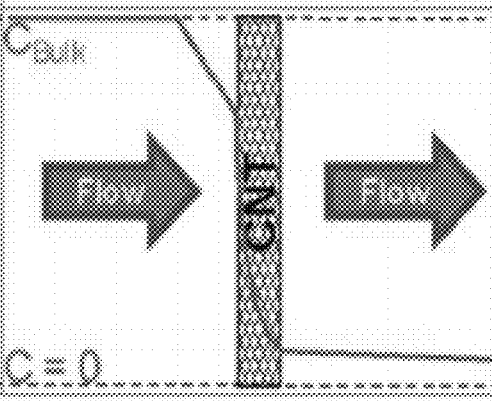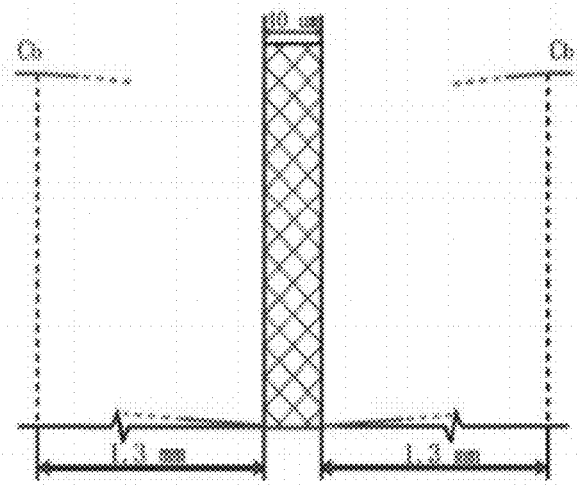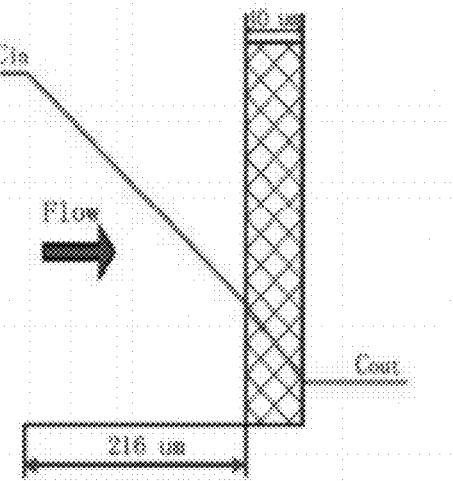
FIG. 43A  FIG. 43B

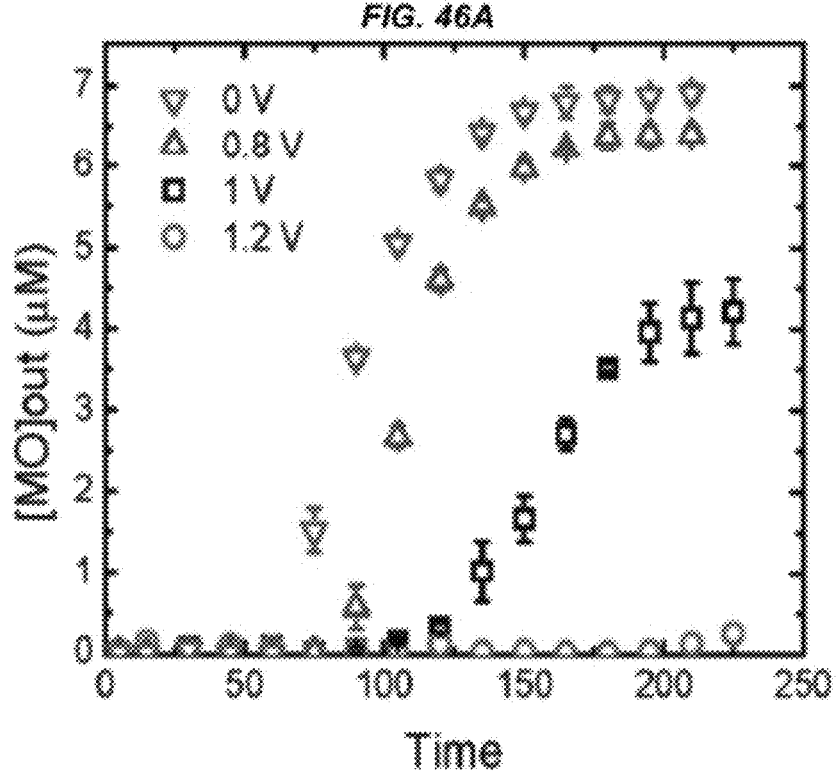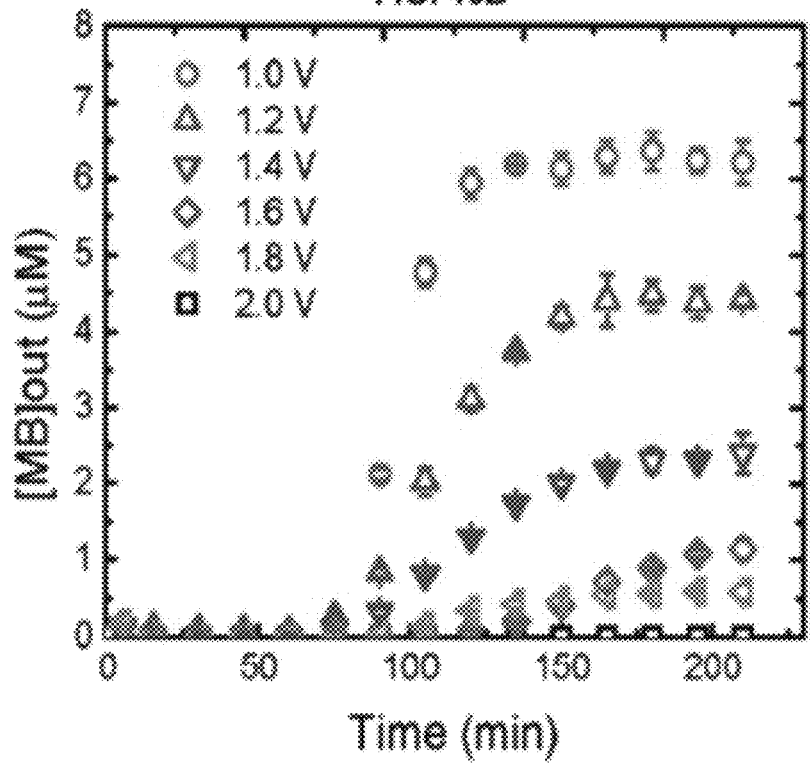

FIG. 55D
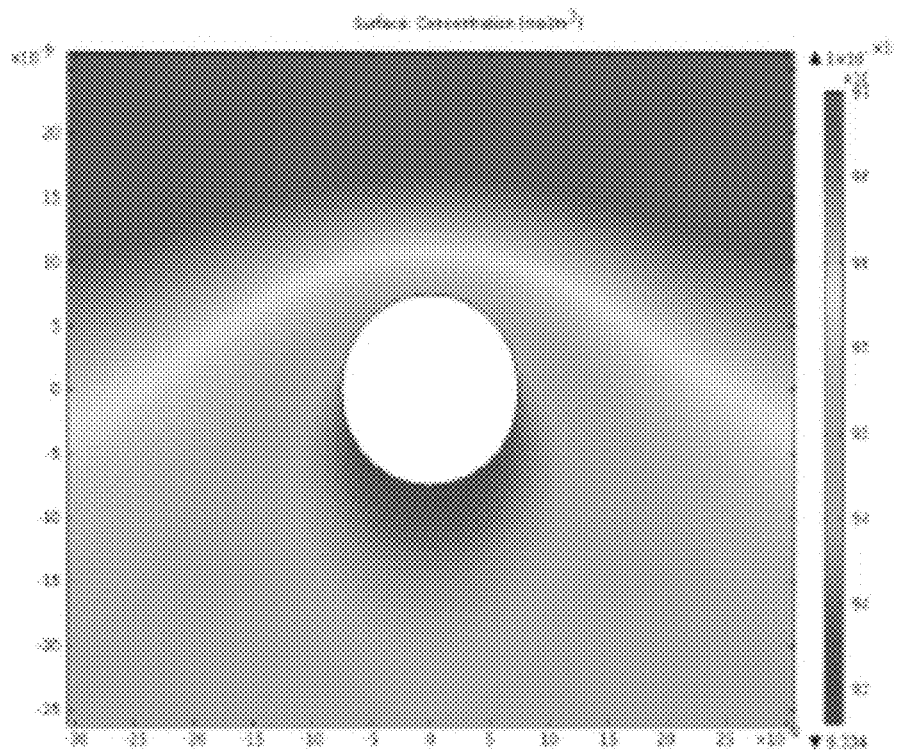
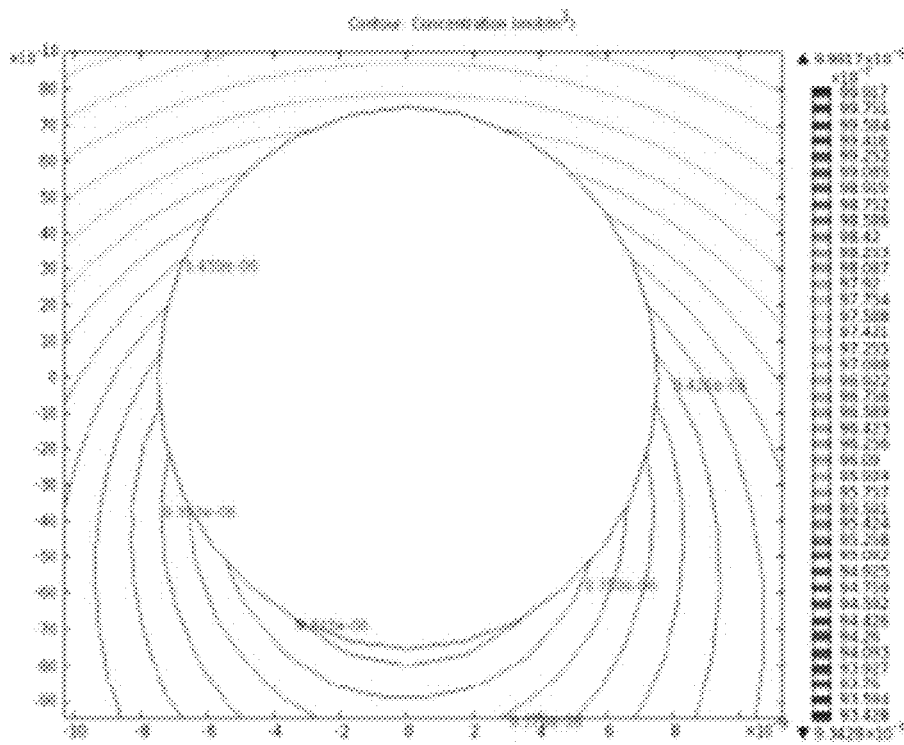

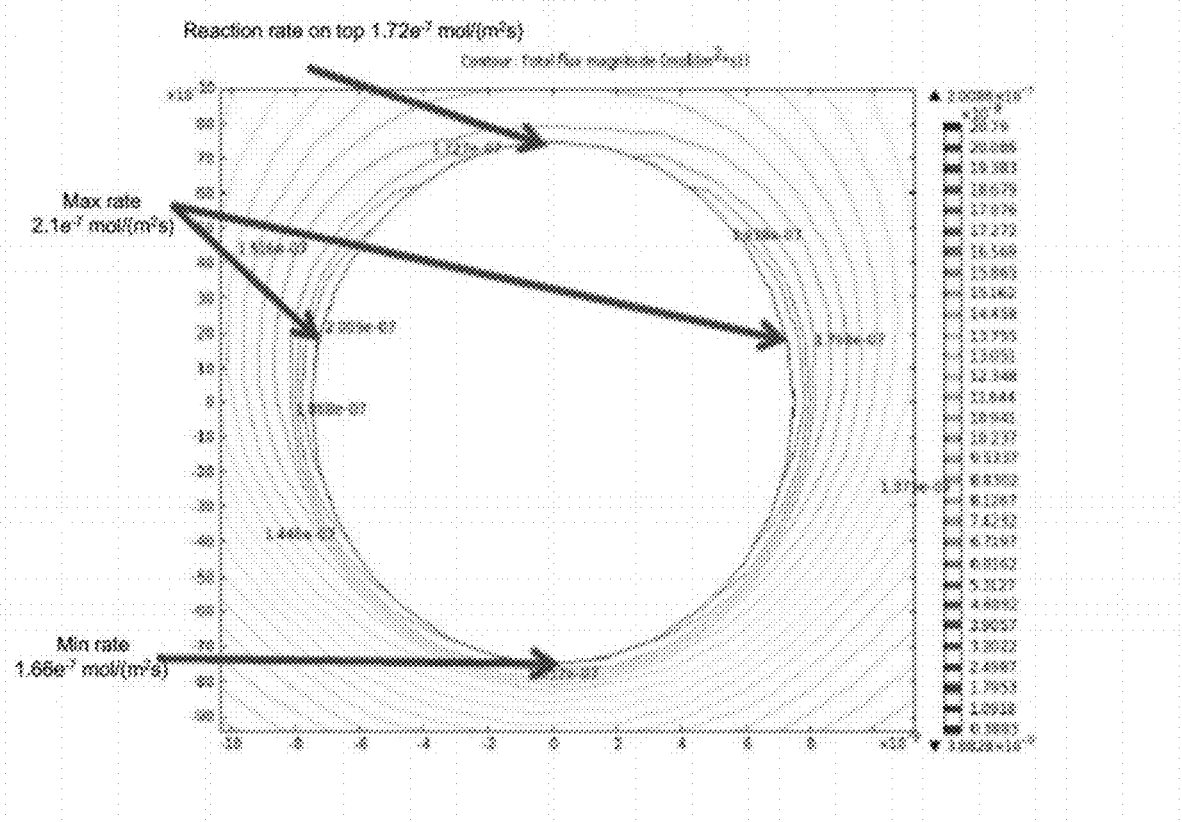

Membrane Performance w/ Respect to UV-VIS Analysis

| Force (metric tons) | Time (minutes) | Description | Image |
|---|---|---|---|
| 1.00 | 5 | Well-assembled CNT-polymeric hybrid membrane, substantial layer of CNT film remaining on parchment paper | 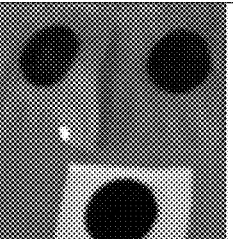 |
| 0.50 | 5 | Well-assembled CNT-polymeric hybrid membrane, thinner layer of CNT film remaining on parchment paper | 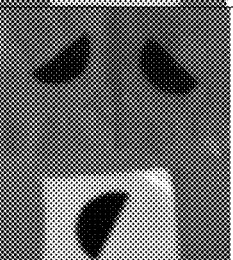 |
| 0.25 | 5 | Well-assembled CNT-polymeric hybrid membrane, thinnest layer of CNT film remaining on parchment paper | 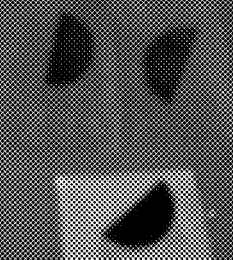 |

Table 13. Press Evaluation Results

*FIG. 65*

ELECTROCHEMICAL CARBON NANOTUBE FILTER AND METHOD

CROSS-REFERENCE TO RELATED APPLICATIONS

This application claims benefit under 35 U.S.C. §120 and is a Continuation-in-Part of U.S. application Ser. No. 13/358,248, filed Jan. 25, 2012, which claims benefit under 35 U.S.C. §119(e) of provisional application No. 61/436,031, filed on Jan. 25, 2011. The contents of both applications are incorporated herein by reference in their entirety.

FIELD OF THE INVENTION

The invention relates generally to filtration apparatuses and methods for reducing one or more contaminants from a fluid, e.g., an aqueous fluid. In particular, the invention is directed to filtration apparatuses and methods using an applied voltage for reducing aqueous contaminants.

BACKGROUND OF THE INVENTION

Waterborne contaminants e.g., toxic chemical substances and pathogens, are a primary public health concern in developing countries and result in millions of deaths every year [1]. Minimal drinking water treatment is beneficial and should include removal of harmful contaminants such as organic molecules, ions, and pathogens.

Electrochemical processes have been reported to inactivate both viruses and bacteria [5-7]. Most previous studies have focused on electrochemical generation of active chlorine species (>2.5 V; HOCl, Cl2.$^-$) or electrochlorination [6, 8]. However, active chlorine-based pathogen inactivation can result in formation of harmful disinfection by-products [9], making the treated water unsuitable for drinking. As such, boron-doped diamond (BDD) anodes have been developed for bacterial inactivation. Although BDD anodes do not generate active chlorine species [10, 11], they require greater driving potentials (>3.0 V) than electrochlorination and thus increase energetic requirements for the disinfection process. Another alternative material for electrochemical disinfection is porous elemental carbon. Carbon cloth [12], carbon fiber [13], and granular activated carbon [14] anodes have been reported to be useful for electrochemical inactivation of attached bacteria at relatively low potentials (~1 V). While the low driving potentials of these carbon-based anodes may reduce energy requirements and avoid disinfection by-product formation, these porous elemental carbon anodes do not have large specific surface area for efficient electrochemical processes. Previous research has also discussed destruction of organic compounds by electrochemical oxidation. However, the low mass transfer of contaminants from water to the electrode surface has limited the usefulness of electrochemical techniques in water treatment.

A recent study has been attempted to improve the overall mass transfer of chemical compounds in electrochemical treatment of contaminated water. Yang J. et al., 43 Environ. Sci. Technol. 3796 (2009). The Yang J. et al.'s system utilizes electrodes made of carbon nanotubes (CNTs) packed between two activated carbon fiber felts. Such system has been shown to degrade an organic dye (e.g., X-3B) present in water by re-circulating the contaminated water through the system for ~90 mins at an applied potential of about 10V. However, re-circulation of contaminated water through the system limits its usefulness in continuous free-flow processes. Further, the Yang et al. reference does not disclose the ability of the system to remove biological microorganisms such as pathogens in in aqueous fluid.

Other studies have also previously reported that CNTs can be useful for adsorbing ionic dyes (7), chlorophenols (8), and natural organic matter via van der Waals interactions with the sp$^2$-conjugated (planar) CNT sidewalls (9). CNT oxidation produces a large number of carboxylate surface groups that can bind metal ions such as $Zn^{2+}$ and $Cd^{2+}$ (10). CNTs coated with ceria have been utilized to separate chromium and arsenate from aqueous solutions (11, 12). Further, randomly-oriented single-walled carbon nanotube (SWNT) (14, 15) and multi-walled carbon nanotube (MWNT) (16) filters have been previously shown to isolate bacteria and virus from an aqueous fluid by sieving and depth filtration, respectively. Aligned MWNT network can also be useful for isolation of heavy petroleum hydrocarbons, bacteria, and virus from aqueous solution by gravity filtration through their interstitial space (19). Although the CNTs have been used to separate organic matters and bacteria from an aqueous fluid, e.g., by adsorption and filtration (mainly size exclusion), adsorption breakthrough can occur over time. Unless the adsorbed/sieved matters on the CNTs are destroyed and/or removed, the over-loaded CNTs would be rendered ineffective for further filtration. In addition, the adsorbed/sieved organics and pathogens may remain active, toxic, and/or viable. If they are not inactivated or degraded, the adsorbed matters can still pose potential health hazards in our environment.

The application of electrochemical processes in water treatment has drawn considerable attention in the past few years, because the electrolytic process is easy to control by potential and current, and such process can operate at low temperatures and pressures. However, the electrochemical technique is not widely applied in water treatment because of the high cost and low current efficiency caused by low contaminant mass transfer from water to the electrode surface. While CNT is an attractive material for aqueous filtration due to large specific surface area, adsorption breakthrough poses a limitation on the filter life-time and its usage in continuous water treatment processes. As such, there is a strong need to develop a more effective and efficient apparatuses and/or methods for water treatment. Further, there is an unmet need in the art for development of novel point-of-use water filtration devices and methods for removal and/or inactivation of waterborne pathogens and/or contaminants.

SUMMARY OF THE INVENTION

Aspects of the present invention stems from the discovery that an electrochemical filter comprising carbon nanotubes, e.g., multi-walled carbon nanotubes (MWNTs), can efficiently reduce at least one contaminant present in an aqueous solution, e.g., organic molecules, aqueous anions (e.g., chlorides and iodides), or biological microorganisms (e.g., viruses and bacteria), through a porous carbon nanotube network when a potential is applied. At an applied potential, the electrochemical MWNT filter can separate the contaminants from the aqueous fluid. Further, the MWNT filter can transform the contaminants (e.g., by oxidation). In some embodiments, the contaminants can be oxidized or deactivated on the MWNT filter. Accordingly, provided herein are filtration apparatuses and methods for reducing at least one contaminant in a fluid, e.g., an aqueous fluid. Examples of contaminants include, but are not limited to, chemical substances (e.g., organic molecules, and ions) and biological microorganisms (e.g., viruses, and bacteria). In some embodiments, the fluid, e.g., an aqueous fluid, can include an electrolyte, e.g., an ionic solution.

In one aspect, the present invention is directed to filtration apparatuses, for example, for reducing at least one contaminant in a fluid, e.g., an aqueous fluid. In some embodiments, the filtration apparatus described herein includes (1) a housing forming a chamber with an inlet for receiving an input fluid and an outlet for releasing an output fluid; (2) a porous carbon nanotube filter material positioned between the inlet and the outlet, wherein at least a portion of the porous carbon nanotube filter material is in contact with a first conducting material, e.g., titanium; and (3) a second conducting material, e.g., permeable stainless steel, positioned between the inlet and the outlet. In some embodiments of the invention, the second conducting material and first conducting material can be separated or held in a spaced apart configuration by an insulating or dielectric material. In some embodiments, the second conducting material and the porous carbon nanotube filter material can be separated or held in a spaced apart configuration.

In some embodiments, the porous carbon nanotube filter material is utilized as an anode and connected to a voltage source via mechanical contact to the first conducting material, e.g., titanium.

In operation, the first and second conducting materials can be connected to a voltage source providing an applied potential between an anode and a cathode formed by the conducting materials. In some embodiments, a potential of at least about 1 volt is applied to the filtration apparatus. In some embodiments, the filtration apparatus can be used for dead-end filtration.

In alternative embodiments, the filtration apparatus can be used for cross-flow filtration. In some embodiments, the filtration apparatus comprises (1) a housing forming a chamber having a plane, the chamber including an inlet for receiving an input fluid, a first outlet for releasing fluid, and a second outlet for releasing filtered fluid, wherein the inlet and the first outlet are disposed on a first side of the plane, and the second outlet is disposed on a second side of the plane; (2) a laminated filter positioned along the plane between the inlet and the second outlet, the filter comprising at least one porous polymer layer disposed between a first porous carbon nanotube filter material and a second porous carbon nanotube filter material; (3) a first conducting connector positioned along the plane between the inlet and the carbon nanotube-based filter; and (4) a second conducting connector positioned along the plane between the carbon nanotube-based filter and the second outlet. In some embodiments, the filtration apparatus can be used for cross-flow filtration.

In some embodiments, the first conducting connector can be in contact with a portion of the first porous carbon nanotube filter material. In some embodiments, the second conducting connector can be in contact with a portion of the second porous carbon nanotube filter material.

The first conducting connector and the second conducting connector can have a thickness of any dimension. In some embodiments, the first conducting connector and the second conducting connector can have a thickness of about 100 µm to about 1000 µm or more. In one embodiment, the first conducting connector and the second conducting connector can have a thickness of about 130 µm.

The first conducting connector and the second conducting connector can be designed and placed in the filtration apparatus to act as an anodic electrode and a cathodic electrode, respectively, but they cannot be configured in the filtration apparatus in a manner that can result in a short circuit. For example, in some embodiments where the first conducting connector and the second conducting connector are aligned with the filter and the housing with a peg, the peg can be an electrical insulator, e.g., acrylics. In some embodiments, any portion or surface of the first conducting connector and second conducting connector that could be potentially electrically-connected via a contact with the peg can be coated with an electrically-insulating layer.

In some embodiments, at least one of the first conducting connector and the second conducting connector includes titanium. In one embodiment, both the first conducting connector and the second conducting connector include titanium.

In some embodiments, a laminated filter comprising at least one first porous polymer layer disposed between a first porous carbon nanotube filter material and a second porous carbon nanotube filter material can also be provided. In some embodiments, the laminated filter can be used in the filtration apparatus for cross-flow filtration. In some embodiments, the laminated filter can be used in the filtration apparatus for dead-end filtration.

In some embodiments, the porous carbon nanotube (CNT) filter material can include porous polymer material, e.g., for increasing the stability of the porous carbon nanotube filter material for repeated use. An exemplary porous polymer material that can be added into the porous carbon nanotube filter material includes polyvinylidene fluoride (PVDF). In one embodiment, the porous carbon nanotube filter material can comprise about 1-10% CNT or about 1-5% CNT in porous polymer material, e.g., but not limited to PVDF.

In some embodiments, the laminated filter can further comprise a second porous polymer layer disposed between the first porous carbon nanotube filter material and a third porous carbon nanotube filter material. In some embodiments, the laminated filter can further comprise a third porous polymer layer disposed between the second porous carbon nanotube filter material and a fourth porous carbon nanotube filter material.

In some embodiments, any porous polymer layer that is inert to chemicals and/or is mechanically strong to withstand the desired fluid pressure (e.g., water pressure) can be used in the laminated filter. In some embodiments, the porous polymer layer can include polyvinylidene fluoride (PVDF).

In order to minimize the resistance to a flow through the laminated filter, in some embodiments, the porous polymer layer can exhibit a flux that is at least 70% of a flux through the first porous carbon nanotube filter material or the second porous carbon nanotube filter material. Alternatively, the porous polymer layer can have a pore size of about 0.01 µm to about 5 µm.

In some embodiments of any aspects described herein, the porous carbon nanotube filter materials can comprise undoped carbon nanotubes, nitrogen-doped carbon nanotubes, boron-doped carbon nanotubes, fluorine-doped carbon nanotubes or any combinations thereof.

In some embodiments of any aspects described herein, the carbon nanotubes can be multi-walled carbon nanotubes.

In some embodiments of any aspects described herein, the porous carbon nanotube filter materials can have a specific surface area of about 50 $m^2/g$ to about 1500 $m^2/g$, or more. In one embodiment, the porous carbon nanotube filter materials can have a specific surface area of about 50 $m^2/g$ to about 200 $m^2/g$ or more. In one embodiment, the porous carbon nanotube filter materials can have a specific surface area of about 100 $m^2/g$, e.g., to provide a large number of active adsorption, reaction, and/or deposition sites for molecular and/particulate/microorganism removal, respectively.

The carbon nanotubes can be surface-modified to enhance the performance of the carbon nanotube filter material. Accordingly, in some embodiments of any aspects described herein, at least a portion of the carbon nanotubes can be modified by at least one processing treatment. Examples of such processing treatment can include, but are not limited to, calcination, acid treatment, polymer coating, addition of an electrocatalyst, addition of at least one functional group, and any combinations thereof.

Another aspect of the invention provides methods for reducing at least one contaminant from a fluid (e.g., aqueous fluid, non-aqueous fluid or gaseous fluid). In some embodiments, the method includes (a) providing at least one filtration apparatus described herein; (b) connecting the first conducting material to a positive pole of a voltage source; (c) connecting the second conducting material to a negative pole of the voltage source; (d) applying a voltage from the voltage source; (e) passing a fluid through the porous carbon nanotube material from the inlet of the filtration apparatus, wherein the porous carbon nanotube material separates at least one contaminant from the fluid; and (f) collecting the output fluid from the outlet of the filtration apparatus. In some embodiments, the fluid to be filtered is an aqueous fluid.

In alternative embodiments, the method can include providing (1) a laminated filter as described herein extending along a plane between an inlet and a second outlet; (2) a first conducting connector positioned along the plane between the inlet and the laminated filter, wherein the first conducting connector connects to the first porous carbon nanotube filter material; and (3) a second conducting connector positioned along the plane between the laminated filter and the second outlet, wherein the second conducting connect connects to the second porous carbon nanotube filter material. Additionally, the method can include connecting the first conducting connector to a positive pole of a voltage source; connecting the second conducting connector to a negative pole of the voltage source; applying a voltage from the voltage source; and flowing a fluid parallel to a first surface of the laminated filter from the inlet, wherein a first portion of the fluid flows across the filter separating at least one contaminant from the aqueous fluid, whereby the first portion of the fluid exits through the second outlet, and a second portion of the fluid exits through a first outlet, thereby reducing the at least one contaminant from the fluid. In some embodiments, the fluid to be filtered is an aqueous fluid.

As the second portion of the fluid existing through the first outlet did not flow across the laminated filter in the previous pass, the second portion of the fluid can be directed to flow into the inlet of the same or different filtration system or apparatus for further filtration. In some embodiments, the fluid is an aqueous fluid.

In some embodiments of any methods described herein, the aqueous fluid can include water to be filtered. In some embodiments of any methods described herein, the aqueous fluid can include a biological fluid. In some embodiments of any methods described herein, the aqueous fluid can include at least one contaminant selected from organic molecules, ions, biological microorganisms, or a combination thereof.

In some embodiments of any methods described herein, the applied voltage from the voltage source can be less than 10 volts. In other embodiments, the applied voltage from the voltage source can be at least about 1 volt, at least about 2 volts or at least about 3 volts. In some embodiments, the applied voltage can be sufficient for at least one contaminant to be oxidized or deactivated within the porous carbon nanotube filter material.

In some embodiments of any aspects described herein, the porous carbon nanotube filter material includes a network of carbon nanotubes, e.g., multi-walled carbon nanotubes, with a porosity of at least about 10%. In some embodiments, the carbon nanotube filter material has an average pore size of at least about 0.5 nm. In some embodiments, the carbon nanotubes include a catalyst, e.g., metals, metal alloys, metal oxides, doped metal oxides, or a composite thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A to 1G show a schematic diagram and images of one embodiment of the electrochemical filtration apparatus described herein. FIG. 1A shows a diagram of the filter 100 according to the present invention. The filter 100 can include an enclosure or casing 102 adapted to enclose a perforated stainless steel cathode 112, ah insulating silicone rubber separator and seal 114, a titanium anodic ring 110 that can be pressed into the carbon nanotube anodic filter, and the MWNT anodic filter 108 supported, for example, by a PTFE membrane. FIG. 1B shows an image of one embodiment of the electrochemical filtration set-up. FIG. 1C shows an image of a polycarbonate filter casing 102 with cathodic (connected to 112) and anodic (connected to 110) leads on top. FIG. 1D shows an image of the modified filtration casing, the perforated stainless steel cathode 112 in the back and is separated from the anodic titanium ring 110 by the insulating silicone rubber O-ring 114. FIG. 1E shows an image a MWNT filter 108 composed of 3 mg MWNTs (0.31 mg/cm$^2$ coverage) on a Teflon membrane (5-μm pore size) on the bottom piece of apparatus. FIG. 1F shows an image of two MWNT filters prior to use. FIG. 1G shows an image of two MWNT filters post-electrochemical filtration (2 V, left; 3 V, right). Note that the filters are still free-standing and intact. Filters in FIGS. 1F and 1G are roughly scaled to size.

FIGS. 2A to 2C show aerial images of the MWNT filter with an average pore size of 115±47 nm in indicated length scales. FIGS. 2D to 2F show cross-section images of the MWNT filter with an average height of 41±8 μm in indicated scales.

FIG. 3A shows 'instantaneous' current (mA) as a function of applied potential (V) for $[NaCl]_{in}$=0 mM, 1 mM, 10 mM, and 100 mM where 'instantaneous' is described as the first current reading displayed after setting to a specific voltage. FIG. 3B shows a comparison of 'instantaneous' vs. 'steady-state' I-V curves for 10 mM NaCl at 1.5 mL min$^{-1}$ where 'steady-state' occurs after sufficient electrolysis time such that the current does not change, e.g., after 10-15 s. FIG. 3C shows 'instantaneous' I-V curves for 10 mM NaCl at flow rates of 0 mL min$^{-1}$, 0.5 mL min$^{-1}$, 1.5 mL min$^{-1}$, 2.5 mL min$^{-1}$, and 3.5 mL min$^{-1}$, respectively.

FIG. 4A shows a schematic diagram of dye adsorption on the MWNT filter. FIG. 4B shows methylene blue adsorption breakthrough curves for MWNT filters of various dimensions; $[MB]_{in}$=7.0±100 μM, [NaCl]=10 mM, and 1.5±0.1 mL min$^{-1}$. FIG. 4C shows methyl orange adsorption breakthrough curves for three MWNT filters of similar dimensions; $[MO]_{in}=25.0\pm2.0$ μM, $[NaCl]=10$ mM, $1.5\pm0.1$ mL min$^{-1}$, h=41 μm, and d=30 mm. Representative plots are shown, and all experiments were completed in at least duplicate.

FIG. 6 shows images of the electrochemical MWNT filtration cell during methyl orange adsorption under 0 V followed by oxidation at ~3V upon application of a potential after 35 minutes. The images correspond to data in FIGS. 4C and 3 volts in FIG. 7C.

FIG. 7A shows a schematic diagram of electrochemical desorption (top panel) and oxidation (bottom panel) of adsorbed dye. FIG. 7B shows adsorbed methylene blue desorption and oxidation at potentials of 1 V (square), 2 V (circle), and 3 V (triangle). The inset is the same plot zoomed in on the y-axis to show low concentration data. FIG. 7C shows adsorbed methyl orange oxidation at potentials of 1 V (square), 2 V (circle), and 3 V (triangle). It is of note that no desorption is observed for the negatively charged methyl orange. Representative plots are shown, all experiments were completed in at least duplicate, and lines are eye guides.

FIG. 8A shows electrochemical filtration of methylene blue at potentials of 0 V (square), 1 V (circle), 2 V (triangle), and 3 V (inverted triangle), respectively. FIG. 8B shows electrochemical filtration of methyl orange at potentials of 0 V (square), 1 V (circle), 2 V (triangle), and 3 V (inverted triangle), respectively. Representative plots are shown, and all experiments were completed in at least duplicate.

FIGS. 9A to 9C show I-V curves and electrochemical filtration of NaCl and NaI. Experimental conditions are J=1.5 mL min$^{-1}$. FIG. 9A shows steady-state I-V curves for $[NaCl]_{in}=10$ mM (square) and $[NaCl]_{in}=10$ mM & $[NaI]_{in}=10$ mM (circle). FIG. 9B shows electrochemical iodide filtration at potentials of 0 V (square), 1 V (circle), 2 V (triangle), and 3 V (inverted triangle), respectively. Representative plots are shown, and all experiments were completed in at least duplicate. FIG. 9C shows electrochemical iodide filtration over a range of [NaCl] and [NaI]. In the legend, X-Y is representative of salt concentrations in mM where X is NaCl and Y is NaI. Open symbols represent experiments run at ~2 V and closed symbols represent experiments run at ~3 V. All experiments were completed in at least duplicate.

FIGS. 11A to 11D show SEMs of the aerial view of MWNT filters in indicated length scales. FIGS. 11E to 11G show SEMs of side view of MWNT filters in indicated length scales.

FIG. 12A show current vs. potential at various ionic strengths of NaCl (1-155 mM). FIG. 12B is a zoom-in graph of FIG. 12A to show threshold potential. FIG. 12C shows current vs. time at constant voltage (V) for $[NaCl]=\sim100$ mM.

FIG. 13A displays log MS2 removal as a function of applied potential during filtration. The input fluid was 10 mL of 10 mM NaCl (pH 5.7) and $10^6$ viruses/mL and was filtered at a rate of 4 mL/min (filter approach velocity of 250 L/m$^2$/h). At ~2 V and ~3 V, no viruses were detected in the output fluid from the filter. FIG. 13B displays culturable virus PFU from MWNT filter extraction as a function of the post-filtration applied potential. The input fluid was 10 mL of 10 mM NaCl (pH 5.7) with ~$10^6$ virus/mL and was filtered at a rate of 4 mL/min (filter approach velocity of 250 L/m$^2$/h) in the absence of potential. Adsorbed viruses were then electrolyzed for ~30 s at ~2 V or ~3 V before they were extracted from the MWNT filter. It should be noted that extractable and culturable virus from the filter is about 0.5% to about 1.0% of the total virus adsorbed. Each data point represents the mean of at least duplicate measurements under the same experimental conditions, with error bars representing standard deviations.

FIG. 16A display cells fixed immediately after sieving onto the MWNT filter. FIGS. 16B, 16C and 16D show cells exposed to electrolysis for ~30 s in 10 mM NaCl at an applied potential of ~1 V, ~2 V, and ~3V, respectively.

FIG. 17A depicts direct (left) electrochemical oxidation of bacteria adhered to MWNT surface, and indirect (right) electrochemical production of aqueous oxidant that subsequently inactivates the bacteria in solution. FIGS. 17B, 17C, and 17D show epifluorescence images of PI-stained bacteria electrolyzed at an applied potential of ~1 V, ~2 V, and ~3 V, respectively, for ~30 s in 10 mM NaCl (pH 5.7). Typical PI red fluorescence is shown at ~1V and ~2V, whereas the fluorescence at ~3 V has been shifted towards a lower wavelength. FIG. 17E shows a fluorescent emission spectra ($\lambda_{exc}=450$ nm) of PI (1.2 mL, 50 μM) reacted with 0 μL, 1

μL, 2 μL, and 3 μL of 50 mM HOCl. Location of fluorescence emission peak shifts to a lower wavelength with addition of oxidant (HOCl).

Figure 18A:
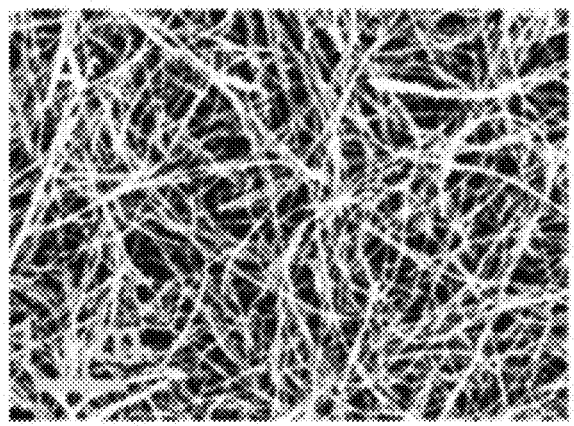
Figure 18B:
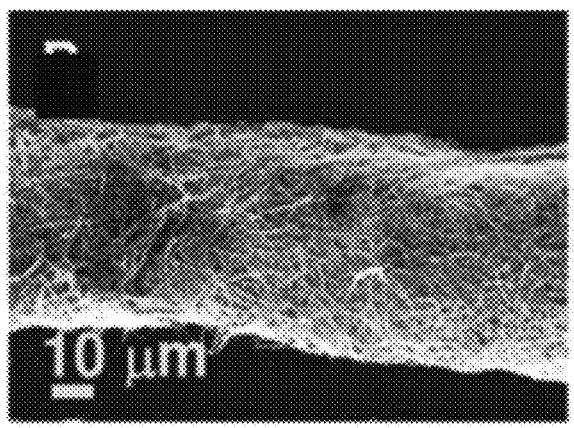
Figure 18C:
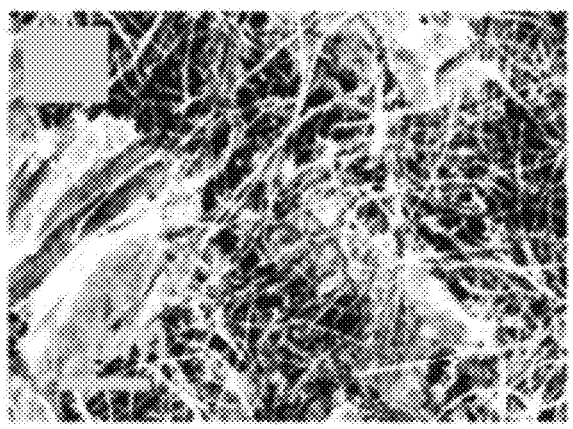
Figure 18D:
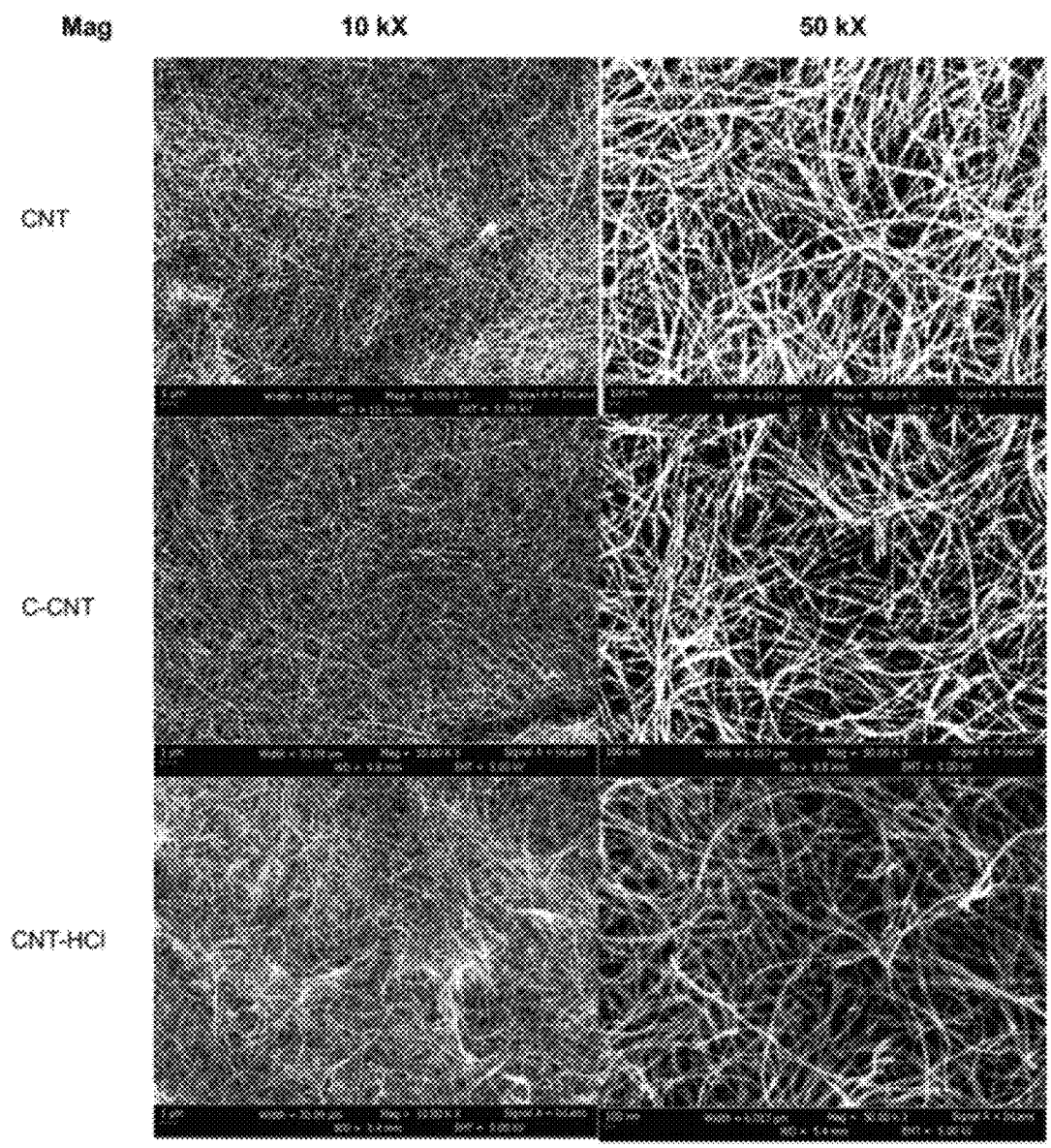
Figure 18E:
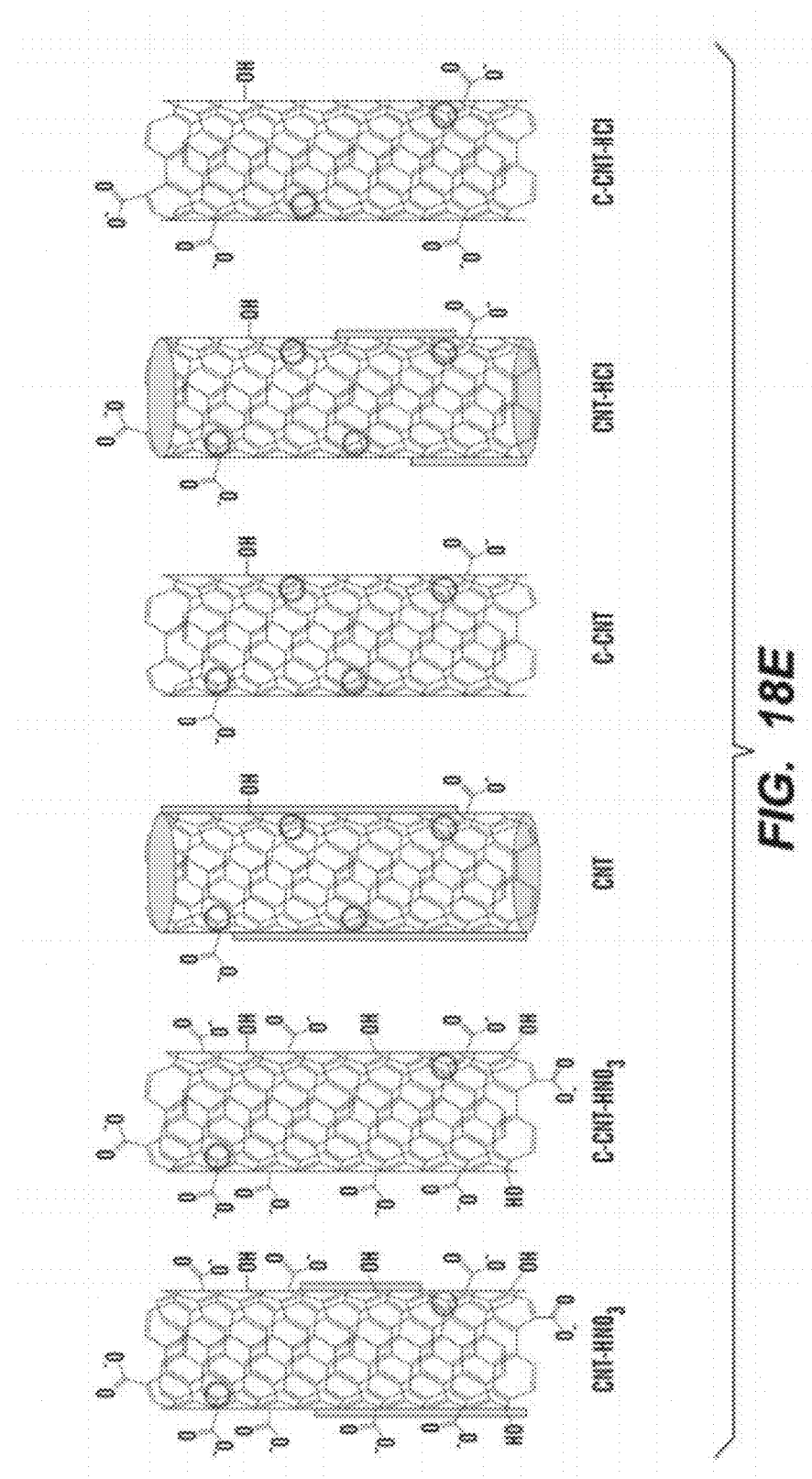
Figure 18F:
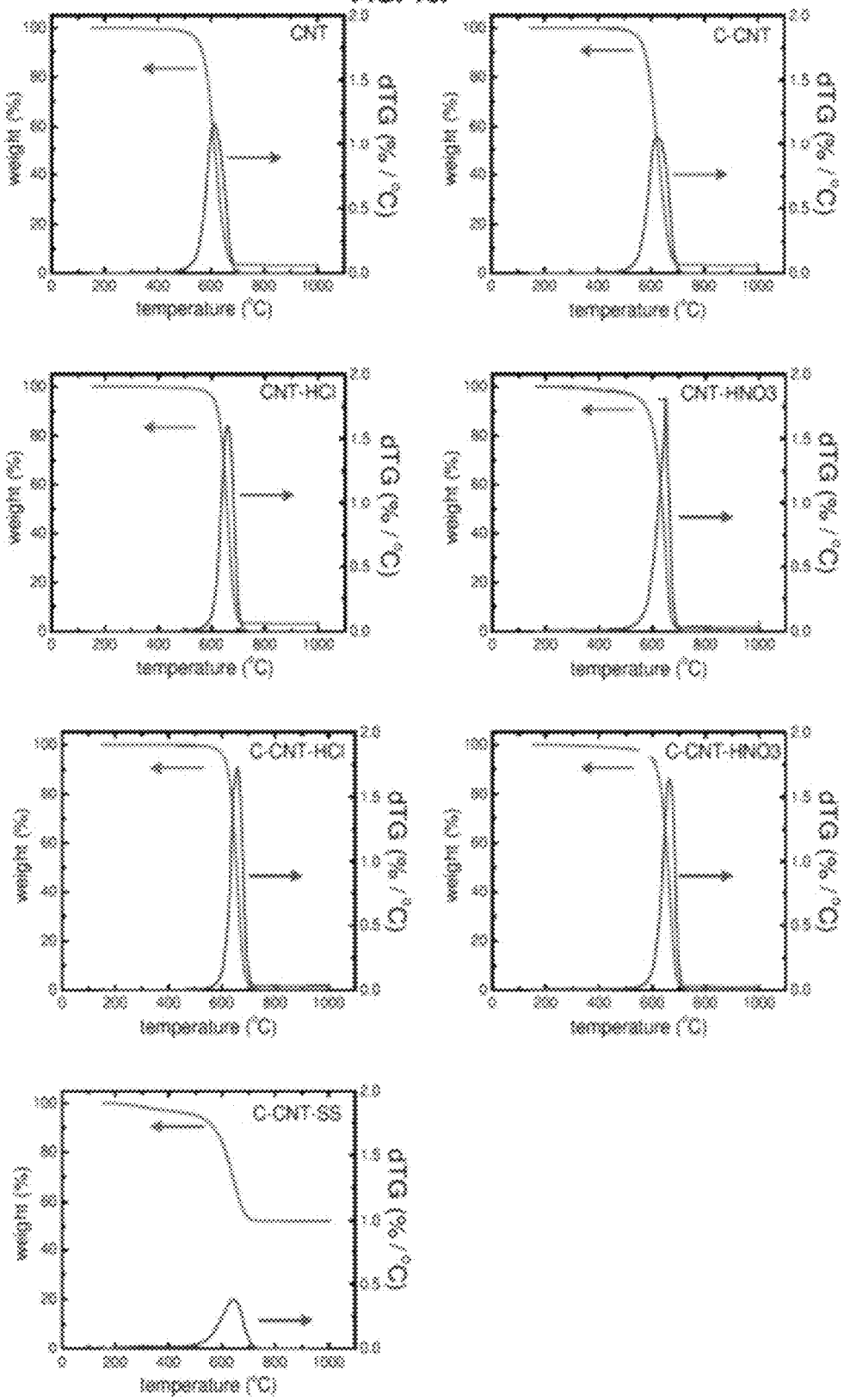
Figure 18G:
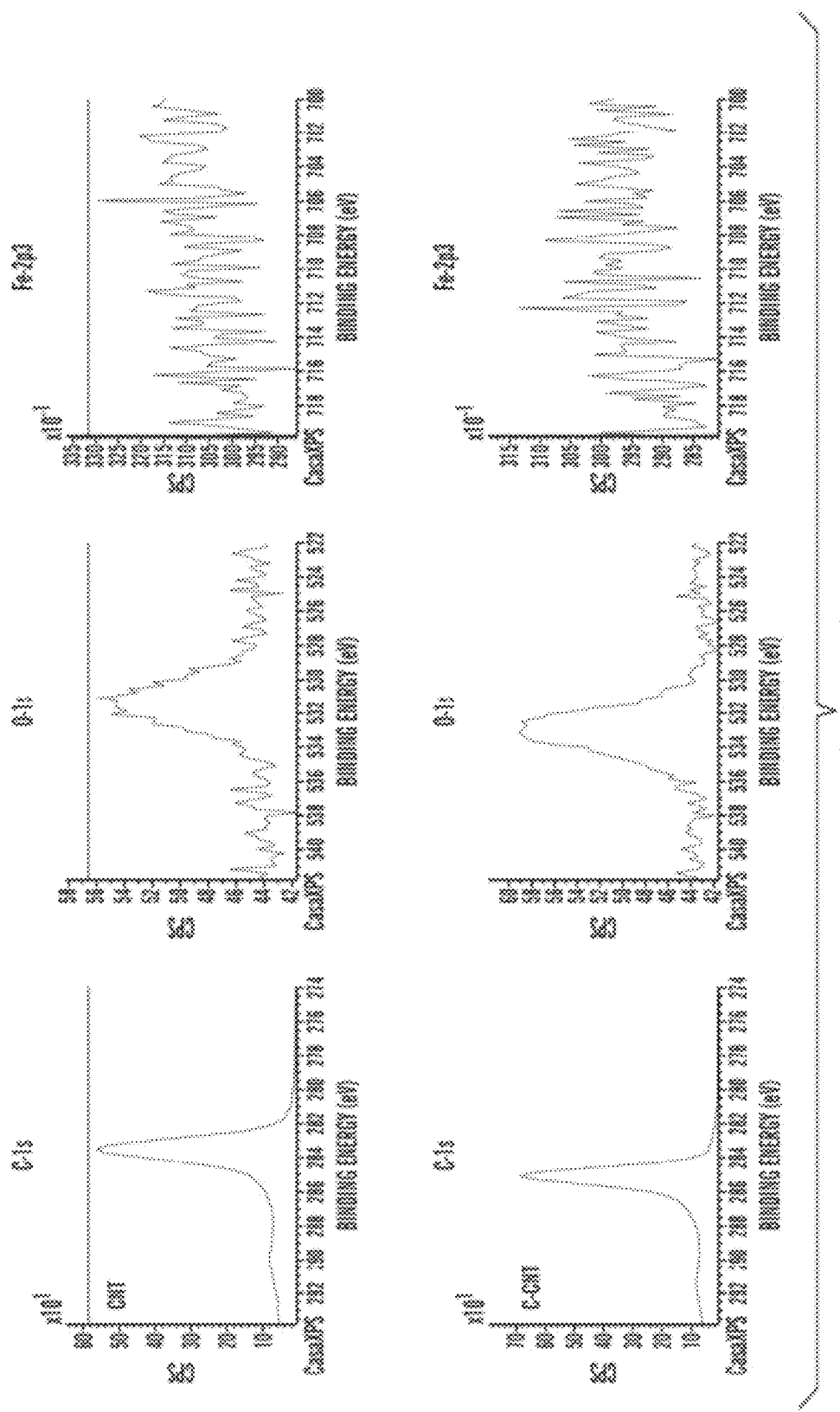
Figure 18G:
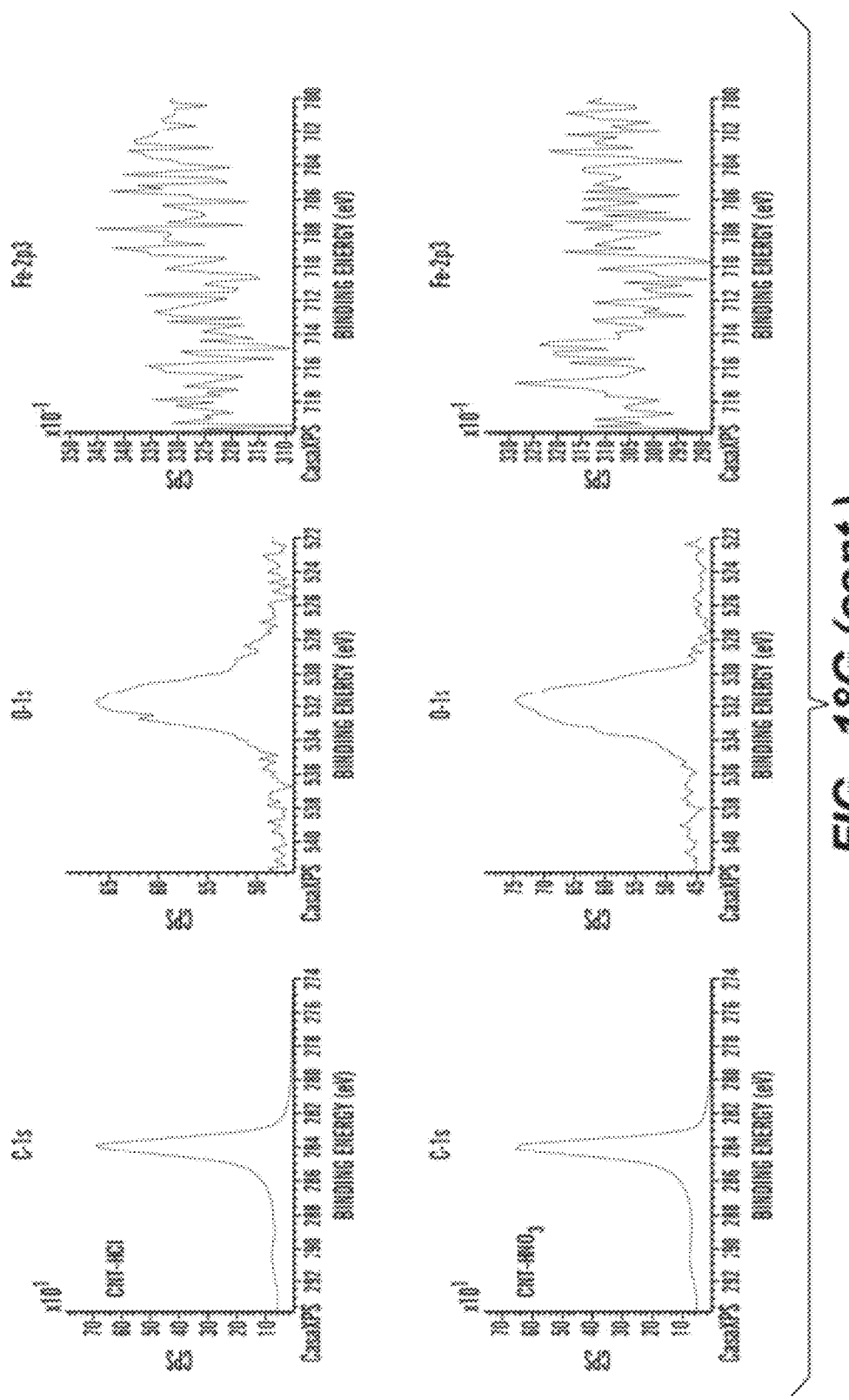
Figure 18G:
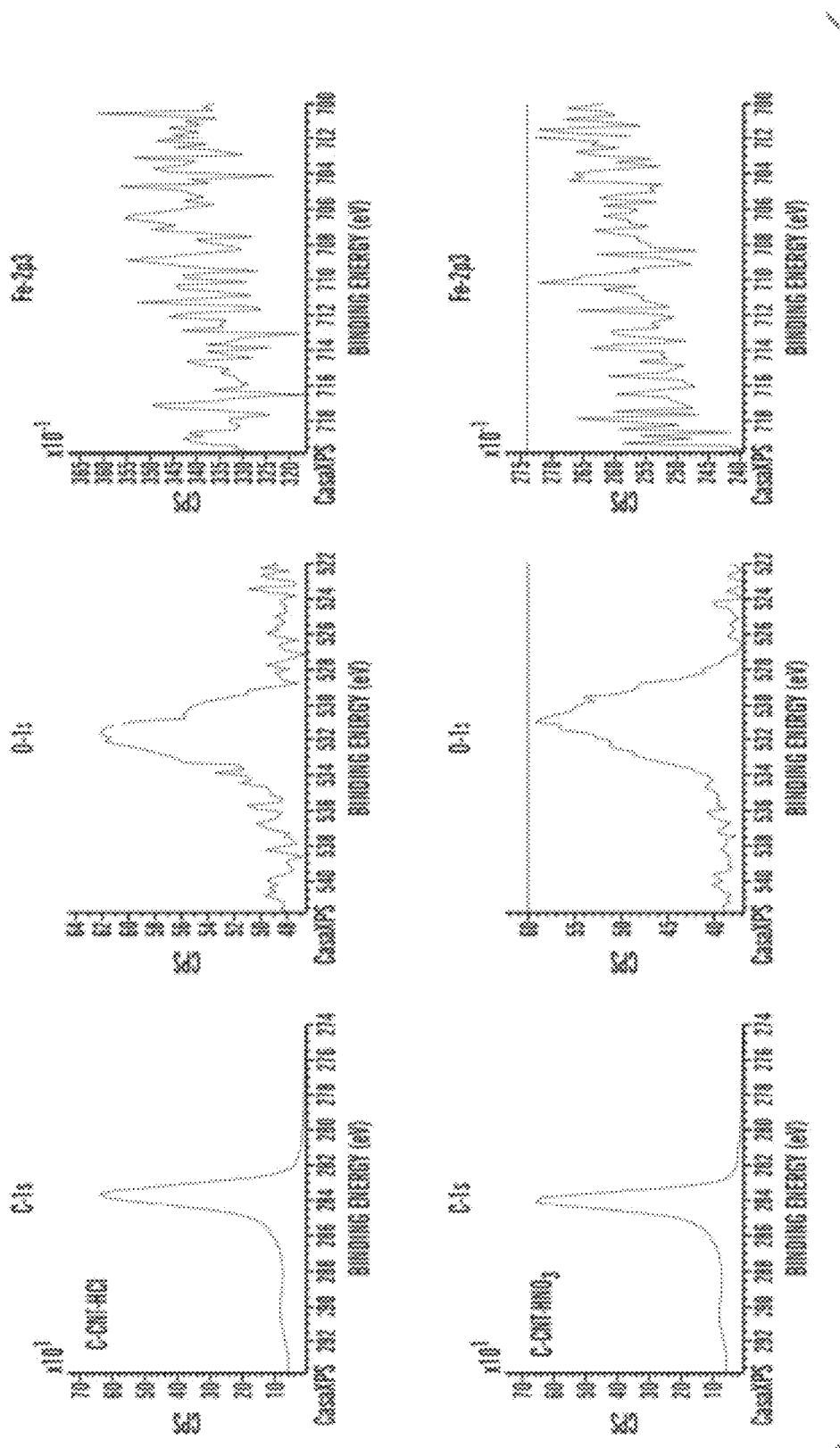
Figure 18G:
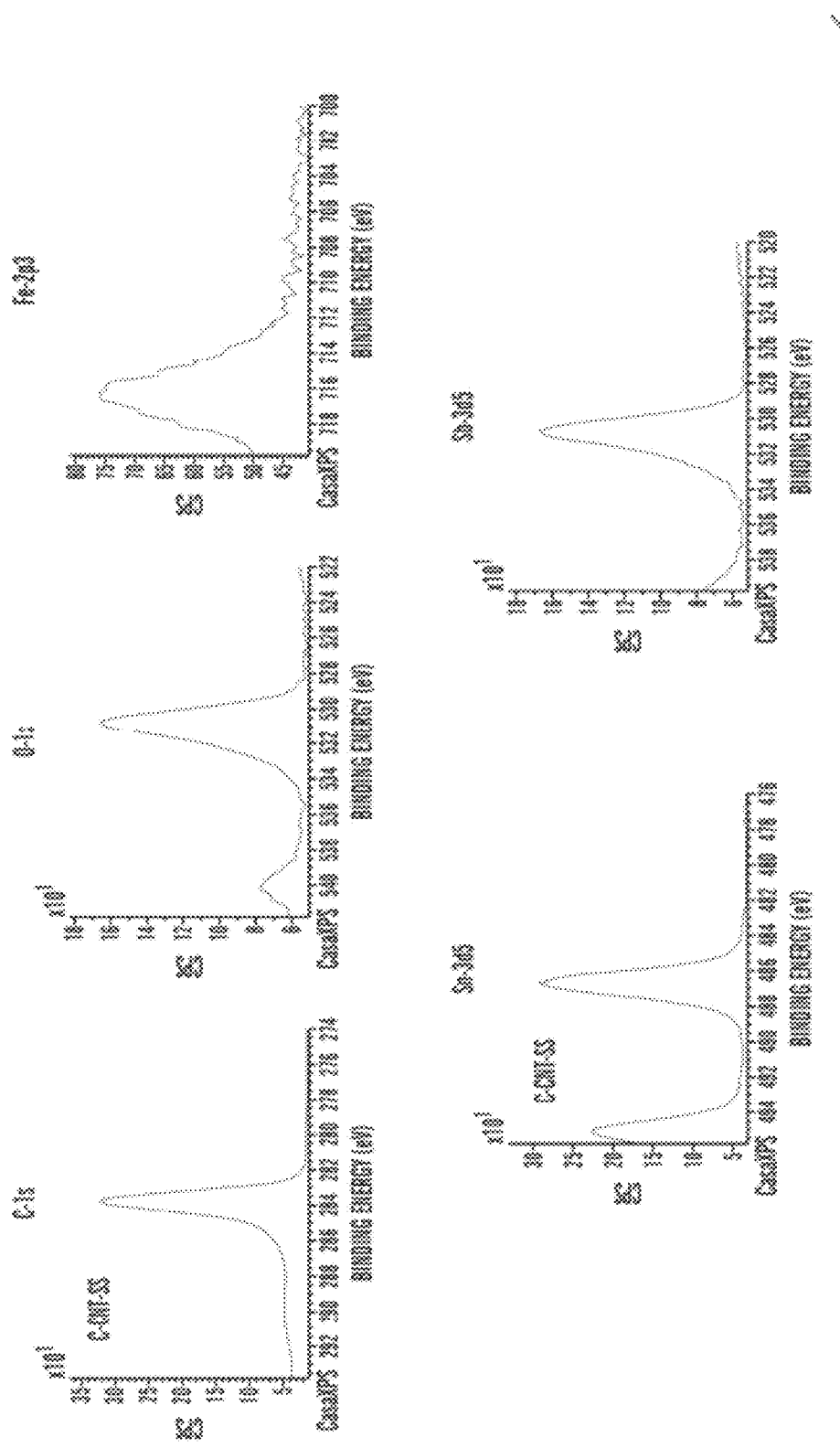

FIGS. 18A-18G show SEM images, thermogravimetric analysis and X-ray photoelectron spectrum of some embodiments of the CNT networks described herein. FIG. 18A shows an aerial image of C-CNT-HCl network. FIG. 18B shows a cross section of raw CNT network, and FIG. 18C shows an aerial image of C-CNT-SS network. FIG. 18D shows a set of scanning electron micrographs of the various CNT filters at 10 kX and 50 kX magnifications. FIG. 18E shows a schematic diagram of CNT surface chemistry after various CNT surface treatments described herein. FIG. 18F shows a set of thermogravimetric analysis data of the various CNT samples. FIG. 18G shows a set of X-ray photoelectron spectrum of the various CNT samples in various binding energy ranges: C1s, O1s, and Fe2p3 for all samples and Sn3d5 and Sb3d5 for the C-CNT-SS.

Figure 19A:
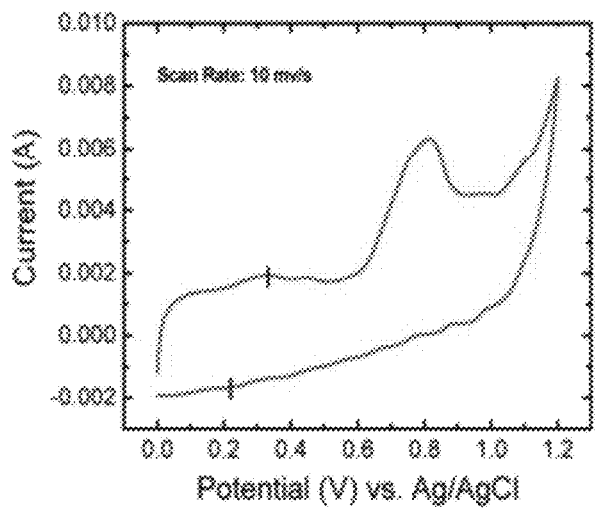
Figure 19B:
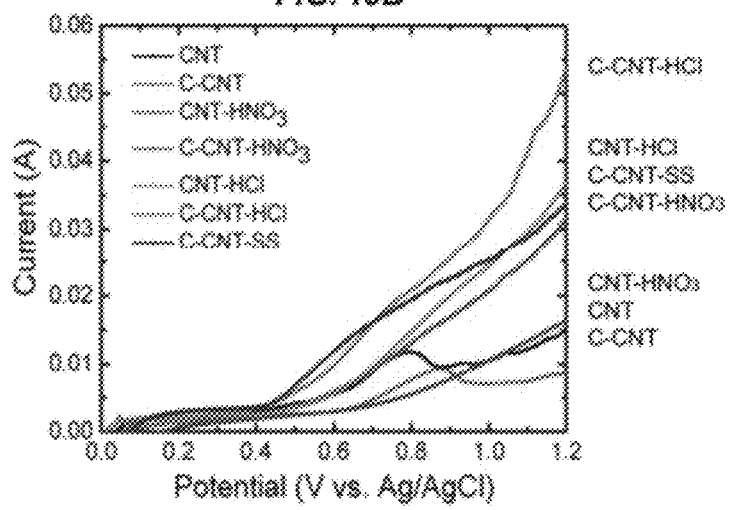
Figure 19C:
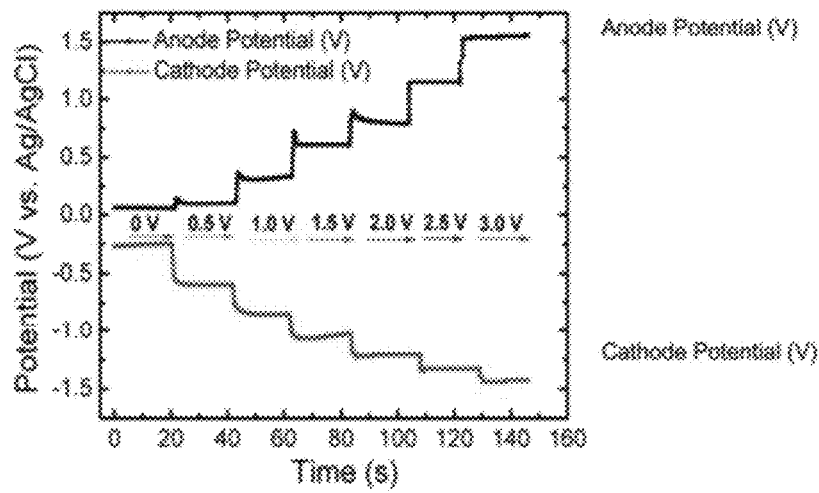

FIGS. 19A-19F show electrochemical characterization data of different CNT filters. Unless otherwise stated, FIGS. 19A-19F were generated using influent conditions of 1 mM MO, 100 mM $Na_2SO_4$, and a flow rate of 1.5 mL $min^{-1}$. FIG. 19A shows a cyclic voltammogram of the C-CNT-sample completed at a scan rate of 10 mV $s^{-1}$. FIG. 19B shows linear sweep voltammograms for different indicated CNT filter samples, and FIG. 19C shows anodic and cathodic open circuit potential (V) of the C-CNT sample over a range of applied voltages from 0V to 3 V. FIG. 19D shows cyclic voltammograms of different indicated CNT samples. FIG. 19E shows a plot of open circuit potential vs. time for different indicated CNT samples, and FIG. 19F shows an analysis result of electrochemical impedance spectroscopy of different indicated CNT samples.

FIGS. 20A-20D show sets of data indicating electrochemical CNT filter batch oxidative performance. Electrochemical filters were challenged with 1 mM MO in 100 mM $Na_2SO_4$ electrolyte at a flow rate of 1.5 mL $min^{-1}$. Steady-state current (mA; blue bars), MO degradation (%; red bars), and electrochemical impedance (ohm; gray bars) are plotted in an approximate order of increasing performance at an applied potential of (FIG. 20A) 2 V and (FIG. 20B) 3 V. FIG. 20C shows data of oxidative performance at 3V of the C-CNT-HCl (blue) and C-CNT-$HNO_3$ (red) networks toward MO and MB decolorization, phenol TOC removal, and CTAB, methanol, formaldehyde, and formate conversion to carbon dioxide. FIG. 20D shows a set of data indicating electrochemical filtration of various organic chemicals using the indicated CNT filters (i.e., C-CNT-HCl (top panel) and C-CNT-$HNO_3$ (bottom panel)) at 3 V. The influent concentration of all species is 1 mM with the exception of CTAB at 0.1 mM. The percent degradation (red bars) is in terms of decolorization (for MO and MB), TOC removal (for phenol), and TIC formation i.e., conversion to carbon dioxide (for CTAB, MeOH, formaldehyde, formate). The current is presented as the blue bars in mA and the electrochemical impedance is presented in the gray bars in ohm.

Figure 21A:
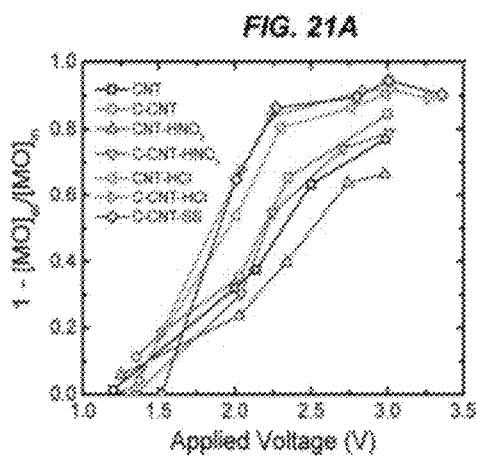
Figure 21B:
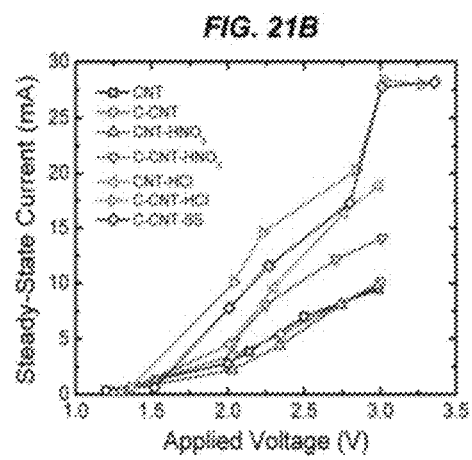
Figure 21C:
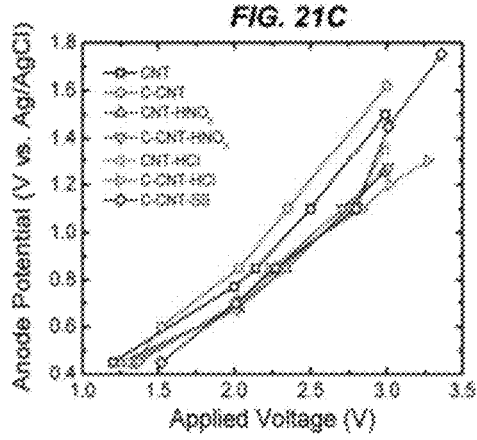
Figure 21D:
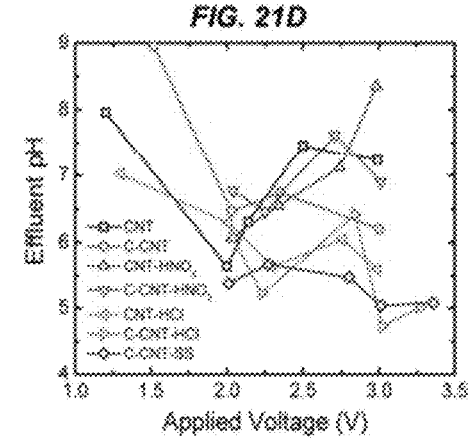
Figure 21E:
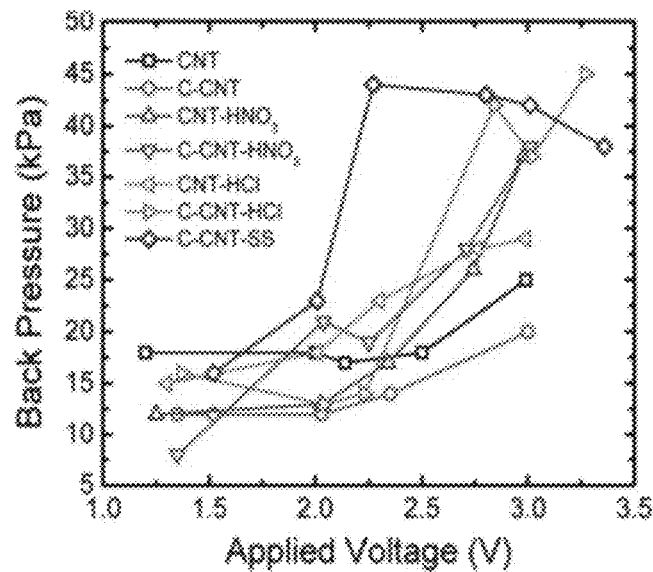
Figure 21F:
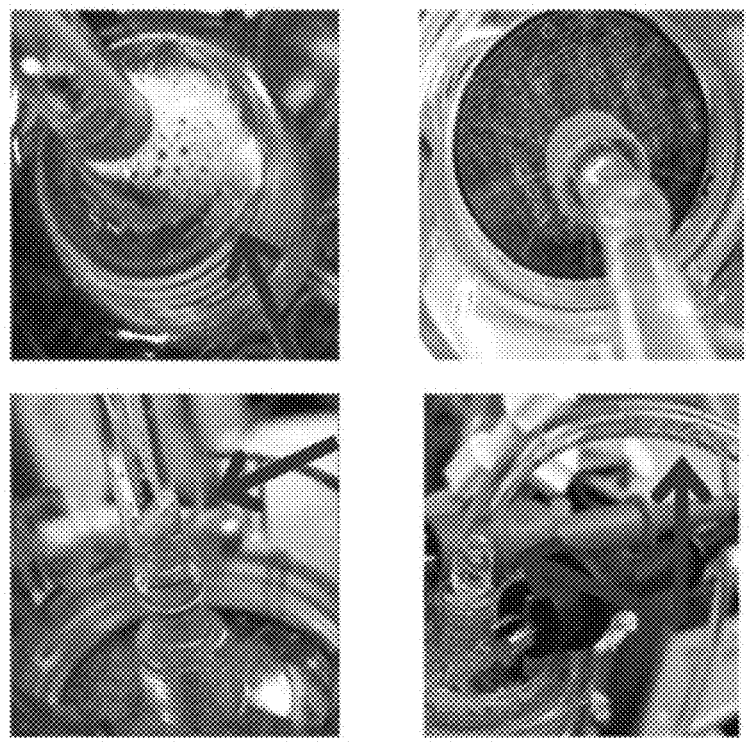

FIGS. 21A-21F show results of electrochemical and effluent characteristics vs. applied voltages for different indicated surface chemistry of the CNT samples: CNT (black squares), C-CNT (red circles), CNT-$HNO_3$ (blue up triangles), C-CNT-$HNO_3$ (green down triangles), CNT-HCl (pink left triangles), C-CNT-HCl (yellow right triangles), and C-CNT-SS (navy diamonds). FIG. 21A shows a plot of MO degradation (1-$[MO]_{ef}/[MO]_{in}$) as a function of applied voltages for different indicated CNT samples. FIG. 21B shows a plot steady-state current (mA) as a function of applied voltages for different indicated CNT samples. FIG. 21C shows a plot of an anode potential (V) as a function of applied voltages for different indicated CNT samples. FIG. 21D shows a plot of effluent pH as a function of applied voltages for different indicated CNT samples. FIG. 21E shows a plot of back pressure (kPa) as a function of applied voltage (V) different indicated CNT samples. FIG. 21F shows a set of images of the gas bubbles produced during electrochemical CNT filtration. Error bars were not shown in FIGS. 21A-21E for clarity, and typical standard deviations for the degradation, current, and potential plots were ±5%, and for pH and back pressure, typical standard deviations were ±20%.

Figure 22E:
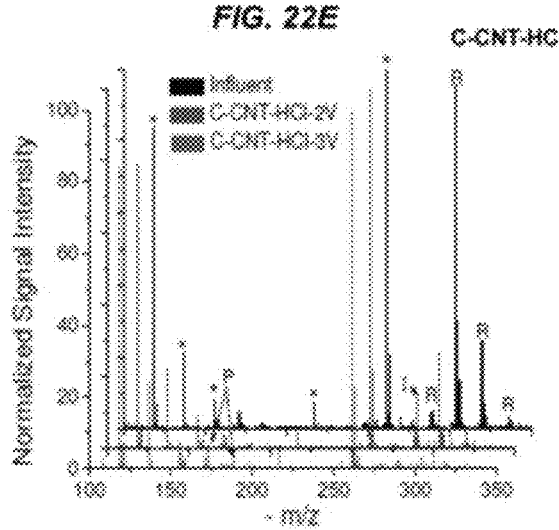
Figure 22F:
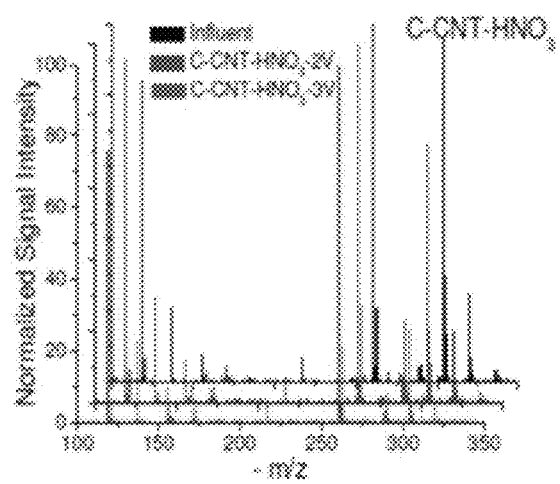
Figure 22G:
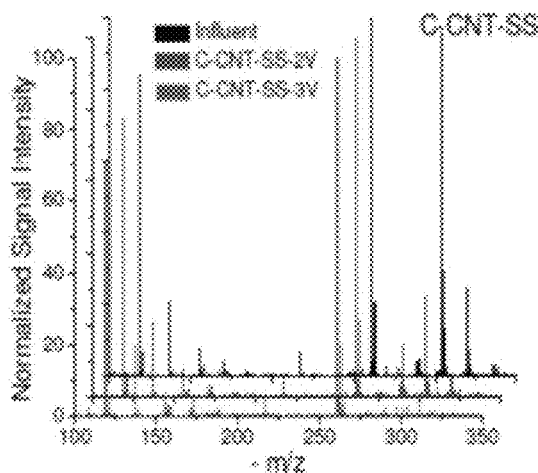

FIGS. 22A-22G show direct injection mass spectrums of influent as compared to effluent of different CNT electrochemical filter at applied potentials of 2 V and 3 V. FIG. 22A: CNT; FIG. 22B: C-CNT; FIG. 22C: CNT-HCl; FIG. 22D: CNT-$HNO_3$; FIG. 22E: C-CNT-HCl; FIG. 22F: C-CNT-$HNO_3$, and FIG. 22G: C-CNT-SS.

Figure 23A:
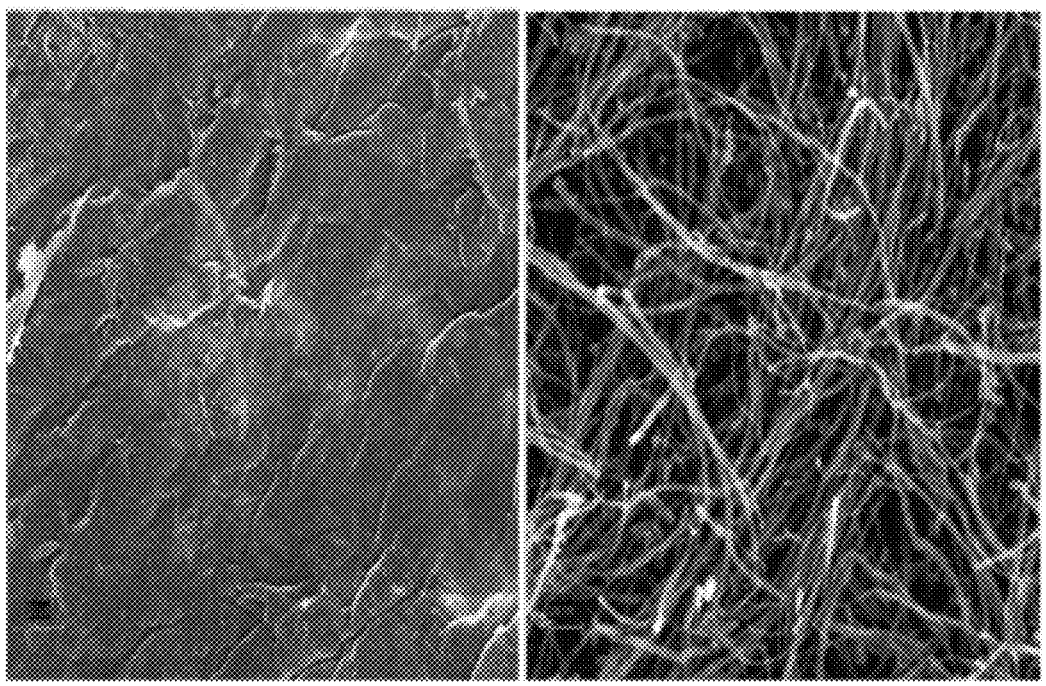
Figure 23B:
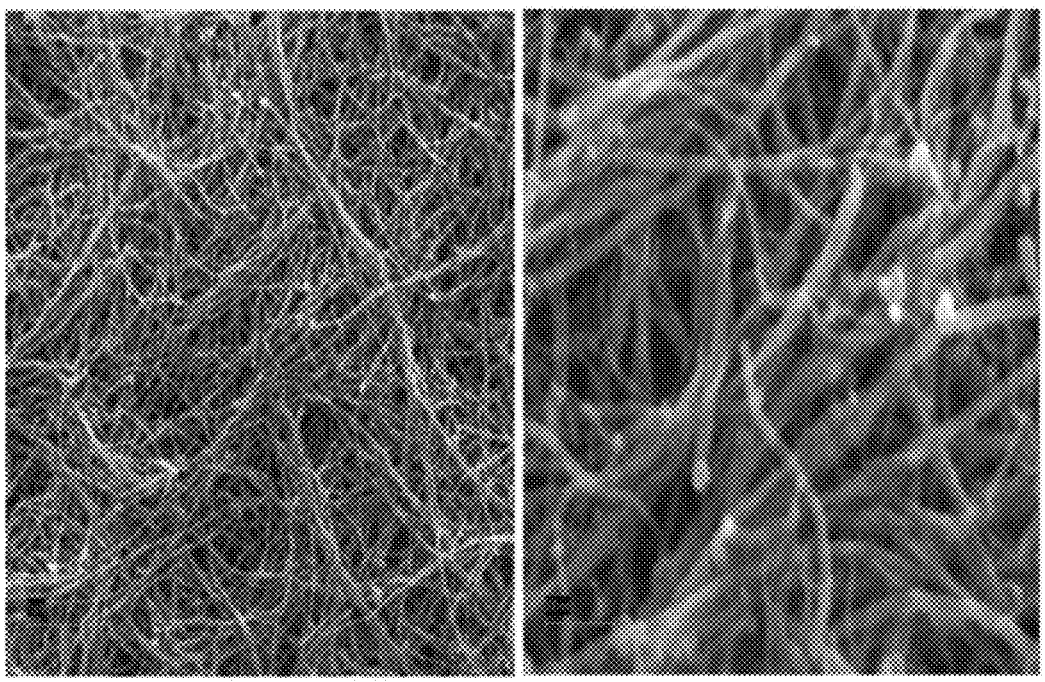
Figure 23C:
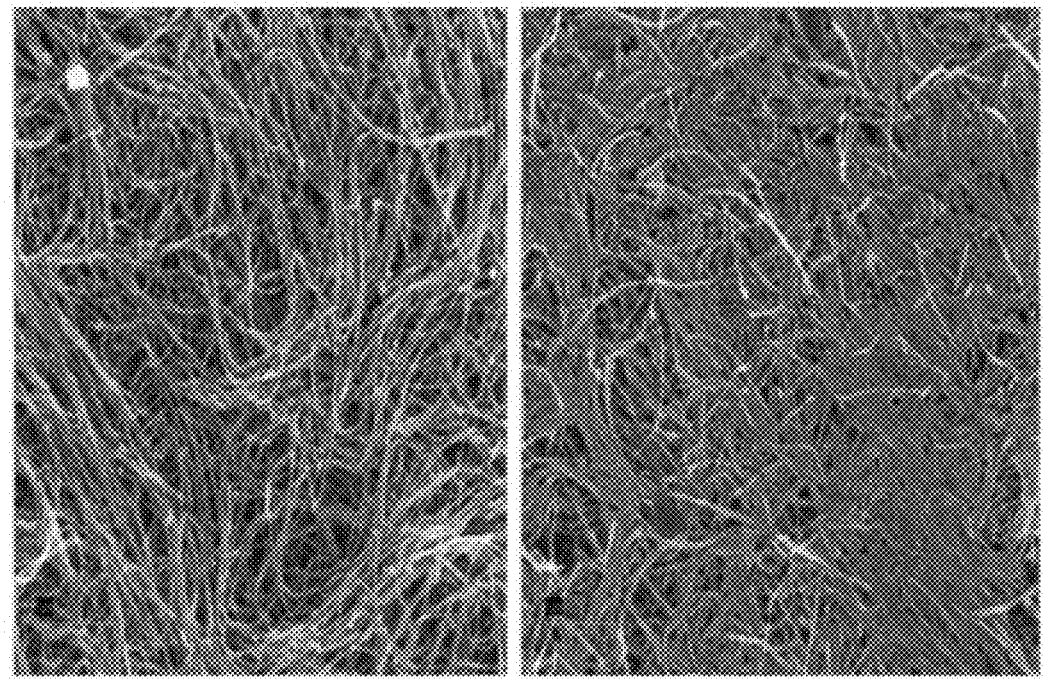

FIGS. 23A-23C show SEM images of Nafion-coated CNT network in various Nafion/CNT ratios. FIG. 23A shows a set of SEM images of Nafion-coated CNT network with a Nafion/CNT ratio of 1:6. FIG. 23B shows a set of SEM images of Nafion-coated CNT network with a Nafion/CNT ratio of 1:2.4. FIG. 23C shows a set of SEM images of Nafion-coated CNT network with a Nafion/CNT ratio of 2:3.

Figure 24A:
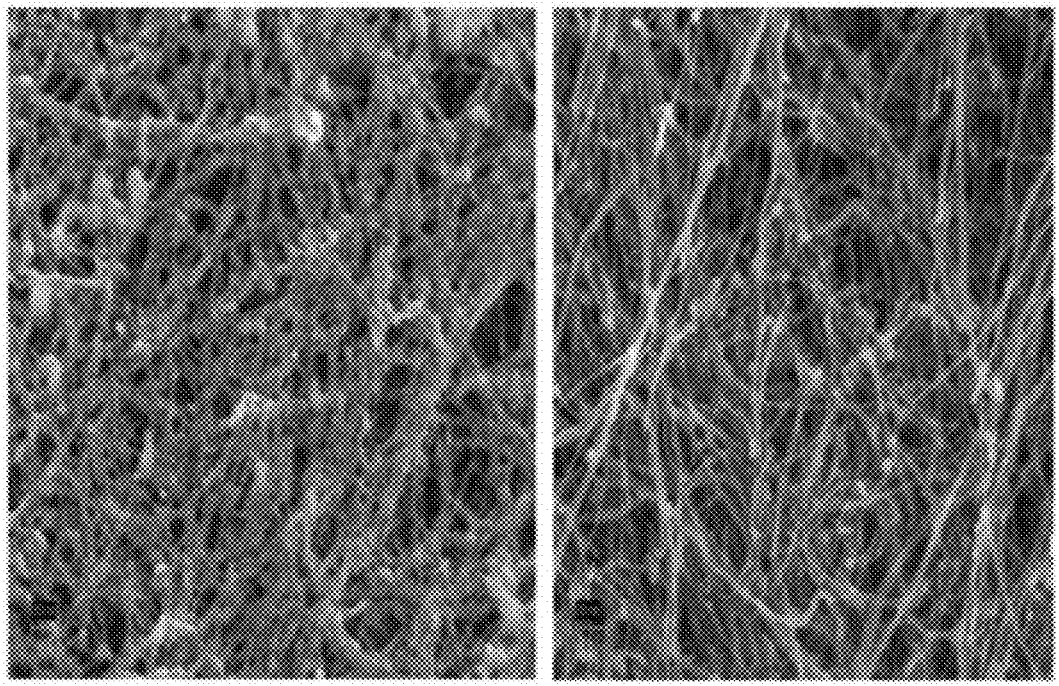
Figure 24B:
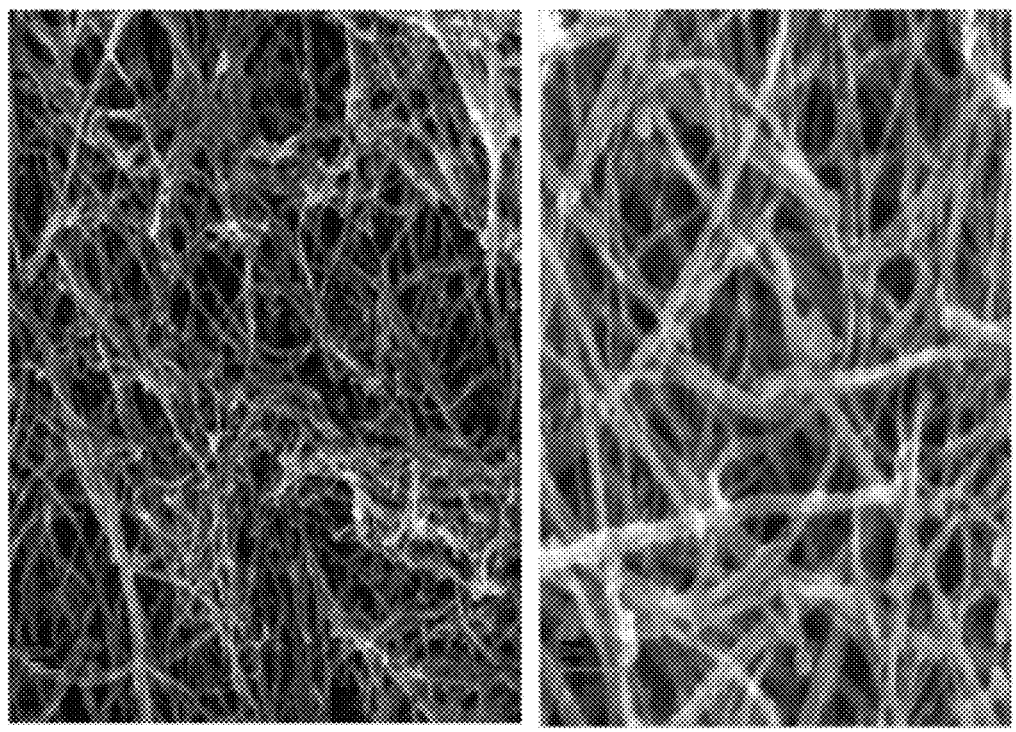
Figure 24C:
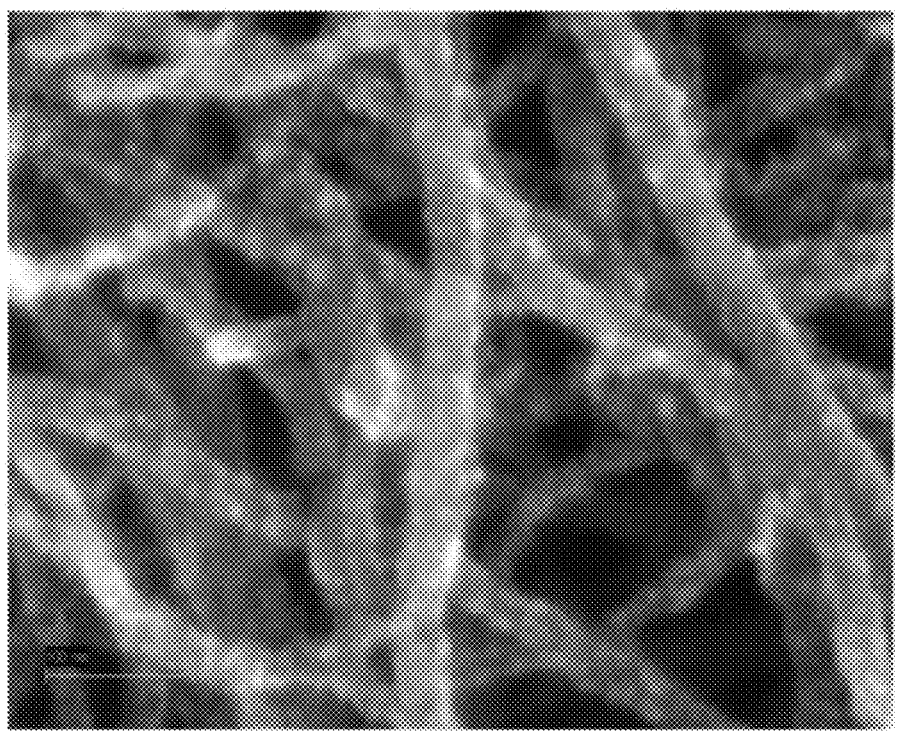
Figure 24D:
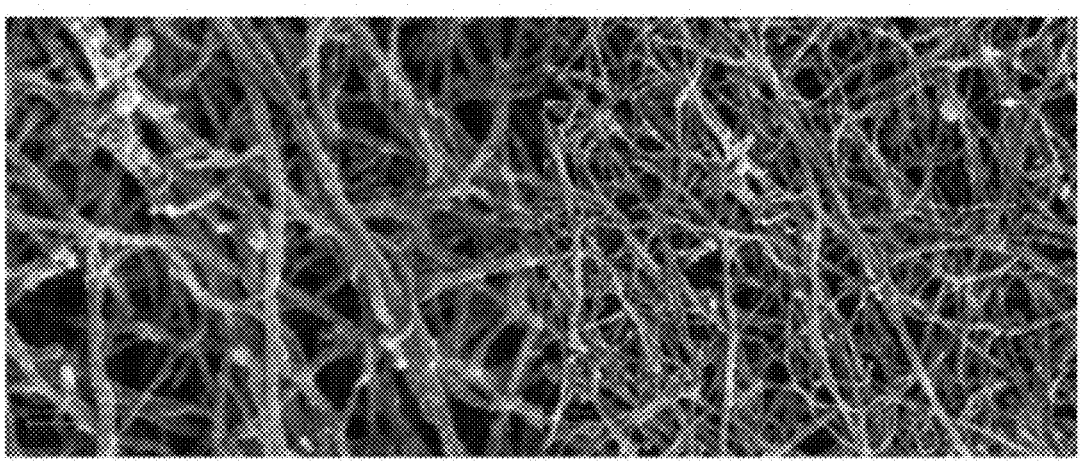
Figure 24E:
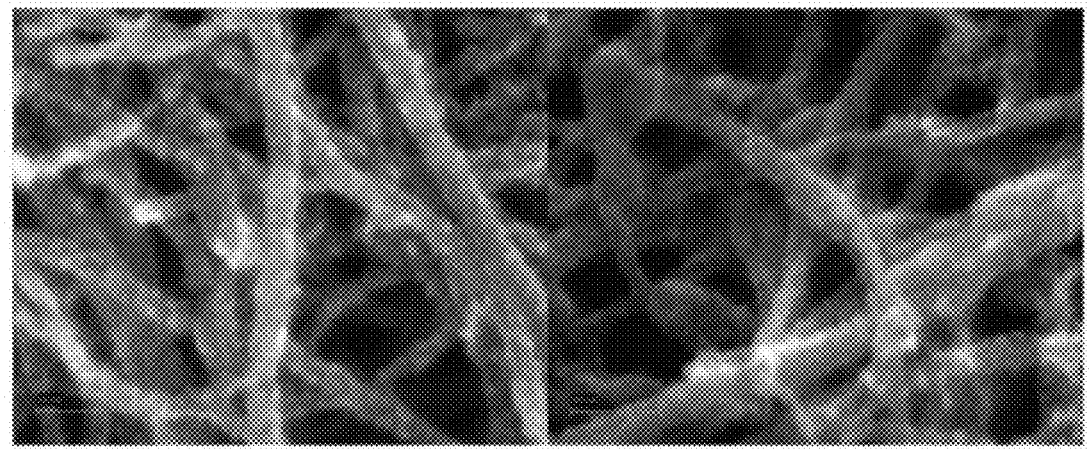

FIGS. 24A-24E show SEM images of Nafion-coated CNT network (in a ratio of 1:6 Nafion: CNT) with $SnO_2$ deposition. FIG. 24A shows a set of SEM images of in situ Nafion-coated CNT network with $SnO_2$ deposition. FIG. 24B shows a set of SEM images of soaked Nafion-coated CNT network with SnO2 deposition. FIGS. 24C-24E show SEM images of the cathode of Nafion-coated CNT network with SnO2 deposition.

Figure 25A:
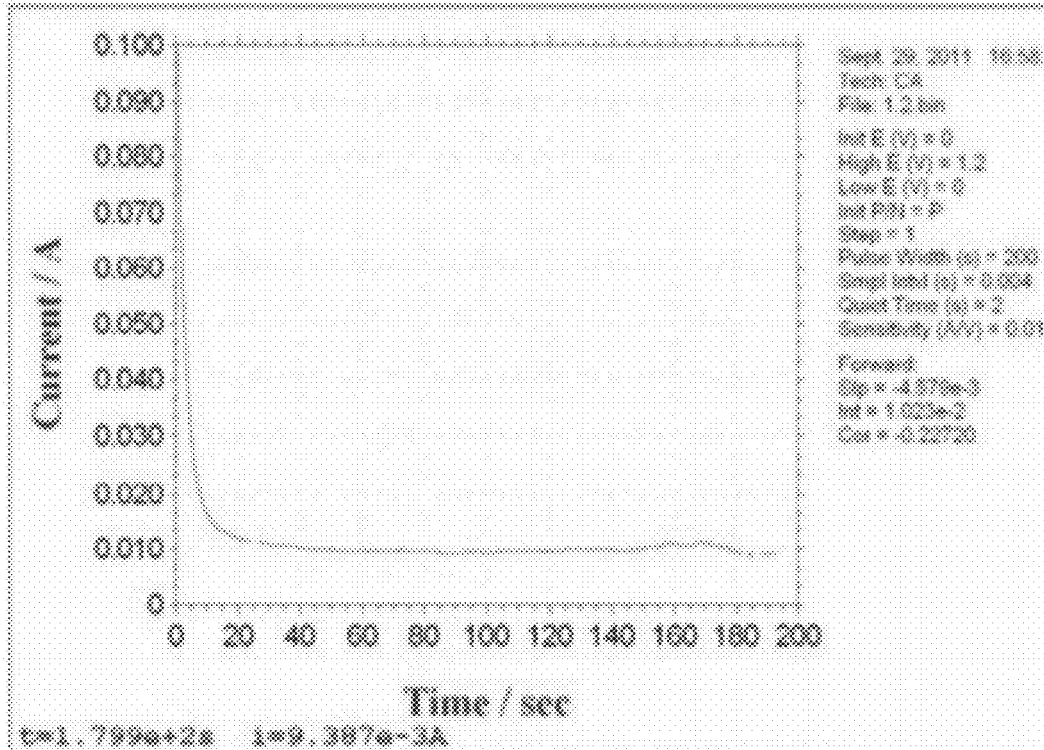
Figure 25B:
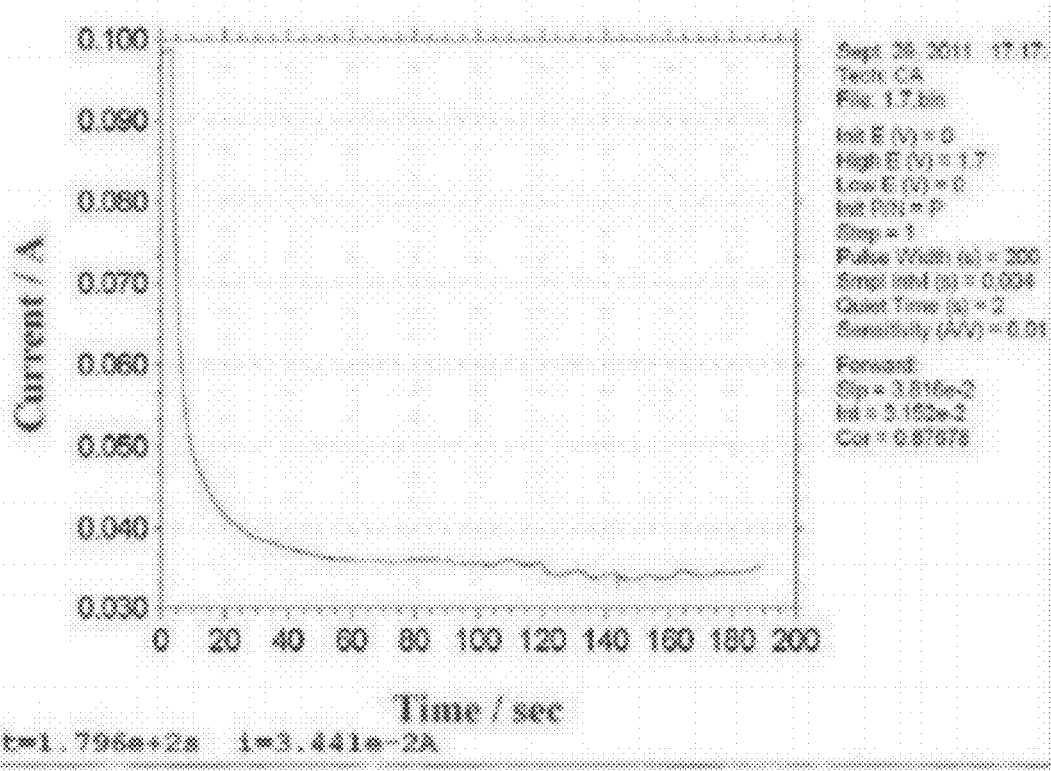
Figure 25C:
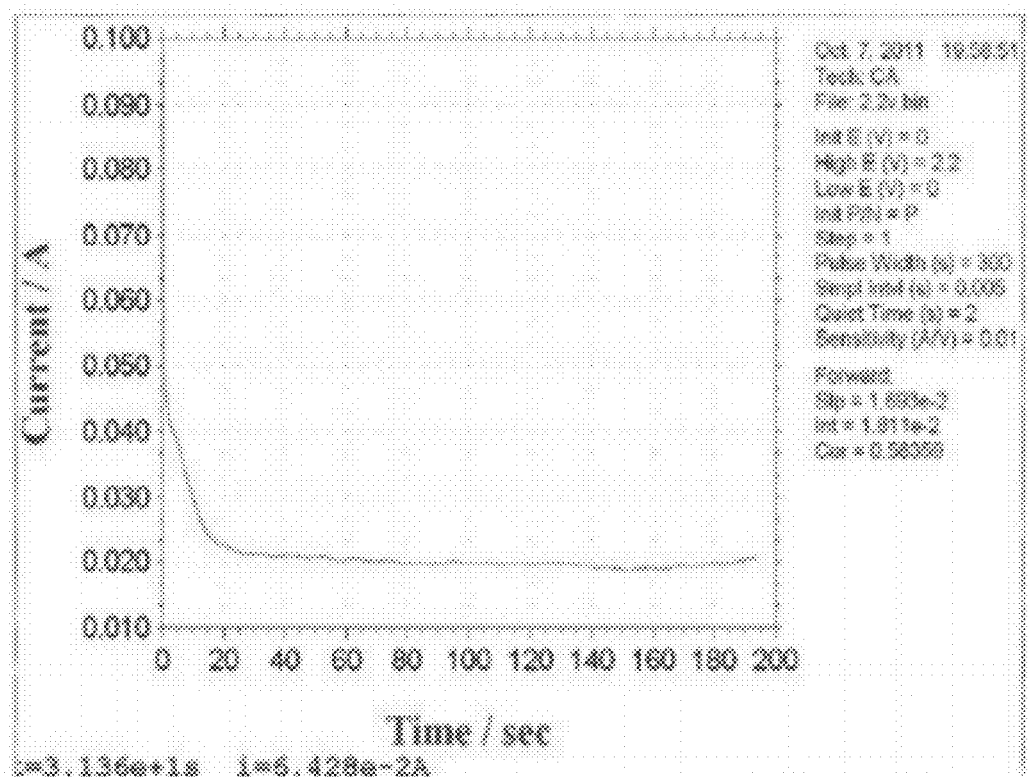
Figure 25D:
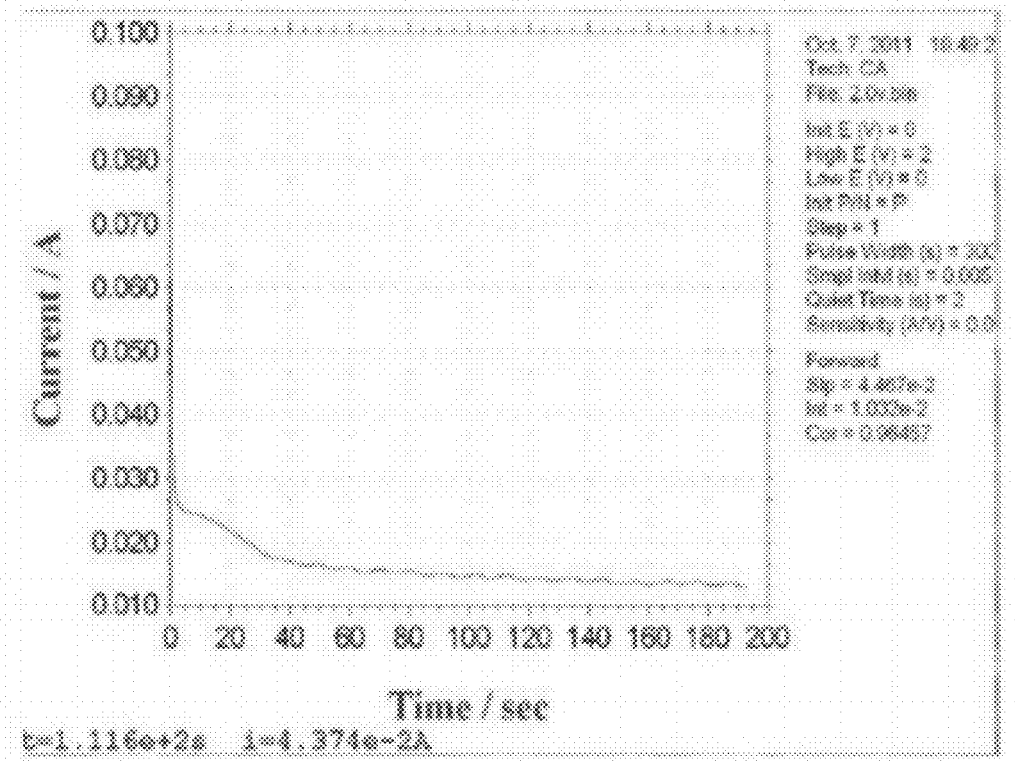

FIGS. 25A-25D show chronoamperometry data for Nafion-coated CNT networks performed at different anode potentials. FIGS. 25A and 25B show chronoamperometry data for Nafion-coated CNT networks (using 40 uL Nafion) performed at 1.2 V and 1.7 V, respectively. FIGS. 25C and 25D show chronoamperometry data for Nafion 20-SnO2-Nafion 40-coated CNT networks performed at 2.0 V and 2.2 V, respectively. The term "Nafion 20-SnO2-Nafion 40-coated CNT" as used herein refers to CNT-Nafion composite films in which at least one additional Nafion coating is applied after $SnO_2$ deposition on the Nafion-coated CNT films.

Figure 26A:
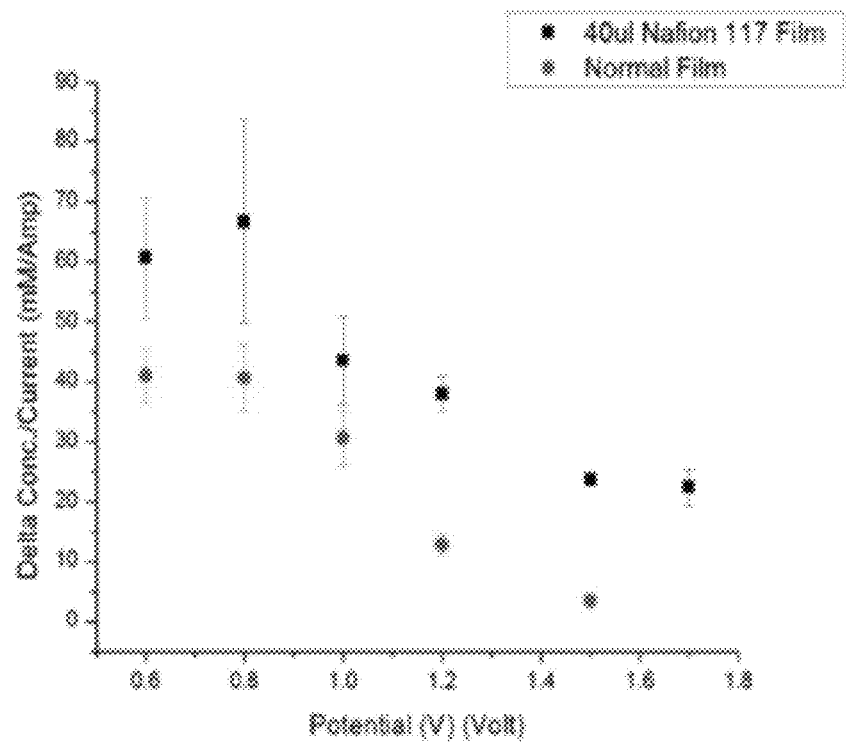
Figure 26B:
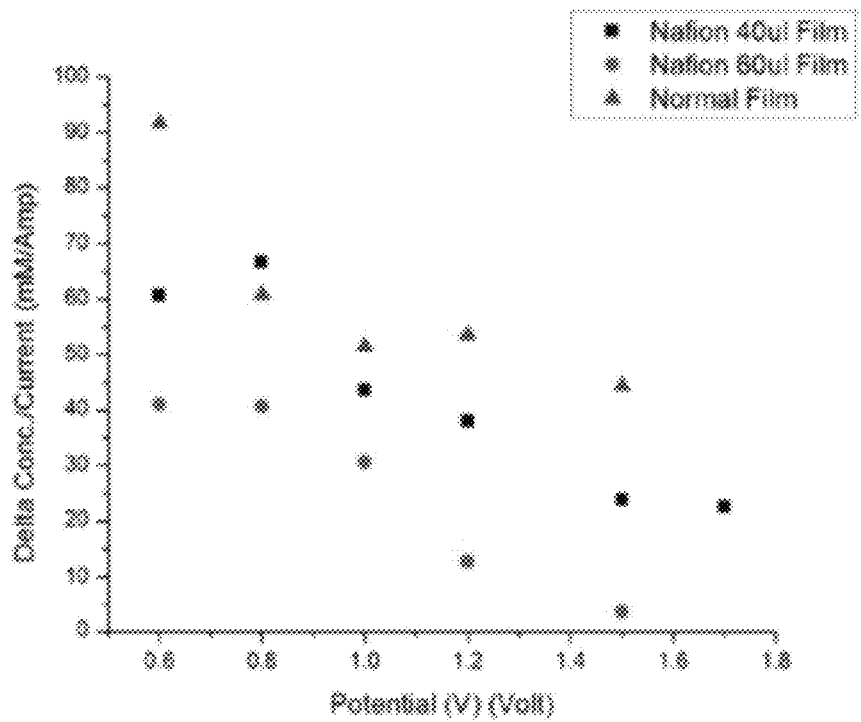

FIGS. 26A-26C show energy efficiency and oxidation data for Nafion-coated CNT films as compared to uncoated films (normal films), represented by plots of a change in MO concentration/current as a function of anode potentials.

FIGS. 27A-27E show experimental data for titanium and CNT passivation. The current in mA and the effluent TOC in mgC $L^{-1}$ were monitored as a function of time. The electrochemical impedance in ohms was measured at the start and at the end of each run. The electrochemical filtration conditions were $[PhOH]_{in}$=1 mM=72 mgC $L^{-1}$, $[Na_2SO_4]_{in}$=100 mM, and J (flow rate)=1.5 mL $min^{-1}$, anode potential=1.60 V. FIG. 27A shows data for fresh Ti ring and fresh CNT film run for 360 min. FIG. 27B shows data for continuation of the run (from FIG. 27A) for another 360 min after polishing the Ti ring with a sandpaper. FIG. 27C shows data for continuation of the run (from FIG. 27B) with fresh CNT film for 400 min. FIG. 27D shows data of LSV performed under the same conditions as above with a scan rate 10 mV $s^{-1}$. FIG. 27E shows a relationship between applied voltage and anode potential.

Figures 28A, 28B, 28C:
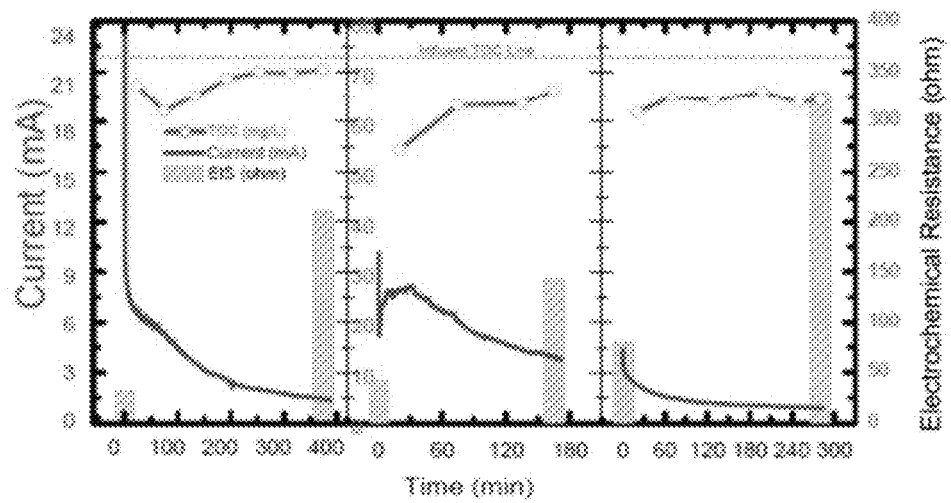
Figure 28D:
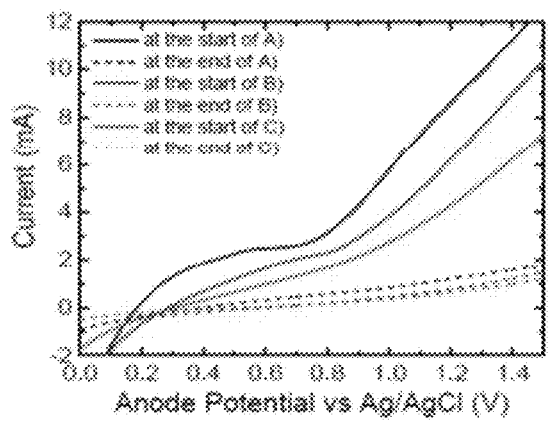
Figure 28E:
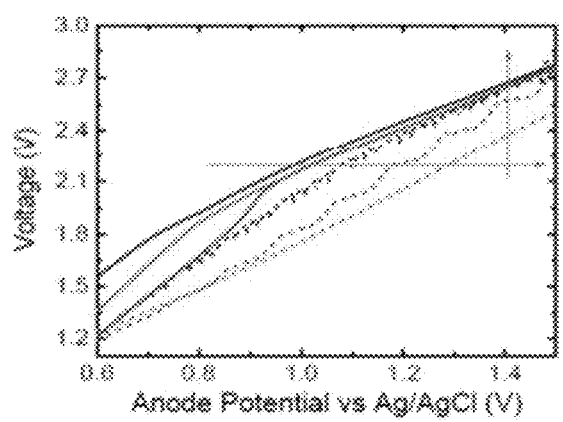

FIGS. 28A-28E show experimental data for regeneration of the used CNT films. The electrochemical filtration conditions were $[PhOH]_{in}$=1 mM=72 mgC L$^{-1}$, $[Na_2SO_4]_{in}$=100 mM, and J (flow rate)=1.5 mL min$^{-1}$, anode potential=1.60 V. FIG. 28A shows data for used Ti and CNT film run for 400 min. FIG. 28B shows data for continuation of the run (from FIG. 28A) after regenerating the CNT film by flowing with mixture solution containing EtOH and DI Water (V:V=1:1) and HCl (pH=1.7) at the rate 1 mL min$^{-1}$ for 60 min. FIG. 28C shows data for continuation of the run (from FIG. 28B) after regenerating the CNT film (from the end of run of FIG. 28B) by dispensing the CNT film in 30 ml pure DMSO and re-forming the CNT afterward. FIG. 28D shows data of LSV performed under the same conditions as above with a scan rate 10 mV s$^{-1}$. FIG. 28E shows a relationship between applied voltage and anode potential.

Figure 29A:
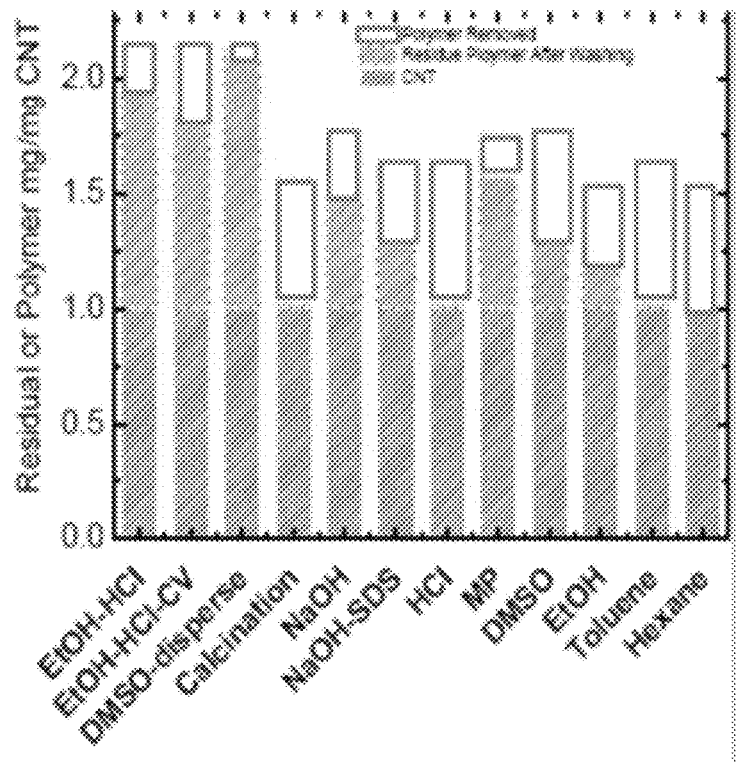
Figure 29B:
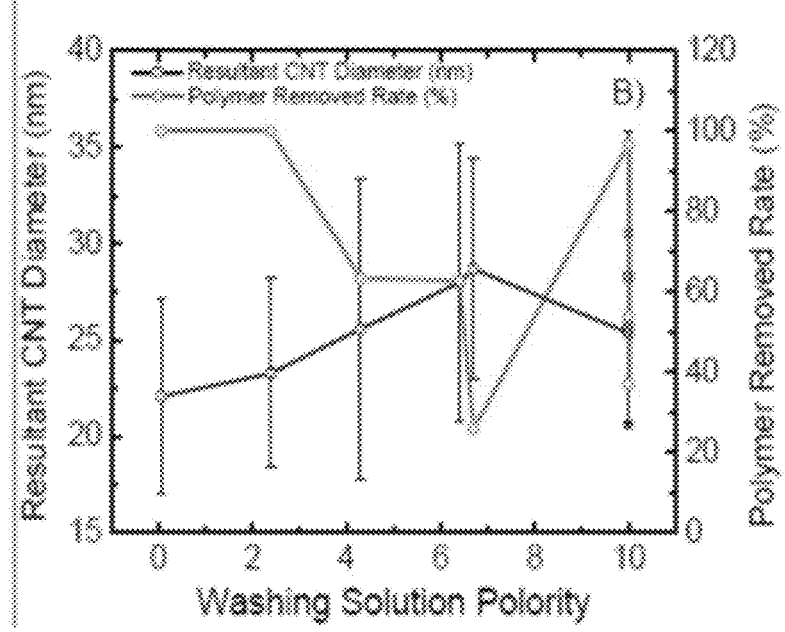
Figure 29C:
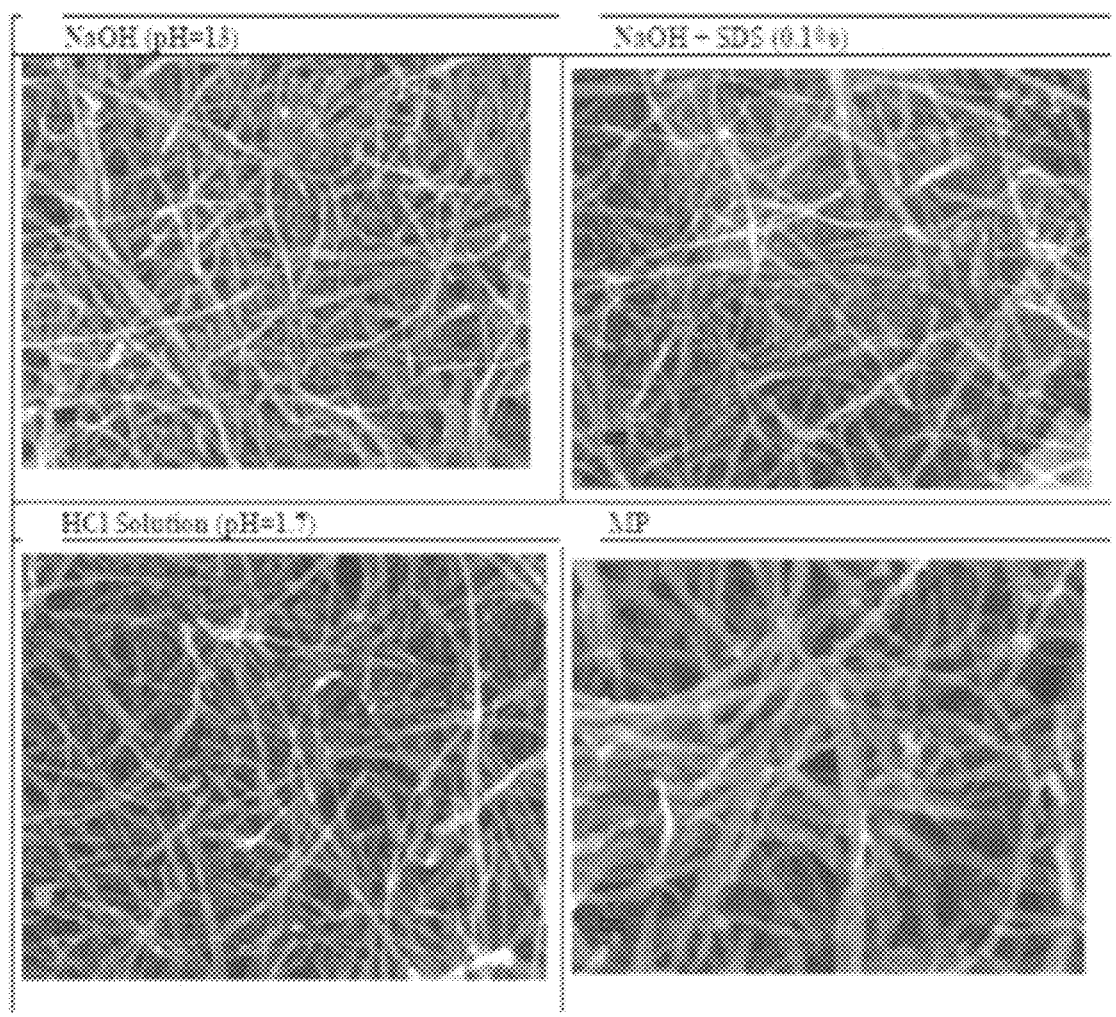
Figure 29C:
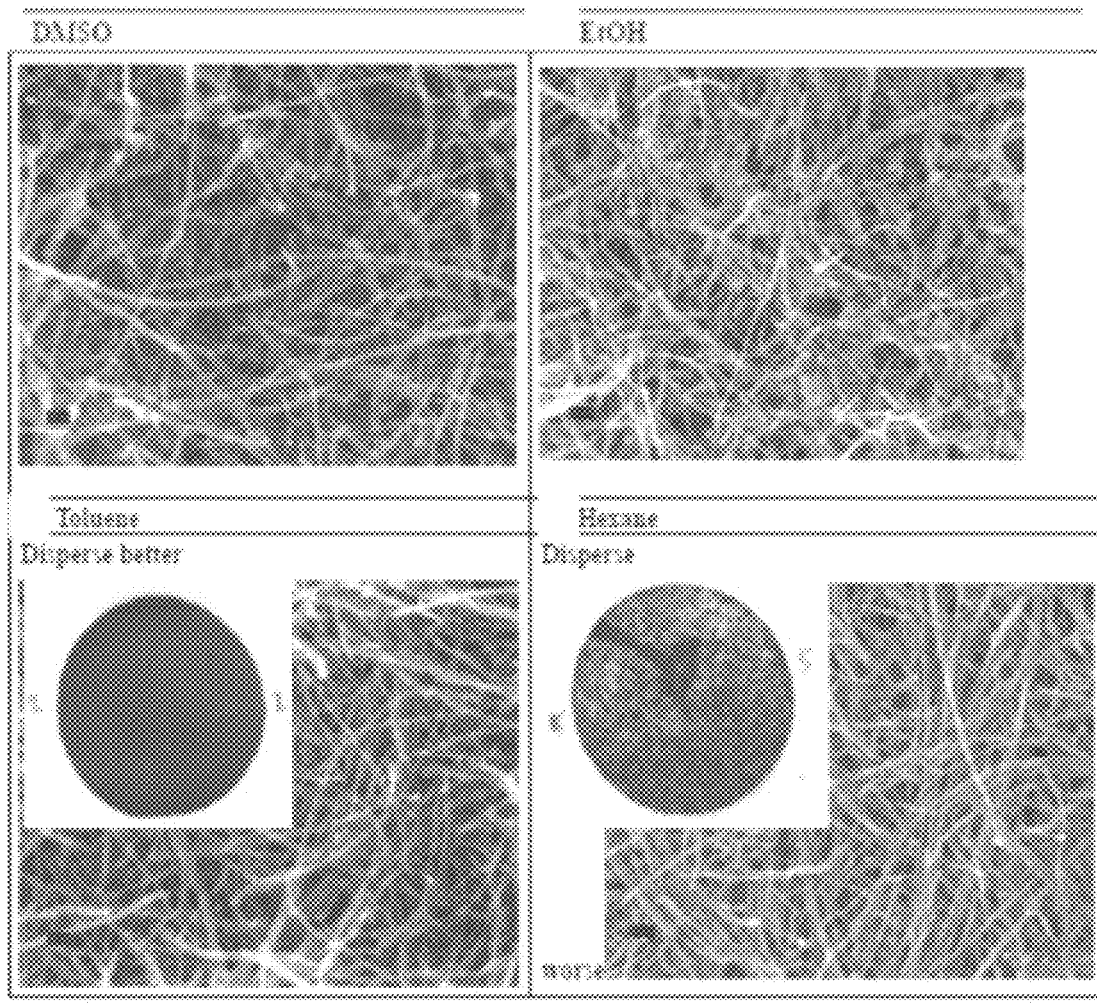

FIGS. 29A-29C show experimental data for additional regeneration methods: (1) electrochemical regeneration method (denoted by EtOH—HCl-CV) in which 60 mL mixture solution containing EtOH and DI water (V:V=1:1) and HCl was flowed through the CNT film, and cyclic voltammetry (CV) was performed with a scan rate 10 my s$^{-1}$ for strengthening reactivation performance; (2) calcinations in which the used CNT films were calcinated in a tube furnace by increasing from room temperature to 400° C. for at a rate of 5° C. per min and holding for 60 min; (3) the used CNT films were dispersed in 30 mL of eight solutions or solvents: NaOH (pH=13), NaOH (pH=13)+SDS (0.1%), HCl (pH=1.76), n-methylpyrrolidone (MP), DMSO, ethanol (EtOH), toluene and hexane. The same CNT film preparation was performed as discussed earlier, except that the dispersed CNT solution were put into 50° C. oven for about 24 h followed by CNT film preparation by vacuum system. FIG. 29A shows data of polymer removal efficiencies under different indicated conditions. FIG. 29B shows data of the final CNT diameter or polymer removal percent as a function of the polarity of the regeneration solution. FIG. 29C shows a set of scanning electron micrographs of the various CNT filters treated with different regeneration solutions.

Figure 30B:
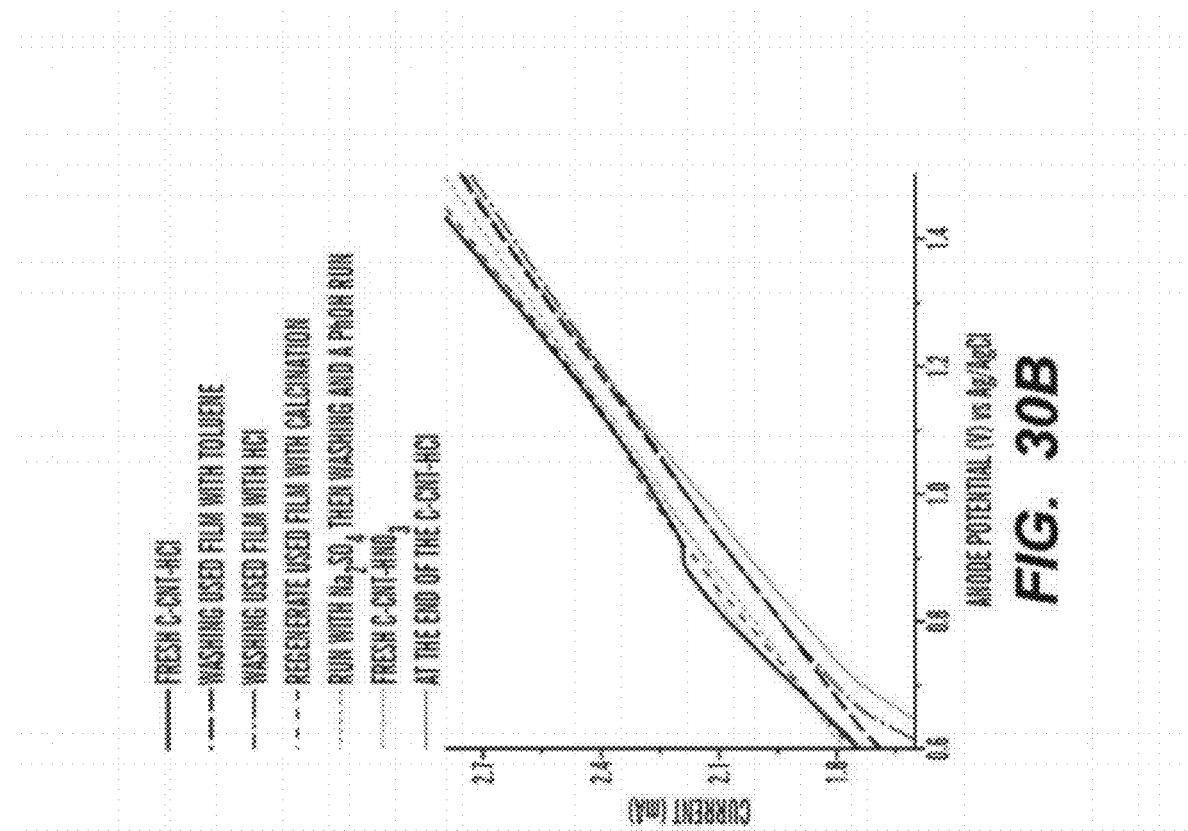
Figure 30A:
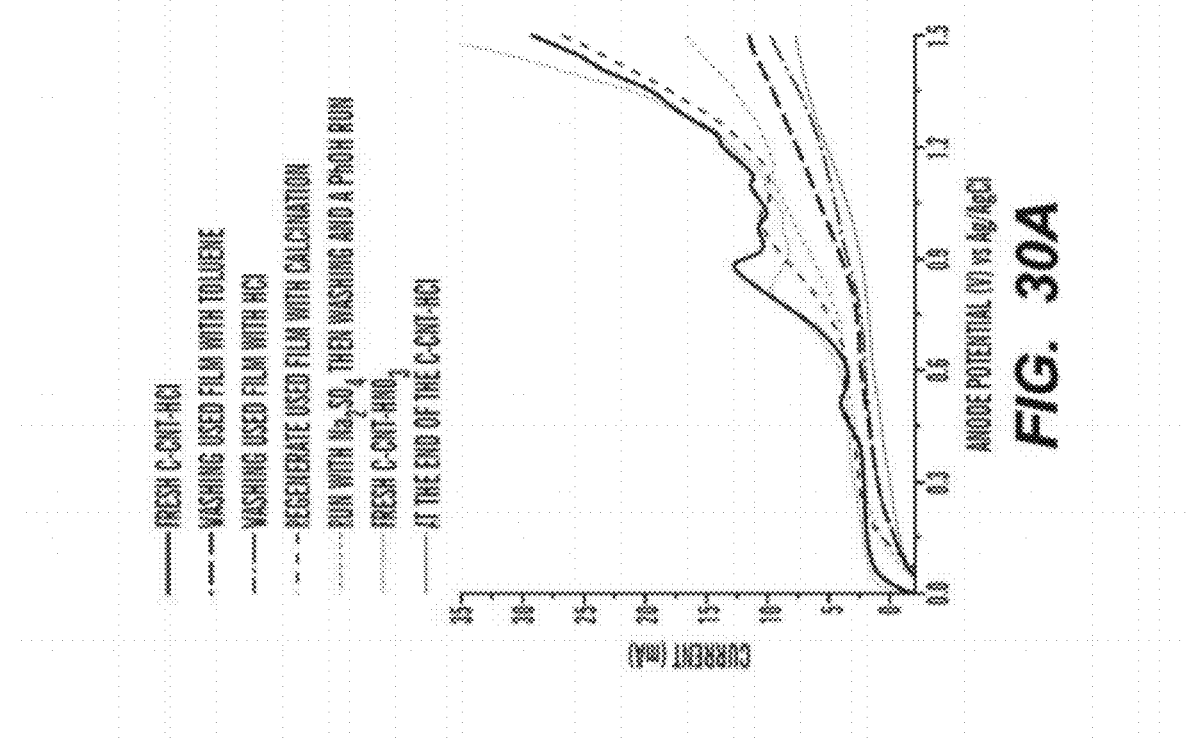
Figure 30F:
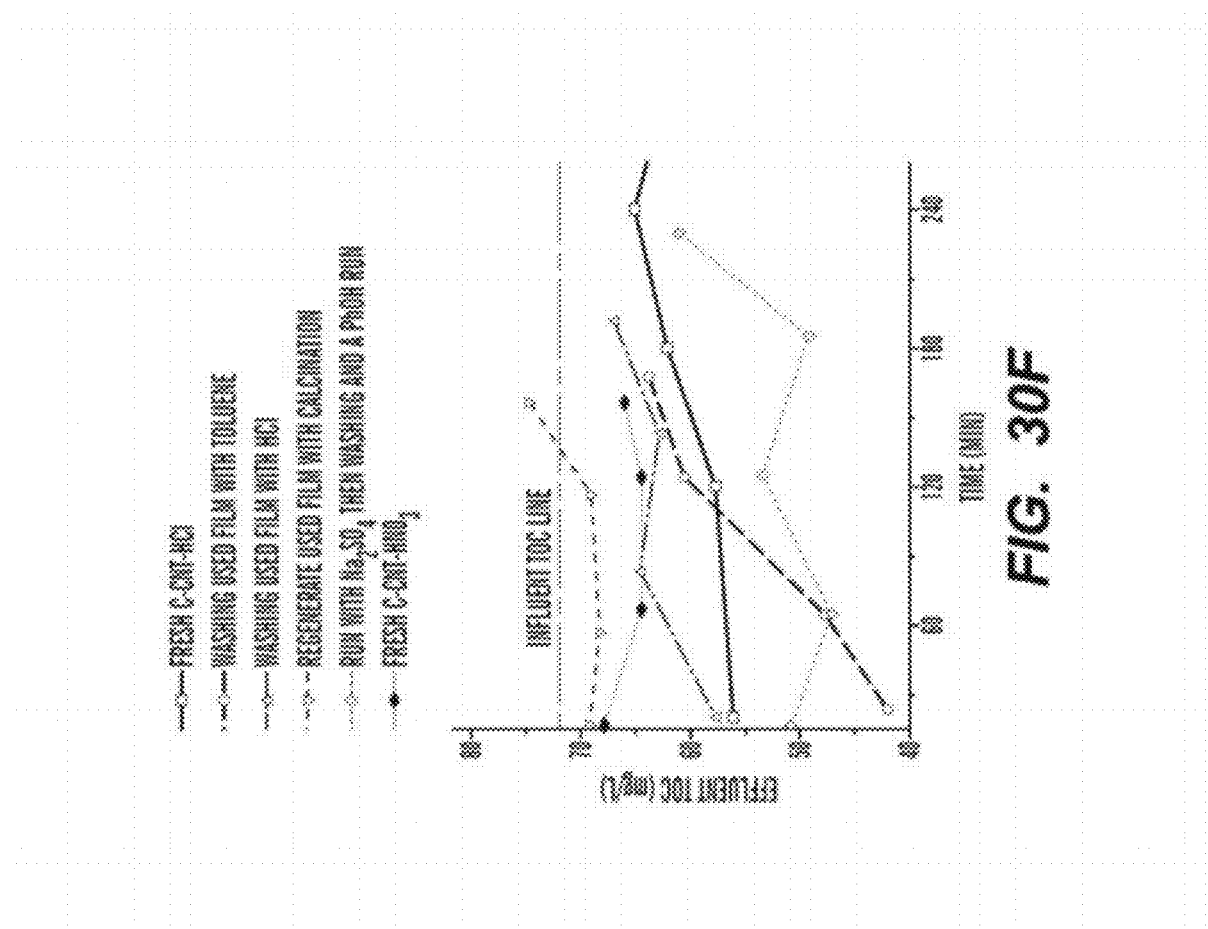
Figure 30E:
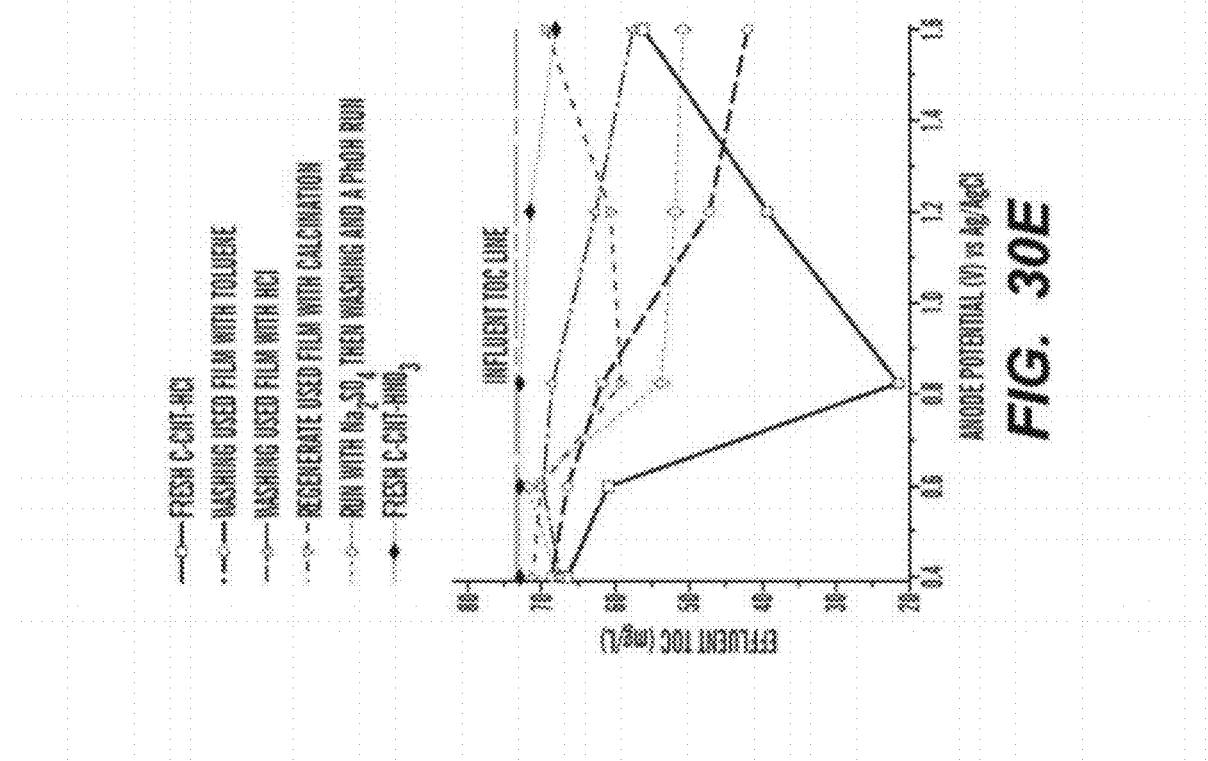

FIGS. 30A-30F show experimental data for electrochemical characterization of the regenerated CNT filter performance. Electrochemical conditions were J (flow rate)=1.6 mL min$^{-1}$, [PhOH]=1.0 mM, and $[Na_2SO_4]$=100 mM. FIG. 30A shows data of LSV performed under the same conditions as above with a scan rate 10 mV s$^{-1}$. FIG. 30B shows a relationship between anode potential and voltage. FIG. 30C shows the steady-state anode potential-current relation, where each anode potential was run for 15-20 min. FIG. 30D shows a steady-state anode potential-applied voltage relation. FIG. 30E shows effluent TOC as a function of anode potential where the applied voltage was increased until the anode potential reached 1.6 V. FIG. 30F shows effluent TOC as a function of time where the electrolysis was continued for another 3-4 hours at an anode potential of 1.6 V.

Figure 31A:
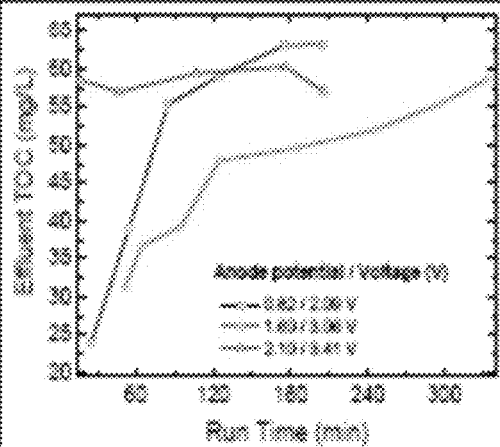
Figure 31B:
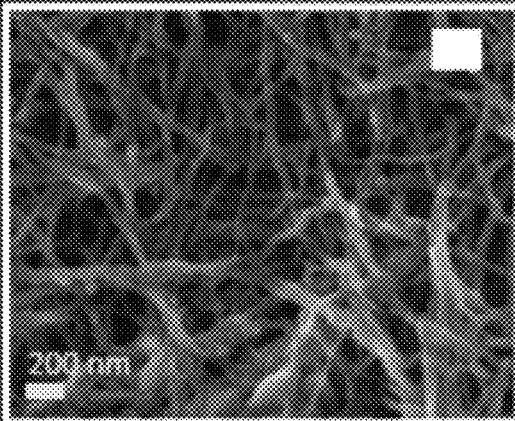
Figure 31C:
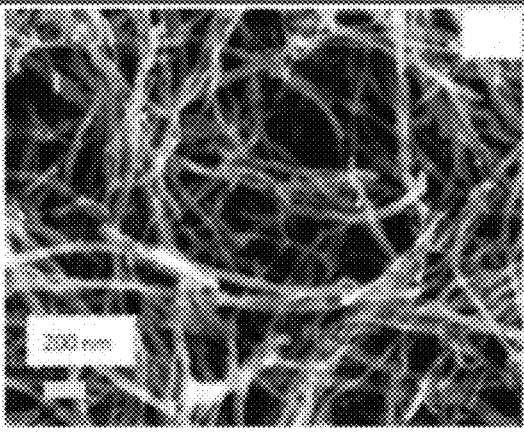
Figure 31D:
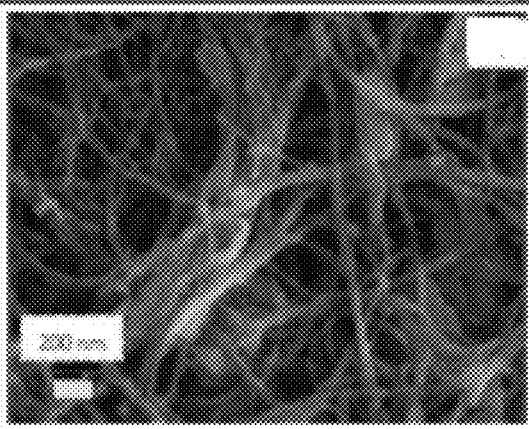
Figure 31E:
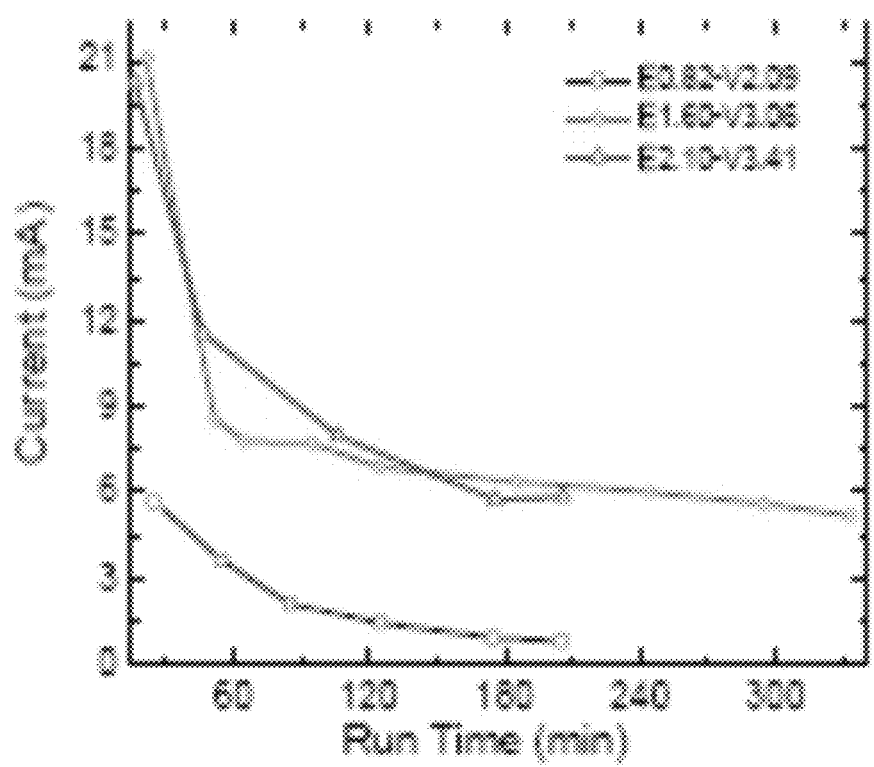

FIGS. 31A-31E show experimental data for the CNT films run in long term at different anode potentials of 0.82 V, 1.60 V and 2.10 V. Electrochemical conditions were J (flow rate)=1.6 mL min$^{-1}$, [PhOH]=1.0 mM, and $[Na_2SO_4]$=100 mM. FIG. 31A shows effluent TOC as a function of time where the electrolysis was continued for 3-6 hours. FIGS. 31B-31D show SEM photographs of CNT networks after use at the anode potentials of 0.82 V, 1.60 V and 2.10 V, respectively. FIG. 31E shows a plot of current as a function of time at different anode potentials of 0.82 V, 1.60 V and 2.10 V.

Figure 32A:
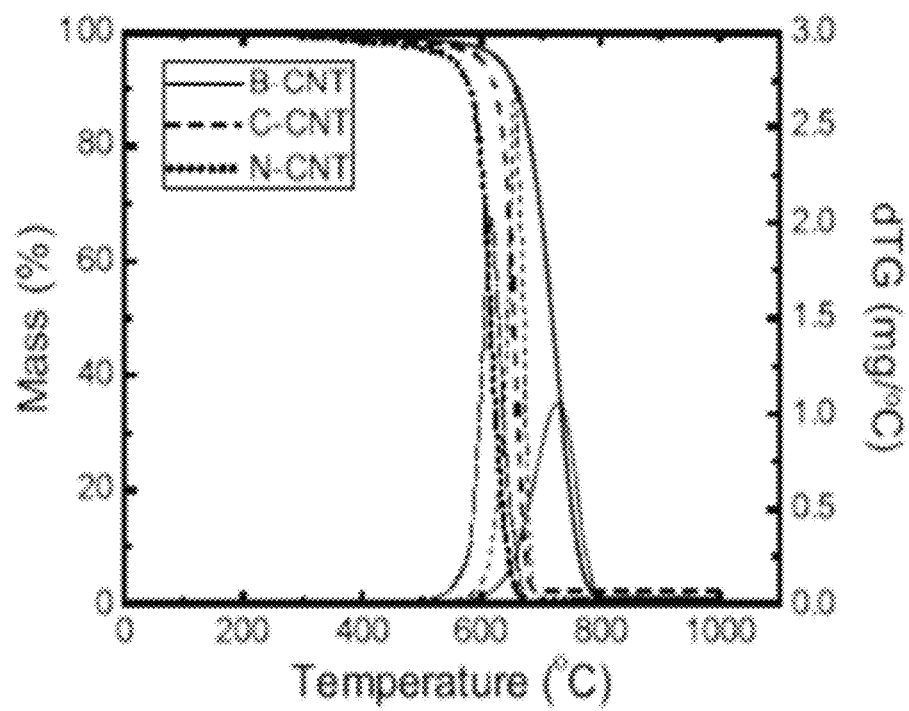
Figure 32B:
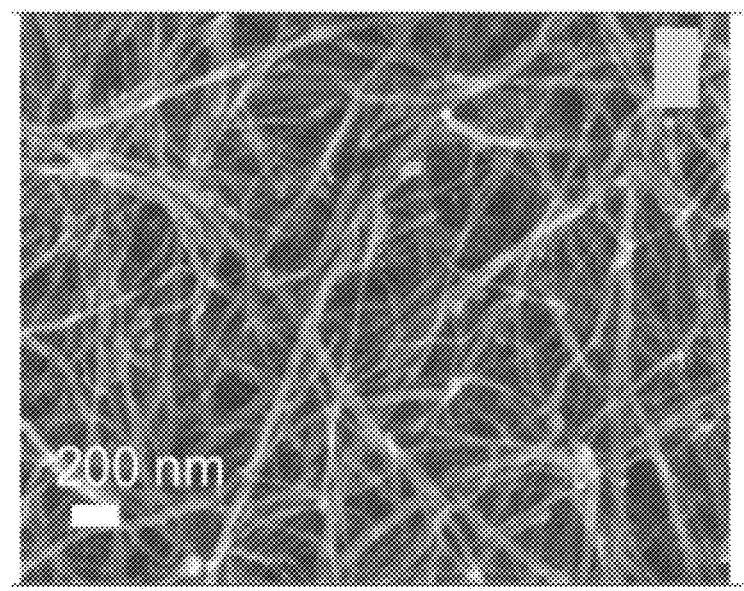
Figure 32C:
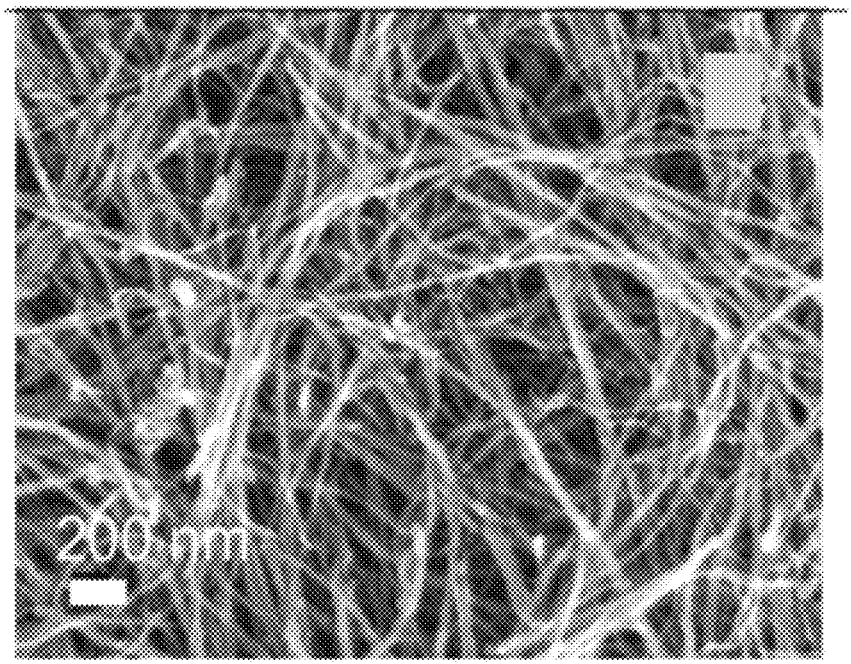
Figure 32D:
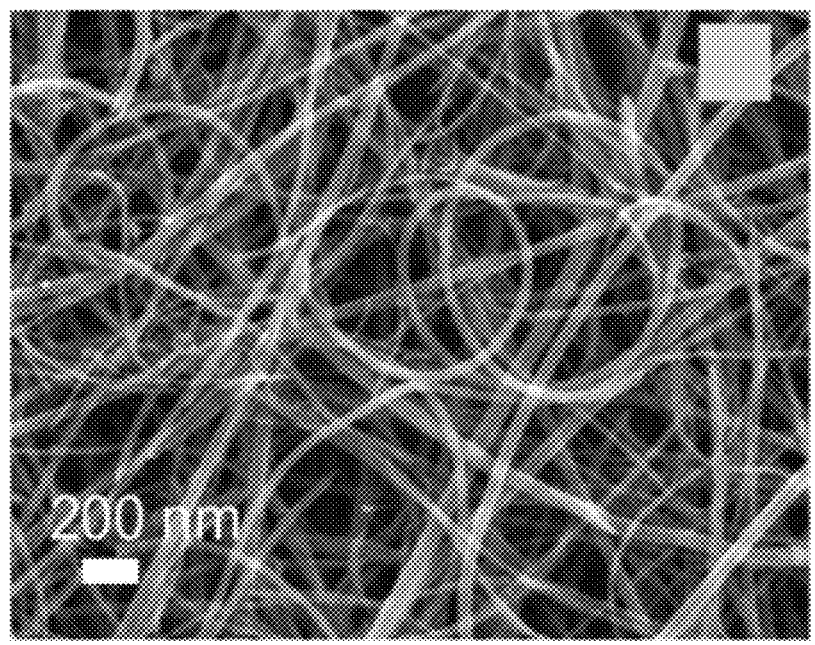
Figure 32E:
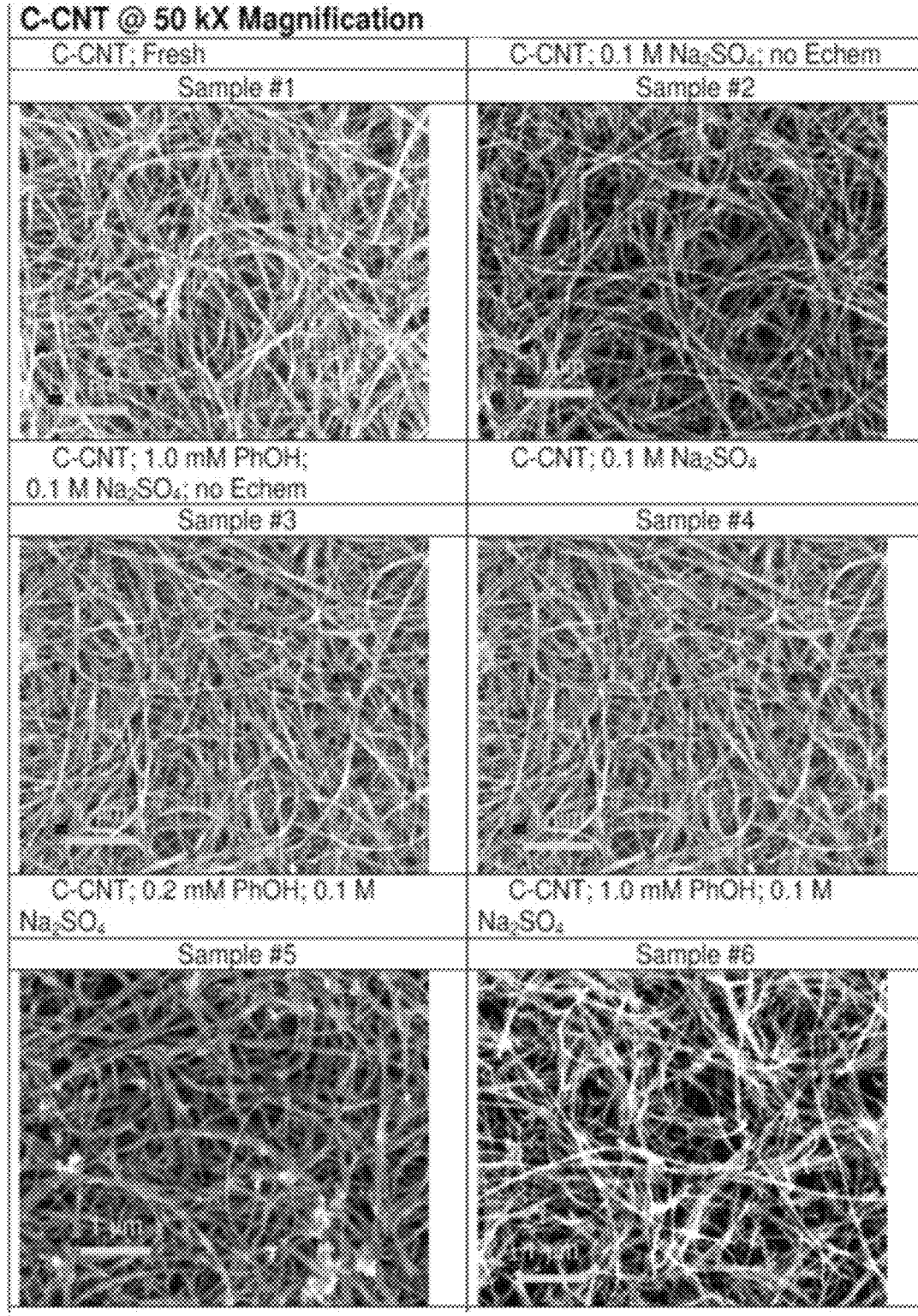
Figure 32E:
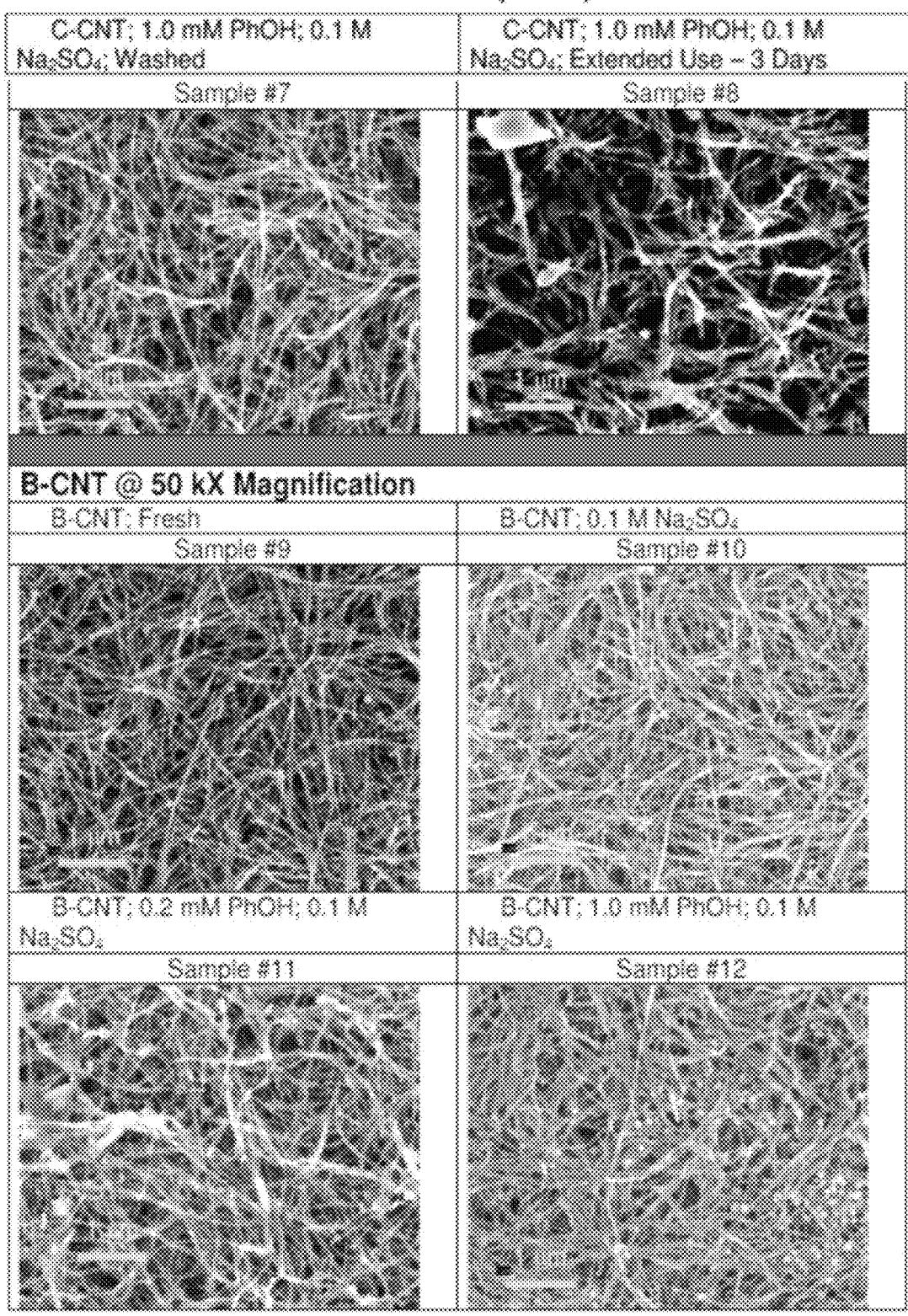
Figure 32E:
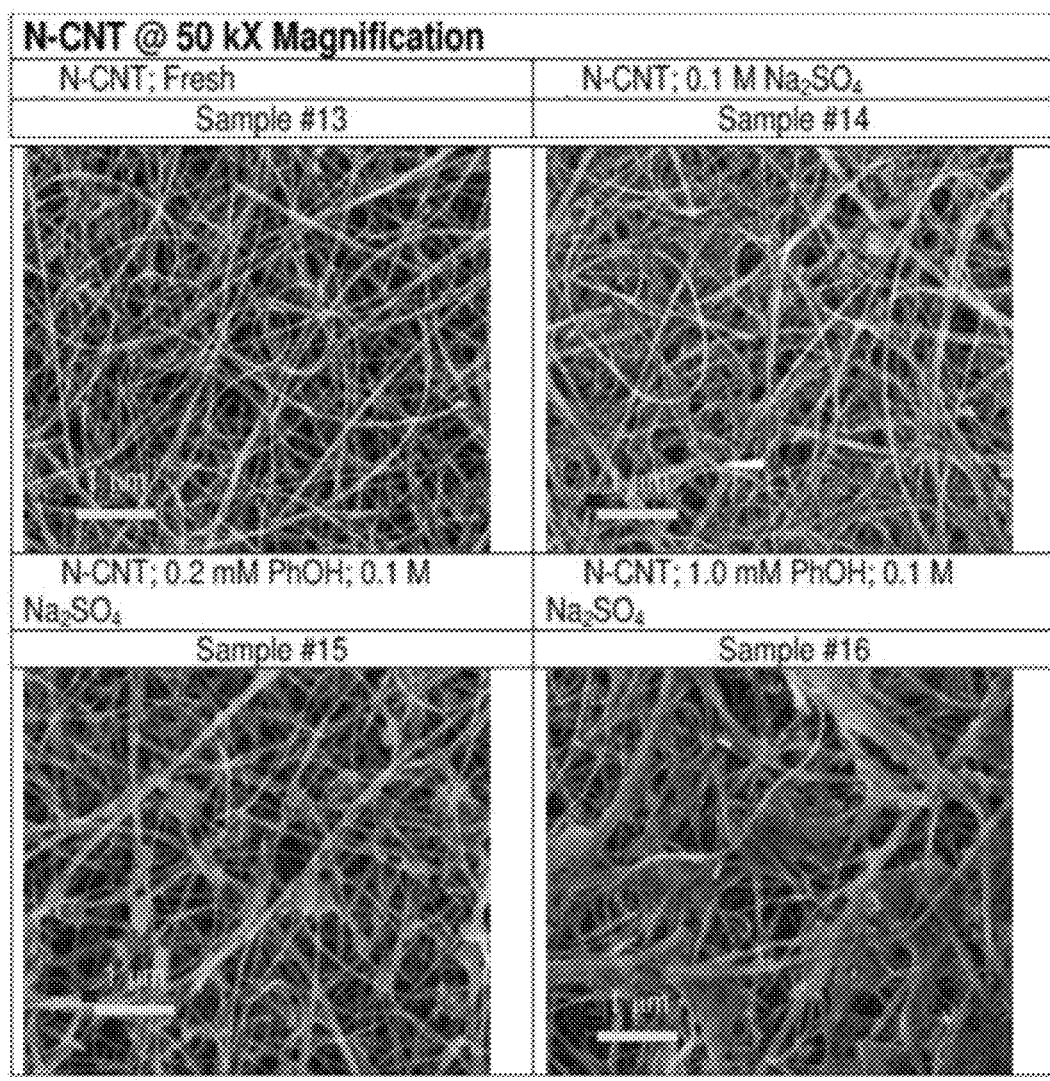
Figure 32E:
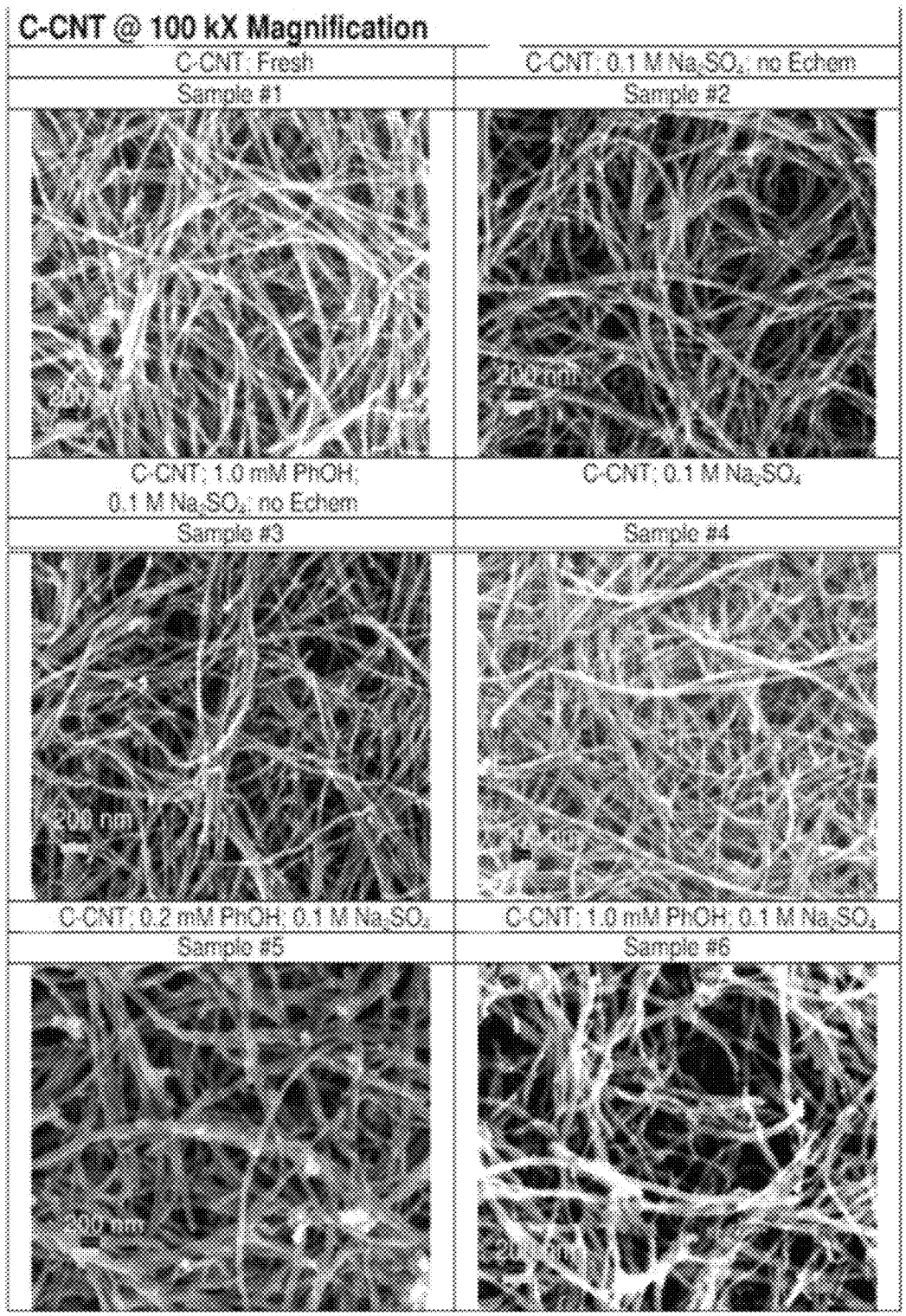
Figure 32E:
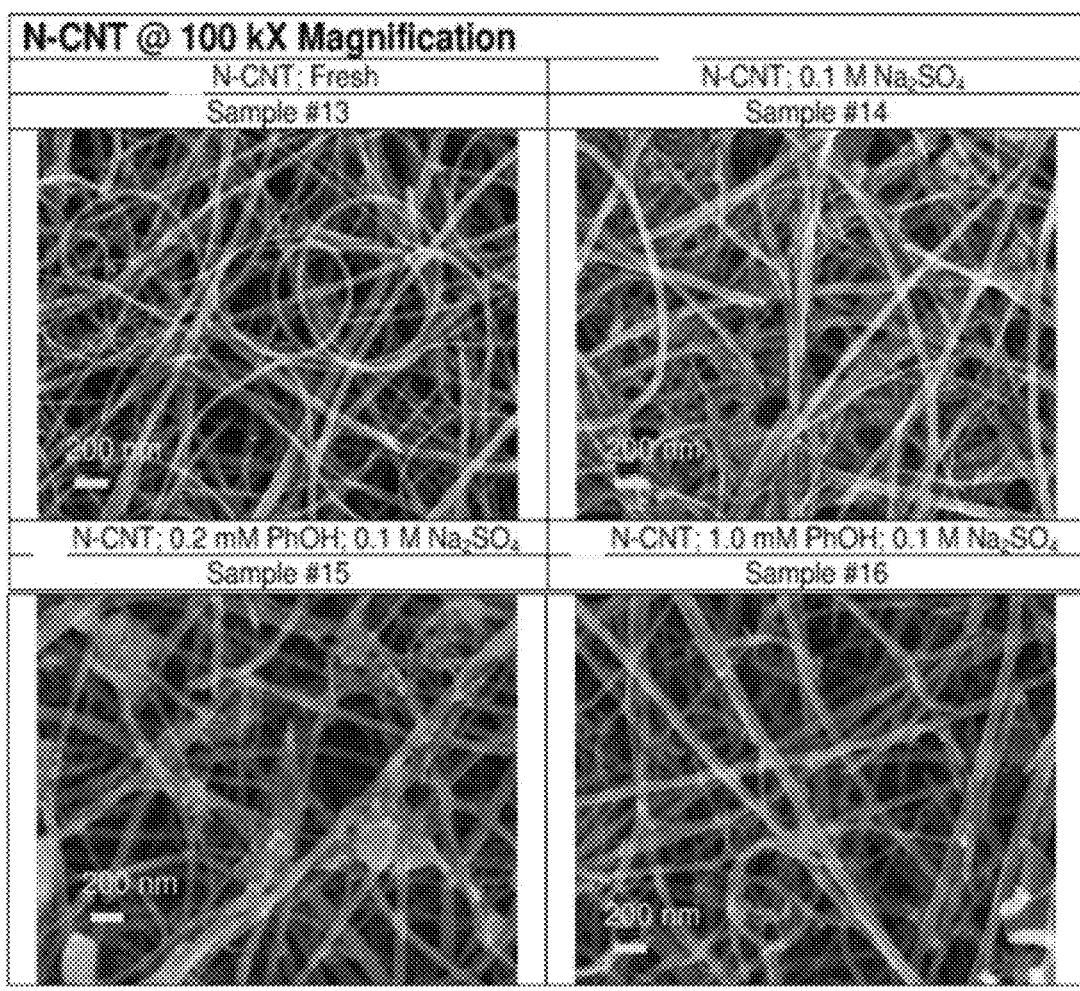
Figure 32F:
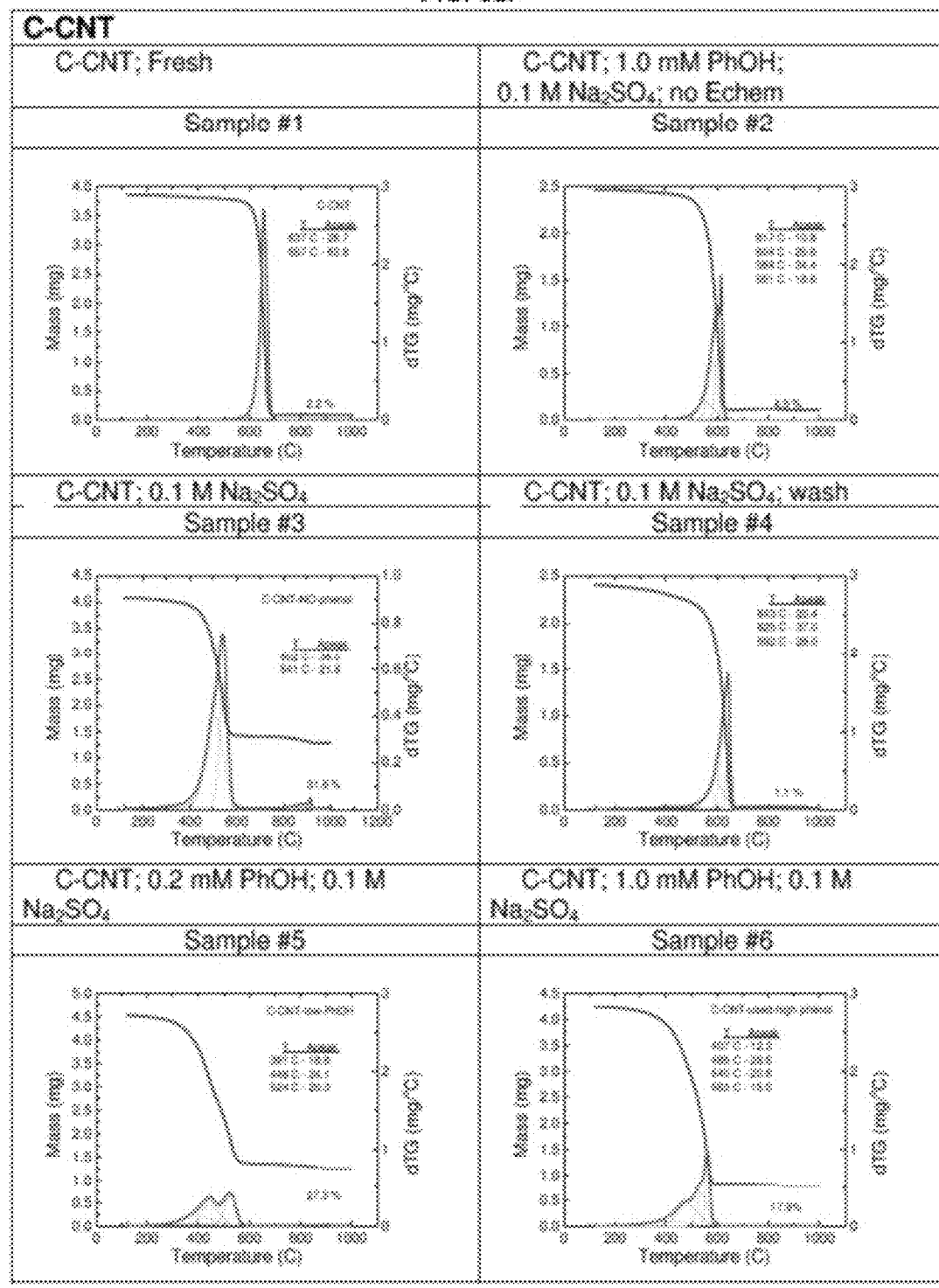
Figure 32F:
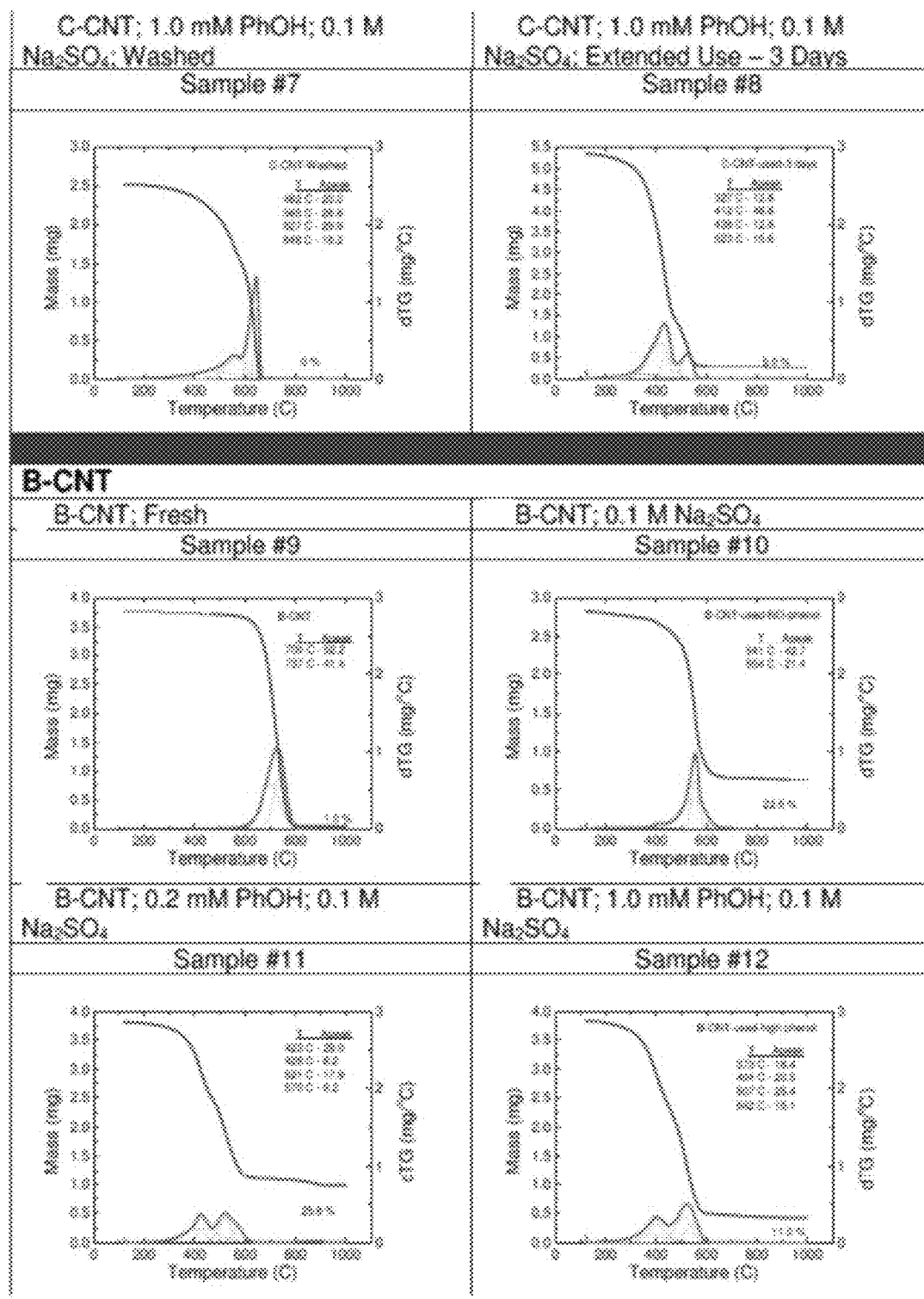
Figure 32F:
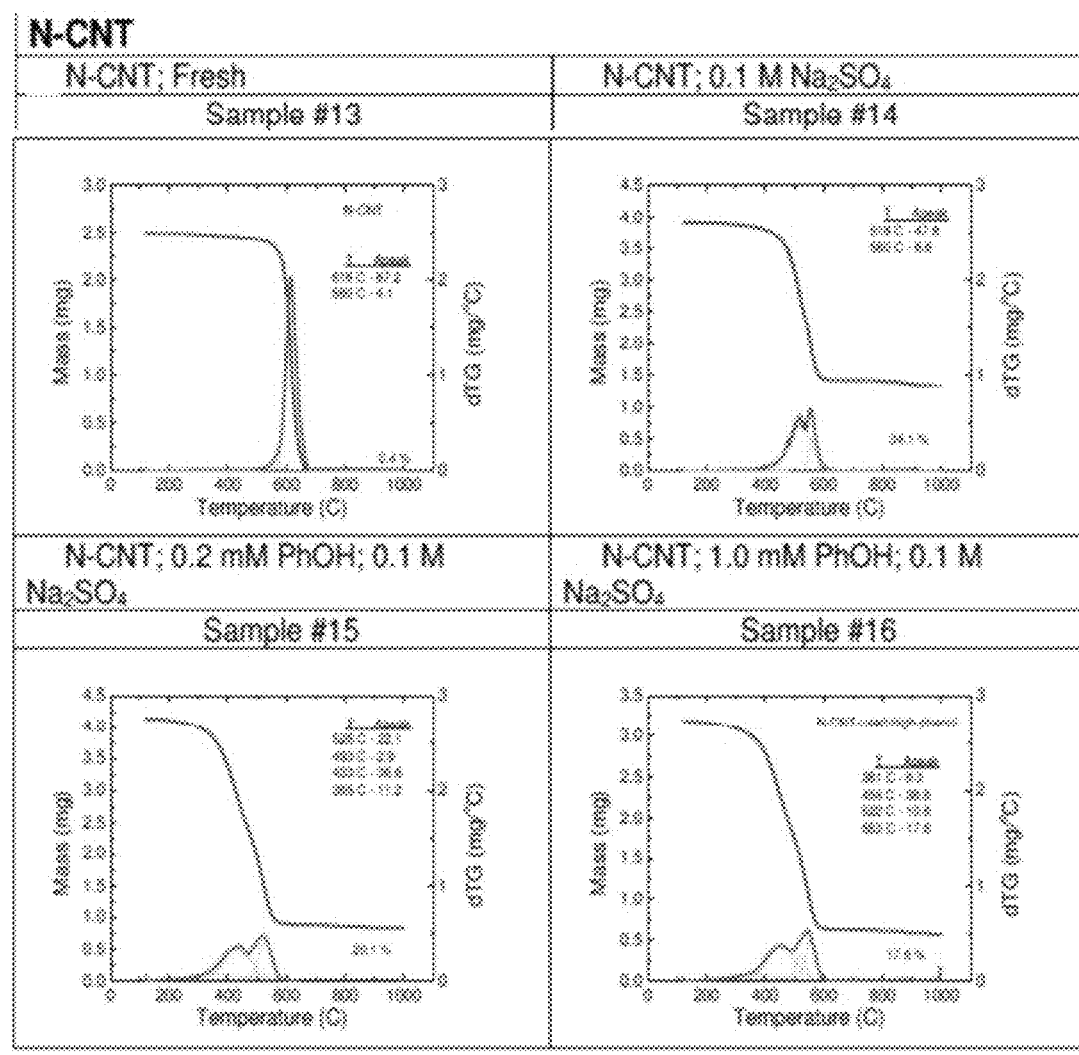

FIGS. 32A-32F show scanning electron micrographs, and thermogravimetric analysis of fresh and electrolyzed CNT networks (including C-CNT, B-CNT and N-CNT). FIG. 32A shows a plot of mass percent and dTG (peaks) in mg ° C.$^{-1}$ as a function of temperature for fresh B-CNT (solid), C-CNT (dashed), and N-CNT (short dash) networks. FIGS. 32B, 32C, and 32D show scanning electron micrographs of the B-CNT, C-CNT, and N-CNT, respectively. FIG. 32E shows a set of SEM images of fresh and electrolyzed CNT networks including C-CNT, B-CNT and N-CNT networks at 50 kX and 100 kX magnifications. FIG. 32F shows a set of thermogravimetric data for fresh and electrolyzed CNT networks including C-CNT, B-CNT and N-CNT networks.

Figure 33A:
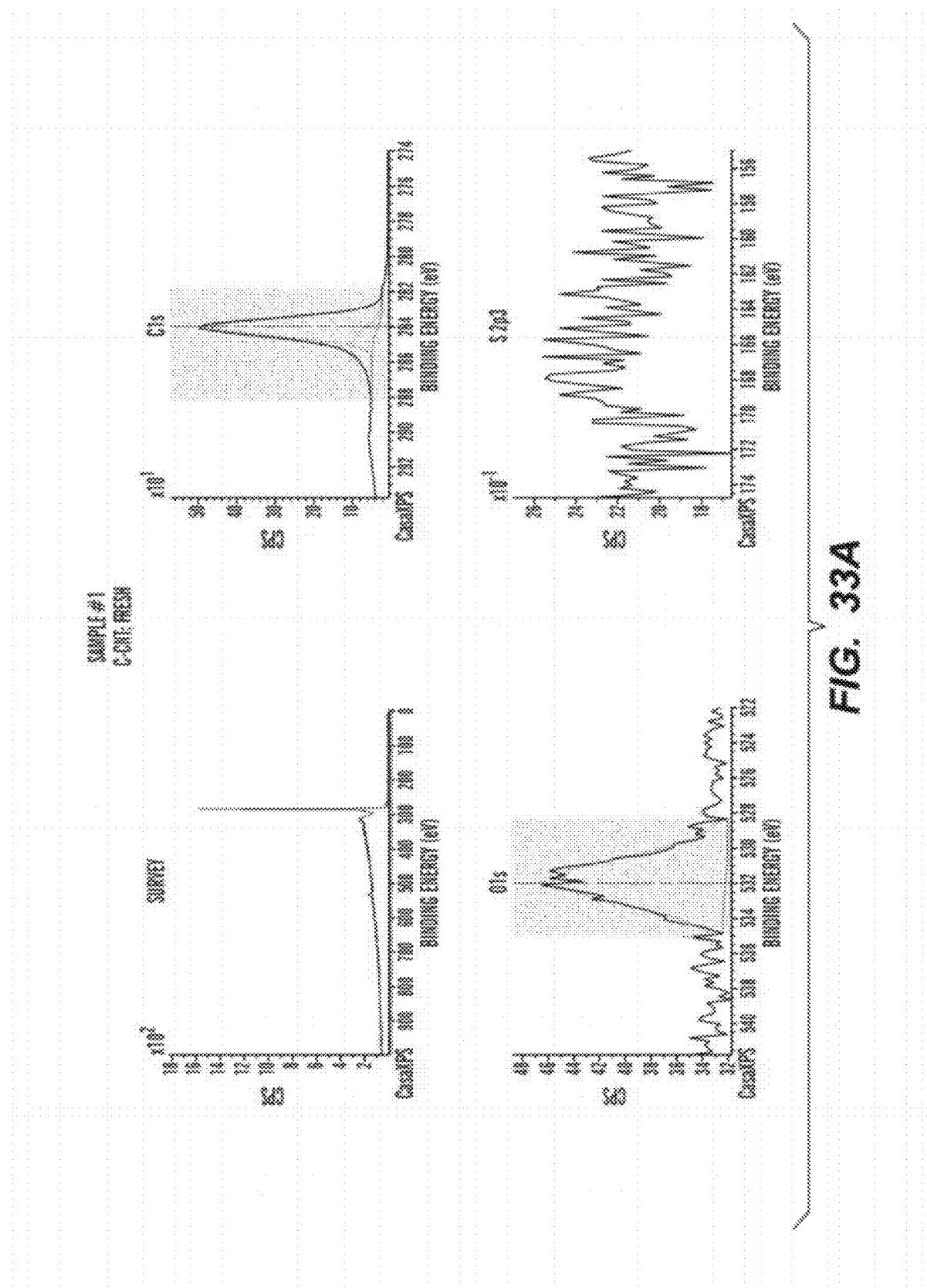
Figure 33A:
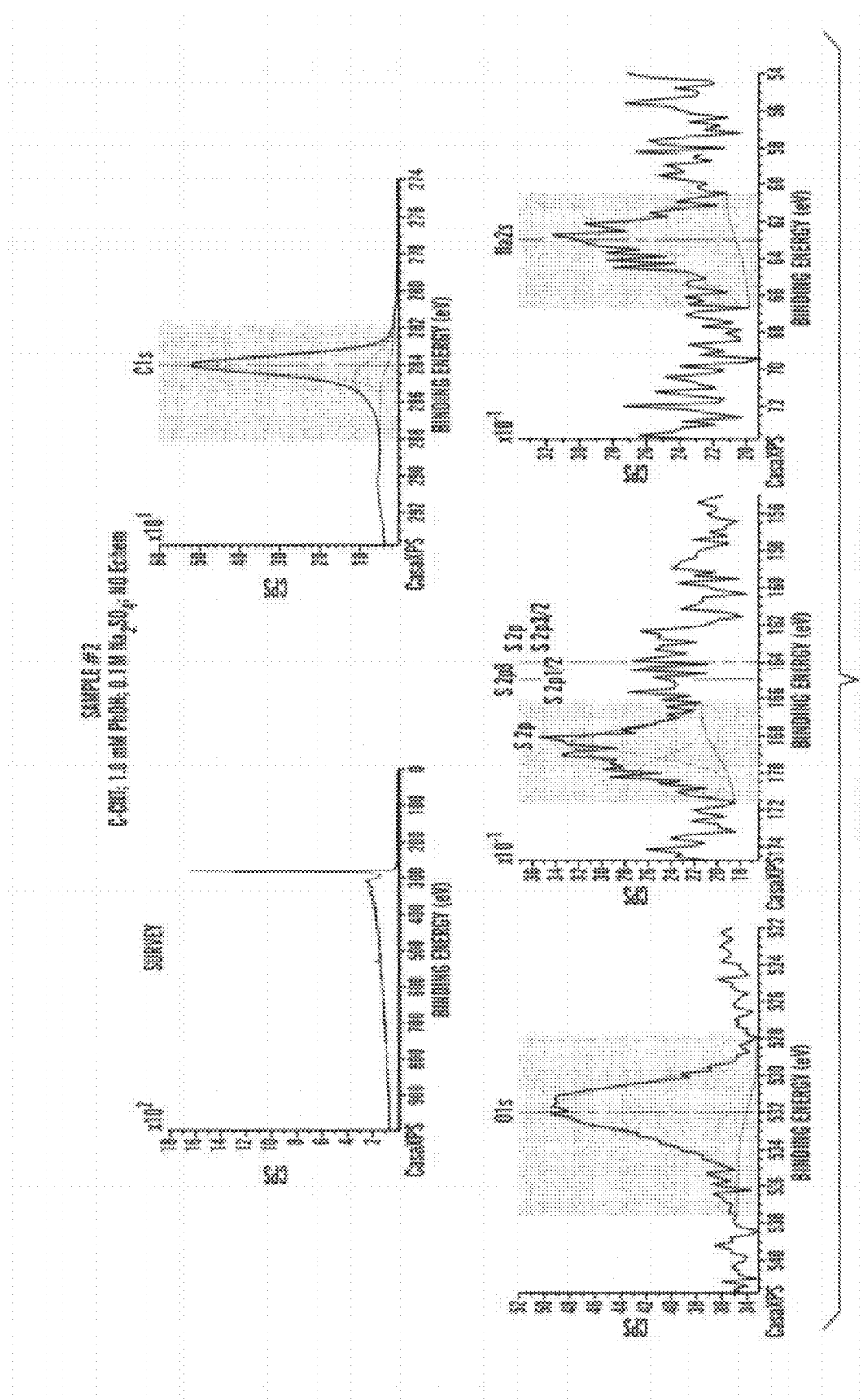
Figure 33A:
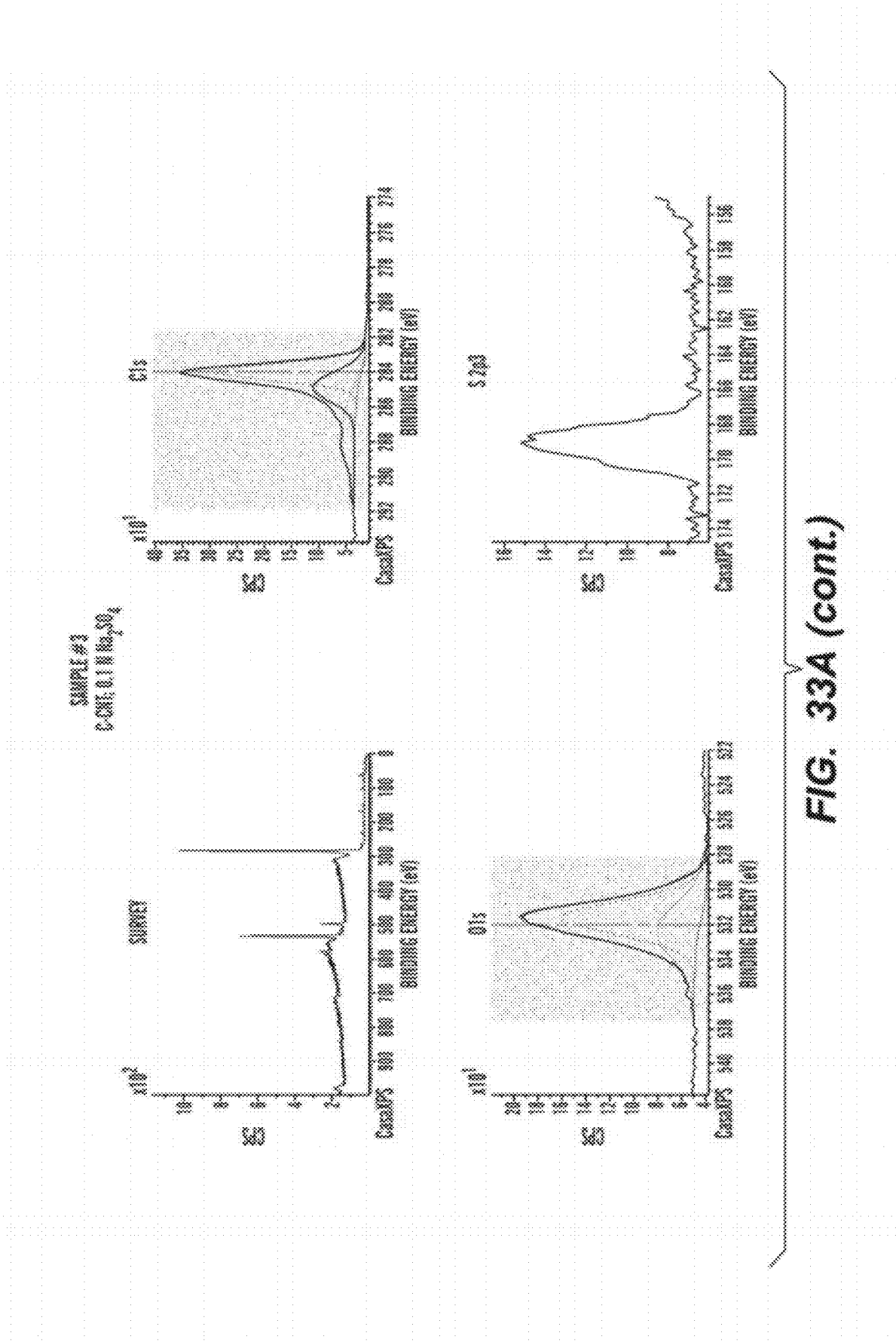
Figure 33A:
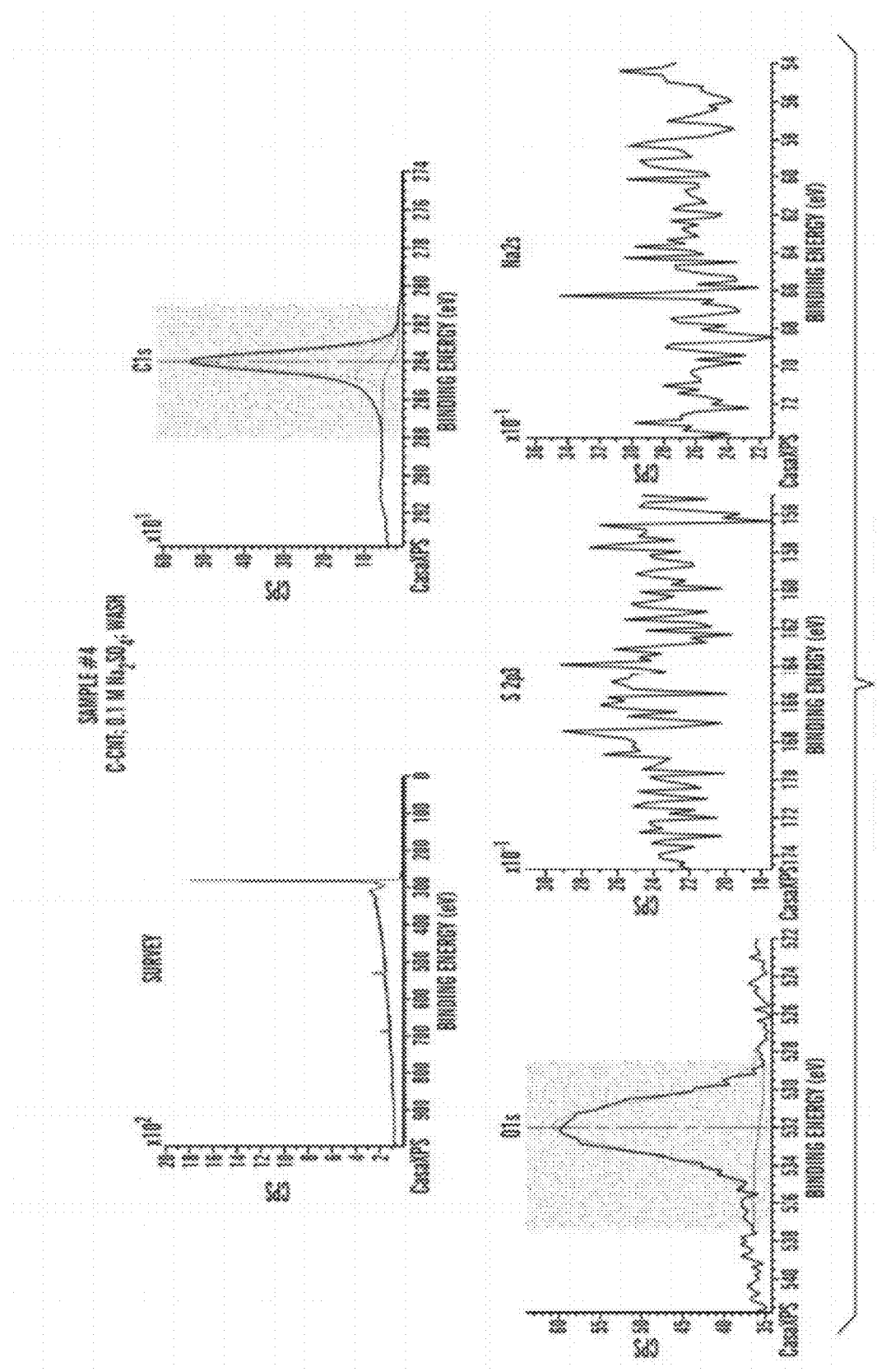
Figure 33A:
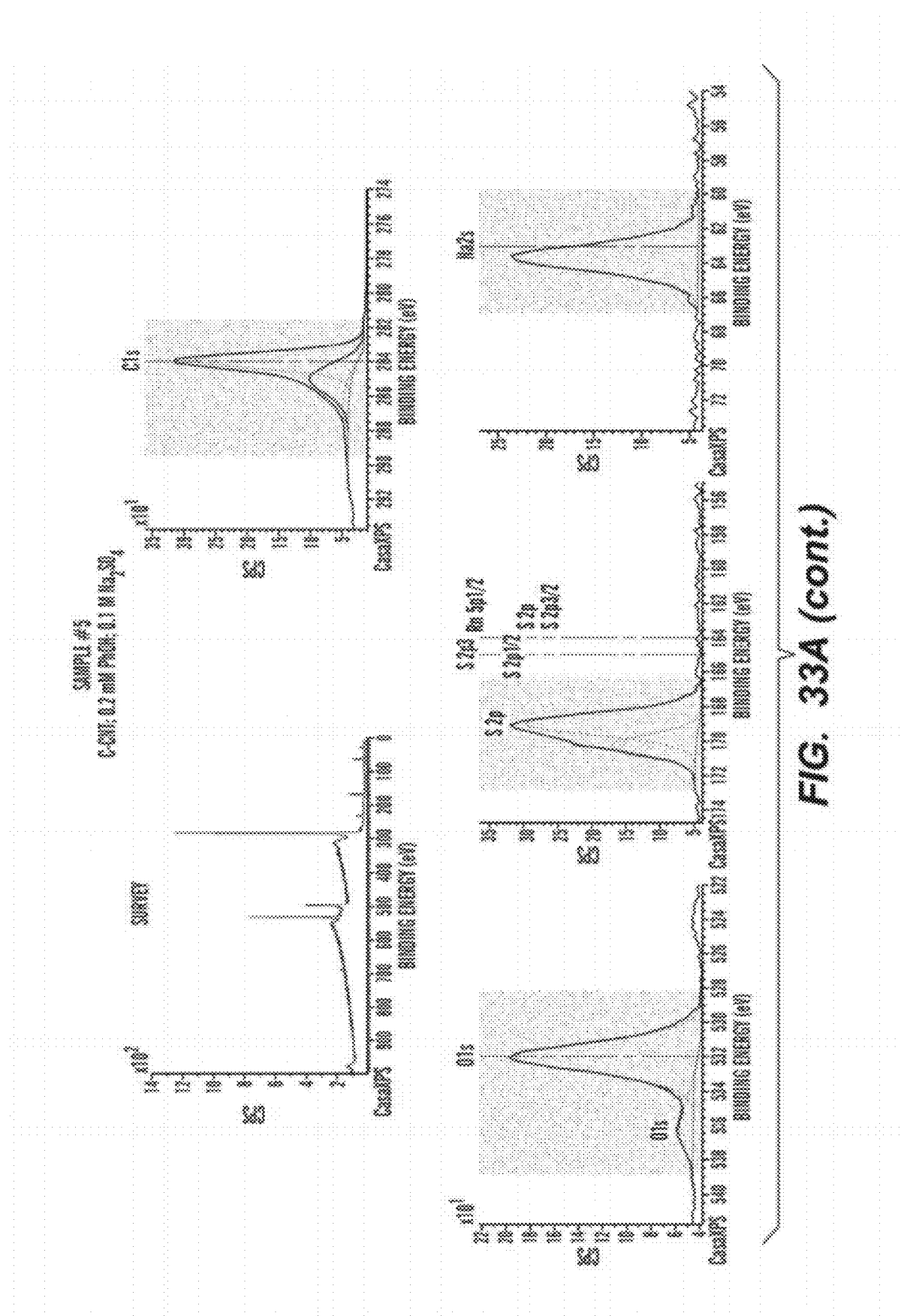
Figure 33A:
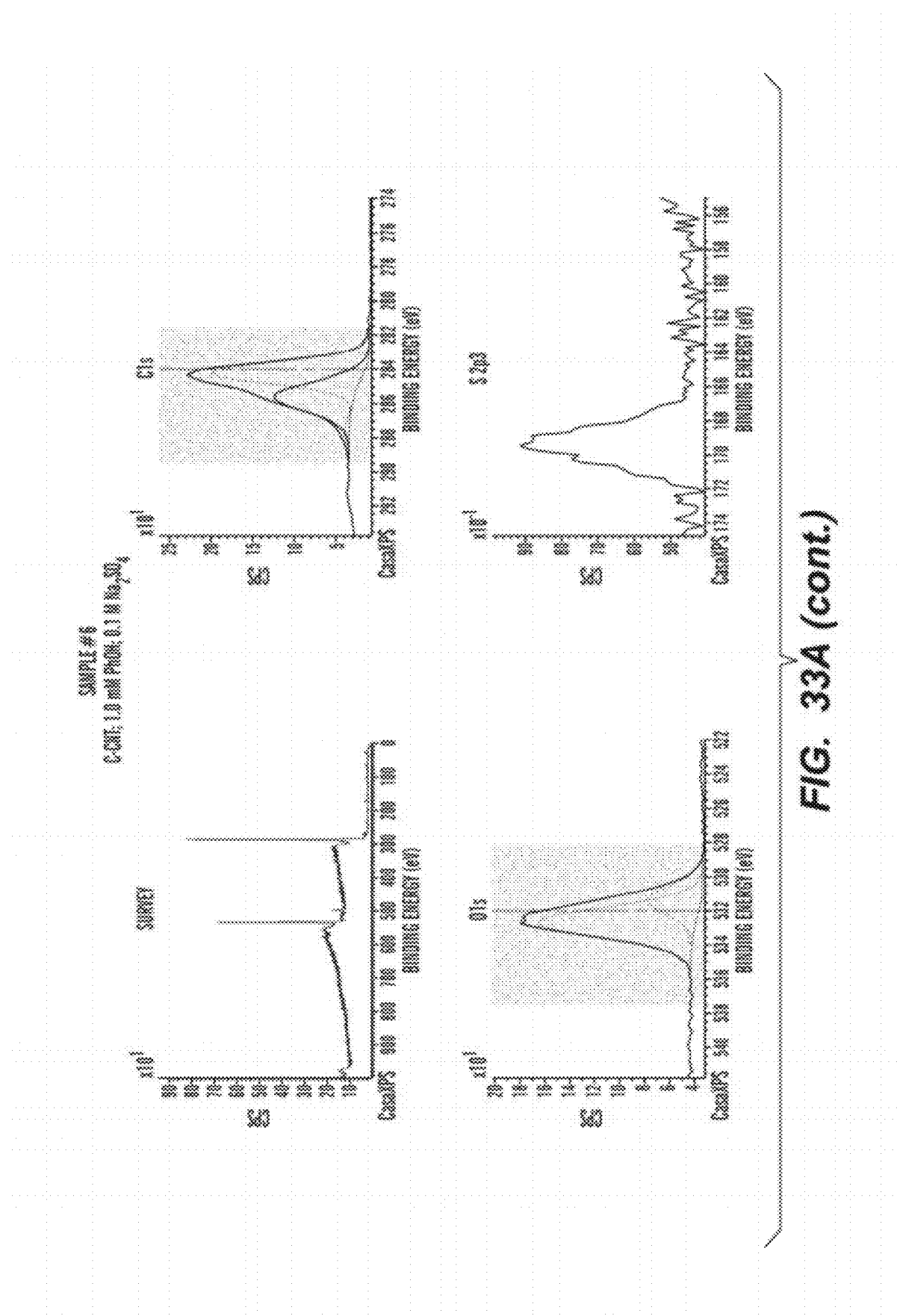
Figure 33A:
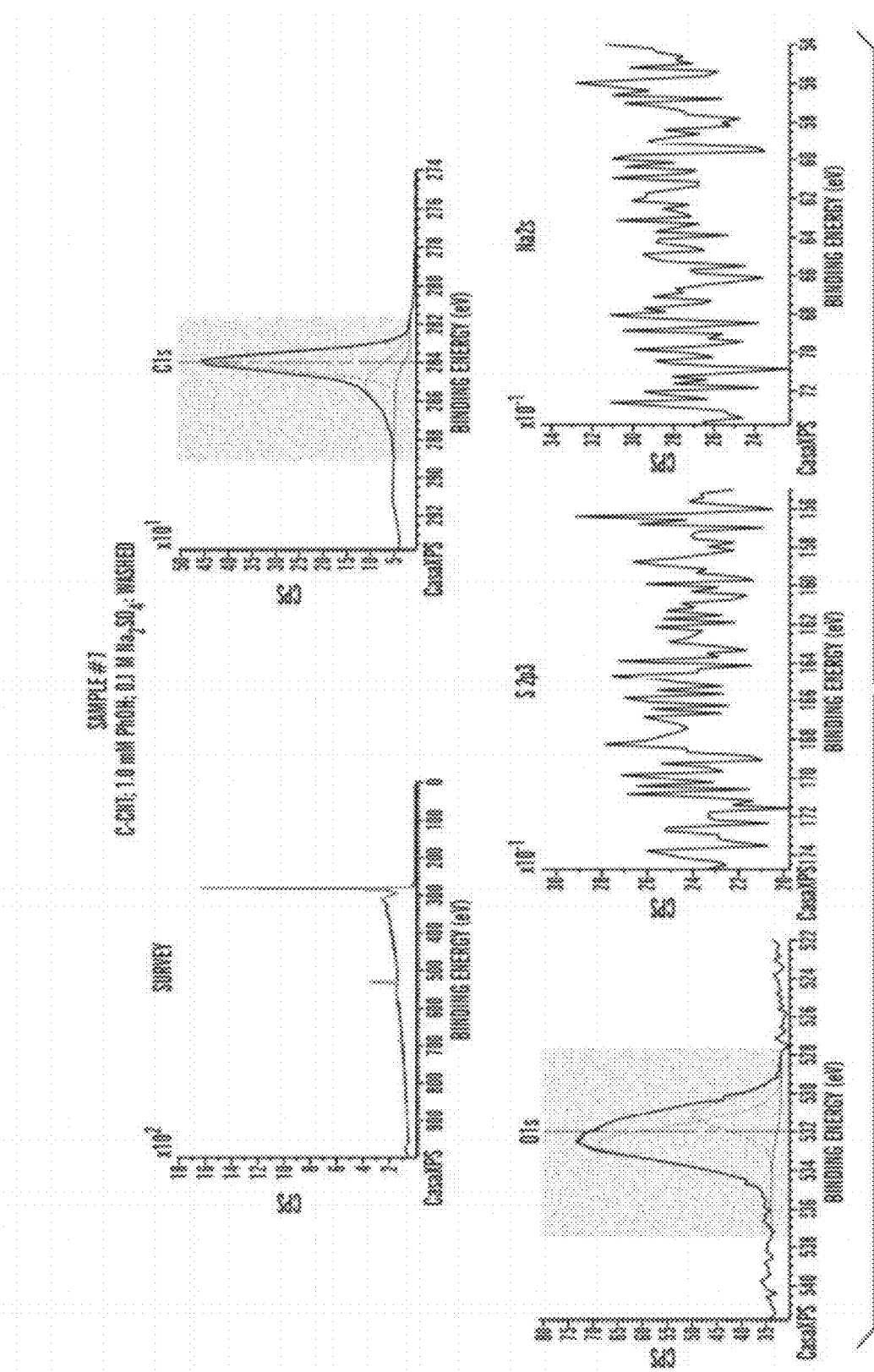
Figure 33A:
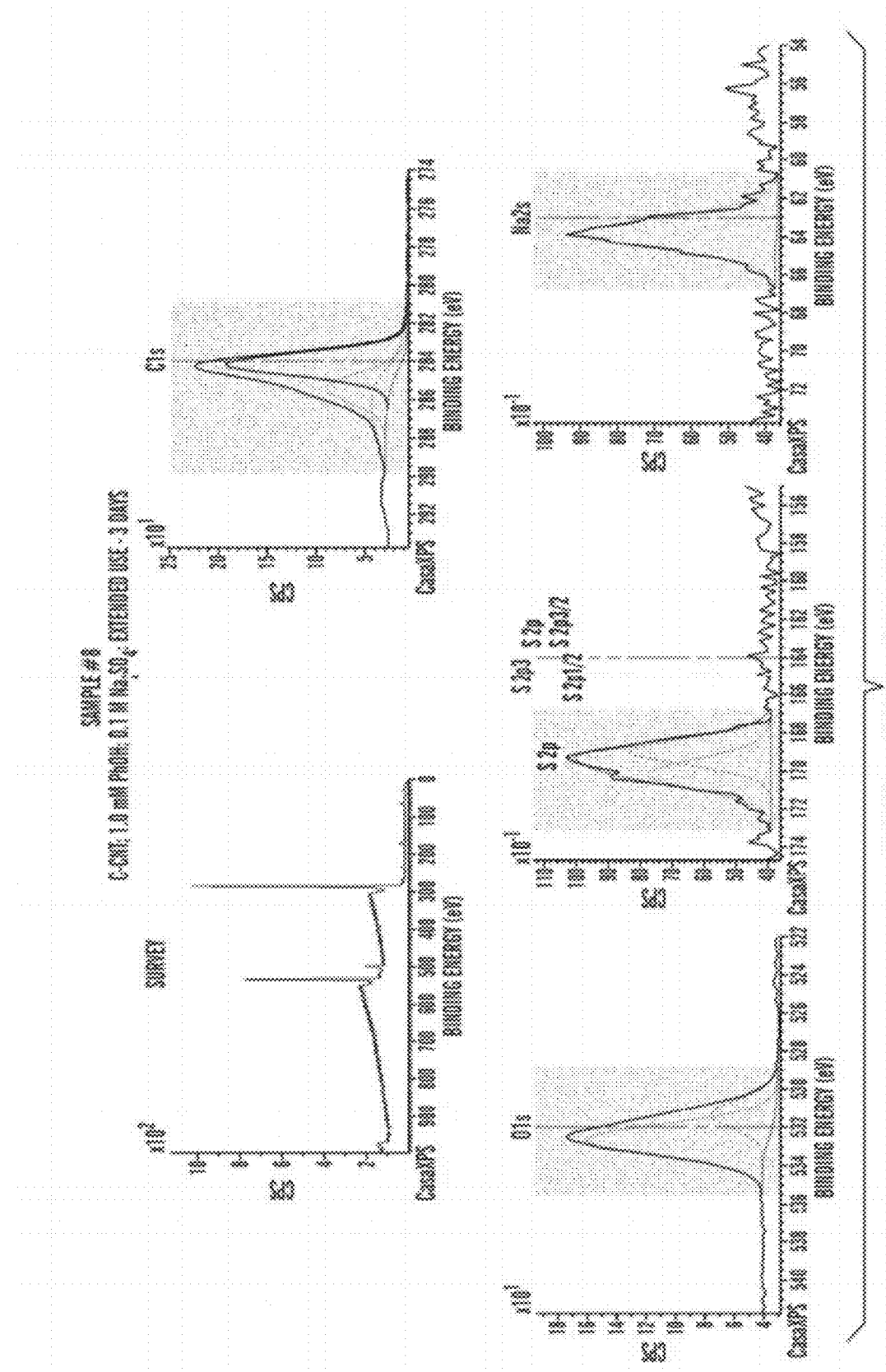
Figure 33B:
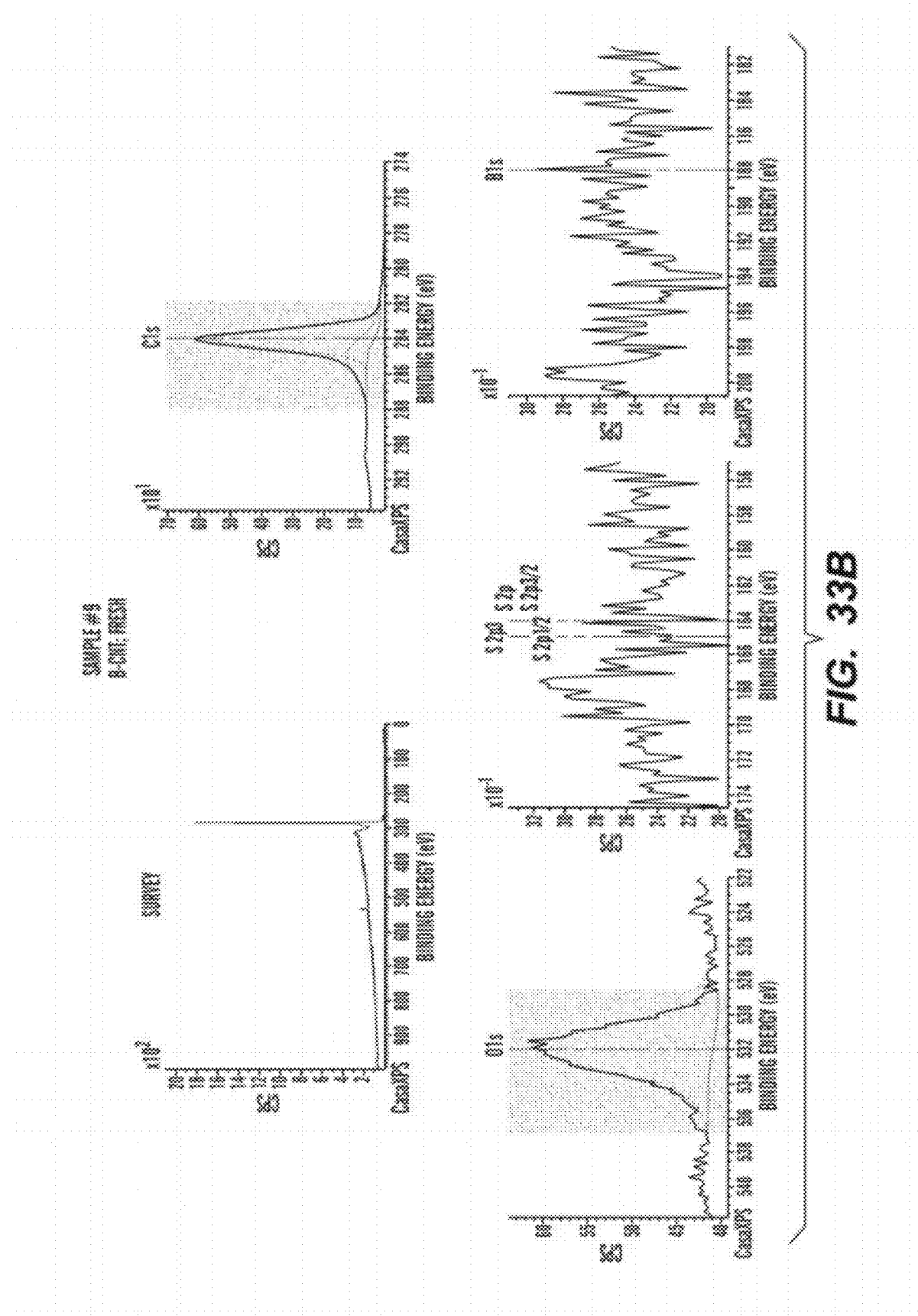
Figure 33B:
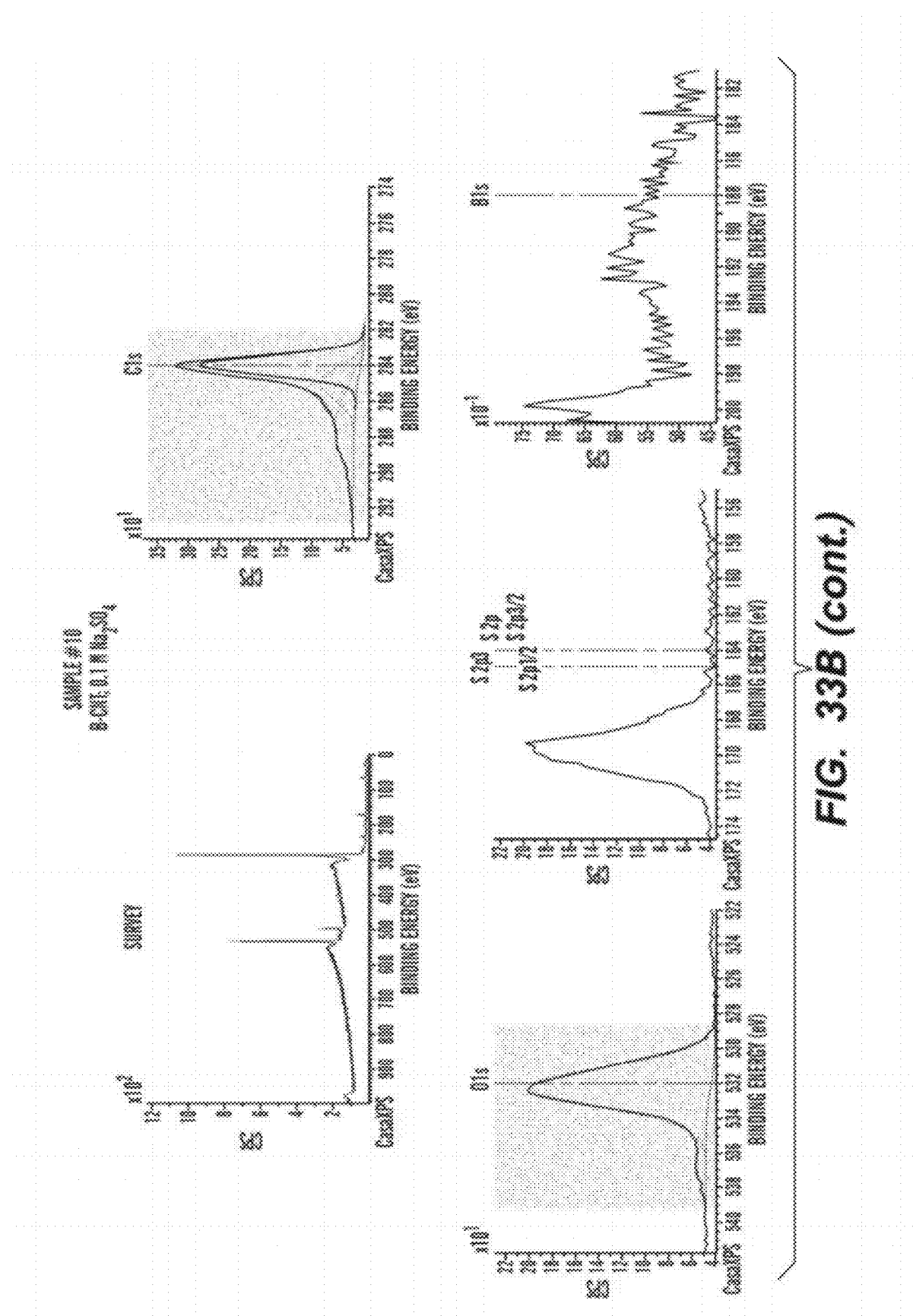
Figure 33B:
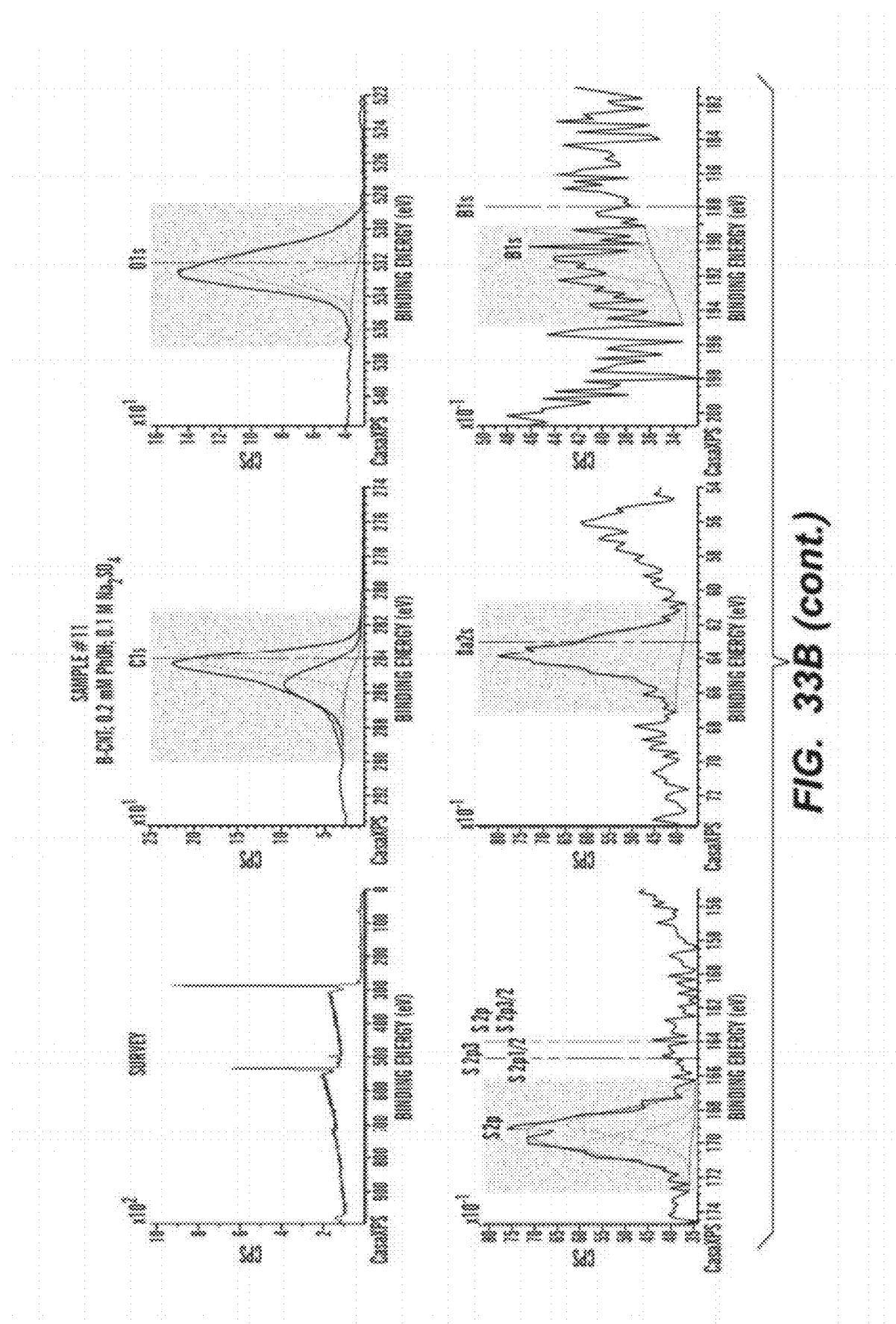
Figure 33B:
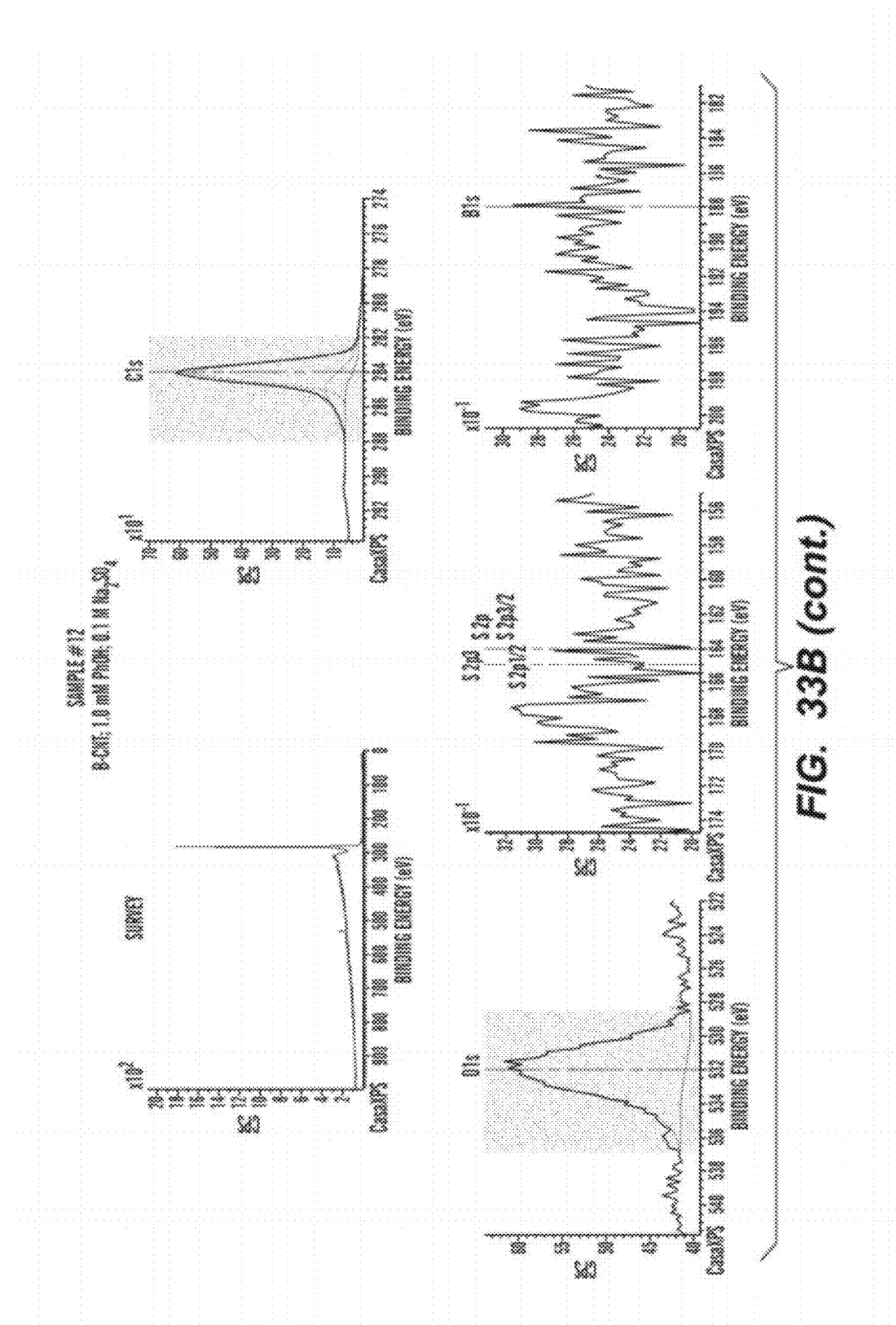
Figure 33C:
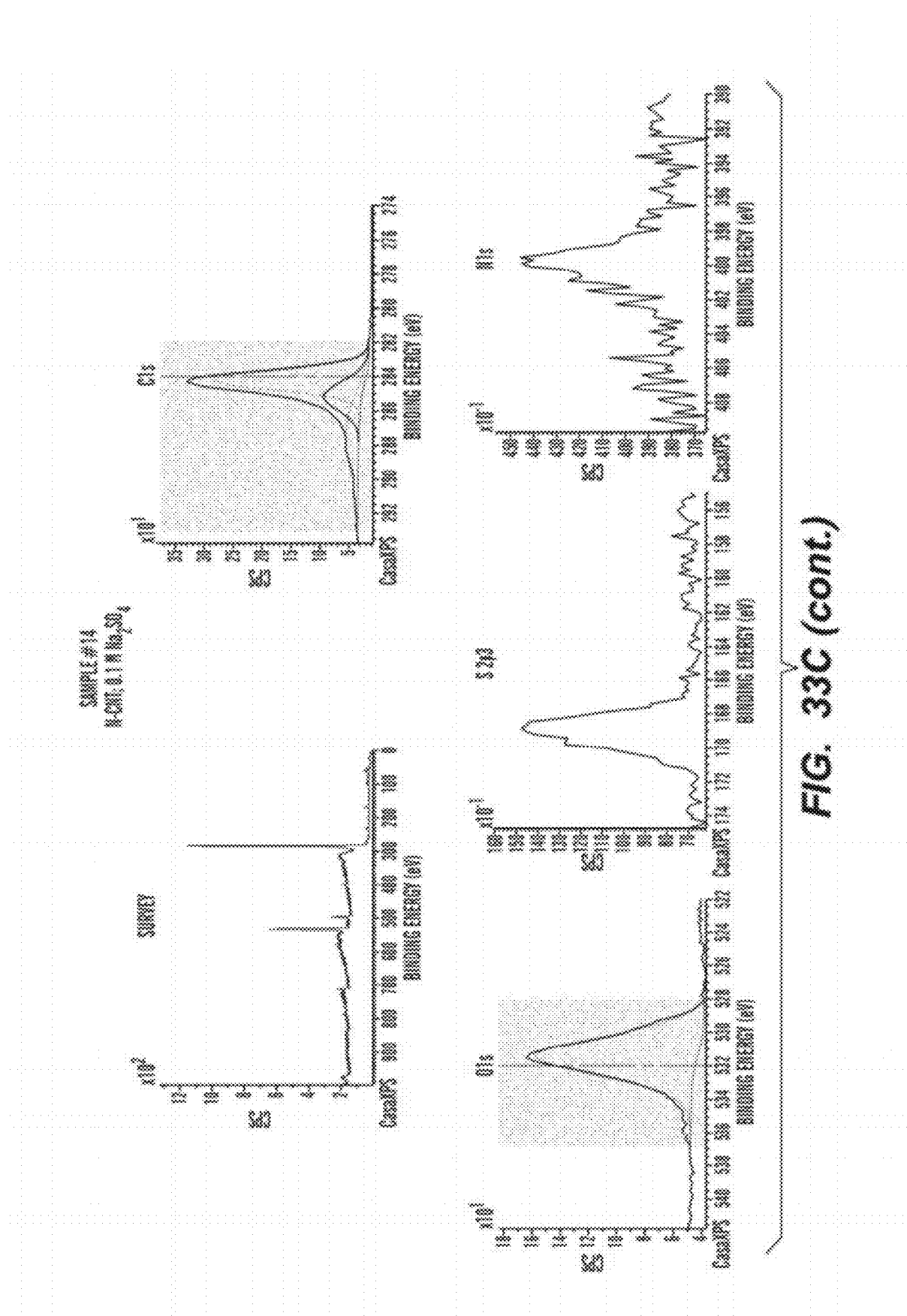
Figure 33C:
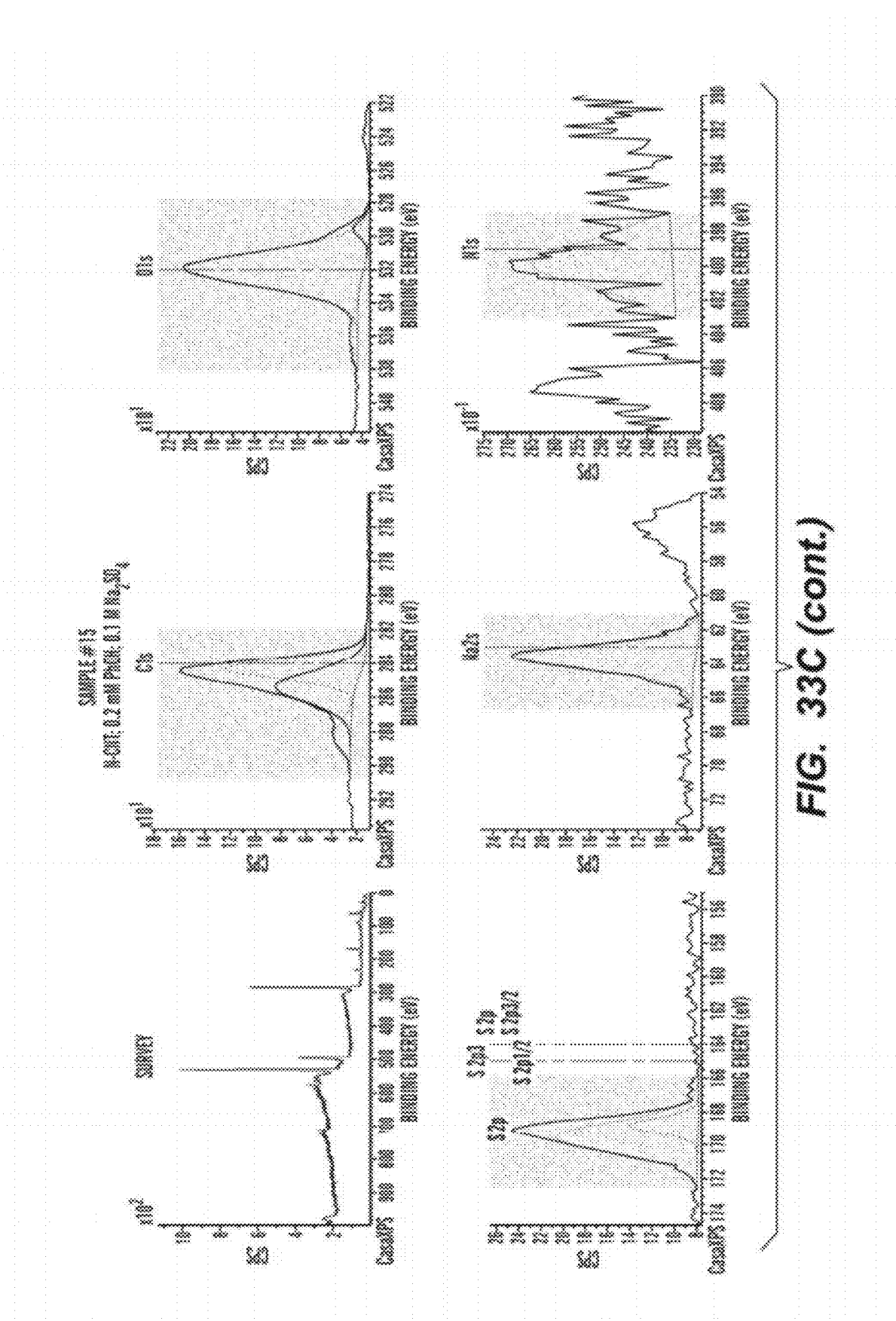
Figure 33C:
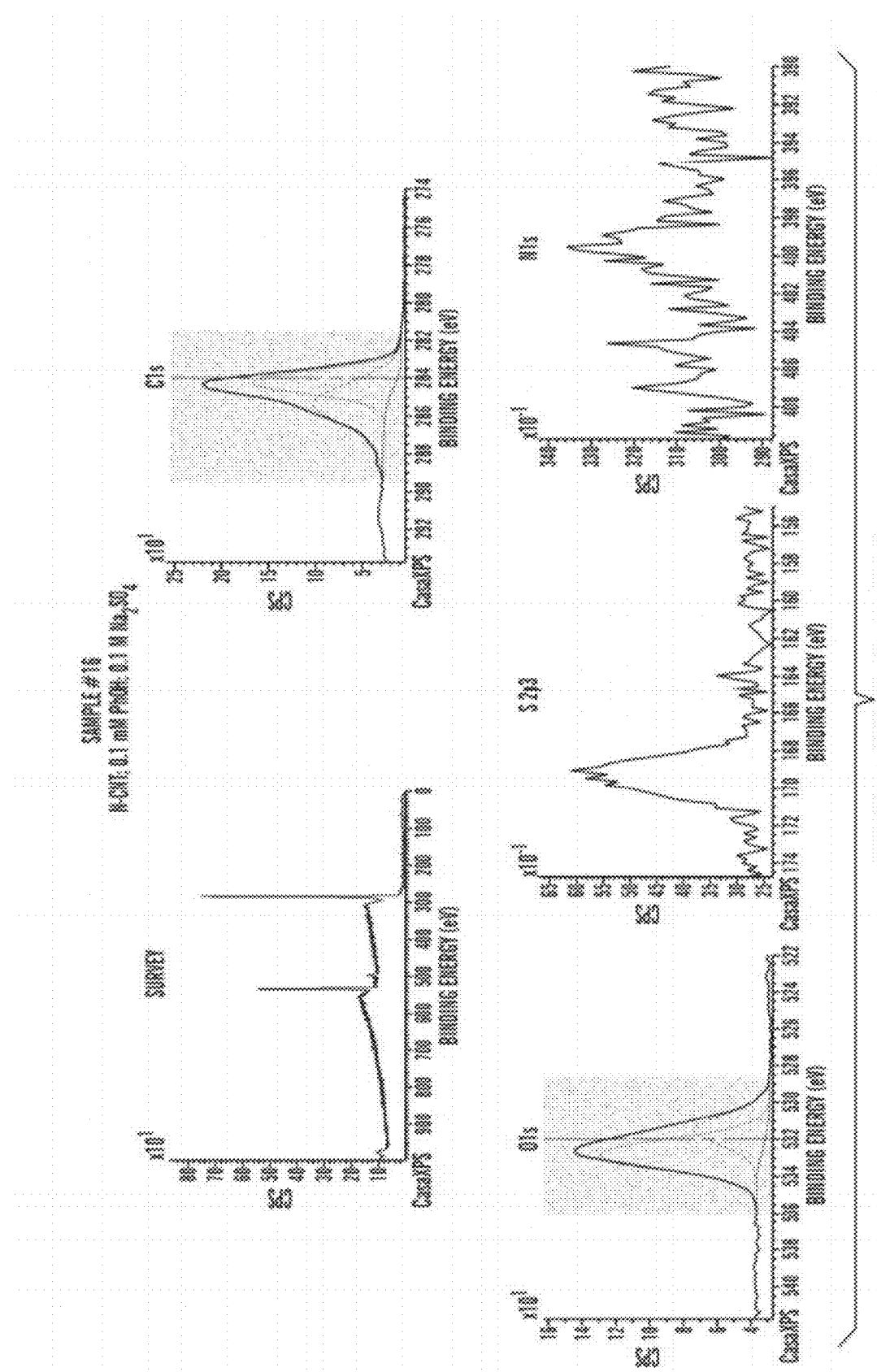

FIGS. 33A-33C show X-ray photoelectron spectroscopy (XPS) data of fresh and electrolyzed CNT networks (including C-CNT, B-CNT and N-CNT). FIG. 33A corresponds to one or more embodiments of the C-CNT networks used in the filtration apparatus described herein. FIG. 33B corresponds to one or more embodiments of the B-CNT networks used in the filtration apparatus described herein. FIG. 33C corresponds to one or more embodiments of the N-CNT networks used in the filtration apparatus described herein.

Figure 34A:
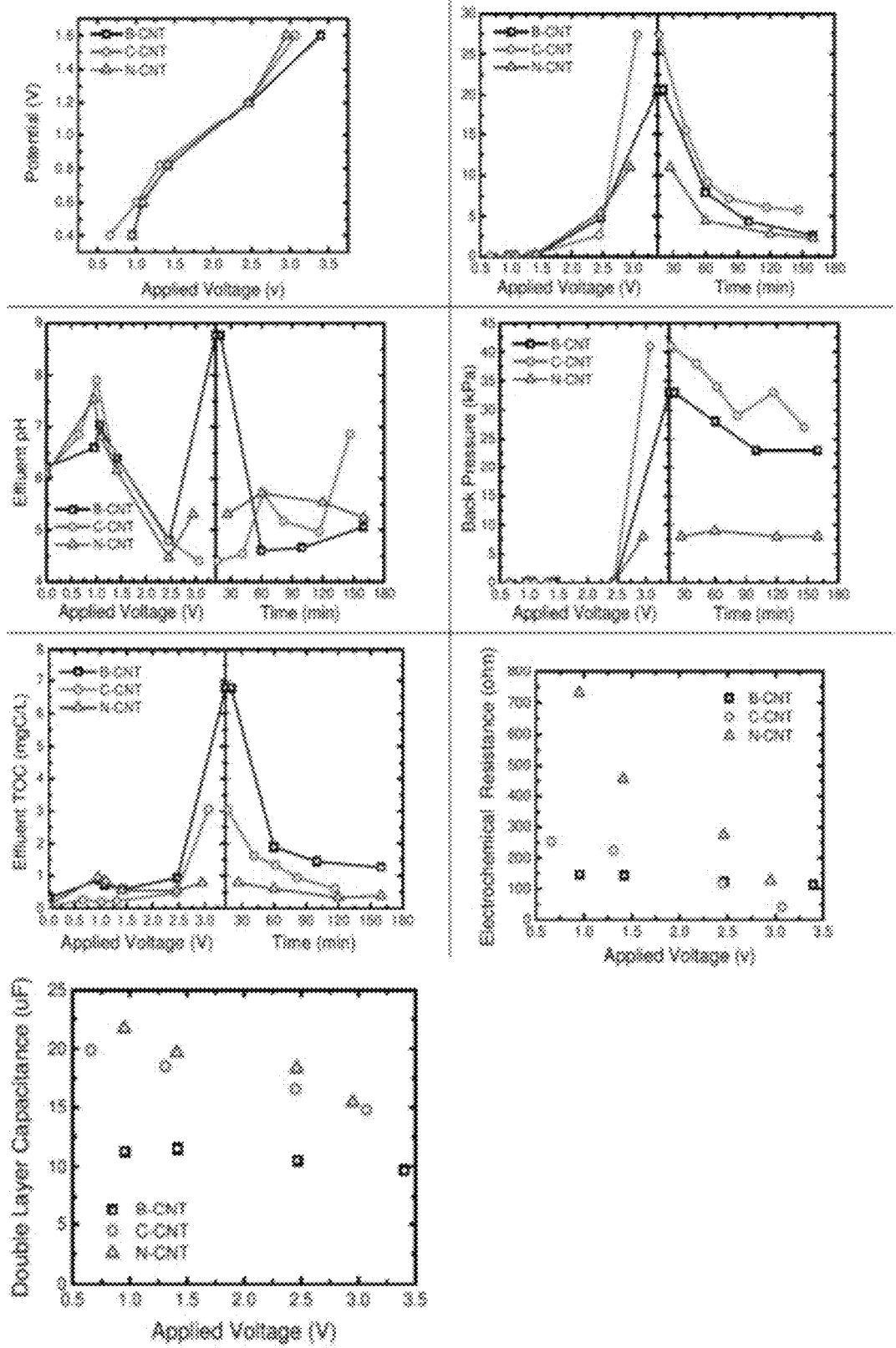
Figure 34B:
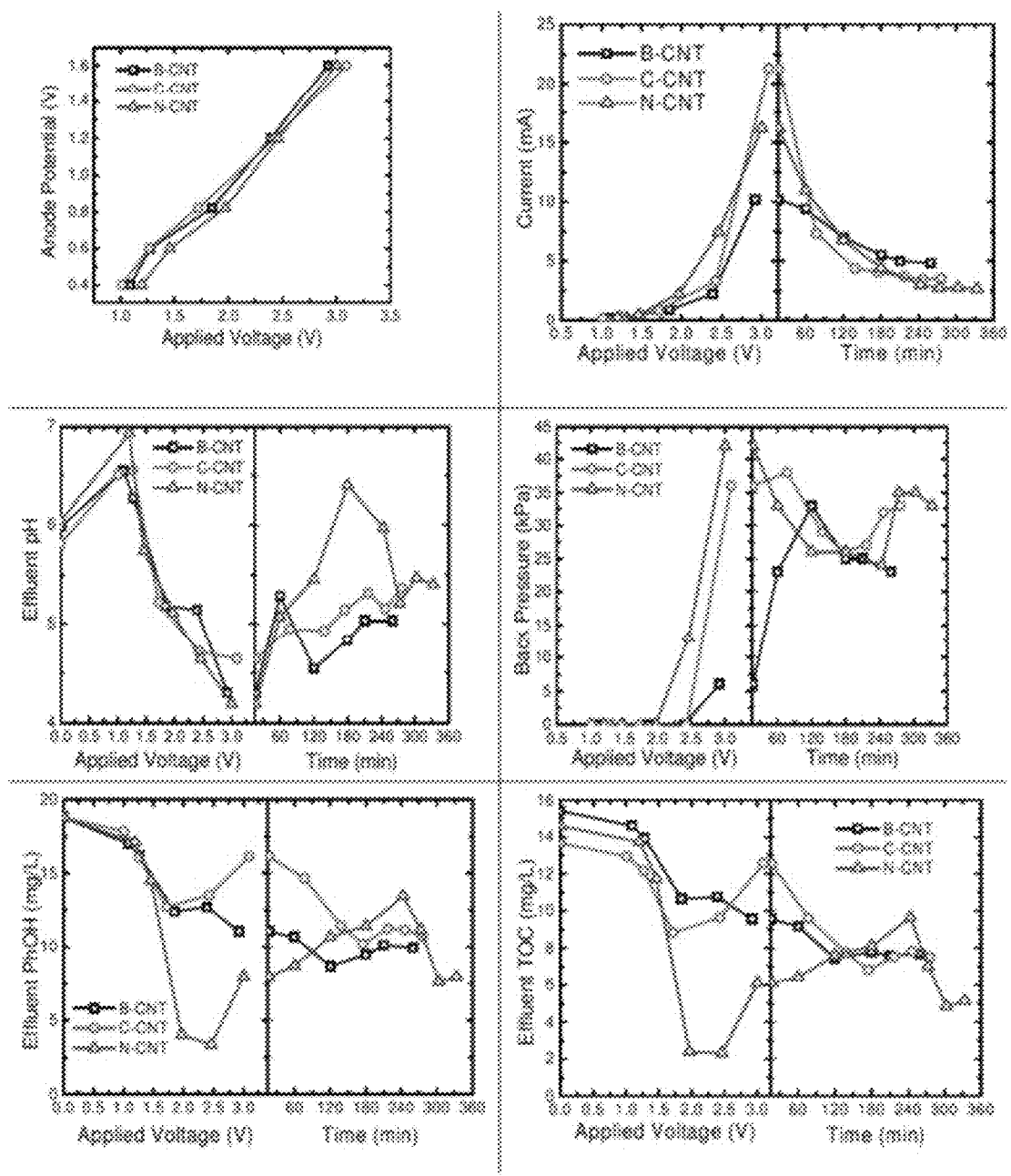
Figure 34B:
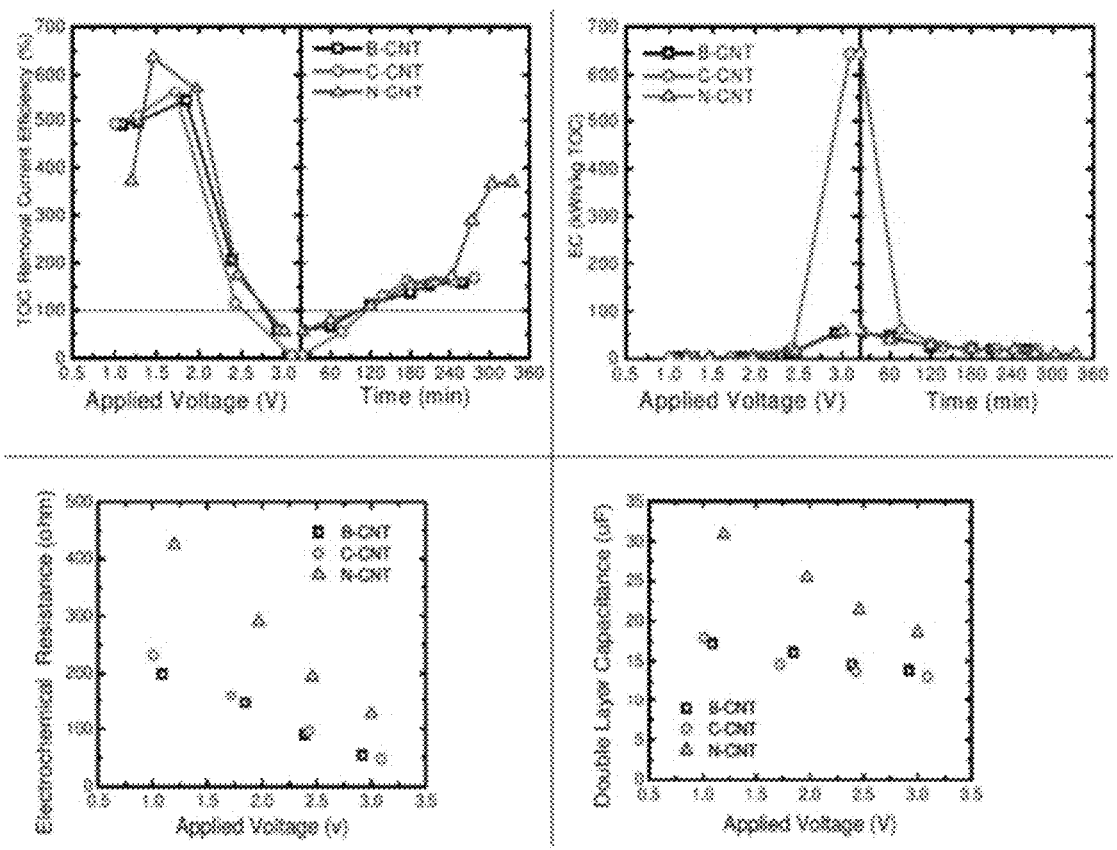
Figure 34C:
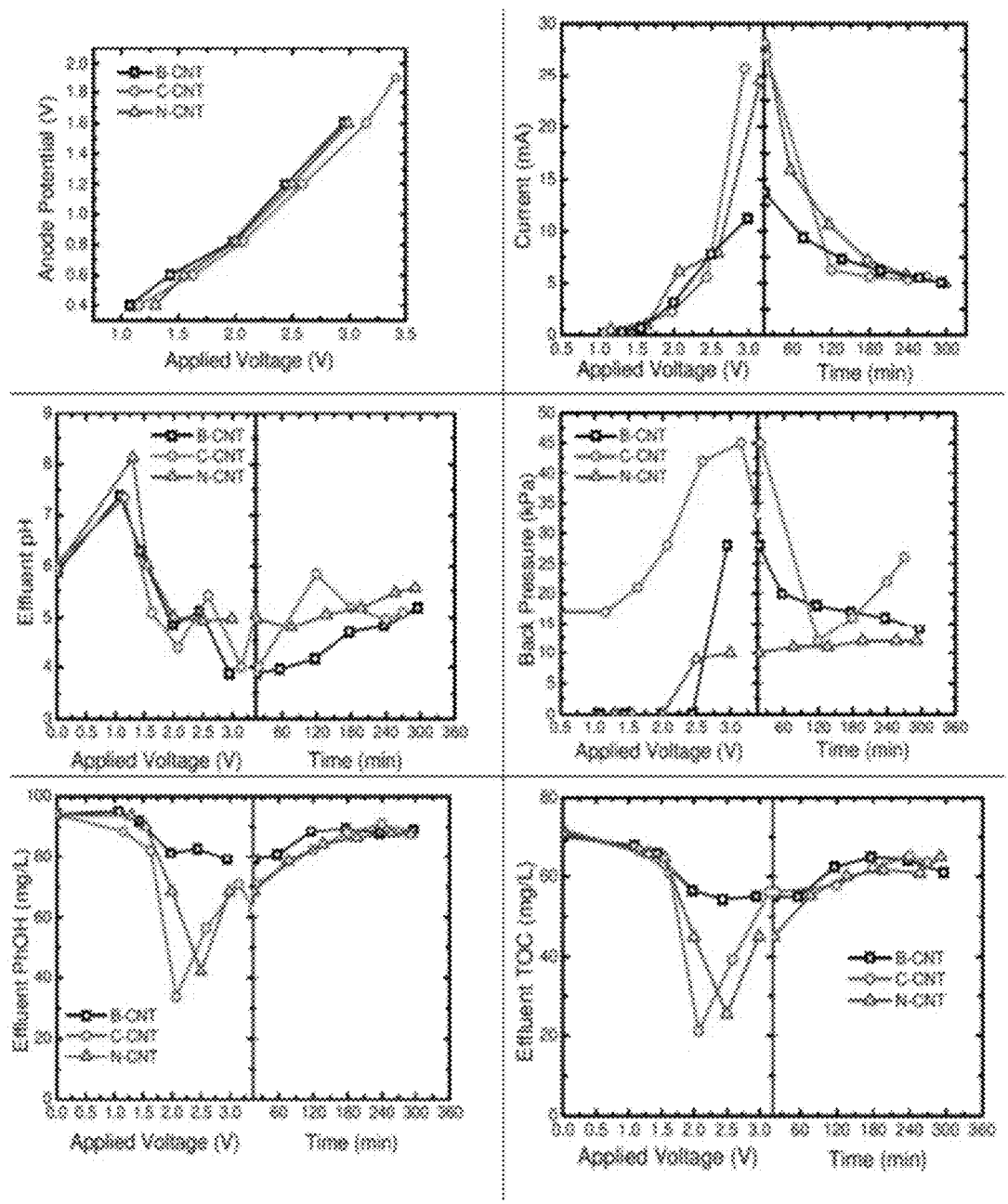
Figure 34C:
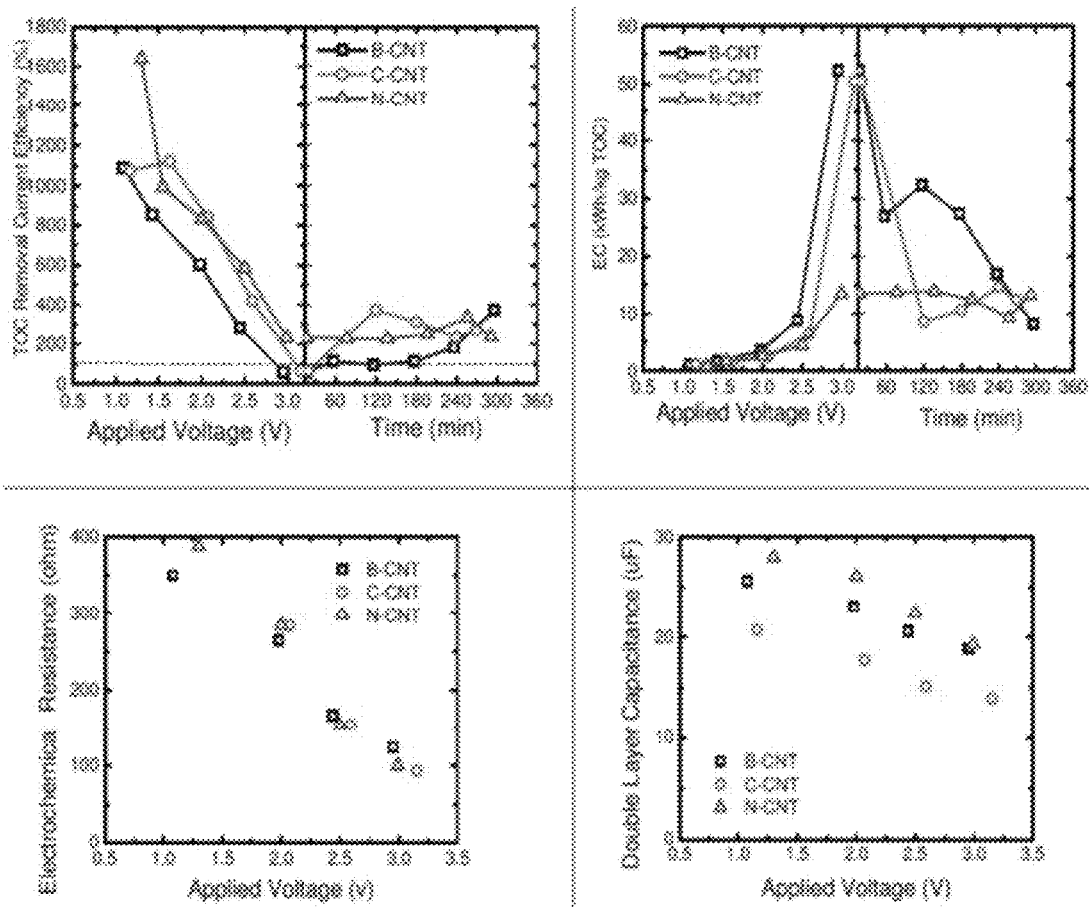

FIGS. 34A-34C show sets of data for electrochemical and effluent characteristics of different CNT networks (including C-CNT, B-CNT and N-CNT networks) during electrochemical filtration of various phenol concentrations as a function of applied voltage and time. FIG. 34A corresponds to electrochemical filtration of 0.0 mM phenol and 100 mM sodium sulfate as function of applied voltage and time. FIG. 34B corresponds to electrochemical filtration of 0.2 mM phenol and 100 mM sodium sulfate as function of applied voltage and time. FIG. 34C corresponds to electrochemical filtration of 1.0 mM phenol and 100 mM sodium sulfate as function of applied voltage and time.

FIGS. 35A-35C show plots of electrochemical filtration of phenol as a function of CNT doping, applied voltage, and time. In all indicated cases, the applied voltage was increased until the anode potential reached 1.6 V vs. SCE as described in the left half of the plots and then the electrolysis was continued for another 5 to 6 hours as described in the right hand of the plots. Electrochemical conditions were J=1.5 mL min$^{-1}$, [PhOH]=0.2 mM, and $[Na_2SO_4]$=100 mM for B-CNT (squares-solid line), C-CNT (circles-dashed line) and N-CNT (triangles-short dash line). FIG. 35A shows a plot of steady-state current in mA as a function of applied voltages and time for different doped CNT network. FIG. 35B shows a plot of effluent total organic carbon (TOC) in mgC/L as a function of applied voltages and time for different doped CNT network. FIG. 35C shows a plot of TOC removal current efficiency in % as a function of applied voltages and time for different doped CNT network.

Figure 36A:
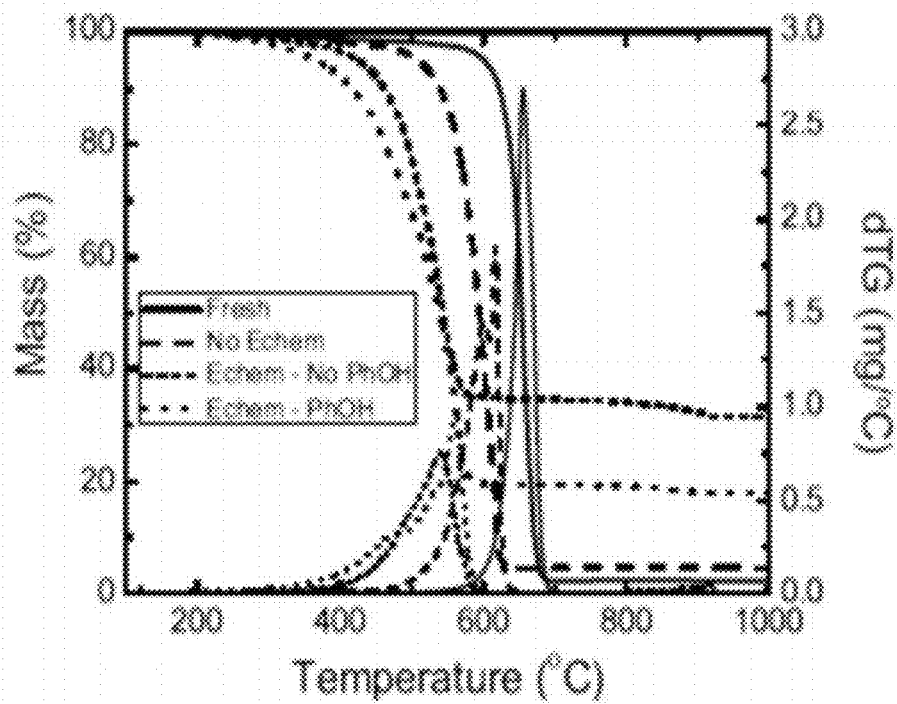
Figure 36B:
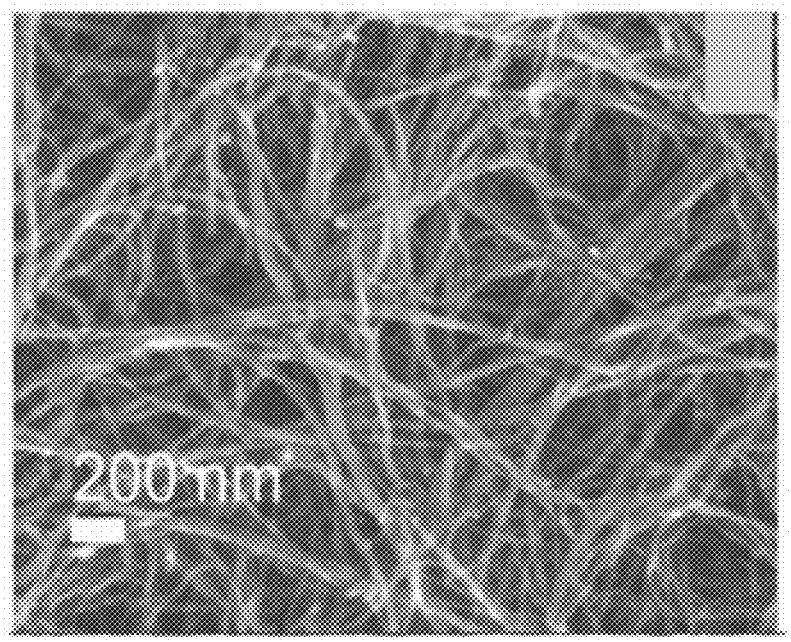
Figures 36C, 36D:
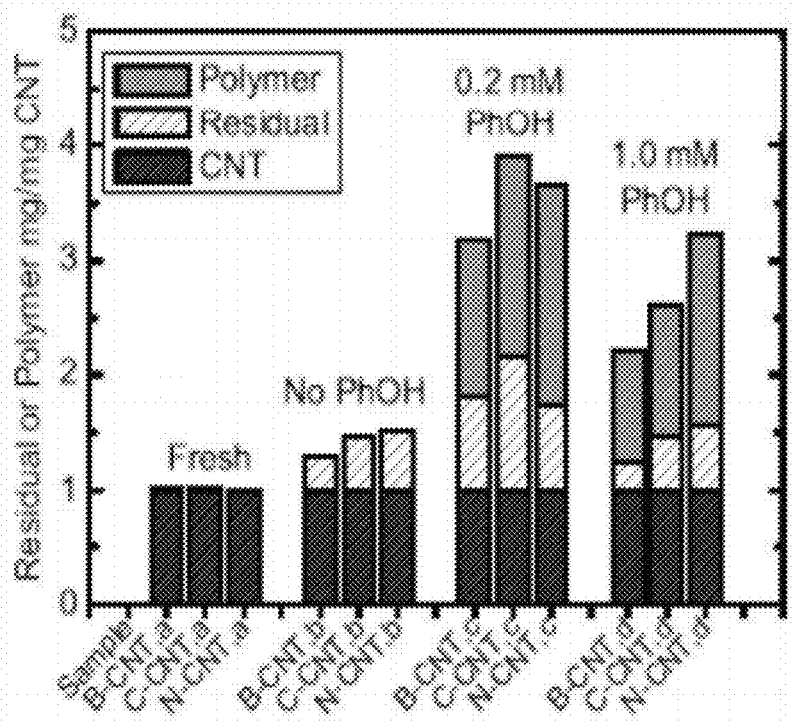
Figure 36E:
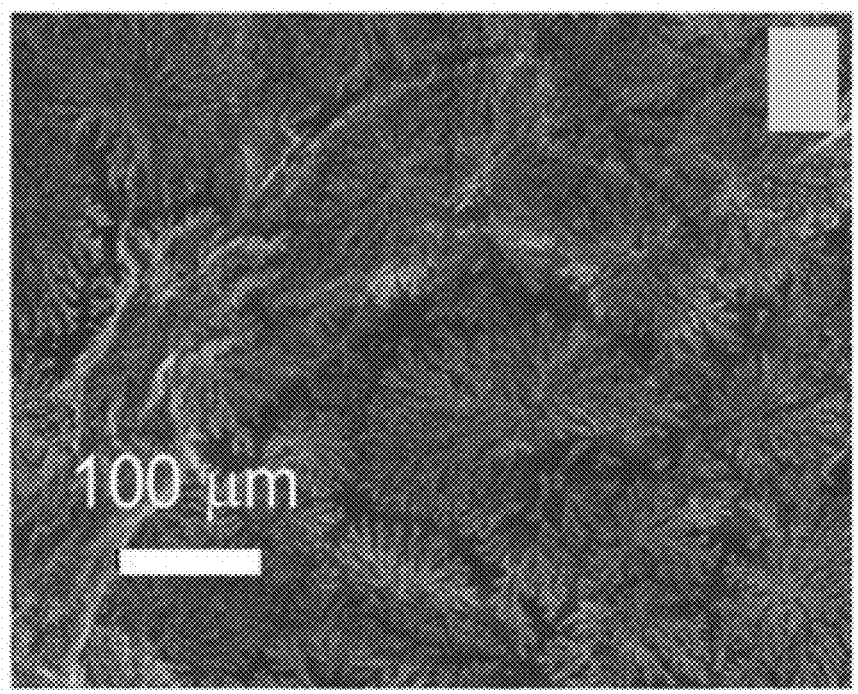
Figure 36F:
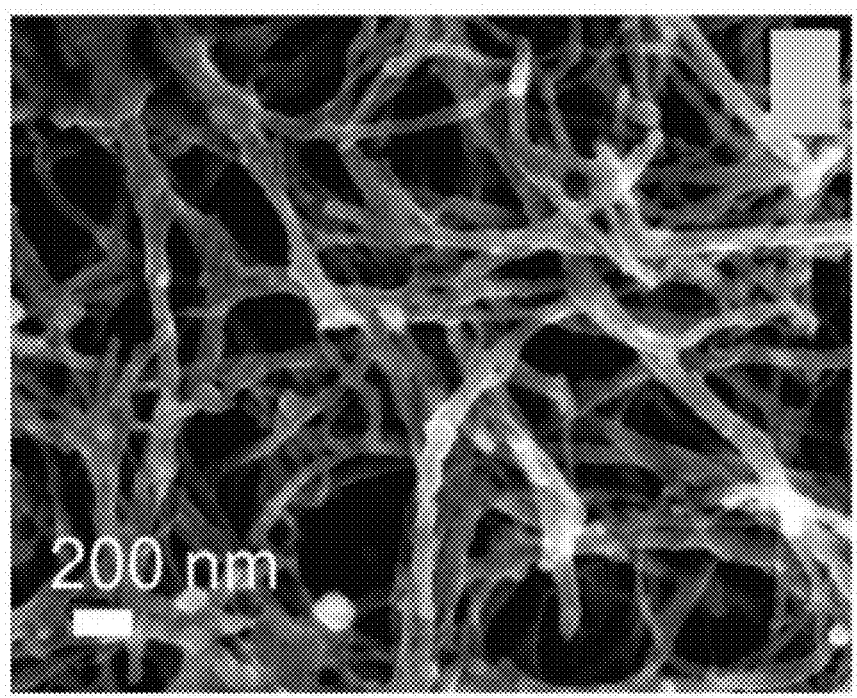

FIGS. 36A-36F show experimental data for electrochemical phenol polymerization and electrolyte precipitation. Electrochemical C-CNT filtration conditions were J=1.5 mL min$^{-1}$, $[Na_2SO_4]$=100 mM, t=5 h, and 3 V. FIG. 36A shows a plot of TGA mass percent and dTG (peaks) of a fresh C-CNT network (solid), C-CNT network after filtration of 1 mM phenol in the absence of potential (dashed), C-CNT network after electrochemical filtration (short dash), and C-CNT network after electrochemical filtration of 1 mM phenol (dot). FIG. 36B shows a SEM image of fresh C-CNT network. FIG. 36C shows a plot of percent CNT, residual, and polymer versus CNT network. FIG. 36D shows a SEM image of C-CNT network after electrochemical filtration of 1 mM phenol. FIG. 36E shows a SEM image of N-CNT network after electrochemical filtration of 1 mM phenol. FIG. 36F shows a SEM image of C-CNT network after electrochemical filtration of 1 mM phenol for 20 h.

Figure 37A:
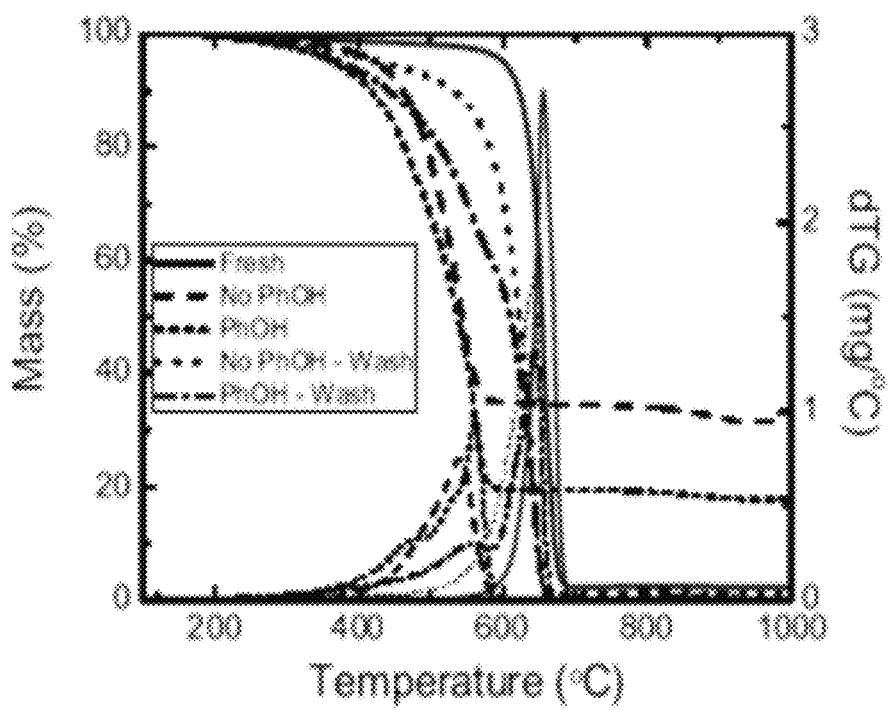
Figure 37B:
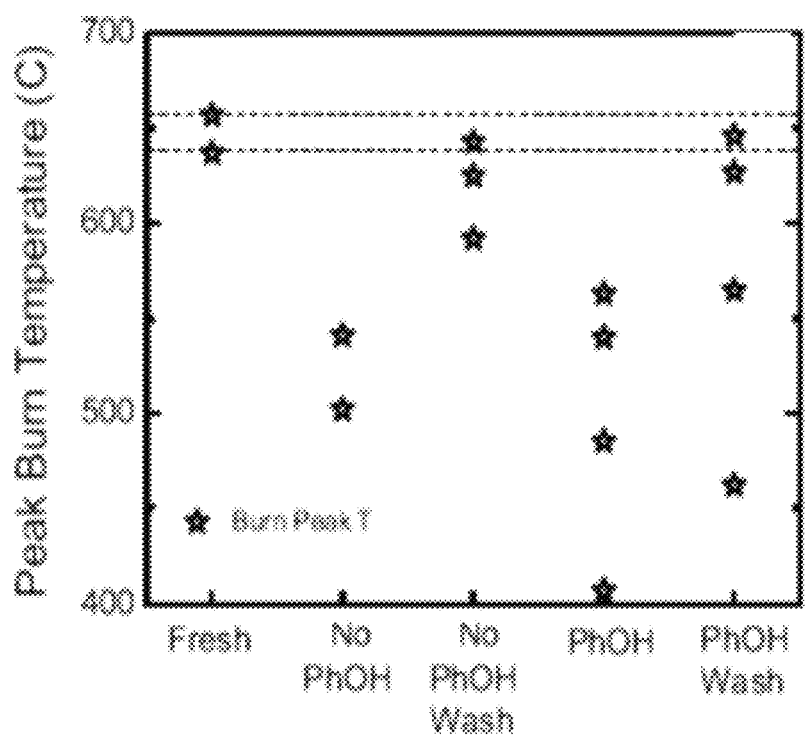
Figure 37C:
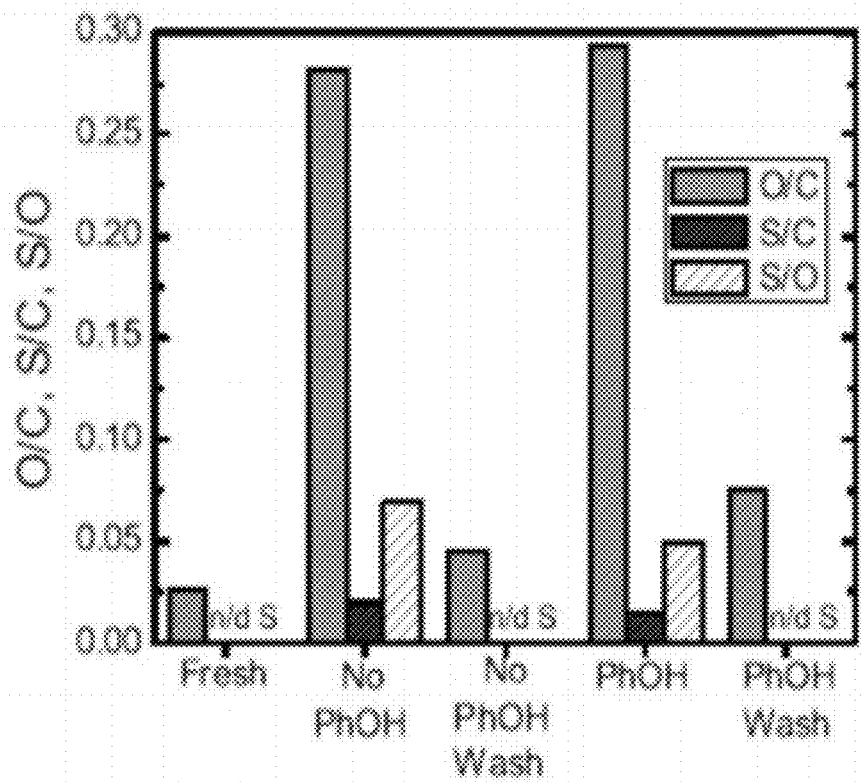
Figure 37D:
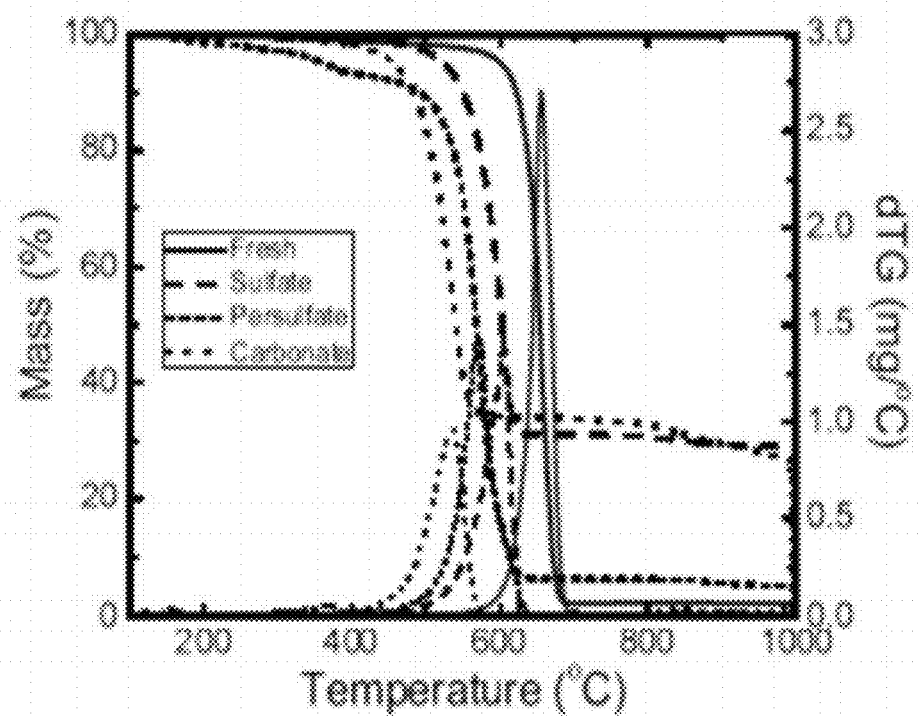

FIGS. 37A-37D show analysis results of CNT oxidation versus electrolyte precipitation. Electrochemical C-CNT filtration conditions were J=1.5 mL min$^{-1}$, [Na$_2$SO$_4$]=100 mM, t=5 h, and 3 V. FIG. 37A shows a C-CNT network thermogravimetric analysis of percent mass and dTG (peaks) versus temperature for fresh (1, solid), electrochemical filtration (3, dash), electrochemical filtration with 1 mM phenol (6, short dash), electrochemical filtration sample washed with acidic water-ethanol mixture (4, dot), and electrochemical filtration with 1 mM phenol sample washed with acidic water-ethanol mixture (7, dash dot). FIG. 37B shows burn peak temperature of samples from FIG. 37A. FIG. 37C shows O/C, S/C, and S/O ratios of samples from FIG. 37A determined by XPS. FIG. 37D shows a C-CNT network thermogravimetric analysis of percent mass and dTG (dash) versus temperature (solid) for fresh network (black) and networks mixed with 20% w/w of sodium sulfate (red), potassium persulfate (green), and sodium carbonate (blue).

Figure 38A:
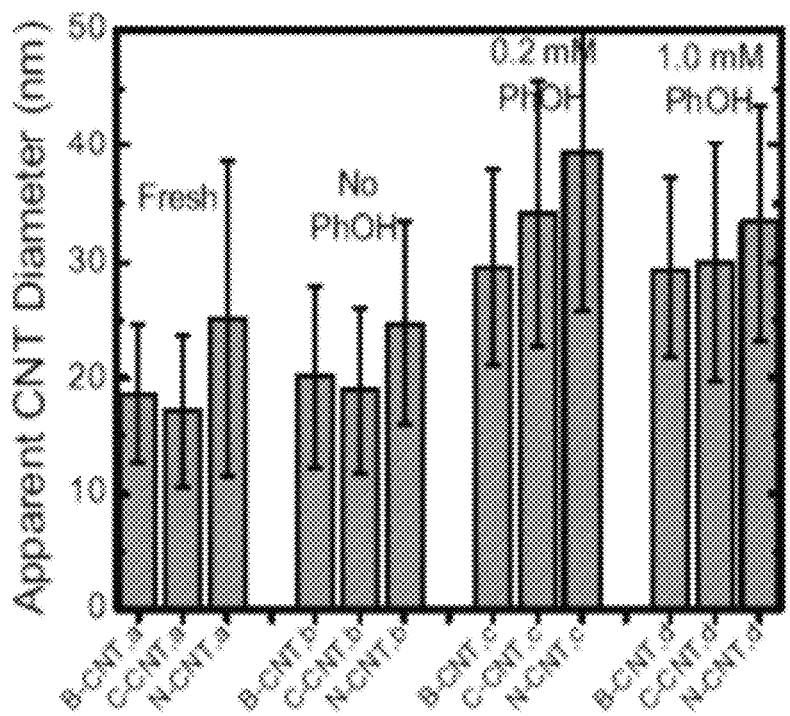
Figure 38B:
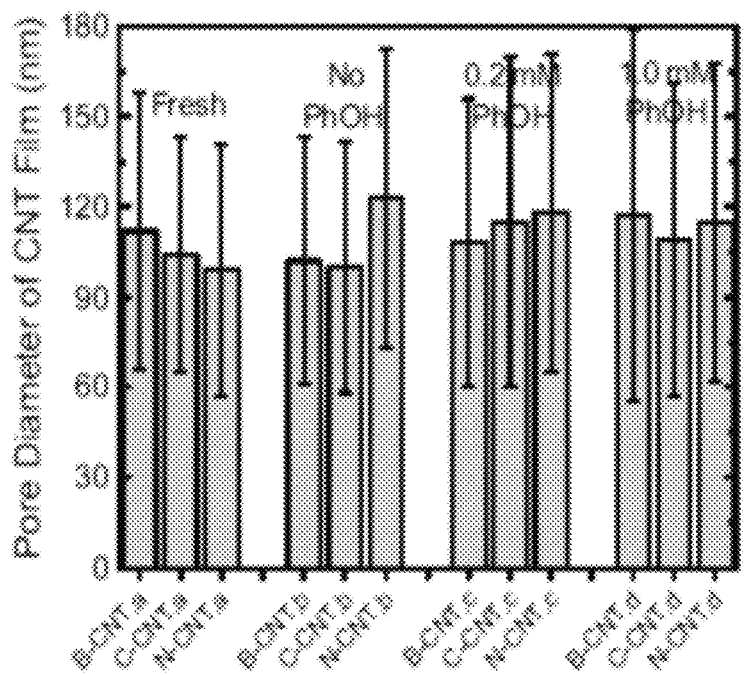
Figure 38C:
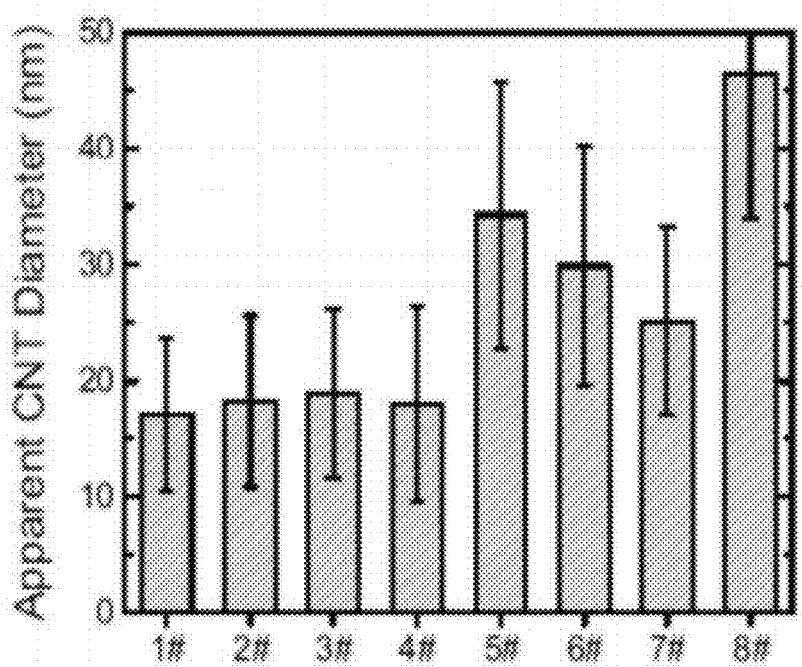

FIGS. 38A-38C show experimental data for electrochemical Polymer Growth. FIG. 38A shows a plot of CNT diameter (determined from SEM images) as a function of doping, electrochemistry, and phenol concentration. FIG. 38B shows a plot of CNT network pore diameter (determined from SEM images) as a function of doping, electrochemistry, and phenol concentration. FIG. 38C shows a plot of C-CNT diameter (determined from SEM images) as a function of electrochemistry, phenol concentration, network washing and electrolysis time.

Figure 39:
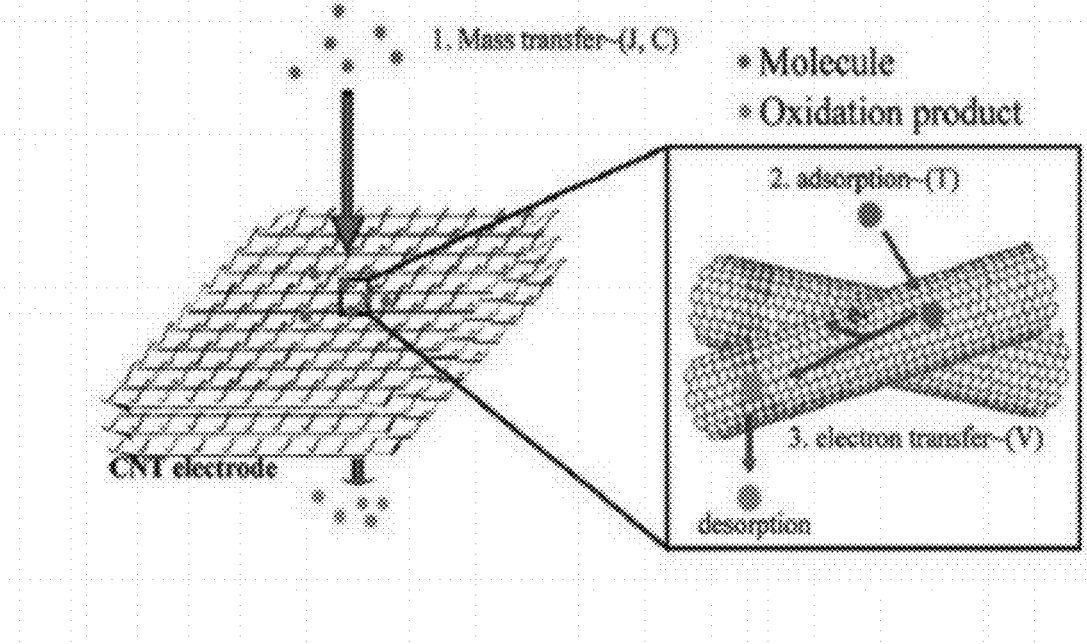

FIG. 39 shows a schematic diagram of an exemplary electrochemical filtration reactive transport mechanism. (1) Molecules are transported to electrode surface via convective and diffusive mass transfer as a function of flow rate, J, and concentration, C. (2) Molecules are adsorbed onto CNT surface as a function of temperature, T. (3) Molecules diffuse on the CNT surface to electrochemically active sites and electron transfer occurs as a function of anode potential, V.

Figure 40:
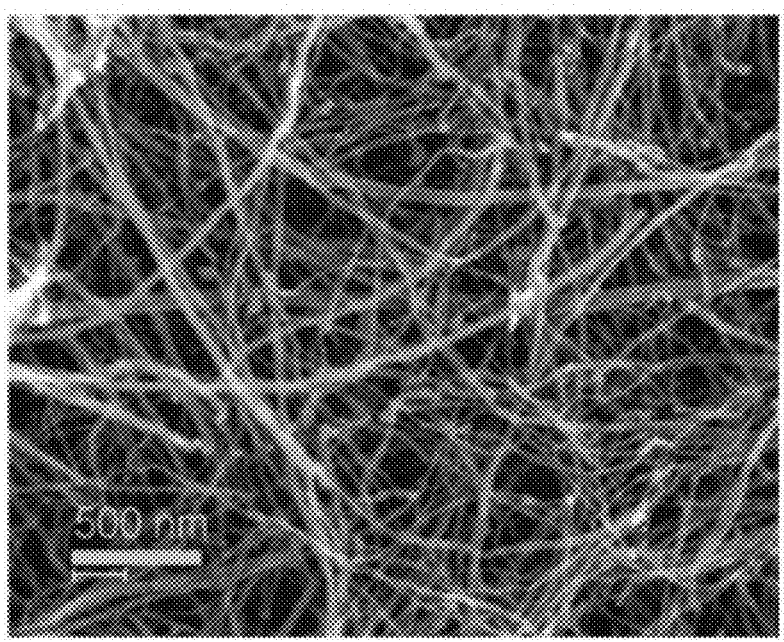

FIG. 40 is a SEM aerial image of one or more embodiments of the CNT network used for electrochemical filtration.

Figure 41:
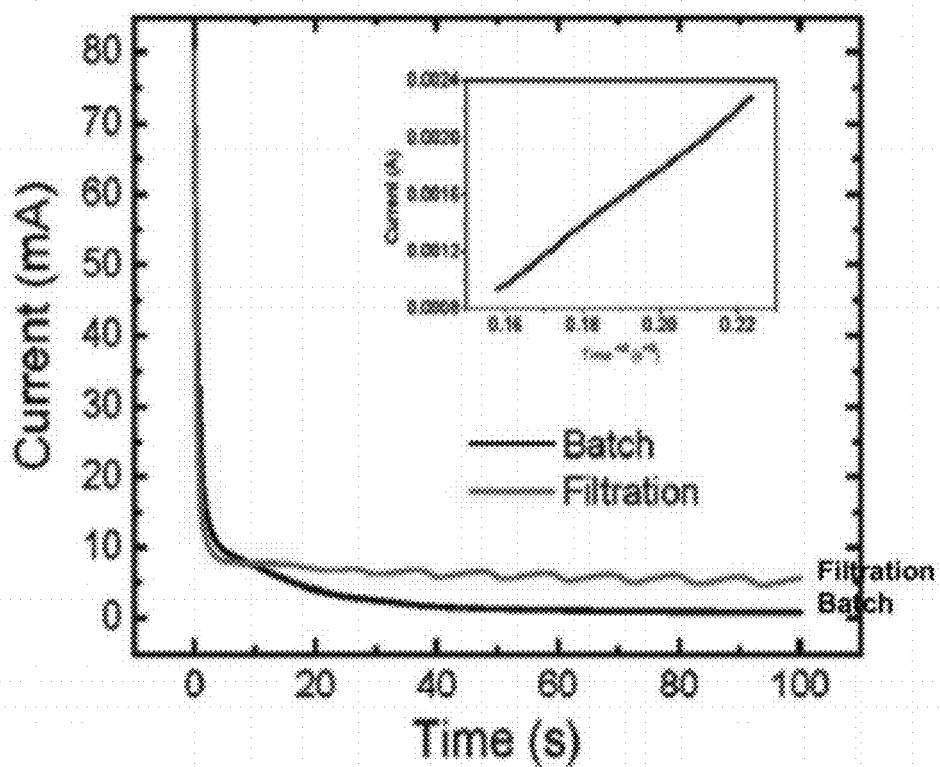

FIG. 41 shows data of chronoamperometry for the batch and filtration electrochemical systems. The conditions are [MO]$_{in}$=300 µM and [NaCl]=10 mM for both systems and J=1.5 mL min$^{-1}$ for the filtration system. The inset displays a linear plot of current versus time$^{-1/2}$ for the batch system.

Figure 42A:
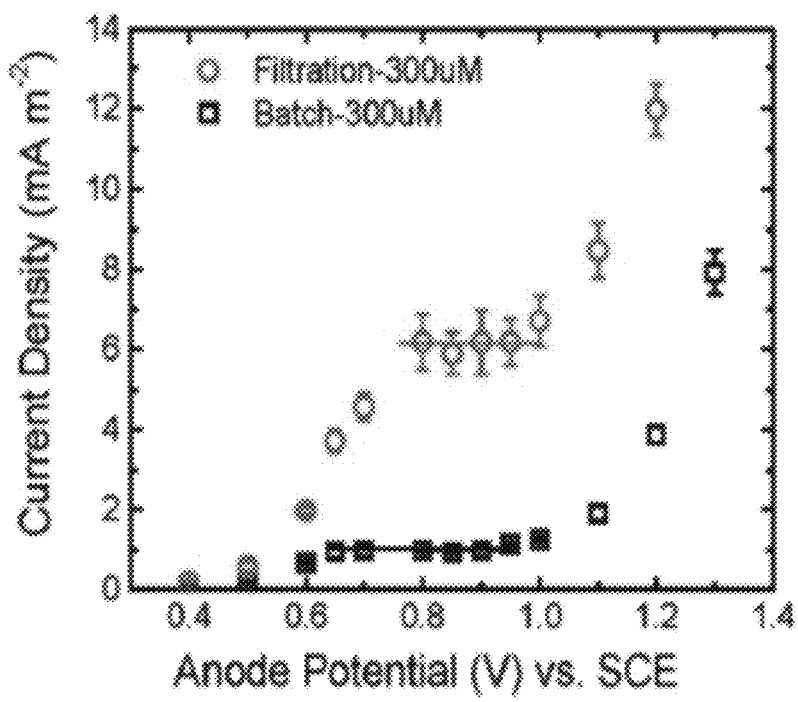
Figure 42B:
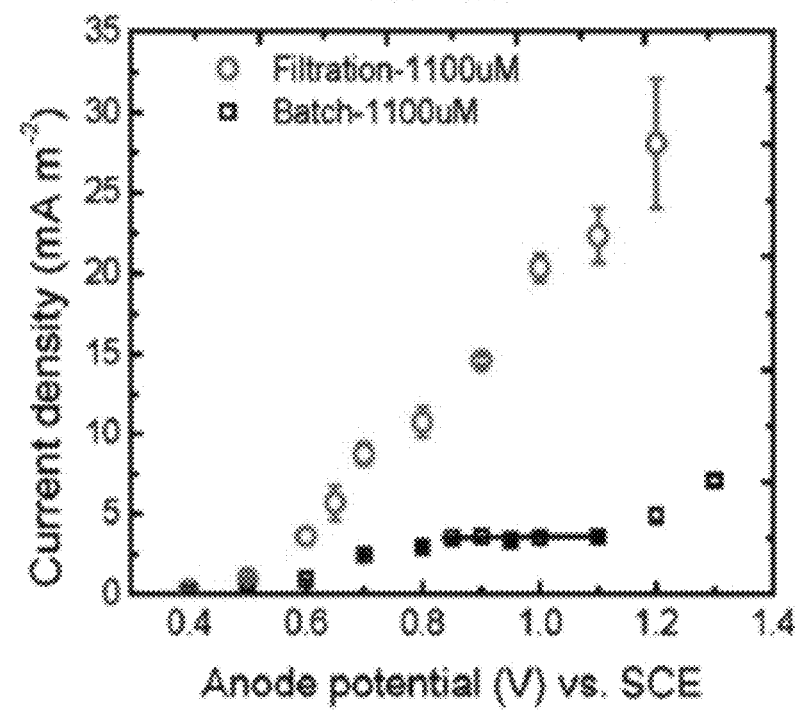

FIGS. 42A-42B show normal pulse voltammograms for the batch and filtration electrochemical systems. FIG. 42A corresponds to [MO]$_{in}$=300 µM and FIG. 42B corresponds to [MO]$_{in}$=1,100 µM. The experimental conditions are [NaCl]=10 mM and the flow rate was J=1.5 mL min$^{-1}$ for the filtration system. The mass transfer limited regime is marked with a horizontal line.

FIGS. 43A-43B show a diagrammatic scheme of representative diffusion layer concentration profile: (FIG. 43A) batch system and (FIG. 43B) filtration system.

Figure 44A:
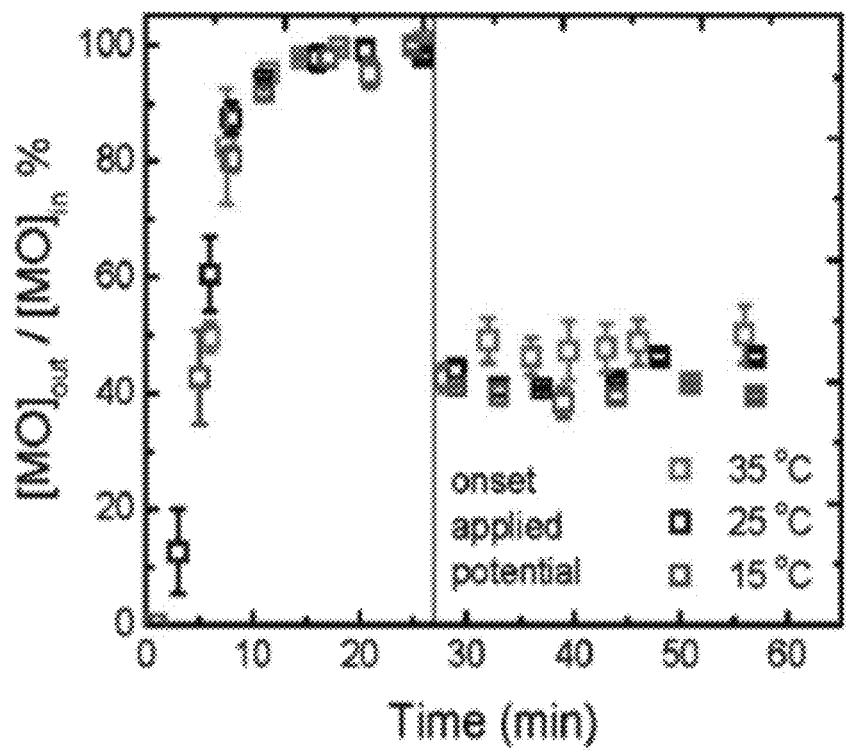
Figure 44B:
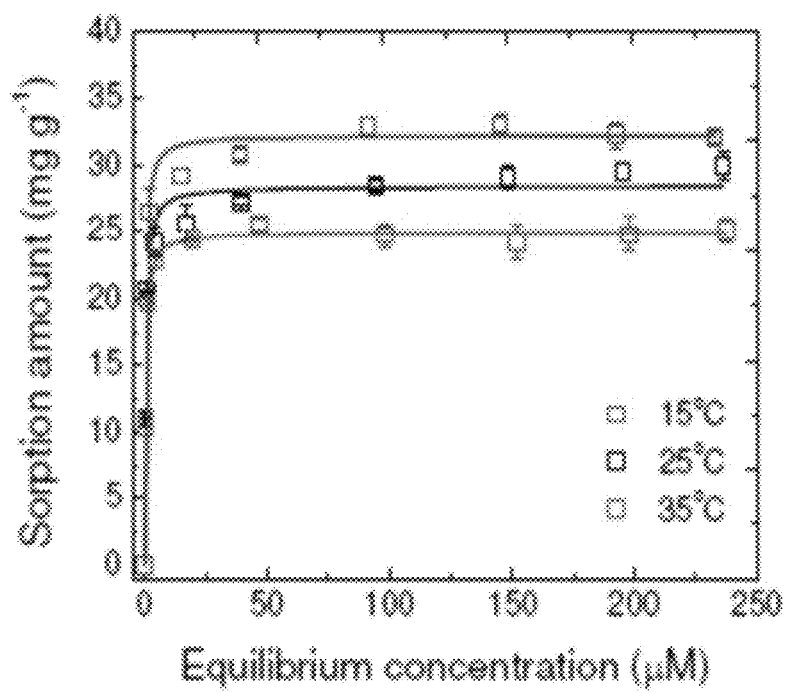

FIGS. 44A-44B show effects of temperature on electrochemical filtration oxidation kinetics. FIG. 44A shows effect of temperature on the extent of oxidation during electrochemical filtration where the applied voltage=2 V, J=1.5 mL min$^{-1}$, and [MO]$_{in}$=300 µM. FIG. 44B shows effect of temperature on MO dye adsorption to the CNTs. Adsorption used 0.015 g CNTs, V=100 mL, and allowed for 24 h to reach equilibrium. The points are experimental data and lines are fitted to the Langmuir isotherm.

Figure 45A:
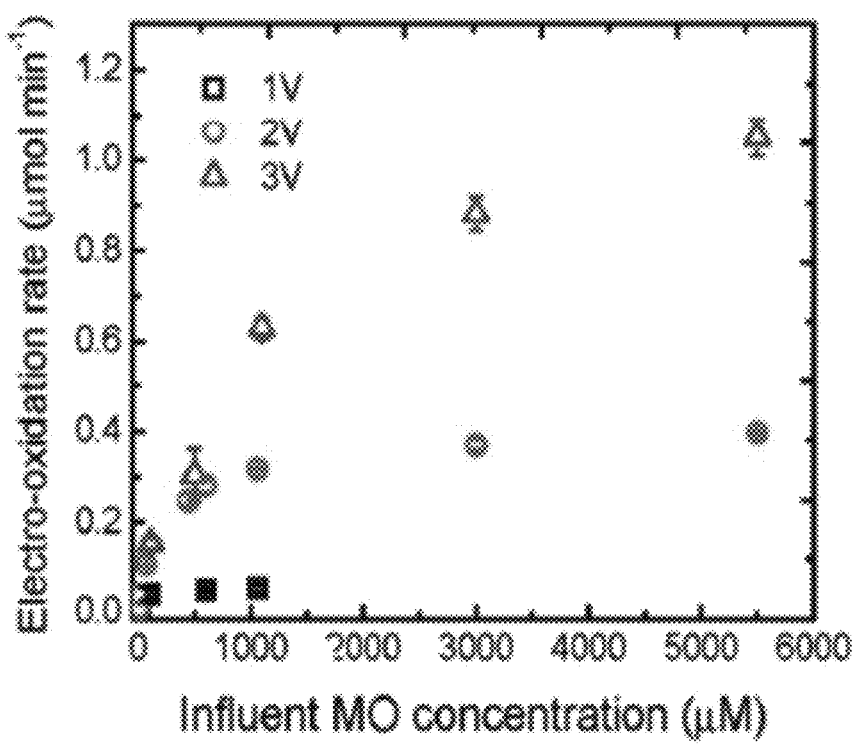
Figure 45B:
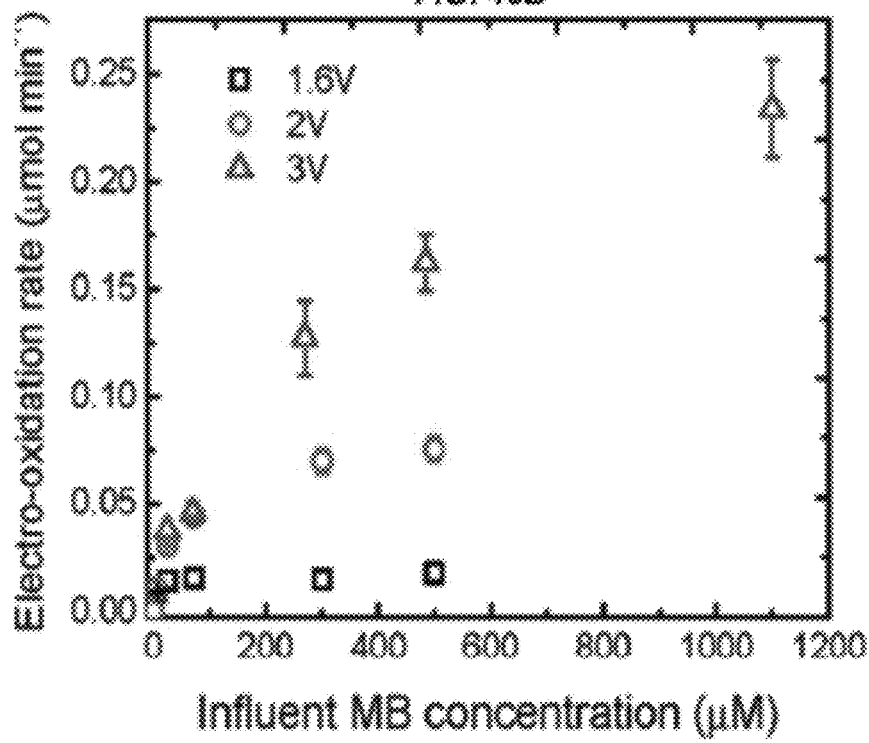

FIGS. 45A-45B show data for concentration dependent oxidation of methyl orange and methylene blue during electrochemical filtration. FIG. 45A corresponds to data for methyl orange and FIG. 45B corresponds to data for methylene blue. The conditions are [NaCl]=10 mM, T=25° C., and J=1.5 mL min$^{-1}$ for all experiments.

FIGS. 46A-46B show data for voltage-dependent oxidation during electrochemical filtration. FIGS. 46A and 46B corresponds to data for methyl orange and methylene blue, respectively. For all experiments, the conditions are [MO]$_{in}$=[MB]$_{in}$=7 µM, [NaCl]=10 mM, J=1.5 mL min$^{-1}$, and T=25° C. for all experiments.

Figure 47:
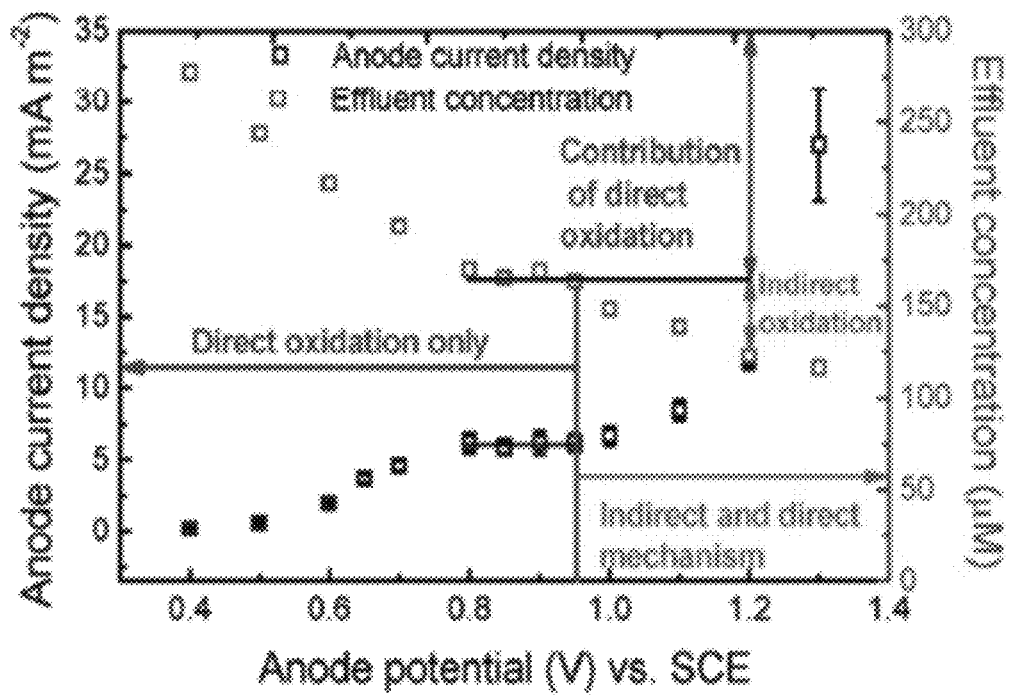

FIG. 47 shows effect of anode potential on MO oxidation and anodic current density during electrochemical filtration. Experimental conditions were [NaCl]=10 mM, J=1.5 mL min$^{-1}$, and [MO]$_{in}$=300 µM.

Figure 48:
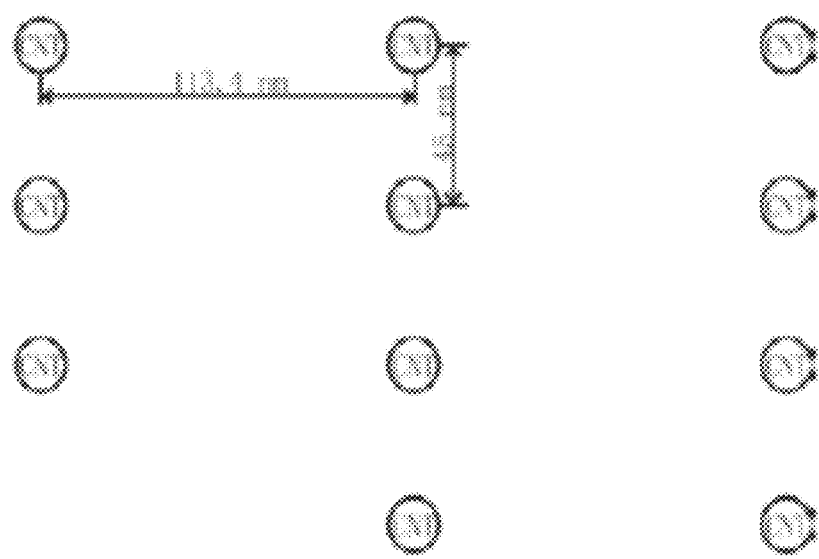

FIG. 48 shows a schematic, simplified diagram of a 2-D CNT filter structure used in numerical simulation: CNTs are modeled to be an array of cylinders aligned along the direction that is perpendicular to the flow.

Figure 49:
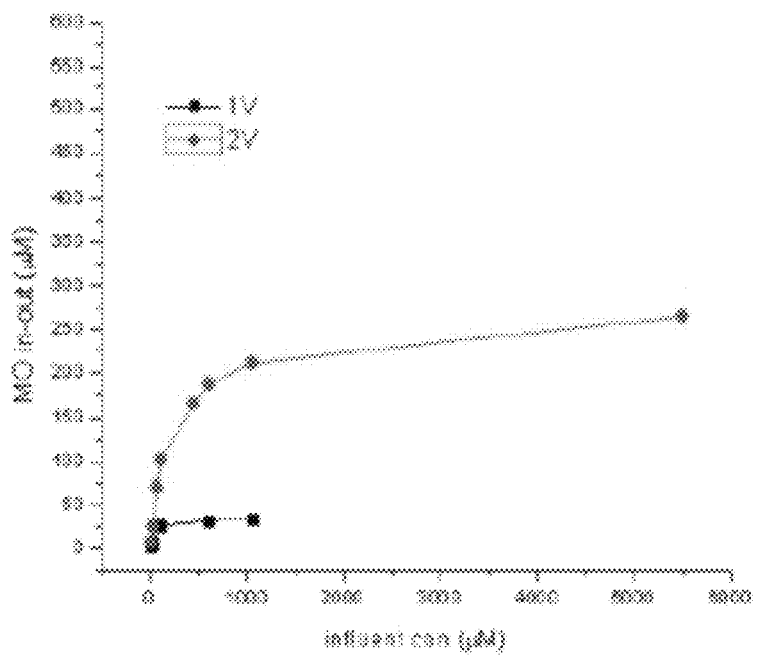

FIG. 49 shows dependence of methyl orange oxidation on influent concentration.

Figure 50:
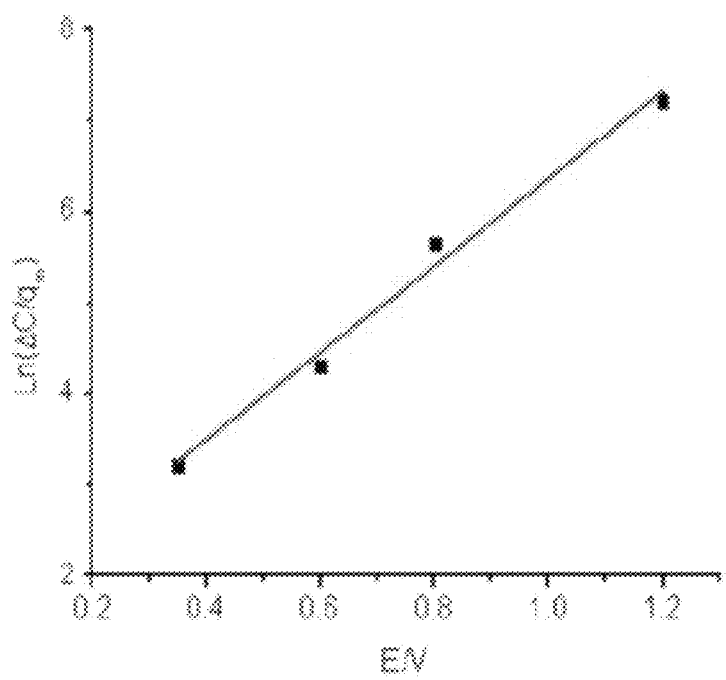

FIG. 50 shows linear fitting of Butler-Volmer kinetics. The dots are experimental data and the line is the linear fitting of the data to Butler-Volmer kinetics model.

Figure 51A:
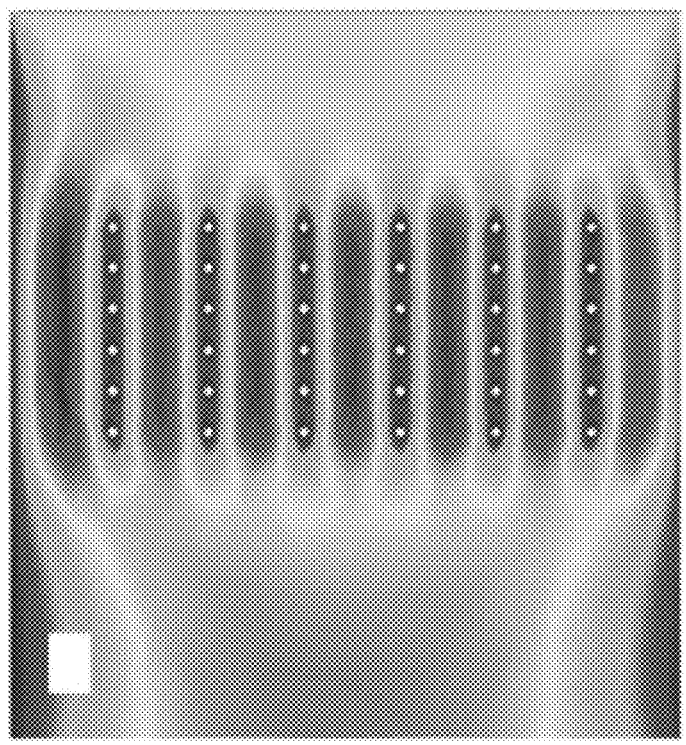
Figure 51B:
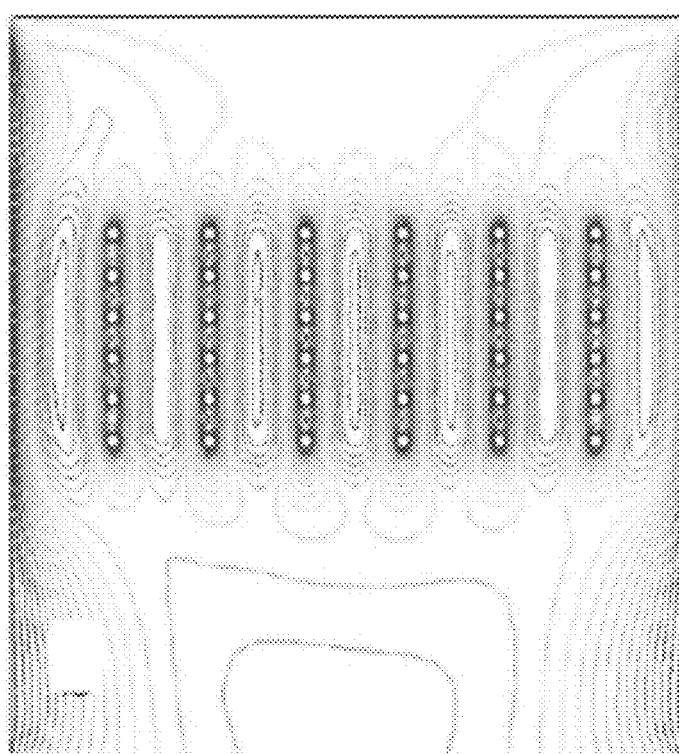

FIGS. 51A-51B show representations of velocity fields calculated based on the mathematical model. FIGS. 51A and 51B correspond to velocity surface and velocity contour, respectively.

Figure 52:
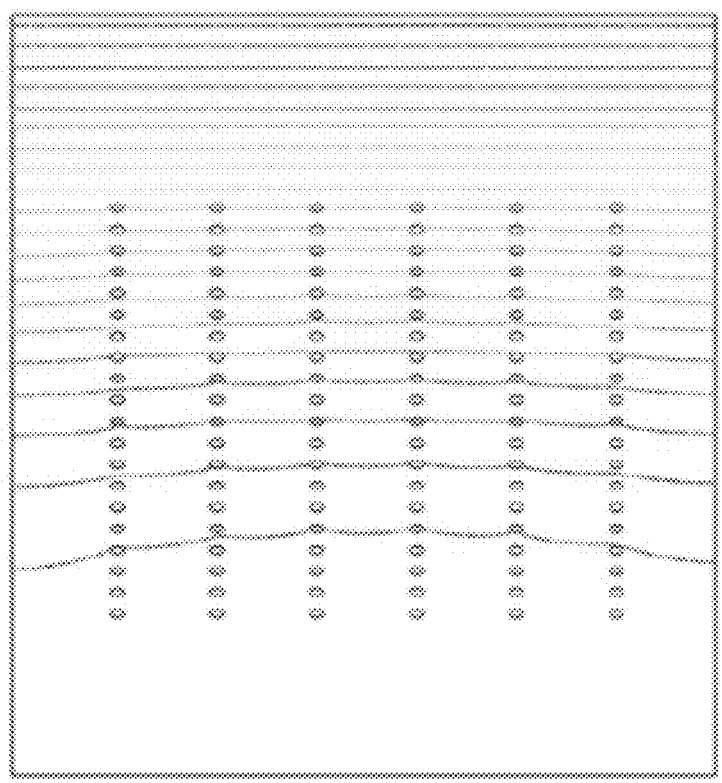

FIG. 52 shows a concentration contour map, where flow is introduced from the top surface of the CNT filter. The red lines denote highest concentration and blue lines denote lowest concentration.

Figure 53A:
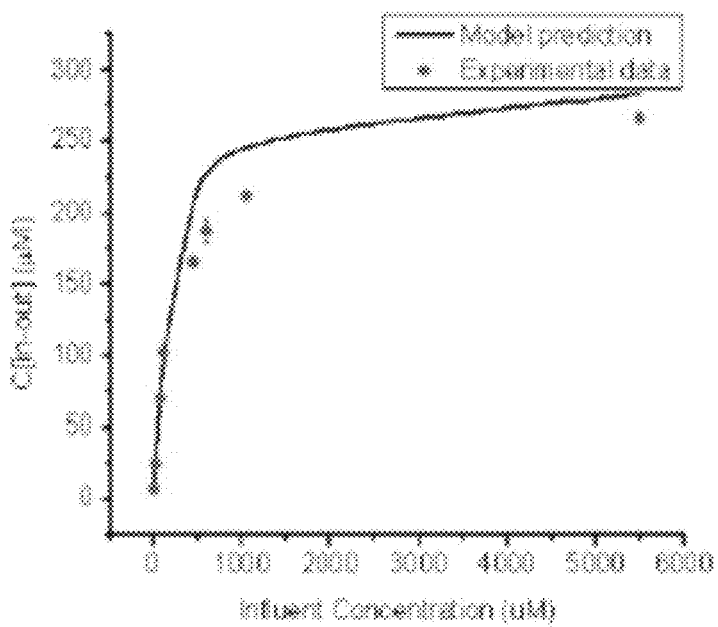
Figure 53B:
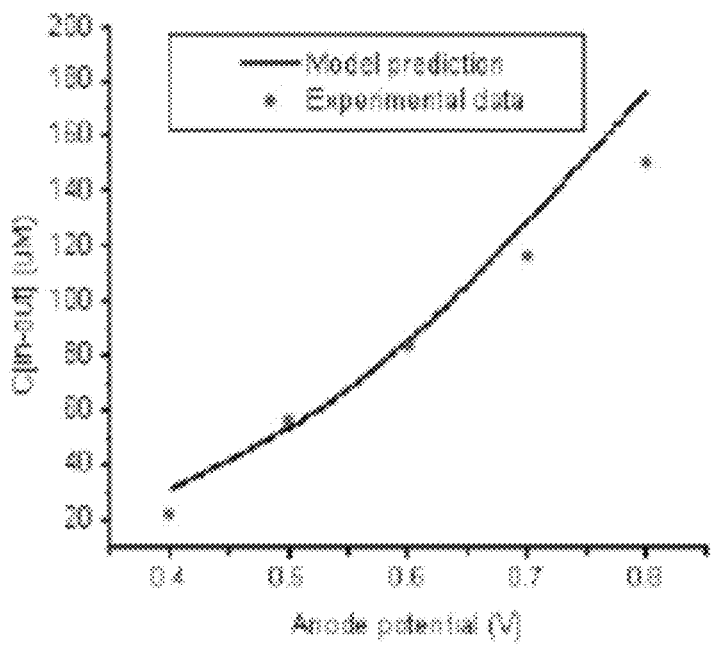

FIGS. 53A and 53B show comparison of kinetics model prediction values and experimental data for influent concentration-dependent experiment and potential-dependent experiment, respectively. In both figures, the flow rate is 1.5 mL/min. The anode potential is kept constant at 2V in FIG. 53A, whereas the influent concentration is kept constant at 300 µM.

Figure 54A:
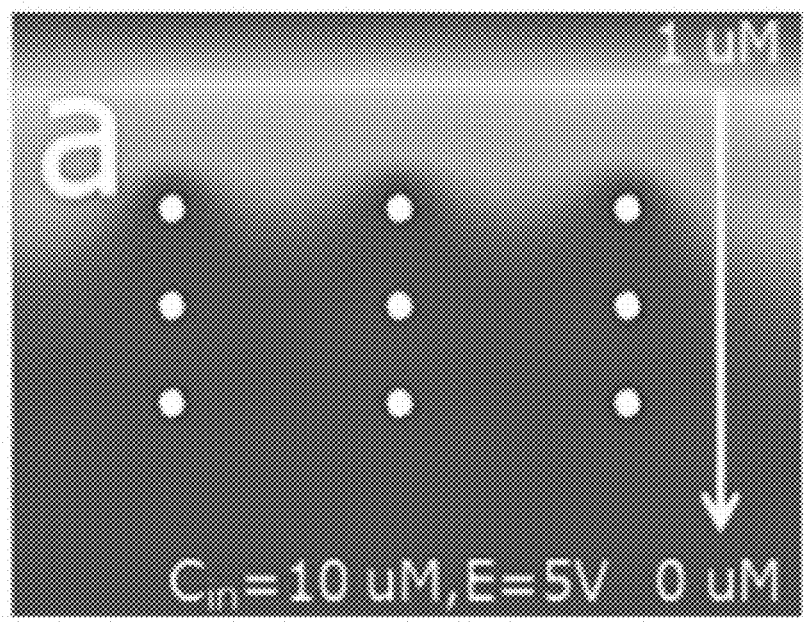
Figure 54B:
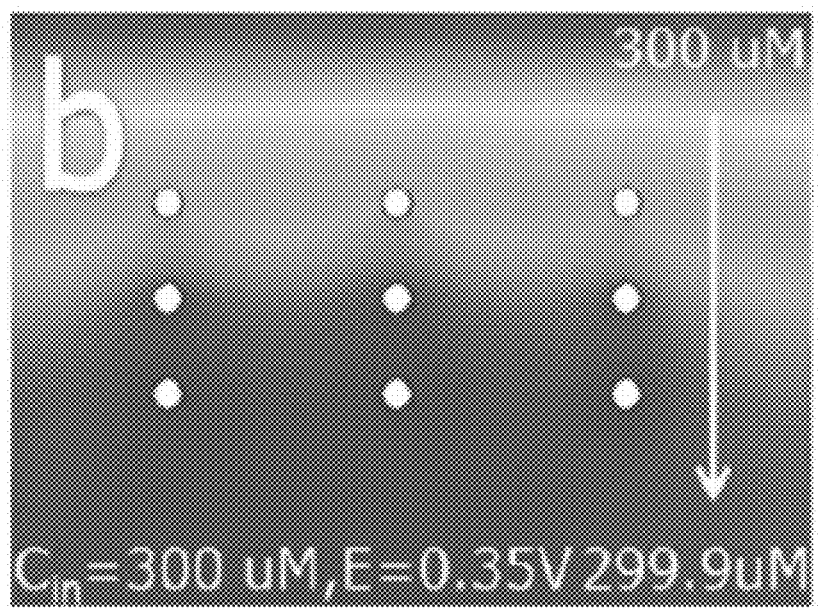

FIGS. 54A and 54B show concentration surface of CNTs based on numerical simulation under mass transfer limitation and oxidation kinetics limitation, respectively.

Figure 55A:
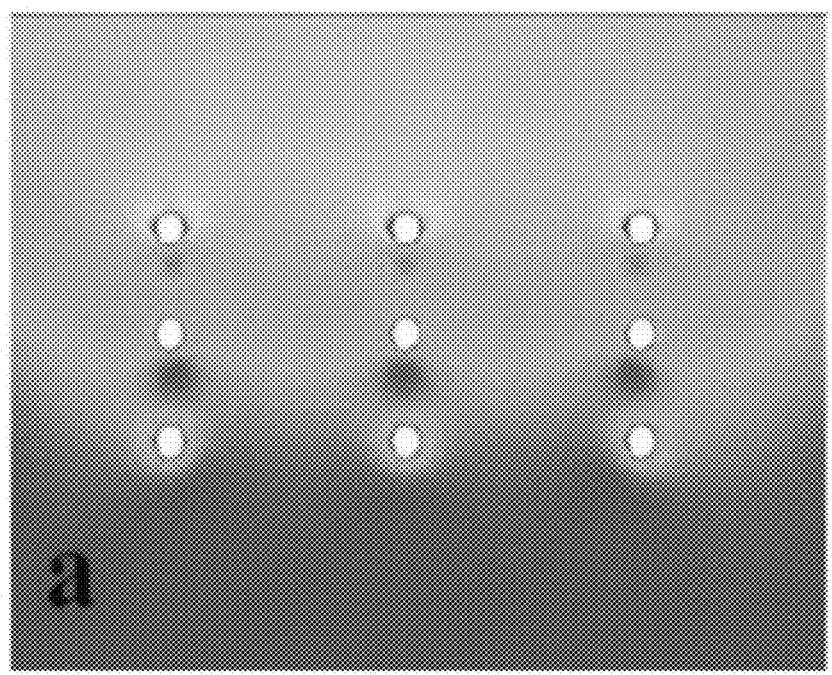
Figure 55B:
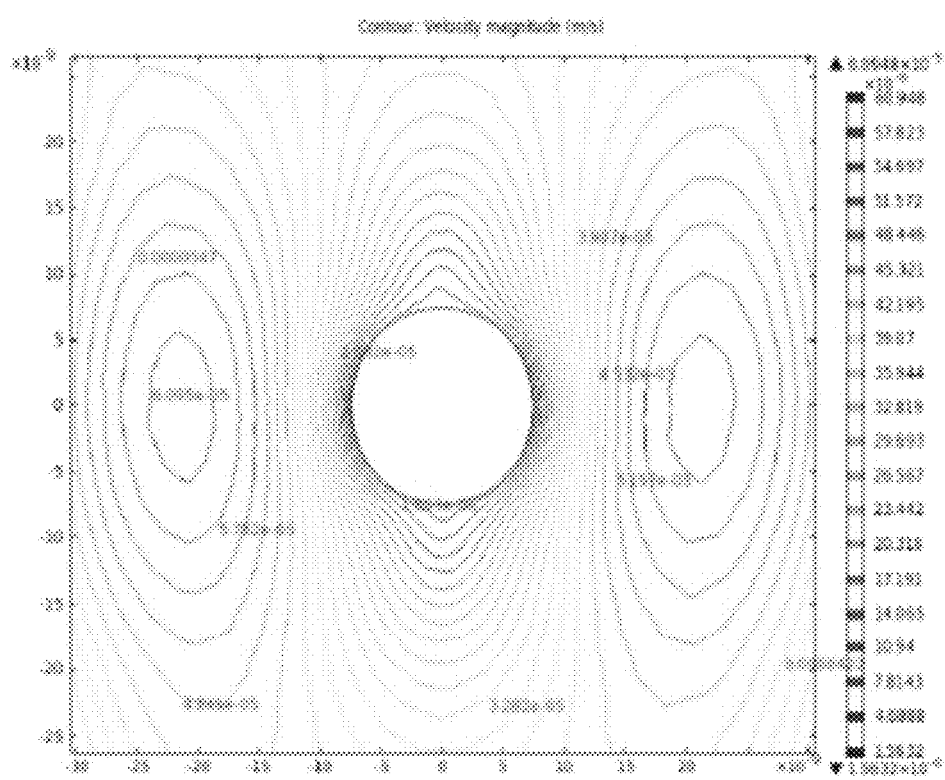
Figure 55C:
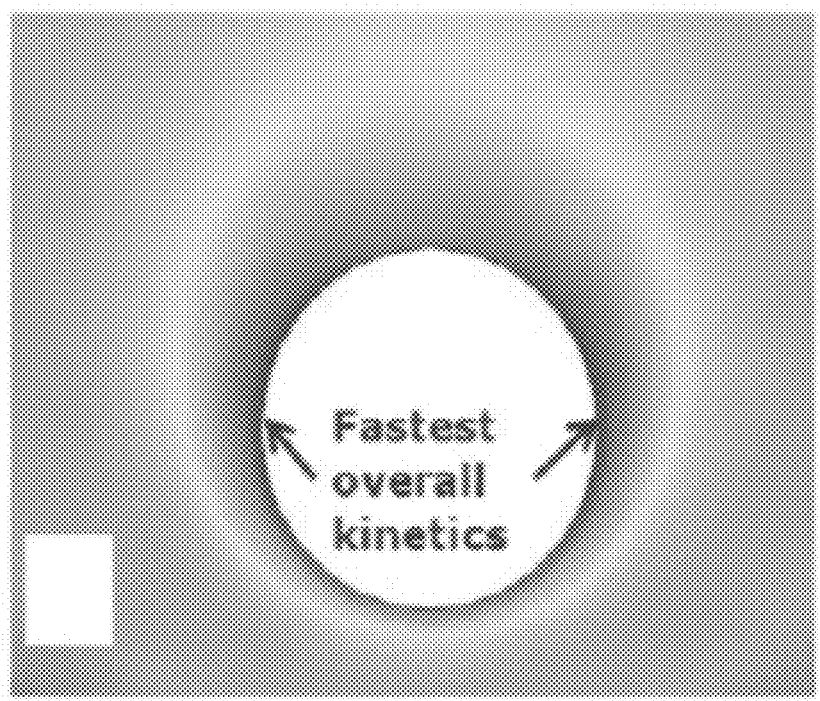

FIGS. 55A-55E show simulated results of an array of CNT anodes and a single CNT anode. In these simulations, a flow of 35.4 um s$^{-1}$ is introduced from the top surface of the CNT anode array, and the influent concentration is 1 uM at an anode potential of 0.8 V. FIG. 55A shows simulated flux magnitude for a 3 by 3 array of CNT anodes. FIG. 55B shows simulated velocity contour of one cylinder CNT anode. FIG. 55C shows simulated flux magnitude of one cylinder CNT anode. FIG. 55D shows a set of simulated concentration surface and contour maps of one cylinder CNT anode. FIG. 55E shows simulated reaction rates along the perimeter of one cylinder CNT anode.

Figure 56A:
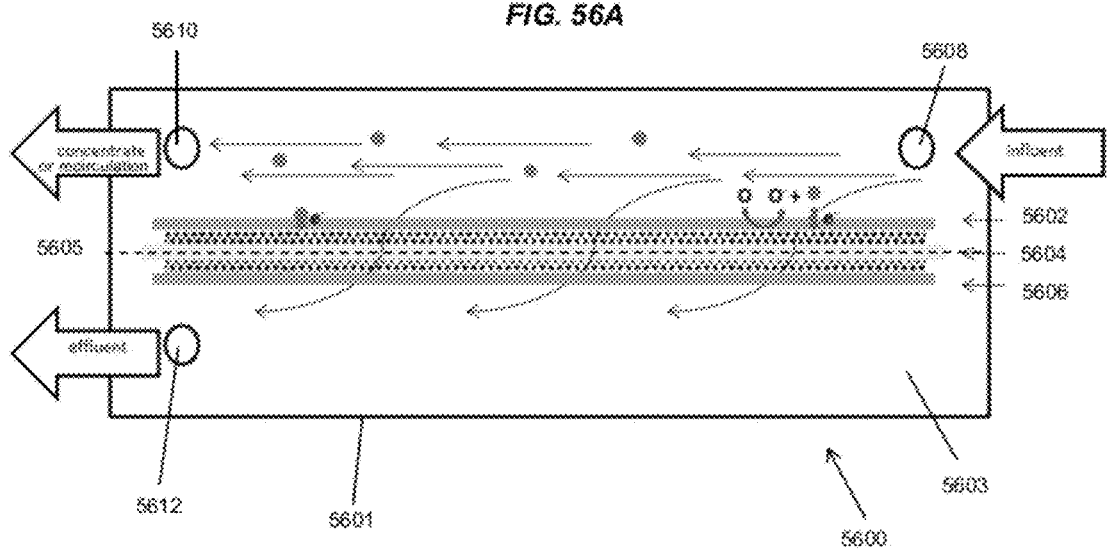
Figure 56B:
Figure 56C:
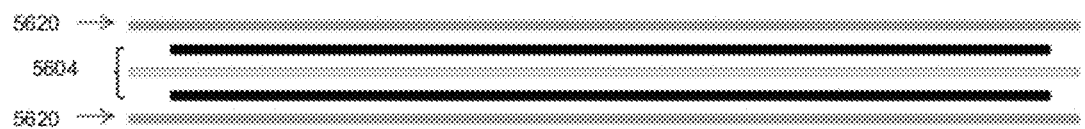

FIGS. 56A-56C show schematic diagrams of an exemplary electrochemical cross-flow filter device and components thereof. FIG. 56A is a schematic cross-sectional diagram of an exemplary CNT electrochemical cross-flow device 5600 having a CNT-polymer-CNT hybrid membrane filter 5604 in contact between an anodic Ti connector 5602 and a cathodic Ti connector 5606. An aqueous fluid is introduced from an inlet 5608 to flow in parallel to a surface of the hybrid membrane 5604, wherein a portion of the aqueous fluid flows across the hybrid membrane filter 5604, whereby separating at least one contaminant from the aqueous fluid and/or inactivating at least one contaminant in the aqueous fluid. The portion of the aqueous fluid crossing the hybrid membrane filter 5604 exits through a second outlet 5612, while a portion of the aqueous fluid exits through a first inlet 5610. FIG. 56B is a schematic cross-sectional diagram of an exemplary hybrid membrane filter used in a cross-flow device described herein. The hybrid membrane filter 5604 comprises a porous, insulating polymeric membrane 5614 disposed between an anodic carbon nanotube membrane 5616 and a cathodic carbon nanotube membrane 5618. FIG. 56C is a schematic cross-sectional diagram of an exemplary membrane pressing configuration.

Figure 57A:
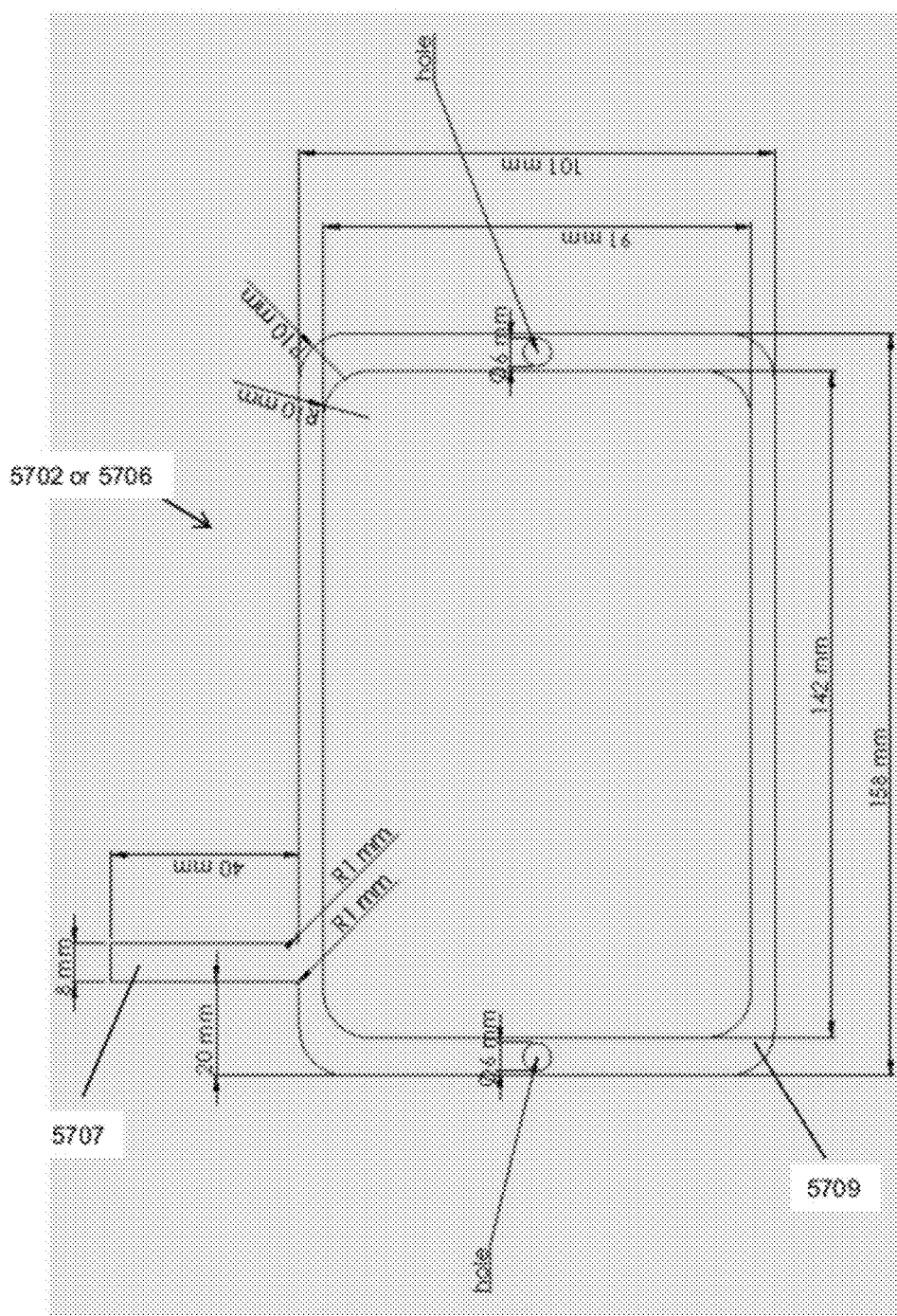
Figure 57B:
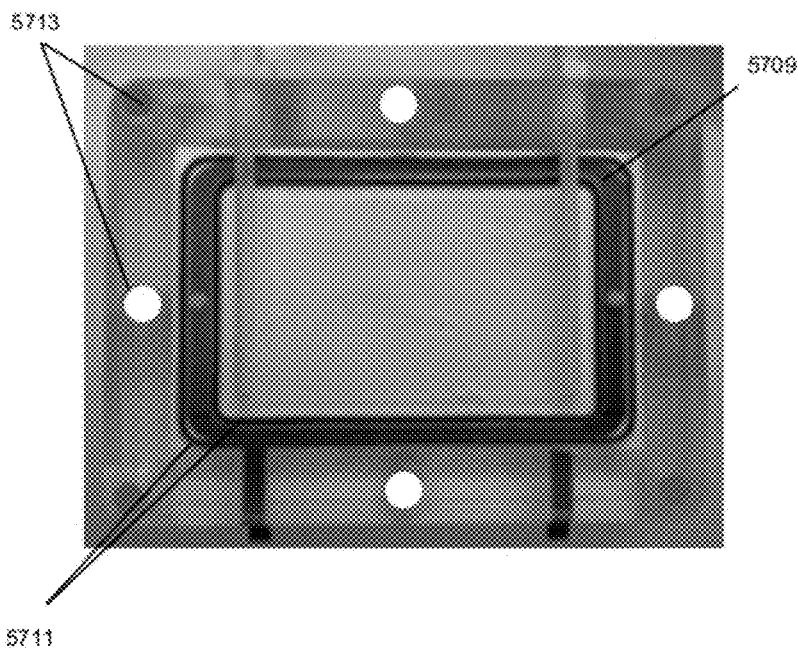
Figure 57C:
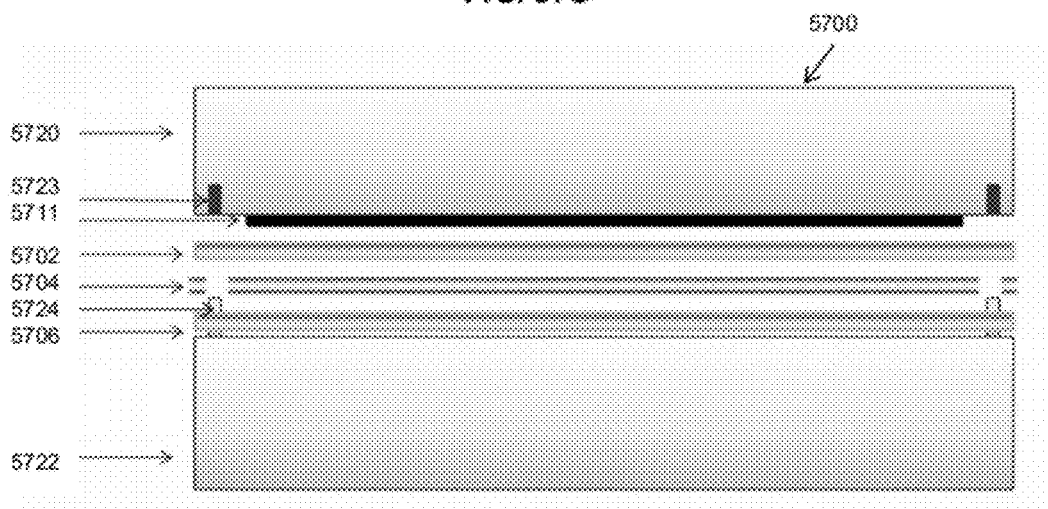

FIGS. 57A-57C shows exemplary modifications of a simple non-electrochemical cross-flow device to incorporate electrochemistry. FIG. 57A is a SolidWorks drawing of an exemplary electrode designed for incorporation into a cross-flow filter device. FIG. 57B is an image showing bolts used to fasten the cross-flow device to prevent leakage during operation. White circles signify the new bolts added to secure a larger cross-flow device for leakage prevention, while the grey circles signify the bolts in an original design. This figure also indicates an exemplary position of electrodes relative to O-rings and the membrane. FIG. 57C is a schematic diagram showing the side-view of an exemplary electrochemical carbon nanotube cross-flow filter device 5700 comprising acrylic pegs 5724 to align the top half 5720 and the bottom half 5722 of the device and hold the filter 5704 positioned in place between the titanium anode 5702 and the titanium cathode 5706.

Figure 58:

FIG. 58 is an image of an electrochemical cross-flow device with CNT-polymer-CNT membrane.

Figure 59:
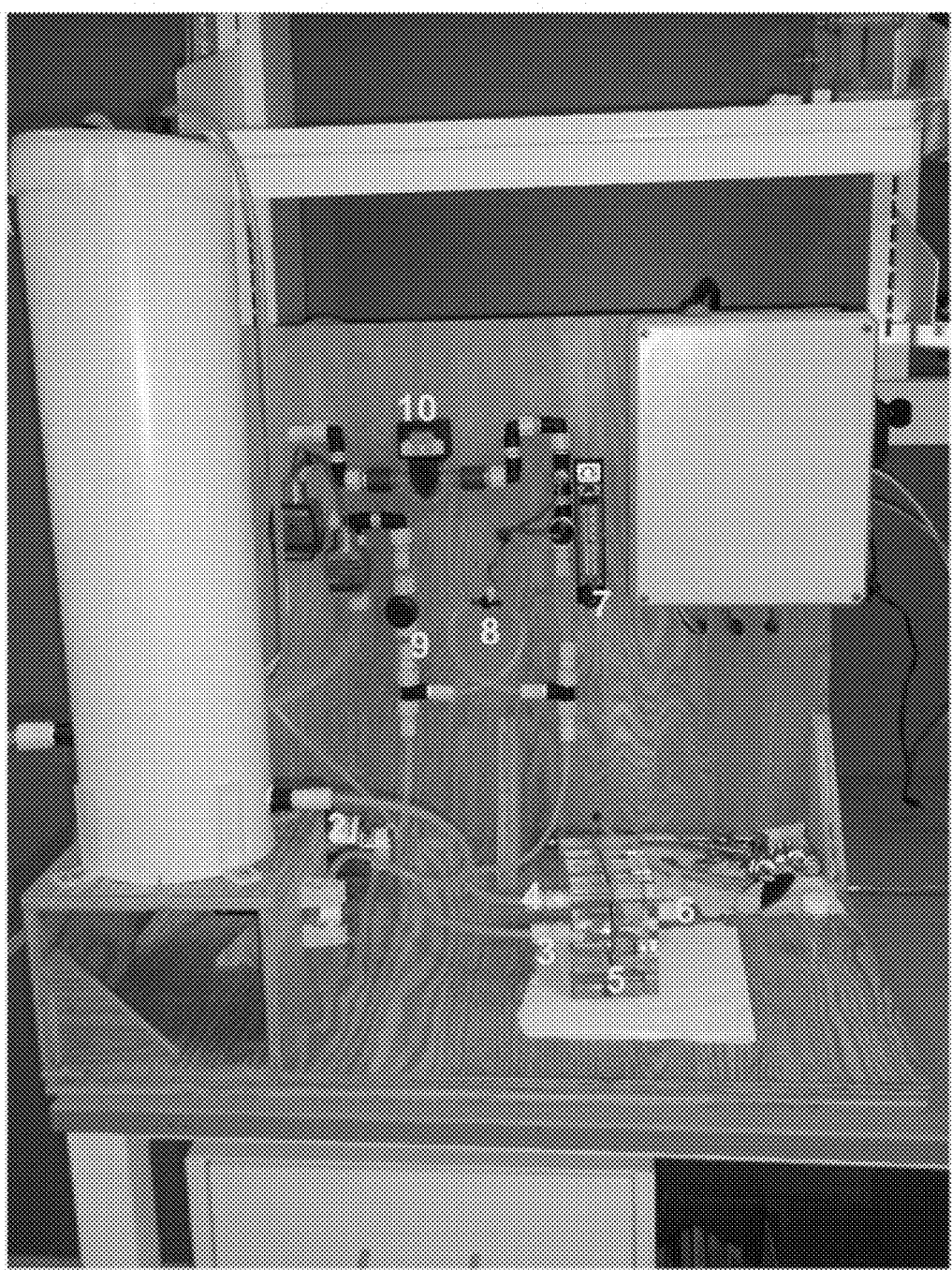

FIG. 59 is an image of an electrochemical cross-flow filtration system according to one or more embodiments provided herein. The numeric references in the figure refer to different components of the system, which are water reservoir (1), water pump (2), influent tube (3), concentrate tube or recirculating tube (4), electrochemical cross-flow device (5), permeate tube (6), permeate flow meter (7), differential pressure sensor (8), pressure valve (9), and permeate flow sensor (10).

Figure 60:
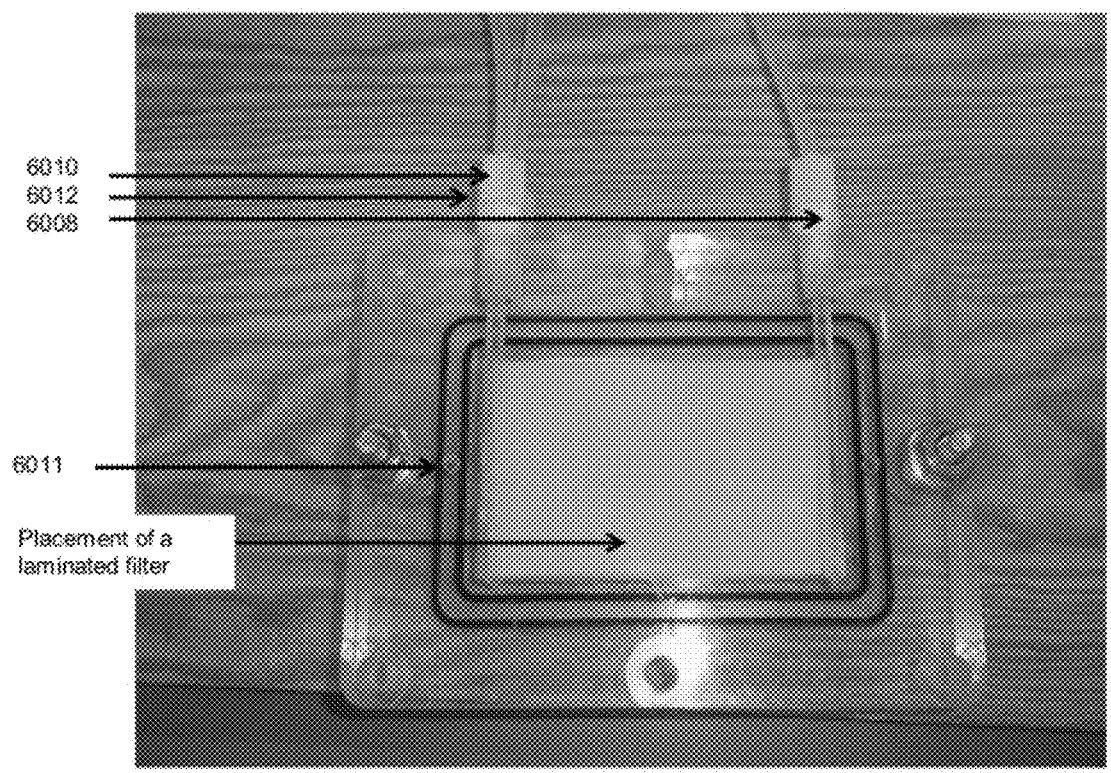

FIG. 60 is an image of an electrochemical cross-flow filtration device connected with tubings. A concentrate or recirculating tube is connected to the first outlet 6010 (top) of the device; a permeate tube is connected to the second outlet 6012 (bottom) of the device, an influent tube is connected to an inlet 6008 of the device. O-ring 6011 can be used to maintain the electrodes and the membrane filter (e.g., laminated filter) in place within the device and/or to prevent leakage.

Figure 61A:
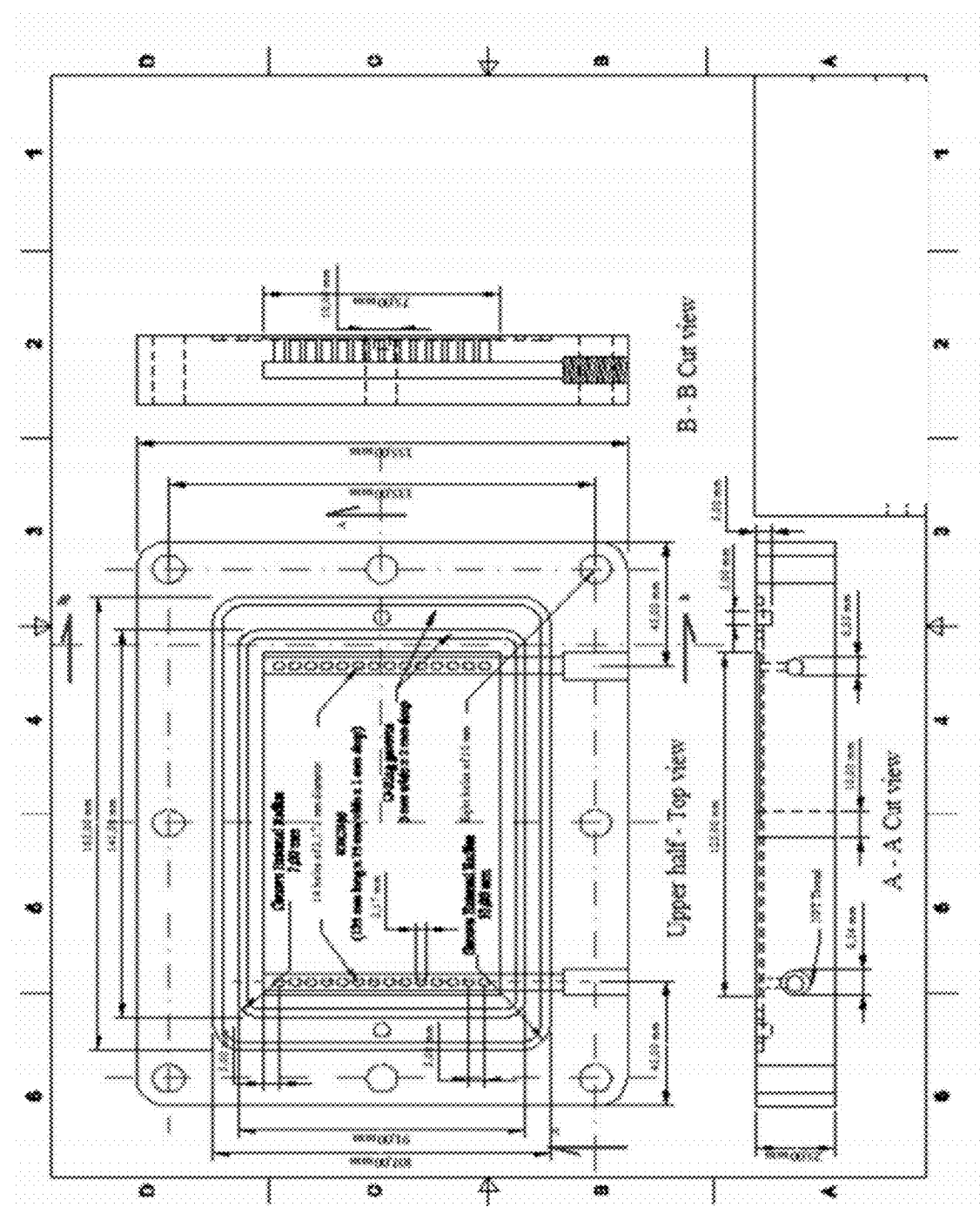
Figure 61B:
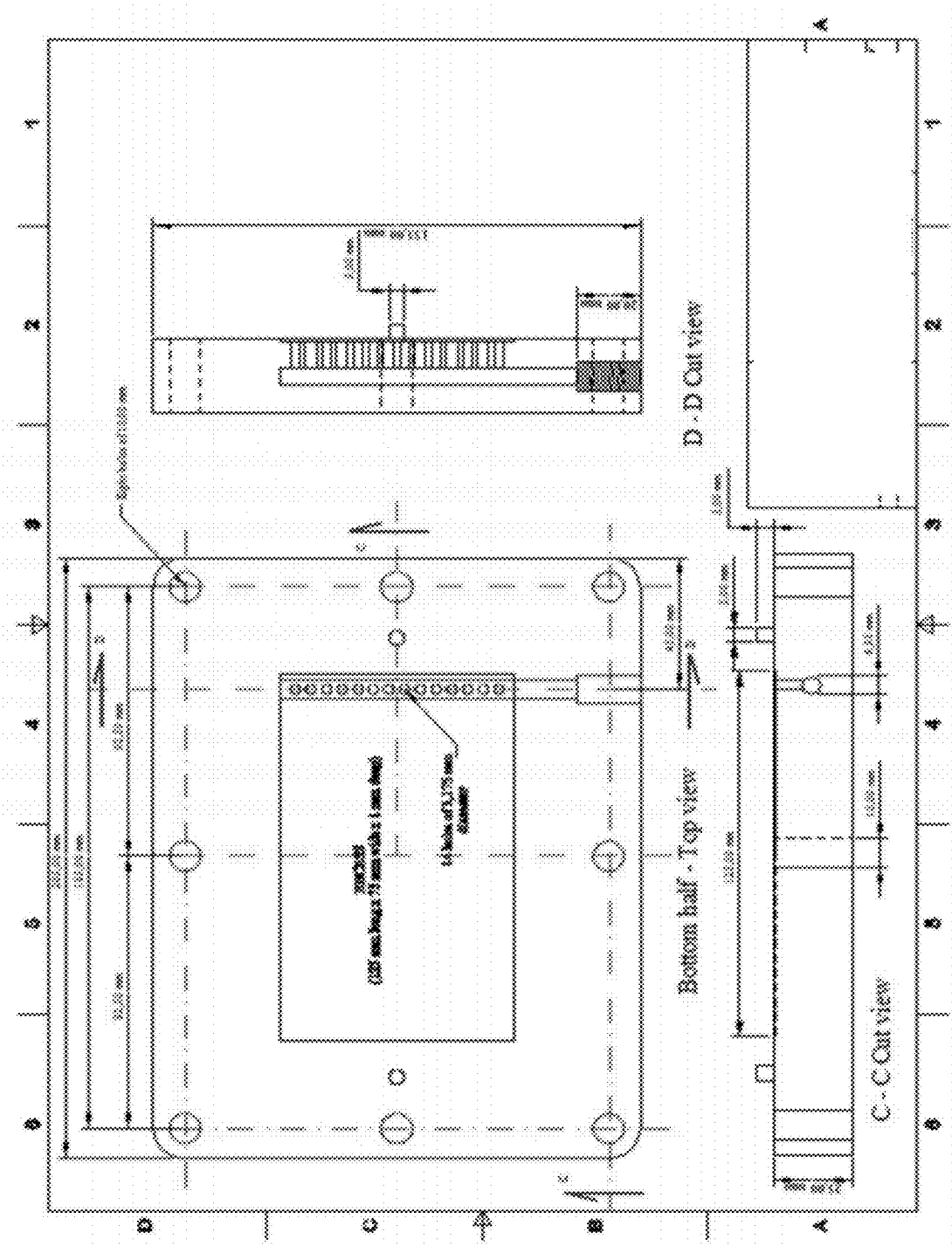

FIGS. 61A-61B are SolidWorks drawings of a top half and a bottom half of an exemplary cross-flow device, respectively, adapted for use with electrochemistry.

Figure 62A:
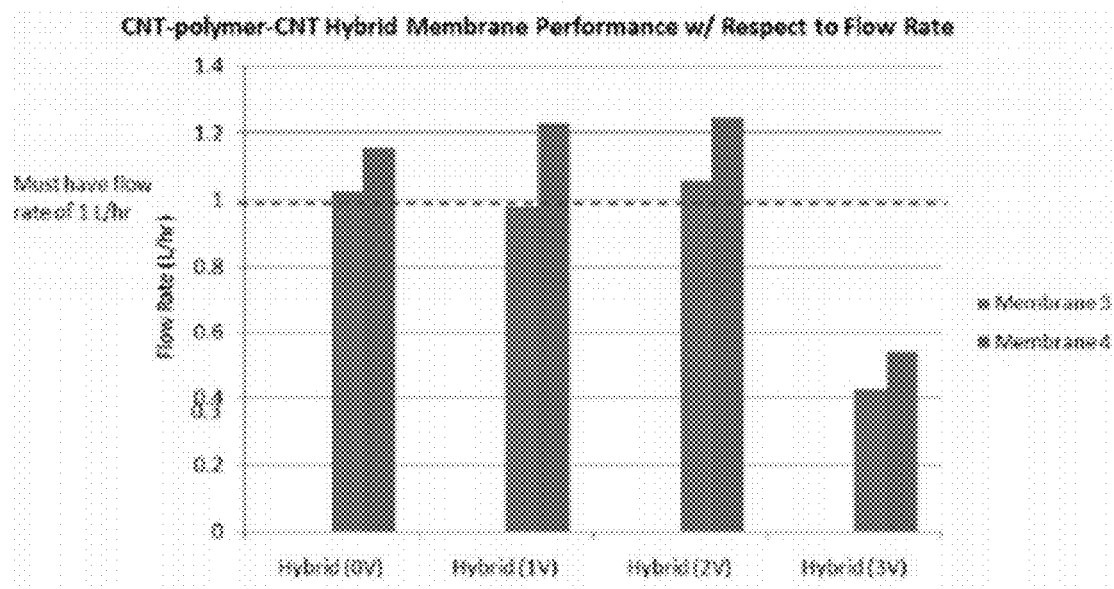
Figure 62B:
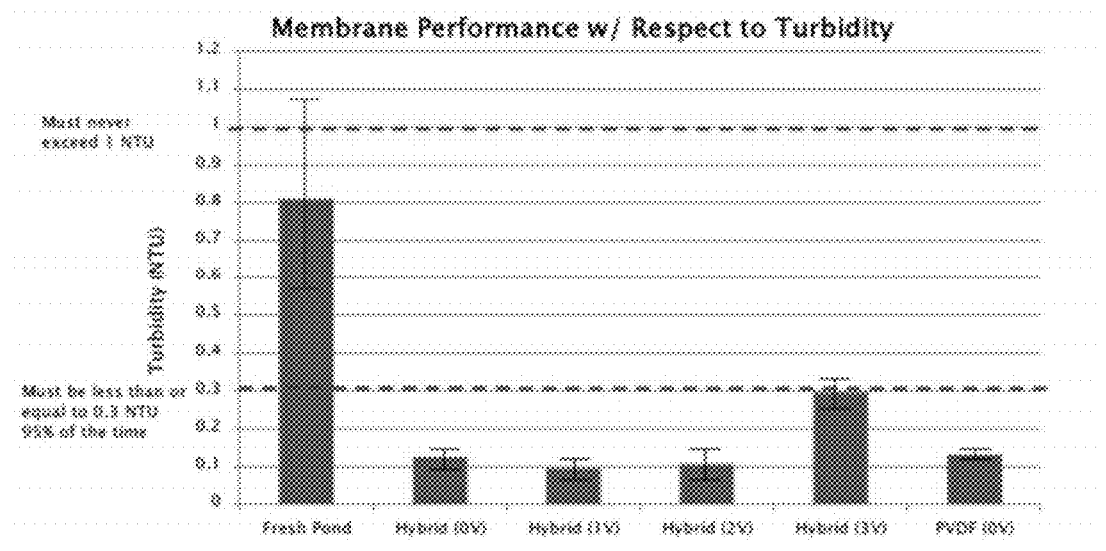

FIGS. 62A-62B show the performance data of the CNT-polymer-CNT hybrid membranes. FIG. 62A is a bar graph showing the flow rate performance of CNT-polymer-CNT hybrid membranes. FIG. 62B is a bar graph showing the performance of CNT-polymer-CNT hybrid membranes for turbidity removal.

Figure 63:
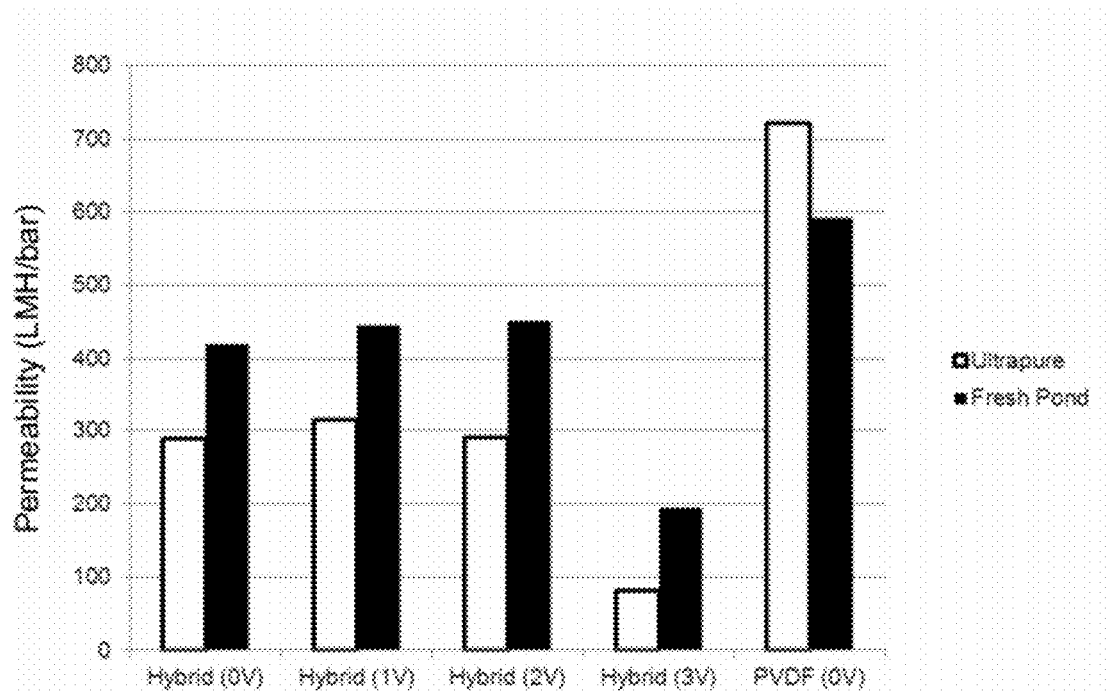

FIG. 63 is a bar graph showing permeability of CNT-polymer-CNT hybrid membranes operated at different voltages with ultrapure water and fresh pond water.

Figure 64:
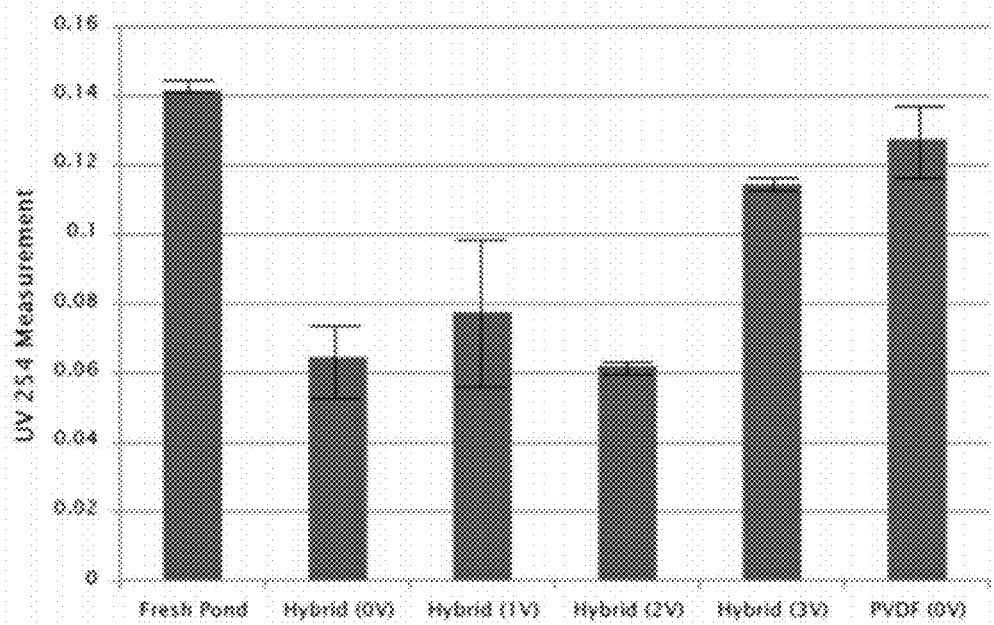

FIG. 64 is a bar graph showing the performance of CNT-polymer-CNT hybrid membranes operated at different voltages with respect to removal of natural organic matter.

FIG. 65 shows in Table 13 an evaluation of various pressing forces for producing a pressed CNT-polymeric hybrid membrane.

DETAILED DESCRIPTION OF THE INVENTION

The present invention is directed to filtration devices comprising one or more carbon nanotube filter materials, for example, for reducing at least one contaminant in an input fluid flowing there through. The input fluid can be any aqueous fluid, e.g., comprising at least one contaminant described herein. Without limitations, the contaminant can be any particulate, molecule, or cellular material. Examples of contaminants include, but are not limited to, organic molecules, ions such as anions, biological microorganisms, and any combination thereof.

In some embodiments of the invention, the filtration apparatus includes (a) a housing forming a chamber with an inlet for receiving an input fluid and an outlet for releasing an output fluid; (b) a porous carbon nanotube filter material positioned between the inlet and the outlet, wherein at least a portion of the porous carbon nanotube filter material is in contact with a first conducting material; and (c) a second conducting material positioned between the inlet and the outlet.

FIG. 1A illustrates a cross-sectional diagrammatic view of a dead-end filtration apparatus in accordance with one or more embodiments of the invention. The filtration apparatus 100 includes a housing 102 forming a chamber 102A with an inlet 104 and an outlet 106. Inside the chamber 102A, a porous carbon nanotube filter material 108 is positioned between the inlet 104 and the outlet 106, wherein at least a portion of the porous carbon nanotube filter material 108 is in contact with a first conducting material 110. In addition, a second conducting material 112 is positioned between the inlet 104 and the outlet 106. In some embodiments, the second conducting material 112 can be positioned between the carbon nanotube filter material 108 and the inlet 104, as shown in FIG. 1A. In alternative embodiments, the second conducting material 112 can be positioned between the carbon nanotube filter material 108 and the outlet 106. In such configuration, any gases, e.g., hydrogen, produced on the second conducting material 112 can be carried out through the outlet 106 without being driven into the porous carbon nanotube filter material 108 that may result in a blockage of the pores.

Figure 1B:
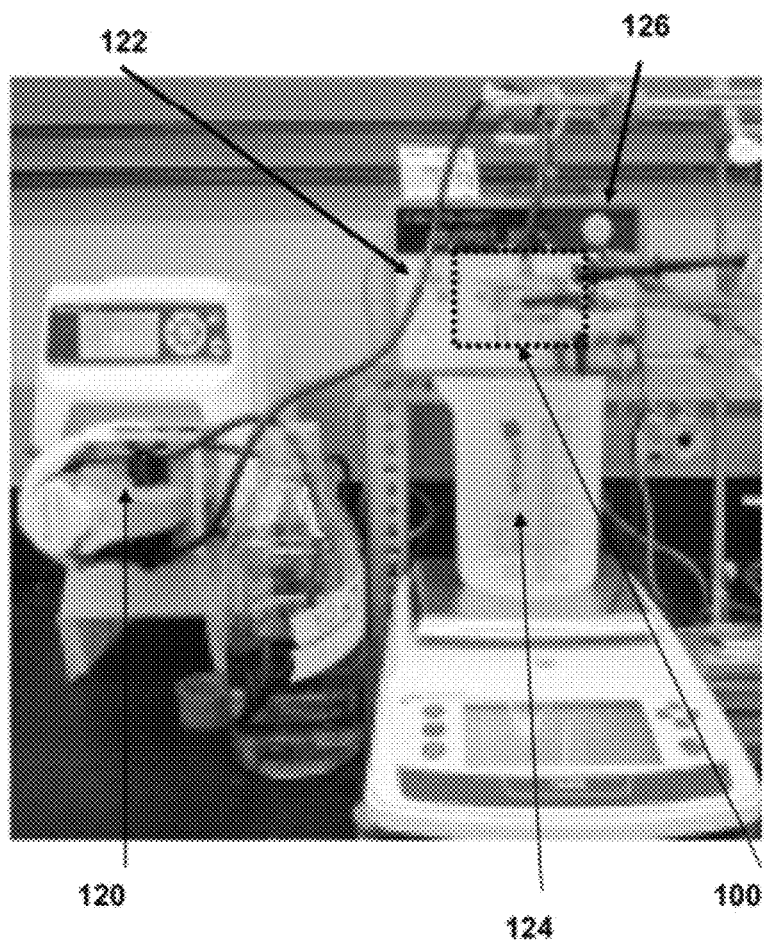

In some embodiments, the second conducting material 112 and the porous carbon nanotube filter material 108 can be separated and positioned in a spaced-apart configuration. In these embodiments, the distance between the second conducting material 112 and the porous carbon nanotube filter material 108 can be less than 5 cm, less than 4 cm, less than 3 cm, less than 2 cm, less than 1 cm, less than 500 μm or less than 250 μm. In one embodiment, the distance between the second conducting material 112 and the porous carbon nanotube filter material 108 is less than 1 cm. It should be noted that the electrolysis efficacy improves with decreasing distance between the first conducting material 110/porous carbon nanotube filter 108 and second conducting material 112. In some embodiments, the second conducting material is not in contact with the porous carbon nanotube filter material 108 or the first conducting material 110. The second conducting material 112 can be separated from the porous carbon nanotube filter material 108 and/or the first conducing material 110 by an insulting material, e.g., an insulating silicone rubber seal 114, as shown in FIGS. 1A and 1D.

In some embodiments of the invention, the first conducting material 110 is in contact with at least a portion of the porous carbon nanotube filter material 108. In various embodiments, the first conducting material 110 can be porous and allow an input fluid to penetrate through and contact the porous carbon nanotube filter material 108. For example, the first conducting material 110 can be a ring as shown in FIG. 1D. As the carbon nanotubes are conductive in one dimension, the first conducting material can facilitate a current flow between the carbon nanotube filter material and an external voltage source. It will be understood that the first conducting material 110 can have any shape and/or size, e.g., based upon the shape and/or size of the carbon nanotube filter material 108.

In various embodiments, the second conducting material 112 can be permeable to an input fluid, i.e., an input fluid can penetrate through the second conducting material. For example, in one embodiment, the second conducting material 112 can be perforated, as shown in FIG. 1D. In another embodiment, the second conducting material 112 can be a mesh. The shape and size of the second conducting material 112 can be adjusted according to the shape and size of the filtration surface area, i.e., the surface area of the carbon nanotube filter material 108.

The first 110 and second 112 conducting materials can be any electrically-conductive materials known in the art. The electrically-conductive materials can be any metal, transition metal, non-metal, oxides or any composite thereof. Without limitations, exemplary conducting materials include stainless steel, titanium or titanium alloys, zirconium alloy, nickel or nickel alloys, brass, carbon-amorphous, graphite, copper, copper graphite, copper tellurium, copper tungsten, copper zirconium diboride, gold or gold alloy, electrographite, metal graphite, molybdenum, palladium or palladium alloys, platinum or platinum alloys, plated base metal, resin bonded graphite, gold or gold alloys, silver or silver alloys, silver copper, silver cadmium oxide, silver graphite, silver molybdenum, silver nickel, silver tin oxide, silver tungsten, silver tungsten carbide, tungsten, and tungsten carbide. In some embodiments, the conducting materials can comprise a coating of metal, transition metal, oxides or any composite thereof. The choice of the first and second conducting materials can depend upon a number of factors, for example, the nature of the fluid to be processed, its relative pH, various types and relative concentrations of its contaminates.

In some embodiments, the first conducting material 110 includes titanium, e.g., at a percentage of at least about 10%, at least about 20%, at least about 30%, at least about 40%, at least about 50%, at least about 60%, at least about 70%, at least about 80%, at least about 90%, at least about 95%, at least about 98%, about 99%, or 100%. In one embodiment, the first conducting material 110 is titanium. Titanium is resistant to corrosion and relatively low-cost, compared to other corrosion-resistant materials. In some embodiments, the first conducting material 110 should be corrosion-resistant.

In some embodiments, the second conducting material 112 includes stainless steel, e.g., at a percentage of at least about 10%, at least about 20%, at least about 30%, at least about 40%, at least about 50%, at least about 60%, at least about 70%, at least about 80%, at least about 90%, at least about 95%, at least about 98%, about 99%, or 100%. In one embodiment, the second conducting material 112 is stainless steel. Stainless steel is relatively low-cost and contains iron that can catalyze hydrogen production. In some embodiments, the second conducting material can contain iron. In some embodiments, the second conducting material can be any other conducting metal, such as copper, nickel, silver, gold, or platinum. In some embodiments, the second conducting material can be another porous carbon nanotube filter material described herein. One of skill in the art can select an appropriate second conducting material, depending on the goal of the electrochemical reaction. For example, hydrogen production efficiency can be improved by adding some nickel or platinum into the second conducting material 112. If carbon dioxide is desired to be reduced, a copper cathode can be used.

FIG. 56A illustrates a cross-sectional diagrammatic view of a cross-flow or tangential flow filtration apparatus in accordance with one or more embodiments described herein. The filtration apparatus 5600 includes a housing 5601 forming a chamber 5603 having a plane 5605. The chamber 5603 includes an inlet 5608 for receiving an input fluid, a first outlet 5610 for releasing fluid, and a second outlet 5612 for releasing filtered fluid. The inlet 5608 and the first outlet 5610 are disposed on a first side of the plane 5605, and the second outlet 5612 is disposed on a second side of the plane 5605. The filtration apparatus 5600 also includes a laminated filter 5604 positioned along the plane 5605 between the inlet 5608 and the second outlet 5612; a first conducting connector 5602 positioned along the plane 5605 between the inlet 5608 and the laminated filter 5604; and a second conducting connector 5606 positioned along the plane 5605 between the laminated filter 5604 and the second outlet 5612.

FIG. 56B illustrates one embodiment of a laminated filter described herein that can be used in the filtration apparatuses described herein, e.g., a cross-flow filtration apparatus. The laminated filter 5604 comprises at least one porous polymer layer 5614 disposed between a first porous carbon nanotube filter material 5616 and a second porous carbon nanotube filter material 5618. Additional details about a laminated filter are described hereafter.

While FIG. 56A illustrates a laminated filter 5604 configured with the filtration apparatus (e.g., a cross-flow filtration apparatus) in a "flat-sheet" configuration, the configuration of the laminated filter 5604 with the filtration apparatus can vary depending on the physical characteristics of the process fluid and/or specific process needs. By way of example only, the laminated filter 5604 can be configured with the filtration apparatus (e.g., a cross-flow filtration apparatus) in tubular, flat sheet, spiral wound, and hollow fiber configurations. In one embodiment, the laminated filter 5604 can be configured with a cross-flow filtration apparatus in a "spiral wound" configuration, where the laminated filter can be rolled up around a tube leading to the second outlet (for fluid that flows across the laminated filter to exist). In the "spiral wound" configuration, for example, feed channel spacer(s) can be spaced between the laminated filter for introduction of an input fluid. In addition, the tube wrapped around by the laminated filter can contain holes or pores for collecting the fluid that flows across the laminated filter, thus directing the collected fluid to the second outlet.

In some embodiments, the first conducting connector 5602 can be in contact (e.g., electrical contact) with a portion of the first porous carbon nanotube filter material 5616. The first conducting connector 5602 can act as an anode electrode connecting the first porous carbon nanotube filter material 5616 to the positive pole of a voltage source. In some embodiments, the second conducting connector 5606 can be in contact (e.g., electrical contact) with a portion of the second porous carbon nanotube filter material 5618. The second conducting connector 5606 can act as a cathode electrode connecting the second porous carbon nanotube filter material 5618 to the negative pole of a voltage source. In one embodiment, the first conducting connector and the second conducting connector are pressed against a portion of a surface of the first porous carbon nanotube filter material and the second porous carbon nanotube filter material, respectively.

To provide a large filter surface area for treatment of an aqueous fluid, the first conducting connector 5602 and the second conducting connector 5606 are designed such that they are in contact (e.g., electrical contact) with no more than 50% of the bulk or filter surface area of the first porous carbon nanotube filter material 5616 and the second porous carbon nanotube filter material 5618, respectively. For example, the conducting connectors 5602, 5606 can cover and be in contact with no more than 50%, including no more than 40%, no more than 30%, no more than 20%, no more than 10% or lower, of the bulk surface area of the porous carbon nanotube filter materials 5616, 5618. However, the conducting connectors 5602, 5606 preferably provide sufficient electrical contact with the porous carbon nanotube filter materials 5616, 5618, to support deactivation of at least one contaminant in the aqueous fluid.

The conducting connectors (electrodes) can be of any shape and/or in any configuration, e.g., depending on the shape and/or configuration of the laminated filter. For example, the conducting connectors can be in a shape of a rectangle, a circle, a square, a triangle, an oval, or any irregular shape. In one embodiment, as shown in FIGS. 57A-57B, the conducting connectors are designed to be a rectangular frame. While FIGS. 57A-57B illustrate the conducting connectors in a form of a frame, the conducting connectors can also be designed in a form of a screen, e.g., a perforated sheet or a sheet containing a plurality of through holes, an array of wires, or strips, provided that there is sufficient open filter surface area of the laminated filter to achieve a desirable filtration rate. In some embodiments where a laminated filter is rolled up, e.g., in a "spiral-wound" configuration, the conducting connectors can also be wrapped around the laminated filter.

In some embodiments, the conducting connectors (electrodes) can be designed to have round corners or filleting of the corners, e.g., as shown in FIGS. 57A-57B. The round corners 5709 can not only enable the electrodes to fit between O-rings 5711, if any, as shown in FIG. 57B, but can also allow easier electrode production. The O-rings 5711 are generally used to provide a tight seal between the top half 5720 and bottom half 5722 of the filtration apparatus housing after assembly (e.g., as shown in FIG. 57C), thus preventing leakage of an aqueous fluid during operation.

The first conducting connector and the second conducting connector can have a thickness of any dimension. In some embodiments, the conducting connectors can have a thickness that does not disrupt the seal created by the O-rings. A too thick conducting connector can generally disrupt the seal created by the O-rings. Accordingly, in some embodiments, the first conducting connector and the second conducting connector can have a thickness of about 25 μm to about 1000 μm, about 50 μm to about 500 μm, about 75 μm to about 250 μm, or about 100 μm to about 200 μm. In one embodiment, the first conducting connector and the second conducting connector can have a thickness of about 130 μm.

In some embodiments, the first and the second conducting connector can include a conducting lead or tab that facilitates the connection of the electrodes to a voltage source. For example, as shown in FIG. 57A, a conducting lead or tab 5707 can be extended from a side of the first 5702 and/or the second 5706 conducting connector. Thus, the conducting lead or tab 5707, 5807 can be extended beyond the side of the filtration apparatus described herein, allowing for a voltage source to be connected to the electrodes, as shown in FIG. 58.

The filtration apparatus as described herein can be fabricated as an integral unit or can be assembled from individual components. FIG. 57C shows a cross-sectional diagrammatic view of an exemplary cross-flow filtration device assembled from individual components, including, e.g., but not limited to, top-half housing 5720, first conducting connector 5702 (anode electrode), laminate filter 5704 (e.g., CNT-polymer-CNT hybrid membrane), second conducting connector 5706 (cathode electrode) and bottom-half housing 5722. In such embodiments, the laminated filter can be removed for regeneration and/or replaced with a fresh one when the filtration efficiency of the apparatus decreases. Each individual components can be aligned and fasten together, for example, using a peg-and-hole mechanism (peg 5724 fitted into hole 5723) as shown in FIG. 57C. Alternatively, adhesive, such as a polymeric adhesive, or pressure-sensitive adhesive (PSA), such as a silicone-, acrylic- or synthetic rubber-based PSA can be used to keep each component in place and hold them together. A skilled artisan can readily appreciate various methods that can be used to align and fasten individual components together during assembly.

In order to operate the filtration apparatus efficiently, one has to ensure that there is no fluid leakage during operation. Accordingly, in some embodiments, at least two O-rings 5711 as shown in FIG. 57B can be disposed on the top-half of the housing 5720 (or the bottom-half of the housing 5722) to create a tight seal between the top-half housing and the bottom-half housing after assembly of the apparatus to minimize any leakage when an aqueous fluid is flow through the apparatus during operation. In some embodiments, bolts and nuts 5713 as shown in FIG. 57B can be used to further fasten the apparatus close to prevent any fluid leakage when an aqueous fluid is run at a pressure, e.g., at a pressure of about 1 bar, about 2 bars, about 3 bars, about 4 bars, about 5 bars, about 6 bars or higher. In other embodiments, a sealant can be used to seal the top and bottom half of the housing during assembly. Any other methods to prevent fluid leakage known to one of skill in the art can also be used herein.

To operate a cross-flow filtration apparatus with electrochemistry, it is useful to have a design that avoids or prevents the electrodes from short-circuiting. The first conducting connector and the second conducting connector can be designed and placed in the filtration apparatus to act as an anodic electrode and a cathodic electrode, respectively, but they cannot be configured with the filtration apparatus in a manner that can result in a short circuit. In some embodiments, the porous polymer layer disposed between the first and the second porous carbon nanotube filter materials of the filter 5704 can be sufficient to separate the first and second conducting connectors from short-circuiting, for example, when an electrically-insulating adhesive is used to attach each individual component together, and there are no other electrically-conducting components that connect the electrodes together.

However, depending on various assembly methods, for example, a peg-and-hole mechanism to align the two sides of the apparatus and hold the filter and electrodes in place as shown in FIG. 57C, the peg 5724 is preferably an electrical insulator, e.g., an electrically-insulating peg such as acrylic peg. In some embodiments, a metal peg can be coated with an electrical-insulating material, e.g., an electrically-insulating polymer layer. A person having ordinary skill in the art can identify appropriate electrical insulators for use as a peg or a coating thereof, if necessary, to prevent the electrodes from short-circuiting. In some embodiments, any portion or surface of the first conducting connector and second conducting connector that could be potentially electrically-connected via a contact with the peg can also be coated with an electrically-insulating layer, e.g., acrylics or polymers.

In one embodiment, instead of aligning and fastening both conducting connectors (electrodes) 5702, 5706 and the filter 5704 together with the same peg 5724 as shown in FIG. 57C, the first conducting connector 5702 can be attached to (e.g., with an electrically-insulating peg or adhesive) or integrated with the upper housing 5720, while the second conducting connector 5706 can be attached to (e.g., with an electrically-insulating peg or adhesive) or integrated with the bottom housing 5722. The filter 5704 can be independently attached or aligned to either the upper housing 5720 or the bottom housing 5722 using another electrically-insulating peg or bolt without contacting the two conducting connectors 5702, 5706. For example, at least a portion of the filter 5704 can extend beyond the outer edge of the electrodes 5702, 5706 such that the pegging and/or bolting can be constructed beyond the outer edge of the electrodes 5702, 5706.

The first 5602, 5702 and second 5606, 5706 conducting connectors can be any electrically-conductive materials known in the art. The electrically-conductive materials can be any metal, transition metal, non-metal, oxides or any composite thereof. Without limitations, exemplary conducting materials include stainless steel, titanium or titanium alloys, zirconium alloy, nickel or nickel alloys, brass, carbon-amorphous, graphite, copper, copper graphite, copper tellurium, copper tungsten, copper zirconium diboride, gold or gold alloy, electrographite, metal graphite, molybdenum, palladium or palladium alloys, platinum or platinum alloys, plated base metal, resin bonded graphite, gold or gold alloys, silver or silver alloys, silver copper, silver cadmium oxide, silver graphite, silver molybdenum, silver nickel, silver tin oxide, silver tungsten, silver tungsten carbide, tungsten, and tungsten carbide. In some embodiments, the conducting connectors can comprise a coating of metal, transition metal, oxides or any composite thereof. The choice of the first and second conducting connectors can depend upon a number of factors, for example, the nature of the fluid to be processed, its relative pH, various types and relative concentrations of its contaminates, voltage to be applied, electrochemical reaction products.

In some embodiments, the first conducting connector (anode electrodes) 5602, 5702 and/or the second conducting connector (cathode electrodes) 5606, 5706, can include titanium, e.g., at a percentage of at least about 10%, at least about 20%, at least about 30%, at least about 40%, at least about 50%, at least about 60%, at least about 70%, at least about 80%, at least about 90%, at least about 95%, at least about 98%, about 99%, or 100%. In one embodiment, the first conducting connector 5602, 5702 and/or the second conducting connector 5606, 5706 is titanium. Titanium is resistant to corrosion and relatively low-cost, compared to other corrosion-resistant materials. In some embodiments, the first conducting connector 5602, 5702 and/or the second conducting connector 5606, 5706 should be corrosion-resistant, as the electrodes are exposed to oxidants while the electrochemical cross-flow filtration apparatus is in operation.

In some embodiments, the filtration apparatus, e.g., for cross-flow filtration, can reduce fouling of the filter during operation by at least about 10%, at least about 20%, at least about 30%, at least about 40%, at least about 50%, at least about 60%, at least about 70%, at least about 80%, at least about 90%, or higher, as compared to the fouling obtained with a dead-end filtration. In such embodiments, the lifespan of the filter can be prolonged by at least about 10%, at least about 20%, at least about 30%, at least about 40%, at least about 50%, at least about 60%, at least about 70%, at least about 80%, at least about 90%, or higher, as compared to the lifespan of a dead-end filtration.

In some embodiments, the filtration apparatus described herein can allow a higher flux of a fluid containing contaminants or particulates (e.g., charged particles) through the porous carbon nanotube filter material or laminated filter, as compared to a flux of a pure fluid. For example, the filtration apparatus described herein can allow an increased flux of a fluid containing contaminants or particulates (e.g., charged particles) through the porous carbon nanotube filter material or laminated filter by at least about 10%, at least about 20%, at least about 30%, at least about 40%, at least about 50%, at least about 60%, at least about 70%, at least about 80%, at least about 90%, or higher, as compared to a flux of a pure fluid through the porous carbon nanotube filter material or laminated filter.

In some embodiments of any aspects of the filtration apparatuses described herein, the housing 102 or 5601 can be made of any material compatible to the input fluid to be processed, e.g., resistant to a solvent, or a biological solution. In some embodiments, the material of the housing can be selected for its resistance to cleaning and/or sterilization methods, such as UV-irradiation, disinfectants, steams and/or high pressures. In one embodiment, the housing of the filtration apparatus is made of plastic, e.g., polycarbonate. In one embodiment, the housing of the filtration apparatus is made of acrylics. Depending on choice of an input fluid and/or process conditions, a skilled artisan will be able to select an appropriate housing material. For example, acetone can dissolve polycarbonate. If the input fluid is an organic solvent, e.g., acetone, a different housing material, other than polycarbonate, will be selected.

Figure 1C:
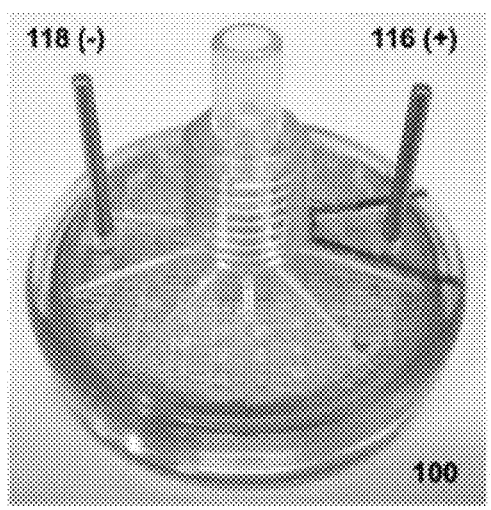
Figure 1D:
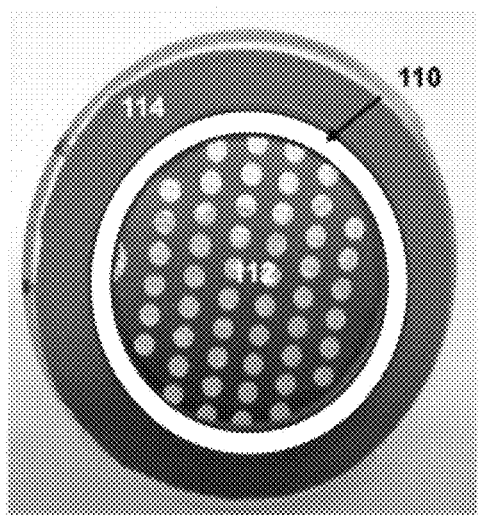

In further embodiments, as shown in FIG. 1C, the housing 102 of the filtration apparatus 100 can have at least two openings (preferably sealed openings) for a first conducting lead 116 and a second conducting lead 118, wherein the first conducting lead 116 contacts the first conducting material 110, and the second conducting lead 118 contacts the second conducting material 112. The first conducting lead 116 and the second conducting lead 118 can be used herein to facilitate an electrical connection to the positive and negative poles of a voltage source 126. In some embodiments, the first conducting material 110 can be connected to a positive pole or a negative pole of a voltage source 126, e.g., via the first conducting lead 116. The second conducting material 112 can be connected to a positive pole or a negative pole of a voltage source 126, e.g., via the second conducting lead 118. It should be appreciated that the first and second conducting leads can be any electrically-conductive materials (e.g., any metal or non-metal) of any shape, which allow an electric current flow through the voltage source and the first and second conducting materials when connected to a voltage source.

As used herein, the phrase "a voltage source" refers to an electrical device or an electrical component that supplies a voltage or an electric potential between two terminals to induce a current to flow through path between the positive and negative terminals. In one embodiment, the voltage sources supplies a direct-current (DC) potential. In another embodiment, the voltage sources supplies an alternating-current (AC) potential. Non-limiting examples of a voltage source include a battery, a voltage generator, and a power supply. As understood in the art, electrons flow from the negative pole ("anode") of a voltage source, through the circuit and return to the positive pole ("cathode") of the voltage source. Stated in another convention, an electric current flows from the positive pole of a voltage source, through the circuit and returns to the negative pole of the voltage source.

In some embodiments of any aspects described herein, the voltage source can produce a potential of at least about 0.5 volt, at least about 1 volt, at least about 2 volts, or at least about 3 volts. In some embodiments, the voltage source can produce a potential of less than 10 volts, less than 9 volts, less than 8 volts, less than 7 volts, less than 6 volts, less than 5 volts or less than 4 volts. In one embodiment, the voltage source produces a potential of about 0.5 volt to about 10 volts, about 1 volt to about 8 volts, or about 1 volt to about 5 volts.

Without wishing to be bound by theory, when the filtration apparatus of the invention is in operation, gases can be produced, e.g., due to electrolysis reaction, and accumulate inside the filtration apparatus. In some circumstances, the gas formation can result in blockage of the pores within the carbon nanotube filter material, affecting the operating condition thereof. Accordingly, in some embodiments, a valve or vent, such as a pressure release valve, can be incorporated into the filtration apparatus to vent the accumulated gases.

Laminated Filter

A laminated filter comprising at least one first porous polymer layer disposed between a first porous carbon nanotube filter material and a second porous carbon nanotube filter material is also provided herein.

In some embodiments, the laminated filter can be used in the filtration apparatus for cross-flow filtration. As used herein, the term "cross-flow filtration" or refers to tangential flow filtration, in which the direction of an input fluid flow is perpendicular to the direction of flow across the filter. In some embodiments, the cross-flow filtration can also encompass recirculation of a portion of the fluid that did not flow across the filter in the previous pass. Accordingly, in some embodiments, the term "cross-flow filtration" can be defined as filtration comprising multiple pass of a fluid over a filter. In some embodiments, the cross-flow filtration tends to have low propensity for fouling, as compared to dead-end filtration, since particles tend to be carried away from the membrane with the flow of fluid that does not go through the filter.

In some embodiments, the laminated filter can be used in the filtration apparatus for dead-end filtration. The term "dead-end filtration" as used herein refers to a filtration process in which the direction of an input fluid flow and the direction of flow across the filter are parallel. In some embodiments, the term "dead-end filtration" is defined as filtration comprising a single pass over a filter. In other embodiments, dead-end filtration can comprise substantially no tangential flow filtration. The dead-end filtration tends to have high recovery and/or higher flux than cross-flow filtration. Some advantages and disadvantages of the cross-flow filtration and dead-end filtration are described below:

|  | Dead-End Flow | Cross-Flow |
|---|---|---|
| Pros | Perpendicular flow to membrane forces water through membrane, thus achieves maximum flux and recovery | Achieve coverage of a large surface area with membrane Low propensity for fouling since particles tend to be carried away from the membrane with the flow of water that does not go through the membrane |
| Cons | High propensity for fouling since contaminants are forced into the membrane Membrane stability comprised by high pressure | Tangential flow to membrane results in lower flux Lower recovery since not all of the influent will go through the membrane |

FIG. 56C shows one embodiment of a laminated filter comprising a porous polymer layer 5614 disposed between two porous carbon nanotube filter materials 5616 and 5618. In some embodiments, more than one porous polymer layers, including two, three or four more porous polymer layers, can be disposed between two porous carbon nanotube filter materials. In such embodiments, each porous polymer layer can be of the same or a different polymer. Examples of materials that can be used as a porous polymer layer can include, but are not limited to, polyvinylidene fluoride (PVDF), polysulfone, polyethersulfone, cellulose, polyamide, polypropylene, polyethylene, polytetrafluoroethylene, cellulose acetate, polyacrylonitrile, vinyl copolymer, polycarbonate, polyesters, and any combinations thereof. In various embodiments, the polymer used in the porous polymer layer is an electrical insulator or a poor conductor, or any porous polymer that can provide sufficient electrical insulation between the first and the second conducting connectors (electrodes) to prevent a short circuit. In some embodiments, any porous polymer that are inert to chemicals can be used in the laminated filter. In some embodiments, any porous polymers that are mechanically strong to be operated under a certain fluid pressure, e.g., greater than 1 bar, greater than 2 bars, greater than 3 bars, greater than 4 bars, greater than 5 bars, greater than 6 bars, greater than 10 bars, greater than 20 bars or higher, can be used in the laminated filter.

In some embodiments, the porous polymer layer includes PVDF. In one embodiment, the porous polymer layer is PVDF because of its mechanical strength and chemical resistivity. PVDF's high mechanical strength allows for the cross-flow filtration to be operated at higher fluid pressures than those used in the dead-end flow filtration. The chemical resistivity of the PVDF polymer enables the membrane to withstand the chemical degradation that could occur when exposed to direct electrochemistry and electrochemically-produced oxidants. The PVDF membrane can be synthesized, e.g., by phase inversion known in the art, or obtained from a commercial source.

In order to minimize the resistance to a flow through the laminated filter, in some embodiments, any porous polymer layer of the laminated filter can exhibit a flux that is at least 60% of a flux, including, e.g., at least about 70%, at least about 80%, at least about 90%, at least about 95%, at least about 98%, at least about 100% or higher, through the first porous carbon nanotube filter material or the second porous carbon nanotube filter material. In some embodiments, any porous polymer layer of the laminated filter can exhibit a flux that is equal or greater than a flux through the first porous carbon nanotube filter material or the second porous carbon nanotube filter material. For example, in some embodiments, any porous polymer layer of the laminated filter can exhibit a flux that is at least about 1-fold, at least about 2-fold, at least about 3-fold, at least about 4-fold, at least about 5-fold, or more, of a flux through the first porous carbon nanotube filter material or the second porous carbon nanotube filter material. Methods for evaluating a flux through a porous polymer membrane can be determined by any art-recognized methods, including the method described in the Examples using a dead-end filtration device.

In some embodiments, the porous polymer layer can have a pore size of about 0.01 μm to about 10 μm or about 0.1 μm to about 5 μm, or about 0.5 μm to about 2.5 μM.

In some embodiments, the polymer layer can have a porosity of at least about 30%, including at least about 40%, at least about 50%, at least about 60%, at least about 70%, at least about 80% or higher.

In some embodiments, the porous carbon nanotube (CNT) filter material can include porous polymer material, e.g., for increasing the stability of the porous carbon nanotube filter material for repeated use. An exemplary porous polymer material that can be added into the porous carbon nanotube filter material includes polyvinylidene fluoride (PVDF). In one embodiment, the porous carbon nanotube filter material can comprise about 1-10% CNT or about 1-5% CNT in porous polymer material, e.g., but not limited to PVDF. Other porous polymer as described above can also be added into the porous carbon nanotube filter material.

In some embodiments, the laminated filter can further comprise a second porous polymer layer disposed between the first porous carbon nanotube filter material and a third porous carbon nanotube filter material. In some embodiments, the laminated filter can further comprise a third porous polymer layer disposed between the second porous carbon nanotube filter material and a fourth porous carbon nanotube filter material.

Accordingly, in some embodiments, the laminated filter can include a plurality of porous polymer layers, each of which is disposed between two consecutive porous carbon nanotube filter materials. In such embodiments, the porous polymer layers of the laminated filter can each be of the same or a different polymer material and/or with the same or a different porosity or pore sizes. In some embodiments, the porous carbon nanotube filter materials of the laminated filter can each have the same or different types of carbon nanotubes, porosity and/or pore sizes.

In one embodiment, the laminated filter can show a gradient of porosity and/or pore sizes across the thickness of the filter. For example, the porous polymer layer and/or carbon nanotube filter material near the top of the filter can have larger pores than the ones near the bottom of the filter, and the pore sizes can decrease with the depth of the filter.

In some embodiments, the porous polymer layer can be integrally bonded to the porous carbon nanotube filter materials or only in physical contact therewith. In some embodiments, a porous carbon nanotube filter material is pressed on both sides of a porous polymer layer to form a pressed laminated filter, e.g., as described in the Examples.

In some embodiments, the porous polymer layer can be separated from the porous carbon nanotube filter materials.

The filter surface area of the laminated filter (including the porous polymer layer and the porous carbon nanotube filter material) can be of any size, depending on applications and/or desired throughput. Generally, a larger filter surface area of the laminated filter can allow a higher throughput, while a smaller filter surface area can provide portability of the laminated filter. Accordingly, in some embodiments, the laminated filter can have a filter surface area ranging from about 5 cm² to about 5000 cm², or about from 5 cm² to about 1000 cm², or about 10 cm² to about 500 cm² or about 50 cm² to about 250 cm². In some embodiments, the laminated filter can have a filter surface area of about 100 cm², e.g., for point-of-use applications. In other embodiments, a laminated filter can have a filter surface area greater than 1000 cm², greater than 5000 cm², or greater than 10,000 cm². For example, in large-scale processing facilities, a laminated filter can have a filter surface area from about 100 m² to about 500,000 m², or from about 1000 m² to about 100,000 m². In some embodiments, a physical support, e.g., a mesh can be included in the laminated filter, and/or a filter holder can be included to provide additional mechanical strength.

Porous Carbon Nanotube Filter Material

The carbon nanotube filter material 108 of the filtration apparatus described herein can include a network of carbon nanotubes. As used herein, the phrase "a network of carbon nanotubes" refers to an arrangement of intertwined carbon nanotubes. The carbon nanotubes can be intertwined in a random orientation, in an ordered configuration, or a combination thereof. In some embodiments, the carbon nanotubes can be randomly or evenly distributed within the network.

Figure 1E:
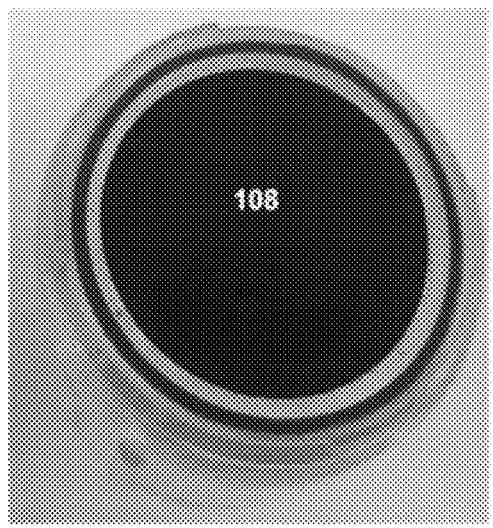
Figure 1F:
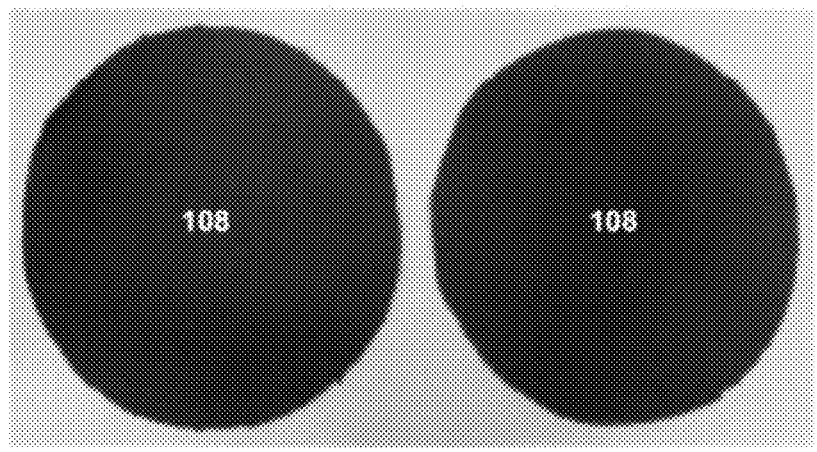

In various embodiments, the network of carbon nanotubes can form a two-dimensional or three-dimensional structure. In some embodiments, the network of carbon nanotubes can form a mesh. In some embodiments, the network of carbon nanotubes can form a mat, as shown in FIGS. 2A to 2G, or FIGS. 11A to 11G. In some embodiments, the carbon nanotube filter material 108 can be free-standing (as shown in FIG. 1F), as opposed to carbon nanotubes packed between two conducting and/or porous materials (e.g., activated carbon felts) described in Yang et al (30).

The carbon nanotube filter material can be fabricated by any methods known to a skilled artisan, e.g., the methods disclosed in U.S. App. Nos.: US 2006/0027499 and US 2006/0073089, which are hereby incorporated by reference in their entirety. In general, the carbon nanotubes can be dispersed in an organic solvent, e.g., DMSO, by a mechanical means such as probe-sonication, and the carbon nanotube suspension can then be filtered through a porous membrane. The carbon nanotubes collected on the porous membrane form the carbon nanotube filter material 108 as shown in FIG. 1E.

It will be understood by one of ordinary skill in the art that the carbon nanotube filter material can exhibit a distribution of pore sizes. The pores can have any shape, e.g., spherical, elliptical, or polygonal. The pore shape can be heterogeneous within the carbon nanotube filter material. The pore size distribution can be determined from any methods known in the art. For example, the pore size distribution can be determined by analysis of images from scanning electron microscopy (FIGS. 2A to 2C and FIGS. 11A to 11D) described in the Examples. Alternatively, the pore size distribution can be determined by flowing a medium with beads of various known sizes through the carbon nanotube filter material, and then analyzing the size distribution in the downstream flow. Accordingly, in some embodiments, the carbon nanotube filter material can have a pore size distribution ranging from about 0.1 nm to about 5 μm, about 0.5 nm to about 5 μm, about 1 nm to about 5 μm, about 5 nm to about 5 μm, from about 10 nm to about 2 μm, from about 30 nm to about 1 μm, from about 50 nm to about 500 nm, or from about 50 nm to about 200 nm. In one embodiment, the carbon nanotube filter material has a pore size of about 50 nm to about 200 nm.

Unless otherwise stated, the term "average pore size" as used herein refers to the average of a pore size distribution. In some embodiments, the carbon nanotube filter material amenable to the invention can have an average pore size of at least about 0.1 nm, at least about 0.5 nm, at least about 1 nm, at least about 5 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 250 nm, at least about 500 nm, or at least about 1 μm.

In reference to the carbon nanotube filter material or the porous polymer layer, the term "porosity" or "porous" as used herein describes the permeability of a filter material. For example, a porous filter permits a fluid to penetrate through. In contrast, a non-porous filter is impermeable and does not let a fluid to pass through. The term "porosity" as used herein is a measure of the extent of permeability of a filter material. Stated in another way, the term "porosity" is a measure of void spaces in a material, and is a fraction of volume of voids over the total volume, as a percentage between 0 and 100% (or between 0 and 1).

In some embodiments, the carbon nanotube filter material has a porosity of at least about 10%, at least about 20%, at least about 30%, at least about 40%, at least about 50%, at least about 60%, at least about 70%, at least about 80%, at least about 90% or more. In some embodiments, the carbon nanotube filter material can have a porosity of about 50% to about 98%, about 70% to about 95% or about 80% to about 95%. The pore size and total porosity values can be quantified using conventional methods and models known to those of skill in the art, such as mercury porosimetry and nitrogen adsorption. One of ordinary skill in the art can determine the optimal porosity of the carbon nanotube filter material for the purpose of the invention. For example, the porosity and/or pore size of the carbon nanotube filter material can be optimized, e.g., according to the operating condition and properties of contaminants to be reduced.

In some embodiments of any aspects described herein, the porous carbon nanotube filter materials can have a specific surface area of about 50 m$^2$/g to about 1500 m$^2$/g, or more. In some embodiments of any aspects described herein, the porous carbon nanotube filter materials can have a specific surface area of about 50 m$^2$/g to about 200 m$^2$/g, or 80 m$^2$/g to about 120 m$^2$/g. In one embodiment, the porous carbon nanotube filter materials can have a specific surface area of about 100 m$^2$/g, e.g., to provide a large number of active adsorption, reaction, and/or deposition sites for molecular and/particulate/microorganism removal, respectively. In some embodiments, e.g., for single-walled carbon nanotubes, the porous carbon nanotube filter materials can have a specific surface area up to about 1500 m$^2$/g.

Thickness of the carbon nanotube filter material can vary in accordance with different embodiments of the invention. In some embodiments, the filter material can have a thickness ranging from about 5 μm to about 1000 μm, from about 5 μm to about 500 μm, from about 5 μm to about 250 μm, from about 10 μm to about 100 μm, or from about 15 μm to about 80 μm. In one embodiment, the filter material has a thickness of about 10 μm to about 30 μm. In one embodiment, the filter material has a thickness of about 25 μm to about 80 μm. Different carbon nanotube filter thickness can be used based upon the properties of the input fluid and contaminants therein, the respective concentration of the contaminants, and/or the desired contact surface area of the carbon nanotube filter material. For example, a higher contact surface area of the carbon nanotube filter material can be achieved by increasing the loading of the carbon nanotubes and thus the thickness of the carbon nanotube filter material. As illustrated in the Examples, a thinner carbon nanotube filter material can be used to reduce pathogens (e.g., viruses and bacteria) in a contaminated aqueous fluid, as compared to reducing organic molecules therein. In some embodiments, the filter material can have a thickness in the millimeter or centimeter range, e.g., a thickness of at least about 1 mm, at least about 3 mm, at least about 5 mm, at least about 1 cm, at least about 5 cm, at least about 10 cm, at least about 20 cm, at least about 30 cm, at least about 40 cm, at least about 50 cm or thicker. Such filter material can be used in an industrial-type filter, such as a packed-bed filter.

In some embodiments, the porous carbon nanotube filter material can be a composite of two or more layers of the carbon nanotube filter materials. Each carbon nanotube filter material layer can have different porosity, pore size, and/or loading and types of carbon nanotubes.

The design (e.g., shape or size) of the carbon nanotube filter material can vary according to the shape, size and capacity of the filtration apparatus. Depending upon the design of the housing, the filter material can have any shape. In one embodiment, a circular filter material is encased inside a cylindrical housing (FIG. 1C). Further, the diameter of the filter material can be adjusted according to the width of the housing, and/or the desired throughput of the filtration apparatus described herein. If a higher filtration throughput is desired for processing a large volume of a fluid, e.g., in a wastewater treatment plant, a filter material with a larger cross-sectional area could be used. On the other hand, if the filter material is designed for a portable filtration device, the size of the filter has to be taken into consideration with respect to ease of transport. Accordingly, the size of the filter material 108 can vary from millimeters to meters, e.g., from about 5 mm to about 500 m, from about 10 mm to about 250 m, from about 20 mm to about 100 m, from about 30 mm to about 50 m, from about 35 mm to about 25 m. In one embodiment, the diameter of the filter material is comparable to the width of the housing (FIG. 1E), e.g., from about 30 mm to about 60 mm. In some embodiments, the filtration apparatus can be designed for processing micro-volume of fluid. In such cases, the size of the filter material can be reduced down to a micro-meter level, and vary from about 10 μm to about 1000 μm, from about 20 μm to about 750 μm, from about 50 μm to about 500 μm, or from about 20 μm to about 500 μm.

Without limitations, alternative filter designs, other than a flat-sheet filter material as illustrated in FIG. 1A, can be used for the purpose of the invention. For example, a hollow-fiber filter material, e.g., hollow fibers arranged in a coaxial configuration, can be wrapped or encased by a second conducting material. In such configuration, a pressure source, e.g., vacuum, can be used to draw the fluid through the pores and into the hollow-fiber filter material.

In additional embodiments, the carbon nanotube filter material can include an agent, e.g., to target a desired component, to enhance its electrical properties, or to enhance its electrochemical activity. In some embodiments, the agent can be dispersed within the carbon nanotube filter material. In some embodiments, the agent can be dispersed in a coating (e.g., a film coating or a particle coating) formed on the surface of the carbon nanotube filter material. In some embodiments, the agent can be bonded to the carbon nanotube filter material. Exemplary agents can include, but are not limited to, peptides, nucleic acid (e.g., DNA or RNA), antibodies, small molecules, biological or organic enzymes, catalysts, and inorganic compounds (e.g., metal, transition metal, non-metal, and oxides). In one embodiment, the agent is a catalyst, which can be selected from a metal, a metal alloy, a metal oxide, a doped metal oxide or any combination thereof. Non-limiting examples of a catalyst include platinum and platinum alloys, silver and silver alloys, nickel and nickel alloys, tin oxide and doped tin oxides, titanium oxide and doped titanium oxide, and any combination thereof.

In certain embodiments, the agent described herein can be dispersed in a network of carbon nanotubes. In some embodiments, the agent described herein can be dispersed within the carbon nanotubes. In other embodiments, the agent can be incorporated into the structure of the carbon nanotubes. In alternative embodiments, the agent described herein can be dispersed in a coating (e.g., a film coating or a particle coating) formed on the surface of the carbon nanotubes.

As used herein, "carbon nanotubes" refers to graphene sheets rolled into single-walled nanotubes (SWNTs) or coaxial double- and multi-walled nanotubes (DWNTs and MWNTs) (2). In one embodiment, the carbon nanotubes can be multi-walled carbon nanotubes. For example, the multi-walled carbon nanotubes can comprise at least two layers (e.g., in concentric tubes) of graphite, including at least three layers, at least four layers, at least five layers, at least six layers, at least seven layers or more, of carbon or its allotropes. In another embodiment, the carbon nanotubes can be a combination of SWNTs and MWNTs. In accordance with some embodiments of the invention, the CNTs can have high aspect ratios ($10^3$-$10^7$), large specific surface areas (50-1000 $m^2$ $g^{-1}$) (3), exceptional mechanical strength (4), and be conducting or semiconducting (5). The conductive nature of CNTs [4] allows for simultaneous electrochemistry during the filtration process that can enhance separation of contaminants from an aqueous and/or and electrochemically inactivate the contaminants.

In some embodiments, at least a portion of the carbon nanotubes can be doped carbon nanotubes. As used herein, the term "doped" is used in reference to the presence of at least one ion or atom, other than carbon, in the crystal structure of the rolled sheets of hexagonal carbon. That is, doped carbon nanotubes have at least one carbon in the hexagonal ring replaced with a non-carbon atom. Examples of non-carbon atoms include, without limitations, a trivalent atom or p-type dopant (e.g., elements with three valence electrons such as boron or aluminum), a pentavalent atom or a n-type dopant (e.g., elements with five valence electrons such as nitrogen and phosphorous), a halogen (e.g., F, Cl, or Br) and any combinations thereof. In some embodiments, the doped carbon nanotubes can be nitrogen-doped carbon nanotubes. In some embodiments, the doped carbon nanotubes can be boron-doped carbon nanotubes. In some embodiments, the doped carbon nanotubes can be fluorine-doped carbon nanotubes, e.g., by fluorination. Doping can influence the physical and/or chemical properties of the carbon nanotubes such as conductivity and specific capacitance, and thus the electrochemical activity of the CNT filter material. Doping of carbon nanotubes are known to one of skill in the art, e.g., see the chapter of "Doping of carbon nanotubes" in "Doped Nanomaterials and Nanodev ices," Wei Chen (2010) Volume 3.

According to some embodiments, at least a portion of the carbon nanotubes can be doped with boron, nitrogen, or a combination thereof. In one embodiment, for example, doped carbon nanotubes can comprise boron in an amount ranging from about 0.01 weight percent to about 10 weight percent. In another embodiment, doped carbon nanotubes can comprise about 0.1 weight percent boron to about 5 weight percent. In other embodiments, doped carbon nanotubes can comprise nitrogen in an amount ranging from about 0.01 weight percent to about weight 20 percent, from about 0.1 weight percent to about 10 weight percent, or from about 0.1 weight percent to about 5 weight percent. In some embodiments, doped carbon nanotubes can comprise boron and nitrogen. In such embodiments, doped carbon nanotubes can have any weight percent of boron and nitrogen as described herein, for example, between about 0.01 weight percent and about 10 weight percent, or between about 0.1 weight percent and about 5 weight percent, of boron and nitrogen.

The diameter and length of the carbon nanotubes can be changed to modify the structure (e.g., porosity and/or pore size) and/or property of the carbon nanotube filter material. In some embodiments, the diameter of the carbon nanotubes can be in a range of about 0.1 nm to about 100 nm, about 0.5 nm to about 100 nm, about 0.5 nm to about 50 nm, about 0.5 nm to about 40 nm, about 0.5 nm to about 30 nm, about 1 nm to about 30 nm, or about 5 nm to about 30 nm. In some embodiments, the length of the carbon nanotubes can be in a range of about 20 nm to about 200 nm, about 30 nm to about 180 nm, about 50 nm to about 150 nm, or about 50 nm to about 130 nm. With respect to the length of the carbon nanotubes, it can be in a range of about 10 μm to about 500 μm, about 25 μm to about 400 μm, or about 50 μm to about 200 μm.

In some embodiments, the carbon nanotubes can comprise amorphous carbon, which is an allotrope of carbon without a crystalline structure. In some embodiments, the carbon nanotubes can comprise amorphous carbon at a percentage of less than 20%, less than 10%, less than 5%, or less than 3%.

In some embodiments, the carbon nanotubes can comprise metal residues, e.g., metal residues arising from the use of a metal, e.g., iron, as a catalyst during synthesis of carbon nanotubes. In such cases, the carbon nanotubes can comprise metal residues of up to about 20%, about 15%, about 10%, or about 5%. In one embodiment, the carbon nanotubes comprise about 8% to about 9% residual iron. In one embodiment, the carbon nanotubes comprise about 4% to about 5% residual iron.

In some embodiments, the porous carbon nanotube (CNT) filter material can further include porous polymer material, e.g., for increasing the stability of the porous carbon nanotube filter material for repeated use. An exemplary porous polymer material that can be added into the porous carbon nanotube filter material includes polyvinylidene fluoride (PVDF). In one embodiment, the porous carbon nanotube filter material can comprise about 1-30% CNT, or about 1-10% CNT or about 1-5% CNT in porous polymer material, e.g., but not limited to PVDF. In some embodiments, other porous polymer material used in the laminated filter can also be added in the porous carbon nanotube filter material.

Carbon nanotubes (CNTs) can be produced by any methods known in the art, e.g., arc discharge method, laser evaporation method, or chemical vapor deposition method. Depending upon the structure or configuration of the carbon nanotubes, a skilled artisan can select appropriate methods to prepare the desired carbon nanotubes. Alternatively, commercially-available carbon nanotubes, e.g., from Nanotech Labs, can also be purchased for use in the invention.

In some embodiments, at least a portion of the carbon nanotubes can be subjected to at least one processing treatment (including at least two, at least three, at least four or more processing treatments), e.g., to increase reactive CNT surface sites and/or to enhance the electrooxidative performance of the anodic porous carbon nanotube filter material described herein. For example, the surface chemistry of at least a portion of the carbon nanotubes can be modified by at least one processing treatment (including at least two, at least three, at least four or more processing treatments), e.g., to affect the chemical, physical and/or electrochemical properties of the carbon nanotubes such as chemical absorption, colloidal properties, antimicrobial properties, and/or electrooxidative performance.

Various processing treatments to modify surface chemistry of the carbon nanotubes are known in the art. Examples of such processing treatments include, but are not limited to, chemical modification of the carbon nanotubes with a functional group (e.g., a chemical functional groups such as a carbonyl group), functionalization of the carbon nanotubes with a polymer or dendrimer, photo-oxidation (e.g., with UV radiation), plasma polymerization, high-temperature heating, silanization, acid-oxidation, calcination, surface coating treatment (e.g., coating with catalyst particles), and any combinations thereof. Depending on desired properties of the CNTs, one of skill in the art can perform appropriate art-recognized surface treatments accordingly.

In some embodiments, at least a portion of the carbon nanotubes can be subjected to at least one processing treatment comprising high-temperature heating or calcination. The term "calcination" as used herein refers to a thermal process applied to carbon nanotubes generally to remove any amorphous or other carbon impurities. The calcination process generally takes places at temperatures below the melting point of the carbon nanotubes. For example, calcination of the carbon nanotubes can be carried out in air heated to about 200° C.-about 800° C., or to about 400° C.-about 700° C. In some embodiments, the calcination can be performed at higher temperatures, e.g., up to about 1200° C. under different pressure conditions. For example, calcination of the carbon nanotubes can be carried out at higher temperatures (e.g., up to about 1200° C.) in the absence of oxygen, either in vacuum or in the presence of hydrogen and/or an inert gas such as argon. Such higher temperature anoxic treatment can result in calcination with no formation of oxidation functional groups. In some embodiments, calcination of carbon nanotubes can be performed in a variety of gases containing oxygen, and/or at a variety of pressures, such as between $10^{-5}$ bar and 10 bars, or higher, provided that a mild oxidation of the nanotube results that does not affect the performance of the carbon nanotube filter material. Any other art-recognized calcination methods for carbon nanotubes, e.g., the method described in U.S. Pat. App. No.: US 2008/0292530, can be used to treat the carbon nanotubes.

In one embodiment, the carbon nanotubes can be calcinated, e.g., in a tube furnace, by increasing the temperature from room temperature to about 400° C. at any reasonable rate, e.g., at a rate of about 5° C./min or higher, and maintaining for a certain period of time (e.g., about 1 hour or more) at about 400° C. The duration of the calcination process can range from minutes to days, e.g., 30 mins, 60 mins, 1 hour, 2 hours, 3 hours, 6 hours, 12 hours, 1 day, 2 days or longer, depending on the types and/or concentrations of impurities to be removed, and the calcination temperature. See Example 11 for exemplary methods of CNT calcination and its effects on electrooxidative CNT filter performance.

In some embodiments, at least a portion of the carbon nanotubes can be subjected to at least one processing treatment comprising contacting at least a portion of the carbon nanotubes with an acid, e.g., a mineral acid, an organic acid, or combinations thereof. Examples of acids that can used to treat the carbon nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and any combinations thereof. The acid used can be a pure acid or diluted with a liquid medium, such as an aqueous and/or organic solvent. In some embodiments, concentrated hydrochloric acid can be used, e.g., to remove any metallic or metal oxide impurities (e.g., $Fe_2O_3$ nanoparticles). In some embodiments, concentrated nitric acid can be used, e.g., to induce formation of surficial oxy-functional groups, such as surface carbonyl, hydroxyl, and carboxyl groups. After acid treatment, the acid and impurities can be removed from the carbon nanotubes by washing or rinsing, e.g., with a solvent such as water. See Example 11 for exemplary methods of acid treatment and its effects on electrooxidative CNT filter performance.

In some embodiments, at least one catalyst can be introduced to or dispersed in at least a portion of the carbon nanotube ends, interior and/or exterior surfaces by any known methods in the art, e.g., solution chemical deposition, electrochemical deposition, chemical deposition, physical deposition by evaporation, sputtering, molecular beam epitaxy, electrostatic interaction (e.g., van der Waals forces) or any combination thereof. In some embodiments, the catalyst can be dispersed as individual molecules randomly and/or orderly to at least a portion of the carbon nanotube ends, interior and/or exterior surfaces. In some embodiments, the catalyst can be dispersed in a coating (e.g., a film coating or a particle coating) formed on the surface of at least a portion of the carbon nanotubes.

In some embodiments, the catalyst can be an electrocatalyst. An "electrocatalyst" is generally a material that is capable of increasing the rate of electrochemical oxidation or reduction of a redox reactant, as compared to the rate of electrochemical oxidation or reduction of a redox reactant in the absence of the electrocatalyst. An electrocatalyst can be a metal or a metal alloy (e.g., platinum, silver, nickel, iron, antimony, alloys thereof or any combinations thereof), a metal oxide (e.g., tin oxide or titanium oxide), a doped metal oxide (e.g., doped tin oxide or doped titanium oxide) or any combinations thereof. In some embodiments, the electrocatalyst can comprise metal oxide, e.g., tin oxide or titanium oxide. In one embodiment, the electrocatalyst can comprise doped metal oxide, e.g., doped tin oxide. In such embodiment, the dopant present in the doped metal oxide can comprise antimony, e.g., the electrocatalyst can comprise Sb-doped $SnO_2$ particles.

In some embodiments, the electrocatalyst added to the carbon nanotubes is an electrocatalyst with a high $O_2$ overpotential. The term "overpotential" as used herein is generally referred to the potential (voltage) difference between a half-reaction's thermodynamically determined reduction potential and the potential at which the redox event is experimentally observed. As used herein, the term "high overpotential" generally refers to a condition in which the overpotential is more than the overpotential that would be normally observed for a given reaction. In order to prevent oxygen evolution at an operational potential of the filtration apparatus described herein, e.g., an operational potential of at least about 1.5 V, at least about 2 V, at least about 3 V or higher, an electrocatalyst that allows oxygen evolution to occur at any potential higher than the operational potential can be desirable. In some embodiments, the electrocatalyst with a high $O_2$ overpotential can comprise Sb-doped $SnO_2$ particles.

In one embodiment, at least a portion of the carbon nanotubes can be coated with an electrocatalyst comprising antimony-doped tin oxide (Sb-doped $SnO_2$ particles). By way of example only, the carbon nanotubes coated with Sb-doped $SnO_2$ particles can be prepared by a hydrothermal method (e.g., described in Fujuhara S. et al. (2004) 20 Langmuir 6476; and Wen Z. H. et al. (2007) 17 Adv. Funct. Mater. 2772) or any other methods known in the art. See Example 11 for exemplary methods of Sb-doped $SnO_2$ particle coating and its effects on electrooxidative CNT filter performance.

In some embodiments, the carbon nanotubes can be derivatized or functionalized with one or more functional groups. The functionalization of the carbon nanotubes can be covalent or non-covalent. In some embodiments, the carbon nanotubes can be derivatized or functionalized on their ends or sides with functional groups, such as carboxylic acid, alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally substituted with one or more heteroatom. The number of carbon atoms in the alkyl, acyl, aryl, aralkyl groups can vary depending on types and/or sizes of the functional groups. In some embodiments, the number of carbon atoms in the alky, acyl, aryl, aralkyl groups can be in the range of about 1 to about 30, and in some embodiments in the range of about 1 to about 10. In some embodiments, the carbon nanotubes can be derivatized or functionalized with at least one aryl group or at least one aromatic-type molecules such as pyrene and naphthalene.

In some embodiments, the carbon nanotubes can be derivatized or functionalized with one or more function groups before introduction of a catalyst or an electrocatalyst. In such embodiments, the derivatization or functionalization of the carbon nanotubes can provide catalyst support performance, e.g., by promoting chemical bonding, chelating or creating a polar attraction of the catalyst to the ends and/or sidewalls of the carbon nanotubes. For example, carboxylic acid functional groups on a carbon nanotube can bond, chelate or provide a polar attraction to a catalyst and promote a catalyst-nanotube interaction. The functionality on the carbon nanotubes can provide "docking sites" for the catalyst.

In some embodiments, the carbon nanotubes can be derivatized or functionalized with at least one or more functional groups, e.g., oxy-functional groups, by contacting the carbon nanotubes with an acid, e.g., nitric acid for surficial formation of oxy-functional groups such as carbonyl, hydroxyl, and/or carboxyl groups. Accordingly, in some embodiments, the carbon nanotubes can be treated with an acid, e.g., nitric acid, prior to introduction of a catalyst or an electrocatalyst.

In some embodiments where at least one end of the carbon nanotubes is not initially open, e.g., covered by amorphous carbon, the carbon nanotubes can be subjected to calcination (or high-temperature heating) before any further processing treatments so that the interior surface of the carbon nanotubes can be exposed to any subsequent processing treatments. For example, in some embodiments, the carbon nanotubes can be subjected to calcination before treatment with an acid, e.g., hydrochloric acid or nitric acid. In one embodiment, the carbon nanotubes can be calcinated (or subjected to high-temperature heating) followed by acid treatment and introduction of a catalyst or an electrocatalyst.

In additional embodiments, the carbon nanotubes can be coated with a polymer, e.g., a polymer with ionic properties. In some embodiments, the polymer with ionic properties can comprise a sulfonated tetrafluoroethylene based fluoropolymer-copolymer, e.g., Nafion. Such polymer coating can not only enhance strength and/or durability of the carbon nanotubes, but can also wrap catalyst or electrocatalyst particles to the carbon nanotubes. See, e.g., Example 12. The amount ratio of the polymer to the carbon nanotubes can be value provided that the composition does not significantly affect the permeability and/or porosity of the carbon nanotube filter material. In some embodiments, the ratio of the polymer (e.g., Nafion) to the carbon nanotubes can be less than 1:4, less than 1:5, less than 1:6, less than 1:7, less than 1:8, less than 1:9, less than 1:10 or lower. Additional polymers that can be used to coat the carbon nanotubes include, without limitations, polyvinylidene fluoride (PVDF), polyethersulfone, polyamide, polysulfone, cellulose acetate, polytetrafluoroethylene (PTFE), polystyrene, and any combinations thereof. Any art-recognized polymers typically used in membranes can also be used to coat the carbon nanotubes used in the filtration apparatus described herein.

In some embodiments, surface charges of the carbon nanotubes can be modified, e.g., to effect the adsorption and/or absorption of a contaminant (or a molecule to be removed from an aqueous fluid) on the CNT surface. For example, the carbon nanotubes can be treated with an acid, e.g., nitric acid, to induced formation of negatively-charged surface oxy-groups, for increased adsorption of positively-charged molecules on the CNT surface.

Accordingly, in certain embodiments, at least a portion of the carbon nanotubes can be subjected to at least two processing treatments, at least three processing treatments, at least four processing treatments or more, as described above.

Methods of the Invention

In accordance with the invention, contaminants such as organic molecules and/or biological microorganisms present in a fluid (e.g., but not limited to aqueous fluid, non-aqueous fluid or gaseous fluid) can be reduced after passing through the filtration apparatus of the invention. Accordingly, another aspect of the invention provides for methods of reducing at least one contaminant in a fluid. In some embodiments, the method can include (a) providing at least one filtration apparatus described herein; (b) connecting the first conducting material to a positive pole of a voltage source; (c) connecting the second conducting material to a negative pole of the voltage source; (d) applying a voltage from the voltage source; (e) passing a fluid through the inlet of the filtering apparatus; (f) extracting at least one contaminant in filtration apparatus from the fluid as it flows from the inlet to the outlet; and (g) collecting the fluid from the outlet of the filtration apparatus. In such embodiments, the filtration apparatus can be a dead-end filtration apparatus, e.g., as shown in FIG. 1A. In some embodiments, the fluid can be an aqueous fluid.

In alternative embodiments, the method can include providing (i) a laminated filter described herein extending along a plane between an inlet and a second outlet (for fluid that flows across the laminated filter); (ii) a first conducting connector positioned along the plane between the inlet and the laminated filter, wherein the first conducting connector connects to the first porous carbon nanotube filter material; and (iii) a second conducting connector positioned along the plane between the laminated filter and the second outlet, wherein the second conducting connect connects to the second porous carbon nanotube filter material. To operate the filter, the method can include connecting the first conducting connector to a positive pole of a voltage source; connecting the second conducting connector to a negative pole of the voltage source; applying a voltage from the voltage source; and flowing a fluid parallel to a first surface of the filter from the inlet. A first portion of the fluid flows across the filter separating at least one contaminant from the fluid, whereby the first portion of the fluid exits through the second outlet, and a second portion of the fluid exits through a first outlet (for fluid that does not flows through the laminated filter), thereby reducing the at least one contaminant from the fluid. In some embodiments, the method is used for cross-flow filtration. In some embodiments, the fluid to be filtered can be an aqueous fluid.

As a portion of the fluid does not go through the laminated filter and exits through the first outlet, in some embodiments, the fluid existing through the first outlet can be re-circulated. For example, the fluid existing through the first outlet can be directed to a fluid reservoir such that the fluid can be re-circulated into the inlet again, e.g., as shown in FIG. 59 where an inlet tubing (3) is connected between a fluid reservoir (1) and an inlet to the filter, an recirculating tubing (4) is connected between a fluid reservoir (1) and a first outlet from the filter. Alternatively, the fluid existing through the first outlet can be directly flowed to the inlet again, e.g., via a tubing. Alternatively, the fluid existing through the first outlet can be flowed to at least one different filter, e.g., another cross-flow filter, a dead-end filter, or both, connected in series with or parallel to the laminated filter. In one embodiment, the fluid existing through the first outlet can be flowed to a dead-end filter. In one embodiment, the fluid existing through the first outlet can be flowed to another cross-flow filter. In another embodiment, the fluid existing through the first outlet can be split and flowed to a plurality of filters, e.g., cross-flow filters, dead-end filters, or a combination thereof. In some embodiments, the fluid can be an aqueous fluid.

As an input fluid flows through a laminated filter, a portion of the input fluid is filtered as it flows across the laminated filter. The contaminants or any particulates that are absorbed on the laminated filter can be desorbed and released into another portion of the input fluid that does not flow across the membrane and exists through the first outlet. Accordingly, in some embodiments, the amount of the contaminants and/or particulates can be concentrated in the fluid existing the first outlet. Thus, methods for concentrating a contaminant from an aqueous fluid, e.g., by at least about 10% or more, are also provided herein, wherein the method can comprise flowing an aqueous fluid in parallel to a first surface of the filter from the inlet, and collecting a fluid from the first outlet. In some embodiments where the contaminants are absorbed onto the laminated filter, the contaminants can be desorbed before collecting the fluid existing the first outlet (for fluid that does not goes through the laminated filter).

In some embodiments, the method can further comprising pre-wetting the porous carbon nanotube filter material or the laminated filter, e.g., with an alcohol, water, or a mixture thereof, prior to flowing an aqueous fluid to be filtered. Carbon nanotubes are generally hydrophobic and are thus preferably wetted with a lower surface tension solvent (e.g., ethanol) before use to allow water to permeate into the CNT film pores.

As used herein, the term "reduce" or "reducing" when referring to filtration generally means a decrease in the amount of at least one contaminant present in a fluid (e.g., an aqueous fluid). In some embodiments, the term "reduce" or "reducing" means a statistically significant decrease in the amount of at least one contaminant present in a fluid (e.g., an aqueous fluid), for example, by at least about 5% as compared to the amount in the absence of filtration, for example a decrease by at least about 10%, at least about 20%, at least about 30%, at least about 40%, at least about 50%, at least about 60%, at least about 70%, at least about 80%, at least about 90% or more, up to and including a 100% reduction, or any decrease in the amount of at least one contaminant between 5-100% in a fluid (e.g., an aqueous fluid) as compared to the amount in the absence of filtration.

In reference to reduction of contaminants in a fluid (e.g., an aqueous fluid) by the filtration apparatus of the invention, the term "reduce" or "reducing" can encompass separation of at least one contaminant from a fluid (e.g., an aqueous fluid), e.g., by adsorption or sieving. It can further encompass a transformation of at least one contaminant in a fluid (e.g., an aqueous fluid). With respect to biological contaminants, e.g., biological microorganisms, the transformation of a contaminant can involve a change in cell morphology, e.g., cell shape, structure, composition and/or texture. In some embodiments, a bacterial cell in contact with the carbon nanotube filter material, e.g., *E. coli*, becomes elongated or have a disturbance (e.g., a disruption) in the cell membrane. Additionally or optionally, the transformation of a biological contaminant can involve a decrease or at least a partial inactivation of a cell's function, e.g., cell viability or infectivity. With respect to a non-biological contaminant, e.g., organic molecules, the transformation of a contaminant can mean a change in the molecular composition and/or structure of the contaminant, e.g., by oxidation. In accordance with the invention, the term "reduce" or "reducing" when referring to a contaminant can further encompass a partial or complete destruction of at least one contaminant in a fluid (e.g., an aqueous fluid). For example, contaminants such as organic molecules and/or biological microorganisms in an aqueous fluid can be destroyed by degradation and/or transformation described herein, e.g., oxidation.

In accordance with the invention, non-biological contaminants such as organic molecules or anions in a fluid (e.g., an aqueous fluid) can be adsorbed to the carbon nanotube filter material in the absence of an applied potential. When an applied potential is applied, the adsorbed organic molecules or anions can be oxidized (see Examples 1-6). In one embodiment, the method described herein using an applied potential of about 2 volts results in greater than 90% oxidation of the fluid contaminant during a single pass through the filtration apparatus with a residence time of less than 2 seconds.

In a further accordance with the invention, biological contaminants such as viruses and bacteria in a fluid (e.g., an aqueous fluid) can be sieved and/or adsorbed on the carbon nanotube filter material in the absence of an applied potential. An applied potential can further reduce the number of viruses and bacteria in the fluid, e.g., to the level below the limit of detection, and inactivate the sieved bacteria and adsorbed virus (see Examples 7-10). In one embodiment, the method described herein using an applied potential of about 2 volts to about 3 volts results in at least greater than 90% reduction of bacteria or virus from the aqueous fluid. The term "inactivate" as used herein, in reference to biological microorganisms such as pathogens, refers to a decrease in function of a biological microorganism, e.g., cell viability and/or infectivity. Methods for determining viability and/or infectivity of biological organisms are well established in the art. The methods described in the Materials and Methods for Examples 7-10 can also be used for such purposes.

In accordance with the invention, at least one contaminant present in a fluid (e.g., an aqueous fluid) can be reduced by using the filtration apparatus described herein. By way of example, one embodiment of the filtration apparatus is utilized in describing the methods of the invention. However, as one of ordinary skill will appreciate, various embodiments of the filtration apparatus can be employed in the methods described herein.

In operation, as shown in FIGS. 1A and 1B, the first conducting material 110 should be connected to a positive pole of a voltage source, e.g., via a first conducting lead 116, while the second conducting material 112 is connected to a negative pole of a voltage source, e.g., via a second conducting lead 118.

After both the first and second conducting materials have been properly connected to a voltage source, a voltage or a potential can be supplied to the filtration apparatus from the voltage source. In some embodiments, a potential of at least about 0.5 volt, at least about 1 volt, at least about 2 volts, or at least about 3 volts can be applied to the filtration apparatus. In some embodiments, the potential applied to the filtration apparatus should be less than 10 volts, less than 9 volts, less than 8 volts, less than 7 volts, less than 6 volts, less than 5 volts or less than 4 volts. In one embodiment, a potential of about 0.5 volt to about 4 volts is applied to the filtration apparatus. In another embodiment, a potential of about 2 volts to about 4 volts is applied to the filtration apparatus. In some embodiments, the potential can be constant and in other embodiments, the potential can be alternating. It should be appreciated that the voltage applied during operation of the filtration apparatus can be adjusted accordingly, based upon the preference of an user/operator. For example, if a higher reduction efficiency of the method described herein is desirable, a higher potential/voltage can be applied.

As a voltage applied to the filtration apparatus can be consumed by both the cathode and anode of the filtration apparatus described herein, in some embodiments, the filtration apparatus described herein can be applied with a sufficient voltage such that the filtration apparatus is operated at an anode potential of at least about 0.5 volts, at least about 1 volt, at least about 1.5 volt, at least about 2 volts or more.

In alternative embodiments, the filtration apparatus of the invention can be powered by solar (photovoltaic) energy, e.g., for point-of-use water purification in developing countries.

In the presence of an applied potential, an aqueous fluid can be introduced through the inlet 104 of the filtration apparatus. The fluid can be pumped through the filtration apparatus using various pumps according to the volume and/or flow rate of the fluid to be processed. Non-limiting examples of pumps include micromachined pumps, reciprocating pumps, peristaltic pumps, diaphragm pumps, syringe pumps, volume occlusion pumps and other pumping means known to those skilled in the art. In some embodiments, the aqueous fluid can be introduced through the filtration apparatus by applying a positive force, or by vacuum suction. In some embodiments of the invention, the aqueous fluid can be forced through the filtration apparatus using the forces of gravity.

In some embodiments, for example, a portable filtration apparatus, a syringe loaded with an aqueous fluid can be connected to the inlet of the filtration apparatus. A positive force can then be manually applied to the syringe to push the aqueous fluid through the filtration apparatus into a fluid collection container. In alternative embodiments, the inlet of the filtration apparatus can be connected to a peristaltic pump 120, e.g., via a tubing 122 (e.g., FIG. 1B) to introduce the aqueous fluid through the filtration apparatus.

In some embodiments, the aqueous fluid can be drawn through the filtration apparatus by vacuum suction via the outlet of the filtration apparatus. A skilled artisan is well aware of filtering apparatus and methods in the art that utilize vacuum suction for passing a sample through a filter. Thus, any such apparatus and/or method can be used in accordance with the invention.

In accordance with various embodiments of any methods described herein, a fluid (e.g., an aqueous fluid) can be flowed through a filtration apparatus at any rate, which can be determined according to the application, the characteristics of the input fluid and the desired characteristics of the output fluid. For example, in accordance with one embodiment of the invention, the flow rate of a fluid (e.g., an aqueous fluid) can range from about 500 µL/min to about 10 mL/min, from about 1 mL/min to about 8 mL/min, or from about 1 mL/min to about 5 mL/min. It should be appreciated that a higher or a lower flow rate can be accommodated with various designs of the filtration apparatus, e.g., by increasing or reducing the surface area of the carbon nanotube filter material as well as the filtration apparatus housing and the treatment chamber. Accordingly, in other embodiments, the flow rate of a fluid (e.g., an aqueous fluid) can range from about 10 mL/min to about 1000 L/min, from about 50 mL/min to about 500 L/min, or from about 100 mL/min to about 100 L/min. In embodiments involving a large-volume processing such as in a wastewater treatment plant, an aqueous fluid can flow at a rate of up to about 1000 million gallon per day (MGD), up to about 900 MGD, up to about 800 MGD, or about 700 MGD. In some embodiments, the flow rate of a fluid (e.g., an aqueous fluid) can range from about 500 mL/hr to about 100 L/hr, from about 1 L/hr to about 50 L/hr, from about 2 L/hr to about 25 L/hr. In some embodiments, e.g., for point-of-use applications, the flow rate of a fluid (e.g., an aqueous fluid) can be about 1-2 L/hr.

In some embodiments of any methods described herein, the flow rate can also be normalized to the filter surface area using units of liter per square meter per hour (LMH), or normalized to both surface area and pressure such as liters per square meter per hour per bar (LMH-bar). For example, microfiltration membranes with pore sizes of about 100 nm to about 1000 nm can operate at a normalized flow rate of about 100 LMH to about 1000 LMH. One of skill in the art can readily convert volumetric flow rate as described herein to normalized flow rate with known filter surface area and/or operating pressures.

It is to be understood that the flow rate of a fluid (e.g., an aqueous fluid) through the filter apparatus can be adjusted based on a number of factors such as physical properties of the carbon nanotube filter material (e.g., thickness, pore size, porosity, and filter surface area), possible back pressure build-up during filtration, and desired reduction efficiency. For example, in some embodiments, the flow rate of an aqueous fluid can be reduced when a significant back-pressure accumulates at a higher flow rate. In some embodiments, the flow rate of an aqueous fluid can be decreased to prolong the contact of the aqueous fluid with the carbon nanotube filter material, thus increasing filtration efficiency of the method. Alternatively, the thickness of the carbon nanotube filter material can be increased in a dimension parallel to the direction of fluid flow to provide increased contact and increased efficiency at high flow rates. One of skill in the art can readily determine optimal conditions for each filtration process.

Figure 4A:
FIGS. 4A to 4C show MWNT filter dye adsorption isotherms.
Figure 7A:
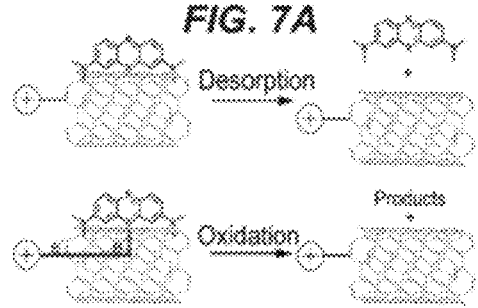
FIGS. 7A to 7C show electrochemical desorption and/or oxidation of adsorbed dye as a function of applied potential. Dye adsorption was completed in the absence of applied potential under similar conditions as described in FIGS. 4A to 4C. Negative time points are the time prior to application of potential at t=0 noted by the vertical dashed line.

As a fluid (e.g., an aqueous fluid) flows from the inlet 104 to the outlet 106, at least one contaminant in the aqueous fluid will be reduced, e.g., by at least about 5%, at least about 10%, at least about 20%, at least about 30%, at least about 40%, at least about 50%, at least about 60%, at least about 70%, at least about 80%, at least about 90%, at least about 95%, at least about 96%, about 97%, about 98%, about 99%, or 100%, relative to the amount in the absence of filtration. Without wishing to be bound by theory, in some embodiments, the contaminant can be reduced in the aqueous fluid by having the contaminant attached to the carbon nanotube filter material (e.g., by adsorption as shown in FIG. 4A, or trapping within filter pores). In further embodiments, contaminant can be reduced in the aqueous fluid by being oxidized or inactivated (e.g., as shown in FIG. 7A and left panel of FIG. 17A). In some embodiments, the contaminant can react with an oxidizing agent produced during the electrochemical filtration process and be oxidized or inactivated (e.g., as shown in the right panel of FIG. 17A). It should be appreciated that since the filtration apparatuses and/or methods described herein can oxidatively inactivate and/or degrade contaminants in an aqueous fluid, the occurrence of adsorption breakthrough observed in the previously-reported carbon nanotube filters (in the absence of an applied potential) can be lowered, resulting in an improved life-time and efficiency of the filtration process. Further, the ability to inactivate biological contaminants in an aqueous fluid by the filtration apparatuses and/or methods described herein can decrease biohazards, e.g., bacterial or viral infection.

In some embodiments, the methods described herein, e.g., for cross-flow filtration, can reduce an amount of at least one contaminant in a fluid (e.g., an aqueous fluid) to be filtered to a level less than or equal to 0.3 NTU (Nephelometric Turbidity Units) 95% of the time. In some embodiments, the methods described herein, e.g., for cross-flow filtration, can reduce an amount of at least one contaminant in a fluid (e.g., an aqueous fluid) to be filtered to a level no more than 1 NTU, no more than 0.8 NTU, no more than 0.6 NTU, or no more than 0.4 NTU or lower.

In some embodiments, the methods described herein, e.g., for cross-flow filtration, can reduce an amount of a biological microorganism present in a fluid (e.g., an aqueous fluid) by at least about 30%, at least about 40%, at least about 50%, at least about 60%, at least about 70%, at least about 90%, at least about 95% or higher, as compared to the amount prior to filtration. In one embodiment, the methods described herein, e.g., for cross-flow filtration, can reduce an amount of a biological microorganism present in a fluid (e.g., an aqueous fluid) to a level below the limit of detection, or to a level that does not cause any adverse health effect to a subject.

In some embodiments, the methods described herein, e.g., for cross-flow filtration, can reduce an amount of natural organic matter, e.g., but not limited to, fulvic acids, humic acids, humins and any combinations thereof, present in a fluid (e.g., an aqueous fluid) by at least about 10%, at least about 20%, at least about 30%, at least about 40%, at least about 50%, at least about 60%, at least about 70%, at least about 80%, at least about 90%, at least about 95% or higher, as compared to the amount prior to filtration.

After the aqueous fluid has passed through the filtration apparatus, the output fluid from the outlet 106 of the apparatus can be collected. In some embodiments, the output fluid can be collected into a collection container 124 as shown in FIG. 1B. In some embodiments, the outlet 106 of the filtration apparatus can be fitted over a collection container, e.g., a bottle. In some embodiments, the output fluid can be directed to another process, e.g., via a tubing, for additional treatment.

Without limitations, the filtration apparatuses or methods of the invention can be combined with other techniques for processing a fluid (e.g., an aqueous fluid). For example, the filtration apparatuses and/or methods described herein can be utilized downstream of a pre-treatment process, e.g., a pre-filtration step to remove large debris and particulates present in an aqueous fluid or to change the physical or chemical characteristics of the fluid to be treats, for example, to adjust the temperature or pH of the fluid. On the other hand, an output fluid collected from the filtration apparatuses and/or methods described herein can be subjected to further processing. In some embodiments, an aqueous fluid can pass through a series of the filtration apparatuses using various embodiments of the methods (e.g., different flow rate or applied potential), wherein each filtration apparatus can be specifically designed for removal of one or more components in the aqueous fluid. In addition, two or more filtration apparatus according to the present invention can be used in parallel to increase the volume of fluid processed.

In some embodiments, the filtration apparatus can be cleaned and/or sterilized before use by various methods known to one of skill in the art. Exemplary sterilization methods include, but not limited to, heat sterilization (e.g., autoclaving), chemical sterilization (e.g., ethylene oxide or alcohol), and radiation sterilization (e.g., UV irradiation or gamma rays).

Figure 7B:
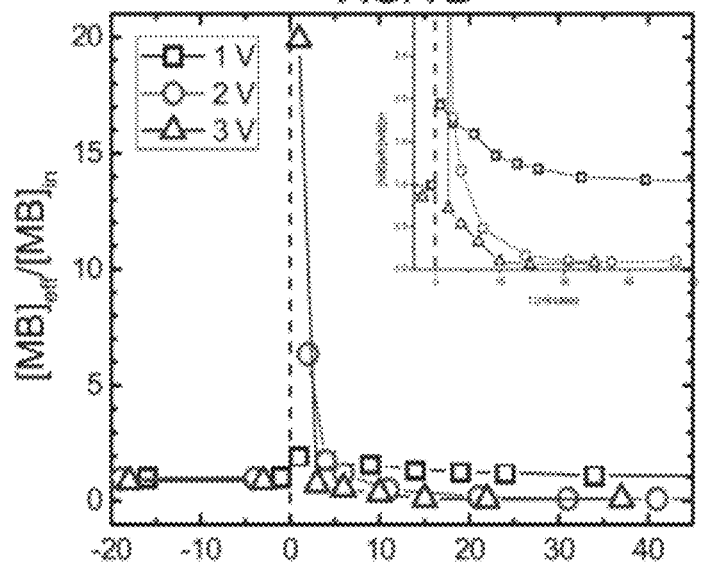

In some embodiments, the filtration apparatus can be disposable after single use or recycled. In accordance with the invention, the carbon nanotube filter material can be cleaned after use, e.g., by running a contaminant-free fluid through the filtration apparatus at an applied potential. In some embodiments, the contaminant adsorbed on the carbon nanotube filter material can be electrostatically desorbed and washed away in a collection fluid. As shown in FIG. 7B, organic molecules, such as positively-charged organic molecules, adsorbed on the carbon nanotube filter material can be desorbed and collected as a more concentrated solution (e.g., for further analysis) at an appropriate potential, while simultaneously regenerating the carbon nanotube filter material. Alternatively, a higher potential can be applied to oxidatively degrade the contaminant adsorbed on the carbon nanotube filter material.

In some embodiments, at least a portion of the first conducting material (e.g., a titanium ring) of the filtration apparatus described herein can be regenerated when needed, e.g., when at least a portion of the first conducting material becomes passivated and/or the filtration efficiency is reduced after it has been used in an electrochemical filtration process for a period of time. An exemplary method for regenerating the first conducting material can include polishing the surface of the first conducting material that contacts the carbon nanotube filter material. See, e.g., Example 13. Alternatively, the first conducting material (e.g., a titanium ring) of the filtration described herein can be simply replaced with a fresh first conducting material (e.g., a fresh titanium ring).

The term "regenerate" as used herein in reference to electrodes, e.g., the first conducting material and/or the CNT filter material, as discussed below, means increasing, reactivating, or restoring the activity or performance of an passivated electrode in an electrochemical filtration process. The performance of the electrode can be reduced or deactivated over time during electrochemical filtration when the electrodes are passivated. The term "passivated" or "passivation" generally means the alteration of a reactive surface to a less reactive state. Passivation of an electrode surface can refer to a process, for example, which can decrease the chemical reactivity (e.g., oxidative performance) of an electrode surface, decrease the number of active reaction sites on an electrode surface, or decrease the affinity of an electrode surface for a molecule to be filtered. Examples of processes or mechanisms that can passivate an electrode (e.g., the first conducting material and/or the CNT filter material) include, but are not limited to, oxidative passivation (e.g., formation of metal oxide on the surface of the first conducting material such as titanium ring, formation of polymer such as aromatic polymer on the surface of CNT filter material, and/or CNT surface oxidation), and/or electrolyte precipitation. Methods for characterizing the performance of the electrode in an electrochemical filtration process are known in the art, including, but not limited to, measuring the current flowing through the filtration apparatus (e.g., with linear sweep voltammetry), measuring the total organic carbon (TOC) content of the output fluid and/or measuring the electrochemical impedance (e.g., with electrochemical impedance spectroscopy). For example, in some embodiments, a passivated electrode (e.g., the first conducting material such as a titanium ring) after regeneration can increase the current flowing through the filtration apparatus. In some embodiments, a passivated electrode (e.g., the carbon nanotube filter material) after regeneration can further decrease the TOC content of the output fluid, and/or decrease electrochemical impedance of the electrochemical filtration process. See, e.g., Example 13, for exemplary methods to monitor electrochemical and passivation processes.

In some embodiments, at least a portion of the carbon nanotube filter material of the filtration apparatus described herein can be regenerated when needed, e.g., when at least a portion of the carbon nanotube filter material becomes passivated and/or the filtration efficiency is reduced after it has been used in an electrochemical filtration process for a period of time. Methods to regenerate at least a portion of the carbon nanotube filter material can include, but are not limited to, flowing an acidic alcohol solution (e.g., acidic ethanol-water mixture) through the carbon nanotube filter material and optionally accompanied with cyclic voltammetry, redispersing or resuspending the carbon nanotube filter material in an organic solvent, with or without sonication (e.g., ultrasonication), followed by subsequent reproduction of the carbon nanotube filter material, calcinating the carbon nanotube filter material at a high temperature (e.g., at 400° C. or higher) and any other art-recognized methods for regenerating the carbon nanotube filter material. Examples of the organic solvent that can be used to resuspend the carbon nanotube filter material for regeneration include, but are not limited to, DMSO, NaOH, HCl, n-methylpyrrolidone, ethanol, toluene and hexane. In some embodiments, the organic solvent can comprise a detergent such as SDS, e.g., NaOH containing about 0.1% SDS.

Depending on the identity and/or amounts of the passivants (e.g., electrolyte precipitation and/or electropolymer passivant) coated on the carbon nanotube surface, one of skill in the art can determine an appropriate regeneration method. For example, in some embodiments, an acidic alcohol wash (e.g., an ethanol-water mixture with a pH value between pH 1 and pH 4) can be sufficient to, at least partially or completely, remove electrolyte precipitates from the carbon nanotube filter material. In some embodiments, calcination (e.g., at 400° C.) can be used to, at least partially or completely, remove an electropolymer passivant from the carbon nanotube filter material. In some embodiments, an acidic solution (e.g., HCl) can be used to, at least partially or completely, remove electropolymer passivant from the carbon nanotube filter material. If the electropolymer passivant appears to be non-polar, non-polar organic solvents are preferably used. For example, in some embodiments, a toluene wash can be used to, at least partially or completely, remove an electropolymer passivant from the carbon nanotube filter material. In some embodiments, a combination of different regeneration methods described herein can be used to remove one or more passivants from the carbon nanotube filter material. See, e.g., Example 13 for different regenerations methods that can be used to regenerate at least a portion of the carbon nanotube filter material.

Contaminant

As used herein, the term "contaminant" refers to any molecule, cell or particulate to be removed from an aqueous fluid. Representative examples of contaminants include, but are not limited to, biological microorganisms (e.g., mammalian cells, pathogens, viruses, bacteria, fungi, yeast, protozoan, microbes, parasites, and combinations thereof), organic molecules, and ions.

In some embodiments, the contaminant is a biological microorganism or pathogen selected from the group consisting of living or dead cells (prokaryotic and eukaryotic, including mammalian), viruses, bacteria, fungi, yeast, protozoan, microbes, parasites, and combinations thereof. As used herein, a pathogen is any disease-causing microorganism.

Exemplary fungi and yeast include, but are not limited to, *Cryptococcus neoformans, Candida albicans, Candida tropicalis, Candida stellatoidea, Candida glabrata, Candida krusei, Candida parapsilosis, Candida guilliermondii, Candida viswanathii, Candida lusitaniae, Rhodotorula mucilaginosa, Aspergillus fumigatus, Aspergillus flavus, Aspergillus clavatus, Cryptococcus neoformans, Cryptococcus laurentii, Cryptococcus albidus, Cryptococcus gattii, Histoplasma capsulatum, Pneumocystis jirovecii* (or *Pneumocystis carinii*), *Stachybotrys chartarum*, and any combinations thereof.

Exemplary bacteria include, but are not limited to: anthrax, *campylobacter*, cholera, diphtheria, enterotoxigenic *E. coli, giardia*, gonococcus, *Helicobacter pylori, Hemophilus influenza* B, *Hemophilus influenza* non-typable, meningococcus, pertussis, pneumococcus, *salmonella, shigella, Streptococcus* B, group A *Streptococcus*, tetanus, *Vibrio cholerae, yersinia, Staphylococcus, Pseudomonas* species, *Clostridia* species, *Myocobacterium tuberculosis, Mycobacterium leprae, Listeria monocytogenes, Salmonella typhi, Shigella dysenteriae, Yersinia pestis, Brucella* species, *Legionella pneumophila, Rickettsiae, Chlamydia, Clostridium perfringens, Clostridium botulinum, Staphylococcus aureus, Treponema pallidum, Haemophilus influenzae, Treponema pallidum, Klebsiella pneumoniae, Pseudomonas aeruginosa, Cryptosporidium parvum, Streptococcus pneumoniae, Bordetella pertussis, Neisseria meningitides*, and any combination thereof.

Parasites include organisms within the phyla Protozoa, Platyhelminthes, Aschelminthes, Acanthocephala, and Arthropoda. Exemplary parasites include, but are not limited to: *Entamoeba histolytica; Plasmodium species, Leishmania* species, Toxoplasmosis, Helminths, and any combination thereof.

Exemplary viruses include, but are not limited to, HIV-1, HIV-2, hepatitis viruses (including hepatitis B and C), Ebola virus, West Nile virus, and herpes virus such as HSV-2, adenovirus, dengue serotypes 1 to 4, ebola, enterovirus, herpes simplex virus 1 or 2, influenza, Japanese equine encephalitis, Norwalk, papilloma virus, parvovirus B19, rubella, rubeola, vaccinia, varicella, Cytomegalovirus, Epstein-Barr virus, Human herpes virus 6, Human herpes virus 7, Human herpes virus 8, Variola virus, Vesicular stomatitis virus, Hepatitis A virus, Hepatitis B virus, Hepatitis C virus, Hepatitis D virus, Hepatitis E virus, poliovirus, Rhinovirus, Coronavirus, Influenza virus A, Influenza virus B, Measles virus, Polyomavirus, Human Papilomavirus, Respiratory syncytial virus, Adenovirus, Coxsackie virus, Dengue virus, Mumps virus, Rabies virus, Rous sarcoma virus, Yellow fever virus, Ebola virus, Marburg virus, Lassa fever virus, Eastern Equine Encephalitis virus, Japanese Encephalitis virus, St. Louis Encephalitis virus, Murray Valley fever virus, West Nile virus, Rift Valley fever virus, Rotavirus A, Rotavirus B. Rotavirus C, Sindbis virus, Human T-cell Leukemia virus type-1, Hantavirus, Rubella virus, Simian Immunodeficiency viruses, and any combination thereof.

In accordance with the invention, the contaminants can be non-biological substances, e.g., organic molecules. Exemplary organic molecules include any molecules that can be adsorbed on the carbon nanotube filter material or be oxidized. In some embodiments, the organic molecules can be positively-charged. In some embodiments, the organic molecules can be negatively-charged. In some embodiments, the organic molecules can be structurally-planar chemical molecules, e.g., aromatic molecules or $sp^2$-conjugated molecules.

In some embodiments, the contaminants include any aqueous ions (e.g., anions) that can be adsorbed on the carbon nanotube filter material or be oxidized. Exemplary anions include, but are not limited to, include iodides, chlorides, chlorites, bromide, bromates, sulfates, sulfites, oxides, nitrates, nitrites, and combinations thereof. In some embodiments, the contaminants can include any aqueous metals that fall into the class of oxyanions. For example, arsenite and arsenate are the two major aqueous arsenic species, which can be found as anions in solutions.

In some embodiments, the contaminants can include other metals, polymer, and/or chemical molecules such as haloactic acids, trihalomethanes, chloramines, chlorine, chlorine dioxide, antimony, arsenic, mercury (inorganic), selenium, thallium, Acrylamide, Alachlor, Atrazine, Benzene, Benzo (a)pyrene (PAHs), Carbofuran, Carbon, etrachloride, Chlordane, Chlorobenzene, 2,4-D, Dalapon, 1,2-Dibromo-3-chloropropane (DBCP), o-Dichlorobenzene, p-Dichlorobenzene, 1,2-Dichloroethane, 1,1-Dichloroethylene, cis-1,2-Dichloroethylene, trans-1,2-Dichloroethylene, Dichloromethane, 1,2-Dichloropropane, Di(2-ethylhexyl) adipate, Di(2-ethylhexyl) phthalate, Dinoseb, Dioxin (2,3, 7,8-TCDD), Diquat, Endothall, Endrin, Epichlorohydrin, Ethylbenzene, Ethylene dibromide, Glyphosate, Heptachlor, Heptachlor epoxide, Hexachlorobenzene, Hexachlorocyclopentadiene, Lead, Lindane, Methoxychlor, Oxamyl (Vydate), Polychlorinated, biphenyls (PCBs), Pentachlorophenol, Picloram, Simazine, Styrene, Tetrachloroethylene, Toluene, Toxaphene, 2,4,5-TP (Silvex), 1,2,4-Trichlorobenzene,
1,1,1-Trichloroethane, 1,1,2-Trichloroethane, Trichloroethylene, Vinyl chloride, Xylenes or combinations thereof.

In some embodiments, the contaminant can include any compound present in wastewater.

Fluids, e.g., Aqueous, Non-aqueous, and Gaseous Fluids

In accordance with the invention, any fluid can pass through the filtration apparatus described herein. The fluid can be liquid, supercritical fluid, solutions, suspensions, gases, gels, and combinations thereof. In some embodiments, the input fluid can be aqueous or non-aqueous.

In some embodiments, the input fluid can be a gaseous fluid, e.g., but not limited to $SO_2$.

In some embodiments, the input fluid can be non-aqueous. As used herein, the term "non-aqueous fluid" refers to any flowable water-free material that comprises at least one contaminant described herein. Accordingly, in some embodiments, a non-aqueous fluid can be an organic solvent, e.g., acetone, or an inorganic solvent, e.g., $SOCl_2$ and $SO_2$. The term "solvent" as used herein refers to a liquid, solid, or gas that dissolves another solid, liquid, or gaseous solute, e.g., contaminant as described herein.

In some embodiments, non-aqueous fluids can be non-polar solvents, polar aprotic solvents, polar protic solvents, or a combination thereof. Exemplary non-polar solvents include, but are not limited to, pentane, cyclopentane, hexane, cyclohexane, benzene, toluene, 1,4-dioxane, chloroform, and diethyl ether. Exemplary polar aprotic solvents include, but are not limited to, dichloromethane, tetrahydrofuran, ethyl acetate, acetone, dimethylformamide, acetonitrile, and dimethyl sulfoxide. Exemplary polar protic solvents include, but are not limited to, formic acid, n-butanol, isopropanol, n-propanol, ethanol, methanol, and acetic acid.

In some embodiments, the input fluid can be an aqueous fluid. As used herein, the term "aqueous fluid" refers to any flowable water-containing material that comprises at least one contaminant described herein.

In some embodiments, the aqueous fluid is a biological fluid. Exemplary biological fluids include, but are not limited to, blood (including whole blood, plasma, cord blood and serum), lactation products (e.g., milk), amniotic fluids, sputum, saliva, urine, semen, cerebrospinal fluid, bronchial aspirate, perspiration, mucus, liquefied feces, synovial fluid, lymphatic fluid, tears, tracheal aspirate, and fractions thereof.

Another example of a group of biological fluids are cell culture fluids, including those obtained by culturing or fermentation, for example, of single- or multi-cell organisms, including prokaryotes (e.g., bacteria) and eukaryotes (e.g., animal cells, plant cells, yeasts, fungi), and including fractions thereof.

In some embodiments, the aqueous fluid is a non-biological fluid. As used herein, the term "non-biological fluid" refers to any aqueous fluid that is not a biological fluid as the term is defined herein. Exemplary non-biological fluids include, but are not limited to, water, salt water, brine, buffered solutions, saline solutions, sugar solutions, carbohydrate solutions, lipid solutions, nucleic acid solutions, hydrocarbons (e.g. liquid hydrocarbons), acids, gasolines, petroleum, liquefied samples (e.g., liquefied samples), and mixtures thereof.

In some embodiments, the aqueous fluid is a media or reagent solution used in a laboratory or clinical setting, such as for biomedical and molecular biology applications. As used herein, the term "media" refers to a medium for maintaining a tissue or cell population, or culturing a cell population (e.g. "culture media") containing nutrients that maintain cell viability and support proliferation.

As used herein, the term "reagent" refers to any solution used in a laboratory or clinical setting for biomedical and molecular biology applications. Reagents include, but are not limited to, saline solutions, PBS solutions, buffered solutions, such as phosphate buffers, EDTA, Tris solutions, and any combinations thereof. Reagent solutions can be used to create other reagent solutions. For example, Tris solutions and EDTA solutions are combined in specific ratios to create "TE" reagents for use in molecular biology applications.

In some embodiments, the aqueous fluid can be a water-containing fluid comprising organic molecules, anions, biological microorganisms, or a mixture thereof described herein.

In some embodiments, the aqueous fluid can be a salt solution comprising organic molecules, anions, biological microorganisms, or a mixture thereof described herein.

In one embodiment, the aqueous fluid is wastewater.

In some embodiments of the invention, the aqueous fluid can include at least one electrolyte. As used herein, the term "electrolyte" refers to any substance containing free ions that make the substance electrically conductive. An electrolyte that can be used for the purpose of the invention can be an ionic solution, but molten electrolytes and solid electrolytes can also be used. In some embodiments, the electrolyte can normally or inherently be present in the aqueous fluid. In some embodiments, the electrolyte can be added to the aqueous fluid before, or during the filtration process.

Generally, electrolytes are solutions of acids, bases or salts. Furthermore, some gases may act as electrolytes under conditions of high temperature or low pressure. Electrolyte solutions can also result from the dissolution of some biological (e.g., DNA, polypeptides) and synthetic polymers (e.g., polystyrene sulfonate), termed polyelectrolytes, which contain charged functional groups.

In one embodiment, the electrolyte is a salt solution, e.g., sodium chloride (NaCl), sodium iodide (NaI), sodium sulfate ($Na_2SO_4$).

In various embodiments, the concentration of electrolytes in an aqueous fluid can range from about 0.01 mM to about 1000 mM, from about 0.1 mM to about 500 mM or from about 0.5 mM to about 250 mM. In accordance with the invention, the current generated during the filtration process generally increases with increasing electrolyte concentration at an applied potential. In one embodiment, the electrolyte concentration is between 5 mM and 50 mM. In some embodiments, the concentration of electrolytes, e.g., salts, in an aqueous fluid can be greater than 500 mM, greater than 1 M, greater than 5 M, greater than 10 M, greater than 25 M, or greater than 50 M.

The present invention may be defined in any of the following numbered paragraphs:

1. A filtration apparatus, comprising:
   a housing forming a chamber, the chamber including an inlet for receiving an input fluid and an outlet for releasing an output fluid;
   a porous carbon nanotube filter material positioned between the inlet and the outlet, wherein at least a portion of the porous carbon nanotube filter material is in contact with a first conducting material; and
   a second conducting material positioned between the inlet and the outlet.
2. The filtration apparatus of paragraph 1, wherein the housing has at least two openings for a first and a second conducting leads, wherein the first conducting lead contacts the first conducting material and the second conducting lead contacts the second conducting material.
3. The filtration apparatus of paragraph 1 or 2, wherein the second conducting material and the first conducting material are spaced apart.
4. The filtration apparatus of paragraph 1 or 2, wherein the second conducting material and the porous carbon nanotube filter material are spaced apart.
5. The filtration apparatus of any of paragraphs 1-3, wherein the first conducting material includes titanium.
6. The filtration apparatus of any of paragraphs 1-4, wherein the second conducting material is permeable to an input fluid.
7. The filtration apparatus of any of paragraphs 1-4, wherein the second conducting material includes stainless steel.
8. The filtration apparatus of any of paragraphs 1-3, wherein the first conducting material is connected to a negative pole of a voltage source.
9. The filtration apparatus of any of paragraphs 1-3, wherein the first conducting material is connected to a positive pole of a voltage source.
10. The filtration apparatus of any of paragraphs 1-4, wherein the second conducting material is connected to a negative pole of a voltage source.
11. The filtration apparatus of any of paragraphs 1-4, wherein the second conducting material is connected to a positive pole of a voltage source.
12. The filtration apparatus of any of paragraphs 8-11, wherein the voltage source produces a potential of less than 10 volts.
13. The filtration apparatus of paragraph 12, wherein the voltage source produces a potential of at least about 1 volt.
14. The filtration apparatus of paragraph 13, wherein the voltage source produces a potential of at least about 2 volts.
15. The filtration apparatus of paragraph 1, wherein the carbon nanotube filter material includes a network of carbon nanotubes.
16. The filtration apparatus of paragraph 15, wherein the carbon nanotubes are multi-walled carbon nanotubes.
17. The filtration apparatus of any of paragraphs 1-16, wherein at least a portion of the carbon nanotubes are doped with at least one atom.
18. The filtration apparatus of paragraph 17, wherein said at least one atom is nitrogen, boron, fluorine or a combination thereof.
19. The filtration apparatus of any of paragraphs 1-18, wherein at least a portion of the carbon nanotubes are surface modified by at least one processing treatment.
20. The filtration apparatus of paragraph 19, wherein said at least one processing treatment comprises heating said at least a portion of the carbon nanotubes to a high temperature.
21. The filtration apparatus of paragraph 20, wherein the high temperature is at least about 200° C.
22. The filtration apparatus of paragraph 21, wherein the high temperature is at least about 400° C.
23. The filtration apparatus of any of paragraphs 19-22, wherein said at least one processing treatment comprises contacting said at least a portion of the carbon nanotubes with an acid.
24. The filtration apparatus of paragraph 23, wherein the acid is selected from a group consisting of hydrochloric acid, nitric acid, hydrofluoric acid, hydrobromic acid, hydroiodic acid, sulfuric acid, oleum, citric acid, oxalic acid, chlorosulfonic acid, phosphoric acid, trifluoromethane sulfonic acid, glacial acetic acid, monobasic organic acids, dibasic organic acids, and any combinations thereof.
25. The filtration apparatus of any of paragraphs 1-24, wherein said at least a portion of the carbon nanotubes comprise a polymer coating.
26. The filtration apparatus of paragraph 25, wherein the polymer coating comprises sulfonated tetrafluoroethylene based fluoropolymer-copolymer, polyvinylidene fluoride (PVDF), polyethersulfone, polyamide, polysulfone, cellulose acetate, polytetrafluoroethylene (PTFE), polystyrene, or any combinations thereof.
27. The filtration apparatus of any of paragraphs 1-26, wherein the carbon nanotube filter material includes a catalyst.
28. The filtration apparatus of paragraph 27, wherein the catalyst is an electrocatalyst with a high $O_2$ overpotential.
29. The filtration apparatus of any of paragraphs 27-28, wherein the catalyst is dispersed within the carbon nanotubes.
30. The filtration apparatus of any of paragraphs 27-29, wherein the catalyst is present in a coating of the carbon nanotubes.

31. The filtration apparatus of any of paragraphs 27-30, wherein the catalyst is selected from metal, metal alloy, metal oxide, doped metal oxide, or any combination thereof.
32. The filtration apparatus of paragraph 31, wherein the metal is selected from platinum, silver, nickel, iron, antimony, or any combination thereof.
33. The filtration apparatus of paragraph 31 or 32, wherein the metal oxide is selected from tin oxide, titanium oxide or a combination thereof.
34. The filtration apparatus of any of paragraphs 31-33, wherein the doped metal oxide is selected from doped tin oxide or doped titanium oxide.
35. The filtration apparatus of paragraph 34, wherein the dopant present in the doped metal oxide comprises antimony.
36. The filtration apparatus of any of paragraphs 1-35, wherein said at least a portion of the carbon nanotubes are subjected to at least two processing treatments comprising heating to the high temperature and contacting with the acid.
37. The filtration apparatus of any of paragraphs 1-36, wherein said at least a portion of the carbon nanotubes are subjected to said at least three processing treatments comprising heating to the high temperature, contacting with the acid, and coating with doped metal oxide.
38. The filtration apparatus of any of paragraphs 1-37, wherein the carbon nanotube filter material has a porosity of at least about 10%.
39. The filtration apparatus of any of paragraphs 1-38, wherein the carbon nanotube filter material has an average pore size of at least about 0.5 nm.
40. The filtration apparatus of any of paragraphs 1-39, further comprises a vent to release gas accumulated within the chamber during a filtration process.
41. The filtration apparatus of any of paragraphs 1-40, wherein at least a portion of the carbon nanotubes are functionalized with one or more functional groups or molecules.
42. The filtration apparatus of paragraph 41, wherein said one or more functional groups comprise pyrene, naphthalene or other aromatic-type molecules.
43. A method for reducing at least one contaminant in an aqueous fluid, the method comprising:
    providing at least one filtration apparatus of any of paragraphs 1 to 42;
    connecting the first conducting material to a positive pole of a voltage source;
        connecting the second conducting material to a negative pole of the voltage source;
    applying a voltage from the voltage source;
    flowing the aqueous fluid through the porous carbon nanotube filter material from the inlet of the filtration apparatus, wherein the porous carbon nanotube filter material separates said at least one contaminant from the aqueous fluid; and
    collecting the output fluid from the outlet of the filtration apparatus, thereby reducing said at least one contaminant from the aqueous fluid.
44. The method of paragraph 43, wherein the aqueous fluid includes an electrolyte.
45. The method of paragraph 43 or 44, wherein the aqueous fluid includes the at least one contaminant selected from organic molecules, ions, biological microorganisms, or a combination thereof.
46. The method of paragraph 45, wherein the ions are anions.
47. The method of paragraph 45, wherein the biological microorganisms are selected from cells, viruses, bacteria, fungi, yeast, protozoan, microbes, parasites, or a combination thereof.
48. The method of any of paragraphs 43-47, wherein the aqueous fluid is water.
49. The method of any of paragraphs 43-48, wherein the voltage generated by the voltage source is not greater than 10 volts.
50. The method of any of paragraphs 43-49, wherein the voltage generated by the voltage source is at least about 1 volt.
51. The method of any of paragraphs 43-50, wherein the voltage generated by the voltage source is at least about 2 volts.
52. The method of any of paragraphs 43-51, wherein the at least one contaminant in the aqueous fluid is reduced by at least about 5%.
53. The method of any of paragraphs 43-52, further comprising regenerating at least the first conducting material of the filtration apparatus or the carbon nanotube filter material.
54. The method of paragraph 53, wherein the first conducting material of the filtration apparatus is regenerated by polishing a surface of the first conducting material.
55. The method of paragraph 53, wherein the carbon nanotube filter material of the filtration apparatus is regenerated by contacting the carbon nanotube filter material with an organic solvent.
56. The method of paragraph 53, wherein the carbon nanotube filter material is regenerated by contacting the carbon nanotube filter material with an acid.
57. The method of paragraph 53, wherein the carbon nanotube filter material is regenerated by calcination.
58. A filtration apparatus, comprising:
    a housing forming a chamber having a plane, the chamber including an inlet for receiving an input fluid, a first outlet for releasing fluid, and a second outlet for releasing filtered fluid, wherein the inlet and the first outlet are disposed on a first side of the plane, and the second outlet is disposed on a second side of the plane;
    a filter positioned along the plane between the inlet and the second outlet, the filter comprising at least one porous polymer layer disposed between a first porous carbon nanotube filter material and a second porous carbon nanotube filter material;
    a first conducting connector positioned along the plane between the inlet and the carbon nanotube-based filter; and
    a second conducting connector positioned along the plane between the carbon nanotube-based filter and the second outlet.
59. The apparatus of paragraph 58, wherein the first conducting connector is in contact with a portion of the first porous carbon nanotube filter material.
60. The apparatus of any of paragraphs 58-59, wherein the second conducting connector is in contact with a portion of the second porous carbon nanotube filter material.
61. The apparatus of any of paragraphs 58-60, wherein at least one of the first conducting connector and the second conducting connector has a thickness of about 20 μm to about 1000 μm or about 100 μm to about 150 μm.

62. The apparatus of any of paragraphs 58-61, wherein the first conducting connector and the second conducting connector are configured to separate from each other to prevent a short circuit.

63. The apparatus of any of paragraphs 58-62, wherein the first conducting connector and the second conducting connector each comprises at least one hole designed for a peg to align the first conducting connector and the second conducting connector with the filter.

64. The apparatus of paragraph 63, wherein a rim of the hole is coated with an electrically-insulating layer.

65. The apparatus of any of paragraphs 63-64, wherein the peg is an electrically-insulating peg.

66. The apparatus of any of paragraphs 58-65, wherein at least one of the first conducting connector and the second conducting connector includes titanium.

67. The apparatus of any of paragraphs 58-66, wherein a flux through the porous polymer layer is at least 70% of a flux through the first porous carbon nanotube filter material or the second porous carbon nanotube filter material.

68. The apparatus of any of paragraphs 68-67, wherein the porous polymer layer has a pore size of about 0.01 µm to about 5 µm.

69. The filtration apparatus of any of paragraphs 58-68, wherein the first and the second porous carbon nanotube filter materials comprise undoped carbon nanotubes, nitrogen-doped carbon nanotubes, boron-doped carbon nanotubes, fluorine-doped carbon nanotubes or any combinations thereof.

70. The filtration apparatus of any of paragraphs 58-69, wherein the carbon nanotubes are multi-walled carbon nanotubes.

71. The filtration apparatus of any of paragraphs 58-70, wherein at least a portion of the carbon nanotubes are modified by at least one processing treatment.

72. The filtration apparatus of paragraph 71, wherein said at least one processing treatment is selected from a group consisting of calcination, acid treatment, polymer coating, addition of an electrocatalyst, addition of at least one functional group, and any combinations thereof.

73. The filtration apparatus of any of paragraphs 58-72, wherein the first and the second porous carbon nanotube filter material have an average pore size of at least about 0.5 nm.

74. The filtration apparatus of any of paragraphs 58-73, wherein the first and the second porous carbon nanotube filter material have a specific surface area of about 50 $m^2/g$ to about 200 $m^2/g$, or about 80 $m^2/g$ to about 120 $m^2/g$.

75. A method for reducing at least one contaminant in a fluid, the method comprising:
providing
a filter extending along a plane between an inlet and a second outlet, the filter comprising at least one porous polymer layer disposed between a first porous carbon nanotube filter material and a second porous carbon nanotube filter material;
a first conducting connector positioned along the plane between the inlet and the filter, wherein the first conducting connector connects to the first porous carbon nanotube filter material; and
a second conducting connector positioned along the plane between the filter and the second outlet, wherein the second conducting connect connects to the second porous carbon nanotube filter material;
connecting the first conducting connector to a positive pole of a voltage source;
connecting the second conducting connector to a negative pole of the voltage source;
applying a voltage from the voltage source;
flowing a fluid parallel to a first surface of the filter from the inlet, wherein a first portion of the fluid flows across the filter separating at least one contaminant from the fluid, whereby the first portion of the fluid exits through the second outlet, and a second portion of the fluid exits through a first outlet, thereby reducing the at least one contaminant from the fluid.

76. The method of paragraph 75, wherein the fluid is an aqueous fluid.

77. The method of paragraph 76, wherein the aqueous fluid is water to be filtered.

78. The method of paragraph 76, wherein the aqueous fluid is a biological fluid.

79. The method of any of paragraphs 75-78, wherein the fluid includes the at least one contaminant selected from organic molecules, ions, biological microorganisms, or a combination thereof.

80. The method of any of paragraphs 75-79, wherein the second portion of the fluid existing through the first outlet is directed to flow into the inlet or an inlet to a different filter.

81. The method of any of paragraphs 75-80, wherein the voltage generated by the voltage source is not greater than 10 volts.

82. A filter comprising at least one first porous polymer layer disposed between a first porous carbon nanotube filter material and a second porous carbon nanotube filter material.

83. The filter of paragraph 82, further comprising a second porous polymer layer disposed between the first porous carbon nanotube filter material and a third porous carbon nanotube filter material.

84. The filter of paragraph 82 or 83, further comprising a third porous polymer layer disposed between the second porous carbon nanotube filter material and a fourth porous carbon nanotube filter material.

85. The filter of any of paragraphs 82-84, wherein said at least one porous polymer layer includes polyvinylidene fluoride (PVDF).

Some Selected Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments of the aspects described herein, and are not intended to limit the claimed invention, because the scope of the invention is limited only by the claims. Further, unless otherwise required by context, singular terms shall include pluralities and plural terms shall include the singular.

Other than in the operating examples, or where otherwise indicated, all numbers expressing quantities of ingredients or reaction conditions used herein should be understood as modified in all instances by the term "about." The term "about" when used in connection with percentages may mean±1%.

The singular terms "a," "an," and "the" include plural referents unless context clearly indicates otherwise. Similarly, the word "or" is intended to include "and" unless the context clearly indicates otherwise. Thus for example, references to "the method" includes one or more methods, and/or steps of the type described herein and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

The term "alkyl" as used herein includes both linear and branched chain radicals, for example, but not limited to, methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, and any various branched chain isomers thereof. The chain can be linear or cyclic, saturated or unsaturated, containing, for example, double and/or triple bonds. The alkyl chain can be substituted with, for example, one or more halogen, oxygen, hydroxy, silyl, amino, or other art-recognized substituents.

The term "acyl" as used herein refers to carbonyl groups of the formula —COR wherein R can be any suitable substituent such as, for example, alkyl, aryl, aralkyl, halogen; substituted or unsubstituted thiol; unsubstituted or substituted amino, unsubstituted or substituted oxygen, hydroxy, or hydrogen.

The term "aryl" as used herein refers to monocyclic, bicyclic or tricyclic aromatic groups containing from about 6 to about 14 carbons in the ring portion, such as phenyl, naphthyl substituted phenyl, or substituted naphthyl, wherein the substituent on either the phenyl or naphthyl can be for example $C_{1-4}$ alkyl, halogen, $C_{1-4}$ alkoxy, hydroxy or nitro.

The term "aralkyl" as used herein refers to alkyl groups having an aryl substituent, such as benzyl, p-nitrobenzyl, phenylethyl, diphenylmethyl and triphenylmethyl.

The term "substituted amino" as used herein refers to an amino, which can be substituted with one or more substituents, for example, alkyl, acyl, aryl, aralkyl, hydroxy, and hydrogen.

The term "substituted thiol" as used herein refers to a thiol which can be substituted with one or more substituents, for example, alkyl, acyl, aryl, aralkyl, hydroxy, and hydrogen.

To the extent not already indicated, it will be understood by those of ordinary skill in the art that any one of the various embodiments herein described and illustrated may be further modified to incorporate features shown in any of the other embodiments disclosed herein.

The following examples illustrate some embodiments and aspects of the invention. It will be apparent to those skilled in the relevant art that various modifications, additions, substitutions, and combinations thereof can be performed without altering the spirit or scope of the invention, and such modifications and variations are encompassed within the scope of the invention as defined in the claims which follow. The following examples do not in any way limit the invention.

EXAMPLES

The examples presented herein relate to one or more embodiments of the filtration apparatuses and/or methods described herein for reducing at least one contaminant from an aqueous fluid. In particular, an electrochemically-active multi-walled carbon nanotube (MWNT) filter has been demonstrated for adsorption, desorption, and oxidation of the aqueous dyes; oxidation of the aqueous anions iodide ($I^-$) and chloride ($Cl^-$); and adsorption and/or inactivation of pathogens such as viruses and bacteria.

Materials and Methods for Examples 1-6

Chemicals and Materials. Methylene blue (0.05% in water), methyl orange (>95%), sodium iodide (>99.9%), and sodium chloride (>99.0%) were purchased from Sigma-Aldrich. The multi-walled carbon nanotubes (MWNTs) were purchased from Nanotech Labs in preformed sheets of a range of depths; thin (~40 μm), medium (~70 μm), and thick (~100 μm). The thinnest MWNT sheets, determined to be 41±8 μm by SEM analysis, were used in all experiments unless noted otherwise. All aqueous solutions were made with water from a Barnstead Nanopure Infinity purification system that produced water with a minimal resistivity of 18 MΩ $cm^{-1}$. All solutions contained 10 mM NaCl as a background electrolyte to normalize ionic strength and conductivity unless otherwise noted. For experiments, a methylene blue input fluid was made to a concentration of 7.0±1.0 μM, a methyl orange input fluid was made to a concentration of 25.0±2.0 μM, and an iodide input fluid was made to a concentration of 1 or 10 mM.

Electrochemical Filtration. All filtration experiments were completed using the modified electrochemical filtration casing as described in the Examples. First, a 5-μm pore PTFE membrane was placed on the bottom piece of the casing and wetted. Next, the 47 mm diameter multi-walled carbon nanotube (MWNT) filter (Nanotech Labs) was placed on top of the PTFE membrane and wetted. Then, a layer of water was spread on the MWNT filter and allowed to sit for 10-15 minutes until the water had seeped through the filter. The filtration casing was then sealed and the top half of the casing was primed with deionized water using a needle syringe to remove any air that could restrict flow. Water was then peristaltically pumped (Masterflex) through the filter at 1.5±0.1 mL $min^{-1}$ to compact and rinse the MWNT filter and to calibrate the flow rate, which was measured gravimetrically (Pinnacle, Denver Instruments). After the water rinse was complete, the pump was first primed with the appropriate input fluid solution and then the experiment was started. Sample aliquots were collected directly from the filter casing outlet and analyzed immediately after collection.

UV-Vis Analysis. The quantification of aqueous methylene blue, methyl orange, and triiodide was completed on an Agilent 8453 UV-Visible spectrophotometer. Aliquots (0.5-0.75 mL) of an output fluid were collected from the filter into a 1 mL glass cuvette with a 1 cm pathlength. Methylene blue was quantified by its absorption at $\lambda_{max}$=665 nm (∈=74,100 $M^{-1}$ $cm^{-1}$). For high concentration of methylene blue solutions, absorption at 550 nm (∈=6,190 $M^{-1}$ $cm^{-1}$) was used for quantification. Methyl orange was quantified by its absorption at $\lambda_{max}$=464 nm (∈=26,900 $M^{-1}$ $cm^{-1}$). Triiodide was quantified by its adsorption at 287 nm (∈=40,000 $M^{-1}$ $cm^{-1}$) or 353 nm (∈=26,400 $M^{-1}$ $cm^{-1}$) for low concentrations. High aqueous triiodide concentrations were diluted 10 times with deionized water prior to analysis.

BET Surface Area Analysis. The specific surface area of the MWNT nanotube filters was measured with a Beckman Coulter SA 3100 Surface Area and Pore Size Analyzer. Approximately 0.1 g of filter sample was placed into a glass analysis tube. The sample was dried at 120° C. for 1 hour prior to analysis.

SEM Analysis. Scanning electron microscopy was completed in Harvard's Center for Nanoscale Systems on a Zeiss FESEM Supra55VP. Scanning electron micrographs were analyzed with ImageJ software.

Example 1

Design and Operation of the Electrochemical Filter

Figure 1G:
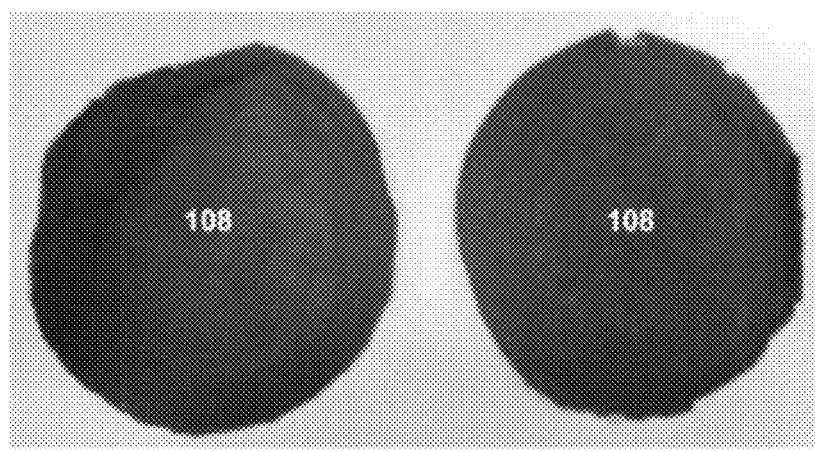
Figure 2A:
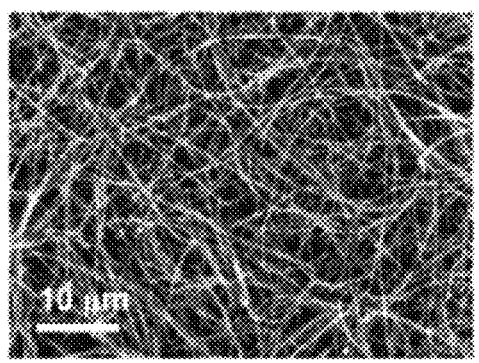
FIGS. 2A to 2F show scanning electron micrographs of the MWNT filter.
Figure 2D:
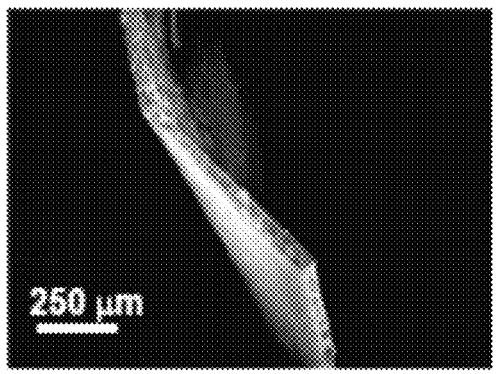
Figure 2B:
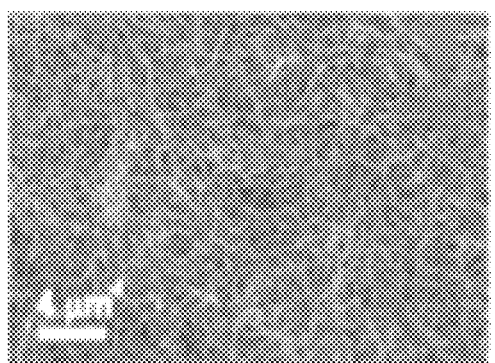
Figure 2E:
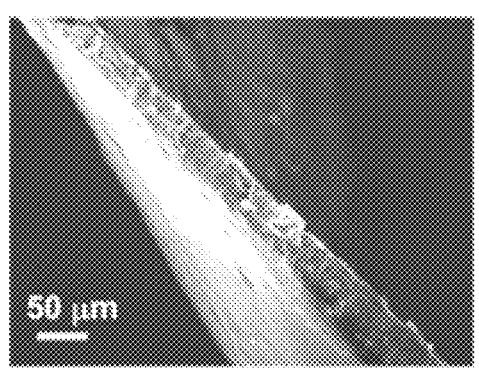
Figure 2C:
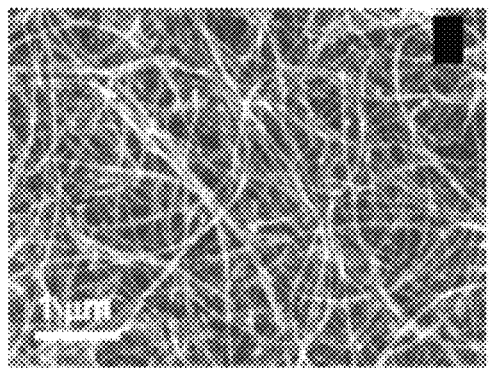
Figure 2F:
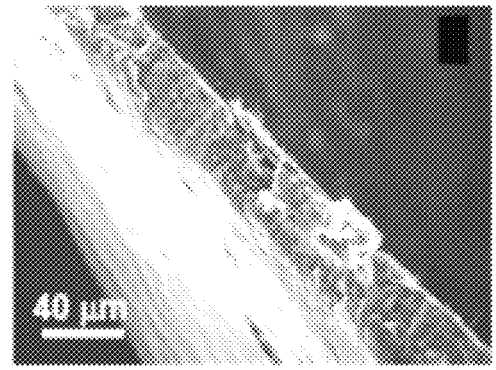

FIGS. 1A to 1G show images of one embodiment of the electrochemical filtration apparatus and set-up. A commercial 47 mm polycarbonate filtration casing (Whatman) as shown in FIG. 1C was modified to allow for simultaneous electrochemistry. Two holes were drilled in the upper piece of the filtration casing as openings for the cathodic and anodic leads. The main components of the electrochemical filter casing are the perforated stainless steel cathode (1) separated with an insulating silicone rubber seal (2) from the titanium (Ti) anodic ring-connector (3) (FIG. 1D). When the filtration casing is sealed, the anodic Ti ring (3) is pressed into the carbon nanotube filter (4) (FIG. 1E) for electrical connectivity. FIGS. 1F and 1G show images of the MWNT filters mats prior to and after electrochemical filtration, respectively.

FIG. 2A to 2F show both aerial and cross-section SEM images of the MWNT filter. The MWNT mat is composed of randomly-oriented MWNTs ($<d>=15$ nm, $<l>=100$ μm, 4-5% residual Fe catalyst, Nanotech Labs). The SEM images were analyzed by ImageJ to determine average pore size, 115.2±46.7 nm, and height, 41.1±7.6 μm. The MWNT network has an effective filtration area of 706 mm$^2$. The total volume of the filter (not excluding CNTs) is 0.029 mL, thus an upper limit for liquid residence time at 1.5 mL min$^{-1}$ in the filter is τ≤1.2 s. The density of the filter is 0.36 g cm$^{-3}$ and the bulk density of the MWNTs is 2.3-2.4 g cm$^{-3}$ resulting in ~85% pore volume. The specific surface was measured to be 88.5±4.3 m$^2$ g$^{-1}$, thus each filter of 41-μm thickness has ~1.05 m$^2$ of total MWNT surface area.

Figure 3A:
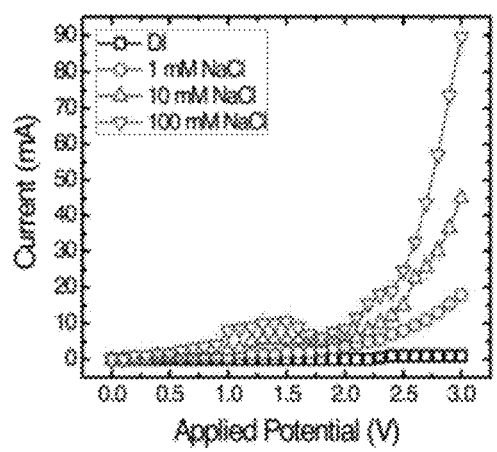
FIGS. 3A to 3C show electrochemical MWNT filter I-V curves as a function of NaCl concentration and liquid flow rate.
Figure 3B:
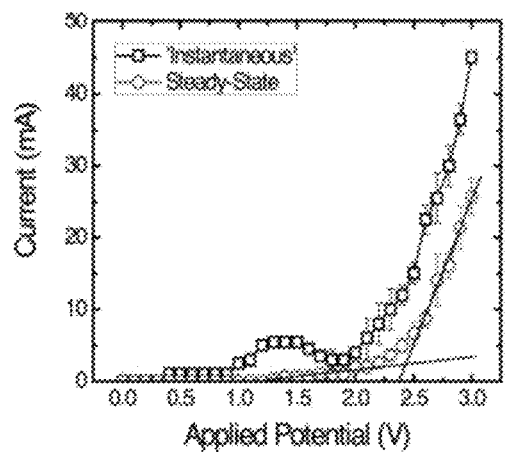
Figure 3C:
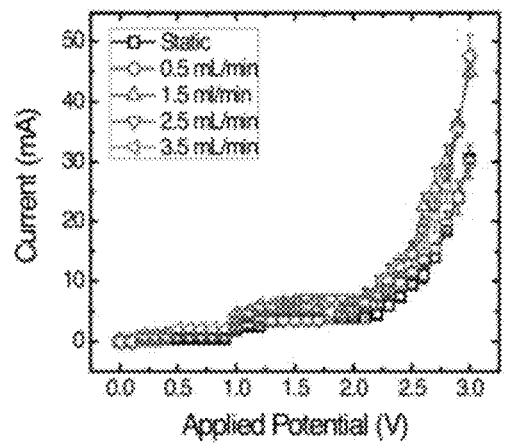

FIGS. 3A to 3C show I-V curves for sodium chloride electrolyte solutions. In FIG. 3A, the instantaneous current of the aqueous solution flowing at 1.5 mL min$^{-1}$ is plotted as a function of applied voltage and NaCl concentration where 'instantaneous' is defined as the initial current value displayed. At all potentials, the current increases with increasing electrolyte concentration. When NaCl is present, the current increases linearly with increasing potential above 2.3 V. This corresponds to the one-electron oxidation of chloride; $Cl^-+h^+\rightarrow Cl.(E^0=2.4$ V) (31). At the higher NaCl concentrations (10 and 100 mM), there is broad current peak from 0.7 to 1.7 V. In one embodiment, the MWNTs utilized contain 4-5% residual iron catalyst (Nanotech Labs). Thus, this broad peak can correspond to iron oxidation. This is consistent with FIG. 3B that compares the 'instantaneous' to 'steady-state' current where 'steady-state' is the current after 10 s at a chosen potential. In the 'steady-state' I-V curve, the broad peak has disappeared indicating that there is finite amount of a current generating species at the MWNT surface, such as the residual iron catalyst. The electrochemical filtration process at 3 V decreases the unbuffered input fluid pH ~6.3 slightly to ~5.3. The effect of liquid flow rate on the electrochemical MWNT filter I-V curves is presented in FIG. 3C. The current is observed to slightly increase with increasing flow rate, but the magnitude of the effect is relatively small.

Example 2

Dye Adsorption to the MWNT Filter in the Absence of an Applied Voltage

Figure 4B:
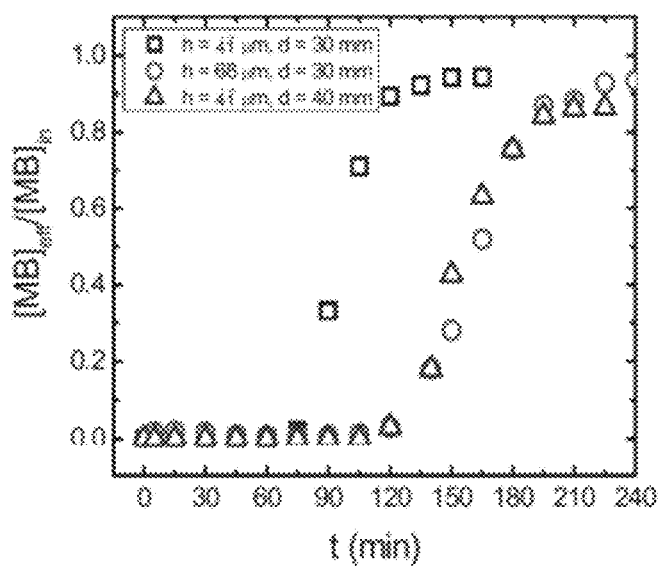
Figure 5:
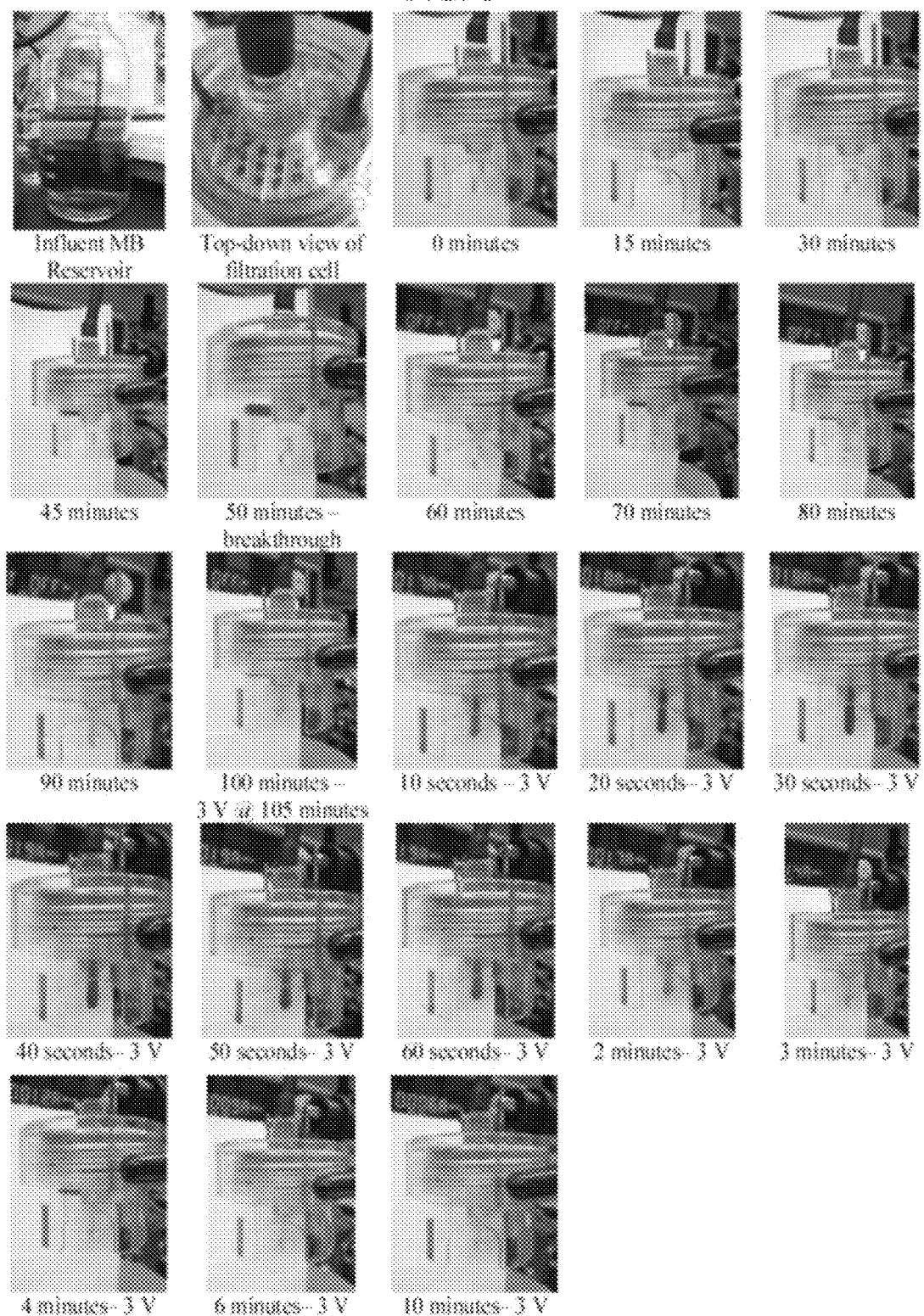
FIG. 5 shows images of the electrochemical MWNT filtration cell during methylene blue adsorption under 0 V followed by desorption and oxidation at ~3 V upon application of a potential after 105 minutes. The images correspond to data in FIGS. 4B and 3 volts in FIG. 7B.

FIG. 4A shows a schematic diagram of dye adsorption to the MWNT filter and FIG. 4B shows the methylene blue (MB) adsorption breakthrough curve, $[MB]_{eff}/[MB]_{in}$ vs. t, in the absence of electrochemistry for three MWNT filters of varying physical dimensions ($[MB]_{in}=7.0\pm1.0$ μM, $[NaCl]_{in}=10$ mM, J=1.5±0.1 mL min$^{-1}$). The squares, circles, and triangles represent filters having average height (h) and diameter (d) of h=41 μm and d=30 mm, h=68 μm and d=30 mm, and h=41 μm and d=40 mm, respectively. In all cases, the methylene blue concentration of the output fluid was below the limit of detection prior to breakthrough, indicating that all MB molecules had at least one collision that could result in sorption with the MWNT surface during a single pass through the filter of ≤1.2 s. Images of the filtration set-up during the MB adsorption process are shown in FIG. 5. The MB sorption capacities of the three filters were 28.5 mg g$^{-1}$, 29.0 mg g$^-$, and 26.4 mg g$^{-1}$, lower than previous reports for dye adsorption to MWNTs (7). The specific BET surface area of the MWNT filter was independent of filter physical dimensions and determined to be 88.5±4.3 m$^2$ g$^{-1}$ and the area per MB molecule adsorbed for the three filters was 163, 161, and 176 Å$^2$ per molecule. The molecular area of methylene blue has been estimated to be 160 Å$^2$ (32), indicating that MB adsorption to the MWNT filters occurs until monolayer coverage.

Figure 4C:
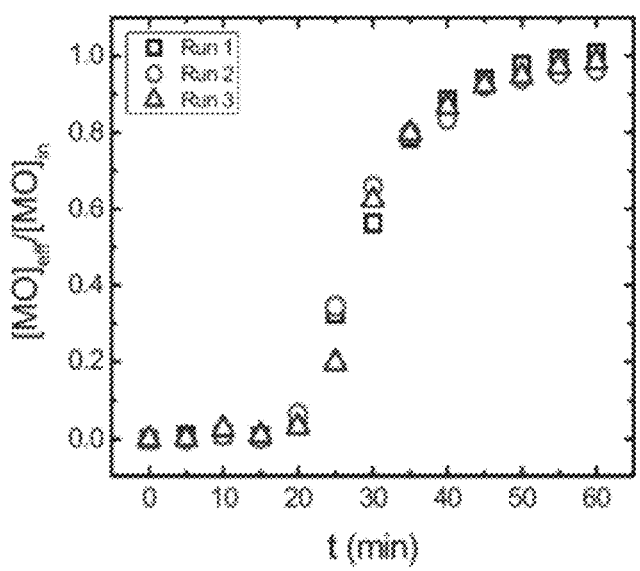

FIG. 4C shows the methyl orange (MO) adsorption breakthrough curve, $[MO]_{eff}/[MO]_{in}$ vs. t, in the absence of electrochemistry for three MWNT filters of similar physical dimensions ($[MO]_{in}=25.0\pm2.0$ μM, $[NaCl]_{in}=10$ mM, J=1.5±0.1 mL min$^{-1}$). The squares, circles, and triangles represent adsorption experiments completed on three different MWNT filters having average height (h) and diameter (d) of h=41 μm and d=30 mm to display the repeatability of the procedure. In all cases, the methyl orange concentration of the output fluid was below the limit of detection prior to breakthrough indicating that all MO molecules had at least one collision that could result in sorption with the MWNT surface during a single pass through the filter of ≤1.2 s. The results of the three runs were quite similar showing the reproducibility of the adsorption process. The filtration set-up during the MO adsorption process is similar to that for MB adsorption process and is shown in FIG. 6. The lower MWNT sorption capacities observed in one embodiment are likely due to a lower MWNT filter specific surface area, 88.5 m$^2$ g$^{-1}$, as compared to other carbon nanotubes that can have >500 m$^2$ g$^{-1}$ (3). The filter surface area per adsorbed MO molecule was 144 Å$^2$ per molecule, slightly less than observed for methylene blue, and also indicative of monolayer formation. In addition, the filter MO sorption capacity was 30.0 mg g$^{-1}$, slightly higher than the MB, but still lower than the range of dye adsorption to MWNTs (80-250 mg g$^{-1}$) previously reported in Fugetsu B et al. (7). Unlike embodiments of the invention, Fugetsu B. et al.'s configuration (7) involves carbon nanotubes made into a composite with a biopolymer, e.g., alginate, and the CNT-alginate composite was solely used as an adsorbate material. The CNT-alginate composite was put into the aqueous solution with chemical contaminants and stirred until all of the contaminants adsorbed to the CNTs. Hence, no filtration or electrochemistry was involved in Fugetsu B. et al.'s process (7).

The complete removal of methylene blue and methyl orange from the input fluids during a single pass (≤1.2 s) through the thin (h=41 μm, d=30 mm) MWNT filter demonstrates the ability of the filter for adsorptive removal of aquatic contaminants from solution. Without wishing to be bound by theory, the efficient adsorptive removal at microfiltration flow rates (130 L m$^{-2}$ h$^{-1}$) is due to strong affinity of the dyes to the MWNT surface (7), the large MWNT surface area (specific surface area=88.5 m² g⁻¹, surface area=1.05 m²), and the MWNT filter pore size. For example, the average MWNT filter pore diameter is 115±47 nm, thus if a dye molecule is at the center of the largest pore, the maximum distance to an MWNT surface is (115+47)/2=81 nm. The maximum dye diffusion time to the MWNT surface can be estimated by $t_d = l_d^2/(2D)$ using the aforementioned maximum distance and a diffusion coefficient (D=10⁻⁵ cm² s⁻¹) and $t_d$ is determined to be 10³ nm² μs⁻¹ (33). Thus, a dye molecule in the input fluid will collide with an MWNT surface in the filter with a maximal characteristic time of 3.3 μs, and thus during the filter residence time (τ≤1.2 s), a single dye molecule could have 100's of collisions with an MWNT interface. FIGS. 4B and 4C show that there was very little or zero contaminant (dye molecules) in the output fluid for the first 60 and 20 minutes, respectively. Without wishing to be bound by theory, since no electrolysis was taking place, the dye molecules in the input fluid were reduced or removed by adsorption to the CNT surface. This indicates that during this time period, every dye molecule going through the filter should be removed by adsorption to the CNT surface. Adsorption to the CNT first requires a collision with the CNT surface (and there could be many collisions), and second requires that one of these collision be adsorption. Accordingly, due to the affinity of planar dye for the MWNT surface, one of these collisions will be adsorptive, in agreement with results presented in FIGS. 4B and 4C.

Example 3

Electrochemical Desorption and/or Oxidation of Adsorbed Dye

Due to the thin film nature of the filter, the total adsorptive capacity of the MWNT filter is relatively low, i.e., dye breakthrough occurs in <2 h. Therefore, there is a strong need to improve the filtration efficiency of MWNT filter. In some embodiments of the invention, the adsorbed dye and/or the dye in the input fluid is oxidized by application of a voltage potential of 1 to 3 volts after a dye monolayer on the MWNTs has been formed. FIG. 7A shows a schematic diagram of electrochemical desorption and/or oxidation of adsorbed dye on the MWNT filter. FIG. 7B shows the electrochemically-mediated desorption and/or oxidation of adsorbed methylene blue (MB) as a function of an applied potential where the squares, circles, and triangles represent 1 volt, 2 volts, and 3 volts, respectively. Images of the filtration set-up during MB desorption at an applied potential of 3 volts are shown in FIG. 5. MB was initially run through the filter for at least 150 minutes to form an MB monolayer on the MWNT filter surface. At t=0 and marked by the dashed line in FIG. 7B, a potential was applied to the electrochemical cell during MB filtration. At all potentials, the first aliquot of the collected output fluid contained a greater concentration of MB than in the input fluid, i.e., $[MB]_{eff}/[MB]_{in}$ >1, suggesting that the adsorbed MB is electrostatically desorbed. Without wishing to be bound by theory, anodic operation of the MWNT filter can result in accumulation of positively charged holes at the anode surface and/or generation of protons near the MWNT interface. Accordingly, positively-charged methylene blue at the unbuffered pH 6.3 used for the experiments described herein can be electrostatically desorbed. The increase in MB concentration of the output fluid was correlated with the applied potential, i.e., $[MB]_{eff}/[MB]_{in}$ at about 3 volts=~20)>$[MB]_{eff}/[MB]_{in}$ at about 2 volts=~6)>$[MB]_{eff}/[MB]_{in}$ at about 1 volt=~2), which is consistent with an electrostatic desorption mechanism. In all cases, upon continued electrolysis, the $[MB]_{eff}/[MB]_{in}$ quickly decreased until it achieved an equilibrium value of about ~1 for ~1 volt and <0.02 for 2 volts or 3 volts (see the inset of FIG. 7B). Thus, in the cases of 2 volts or 3 volts, the MB was not only desorbed electrostatically, but was also electrochemically oxidized to yield a colorless species.

Figure 7C:
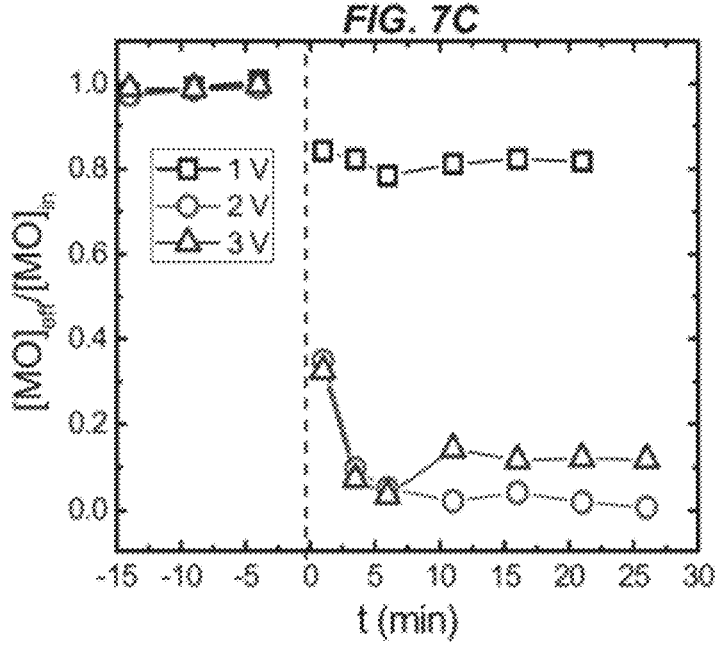

FIG. 7C shows the electrochemical oxidation of adsorbed methyl orange (MO) as a function of an applied potential where the squares, circles, and triangles represent 1 volt, 2 volts, and 3 volts, respectively. Images of the filtration set-up during MO desorption at an applied potential of 3 volts are shown in FIG. 6. MO was initially run through the filter for at least 60 minutes to form an MO monolayer on the MWNT filter surface. At t=0 and marked by the dashed line in FIG. 7C, a potential was applied to the electrochemical cell during the MO filtration. In contrast to the methylene blue results, no desorption of the methyl orange is observed upon application of potential to the electrochemical cell. This is consistent with an electrostatic desorption mechanism since the sulfonated methyl orange will be negatively charged over all solution conditions used in these experiments and will thus be attracted to the positively-charged MWNT anodic filter. In all cases, there is an immediate decrease in $[MO]_{eff}/[MO]_{in}$, which continues for ~5 minutes when the $[MO]_{eff}/[MO]_{in}$ reaches an equilibrium value of $[MO]_{eff}/[MO]_{in}$=~0.8 for ~1 volt, $[MO]_{eff}/[MO]_{in}$ <0.02 for ~2 V, and $[MO]_{eff}/[MO]_{in}$=~0.1 for ~3 V. While application of a greater potential should result in more significant oxidation of organics in the input fluid, the equilibrium $[MO]_{eff}/[MO]_{in}$ value for ~3 V is determined to be greater than that for ~2 volts. However, increased electrolytic gas bubble formation (anode-$O_2$/cathode-$H_2$) at a higher potential may disrupt the filtration process by clogging pores and thus electrocatalytic sites, or by breaking MWNT-MWNT contacts, which in turn reduces electrical connectivity and thus results in a loss of electrochemical activity. This phenomenon will be discussed below in greater detail in Example 5 on iodide oxidation where it is more prominent. It should be also noted that the characteristic time for the electrochemical oxidation of MO to reach steady-state (~5 min) is shorter than that for MB (~15 min), indicating that the electrostatic attraction/repulsion of the dye to the MWNT surface can also affect the dye oxidation efficiency.

The images in FIG. 6 yield insight into near-surface charging effects that may account for the electrostatic desorption process. Methyl orange is a pH indicator that gradually turns from yellow to red as the pH is decreased below 4.5 (34). Upon application of 3 V to an adsorbed MO monolayer, the output fluid solution in FIG. 6 takes on a pink to red color, indicating a decrease in pH below 4.5, and thus there is a significant production of protons at the MWNT anode surface. This decrease in pH is greater than observed for 10 mM NaCl alone (pH$_{in}$ 6.3 and pH$_{eff}$ 5.3). In some embodiments, this decrease in pH can be due to fast multi-electron oxidation of the adsorbed MO monolayer yielding protons. Accordingly, without wishing to be bound by theory, a quick and significant increase in proton concentration near the MWNT anode surface can mediate the desorption of a positively-charged dye such as methylene blue, consistent with observations in FIGS. 5 and 7B.

The electrochemical desorption and oxidation of adsorbed dyes and dyes in the input fluid occurs quite rapidly with equilibrium oxidation of ≥90% of the input fluid dye at ~2 volts and ~3 volts being achieved within 10 minutes. The electrostatic desorption and oxidation of dyes shows the ability of the electrochemical MWNT filter as a self-cleaning filter. By applying the appropriate potential, an adsorbed compound can be electrostatically desorbed and collected as a more concentrated solution while simultaneously regenerating the adsorbent material, the reverse of electro-filtration (35). Alternatively, if the adsorbed species is an undesirable contaminant, a higher potential can be applied to oxidatively degrade the adsorbed compound. However, the electrochemical oxidation of the dyes in the input fluid can be decreased by adsorbed dye or its oxidation by-products consuming all of the reactive MWNT surface sites.

Example 4

Electrochemical Dye Filtrations

Figure 8A:
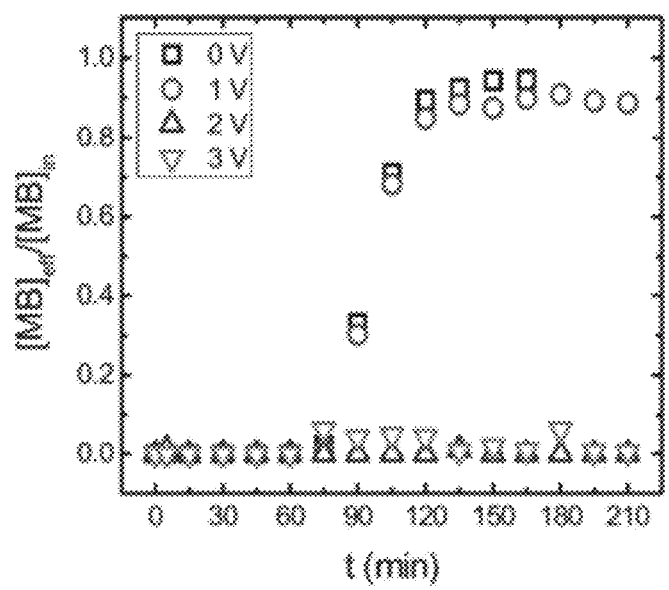
FIGS. 8A to 8B show electrochemical filtration of dyes as a function of applied potential. Experimental set-up is the same as those in FIGS. 1A to 1G.

Accordingly, it was sought to evaluate only oxidation of dyes in an input fluid by applying a potential of 1 volt, 2 volts, or 3 volts prior to flowing any dye solution through the filter. FIG. 8A shows the results of the electrochemical filtration of methylene blue over a range of applied potentials (0-3 V) under conditions of $[MB]_{in}=7.0\pm1.0$ μM, $[NaCl]_{in}=10$ mM, and $J=1.5\pm0.1$ mL min$^{-1}$. The application of ~1 V results in an adsorption isotherm that is nearly identical to the isotherm in the absence of potential. The lack of MB oxidation at ~1 V is in agreement with the one-electron oxidation potential of MB (MB+H$^+$→MB.$^+$, $E^0$=~1.1 V) (36). The identical adsorption isotherms observed at 0 volt and 1 volt indicate that the MB desorption observed at ~1 volt (FIG. 7B) is also a function of the extent of dye monolayer formation on the MWNT filter surface. The application of ~2 volts or ~3 volts results in the removal and/or oxidation of >98% and >93% of the dye in the input fluid at all points in time, respectively. The absence of dye breakthrough at 2 volts and 3 volts indicates that the primary MB loss mechanism is oxidation. As discussed earlier, ~2 volts is observed to be more effective than ~3 volts towards dye oxidation, indicating that application of ~3 volts may be detrimental to the operation of the electrochemical MWNT filter.

Figure 8B:
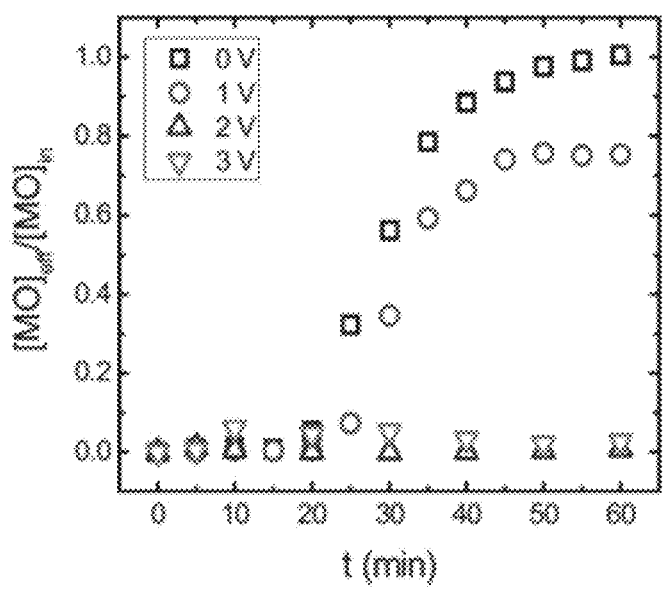

FIG. 8B shows the results of the electrochemical filtration of methyl orange over a range of applied potentials (0-3 V) under conditions of $[MO]_{in}=25.0\pm2.0$ μM, $[NaCl]_{in}=10$ mM, and $J=1.5\pm0.1$ mL min$^{-1}$. The application of ~1 V results in a slight delay in the dye breakthrough as compared to the 0 V conditions and a slight decrease in $[MO]_{eff}/[MO]_{in}=0.8$. This is similar to the equilibrium MO concentration of the output fluid as shown in FIG. 4B. A recent study (37) evaluated the MO oxidation potential as a function of pH, which was observed to increase with decreasing pH (0.3 volts at pH 7 to 0.7 volts at pH 3). The MO input fluid solution is unbuffered at pH 6.3 and the estimated MO oxidation potential, $E^{pH\ 6.3}$=0.37, is at variance with the observed extent of MO oxidation, i.e., most of MO in the input fluid should have been oxidized at pH 6.3 and at 1 volt. The variance between the theoretical and experimental results suggests that the solution near the anodic MWNT surface has a lower effective pH than the bulk water and is consistent with the observed pH decrease during electrochemical MO monolayer oxidation in FIG. 6. There was no shift in the MO UV-Vis adsorption peak of the output fluid, suggesting that this is a surface phenomenon. The application of ~2 volts and ~3 volts during MO filtration resulted in the removal and/or oxidation of >98% and >93% of the dye in the input fluid at all time points, respectively. The absence of dye breakthrough at ~2 volts and ~3 volts indicates that the primary MO loss mechanism during electrochemical filtration is oxidation. The results are in agreement with the methylene blue electrochemical filtration results.

The >90% oxidation of methylene blue and methyl orange in an input fluid during a single pass through the MWNT filter (h=~41 μm, d=~30 mm) is an impressive result since the characteristic solution residence time within the filter is ≤~1.2 s. The efficient oxidation of these dyes shows the ability of the electrochemical MWNT filter for degradation of aqueous organic contaminants. In some embodiments, the efficacy of the anodic MWNT filter towards dye oxidation can be enhanced by the strong affinity of planar aromatic molecules for the sp$^2$-conjugated nanotube surface (6,7).

Example 5

Electrochemical Anion Filtration

Next, to investigate the importance of adsorption to the oxidation process, it was sought to compare the reactivity of organic dyes, e.g., MB and MO, to aqueous species that can have a weaker affinity for the MWNT surface. Presented herein is the electrochemical filtration of the aqueous anions chloride (Cl$^-$) and iodide (I$^-$). FIGS. 9A to 9C show I-V curves and the electrochemical filtration of the aqueous chloride and iodide solutions. The steady-state I-V curves for 10 mM NaCl (squares) and 10 mM NaCl-10 mM NaI (circles) flowing at 1.5 mL min$^{-1}$ in FIG. 9A can both be described with two straight lines. Regarding the 'steady-state' I-V curve for NaCl, the first line crosses zero mA at 1.25 V representing the onset of the two-electron oxidation of chloride to chlorine (2 Cl$^-$+2H$^+$→Cl$_2$, $E_0$=1.36 V) (38), and the second line crosses the zero mA at 2.3-2.4 V representing the one-electron oxidation of chloride to Cl-atom (Cl$^-$+H$^+$→Cl.). Similar to chloride, the first iodide line represents a two-electron oxidation process yielding iodine (2I$^-$+2H$^+$→I$_2$, $E^0$=0.55 V) (38), and the second line represents a one-electron oxidation process yielding I-atom (I$^-$+H$^+$→I., $E^0$=1.5 V) (31). The point where the extrapolation of these lines crosses 0 mA represents the threshold potential for anodic MWNT oxidation of ions. In both cases, there is minimal oxidation overpotential at the MWNT anode. The current peak for the NaCl—NaI solution occurs at ~2.0 V indicating an optimal potential for iodide oxidation during electrochemical filtration. Upon increasing the applied potential above 2 V, the NaCl—NaI current decreases until the onset of Cl$^-$ oxidation at 2.5 V where the current begins to increase again.

FIG. 9B shows the results of the electrochemical MWNT filtration at 1.5 mL min-1 of the 10 mM NaCl-10 mM NaI solution over a range of applied potentials (0-~3 V). The percent iodide oxidized, $[I^-]_{ox}/[I^-]_{in}\times100$, is plotted as a function of time where $[I^-]_{ox}=2[I_3^-]$. In the absence of applied potential, I$^-$ is not oxidized during filtration. Application of ~1 volt results in the gradual increase of iodide oxidation with time until a plateau of ~0.3% oxidation is achieved after 60 minutes of filtration. At ~1 volt, the two-electron process is the only thermodynamically allowed oxidation pathway and thus requires 2 I⁻ to be in close proximity to each other on the MWNT filter surface. Thus, the lag in achieving the steady-state oxidation value can be a result of the slow adsorption of I⁻ to the MWNT surface. Application of 2 volts or 3 volts results in the steady-state oxidation of 1% to 2% (or 100 to 200 µM) of the iodide in the input fluid. At ~1.5 mL min⁻¹, the maximum rate of I⁻ oxidation is 3×10¹⁵ molecules s⁻, which can be compared to the average current (3-6 mA at ~2 V, 5-10 mA at ~3 V) to determine average anodic iodide oxidation current efficiencies of 8 to 16% at ~2 volts and 5 to 10% at ~3 volts. The MWNT area per I⁻ oxidation site can be estimated by dividing the total MWNT surface area of 1.05 m² by the maximum iodide oxidation rate and multiplying by the liquid retention time of ~1.2 s to yield ~45,500 Å² per molecule. This is significantly greater than areas observed for adsorption of MB (165 Å²) and MO (144 Å²), and the estimated iodide molecular area (33) of 20 Å². The significant difference between electrocatalytic site area (~45,500 Å²) and molecular area (20 Å²) indicates that only a fraction of the MWNT surface sites are active towards iodide oxidation. To confirm this, the electrochemical filtration of various NaCl—NaI mixtures (10 mM NaCl-1 mM NaI, 100 mM NaCl-10 mM NaI, and 10 mM NaI) were performed and investigated (FIG. 9C). In all cases, the steady-state percent of iodide oxidized fell between 0.5-2.0%, confirming that I⁻ oxidation is limited by electrocatalytically-active MWNT surface sites.

It is of note that in all cases in FIG. 9B, there is variation in the steady-state iodide oxidation values. This was correlated with observations of oscillations in both the flow rate of the output fluid and the steady-state current. At ~2 volts, the steady-state current oscillated between 5 and 20 mA and at ~3 volts the steady-state current oscillated between 0 and 25 mA. The low current values corresponded to points in time when the output fluid flow was significantly reduced and the high current values corresponded to points in time when the output fluid flowed as expected. It was next assessed whether the oscillating flow rate may have been due to electrolytic gas formation that resulted in blockage of MWNT filter pores. Accordingly, the gas was vented by removing the tubing of the input fluid, which resulted in a jet or spray of liquid out of the filter casing. After replacement of the tubing, a significantly higher current value of ~30-50 mA at ~2 V and ~80-100 mA at ~3 V was observed for a brief period, e.g., <5 s, and soon thereafter the current and flow oscillation resumed. To resolve the issue of electrolytic gas accumulation blocking MWNT filter pores, one solution can be the incorporation of a pressure release valve to continually vent electrolytically produced gas. Alternatively, the system can be operated gravimetrically such that the top of the system was open to atmosphere for gas release. In another embodiment, the cathode can be placed after the anode such that hydrogen produced at the cathode can be hydrodynamically carried out of the system rather than driven into the porous MWNT anode.

Example 6

Comparison of One Embodiment of the Invention with the Previously Reported Electrochemical Wastewater Treatment Systems Yang et. al. (30) reported on an activated carbon felt-carbon nanotube electrochemical seepage filter for the oxidation of Brilliant Red X-3B, which is compared herein to the electrochemical filter of the invention and oxidation of methyl orange demonstrated herein.

TABLE 1

Comparison of Yang et.al.'s electrochemical filter properties, solution conditions, and dye oxidation performance to experimental conditions and results of one embodiment of the invention

| Filter Property or Operational Condition | Yang et.al., ES&T, 2009 (30) | One embodiment of the invention |
|---|---|---|
| Cathode Composition | MWNT-powder packed between activated carbon felt | Perforated stainless-steel |
| Anode Composition | MWNT-powder packed between activated carbon felt | Free-standing MWNT network |
| Mass CNT | 0.5 g | 0.02 g |
| Flux Area Filter | 2,800 mm² | 700 mm² |
| Mass CNT per Filter Area | 178.5 g m⁻² | 28.5 g m⁻² |
| Filtration Configuration | Recirculating | Single-Pass |
| Reservoir Size | 300 mL | n/a |
| Volumetric Liquid Flow Rate | 80 mL min⁻¹ | 1.5 mL min⁻¹ |
| Volume Flow Rate per unit Surface Area | 1,700 L m⁻² h⁻¹ | 130 L m⁻² h⁻¹ |
| Input Fluid pH | 7.0 | 6.3 |
| Electrolyte Species and Conc. | [Na₂SO₄] = 20 mM | [NaCl] = 10 mM |
| Applied Potential | 10 V | 2 V |
| Target Species | Brilliant Red X-3B (50 mg L⁻¹, 60 µM) | Methylene Blue (8 µM) Methyl Orange (24 µM) |
| Performance | >95% decolorization after 90 minutes | >98% decolorization after single pass |

As shown in Table 1, there are a number of differences between the two experimental set-ups (Yang et. al. vs. one embodiment of the invention) including (1) cathode (MWNT-packed activated carbon felt vs. perforated stainless steel), (2) anode (MWNT-packed activated carbon felt vs. free-standing porous MWNT network), (3) filter area (2,800 mm² vs. 700 mm²), (4) CNT mass per area (178.5 g M⁻² vs. 28.5 g m⁻²), (5) configuration and flow rate (recirculating/300 mL reservoir/80 mL min⁻¹ vs. single-pass/1.5 mL min⁻¹), and (6) applied potential and steady-state current (10 V/Not Available vs. ~2 V/~1 mA). Accordingly, the flow rate used herein was normalized by the relative areas to yield an equivalent flow rate of 6 mL min⁻¹, assuming that flow rate is proportional to filter area. Yang et. al. reported that after 90 minutes >95% of the initial 300 mL of 60 µM X-3B had been decolorized or a total of 18 µmoles of X-3B had been partially oxidized. In a single-pass in the system described herein, >98% of the 24 µM methyl orange had been decolorized, or stated in another way, after 90 minutes of a flow rate at 6 mL min⁻¹, a total of 13 µmoles of methyl orange had been partially oxidized, which is slightly less than Yang et. al.'s system. The lower extent of oxidation demonstrated by the filtration apparatus described herein can be due to the lower applied potential (2 V vs. 10 V), and the lower mass of CNTs per filter area (28.5 g m⁻² vs. 178.5 g m⁻²) indicative of reducing active surface area.

The filtration apparatus of the invention can be improved, e.g., by modifying MWNT material and/or structure. For example, boron-doped diamond (BDD) anodes have been previously reported to be superior to platinum and glassy carbon towards phenol and formate oxidation (39) and are able to mineralize the atrazine (51), a recalcitrant pesticide. Improvements in BDD anode performance towards 2,4-dichlorophenoxyacetate oxidation and mineralization are also previously reported when the BDD is coated with Sb-doped $SnO_2$ nanoparticles due to their superior electrocatalytic properties (41). BDD methanol electrooxidative performance has also been previously improved by addition of a porous, 3D platinum (Pt) structure perpendicular to the BDD surface (40). The high-surface area porous Pt increases the number of electrocatalytically-active surface sites, while the BDD anodic surface acts to limit Pt passivating products. Accordingly, the design of new anode materials and structures based on boron-doped diamond (BDD) (39-41), Sb-doped $SnO_2$ (42,43) and Bi-doped $TiO_2$ (44,45) can be used to improve the electrochemical CNT filter presented herein. These anode materials are exemplary due to a combination of properties such as high $O_2$ overpotential, oxidative/corrosion stability, high conductivity, and high yield of surface-bound hydroxyl radicals. For example, one strategy is to coat the MWNT filter described herein with doped-SnO2 nanoparticles to improve its electrocatalytic activity. Alternatively, the electrocatalytic activity of the MWNT filter described herein can be enhanced by addition of porous Pt. Further, hybrid electrooxidation technologies such as microwave-assisted BDD electrooxidation (46), photoelectrocatalysis (47,48) and electro-Fenton processes (49,50) can be integrated into the filtration apparatus of the invention.

In summary, an electrochemical MWNT filter demonstrated herein is effective for the adsorptive removal and electrochemical desorption and oxidation of the aqueous dyes, e.g., methylene blue and methyl orange. At an applied voltage of ~2 volts or ~3 volts, a single pass through the ~41-µm thin, ~30-mm diameter MWNT filter in ≤1.2 s can result in oxidation of >90% of the dye in the input fluid. Without wishing to be bound by theory, the efficient removal and oxidation of these dyes is due to their planar aromatic structure that promotes adsorption to anodic MWNT surface. The aqueous anions chloride and iodide were also oxidized while passing through the anodic MWNT filter with minimal overpotential. The electrochemical oxidation of the anions in the input fluid was limited by the number of MWNT active surface sites towards their oxidation. These results demonstrate the ability of an electrochemical carbon nanotube filter described herein for the removal and oxidation of aqueous contaminants.

Materials and Methods for Examples 7-10

Figure 10:
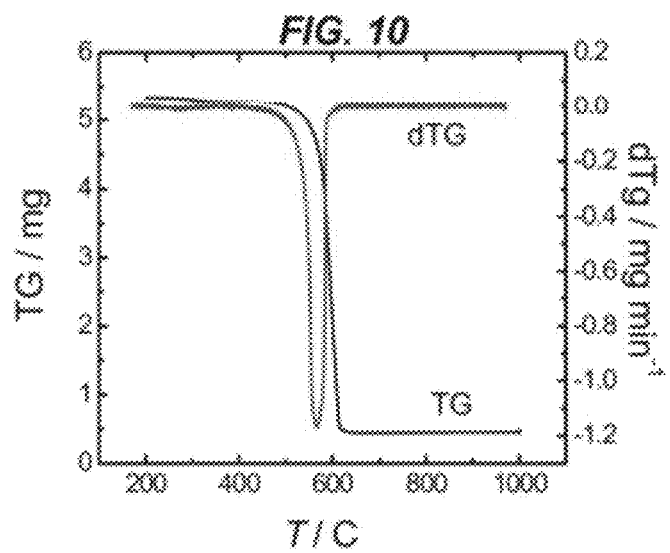
FIG. 10 shows thermogravimetric analysis (TGA) of as-received MWNTs. The MWNTs were used for all experiments (1.3% amorphous carbon and 8.7% residual, mostly Fe as determined by EDX) in the Examples 7-10.
Figure 11A:
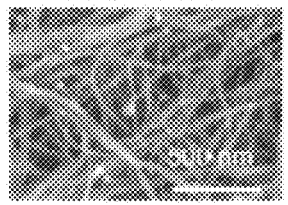
FIGS. 11A to 11G show characterization of the MWNT filter in various length scales.
Figure 11E:
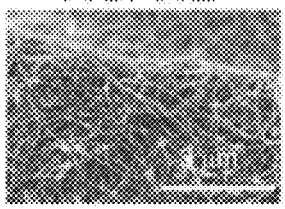
Figure 11B:
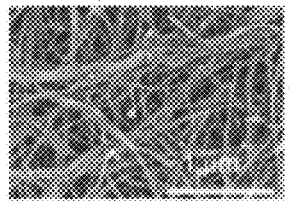
Figure 11F:
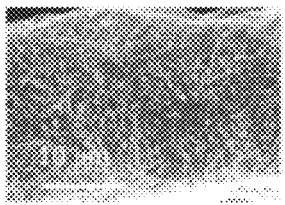
Figure 11C:
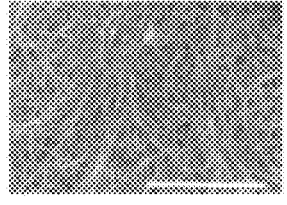
Figure 11G:
Figure 11D:
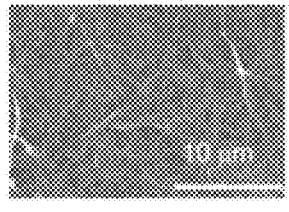

Electrochemical MWNT Filter Preparation and Characterization. The multiwalled carbon nanotubes (MWNTs) were used as received from NanoTechLabs, Inc. (Yadkinville, N.C.). The MWNTs were characterized previously in Kang et al. [30] and have a diameter distribution of 17±9 nm and a length distribution of 91±21 µm. Thermogravimetric analysis of the MWNTs (FIG. 10) showed they are composed of 1-1.5% amorphous carbon and 8-9% residual metal catalyst, which was mostly Fe as determined by EDX. The MWNT filters were produced by first dispersing the MWNTs in dimethylsulfoxide (DMSO) at 0.5 mg/mL and probe sonicating (Branson, Sonifier S450) for 15 min. Then, 6 mL of the sonicated MWNTs in DMSO were vacuum filtered onto a 5-µm PTFE membrane (Millipore, Omnipore, JMWP), resulting in filter loadings of 0.31 mg/cm$^2$ for the bacteria and bacteriophage experiments. The MWNT filters were washed sequentially with 100 mL ethanol (EtOH), 100 mL 1:1 DI-H2O:EtOH, and 250 mL DI-H2O to remove DMSO before use. Scanning electron micrographs of the MWNT filters at various length scales are presented in FIGS. 11A to 11G.

Solution and Electrochemistry. NaCl and $Na_2SO_4$ (EMD Chemicals) were selected as the background electrolytes for all experiments. They are both ubiquitous in aquatic systems and are commonly utilized for electrolytic water treatment. All of the virus electrolysis experiments were completed at 10 mM NaCl. To investigate the effect of ionic strength on bacterial toxicity and electrochemical bacterial inactivation, experiments were carried out at 1 mM, 10 mM, and 155 mM NaCl. Bacterial inactivation experiments were also performed with 10 mM $Na_2SO_4$ to evaluate the importance of reactive chlorine species formation. The electrochemistry was driven by an Agilent E3646A DC power supply. In all cases, electrolysis was completed at a constant voltage of ~1 volt, ~2 volts, or 3 volts for a duration of either 10 or 30 seconds. Current as a function of time was recorded during these experiments.

Preparation and Quantification of Bacteriophage MS2. MS2 viruses were purchased, along with their bacterial host *Escherichia coli* 15597, from the American Tissue Culture Collection (ATCC). The MS2 bacteriophage, commonly used as a conservative viral tracer in aquatic environments, was selected as a model virus for its relative ease of quantification and non-infectivity toward humans. The plaque formation unit (PFU) method was used to quantify the number of viruses (EPA Method 1601) as described in Brady-Estevez et al. [3]. Each MS2 sample to be measured was first diluted four times with DI water. Then, 1 mL of the *E. coli* host and 1 mL of viral sample were added to 4 mL of molten soft agar, thoroughly mixed, and then poured onto a TSA agar plate. Each analysis was completed in at least duplicate. As a control, the original MS2 solution was diluted six times and then quantified.

Bacteriophage MS2 Removal, Inactivation, and Determination of Viability. MS2 bacteriophage, at a starting concentration of $10^6$ PFU $mL^{-1}$, was used for all viral experiments. The viral suspension (10 mL, 10 mM NaCl) was pumped through the MWNT filter at a flow rate of 4 mL $min^{-1}$ (250 L $m^{-2}$ $h^{-1}$) using a peristaltic pump. Filter permeate samples were collected in an autoclaved glass tube and the virus concentration was determined by the PFU method.

To evaluate the viability of the viruses adsorbed on the MWNT filter, the filter was rinsed with 10 mL of virus-free 10 mM NaCl after the viral filtration. Next, the MWNT filter with adsorbed viruses was removed from the electrochemical cell and transferred into an autoclaved glass vial containing 10 mL of 10 mM NaCl. The vial was bath sonicated for 2 min to remove the MWNTs from the PTFE filter and suspend them in solution. The viruses in the suspended MWNTs (adsorbed to MWNTs and in solution) were then quantified by the PFU method.

Preparation of *E. coli*. *Escherichia coli* K12 was selected as the model organism for the electrochemical inactivation experiments. *E. coli* K12 were grown in LB medium at 37° C. and harvested at mid-exponential growth phase. Cells were washed twice and resuspended in saline solution (0.9% or 155 mM NaCl) before exposure to the MWNT samples. Cells were enumerated by their optical density at 600 nm.

Electrochemical Inactivation and Determination of *E. coli* Viability. A fluorescence-based assay that quantifies cells with compromised membrane permeability was used to evaluate bacterial viability. Isotonic saline solution (30-40 mL, 155 mM NaCl) containing $10^7$ *E. coli* cells was first flowed through the MWNT filter. For the non-electrochemical experiments (i.e. MWNT filter with no applied voltage), the sieved bacteria were immediately stained. For the electrochemical experiments, the MWNT-filter with bacteria was moved to the electrochemical filtration casing. The electrochemical filter cell was then filled with the appropriate salt solution and electrolyzed. After the electrochemistry was complete, the MWNT filter was immediately rinsed with 155 mM NaCl and stained for the viability assay.

For the fluorescence-based, nucleic acid assay, E. coli cells were stained with propidium iodide (PI, 50 µM) for 15 min at 37° C., and subsequently counter-stained with 4',6-diamidino-2-phenylindole (DAPI, 4 µM) for 5 min in the dark. The stained bacteria were imaged with an epifluorescence microscope (Olympus) with a U-filter (364 nm) for imaging cells stained with both PI and DAPI and an IB filter (464 nm) for detecting cells stained with only PI. Eight to ten representative images from different locations on each filter were captured for subsequent data analysis through direct counting methods. At least 1,000 cells were counted for each experiment. The percentage of inactivated cells was determined by the ratio of cells stained with PI to those stained with DAPI plus PI (i.e., all stained cells).

Cell Fixation and Scanning Electron Microscopy (SEM). SEM was performed to examine the effects of electrochemistry on cell morphology of E. coli on the MWNT filters. After completion of the electrolysis, the filters were first rinsed with 155 mM NaCl and subsequently fixed with glutaraldehyde and osmium tetroxide. SEM samples were coated with Pt and imaged using a Hitachi SU-70 HR-SEM.

Dye Oxidation and Fluorescence Shift by Reactive Chlorine Species. Propidium iodide (PI) fluorescence emission scans ($\lambda_{ex}$=450 nm, $\lambda_{em}$=500-750 nm) were completed on a Jvon Yobin FluoroMax spectrofluorimeter. PI (1.2 mL, 50 µM) was placed into a fluorescence cuvette. Hypochlorous acid (HOCl, 50 mM) was added to the PI solution in 1 µL aliquots and thoroughly mixed. Fluorescence emission scans were completed after each addition of HOCl.

Presented herein is the design and operation of a novel electrochemical multiwalled carbon nanotube (MWNT) microfilter for the simultaneous removal and inactivation of viral and bacterial pathogens. Experiments with both viruses (bacteriophage MS2) and bacteria (E. coli) demonstrated effective inactivation by the electrochemical MWNT microfilter at relatively low potentials (~1 volt to ~3 volts) and short electrolysis times (≤30 s). The electrochemical mechanism of enhanced pathogen removal and inactivation was investigated by determination of a loss in bacterial viability over a range of potentials and solution compositions, and by observations of aqueous oxidant production.

Example 7

Design and Operation of the Electrochemical MWNT Filter

A similar multi-walled carbon nanotube filter has been developed for removal of virus and bacterial as described in Example 1. A schematic and images of the multiwalled carbon nanotube (MWNT) electrochemically active filter set-up are presented in FIGS. 1A to 1F. The MWNT filter is operated anodically and is electrically connected via a titanium ring 3 and wire (FIG. 1D) to the DC power supply. A perforated stainless steel sheet 1 (FIG. 1D) is operated as the cathode, with an insulating silicone rubber o-ring 2 (FIG. 1D) separating the electrodes. The electrochemically active elements are incorporated into a polycarbonate 47-mm filter casing (Whatman).

FIGS. 11A to 11D present the top down SEM images of the MWNT filter in various length scales. The nanoporous filter had an aerial average pore diameter of 93±38 nm as determined from analysis of SEM images (ImageJ). The pore shape was quite heterogeneous. The side view SEM images of the MWNT filter thickness are presented in FIGS. 11E to 11G. The MWNT filter is observed to have an average thickness of 22±2 µm (ImageJ) for the MWNT loading of 0.31 mg cm$^{-2}$ used in this example.

Figure 12A:
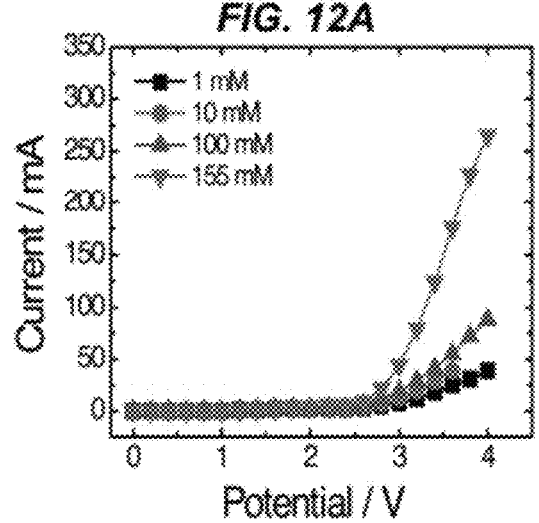
FIGS. 12A to 12C show electrochemical characterization of the MWNT filter.
Figure 12B:
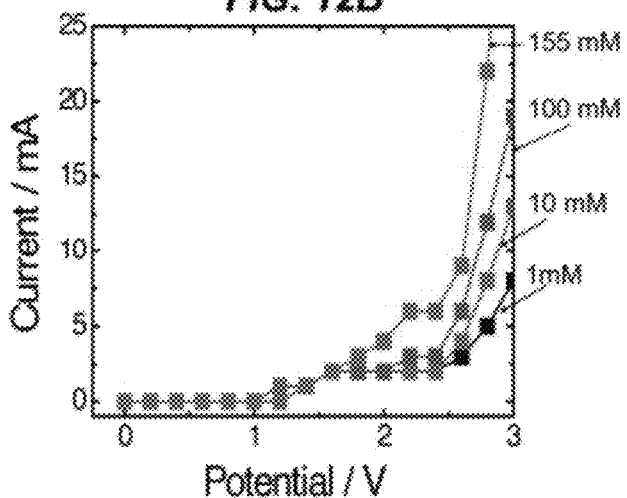
Figure 12C:
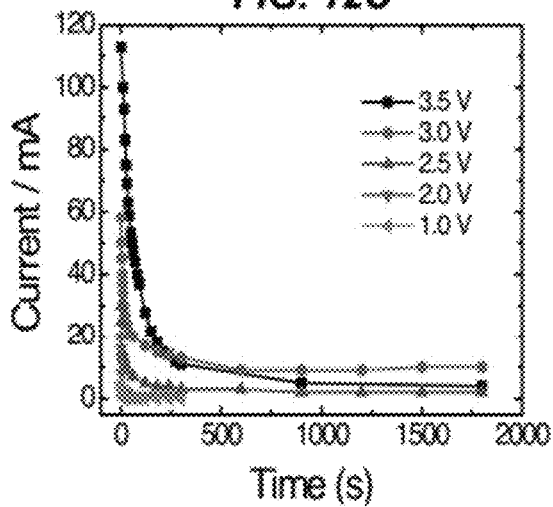

The electrochemical experiments in this example were run at a constant applied voltages or potentials of ~1 volt, ~2 volts, or ~3 volts. The general operating conditions in the absence of pathogens are shown in FIGS. 12A to 12C. FIGS. 12A and 12B show current versus voltage curves over a range of NaCl ionic strengths (1-155 mM). At all ionic strengths, a small current began to flow at ~1.3 V, indicating either four-electron water oxidation ($2H_2O+4$ h$^+ \rightarrow 4$ H$^+ + O_2$, $E_0$=1.23 V) or two-electron oxidation of chloride ($2$ Cl$^- + 2$ h$^+ \rightarrow Cl_2$, $E^0$=1.4 V) is occurring at the CNT anode [24, 25]. The threshold potential for the electrochemical system was around 2.3-2.4 V, above which the current increased linearly with increasing voltage and the slope of this increase was proportional to the ionic strength (FIG. 12B). The threshold electrochemical potential observed in FIG. 12B is in agreement with previous reports that also utilized NaCl as electrolyte, indicating that anodic CF oxidation is the limiting half-cell reaction [25, 26]. Current versus time curves over a range of applied potentials (1.0-3.5 V) are shown in FIG. 12C. At all potentials, the current initially decreased with time and then leveled off with continued electrolysis. The majority of the current drop was within the first 5-10 s of operation, indicating that there is some component of the MWNT filter that was easily corroded, e.g., the residual elemental iron in the MWNTs.

Example 8

Removal of Bacteria and Virus by the Electrochemical MWNT Filter

Figure 13A:
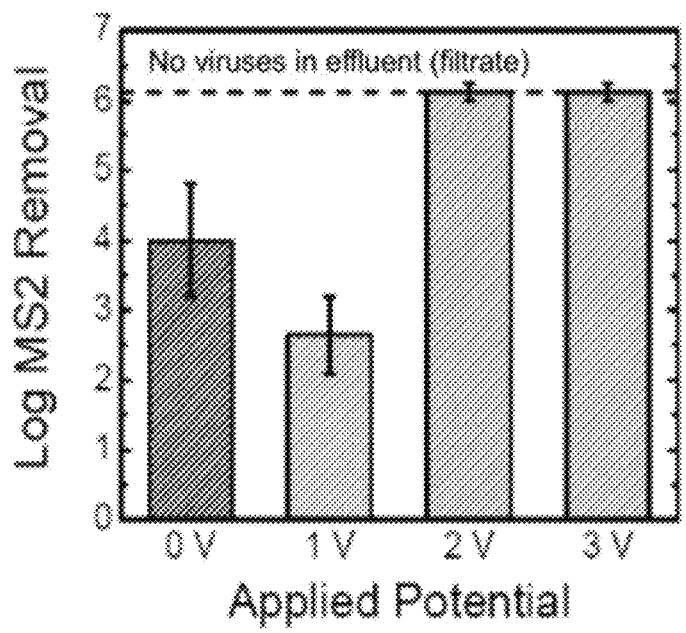
FIGS. 13A and 13B show effect of potentials on electrochemical MS2 removal and/or inactivation.
Figure 13B:
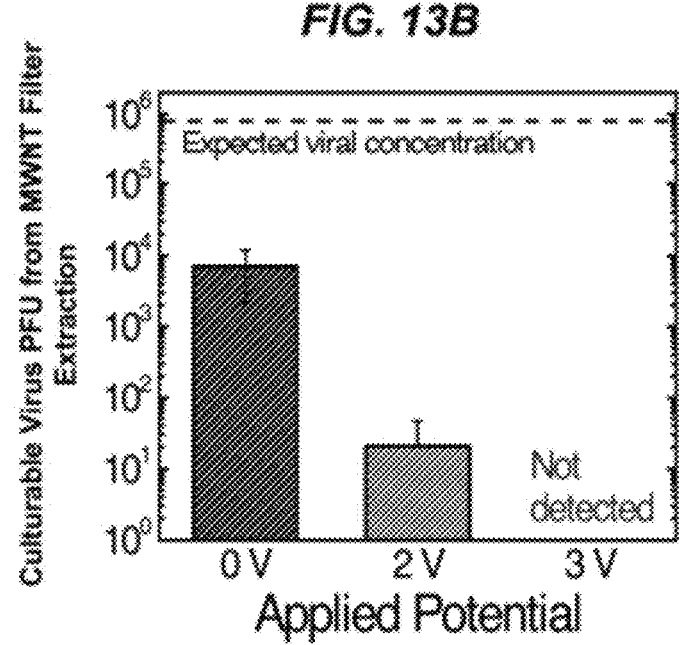
Figure 14:
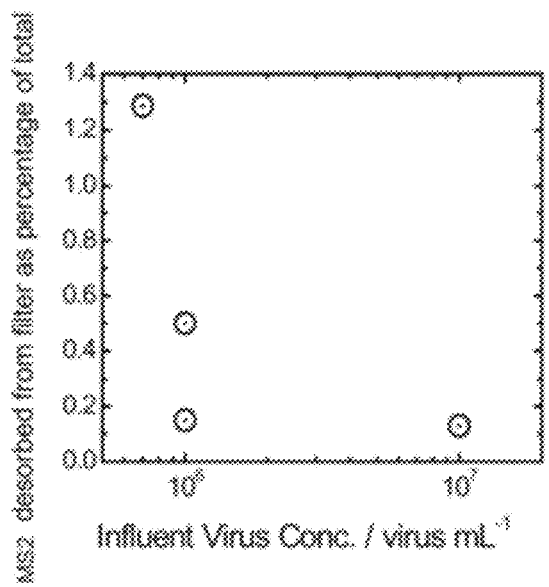
FIG. 14 shows culturable MS2 desorbed from filter as percentage of total MS2 sorbed on filter. MWNT filter was bath sonicated in 10 mL of 10 mM NaCl until the MWNTs were removed (1-2 min) from the PTFE membrane and suspended in solution. Adsorbed viruses in the suspension of recovered MWNTs were subsequently analyzed by the PFU protocol. Total MS2 sorbed on the filter was determined by taking the difference in viral PFU concentrations between the output and input fluids.
Figure 15:
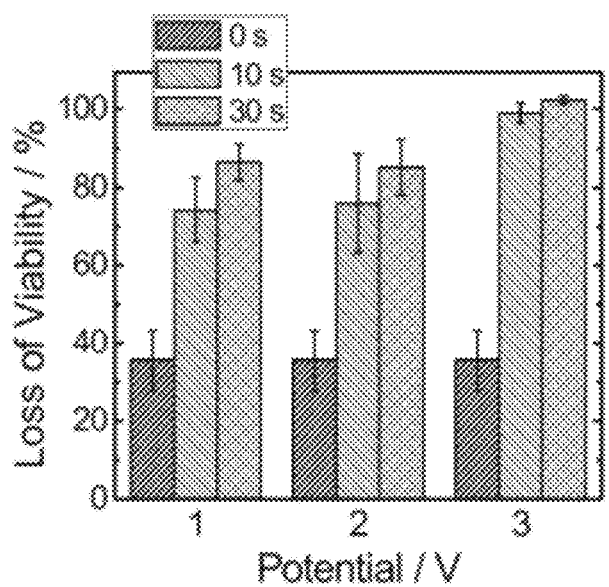
FIG. 15 shows electrochemical loss of *E. coli* viability versus potential and time. *E. coli* suspension (~$10^7$ cells, $[NaCl]=10$ mM, pH 5.7) was first sieved onto the MWNT filter and then electrolyzed at an applied voltage of ~1 V, ~2 V, or ~3 V for ~10 s or ~30 s. Bacteria were stained immediately after electrolysis for viability assay. Each data point represents the mean of at least duplicate measurements under the same experimental conditions, with error bars representing standard deviations.
Figure 16A:
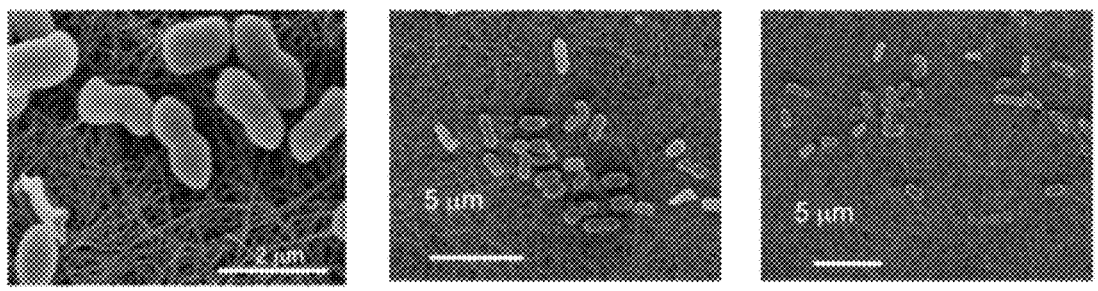
FIGS. 16A to 16D show scanning electron micrographs (SEM) of *E. coli* on the MWNT filter before and after electrolysis. Bacteria were fixed (glutaraldehyde and osmium tetroxide) and dehydrated in preparation for SEM analysis.
Figure 16B:
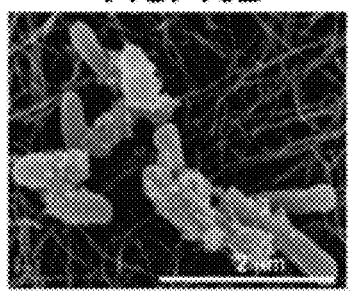
Figure 16C:
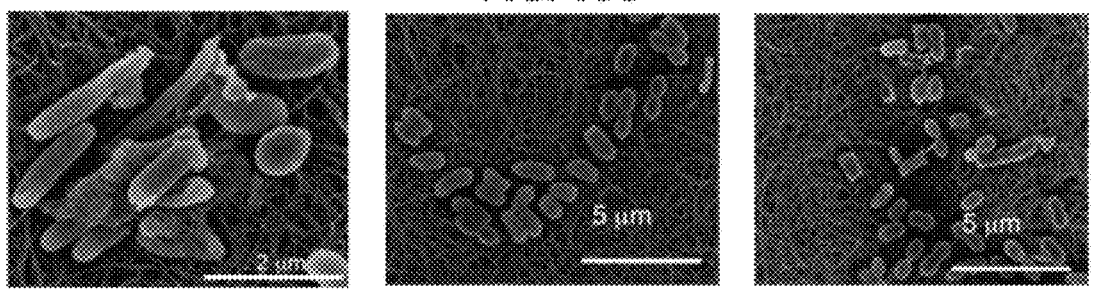
Figure 16D:
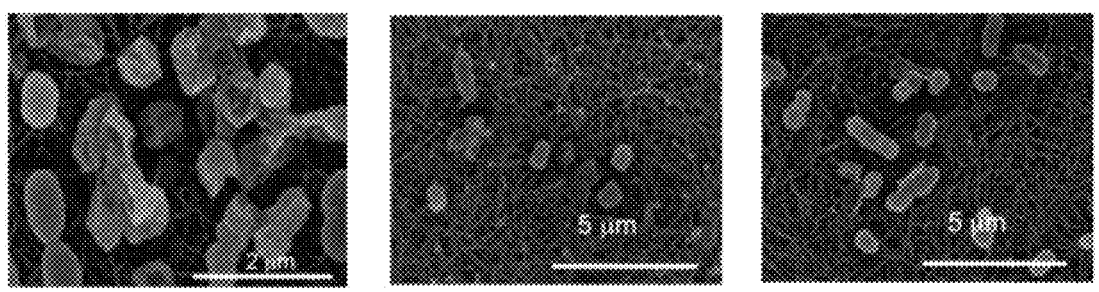

The removal of E. coli and bacteriophage MS2 by the MWNT filter was first evaluated in the absence of an applied potential. For E. coli removal, ~10$^7$ cells in 25 mL of 155 mM NaCl were gently vacuum filtered through ~3 mg of MWNT (~0.31 mg cm$^{-2}$). A small volume (e.g., 100 µL) of the filtrate was spread over an agar plate and incubated overnight. No E. coli colonies formed indicating that all of the bacteria were removed by a sieving mechanism, consistent with the ~100 nm aerial pore size of the MWNT filter (FIGS. 12A to 12G) and previous reports [2, 27]. For MS2 removal, ~10$^7$ viruses in 10 mL of 10 mM NaCl were filtered at ~4 mL min$^{-1}$ (250 L m$^{-2}$ h$^{-1}$) through a ~3 mg (~0.31 mg cm$^{-2}$) MWNT filter and the filtrate was analyzed by the plaque forming unit (PFU) method described in the earlier Materials and Methods. Under these conditions, the MWNT filter achieved on average 4.0±0.8 log removal of MS2 (FIG. 13A, 0 V), similar to previously reported SWNT and MWNT filters [2, 15]. These CNT filters remove viruses by a depth filtration mechanism [3].

The effect of concomitant electrolysis on virus (bacteriophage MS2) removal during filtration was carried out at ~2 volts or ~3 volts (FIG. 13A) by filtering 10 mL of ~10$^6$ viruses per mL at 4 mL min$^{-1}$ (250 L m$^{-2}$ h$^{-1}$) in 10 mM NaCl. The virus concentrations of the input and output fluids were quantified using the PFU method. At an applied potential of ~2 volts and ~3 volts, the log MS2 removal was determined to be greater than 6 and complete. In all electrochemical virus filtration experiments using an applied potential of ~2 volts or ~3 volts, no culturable PFU viruses were detected in the output fluid. The complete removal of viruses during a single pass through the electrochemical MWNT filter is significant in terms of pathogenic virus removal from drinking water as ingesting a single or more viral particle is sufficient to infect humans.

Without wishing to be bound by theory, the electrochemical enhancement of viral filtration can be explained by two mechanisms. The first mechanism could involve physicochemical filtration, where the MWNT anode electrochemically acquires a positive charge, resulting in a deposition (attachment) efficiency of ~1 [28]. An attachment efficiency of ~1, i.e., there are no repulsive electrostatic interactions between viruses and CNT filter media, has been previously reported for SWNT and MWNT filters under high ionic strength or low pH (below the MS2 virus isoelectric point) solution conditions[2, 15]. The second mechanism would involve electrochemical inactivation of viruses via oxidation at the MWNT interface. This would be similar to results reported for electrochemical bacteria inactivation at anodic elemental carbon interfaces [12, 13]. These prior-art anodic materials were either black carbon or activated carbon-based, which were formed into fibers or cloths. The carbon nanotubes as used herein are believed to be a substantially better anode material than the prior-art forms of elemental carbon-based materials, because carbon nanotubes can be used to easily produce porous thin films. In addition, such porous thin films have high mechanical and chemical stability, and are conductive. As the virus is filtered through the MWNT membrane, the viral capsid or possibly even the RNA can be electrochemically oxidized during a collision with the MWNT surface, thus effectively inactivating the virus.

The enhanced electrochemical removal of virus demonstrated herein is significant; however, adsorbed viruses could be released during continued filtration and/or concentrated in the filter backwash solution. Therefore, the effectiveness of electrochemical inactivation of viruses adsorbed to the MWNT filter was evaluated. Viruses were first adsorbed on the MWNT filter in the absence of an applied potential by filtering 10 mL of ~$10^6$ viruses per mL in 10 mM NaCl at ~4 mL $min^{-1}$ (250 L $m^{-2}$ $h^{-1}$). Once the viruses were adsorbed onto the MWNT filter, the filter was either analyzed immediately for PFU (i.e., 0 V condition), or after a potential of 2 volts or ~3 volts was applied for ~30 s (FIG. 13B). It should be noted that the application of potential for ~30 seconds is much less than the ~150 seconds required for the filtration of 10 mL at ~4 mL $min^{-1}$. Hence, these experiments should be considered as a lower limit of the electrochemical inactivation occurred during the actual filtration experiments (FIG. 13A).

The viruses adsorbed to the MWNT filter were desorbed by ultrasonication into 10 mM NaCl and the resulting solution, which included the suspended MWNTs, was then quantified by the PFU method. FIG. 14 shows the culturable MS2 desorbed from the MWNT filter as a percentage of total MS2 adsorbed on the filter, where total MS2 adsorbed is calculated from the difference in viral concentrations between the output and input fluids. It is of note that on average only ~0.5% of the total viruses adsorbed to the filter were detected by the PFU analyses after ultrasonic desorption. Since non-culturable viruses could not be measured, a viral mass balance could not be achieved. Therefore, the virus PFU in FIG. 13B represents the culturable viruses adsorbed to MWNTs plus the culturable viruses released from MWNTs due to sonication and the dashed line represents the total MS2 adsorbed.

Application of either ~2 volts or ~3 volts for ~30 seconds resulted in significant inactivation of viruses adsorbed to the MWNT filter: 7,100±5,000 PFU were detected when no potential was applied; 21±25 PFU were detected when ~2 volts was applied, and 0 PFU were detected in all experiments when ~3 volts was applied (FIG. 13B). The significant reduction in culturable viruses adsorbed to the MWNT filter after electrolysis at ~2 volts or ~3 volts indicates that electrochemistry not only enhances virus removal, but also electrochemically inactivates the adsorbed viruses. Multi-log virus inactivation after ~30 seconds of electrolysis is faster than previously-reported electrochemical virus inactivation rates [5-7]. The fast inactivation kinetics of adsorbed viruses also suggest that viruses that collide with MWNTs via convective-diffusion during filtration, but do not adsorb, can also be electrochemically inactivated.

The *E. coli* were completely removed from the input fluid by a sieving mechanism as demonstrated earlier. Accordingly, the application of a potential to the MWNT filter will have no significant effect on bacterial removal. The electrochemical *E. coli* inactivation experiments were performed in multiple steps to reduce time spent outside of isotonic saline (155 mM NaCl) and to reduce toxic effects that may occur due to osmotic stress [29]. First, ~$10^7$ cells in 30-40 mL of 155 mM NaCl were deposited onto the MWNT filter. Next, the MWNT filter with deposited cells was placed in the electrochemical casing, filled with 10 mM NaCl solution, and electrolyzed for ~10 s or ~30 s at ~1 volt, ~2 volts, or ~3 volts. Immediately after electrolysis, the MWNT filter was removed, washed with 155 mM NaCl, and stained with DAPI and PI for determination of cell membrane permeability. The results of the electrochemical inactivation of *E. coli* are shown in FIG. 15.

The baseline loss of *E. coli* membrane integrity on the MWNT filter in the absence of an applied voltage was determined to be 35.6±7.7%, which is slightly greater than previous reports with MWNTs and *E. coli* utilizing the same viability assay [30]. In all cases, electrolysis significantly increased the inactivation of bacteria deposited on the MWNT filter. The findings also demonstrated that bacterial inactivation increased upon increasing electrolysis time (from 10 s to 30 s) and/or the applied potential (from 0 V to ~3 V). It is of note that the losses of bacterial viability at ~1 V and ~2 V were nearly identical. This finding suggests that the electrolytic inactivation mechanism occurring at these two voltages is similar and likely involves electrolytic oxidation of a specific biomolecule and/or electrolytic interruption of a vital cellular process. Previous reports on electrolytic bacterial inactivation on the elemental carbon cloth and fiber anodes at ~1 V (vs. Normal Hydrogen Electrode NHE) suggested that oxidation of coenzyme A was the electrochemical process leading to cell death [12, 31]. Coenzyme A and its derivatives are important thiol-containing biomolecules involved in fatty acid synthesis [32] and the regulation of metabolism and cell signaling [33]. A recent study on SWNT bacterial cytotoxicity reported the correlation of toxicity with oxidation of glutathione[18], a common thiol-containing biomolecular antioxidant [34]. Without wishing to be bound by theory, a similar oxidation mechanism of a thiolated biomolecule can occur in the MWNT filter system described herein at an applied voltage of ~1 volt or ~2 volts, which are high enough to oxidize most thiols [35].

The bacterial inactivation by electrolysis at ~3 volts for a duration of ~10 s or ~30 s was significantly greater (15-20%) than that observed with ~1 volt or ~2 volts (FIG. 15). This finding indicates that at a higher applied potential, another bacterial inactivation mechanism may become active. The determined inactivation values (99.0% and 102.2%) at an applied voltage of ~3 volts indicate an almost 100% or a complete inactivation of bacteria. However, these values are at the limit of the accuracy or range of the bacterial viability assay (99% or 2-log inactivation), and any value >99% is considered herein only as >99%. Regardless, the extent of electrolytic bacterial inactivation by the MWNT filter after 30 s was significant—85-87% inactivation at ~1 volt or ~2 volts, and >99% inactivation at ~3 volts.

Representative scanning electron microscopy (SEM) images of E. coli in contact with MWNTs after no electrolysis and electrolysis at ~1 volt, ~2 volts, or ~3 volts for ~30 s in 10 mM NaCl are shown in FIGS. 16A to 16D. After 15 min of incubation on the MWNTs and no electrolysis, the majority of the cells was still intact and maintained the expected morphology for viable E. coli. The E. coli electrolyzed on the MWNTs at ~1 volt or ~2 volts for 30 s had similar morphological changes, where the majority of the E. coli cells had become elongated, but were not dehydrated and flattened as with observations of cells in contact with SWNTs previously reported in Kang et al. (2007), and Liu et al. (2009) [16, 36]. Electrolysis at ~1 volt and ~2 volts was able to permeabilize the cell walls enough to allow passage of molecules such as PI across the membrane, but the permeabilization was not enough to allow for release of the larger cellular contents such as proteins and DNA that result in misshapen cells [16, 30]. This finding indicates that electrolysis at ~1 volt or ~2 volts oxidatively interrupts specific, localized regions of the cell membrane, but does not disrupt the macroscopic cell membrane structure. It is also of note that a light-colored aggregated material appeared on the surface of the cells after electrolyzed at ~1 volt and ~2 volts.

The majority of the E. coli cells electrolyzed at ~3 volts were significantly degraded and lost all cell membrane integrity. The membranes of cells electrolyzed at ~3 volts were very rough and looked as if the cells were dehydrated and shriveled (as opposed to flattened). The extensive loss of cell membrane structure at ~3 volts indicates that electrolysis at ~3 volts can chemically degrade or oxidize the membrane molecular components, as compared to ~1 volt and ~2 volts, at which the oxidation may have been more specific and localized. The observed large discontinuities of the cell membrane in regions not in direct contact with the MWNTs can indicate production of aqueous chemical oxidants near the MWNT surface. This observation is consistent with potentials required (>2.3 V) to produce homogeneous oxidants from $H_2O$ and $Cl^-$, which will be discussed in detail in the following paragraphs.

Figure 17A:
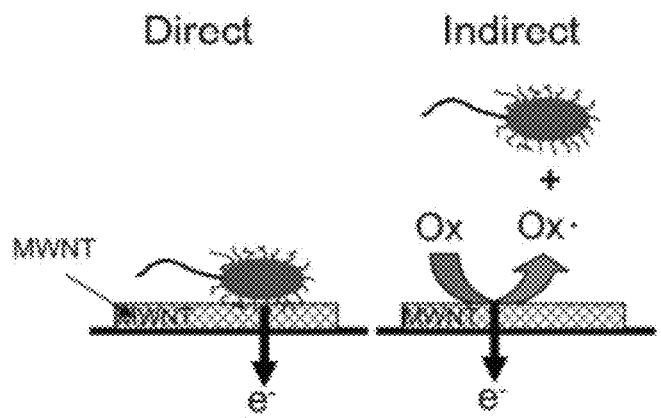
FIGS. 17A to 17E show electrolytic inactivation mechanisms and voltage-dependent dye oxidation.

Without wishing to be bound by theory, the electrochemical inactivation of E. coli and MS2 can occur through two primary mechanisms: (1) the direct oxidation of pathogen (P) in contact with the MWNT anode, and (2) the indirect oxidation of pathogen via anodic production of an aqueous oxidant (e.g., $Cl2.^-$, HO—, or $SO4.^-$), as illustrated in FIG. 17A.

The first step in the direct oxidation mechanism involves deposition or adsorption of the pathogen onto the MWNT filter:

$$MWNT + P \rightarrow MWNT \ldots P \quad (1)$$

The second step involves oxidation of the pathogen adhered to the MWNT filter, which can be a multi-electron process:

$$MWNT(nh^+) \ldots P(ne^-) \rightarrow MWNT \ldots P_{Ox} \quad (2)$$

The indirect oxidation of pathogens also involves two steps, the first being the anodic one-electron production of an oxidant:

$$MWNT(h^+) + Ox^-[H_2O(2.7), Cl^-(2.5), SO_4^{2-}(2.4)] \rightarrow MWNT + Ox.[HO., Cl., SO_4.] \quad (3),$$

wherein examples of specific oxidants are listed within brackets in eq (3) and their reduction potentials in volts are listed within parentheses [35]. Over a range of aqueous NaCl concentrations (1-155 mM), the threshold potential was observed to be around 2.3-2.4 V (FIG. 12A), indicating that anodic $Cl^-$ oxidation (eq 3) was the limiting half-cell process. The pathogen was subsequently oxidized and inactivated by the produced oxidant:

$$Ox. + P \rightarrow Ox^- + P_{Ox} \quad (4)$$

This reaction of pathogen and oxidant may have occurred in solution, or one or both of the reactants may adsorb to the MWNT surface.

As discussed herein, the MWNT filter design promoted contact between pathogen and MWNTs (eq 1), with effective sieving of E. coli and multi-log removal MS2 viruses. This can be advantageous since direct pathogen oxidation may interrupt specific processes of the pathogens at lower driving potentials than those required to produce an oxidant. For example, thiols, such as the antioxidant glutathione [34], coenzyme A [32, 33], and the amino acid cysteine [34], are vital to cellular processes. The oxidation of various thiols has a reduction potential at cellular conditions in the range of 0 to ~1.5 V [35], which is much lower than the potential required to produce a chemical oxidant (eq 3), namely 2.4 to 2.7 V, as evidenced by the minimal steady-state current (≤1 mA) at all solution conditions (FIGS. 12A to 12C). Accordingly, direct oxidation may result in a much lower power requirement than indirect oxidation.

Example 9

Investigation of the MWNT Electrochemical Oxidation Mechanism

Figure 17B:
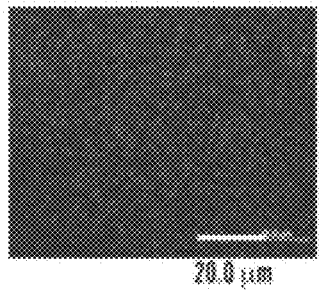
Figure 17C:
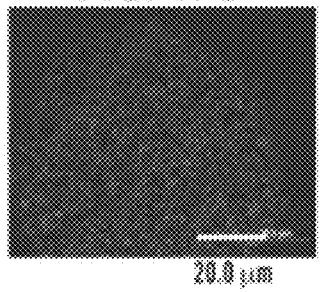
Figure 17D:
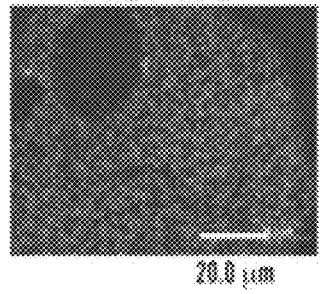
Figure 17E:
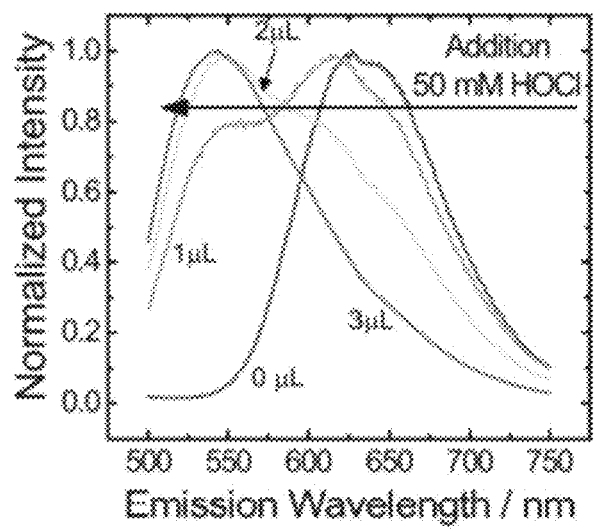

The predominant MWNT electrochemical oxidation mechanism, direct versus indirect, is examined herein by investigating E. coli inactivation and changes in dye fluorescence over a range of solution and electro-chemistries. FIGS. 17A to 17E indicate a negligible production of oxidants at ~1 volt and ~2 volts. FIGS. 17B, 17C, and 17D are epifluorescent microscope images using a 400-nm cut-off excitation filter of propidium iodide (PI)-stained bacteria electrolyzed at ~1 volt, ~2 volts, and ~3 volts, respectively. At ~1 volt (FIG. 17B) and ~2 volts (FIG. 17C), the PI was observed to emit red fluorescence due to the presence of bacteria with compromised cell membranes. This was observed for all solution chemistries and electrolysis times. At ~3 volts (FIG. 17D), the PI was observed to emit yellow fluorescence, which was shifted to a lower wavelength. The blue-shift in the PI fluorescence emission peak after electrolysis at ~3 volts occurred at all solution chemistries and electrolysis times. To determine the source of the shift in the PI fluorescence emission peak, aqueous PI (1.2 mL, 50 μM) was sequentially reacted with 1 μL aliquots of the oxidant hypochlorous acid (HOCl, 50 mM). Upon sequential additions of the HOCl, the PI fluorescence emission peak gradually shifted from around 625 nm to 540 nm (FIG. 17E). Further addition of HOCl over 3 μL did not result in any further peak shifts. Thus, without wishing to be bound by theory, the observation of a shift in PI epifluorescence emission at ~3 volts is due to the production of a relatively high local concentration of oxidant. In one embodiment, the oxidant can be derived from pathogen (eq 2 in Example 8). In another embodiment, the oxidant can be derived from the electrolyte (eq 3 in Example 8). The lack of PI fluorescence shift at ~1 volt and ~2 volts indicated negligible chemical oxidant production at these potentials, and thus the primary electrochemical inactivation mechanism at ~1 volt and ~2 volts can be direct oxidation.

The electrochemical inactivation mechanism is further evaluated by examination of *E. coli* inactivation via DAPI and PI staining over a range of solution chemistries (1 mM NaCl, 10 mM NaCl, 155 mM NaCl, and 10 mM $Na_2SO_4$), electrochemical conditions (1 V, 2 V, 3 V), and electrolysis times (10, 30 s) as summarized in Table 2. The total electrons flowed (mC) and final current (mA) for the corresponding experiments are presented in Table 3.

TABLE 2

Percent loss of *E. coli* viability after electrolysis over a range of solution chemistries, applied potentials, and electrolysis times

| Potential (V) | Electrolysis Time (s) | 1 mM NaCl | 10 mM $Na_2SO_4$ | 10 mM NaCl | 155 mM NaCl |
|---|---|---|---|---|---|
| 1 V | 10 s | 68.8 ± 8.1 | 67.1 ± 6.9 | 74.3 ± 8.3 | 66.3 ± 11.3 |
|  | 30 s | 76.0 ± 4.0 | 79.6 ± 13.3 | 86.5 ± 4.6 | 86.5 ± 11.7 |
| 2 V | 10 s | 70.8 ± 8.4 | 78.6 ± 8.3 | 76 ± 12.7 | 69.0 ± 15.1 |
|  | 30 s | 75.4 ± 17.4 | 84.3 ± 4.6 | 85.2 ± 7.1 | 78.9 ± 14.9 |
| 3 V | 10 s | 97.6 ± 8.4 | 90.7 ± 8.2 | 99 ± 2.5 | 79.6 ± 16.0 |
|  | 30 s | 101.4 ± 7.6 | 97.4 ± 2.2 | 102.2 ± 1 | 97.1 ± 18.2 |

TABLE 3

Total electrons flowed* (mC) and final current (mA) over a range of solution chemistries, potentials, and electrolysis times

| Potential (V) | Electrolysis Time (s) | 1 mM NaCl mC-(mA) | 10 mM $Na_2SO_4$ mC-(mA) | 10 mM NaCl mC-(mA) | 155 mM NaCl mC-(mA) |
|---|---|---|---|---|---|
| 1 V | 10 s | 9-(0) | 11-(0) | 8-(0) | 15-(1) |
|  | 30 s | 13-(0) | 15-(0) | 9-(0) | 18-(1) |
| 2 V | 10 s | 29-(1) | 32-(1) | 39-(2) | 45-(2) |
|  | 30 s | 49-(1) | 55-(1) | 67-(1) | 59-(1) |
| 3 V | 10 s | 124-(10) | 138-(7) | 198-(16) | 360-(25) |
|  | 30 s | 405-(10) | 505-(12) | 474-(12) | 815-(21) |

*[1 C (Coulomb) = 6.242 × $10^{18}$ electrons] The average number of bacterial cells deposited on the filter was $10^7$.

For reference, the baseline MWNT toxicity (no electrochemistry) was 35.6±7.7%. In all cases, the bacterial inactivation was significantly increased (>66%) by the application of direct current. An extended electrolysis time (30 s vs. 10 s) resulted in a greater degree of inactivation for all solution and electrochemical conditions. The percent inactivation tended to increase with increasing voltage following the trend: ~3 V>~2 V≈~1 V>0 V. The results at ~1 V and ~2 V were usually within error of each other, indicating that the electrolytic inactivation mechanism was similar at potentials of ~1 V and ~2V. Since these potentials (~1 V and ~2 V) are lower than that required to produce oxidant (eq 3 in Example 8 and FIGS. 17A to 17E), the electrochemical inactivation at ~1 V and ~2 V was direct pathogen oxidation at the MWNT surface.

There was an increase in bacterial inactivation upon increasing the applied potential to ~3 V, and application of ~3 V for 30 s resulted in >97% inactivation. As previously noted, all values >99% in Table 2 should be considered only as >99% since that is the limit of the viability assay. Without wishing to be bound by theory, the increased *E. coli* inactivation at ~3 V can be due to the production of oxidants (eq 3 in Example 8), which becomes thermodynamically favorable at this driving potential as evidenced by the >0 A current in FIG. 12A. Alternatively, the increased driving potential can open up a large number of one-electron direct oxidation pathways for the organics and biomolecules composing the cell membrane [35]. The increased toxicity at ~3 V is consistent with SEMs of electrolyzed bacteria (FIG. 16D) that display extensive damage to the cell membrane structure.

It was next sought to investigate the effect of various solution conditions (1 mM NaCl, 10 mM NaCl, 155 mM NaCl, and 10 mM $Na_2SO_4$) on the electrolytic inactivation mechanism. The three NaCl concentrations were selected to evaluate the inactivation over a range of solution conductivities, and these were compared to $Na_2SO_4$ electrolyte for evaluation of any possible specific electrolyte effects, which could in turn determine aqueous oxidant speciation (eq 3 in Example 8). As shown in Table 2, there was a negligible effect of NaCl concentration on *E. coli* inactivation at all electrochemical potentials. A potential of ~1 volt or ~2 volts can be too low to generate aqueous oxidants (FIGS. 17A to 17E and FIG. 12A), and this supports the hypothesis that direct oxidation was predominant at those potentials. In contrast, at ~3 volts, the current increases monotonically with increasing NaCl concentration (Table 3 and FIG. 12B), indicating increased homogeneous oxidant/electron shuttle production (e.g., the null cycle; anode: $2\ Cl^-+h^+\rightarrow Cl2.^-$; cathode: $Cl2.^-+e^-\rightarrow 2\ Cl^-$) [25, 26]. However, as previously stated, there is no systematic effect of NaCl concentration on bacterial inactivation. In fact, the observed results indicate the opposite trend, i.e., at ~3 V, *E. coli* inactivation decreases with increasing NaCl concentration. The decrease in loss of bacterial viability with increasing NaCl concentration can be due to inhibition of direct pathogen oxidation on MWNTs by competition with oxidant production. Alternatively, the high ionic strength isotonic solution (155 mM NaCl) can provide a more robust bacterial environment through reducing osmotic stress[29] and thereby increasing bacterial survival. Either way, the decreasing *E. coli* inactivation with increasing NaCl concentration at ~3 V does not support an indirect oxidation mechanism.

Previous studies have discussed that choice of electrolyte strongly affects electrochemical oxidation kinetics. For example, electrochemical organic oxidation kinetics were reported to be at least an order of magnitude faster using NaCl versus $Na_2SO_4$ as an electrolyte, due to significantly lower production of aqueous oxidants [25]. Accordingly, if bacterial inactivation occurred via an indirect oxidation, specific electrolyte effects should be observed. However, the findings indicate there is no significant difference between the electrochemical loss of bacterial viability using $Na_2SO_4$ as compared to NaCl as the electrolyte at all applied potentials and electrolysis times (Table 2). This finding provides additional support for a direct pathogen oxidation mechanism.

The evidence from the solution- and electrochemistry-dependent *E. coli* inactivation supports direct oxidation of bacteria adsorbed to the MWNT filter surface as the primary mechanism at all driving potentials. This finding is in agreement with the observation of a complete removal of the bacteria by a sieving process that results in direct contact of bacteria with the MWNT filter surface. Furthermore, the finding is in agreement with previous results using carbon cloth and carbon fiber anodes [12-14].

Example 10

Comparison of the Electrochemical Bacterial and Viral Inactivation Described Herein with the Prior Art The comparison of the electrochemical bacterial and viral inactivation described herein to previous reports is difficult due to incomplete reporting of conditions. For example, if the electrochemistry was driven under constant current conditions, the voltage was not reported. Therefore, a more generalized comparison is presented herein and the results of those reports are summarized in Table 4.

An alternative to electrochemistry for inactivation of filtered bacteria and viruses is the addition of the strongly antimicrobial nanosilver [38]. Incorporation of nanosilver into or onto the surface of filters has been observed to yield strong antimicrobial [39-41] and antiviral activity [41].

TABLE 4

Tabulation of Previosuly Published Work Completed on Electrochemical Viral and Bacterial Inactivation

| Substrate | V-I Reaction Time | Anode Material-Config. | Results | Mechanism | Ref. |
|---|---|---|---|---|---|
| Reactive Brilliant dye | 10 V 90 min | Flow through; MWNT | >99% degraded after 90 min | Direct oxidation | Yang et al., 2009 [43] |
| E. coli | 0.7 V vs. SCE (or ~1 V vs. NHE) | Flow through; carbon-cloth | $6.0 \times 10^2$ cells inactivated per $cm^3$ per h | Direct oxidation | Matsunaga, et al., 1992 [12] |
| E. coli, enterococci, coliforms | 2.8-3.1 V vs. SCE (~3-3.4 V vs. NHE) 20 to 120 s | Batch; boron-doped diamond | Nearly 100% removed after 2 min | Indirect oxidation via reactive oxygen | Polcaro, et al., 2007 [11] |
| M. aeruginosa | 3.5-9.2 V 52 min | Batch; Ti/$RuO_2$ | Up to 96% removal of chlorophyll | Indirect oxidation via reactive oxygen | Liang, et al., 2005 [8] |
| E. coli, P. aeruginosa, MS2, PRD1 | 25-350 mA 5 s pulses | Batch; copper wire | Bacteria inactivation > bacteriophage; up to 4-log removal of P. aeruginosa | Indirect oxidation via reactive chlorine or electrochlorination | Drees et al., 2003 [5] |
| Hepatitis B; HIV | 3 A; 45 min | Electrolyzed water to viral suspension | Complete (>99%) Inactivation | Indirect oxidation via reactive chlorine or electrochlorination | Morita et al., 2000 [7] |

Electrochemical bacterial inactivation processes can be divided into three primary categories. The first involves indirect oxidation by reactive chlorine species or electro-chlorination [6, 8] (eq 3 in Example 8: $Cl^- + h^+ \rightarrow Cl.$, >2.5 V) (eq. 5). The second category involves indirect oxidation by reactive oxygen species using boron-doped diamond anodes [10, 11] (eq 3 in Example 8: $H_2O + h^+ \rightarrow HO. + H^+$, >3.0 V) (eq. 6). The third category is direct electrochemical oxidization of bacteria deposited on high surface area carbon electrodes (eqs 1 and 2, 1 V –2 V) [12-14].

The MWNT anodic filter investigated herein falls into the third class. Significant bacterial inactivation and negligible oxidant production were observed at ~1 V and ~2 V, indicating direct oxidative pathogen inactivation. While the increased inactivation at ~3 V can be due to oxidant production or new direct oxidation pathways, the findings presented herein indicate towards the latter. The ability of the MWNT filter to directly oxidize pathogens at lower potentials can focus energy towards the desired process and/or greatly reduce the production of undesirable disinfection by-products.

The MWNT anodic filter described herein has a number of advantages over other previously reported carbon-based anodes. These advantages include (i) the nano-dimensional MWNTs have an inherent antimicrobial activity [17, 30] and may allow for more intimate contact with the pathogen due to perturbation of the cell membrane; (ii) the nanoporous MWNT filter structure can sieve all bacteria and remove most viruses by depth filtration, thereby mediating any mass transfer limitations to the anode surface [2, 15]; and (iii) the high MWNT surface area provides a large number of electrochemically active sites per unit volume. Previous reports discuss that CNT-based anodes have increased electrochemical utility over traditional carbon-based anodes since CNTs can catalyze the oxidation of thiol-containing biomolecules [37] and have increased corrosion stability [22].

However, the lifetime of these filters is reduced/limited, due to oxidative dissolution and leaching of the nanosilver into the output fluid, resulting in loss of filter antimicrobial/antiviral activity [41]. A recent study [39] utilized a composite filter composed of cotton, nanosilver, and carbon nanotubes, and applied an electric field to sterilize water at high flow rates via electroporation (not electrochemistry). However, the composite filter required high potentials (±20 V) to achieve results of bacterial inactivation similar to those of the MWNT filter demonstrated herein at much lower aquatic potentials (~1 V-~3 V).

To summarize, in developing countries where no water purification is practiced prior to consumption, or where access to clean water is limited, waterborne pathogens are the cause of millions of deaths per year [1]. Thus, there is a strong need to develop new, efficient point-of-use water treatment technologies. Nanotechnology may offer a solution. For example, the novel electrochemical MWNT filter presented herein can be applied as a drinking-water purification technology for pathogen (bacterial and viral) removal and inactivation. At applied potentials of ~2 V and ~3 V, the electrochemical MWNT filter reduced the number of pathogens in the output fluid to ~0 (i.e., almost or all bacteria sieved, and almost or all virus removed and/or inactivated). Application of these potentials for 30 seconds inactivated >75% of the sieved bacteria and >99.6% of the adsorbed virus. A recent study on various point-of-use technologies reported filtration to be the preferred method due to ease of use, even though it did not perform as well as other methods [42]. As demonstrated herein, at applied potentials of ≥2 V, the electrochemical carbon nanotube filter of the invention reduced the bacteria and viruses in the input fluid, ~$10^6$/mL each, to below the limit of detection in the output fluid. The extent of bacterial and virus removal and inactivation attained by the electrochemical filter of the invention meets the minimal drinking water treatment requirements suggested by the World Health Organization (WHO) of 5 log reduction of bacteria and 4 log reduction of virus. Photovoltaics (PV), which can be used remotely, generate direct electric current and could drive the electrochemical filtration device. Hence, the electrochemical MWNT filter described herein could be used remotely for point-of-use drinking water treatment, displaying the potential of nanotechnology to solve problems encountered in the developing world.

Example 11

Electrochemical Carbon Nanotube Filter Oxidative Performance as a Function of Surface Chemistry Electrochemistry, the interrelation of electrical and chemical effects, has been used for a wide-range of applications including electrophoretic separations, corrosion control, electroanalytical sensors, electroplating, batteries, and fuel cells (1). There are also opportunities for environmental applications of electrochemistry including wastewater treatment, metal recycling, and environmental sensing (2). In regards to electrochemical water treatment, the development of anodes with optimal geometries, high electrocatalytic activity, and extended operational lifetimes has resulted in electrooxidation efficiencies that are energetically comparable to conventional wastewater treatment (3) and disinfection (4) technologies. An electrochemical waste-to-energy process involving simultaneous anodic wastewater treatment and cathodic hydrogen production can lead to greater energy efficiencies (5).

Previous reports on electrooxidation for water treatment has focused on the design of novel anode materials and structures based on boron-doped diamond (BDD) (Refs. 6-8), Sb-doped $SnO_2$ (Refs. 9, 10) and Bi-doped $TiO_2$ (5, 11). These anode materials represent a combination of properties including high $O_2$ overpotential, corrosion stability, conductivity, and surface-bound hydroxyl radical yield. For example, BDD anodes are superior to platinum and glassy carbon toward phenol and formate oxidation (6) and are able to mineralize atrazine (12). Three-dimensional anode nanoarchitectures can also result in increases in electrooxidation. For example, the electrooxidative performance of BDD toward methanol has been improved by addition of a porous, three-dimensional (3D) platinum structure perpendicular to the BDD surface (7). BDD anode electrooxidative performance enhancements toward 2,4-dichlorophenoxyacetate oxidation and mineralization are reported when the BDD is coated with Sb-doped $SnO_2$ nanoparticles (8). In both cases, the enhancements arise from the high surface area Pt/Sb—$SnO_2$ that increases the number of electrocatalytic surface sites in combination with the strongly oxidizing BDD that acts to limit Pt/Sb—$SnO_2$ passivating products.

Presented herein is the use of carbon nanotubes (CNTs), e.g., multiwalled CNTs, as 3D electrode nanoarchitecture material in electrochemical filters described herein that can be used for adsorptive removal and electrooxidation of aqueous dyes and anions (19) and for removal and inactivation of bacteria and viruses (20). Due to CNTs physical (13), electrical (14), mechanical (15), and electrochemical (16) properties, CNTs can be formed into stable, porous, and electrochemically active networks (17) or filters (18). To increase the oxidative capacity of the electrochemical CNT filter described herein or to enhance the anodic CNT filter electrooxidative performance, surface chemistry of the CNTs can be modified, which has been previously reported to affect chemical adsorption (21), colloidal properties (22), antimicrobial properties (23), catalyst support performance (24), photocatalytic nanocomposite performance (25).

Accordingly, presented herein are some exemplary treatment methods used to generate multiwalled carbon nanotubes with varying surface chemistry including CNT (raw or untreated), C-CNT (~400° C. for ~1 h), CNT-HCl (HCl at ~70° C. for ~12 h), CNT-$HNO_3$ ($HNO_3$ at ~70° C. for ~12 h), C-CNT-HCl, C-CNT-$HNO_3$, and C-CNT-SS(C-CNT-$HNO_3$ coated with Sb-doped $SnO_2$ particles) for use in electrochemical filtration of molecules. The CNT materials (untreated or surface-treated) can be characterized by any methods known in the art, e.g., scanning electron microscopy (SEM), X-ray photoelectron spectroscopy (XPS), and thermogravimetric analysis (TGA). The electrooxidative performance of the CNTs has been evaluated over a range of applied voltages by using the electrochemical filter with 1 mM methyl orange (MO) in 100 mM sodium sulfate ($Na_2SO_4$) and other organic molecules. Changes in surface chemistry of the CNTs of the electrochemical filters described herein are determined to significantly affect electrooxidative performance as detailed below. Electrochemical parameters such as steady-state current, anode potential, and impedance as well as effluent (i.e., output fluid) pH, back pressure, and product mass spectrum were also determined, as detailed below, to relate CNT surface chemistry to electrochemical results.

Physical Properties of Electrochemical CNT Filters. The physical properties of the CNT networks were generally similar for all the filter samples except the C-CNT-SS, as shown in Table 5. The CNT network mass was in the range of 14 mg-19 mg, and the C-CNT-SS mass was 35 mg-40 mg. The CNT network depth was in the range of 55 µm-65 µm, and the C-CNT-SS depth was 80 µm-85 µm. The Sb—$SnO_2$ particles were coated onto the CNTs prior to film formation; thus, these additional particles could hinder the CNTs from forming a tightly packed network during vacuum filtration. FIGS. 18A-18G show exemplary SEM images of the CNT networks with different surface chemistry. The images generally look similar for all the samples except C-CNT-SS, FIGS. 18C-18D, where micrometer-sized metal oxide particles are embedded in the CNT network, resulting in a more loosely packed CNT network. The pore size, as measured from SEM images, was also affected by the particle addition. The CNT networks generally had pore diameters in the range of 100 nm-120 nm, whereas the C-CNT-SS had an average pore diameter of about 136 nm. In all cases, the pore diameter was quite heterogeneous with a standard deviation of ±50 nm-60 nm and a range from about 25 nm to about 350 nm.

TABLE 5

Representative Carbon Nanotube Network Properties

| CNT type | weight (mg) | depth (µm)[b] | pore <d> (nm) | residual mass (%)[b] | low-T mass (%)[c] | O/C (%)[d] | ΔMO-2V (%) |
|---|---|---|---|---|---|---|---|
| CNT | 18.8 | 62 | 98.2 | 4.03 | 0.49 | 1.88 | 30 |
| C-CNT | 13.8 | 56 | 104.3 | 3.96 | 0.07 | 2.30 | 36 |

TABLE 5-continued

Representative Carbon Nanotube Network Properties

| CNT type | weight (mg) | depth (μm)[a] | pore <d> (nm) | residual mass (%)[b] | low-T mass (%)[c] | O/C (%)[d] | ΔMO-2V (%) |
|---|---|---|---|---|---|---|---|
| CNT-HCl | 16.1 | 57 | 114.9 | 3.94 | 0.19 | 2.53 | 54 |
| CNT-HNO$_3$ | 15.1 | 58 | 118.3 | 2.64 | 1.19 | 4.67 | 24 |
| C-CNT-HCl | 14.8 | 65 | 109.5 | 2.36 | 0.11 | 2.24 | 72 |
| C-CNT-HNO$_3$ | 14.6 | 59 | 112.2 | 2.16 | 0.76 | 4.08 | 28 |
| C-CNT-SS | 38.5 | 82 | 136.1 | 52.8 | 3.02 | 12.6[d] | 64 |

[a]Measured by microcaliper.
[b]Measured by TGA and representative of percent metal catalyst impurity.
[c]Measured by TGA. Mass loss between 150 and 400° C. representative of amC or functionalization.
[d]Measured by XPS; no surficial Fe was detected in any of the samples; Sb and Sn detected in C-CNT-SS.

Surface Chemistry of CNT Filters. In contrast to the CNT physical properties, the CNT surface chemistry was greatly affected by the treatments (Table 5, and FIGS. 18E-18G). The residual mass, as determined by TGA, is a measure of the residual metal (e.g., iron oxide) catalyst (manufacturer specifications) (31,32). In all cases, there was negligible Fe detected by XPS (33), indicating the Fe$_2$O$_3$ is attached to the inner CNT surface and thus beyond the X-ray analytical depth. The raw (i.e., surface-untreated) CNT samples had a residual mass around 4%, in agreement with manufacturer specifications. The C-CNT and CNT-HCl samples had similar, ~4%, residual mass content. However, the C-CNT-HCl sample had a reduced residual mass, ~2.4%, indicating that amorphous carbon may have been blocking HCl from entering the ends of the CNT-HCl tubes to remove any metal residual catalyst impurities including residual iron oxide catalyst. For comparison, the CNT-HNO$_3$ sample also had a reduced residual content, ~2.6%, likely due to the ability of HNO$_3$ (NO$_2$$^+$) to oxidize the amorphous carbon. The sample with the lowest residual content was C-CNT-HNO$_3$ at ~2.2%, and the sample with the highest residual content was C-CNT-SS at >50% due to addition of noncombustible metal oxide.

The mass loss over the temperature range of 150-400° C. during thermogravimetric analysis can be an indicator of the amorphous and other non-sp$^2$-bonded carbon content of the CNTs (32). As shown in Table 5, The raw CNT sample had ~0.5% mass loss over this temperature range. The C-CNT, CNT-HCl, and C-CNT-HCl had reduced mass loss, 0.05-0.2%, over this temperature range indicating these treatments reduced the amorphous carbon content. The CNT-HNO$_3$ and C-CNT-HNO$_3$ had increased mass loss over this temperature range, 0.8-1.2%, due to oxidative formation of easily combusted surface oxy-groups (34). The increased mass loss in the C-CNT-SS sample can be due to metal oxide catalyzed CNT oxidation.

The CNT surface O/C ratios as determined by XPS are in agreement with the mass loss data. The raw CNT had an O/C ratio of 1.9%, which was only increased slightly in the C-CNT, CNT-HCl, and C-CNT-HCl samples to 2.2-2.5%. The CNT-HNO$_3$ and C-CNT-HNO$_3$ samples had O/C ratios of ~4.7% and ~4.1% indicating significant formation of carbonyl, hydroxyl, and carboxy groups on the CNT surface (22, 28). The C-CNT-SS sample had an even greater O/C ratio due to addition of metal oxide particles. Significant amounts of antimony and tin were also detected on the surface of the C-CNT-SS sample.

The surface chemistry effect of the CNT treatments utilized herein is in agreement with previous studies (22, 31, 32, 34, and 35) and is reported in Pan and Xing (21). For example, the three main surface features affected by the treatments are amorphous carbon, internal Fe$_2$O$_3$ nanoparticles, and surface oxy-groups that are represented by thin gray surface coating, rust-colored internal spheres, and hydroxy and carboxy groups, respectively (FIG. 18E). The CNT network depictions in FIG. 18E are placed in order of increasing electrooxidative performance. The best performing CNT is the one with the most number of these features minimized (e.g., all of these features) as will be discussed later.

Electrochemical CNT Filter Characterization. A representative cyclic voltammogram, linear sweep voltammogram and, open circuit potential versus time for the C-CNT sample are displayed in FIGS. 19A-19C. Identical measurements were completed for all CNT samples under influent (i.e., input fluid) conditions of 1 mM methyl orange, 100 mM Na2SO4, and flow rate of 1.5 mL min$^{-1}$ (FIGS. 19D-F). The cyclic voltammogram in FIG. 19A has two primary features. The first feature is the irreversible oxidation peak of methyl orange around 0.8 V versus Ag/AgCl, and the second feature is water oxidation (2H$_2$O+4h+→O$_2$+4H$^+$) around 1.2 V versus Ag/AgCl. Without wishing to be bound by theory, the electrochemical irreversibility of the anodic CNT filter can be amplified over conventional bipolar electrodes since the electrooxidation products can be permanently carried away from the anode surface by the incident fluid flow. The MO oxidation potential indicates that the near-surface pH of the CNT anode is ~3 (Ref. 36), significantly lower than the input fluid pH ~6. In the majority of the linear sweep voltammograms in FIG. 19B, there is no distinct oxidation peak. Assuming a current similar to the C-CNT peak is representative of peak potential, in all cases the near-surface pH can be <4. A decreased anode surface pH is also supported by the reversible Fe$_2$O$_3$ redox cycle at $E_{1/2}$~0.25 V in FIG. 19A (black dashes). Extrapolation of pH-dependent CV of α-Fe$_2$O$_3$ nanoparticles (37) indicates a near-surface pH of 3-4 supporting the MO data. Thus, the pH near the hydrophobic CNT interface can be significantly lower than that of the bulk solution, in agreement with recent reports of an increased proton activity near the air-water interface (38, 39).

The open circuit potential of both the cathode and the anode as a function of applied voltage and time is displayed in FIG. 19C. At applied voltages of both 0.5 and 1.0 V, the cathodic potential dominates over the anodic potential, in agreement with the findings that a negligible amount of MO is oxidized under these conditions. At 1.0 V applied voltage, the cathode potential is around –0.8 V, near the two-electron reduction potential of water to hydrogen (2H$_2$O+2e$^-$→H$_2$+ 2OH$^-$; $E^0$=–0.83 V) (Ref. 1). Further increases in applied voltage to 1.5 V, 2.0 V, 2.5 V, and 3.0 V results in greater increases to the anode potential as compared to cathode potential. Immediately after each increase in applied voltage up to 2.0 V, an exponential decay in anode potential is observed indicating the formation of a capacitive double layer and adsorption MO pseudocapacitance (40, 41). While a low applied potential is required for the anodic oxidation of MO, in some embodiments, a high fraction of applied potential, e.g., at least 50% at all the applied voltages (e.g., −1.5 V at an 3.0 V applied voltage) is put toward the cathode when proton ($E^0$=−0.83 V), oxygen ($O_2+e^- \rightarrow O2.^-$; $E^{pH7}$=−0.33 V) (42), and water reduction ($2H^+ + 2e^- \rightarrow H_2$; $E^0$=0 V) should occur at significantly lower potentials. Without wishing to be bound by theory, the energy put toward the cathode can be due to the disparity in surface area between the cathode and anode. The cathode has a surface area of at most 15 cm$^2$ and a current density of 0.2-2.0 mA cm$^{-2}$. The anode has an approximately 5000 cm$^2$ of surface area (19) and a current density of 0.006-0.0006 mA cm$^{-2}$. The significant difference between the cathode and anode current density indicates that an increase in cathode surface area can increase the extent of electrooxidation.

Electrooxidative Performance of CNT Filters. The electrooxidative performance of the CNTs was evaluated under conditions of 1 mM MO, 100 mM $Na_2SO_4$, and J=1.5 mL and is displayed in FIGS. 20A-20B, for applied voltages of 2 V and 3 V, respectively. The current (mA; blue bars), MO degradation (%; red bars), and electrochemical impedance (ohm; gray bars; x-axis arc length in FIG. 19F) are plotted versus CNT sample in order of their increasing electrooxidative performance: CNT-HNO$_3$<C-CNT-HNO$_3$~CNT<C-CNT <C-CNT-HCl~C-CNT-SS. The performance order is similar at 2 V and 3 V with the range of percent MO degradation being greater at 2 V (24-72%) as compared to 3 V (66-95%). It is noted that the liquid residence time in the electrochemical CNT filter is ≤1.2 s, and for C-CNT-HCl and C-CNT-SS, ~95% of the MO is oxidized. The steady-state current also roughly follows the MO degradation trend indicating that most of the anodic current is toward MO oxidation. Both CNT-HNO$_3$ and C-CNT-HNO$_3$ have slightly greater currents than the current value corresponding to a known number of electrons transferred during MO oxidation, indicating there can be another anodic process contributing to the current such as corrosive elimination of the oxy-functional groups and/or increased $O_2$ production. In contrast, the C-CNT-SS has a lower current than the current value corresponding to a known number of electrons transferred during MO oxidation, due to SnO$_2$'s high $O_2$ overpotential of 2.2 V versus SCE (43, 44). In terms of electrooxidation, the CNT sample with the most surface sp$^2$-bonded carbon, e.g., C-CNT-HCl, and the sample modified with an electrocatalyst, e.g., C-CNT-SS, had the greatest efficacy. Generally, a "perfect" carbon nanotube should only contain hexagonally sp$^2$-bonded carbon that has been rolled into a nanotube. However, imperfections or defects in the carbon nanotube can arise when the CNT is oxidized and the specific carbon atoms that are oxidized can then go from sp$^2$ to sp$^3$ bonding. Oxidation of CNTs can be induced by a common oxidant such as oxygen. Accordingly, a higher O/C ratio of the CNTs, e.g., as shown in Table 5, indicates a higher amount of oxygen atoms at the CNT surface, which can in turn correspond to a greater degree of CNT oxidation and thus fewer sp$^2$-bonded carbons in the CNTs. Since aromatic molecules such as MO generally prefer to adsorb to a sp2-bonded surface, and the presence of more sp2 bonding can generally increase the conductivity of the material, the CNTs with more sp$^2$-bonded carbon (e.g., indicated by a lower O/C ratio), e.g., C-CNT-HCl, is thus generally more efficient for electrooxidation of aromatic molecules such as MO from an aqueous fluid, as compared to the CNTs with fewer sp$^2$-bonded carbon, e.g., C-CNT-HCO$_3$.

In contrast to current, the electrochemical impedance seems to have minimal correlation to electrooxidative performance. However, the measurement can indicate how the various CNT impurities and functionalizations affect resistance to electron transfer. At both 2 V and 3 V, the raw (i.e., untreated) CNT has the greatest impedance, and the CNT treatment methods can reduce the impedance following the order C-<-HNO$_3$<-HCl indicating that interfacial amorphous carbon, oxy-functional groups, and metal oxides all can act to impede electron transfer with amorphous carbon giving the least impedance. The greater improvement with —HCl as compared to —HNO$_3$ treatment indicates that the oxidatively formed oxy-functional groups and defects also impede electron transfer likely by reducing the conductivity of the CNT network (14, 45). The combined treatments used in C-CNT-HNO$_3$ and C-CNT-HCl result in impedance reductions greater than the sum of the individual treatments. Since calcination was completed first, the impedance result indicates that the ends of the raw CNTs are not initially open, e.g., covered by amorphous carbon, and the acid cannot get inside the tubes to dissolve the internal Fe$_2$O$_3$. Thus, the CNT surface chemistry greatly affects the electrochemical resistance toward interfacial charge transfer reactions; however, this resistance does not seem to have a great effect on electrooxidative performance. The high sensitivity of electrochemical impedance toward CNT surface chemistry can be used for CNT surface analysis.

The effects of surface chemistry on electrooxidative performance may not be solely due to the electrochemical effects since the adsorption of MO, which is a first step for direct electrooxidation, can also be affected by surface chemistry (21, 28). Previous studies have reported that aromatic molecules similar to methyl orange can strongly sorb to the extended sp$^2$-CNT surface (46, 47).,Since a CNT network with the greatest electrooxidation, C-CNT-HCl, has the greatest percentage of surficial sp$^2$-bonded carbon, to further assess the importance of adsorption toward electrooxidative performance, the C-CNT-HCl and C-CNT-HNO$_3$ networks were performed at 3 V with a number of organics: methyl orange (negative aromatic), methylene blue (positive aromatic), phenol (neutral aromatic), CTAB (long-chain aliphatic), and methanol, formaldehyde, and formate (small, polar molecules). The percent degradation in terms of decolorization (MO and MB), TOC removal (phenol), and TIC formation, i.e., conversion to carbon dioxide (CTAB, MeOH, formaldehyde, and formate) is presented in FIGS. 20C-20D.

Both networks were able to degrade some fraction of all of the organics, and the C-CNT-HCl network performed better than the C-CNT-HNO$_3$ in most cases with the exceptions being the positively charged MB and formate. Although 10-20% of the phenol TOC is removed during electrochemical filtration, there was no increase in effluent (i.e., output fluid) TIC indicating an electropolymerization mechanism is active (48). The complete electrochemical conversion of the small, polar organics to TIC and thus carbon dioxide can be, at least in part, due to the relatively low number of electron transfers required for mineralization. For example, a 28-electron transfer is required to completely oxidize phenol, whereas a six-electron transfer is required to completely oxidize methanol. The minimal oxidation of formate can be, at least partly, due to its high one-electron reduction potential, $E^0$~1.9 V (49). The varied extent of oxidation toward the target molecules indicates that there can be a number of factors affecting electrochemical filtration performance including, for example, CNT surface chemistry, molecule-CNT interactions, and molecule oxidation potential.

The two CNT networks evaluated are determined to perform better toward the molecules they adsorb stronger. The oxidative performance of the C-CNT-HCl network toward MO oxidation is, at least partly, due to positive-charging of the CNT anode resulting in enhanced adsorption of the negatively charged MO (19). The strong performance of the C-CNT-HNO$_3$ network toward MB oxidation is, at least partly, due to the electrostatic attraction between the negatively charged surface oxy-groups and the positively charged MB (28). Without wishing to be bound by theory, a strongly adsorbed molecule can have a longer effective retention time in the electrochemical CNT filter resulting in a greater number of chances to be electrochemically oxidized.

Electrochemical and Effluent Characteristics versus Surface Chemistry and Voltage. To further assess the dependence of electrochemical CNT filter performance on surface chemistry, the extent of MO degradation (1-[MO]$_{ef}$/[MO]$_{in}$), steady-state current (mA), anode potential (V), effluent pH, and back pressure (kPa) are plotted as a function of applied voltage (V) and CNT in FIGS. 21A-21F. For most applied voltages, the extent of MO oxidation, steady-state current, and anode potential increased monotonically with increasing applied voltage. Over the applied voltage range of 2.0 V to 3.0 V, the CNT surface chemistry is determined to strongly affect both the extent of MO oxidation and the steady-state current. For the three CNT filters that performed the best, CNT-HCl, C-CNT-HCl, and C-CNT-SS, the extent of MO oxidation reached a plateau around 2.2 V. However, the steady-state current, which is also highest for these three filters, continues to increase indicating either an increase of anodic O$_2$ production or a greater degree of molecular MO oxidation, i.e., a greater number of oxidized electrons per MO molecule. The anode potential is similar over the range of assessed voltages for all CNT materials except the CNT and C-CNT samples that are higher by 0.1-0.2 V. CNT and C-CNT were the filter materials with the greatest electrochemical impedance indicating there can be some threshold value below which the impedance can no longer affect the electrooxidation kinetics, which is in agreement with the lack of correlation between impedance and extent of electrooxidation as discussed earlier.

The effluent pH (i.e., output fluid pH) is a strong function of both applied voltage and CNT surface chemistry. At 1.0 V, the effluent pH (i.e., output fluid pH) is increased over the influent pH (i.e., input fluid pH) indicating that cathodic processes such as water reduction to hydrogen releasing hydroxide anions can control the pH, in agreement with FIG. 19C where the cathodic potential dominates at ≤1.0 V. As the applied voltage is increased to 2.0 V, the effluent pH (i.e., output fluid pH) approaches the influent pH (i.e., input fluid pH) indicating that the cathodic and anodic processes can neutralize each other. As the applied voltage is increased further to 3.0 V, the effect on effluent pH (i.e., output fluid pH) is CNT surface chemistry-dependent. For CNT, CNT-HNO$_3$, and C-CNT-HNO$_3$, the effluent pH (i.e., output fluid pH) tends to increase, whereas for the rest of the filter materials as shown in FIG. 21D, the effluent pH (i.e., output fluid pH) tends to decrease indicating that anodic processes can be dominant. The increase in effluent pH (i.e., output fluid pH) for the HNO$_3$-treated CNTs indicates that electrooxidative cleavage of oxy-functional groups can result in a pH increase.

The potential-dependent back pressure is determined to increase above baseline at applied voltages >2.0 V (FIG. 21E), similar to the steady-state current response (FIG. 21B), indicating the back pressure can be, at least in part, due to an electrochemical process. For example, both cathodic hydrogen production and anodic oxygen production and subsequent bubble formation within the filtration device can be responsible for the increased back pressure. Images of bubbles being released into both the input and output fluids and bubbles being formed on the electrodes are displayed in FIG. 21F. In some embodiments, collection of cathodic hydrogen can result in increased energy efficiency of the electrochemical CNT filtration process (50).

Electrooxidative Mechanism. The electrochemical CNT filter, as demonstrated herein, is able to oxidize at least 95% of a 1 mM MO solution in a single-pass through the filter ($\tau$<1.2 s). To evaluate the degree of molecular MO oxidation and the oxidation products, an estimation of the maximum oxidation can be performed by comparing the MO molecular flux to the electron flux. For example, a 1 mM MO solution flowing at 1.5 mL min$^{-1}$ can result in $10^{16}$ molecules s$^{-1}$ flowing through the filter, and a current of 28 mA corresponds to 17×$10^{16}$ e$^-$ s$^{-1}$ flowing through the anode. Thus, a maximum of 17 e$^-$ can be anodically oxidized per MO molecule. Since there is a total of 80 e$^-$ per MO molecule, only partial oxidation of an MO molecule is possible. Further, cathodic oxygen reduction to O2.$^-$, H$_2$O$_2$, and HO$^-$ can increase the degree of oxidation while anodic water oxidation to O$_2$ can decrease the degree of oxidation.

To identify major MO electrooxidation products, influent (i.e., input fluid) and effluent (i.e., output fluid) samples for all CNTs run at 2 and 3 V were analyzed by negative-ion direct injection mass spectrometry (FIGS. 22A-22G). A large number of the peaks did not change during electrooxidation. For example, peaks at m/z=119/121 and m/z=261/263 are characteristic of salt clusters NaSO$_4^-$ and Na$_3$(SO$_4$)$_2^-$. The parent MO ion (m/z=304/306), parent MO−16 (m/z=288/289/290), parent MO+16 (m/z=320/322), and parent MO+32 (m/z=336/338) are determined in the influent sample and decrease significantly in the 2 V and 3 V samples indicating the parent MO molecule has been destroyed. Three new peaks in the 2 V and 3 V samples appear. For example, a peak at m/z=290 representative of either CH$_2$ or N loss appears at 2 V and disappears at 3 V. Two peaks at m/z=173 and 189, indicated by arrows in the spectrum, appear at 2 V and grow further at 3 V. Without limitations, these peaks can correspond to aminobenzenesulfonate and hydroxyaminobenzenesulfonate. All three intermediates indicate that an electrooxidative bond-breaking process is active.

Environmental Implications. An electrochemical carbon nanotube filter has been shown herein to be effective for the oxidation of methyl orange and other organics. The energy efficiency of MO electrochemical filtration can be calculated in kW·hr kg$^{-1}$ COD assuming 17 electrons transferred per molecule to be 4 (2 V) and 15 (3 V) for C-CNT-SS; and 5 (2 V) and 16 (3 V) for C-CNT-HCl; and these values are similar to state-of-the-art electrochemical oxidation processes that are generally in the range of 5-100 kW·hr kg$^{-1}$ COD (Ref. 3). Alternatively, the energy per volume treated can be calculated in kW·hr m$^{-3}$ to be 0.17 (2 V) and 0.93 (3 V) for C-CNT-SS; and 0.22 (2 V) and 0.96 (3 V) for C-CNT-HCl, and these values are similar to other nanostructured electrodes at ~0.7 kW·hr m$^{-3}$(Ref. 8). The efficiency and extent of degradation are both voltage-dependent with a greater efficiency at lower voltages and greater degradation at higher voltages. The efficiency and extent of degradation are also determined to be dependent on the CNT surface chemistry and the target molecule's physical chemical properties. Thus, in some embodiments, electrooxidation can be increased by adding an electrocatalyst with a high $O_2$ overpotential, e.g., C-CNT-SS, to increase the electron-transfer rate and reduce energy toward null reactions such as water oxidation. In some embodiments, the CNT surface can be tailored toward strong adsorption of target molecules, e.g., C-CNT-HCl for MO molecules or C-CNT-$HNO_3$ for MB molecules, to increase the effective residence time of that molecule within the filter and in turn increase the oxidation.

Exemplary Materials and Methods for Example 11

Chemicals. Methyl orange (MO), hydrochloric acid (HCl; 36.5-38.0%), nitric acid ($HNO_3$; 69.8%), sulfuric acid ($H_2SO_4$; 95.0-98.0%), phosphoric acid ($H_3PO_4$; 85.0%), tin chloride pentahydrate ($SnCl_4(H_2O)_5$), antimony chloride (SbCl3), sodium hydroxide (NaOH), ethyl alcohol (EtOH; ≥95.0%), dimethyl sulfoxide (DMSO; ≥99.9%), potassium hydrogen phthalate (KHP), sodium sulfate ($Na_2SO_4$), sodium persulfate ($Na_2S_2O_8$), sodium bicarbonate ($NaHCO_3$), methylene blue (MB), cetylammonium bromide (CTAB), phenol (PhOH), methanol (MeOH), formaldehyde, formate, and sodium carbonate ($Na_2CO_3$) were purchased commercially, e.g., from Sigma-Aldrich. All chemicals were reagent grade except the DMSO that was spectrophotometric grade.

Carbon Nanotube (CNT) Selection. The multiwalled carbon nanotubes could be purchased from NanoTechLabs, Inc. (Yadkinville, N.C.). The CNTs were characterized previously in Kang et al. (2008) (Ref. 26) to have a diameter distribution of 17±9 nm and a length distribution of 91±21 μm, in agreement with the manufacturer specifications of 5-7 walls, $<d>$=15 nm, and $<l>$=100 μm.

CNT Calcination. To remove any amorphous or other carbon impurities (27), about 1 g of as-received CNTs was first calcinated in a tube furnace (e.g., Thermolyne, 21100) by increasing from room temperature to about 400° C. at a rate of 5° C./min and holding for 60 min at 400° C. If multiple CNT treatment steps were used, calcination could be completed first and the sample is given the C-prefix in the Examples.

CNT Acid Treatment. Different types of acid treatment can be completed depending on various applications. For example, the CNTs can be treated with concentrated HCl to remove any residual metal catalyst impurities (27), and/or treated with concentrated $HNO_3$ for oxidative formation of surface carbonyl, hydroxyl, and carboxyl groups (27, 28). Both acid treatments could be completed as follows: for example, 0.5 g of CNT was placed into 0.5 L of respective acid and heated to 70° C. in a round-bottom flask with stirring and a condenser for at least 12 h. After heating, the sample was cooled to room temperature and vacuum-filtered through a 5 μm PTFE membrane (Omnipore, Millipore) to collect the CNTs. The CNTs were then washed with Milli-Q deionized water (DI) until the filter effluent pH was near DI's pH. The sample was then oven-dried at 100° C. before use. Materials treated with HCl are labeled with the —HCl suffix in the Examples, and materials treated with $HNO_3$ are labeled with the —$HNO_3$ suffix in the Examples unless coated with metal oxide nanoparticles, see the following section.

Sb-Doped SnO2 Particle Coatings. The Sb-doped $SnO_2$ CNT were prepared by the hydrothermal method (29,30). Briefly, 50 mg of C-CNT-$HNO_3$ was added to 30 mL of ethanol and 15 mL of DI water and dispersed by ultrasonication (Branson, Sonifier S450) for 5 min at an applied power of 400 W/L. Then, 27 mg of NaOH was added to the stirred mixture. Once dissolved, 117 mg of tin chloride pentahydrate ($SnCl_4(H_2O)_5$) and 7.6 mg of antimony chloride ($SbCl_3$) were slowly added to the stirred mixture. The final solution was then transferred to a Teflon-lined stainless steel autoclave and heated to 160° C. for at least 12 h. CNTs prepared by this method are labeled C-CNT-SS in the Examples.

Electrochemical CNT Filter Preparation. The CNT filters were produced by first dispersing the CNTs in DMSO at 0.5 mg/mL and probe-sonicating (Branson, Sonifier S450) for 15 min at an applied power of 400 W/L. Then, 30 mL of the sonicated CNTs in DMSO was vacuum-filtered onto a 5 μm PTFE membrane (Millipore, Omnipore, JMWP), resulting in filter loadings of 1.5-1.6 mg/cm². The CNT filters were washed with 100 mL of EtOH, 100 mL of 1:1 DI-$H_2O$/EtOH, and 250 mL of DI-$H_2O$ to remove DMSO. Finally, the prepared filter was loaded into a filtration casing modified for electrochemistry, as described in Vecitis et al. 2011 (19, 20) and FIGS. 1A-1G.

Solution and Electrochemistry. Sodium sulfate ($Na_2SO_4$; 100 mM) was utilized as the background electrolyte, and methyl orange (MO; 1 mM) was used as the model pollutant unless otherwise noted. The input fluid MO-electrolyte solution was peristaltically pumped (Masterflex) through the electrochemical CNT filter (FIGS. 1A-1G), and the electrochemistry was driven by a dc power supply (Agilent). Perforated stainless steel was used as the cathode, and an insulating silicone rubber O-ring separated the electrodes. The electrochemically active elements were incorporated into a modified polycarbonate 47 mm filter casing (e.g., Whatman). Before every experiment, the titanium ring could be polished with sandpaper to optimize the electrical connectivity between the titanium and the CNTs.

Bulk electrochemical filtration of MO was completed at a number of selected applied voltages, 2 and 3 V for comparison to previous reports by the inventor (19,20) before the cyclic voltammetry (CV) peak, at the CV peak, and after the CV peak. The MO electrochemical filtration experiments were completed for at least 30 min with at least three output fluid samples analyzed over this time period to ensure steady-state electrochemical filtration was achieved. A number of parameters including output fluid pH (e.g., measured by Corning 345), output fluid MO concentration (e.g., measured by Agilent 8453 spectrophotometer; $\lambda_{max}$=464 nm; ∈=26, 900 $M^{-1}$ $cm^{-1}$), steady-state current, anodic potential, and back pressure were all recorded.

Bulk electrochemical filtration at 3 V was also completed for methylene blue, phenol, CTAB, methanol, formaldehyde, and formate. Sodium sulfate at 100 mM was used as an electrolyte, and the input fluid concentration for all compounds was 1 mM with the exception of CTAB at 0.1 mM. Similar to MO, the electrochemical filtration experiments were completed for at least 30 min with at least three output fluid samples analyzed over this time period to ensure steady-state electrochemical filtration was achieved. The MB concentration was measured by spectrophotometer ($\lambda_{max}$=665 nm; ∈=74 100 $M^{-1}$ $cm^{-1}$). The phenol concentration was measured by UV-vis and total organic carbon (TOC). The extent of electrochemical transformation of CTAB, methanol, formaldehyde, and formate to carbon dioxide was measured by total inorganic carbon TIC in the output fluid (input fluid TIC was ~0).

The CNT samples were also evaluated using a potentiostat (CHI604D) with the prepared sample as the working electrode, a stainless steel cathode as the counter electrode, and 1 M Ag/AgCl as the reference electrode in a flow cell configuration. Cyclic voltammetry, linear sweep voltammetry (LSV), and alternative current impedance (ACI) methods were used to electrochemically characterize the samples.

SEM Analysis. Scanning electron microscopy was performed on a Zeiss FESEM Supra55VP. Micrographs were analyzed with ImageJ software to determine aerial pore size that was an average of at least 100 measurements.

TGA Analysis. Thermogravimetric analysis was performed on a Q5000-IR thermogravimetric analyzer (TA Instruments). Samples were heated from room temperature to 150 at 10° C. min$^{-1}$, held at this temperature for 30 min, then heated to 1000 at 10° C. min$^{-1}$ and held at this temperature for 30 min. A second run was completed immediately after the first and used as a background. The percent amorphous carbon and low-T combustibles was determined as the fraction burned between 150 and 400° C. The percent residual catalyst was determined using the initial mass and mass remaining after a complete thermal cycle.

XPS Analysis. X-ray photoelectron spectroscopy was performed on an ESCA SSX-100. For all samples, survey spectrum (0-1000 eV), C-1s (274-294 eV), O-1s (522-542 eV), and Fe-2p3 (700-720 eV) scans were performed. For the C-CNT-SS, Sn-3d5 (476-496 eV) and Sb-3d5 (520-540 eV) were also performed. Data was analyzed using Casa-XPS.

Mass Spectrometry Analysis. The input and output fluid MO samples oxidized at applied voltages of 2 and 3 V for all CNTs were analyzed by direct injection electrospray time-of-flight mass spectrometry (ESI-TOF-MS; Waters LCT Premier XE). The instrument was operated in negative-ion high-resolution mode (W-) with a capillary voltage of 3.5 kV. Every sample was continuously injected for at least 5 min at a flow rate of 10 µL min$^{-1}$.

TOC and TIC Analyses. Both TOC and TIC analyses were performed with a TOC analyzer (TOC-V; Shimadzu) with thermal persulfate oxidation. TOC measurements were used to analyze the extent of phenol removal. TIC measurements were used to analyze the electrochemical formation of carbon dioxide.

Example 12

Nafion and Metal Oxide Nanoparticles on Carbon Nanotubes for Water Treatment or Purification Synthesis of CNT containing Nafion and metal oxide nanoparticles. The CNT filters or films were produced as described in earlier Examples. A Nafion coating can then be applied on the CNT films to form CNT/Nafion films. Addition of the Nafion coating to the CNT films can enhance the CNT film strength and/or durability, and also provide a capability to wrap nanoparticles (NPs), e.g., metal oxide nanoparticles, to the CNT if needed. Accordingly, in some embodiments, metal oxide nanoparticles can be deposited on the CNT/Nafion films to form CNT/Nafion/NP films, e.g., for electrochemical catalysis.

The CNT/Nafion films were prepared in various ratios of Nafion to CNT. FIGS. 23A-23C show SEM images of CNT/Nafion films with different ratios of Nafion to CNT. It was determined that the ratio of Nafion to CNT is preferably less than 1:5 due to permeability issues with the CNT/Nafion films. In some embodiments, the ratio of Nafion to CNT is no more than 1:6.

Different metal oxide nanoparticles such as $SnO_2$, $TiO_2$ and Sb-doped $SnO_2$ can be evaluated. In some embodiments, $SnO_2$ can be deposited on the CNT/Nafion films. In one embodiment, $SnO_2$ nanoparticles can be deposited uniformly on CNT film or a CNT/Nafion film. For example, a CNT film or a CNT/Nafion film can act as a cathode in a solution of 1 mg/ml $SnCl_2.2H_2O$ acidic solution and a titanium strip can act as an anode. A potential of about 1V can be applied to the process for a period of time, e.g., about 1 hour. The film can then be rinsed, for example, with a small amount of water to remove excess $SnCl_2$ and be heated in a water bath at 70° C., e.g., for about 1 hour, for hydrolysis. Using this approach, a uniform layer of $SnO_2$ nanoparticles of 4 nm-5 nm can be deposited on the CNT walls. FIGS. 24A-24E show SEM images of Nafion-coated CNT with $SnO_2$ deposition where the ratio of Nafion to CNT is 1:6.

Durability of Nafion-coated films. Mechanical strength and durability of the CNT films coated with Nafion were significantly higher than the uncoated CNT films. In some embodiments, the Nafion-coated CNT films, and/or Nafion-coated CNT films with $SnO_2$ deposition can last higher potentials without self-oxidation than the uncoated CNT films (FIGS. 25A-25D).

Electrochemical filtration performance of the Nafion-coated CNT with $SnO_2$ Deposition. The electrochemical filtration performance of the Nafion-coated CNT films and/or the Nafion-coated CNT films with SnO2 deposition were assessed using methyl orange (e.g., at a concentration of 1000 µM) as a model compound to be removed in an input fluid. The presence/amount of methyl orange in the output fluid was analyzed by UV-Vis spectrometry, and the electrochemical characterization of the filtration process was analyzed by different methods known in the art, e.g., but not limited to cyclic voltammetry, chronoamperometry, and open circuit potential time.

First, energy efficiency and oxidation of the Nafion-coated CNT films were evaluated. At anode potentials beyond 1.2 volt, about 40 µL Nafion-coated CNT films were determined to be more energy-efficient, e.g., 6 times more energy-efficient, than an uncoated CNT film (FIG. 26A). Additionally, increasing the Nafion content in the CNT films can result in further improvement in current and thus energy efficiency at higher anode potentials (FIG. 25B. FIG. 26C shows that the addition of $SnO_2$ nanoparticles into Nafion-coated CNT films can further increase the energy efficiency and/or oxidative performance of the Nafion-coated CNT films. In some embodiments, at least one additional Nafion coating can be applied after $SnO_2$ deposition on the Nafion-coated CNT films. Thus, the $SnO_2$ nanoparticles can be protected or enclosed between the Nafion coatings.

Example 13

Electrochemical Filtration of Aromatic Wastewater: Passivation and Regeneration

Aqueous aromatic compounds are toxic and refractory to conventional biological wastewater treatment. Phenol is frequently used as a model aromatic compound in wastewater treatment studies and millions of tons are produced every year as a plastics and pharmaceutical precursor [1-3]. A number of alternative aqueous phenol treatment methods have been previously reported including adsorption [4], advanced oxidation process (AOP) [5], and catalytic wet air oxidation [6-9]. Another treatment process that has been reported to be effective for aqueous phenol is electrochemical oxidation [10-13]. Electrochemistry has the advantages of simple operation, no chemical additives and high energy efficiency. However, improvements are needed to improve oxidation rates and efficiencies and to extend the lifetime of the electrodes.

Electrochemical oxidation kinetics of classical bipolar systems is limited by diffusional mass transfer since convection becomes negligible within a few millimeters, e.g., between 1 mm and 3 mm or between 1 mm and 2 mm, of the electrode surface. Thus, electrochemical oxidation kinetics can be increased by using three-dimensional electrode nanoarchitectures where the liquid to be treated can flow through the electrode, thus enhancing mass transport. The production of a three-dimensional nanoporous electrode requires the material to be electrically-conducting, mechanically-sound, and corrosively-stable. Three-dimensional carbon nanotube networks can fulfill all of these requirements. For example, wastewater seepage electrodes and electrochemical carbon nanotube filters have been reported to increase current densities by 3-fold and 6-fold as compared to the classical bipolar configuration. Electrochemical carbon nanotube network, as described herein, can be effective as an anodic water filter for the oxidation of dyes, anions, aromatic organics, and small polar and aliphatic organics as well as bacteria and virus removal and inactivation [18-23].

There are a number of passivation processes that can reduce electrode activity. In electrochemical aromatic treatment, a major passivation mechanism is oxidative polymerization and subsequent electrode passivation by the polymer coating [14-17]. One strategy to reduce such polymerization and thus passivation can be development of dimensionally-stable electrodes with high oxygen overpotentials. For example, the boron-doped diamond electrode is stable and produces minimal oxygen at potentials >2.0 V where phenol is completely mineralized to $CO_2$ and $H_2O$. However, the cost of boron-doped diamond electrodes has limited their large-scale use. Another strategy can be to develop simple methods for passivant removal and electrode regeneration.

As presented herein, purified and characterized carbon nanotube networks were utilized for the electrochemical filtration of phenol as the model aromatic pollutant in 100 mM sodium sulfate ($Na_2SO_4$). Electrochemical methods such as chronoamperometry, electrochemical impedance spectroscopy (EIS), and linear sweep voltammetry (LSV) were used to monitor the electrochemical and passivation processes and to evaluate the electrodes before and after phenol electrolysis. Total organic carbon measurements of the influent (input fluid) and effluent (output fluid) were utilized to monitor phenol removal. Scanning electron microscopy and image analysis were used to determine the extent of polymer formation on the carbon nanotube electrode. As discussed in detail below, titanium oxidation, electrolyte precipitation, phenol polymerization, and carbon nanotube oxidation were identified as possible passivation mechanisms. Various methods to regenerate the electrode activity were evaluated, including Ti polishing, aqueous precipitant dissolution, acidic and basic polymer removal, organic solvent polymer removal, and electrochemical polymer removal. Application of an anode potential ≥2.0 V was also evaluated for the reduction or prevention of polymer formation.

Titanium versus CNT Passivation. To investigate the effect of both titanium ring and carbon nanotube passivation, the CNT filtration apparatus described herein was passivated by running 72 mgC $L^{-1}$ phenol in a 100 mM sodium sulfate electrolyte through the CNT network of the filtration apparatus, e.g., at an anode potential of 1.6 V for 6 hours. The current (mA) and effluent TOC (mgC $L^{-1}$) versus time (min) and the electrochemical impedance (ohm) before and after passivation are shown in FIG. 27A. At the start of the passivation process, the current is near 50 mA and the effluent TOC is 23 mgC $L^{-1}$ and over the first two hours the current decreases sharply and exponentially to around 7 mA and the effluent (output fluid) TOC increases linearly to near 50 mgC $L^{-1}$. Over the next four hours the current decreases slowly and linearly to 5 mA and the effluent (output fluid) TOC increases to 60 mgC $L^{-1}$. The electrochemical impedance increased from 2 Ohm for the fresh CNT network to 37 Ohm after 6 hours of electrolysis. The significant decrease in current, and increase in effluent (output fluid) TOC and electrochemical impedance indicate that the electrochemical CNT network has been passivated.

To determine the source of the passivation, the titanium ring and/or the CNT network from the previous passivation experiment were polished and replaced, respectively, and then the passivation experiment was continued. After polishing the titanium ring (FIG. 27B), the current increased immediately close to about 50 mA when the fresh electrode was initially used (as shown in FIG. 27A) and the electrochemical impedance was slightly reduced to ~30 Ohm. However, the effluent (output fluid) TOC was unchanged. Such findings indicate that oxidative passivation of the titanium can, at least partly, contribute to the decrease in current, but that an active CNT network can be necessary for electrochemical reaction and TOC removal. This is in agreement with previous reports of electrochemical oxidation of conductive titanium to the semiconductive titanium oxide ($TiO_2$) [24-29].

After the titanium ring was polished, the passivation experiment was continued under similar conditions, but this time the CNT network was replaced with a fresh network (FIG. 27C). The replacement of the CNT network results in an increase in current from 2.5 mA to 15 mA, which is less than the improvement resulted from polishing the titanium ring, indicating that oxidation of the titanium ring is primarily responsible for the reduction in steady-state current. In contrast, the effluent (output fluid) TOC is significantly decreased from 70 mgC $L^{-1}$ to 30 mgC $L^{-1}$ and the electrochemical impedance is reduced from ~215 Ohm to ~45 Ohm after replacement of the CNT network. This result indicates that an active CNT network is critical to organic oxidation and removal and that modifications to and/or coatings on the CNT network are, at least partly, responsible for the increase in electrochemical impedance. The coatings can be due to electrolyte precipitation and phenol precipitation, which were previously reported to occur to a significant extent, e.g., equivalent to a greater mass than the CNT network itself.

Linear sweep voltammograms (LSV) were also performed, in similar conditions as the electrochemical impedance spectroscopy experiments, on the CNT network before passivation, after passivation, after regeneration, and before and after running only 100 mM sodium sulfate electrolyte as a control. Comparing the LSV of a fresh CNT network in the presence (black solid line) and absence of phenol (gray solid line) a number of peaks are present, with the most predominant peak at 0.85 V (indicated by the red arrow) that corresponds to the one-electron oxidation of phenol (Eq. 1)

$$C_6H_6O \rightarrow C_6H_5O \cdot + e^- + H^+; \ E^0 = 0.86 \text{ V} \tag{1}$$

Without wishing to be bound by theory, continued oxidation could first result in the formation of quinones and hydroquinones, which could be further oxidized to small organic acids such as formic acid, maleic acid, oxalic acid, and finally mineralized to carbon dioxide and water. If the anode potential is not sufficiently high, the intermediate phenolic free-radicals adsorbed to the electrode surface can polymerize as reported in previous studies [11, 30-35]. These other oxidative reactions are likely responsible for the other peaks observed in the LSV of the fresh CNT film. Distinct peaks are not observed in the LSV of other conditions indicating that either a wide-distribution of electron transfer site energies has been produced and/or a wide-distribution of intermediate organics has been produced as both can be expected after multi-hour electrolysis.

After each multi-hour electrolysis, the current at all voltages in the linear sweep voltammogram has been significantly reduced indicating that the electrode has been passivated. Both the polishing of the titanium (black dash to blue solid line) and replacement of the CNT network (blue dash tared solid line) results in an increase in current over the range of voltages. Even for the more passivated films (blue dash, red dash, and gray dash), the CNT network never becomes completely passivated because once the anode potential becomes greater than 0.6 V the current becomes greater than zero. FIG. 27E illustrated that the anode potential distribution varies with different reaction conditions with the same applied voltage, and that (along the gray horizontal arrow direction shown in the figure) higher anode potential are required for producing the equal current to the stable cathode in cases of the used titanium ring and/or the used CNT film system. This indicates that CNT film and titanium ring are primarily responsible for the electrochemical performance and its passivation. The findings indicate that titanium ring can be regenerated by polishing the surface of the titanium ring that contacts the CNTs. In terms of the efficacy of phenol removal or other organic removal, it is more important to ensure that the CNT network does not become passivated.

Two CNT network regeneration procedures were first evaluated: the EtOH—HCl method is to flow 60-mL of an acidic (pH 1.7) 1:1 ethanol:water solution over the electrode and the DMSO-redisperse method is to redisperse the passivated CNT network in DMSO and re-produce the network by filtration. These regeneration procedures were selected since there can be electrolyte precipitation and/or polymer formation occurred on the CNT network in significant amounts as comparable to the CNT mass. The EtOH—HCl method can be used for the precipitate removal and the DMSO-redisperse method can be used for the polymer removal.

As shown in FIG. 28B, the EtOH—HCl regeneration method decreases the electrochemical impedance, increases the current, and decreases the effluent (output fluid) TOC. While the electrochemical performance of the EtOH—HCl-regenerated CNT network is improved as compared to the passivated one, its performance is still below the performance of a fresh CNT film (FIG. 27A). The significant decrease in effluent (output fluid) TOC and electrochemical impedance, yet relatively small increase in current indicate that, as discussed earlier, oxidation of the titanium ring is more responsible for the changes in steady-state current whereas modifications to and coatings of the CNT network are responsible for changes in electrochemical impedance and efficacy of TOC removal. The EtOH—HCl method can remove any electrochemically-precipitated salts on the CNT network and the efficacy of this regeneration technique indicates that the insulating precipitates can coat and passivate the electrochemically-active CNT surface sites.

As shown in FIG. 28C, the DMSO-redisperse method results in a 50% decrease in electrochemical impedance, but no significant improvement in effluent (output fluid) TOC removal or in steady-state-current. The minimal effect of re-dispersing the passivated CNT network in DMSO on the CNT network passivants indicates that the CNT network passivants can be insoluble in DMSO and/or they can be permanent modifications to the CNTs. Significant electrolyte precipitation and non-polar aromatic polymer formation, both of which would only be slightly soluble in the polar, aprotic DMSO, has also been previously reported. Previous reports on inefficient removal of the passivating polymers formed during phenol electrolysis with the polar solvents isopropanol and EtOH [36] also indicate that aromatic electropolymers are non-polar. The linear sweep voltammograms in FIG. 28D show that the improvement in current at all voltages after the EtOH—HCl treatment (black dash to blue solid) is greater than the DMSO-redisperse treatment (blue dash to red solid) by 50% to 100%. This result indicates that the electrochemical formation of insulating salt precipitates can passivate the CNT network electrode and that the DMSO-redisperse method is not as ineffective as the EtOH—HCl method for the regeneration of the electrode. Similar to FIG. 27D, the CNT networks did not completely passivated since the current becomes greater than 0 when the anode potential is greater than 0.6 V. In summary, the electrochemical CNT network passivation is most likely due to both electroprecipitation and electropolymerization coating the CNT network electrode. While the precipitants can be removed with an acidic ethanol-water wash, neither the EtOH—HCl method nor the DMSO-redisperse method was effective for the removal of the non-polar electropolymer. Since electropolymerization is one of the most common passivation mechanisms, methods to prevent electropolymerization and/or to regenerate polymer-coated electrodes, e.g., by more intense washing methods including highly acidic/basic aqueous solutions and non-polar organic solvents, were next evaluated.

Electrode Regeneration Methods for Polymer Removal. As discussed earlier, neither the EtOH—HCl method nor the DMSO-redisperse method was effective for electropolymer removal. Different electrode regenerate methodologies were evaluated, including acidic ethanol-water wash with cyclic voltammetry (EtOH—HCl-CV), calcination, redispersion with highly basic or acidic waters, and redispersion with organic solvents over a range of polarities. The pre- and post-regeneration polymer mass for all of the regeneration methods and the apparent CNT diameter and percent polymer removal as a function of organic solvent polarity are shown in FIGS. 29A-29B, and the SEM images of the various CNT filters after different washing solution are shown in FIG. 29C. As discussed earlier, the EtOH—HCl and DMSO-redisperse methods only removed 16% and 3% of the total polymer, respectively. The combined wash and electrochemical methods of EtOH—HCl-CV improved the efficacy and removed 25% of the formed polymer. Calcination of the passivated CNT network at 400° C. for about 1 hour after washing with water to remove the precipitant resulted in ≥97% of polymer being removed, indicating that this approach can be used to remove the passivating polymer on the CNT network. However, precaution should be taken with this high-temperature method in order to avoid oxidizing the CNT network itself, which will be discussed in detail later.

Three aqueous solutions of extreme pH: NaOH (pH 13), NaOH (pH 13)+SDS (1%), and HCl (pH 1.7) were assessed for their ability to remove the CNT electropolymer coating. Among these three solutions, the acidic solution was the most effective as it removed>97% of the polymer. The basic-detergent solution removed 54% of the polymer, and the basic-only solution removed 37% of the polymer. Without wishing to be bound by theory, the efficacy of these extreme pH aqueous solutions to remove polymer from the CNT network can rely on polymer hydrolysis catalyzed by the acidic or basic solution, thus yielding water soluble monomers. In other embodiments, the efficacy of the basic and acidic solutions to remove polymer from the CNT network can likely rely on a depolyrperization mechanism.

A number of common organic solvents over a range of polarities, e.g., n-methylpyrrolidone (NMP), DMSO, ethyl alcohol (EtOH), toluene, and hexane, were also evaluated for their ability to remove the CNT electropolymer coating. Toluene and hexane, the most non-polar solvents, were both able to remove >97% of the polymer coating from the CNT network electrode. The extent of polymer removal increased with the increasing non-polar nature of the solvent indicating that the polymer was also non-polar. The electropolymer coating the CNT network can be polyphenoxide or polyphenyleneoxide, which is highly aromatic and non-polar.

In summary, the methods of calcination and redispersion in HCl (pH 1.7), toluene, or hexane are effective for >95% removal of the electropolymer passivant coating. However, the methods of calcination and redispersion in HCl (pH 1.7) or toluene are preferably used for regenerating the passivated CNT network as the CNTs can be poorly dispersed in the hexane resulting in mechanically-unstable networks post-filtration.

Post-regeneration CNT Network Performance. To assess the efficacy of the various CNT network regeneration methods with respect to electrochemical performance, the regenerated CNT films were evaluated using a number of methods including linear weep voltammogram, steady-state current versus anode potential, anode potential versus applied voltage, and effluent (output) TOC versus potential and time. The results of these experiments are shown in FIGS. 30A-30F for seven CNT networks of different conditions: a fresh CNT network, a passivated CNT network, a calcination-regenerated CNT network, a HCl-regenerated CNT network, and a toluene-regenerated network, and a CNT network run with only sodium sulfate electrolyte and a CNT network treated with $HNO_3$ as examples of oxidized CNTs. In regards to the current versus anode potential as shown in FIGS. 30A-30C, all of the regenerated CNT networks show improved performance over the passivated network, but none of them achieve the performance as a fresh CNT network. There is a distinct electron transfer peak only for the calcinated CNT network in the linear sweep voltammogram and this peak is shifted to a higher potential as compared to the fresh CNT network, indicating that there can be a tightly bound CNT surface coating that can be removed, among all the tested method, only by calcinating the CNTs at higher temperatures and that this coating can cause the energy of the CNT electron transfer sites to be broadened and the rate of electron transfer to be reduced. This can be supported by the LSV of the CNT films reactivated or regenerated with toluene or HCl wash as their current is lower at all potentials and there are no obvious phenol oxidation peak. At the same time anode potential-voltage relation as shown in FIG. 30B can also support the data of FIG. 30A. The steady-state current versus anode potential as plotted in FIG. 30C is in agreement with the LSV as shown in FIG. 30A. Thus, in terms of the electrochemical current, calcination is seemingly the optimal CNT network regeneration method. However, it should be noted that if the current efficiency towards a desired reaction is low then energy is only being wasted. Thus, an analysis of the regenerated networks toward phenol TOC removal was also performed.

The electrochemical filtration performance of the regenerated CNT networks towards phenol removal as measured by the difference in TOC between the influent and the effluent as function of anode potential and time is shown in FIGS. 30E and 30F, respectively. Although the calcinations method was the most optimal method in regards to improving the total current, the calcinated CNT network did not perform well in regards to TOC removal, especially at anode potentials ≥1.2 V that are necessary to completely oxidize phenol. After 130 minutes at an anode potential of 1.6 V, the calcinated CNT network lost structural integrity and yielded the effluent (output fluid) TOC equivalent to the influent (input fluid) TOC. The breakdown of the calcinated CNT film at higher potentials can be, at least partly, due to oxidative cutting and shortening of the CNTs during the calcination process, which can in turn generate more defect sites for further oxidation and led to a CNT network of a lower mechanical stability. In contrast, the CNT films reactivated or regenerated by toluene or HCl wash exhibited better performance towards the electrochemical oxidation and removal of phenol as compared to the calcination method, even though their instantaneous and steady-state currents were only slightly improved. This finding indicates that a toluene or HCl wash can regenerate the most active CNT electron-transfer sites that are typically found at the ends of the nanotubes. In particular, the CNT network reactivated or regenerated by the toluene wash method displayed at least a similar, if not better, performance on phenol oxidation and removal as compared to a fresh CNT network when the anode potential was ≥1.6 V. Accordingly, the CNT network can be regenerated for phenol oxidation and removal with a simple toluene wash.

It was next sought to determine why the toluene regeneration method could not improve the current and why the specific oxidation peaks were not detected using the toluene regeneration method. As discussed earlier, there could be some surface impurity or coating that covers a highly active, but weakly oxidative electron-transfer site resists removal during the strong non-polar washing. For example, the two primary electron-transfer sites present on a CNT are the oxidized ends and the sidewall defects of the CNTs. Aromatics are known to strongly sorb to the CNT sidewalls due to pi-pi interactions and thus if they are not removed during washing, aromatics could continue to passivate the sidewall defect electron transfer sites. Alternatively, during the initial electrolysis and passivation, the CNT surface could be oxidized along with the phenol. For example, it was previously reported that the surficial CNT O/C ratio increased from 0.026 for fresh CNTs to 0.045 for CNTs used as an electrochemical filter. If CNT oxidation could contribute to passivation, the passivation could be permanent unless the oxidized CNTs could be reduced to their original state. Calcination can increase the O/C ratio and thus may not less effective to treat oxidized CNT network.

As such, it was next sought to determine whether phenol absorption on the CNT network and/or CNT oxidation could contribute to CNT passivation. In the first experiment, the CNTs were pre-oxidized with a concentrated nitric acid solution (denoted by $HNO_3$-CNTs) at 70° C. for 12 h and the O/C ratio of the $HNO_3$-CNTs is increased to 4.1%. If oxidation were the primary cause of passivation, then the regenerated CNT networks should perform comparably to the $HNO_3$-CNTs networks. In the second experiment, a fresh CNT network was used to electrochemically filter 100 mM Na$_2$SO$_4$ electrolyte without phenol (denoted by CNT-Na$_2$SO$_4$) and then washed with HCl for reactivation or regeneration. If there were an aromatic organic coating that cannot be removed by the toluene wash, then this coating should not be present on theses CNTs after regeneration since no phenol was used during the electrochemical filtration. The CNT-Na$_2$SO$_4$ network can be more oxidized than the fresh network as the surficial O/C ratio is around 4.5%.

The LSV and steady-state current versus voltage plots in FIGS. 30A and 30C show that the CNT-HNO$_3$ curves are quite similar to the fresh CNT network curves with a slightly smaller current from 0.7 V to 1.2 V. On the other hand, the CNT-Na$_2$SO$_4$ curve looked more like the passivated CNT network or washed CNT network curves in that the current increased rather linearly with potential and only one slight peak was present in the LSV. However, similar to the calcinations versus wash results, the CNT-Na$_2$SO$_4$ network performed significantly better in regards to phenol oxidation and removal as compared to the HNO$_3$-CNT even though the former had lower steady-state current. This finding indicates that external CNT oxidation methods such as calcinations and concentration nitric acid can result in the formation of a large number of weakly-oxidizing electron-transfer sites. This is in agreement with the reduced performance of the HNO$_3$-CNTs as compared to the CNTs with other surface modification with respect to its electrochemical filtration and oxidation of a number of organics such as methyl orange, methanol, and CTAB [19]. It is also of note that at higher potentials and longer electrolysis times, the CNT-Na$_2$SO$_4$ network performed better than the fresh CNT network with respect to phenol removal and oxidation. While both the CNT-Na$_2$SO$_4$ (O/C=0.045) and the CNT-HNO$_3$ (O/C=0.041) are both oxidized to a greater extent than the fresh CNTs (O/C=0.022), the CNT-Na$_2$SO$_4$ and the CNT-NHO$_3$ networks performed in opposite direction from the control (fresh CNT network). One possibility is that since they are oxidized in different manners the resulting surface functional groups can be quite different, i.e., oxidation by thermal HNO$_3$ (NO$_2^+$) and electrochemically-produced persulfate S$_2$O$_8^{2-}$ (SO$_4^-$) can result in a different distribution of functional groups on the CNT surface. For example, a previous report indicates that the capacitor of CNT-oxi-Na$_2$SO$_4$ is 31.4 uF and higher than 16.9 uF of CNT-HNO$_3$, and higher capacitor is useful to transfer electron quickly in double layers, which is important feature for electrochemical reaction.

In summary, among different regeneration methods evaluated herein, a wash with toluene can reactivate a polymer-passivated CNT filter electrode more effectively with respect to aromatic oxidation and removal performance. However, the LSV and steady-state current measurements indicate that a fraction of the CNT electron-transfer sites can remain passivated. An HCl wash was also effective for >95% polymer removal, however, the electrochemical performance was lower than a fresh CNT network. Calcination of the polymer-passivated CNTs also resulted in >95% polymer removal, however, the calcinated CNT network could lose a significant amount of its mechanical and electrochemical stability, thus resulting in breakdown during subsequent use. Without wishing to be bound, hybrid methods can also be used to remove polymer from electrochemical CNT networks.

Alternatives—How to Reduce or Prevent Polymer Formation: Instead of removing passivating polymer completely from the CNT surface, an alternative method is to reduce or prevent such polymer from depositing on the carbon nanotubes in the first place. Thus, it was next sought to determine if running the filtration system at high potentials could prevent formation of the polymer that passivates the CNT network. Three anode potentials 0.82 V, 1.60 V and 2.10 V, corresponding to voltages 2.09 V, 3.06 V and 3.42 V, respectively, were applied to electrochemical oxidation of phenol. As shown in FIGS. 31A-31D, the apparent removal efficiency, as indicated by effluent (output fluid) TOC, at an anode potential of 0.82 V and 1.60 V is better than that at an anode potential of 2.10 V. At lower anode potentials, phenol is apt to form polymer by emitting one electron (C$_6$H$_6$O→C$_6$H$_5$O.+e$^-$+H$^+$), but at higher anode potentials, such as 2.10 V, phenol can be oxidized completely to CO$_2$ and H$_2$O by .OH etc. in which 28 e$^-$ is involved in the reaction (C$_6$H$_6$O+7O$_2$→6CO$_2$+3 H$_2$O+28e$^-$). The complete oxidation requires more electrons because at higher anode potentials there are some side reaction such as oxygen evolution, which can consume the current. The current at the anode potential of 2.1 V is about 1~4 times (rather than 28 e$^-$/1 e$^-$=28 times) higher than that at the anode potential of 0.82 V or 1.60 V (FIG. 31E). However, the effluent (output fluid) TOC at the anode potential of 2.1 V maintained stable over time, while the effluent (output fluid) TOC at the anode potential of 0.82 V and 1.60 V increased gradually and exceeded the level observed at the anode potential of 2.1 V around 150 min and 360 min, respectively, probably because the CNT surface at low potentials were occupied near fully by the polymer and their electrochemical oxidation thus became limited. The effluent (output fluid) TOC at the anode potential of 1.60 V was lower than that at the anode potential of 0.82 V for a longer period of time, because both polymerization and electrochemical oxidation of phenol can occur at the anode potential of 1.60 V, while polymerization is the major reaction at the anode potential of 0.82 V, thus resulting in earlier passivation. FIGS. 31B-31D show the SEM images of the CNT network operated at different anode potentials and their corresponding diameters (37.2±4.6 nm at 0.82 V, 28.7±5.7 nm at 1.60 V and 21.1±7.6 nm at 2.10 V). The CNTs at the anode potentials of 0.82 V and 1.60 V appeared to be coated with polymer, but the latter appeared to have a thinner coating than the former, whereas at the anode potential of 2.10 V, some salt particles other than polymer was formed on the CNT film. The salt particles can come from Na$_2$SO$_4$, Na$_2$S$_2$O$_8$ (2SO$_4^{2-}$→S$_2$O$_8^{2-}$+2e$^-$) and/or Na$_2$CO$_3$ (CO$_2^-$+H$_2$O→CO$_3^{2-}$+2H$^+$), which, unlike polymer, can be washed out easily. However, too high potentials can result in CNT oxidation and even destroy the CNT network, so an optimal potential should be selected.

Accordingly, in some embodiments, higher potentials can be used to reduce polymer formation on the CNT network during electrochemical filtration. In some embodiments, the passivated CNT networks can at last partially regenerated by the methods described herein, e.g., a toluene wash. In some embodiments, CNT surface performance can be improved by pre-coating or doping or mixing the CNT network with an active material to form synthetic composites with at least one performance feature including but not limited to high anti-oxidation, anti-pollution, self-cleaning, high oxygen evolution potential, high film strength and any combinations thereof.

Exemplary Materials and Methods for Example 13

Chemicals. Phenol (PhOH), hydrochloric acid (HCl; 36.5-38.0%), nitric acid (HNO$_3$; 69.8%), sulfuric acid (H$_2$SO$_4$; 95.0-98.0%), phosphoric acid (H$_3$PO$_4$; >85.0%), sodium hydrate (NaOH; ≥99.9%), ethyl alcohol (EtOH; ≥95.0%), dimethylsulfoxide (DMSO; ≥99.9%), potassium hydrogen phthalate (KHP), sodium sulfate (Na$_2$SO$_4$), sodium persulfate (Na$_2$S$_2$O$_8$), sodium bicarbonate (NaHCO$_3$), sodium carbonate ($Na_2CO_3$), n-methylpyrrolidone (NMP; ≥99.9%), sodium dodecyl sulfate (SDS), toluene ($C_7H_8$) and hexane ($C_6H_{14}$) were purchased from Sigma-Aldrich. All chemicals were reagent grade except DMSO, which was spectrophotometric grade.

CNT Selection and Purification. The multi-walled carbon nanotubes were purchased from NanoTechLabs, Inc. (Yadkinville, N.C.) and then purified for optimal electrochemical performance. To remove non-CNT carbon impurities, about 1 g of CNTs was calcinated, e.g., in a tube furnace, by increasing from room temperature to about 400° C. at a rate of 5° C. per min and holding for about 60 min (Thermolyne, 21100). To remove the residual metal catalyst impurities, about 0.5 g of calcinated CNT was placed into 0.5 L of concentrated hydrochloric acid and heated to about 70° C. in a round-bottom flask with stirring and a condenser for at least about 12 hours. After heating, the sample was cooled to room temperature and vacuum filtered through a 5-μm PTFE membrane (Omnipore, Millipore) [19]. The CNTs were then washed with MilliQ deionized water (DI) until the filter output fluid pH was neutral. The sample was then oven dried at 100° C.

Electrochemical CNT Filter Preparation. The CNT filters were produced by first dispersing the CNTs in DMSO at about 0.5 mg/mL by probe sonication (Branson, Sonifier S450) for 15 min at an applied power of 400 W/L. Then, 30 mL of the CNTs in DMSO were vacuum filtered onto a 5-μm PTFE membrane (Millipore, Omnipore, JMWP), resulting in filter loadings of 1.5 to 1.6 mg/cm$^2$. The CNT filters were washed with 100 mL EtOH, 100 mL 1:1 DI-$H_2$O:EtOH, and 250 mL DI-$H_2$O to remove DMSO. Finally, the prepared filter was loaded into an electrochemistry modified filtration casing, as described herein. See also, e.g., Ref. 19.

Passivation and Regeneration of the CNT Network. The passivation experiments were completed by flowing an input fluid solution (or an influent solution) of 1 mM or 72 mgC $L^{-1}$ phenol and 100 mM sodium sulfate through the electrochemical CNT network described herein at 1.5 mL min$^{-1}$. Then, an applied voltage of approximately 3 V was applied to achieve an anode potential of 1.6 V. The solution was then flowed through the electrochemical filtration apparatus described herein until the effluent (i.e., output fluid) total organic carbon (TOC) became similar to the influent (i.e., input fluid) TOC (usually 6 to 12 hours) as an indicator that the electrode was passivated. To determine the source of passivation within the filtration apparatus, either the used CNT network was replaced with a fresh CNT network or the titanium ring was polished. To remove the precipitant and polymer passivants from the carbon nanotubes, two regeneration methods were assessed. The first method (EtOH—HCl) involved flowing 60 mL of an acidic 1:1 ethanol:water solution at pH 1.76 at a flow rate of 1.0 mL min$^{-1}$. The second method (DMSO-disperse) involved redispersing the CNTs in DMSO and reproduction of the CNT filter as described earlier. Chronoamperometry and TOC removal versus time can be used to monitor the passivation process and the efficacy of the regeneration methods. Electrochemical impedance spectroscopy, linear sweep voltammograms, and open circuit anode potential versus applied voltage (CHI Inc., CHI604D) can be used to evaluate the electrodes before passivation, after passivation, and after regeneration.

Additional Regeneration Methods. Three additional regeneration methods were developed to gain further insight into the optimal process. First, an electrochemical regeneration method (EtOH—HCl-CV) was performed by flowing an acidic 1:1 ethanol:water solution with concomitant cyclic voltammetry (CV) at a scan rate, e.g., of 10 mV s$^-$. Second, the passivated films were calcinated, e.g., in a tube furnace, by increasing from room temperature to 400° C. for at a rate of 5° C. per min and holding for about 60 min. Third, the passivated films were redispersed by ultrasonication in 30-mL of 8 different solutions: NaOH (pH 13), NaOH (pH 13)+SDS (0.1%), HCl (pH 1.76), n-methylpyrrolidone, DMSO, EtOH, toluene, and hexanes. The CNT solutions were then placed in an oven, e.g., set to 50° C., for at least 24 hrs before preparing the new CNT network. The electrochemical methods and scanning electron microscopy as described earlier and CNT network weights were used to evaluate the CNT networks before passivation, after passivation, and after regeneration.

SEM Analysis. Scanning electron microscopy was performed on a Zeiss FESEM Supra55VP. Micrographs were analyzed with ImageJ software to determine CNT diameter. Measurements were an average of at least 100 measurements from at least 2 network images.

Example 14

Doped Carbon Nanotube Networks for Electrochemical Filtration of Aqueous Phenol: Polymerization and Precipitation As described herein, a CNT network, which is electrically-conducting, mechanically-sound, and corrosively-stable[7,11], and provides high surface area for increasing the number of electrochemically-active surface sites[7] and high porosity for enhanced ion and molecular transport[10], can be utilized as an anodic water filter for chemical removal and oxidation[6,12] and bacterial and virus removal and inactivation.[9] Accordingly, CNT networks of different physical or chemical properties can be utilized as three-dimensional electrode structures for advanced water treatment. For example, varying physical and chemical properties of the CNTs such as diameter, chirality, and doping can affect the electrochemical activity of the CNT network.

CNT doping with boron (B-CNT, p-type) or nitrogen (N-CNT, n-type) has been reported to effect the CNT electronic structure and in turn will likely also effect the CNT electrochemical activity. As compared to undoped carbon nanotubes (C-CNT), both the B-CNT and N-CNT have been reported to have a greater conductivity[13-15] and a higher specific capacitance[16,17]—two properties that are critical to electrochemical performance. The primary difference between the two dopants is their specific effect on the nanotube work function, i.e., the distance from the material Fermi level to the vacuum level. The work function is 4.6 eV for C-CNT, 5.2 eV for B-CNT, and 3.9 eV-4.4 eV for N-CNT[18,19]. The greater B-CNT work function indicates that B-CNT can be the optimal material for driving oxidative processes. Due to their improved electronic properties as compared to undoped CNTs, both B- and N-doped CNTs can be used for electrochemical applications. The higher B-CNT work function makes it useful for sensing of electron-rich gases[20] and electroanalysis of biomolecules.[21] The lower N-CNT work function makes it useful as a reduction catalyst.[22] For example, N-CNTs have been reported to be used for oxygen reduction in fuel cells and for reactive oxygen species production.[23] Accordingly, it was sought to determine if utilization of anodic B- and N-doped CNT networks can result in an increase in electrochemical filtration performance towards wastewater treatment.

As presented herein, purified and characterized undoped (C-CNT), boron-doped (B-CNT), and nitrogen-doped (N-CNT) carbon nanotube networks were utilized for the electrochemical filtration of an aromatic wastewater. Phenol (PhOH) was selected as the model aromatic pollutant as it is a common industrial solvent and often found in petroleum wastewaters. The electrochemical filters were exposed to 0.0 mM, 0.2 mM, and 1.0 mM phenol in 100 mM $Na_2SO_4$ electrolyte. The electrochemical oxidation efficiency was monitored by measurement of steady-state current and effluent total organic carbon (TOC) concentrations to determine apparent TOC removal efficiency and to compare the efficacy of the three CNT networks. SEM, TGA, and XPS 32A-32D). The pore size distribution of the three networks is similar with an average pore diameter of around 105 nm and a standard deviation of ~45 nm. The surficial O/C ratio as determined by XPS for all three CNT samples is between 0.025 and 0.035. The surficial B- and N-doping as determined by XPS is around 1%. A primary difference between the three materials is their previously reported work functions[18, 19] that correspond to Fermi level redox potentials (vs. NHE) of about −0.1 V for the N-CNT, about 0.1 V for the C-CNT, and about 0.8 V for B-CNT.

TABLE 6

Physical and Chemical Properties of Fresh and Electrolyzed Electrochemical Carbon Nanotube Networks (shown on the next page)

| # | Sample | Phenol | Echem-t | Mass-mg | d(CNT)-nm$^a$ | d(pore)-nm$^a$ | CNT$^b$ | % Res$^b$ | % Poly$^b$ | % Burn Peak T$^b$ | O/C$^c$ | S/C$^c$ | O/S$^c$ | B-N/C$^c$ | Na/S$^c$ |
|---|--------|--------|---------|---------|---------------|----------------|---------|-----------|------------|--------------------|---------|---------|---------|-----------|----------|
| 1 | C-CNT | 0 | 0 | 15.4 | 17.1 ± 6.6 | 104 ± 39 | 97.8 | 2.2 | 0.0 | 657, 637 | 0.026 | 0 | 0 | n/a | |
| 2 | C-CNT | 1 mM | 0 | 17.1(16.4) | 18.2 ± 7.4 | 96 ± 43 | 95.5 | 4.5 | 0.0 | 617, 604, 584, 551 | 0.030 | 0.003 | 10.7 | n/a | 3.15 |
| 3 | C-CNT | 0 | 5 h | 41.7 | 18.9 ± 7.2 | 100 ± 42 | 68.4 | 31.6 | 0.0 | 541, 502 | 0.283 | 0.020 | 14.5 | n/a | |
| 4 | C-CNT | 0 | 5 h-Wash | | 17.9 ± 8.4 | 106 ± 50 | 98.9 | 1.1 | 0.0 | 643, 625, 592 | 0.045 | 0 | 0 | n/a | |
| 5 | C-CNT | 0.2 mM | 5 h | 52.3 | 34.2 ± 11.5 | 115 ± 55 | 23.3 | 27.3 | 40.4 | 524, 448, 391 | 0.309 | 0.070 | 4.5 | n/a | 2.50 |
| 6 | C-CNT | 1 mM | 5 h | 46.8 | 29.9 ± 10.3 | 109 ± 52 | 38.3 | 17.9 | 43.7 | 563, 540, 485, 407 | 0.293 | 0.014 | 20.4 | n/a | |
| 7 | C-CNT | 1 mM | 5 h-Wash | 29.5 | 25.1 ± 8.1 | 114 ± 54 | 50.9 | 0.0 | 49.1 | 646, 627, 565, 462 | 0.075 | 0 | 0 | n/a | |
| 8 | C-CNT | 1 mM | 20 h | 55.9 | 46.4 ± 12.5 | 140 ± 77 | 31.5 | 5.0 | 63.4 | 523, 438, 412, 327 | 0.289 | 0.019 | 15.3 | n/a | 2.70 |
| 9 | B-CNT | 0 | 0 | 15.6 | 18.6 ± 5.9 | 112 ± 46 | 99.0 | 1.0 | 0.0 | 737, 700 | 0.032 | 0 | 0 | 0.007 | |
| 10 | B-CNT | 0 | 5 h | 33.8 | 20.1 ± 7.9 | 102 ± 41 | 77.5 | 22.5 | 0.0 | 554, 541 | 0.300 | 0.041 | 7.3 | 0.022 | |
| 11 | B-CNT | 0.2 mM | 5 h | 50.2 | 29.5 ± 8.4 | 108 ± 48 | 31.4 | 25.6 | 43.0 | 570, 521, 426, 423 | 0.275 | 0.013 | 21.4 | 0.012 | 3.24 |
| 12 | B-CNT | 1 mM | 5 h | 34.8 | 29.4 ± 7.7 | 117 ± 62 | 45.4 | 11.0 | 43.6 | 542, 507, 404, 373 | 0.272 | 0.009 | 30.3 | 0.004 | |
| 13 | N-CNT | 0 | 0 | 15.6 | 25.1 ± 13.6 | 99 ± 42 | 99.6 | 0.4 | 0.0 | 616, 560 | 0.033 | 0 | 0 | 0.013 | |
| 14 | N-CNT | 0 | 5 h | 48.2 | 24.7 ± 8.7 | 123 ± 50 | 65.9 | 34.1 | 0.0 | 560, 518 | 0.224 | 0.016 | 13.7 | 0.020 | |
| 15 | N-CNT | 0.2 mM | 5 h | 52.1 | 39.3 ± 13.6 | 118 ± 53 | 27.4 | 20.1 | 52.5 | 526, 493, 433, 365 | 0.561 | 0.062 | 9.1 | 0.018 | 2.98 |
| 16 | N-CNT | 1 mM | 5 h | 47.1 | 33.4 ± 10.2 | 115 ± 53 | 31.0 | 17.6 | 51.4 | 553, 522, 454, 361 | 0.252 | 0.010 | 24.6 | 0.015 | |

$^a$determined by SEM.
$^b$determined by TGA.
$^c$determined by XPS analysis of the CNT networks before and after electrochemical filtration can, at least partly, determine the electrode passivation mechanisms of electrochemical phenol polymerization and electrochemical electrolyte precipitation.

Characterization of Doped CNT Networks. The three carbon nanotube (CNT) samples assessed included undoped (C-CNT), boron-doped (B-CNT), and nitrogen-doped (N-CNT). The three CNT samples were formed into filter materials or networks by vacuum filtration. The CNT networks were then characterized by thermogravimetric analysis (TGA), scanning electron microscopy (SEM), and X-ray photoelectron spectroscopy (XPS), with the results presented in FIGS. 32A-32F, FIGS. 33A-33C and Table 6 below. The TGA burn temperatures in FIG. 32A indicates that the B-CNT are the most oxidatively stable CNT followed by C-CNT and then N-CNT, in agreement with previous reports that B-doped CNTs have increased graphitization.[25] All three CNT samples were at least 97.5% CNT and the doped CNTs were ≥99.0% CNT. SEM of the C-CNT, B-CNT, and N-CNT networks are shown in FIGS. 32B, 32C, and 32D, respectively. The B-CNT and C-CNT have a similar average diameter of 17 nm to 19 nm. In contrast, the N-CNTs are larger with an average diameter of ~25 nm. The N-CNTs are also notably more flexible than the B- or C-CNTs with CNT circles visible in the micrograph (FIGS.

Electrochemical Filtration Performance Towards Phenol Removal. The electrochemical filtration performance of the CNT networks was evaluated at a liquid flow rate of J=1.5 mL min$^{-1}$ and an influent electrolyte concentration of 100 mM $Na_2SO_4$. The filter performance was assessed with phenol (PhOH), a model aromatic wastewater, at three influent (input fluid) concentrations of 0.0 mM, 0.2 mM, and 1.0 mM as shown in FIGS. 34A-34C, respectively. At 0.2 mM and 1.0 mM influent phenol concentrations, the CNT surface is immediately saturated with phenol due to the strong[26, 27] and fast[12] adsorption of aromatics to the CNTs. The steady-state current (mA) of the 0.2 mM PhOH in 100 mM $Na_2SO_4$ as a function of voltage, 1.0 V to 3.0 V, and time, 0 min to 300 min, is shown in FIG. 35A. For all three CNT networks, the current becomes >0 mA once the applied voltage is increased to >1.5 V and increases monotonically with increasing voltage. Similarly, the anode potential also increases monotonically and linearly with increasing applied voltage (FIGS. 34A-34C), with approximately 50% of the applied voltage going towards the anode potential. The aqueous electrochemical phenol filtration was continued at an anode potential of 1.6 V, corresponding to an applied voltage of 3.0 to 3.3 V, at which the system was stable for an extended period, e.g., longer than 6 hours. At an anode potential of ~1.6 V, the current decreases for the first 2 to 3 hours until a steady-state current value is achieved. The decreasing current with time can indicte that the CNT electrodes are partially passivated. The B-CNT network is more resistant towards electrochemical passivation, i.e., it has a greater steady-state current at 5 mA as compared to 3.5 mA for C-CNT and 2.5 mA for N-CNT. The B-CNT network also has a smaller decrease in current during electrolysis at −5 mA as compared to −13 mA for the C-CNT network and −19 mA for the N-CNT network. The B-CNT network resistance towards electrooxidative passivation indicates that, in some embodiments, the B-CNT can be the optimal CNT for anodic processes such as wastewater treatment.

The effluent (output fluid) total organic carbon (TOC) concentration is plotted versus voltage and time in FIG. 35B. The influent (input fluid) phenol TOC is about 15±1 mgC $L^{-1}$. The effluent (output fluid) TOC trend is similar for B-CNT and C-CNT, in which the TOC decreases with increasing voltage until ~2 V when $[TOC]_{ef}$=9 mgC $L^{-1}$-11 mgC $L^{-1}$ and then decreases with time for the first 2 hours of electrolysis until a steady-state effluent (output fluid) TOC concentration of 7 mgC $L^{-1}$-8 mgC $L^{-1}$ (i.e., ~50% of influent TOC) is achieved. In contrast, over the applied voltage range of 2.0 V to 3.0 V, the N-CNT effluent TOC is significantly lower than the B-CNT and C-CNT and in the range of 2 mgC $L^{-1}$-6 mgC $L^{-1}$. However, after ~2 hours of electrolysis, the N-CNT effluent TOC achieves to a steady-state value similar to the B-CNT and C-CNT networks. The large decrease in effluent (output fluid) TOC is also observed for both the C-CNT and N-CNT networks when the influent phenol concentration is 1 mM (FIG. 34C). Without wishing to be bound by theory, the strong decrease in effluent TOC over the applied voltage range of 2.0 V to 3.0 V is likely due to electrochemical polymer formation.[28]

The electrochemical oxidation mechanism of phenol has been studied and follows the general reaction of eq. 1 below, where n is the number of electrons oxidized from phenol with n=28 for complete mineralization.[29-31]

$$C_6H_6O + nh^+ \rightarrow products \qquad (1)$$

There are three primary classes of phenol oxidation products listed here in order of increasing extent of oxidation: the quinones and corresponding radicals that polymerize, small organic acids such as bioxalate, and the complete mineralization product—carbon dioxide. The one-electron redox potential at pH 7 of phenol is 0.8 V, of the quinone family is 0.0 V-0.8 V, and of small organic acids is 1.0-2.0 V.[32] Without wishing to be bound by theory, the extent of phenol oxidation in terms of n electrons removed per molecule can increase with both increasing anode potential and/or increasing material work function, i.e., Fermi level redox potential. Thus, although similar TOC removal are measured for all three CNT networks, the extent of phenol oxidation can be dissimilar. A shift in reaction products with increasing applied voltage can explain the strong decrease in effluent phenol at intermediate applied voltages, 2.0 to 2.5 V, for the N-CNT (0.2 and 1 mM) and C-CNT (1 mM) where the polymer-forming quinone radicals can be dominant. The resulting increase in effluent phenol at applied voltages >2.5 V can then indicate a shift to more oxidized products that cannot polymerize. The absence of a strong decrease in phenol concentration for the B-CNT network at both 0.2 mM and 1.0 mM can indicate that the B-CNTs' greater work function can result in a greater extent of phenol oxidation to yield a greater fraction of products that cannot polymerize.

The steady-state current and TOC removal from the influent solution were used to calculate the apparent TOC removal current efficiency assuming that any TOC loss is representative of electrochemical phenol combustion to carbon dioxide (FIG. 35C) and n=28 for eq. 1 above. For all three CNT networks, the current efficiency is >100% when the applied voltage is <2.5 V and when time was ≥120 minutes. For the B-CNT and C-CNT networks, the current efficiency did not drop below 50%. Even greater TOC removal current efficiencies, e.g., 60% to 1,200%, can be measured when the influent phenol concentration is 1 mM, as shown in FIG. 34C. The >100% current efficiency can indicate that electrochemical combustion to $CO_2$ may not be complete and, as stated earlier, electrochemical phenol polymerization can be active. Although the influent phenol is not completely oxidized, the electrochemical polymerization process can be energy efficient towards phenol removal, e.g., when the applied voltage is ≤2.5 V and $[PhOH]_{in}$=0.2 mM, the energy required is <25 kWh $kgTOC^{-1}$, and when $[PhOH]_{in}$=1.0 mM, the required energy is <10 kWh $kgTOC^{-1}$ (FIGS. 34B-34C).[4] The extent of electrochemical phenol removal is significant after the influent aqueous solution spends ~1 s within the electrochemical CNT network.[12]

While the three CNT network's electrochemical filtration performance towards aqueous phenol removal can be relatively similar, the B-CNT network, in some embodiments, can be preferably used as an anodic substrate since it displayed a lower extent of electrochemical passivation than the other CNT networks; and the N-CNT network, in some embodiments, can be preferably used for electrochemical phenol polymerization. The extent of electrochemical passivation is reported to be inversely proportional to the CNT work function.[18-19] This indicates that although the performance of the three CNT materials towards phenol removal is similar, the B-CNT can oxidize the individual phenol molecules to a greater extent, i.e., the n in eq. 1 is the greatest for the B-CNT and lowest for the N-CNT. The greater extent of oxidation can bypass the formation of polymerizing organic free radicals.[30] The anode potential, electrochemical impedance, and double-layer capacitance were measured as a function of applied voltage and shown in FIGS. 34A-34C. The anode potentials for the three CNT samples increased linearly with applied voltage and were nearly identical. The electrochemical resistance and capacitance both decreased linearly with increasing applied voltage and at all potentials the N-CNT values were greater than both the B-CNT and C-CNT values, which were similar. The greater N-CNT capacitance is in agreement with previous reports and indicates a larger number of electrochemically-active sites[17] consistent with the greater electropolymerization TOC removal by the N-CNT network. The greater N-CNT resistance can indicate that more phenol may be adsorbed to the N-CNTs, as evidenced by the convergence of resistance for all three samples at the higher influent phenol concentration (FIG. 34C). A greater N-CNT phenol surface concentration can promote electrochemical polymerization and TOC removal.

Electrochemical Phenol Polymerization and Electrolyte Precipitation. The findings of decreasing current with time and >100% TOC removal current efficiencies are both indicative of electrochemical polymer formation on the CNT anode resulting in passivation. The polymer formation is also evidenced by significant increases in CNT network weight post-electrolysis (Table 6 above). To further determine the mechanism of polymer formation, TGA, SEM, and XPS were performed on all of the electrolyzed CNT samples (Table 6 and FIGS. 32E-32F, FIGS. 33A-33C). The TGA data indicates that electrochemical polymer formation was active, and also electrochemical electrolyte or salt precipitation was also active, as shown in FIGS. 36A and 36C. In FIG. 36A, the mass percent and dTG versus T was plotted for a fresh C-CNT network, a C-CNT network that filtered phenol in the absence of electrochemistry, an electrolyzed C-CNT network with 0.0 mM influent phenol, and an electrolyzed C-CNT network with 1.0 mM influent phenol. For both electrolyzed CNT networks, the TGA results showed that the residual mass percent increased to ≥15% as compared to ~2% for the fresh CNT network and ~4% for the non-electrolyzed C-CNT network, indicating electrochemically-mediated electrolyte precipitation. For the C-CNT networks electrolyzed with phenol, a large low T burn shoulder appears in the dTG curve due to polymer formation. Gaussian multi-peak fitting of the dTG curve was used to calculate the percent polymer of the electrolyzed samples. The analyzed TGA data for the majority of the electrolyzed CNT samples is shown in FIG. 36C with the precipitate and polymer mass normalized to the CNT mass. Electrochemically-mediated precipitate formation was detected for all electrolyzed CNT networks and polymer formation was detected for all CNT networks electrolyzed in the presence of phenol. The electrochemically-mediated polymer and precipitate formation is confirmed by aerial SEM images of the electrolyzed CNT networks presented in FIGS. 36B, 36D-36F. FIGS. 36B, 36D, and 36F are SEM images, respectively, of a fresh C-CNT network, a C-CNT network electrolyzed with phenol for 5 h, and a C-CNT network electrolyzed with phenol for 20 h. The apparent CNT diameter is visibly detected to grow with time during phenol electrolysis and a similar extent of CNT diameter growth is detected for the N-CNT and B-CNT networks as shown in Table 6. This growth can be, at least partly, attributed to electrochemical polymer formation and/or is, at least partly, due to incomplete phenol oxidation which in turn results in the formation of organic radicals that take part in a free-radical chain polymerization process.[31] Visual evidence of electrochemical precipitate formation is shown in FIG. 36E for an N-CNT sample electrolyzed for 5 h. A significant amount of salt crystals have obviously coated the N-CNT network surface. The electrochemical precipitation can be driven by the increased ion activity within the CNT electrical double layer of the electrolyte or electrochemically-produced salts. An alternative precipitation mechanism can be the electrochemical oxidation of sulfate to persulfate[33] whose sodium salt is significantly less soluble in water at 20° C. than sodium sulfate, i.e., 23 mM for $Na_2S_2O_8$ versus 900 mM for $Na_2SO_4$.

The B-CNT network as compared to the C-CNT and N-CNT networks is determined to have a lower extent of electrochemical polymer and precipitate formation under all influent aqueous conditions (FIG. 36C). The extent of both electrochemical polymer and precipitate formation can increase with decreasing CNT work function. Both the polymer and precipitate can in turn coat the electrochemically-active surface with an insulating material and passivate the electrode. Thus, the polymer and precipitate formation results indicate that the B-CNT is more resistant to electrochemical passivation in agreement with chronoamperometry results (FIG. 35A), as well as previous reports of the higher B-CNT work function and hole transport properties.[18, 19] The N-CNT network is determined to have the greatest extent of polymer and precipitate formation, in line with the increased TOC removal via polymer formation (FIG. 35B), and increased double layer capacitance (FIGS. 34A-34C).[17]

Electrochemical Salt Formation versus CNT Oxidation. The electrolyzed C-CNTs thermogravimetric burn temperature is significantly decreased from near 650° C. for the fresh C-CNT network to between 500° C.-550° C. for the electrolyzed C-CNT network and a similar result is determined for the electrolyzed N-CNT and B-CNT networks, as shown in FIG. 36A and Table 6. The reduction in burn temperature can be caused by significant electrochemical oxidation of the CNTs introducing more easily combustible $sp^3$ defects into the normally $sp^2$-bonded CNT surface.[34] Alternatively, CNT co-combustion with the precipitate or polymer can be due to thermal production of oxidizing radicals e.g., the thermolysis of persulfate to produce the strongly oxidizing sulfate radical.[35] To discern between these two possibilities, it was sought to determine if the precipitate and/or polymer from the electrolyzed CNT network could be washed with an acidic ethanol-water solution. The TGA results of the C-CNT networks electrolyzed in the absence and presence of phenol and the same samples after washing are shown in FIGS. 37A and 37B. The washed C-CNT networks have nearly all of the precipitate removed, i.e., <1.2% residual mass in both samples, and have TGA burn temperatures near that of a fresh C-CNT network. Only a small fraction of the polymer was removed by the wash indicating the decrease in burn T in the electrolyzed networks can be primarily due to the precipitate catalyzed CNT combustion.

To investigate the specific precipitate responsible for the decreased burn T, the O/C, S/C, and S/O ratios were determined from the XPS spectra of the electrolyzed and electrolyzed-then-washed C-CNT networks, and the corresponding results are shown in FIG. 37C. The large O/C ratio of the electrolyzed CNT networks indicates a highly oxygenated precipitate. The non-zero S/C ratio in these samples indicates that sodium sulfate or persulfate can be responsible for the determined O/C ratios. However, the S/O ratio for both salts is 0.25, which is much higher than the determined values of 0.07 and 0.04 indicating another salt was also present. In some embodiments, the salt can be sodium carbonate as there is evidence for $Na_2CO_3$ in the TGA of the electrolyzed samples (FIG. 37A), where mass loss is observed between 800° C.-900° C.[36] The washed samples have no sulfur signal and a significantly reduced O/C ratio, indicating that the XPS spectrum of the electrolyzed CNT networks is representative of the precipitate. The O/C ratio is slightly greater in the electrolyzed-then-washed CNT networks (0.045 to 0.075), as compared to the fresh C-CNT networks (0.026). Without wishing to be bound by theory, the increased O/C ratio can be due to electrochemical CNT oxidation and/or electrochemical polymer formation since only a small fraction of the polymer is removed during the wash step. To determine whether the increased O/C ratio is due to electrochemical CNT oxidation or electrochemical polymer formation, an estimation of the theoretical O/C ratio of the electrolyzed with phenol then washed C-CNT network was made assuming that the polymer has a similar O/C ratio to the phenol monomer of 0.17. The fresh C-CNT network has an O/C ratio of 0.025. The C-CNT network that were electrolyzed with phenol then washed comprises ~50% polymer and ~50% CNT, resulting in the estimated O/C ratio of 0.095, which is slightly greater than measured O/C ratio of 0.075 indicating that polymer formation is primarily responsible for the O/C ratio increase. However, in some embodiments, electrochemical CNT oxidation can still occur since the O/C ratio indeed increases slightly to 0.045 in the CNT network electrolyzed in the absence of phenol.

To further evaluate whether the presence of the precipitates can reduce the CNT burn temperature, they were individually mixed with fresh CNTs by ultrasonication, dried, and thermogravimetrically analyzed. As shown in FIG. 37D, in all cases, the CNT burn T decreased with the extent of decrease following the order carbonate (525° C.)>persulfate (550° C.)>sulfate (600° C.). The carbonate and persulfate induced-burn Ts are quite similar to the electrolyzed CNT burn Ts indicating carbonate and/or persulfate can be the electrochemical precipitates. Thus, the decreased electrolyzed CNT network burn temperature is, at least partly, due to precipitate formation. In some embodiments, CNT oxidation need not contribute to the decreased electrolyzed CNT network burn temperature.

Electrochemical Polymerization. During the electrooxidation of aqueous aromatics such as phenol, if the anode potential is below 2.3 V, then polymerization forming species such as polyphenol or polyoxyphenylene can occur.[29, 31] Since these polymers can be more insulating as compared to the anode, the electropolymer growth and coating can act to passivate the active electrode surface. Thus, it is of importance to investigate the electropolymerization process such that methods to prevent passivation and/or to regenerate the active electrode surface can be developed. As such, the time-dependent electrolysis was performed at an anode potential of 1.6 V or at an applied voltage of 3.0 V-3.3 V, at which the system is stable for an extended period of time. Both electrode passivation, i.e., the current decrease over the first two hours of electrolysis (as shown in FIGS. 35A-35C), and polymer formation (FIGS. 37A-37D) are detected. The extent of polymer formation was quantified by TGA and SEM of the electrolyzed CNT samples (Table 6 and FIGS. 38A-38C). There are two TGA polymer burn peaks detected in all of the electrolyzed CNT networks. Both peaks occur at a lower temperature as compared to the CNT burn peaks and the higher T peak corresponds to the major polymer peak. As the polymer burn T of the CNT network that was electrolyzed then washed can provide an accurate representation of the polymer material, then typical electropolymer burn Ts are ~560° C. and 460° C. The higher burn T of 560° C. is typical of species with a conjugated π-bonded structure indicating the sp²-conjugation of the phenol monomer has been maintained.[37] The percent polymer mass of the electrolyzed CNT samples was similar for B-CNT and C-CNT at 40-44% and was greater for the N-CNT sample at 51-53%. The percent polymer mass was independent of influent phenol concentration likely due to the strong and fast adsorption of the aromatic phenol to the CNT surface.[26, 27]

The apparent CNT diameter as determined by SEM for the fresh and electrolyzed CNT networks is presented in FIG. 38A. The formation of polymer was only detected when phenol was present in the influent solution. If phenol was present, the apparent CNT diameter generally grew by 8 nm to 17 nm. However, even though the apparent CNT diameter grew by >50% as compared to the initial diameter, there was negligible effect on the average network pore size (FIG. 38B). The polymer identity can be characterized by calculating the polymer density ($\rho_{poly}$) from the TGA polymer mass ($m_{poly}$) and SEM polymer volume ($V_{poly}$) using the equation: $\rho_{poly} = m_{poly}/V_{poly} = (m_f * \%_{poly} * r_i)/(SSA_{CNT} * m_i * (r_f^2 - r_i^2))$ where $m_i$ and $m_f$ are the initial and final CNT network mass, $\%_{poly}$ is the percent polymer by TGA, $r_i$ and $r_f$ are the initial and final apparent CNT radius by SEM, and $SSA_{CNT}$ is the specific surface area of the CNT.[12] The average polymer density for all of the electrolyzed networks is $\rho_{poly} = 1.05 \pm 0.04$ g cm$^{-3}$. The calculated polymer density is quite similar to the density, 1.1 g cm$^{-3}$, of polyphenylene ether and polyphenylene oxide, which can be products of the electrochemical polymerization of phenol and are in agreement with previous reports.[29-31]

The diameter for all of the C-CNT networks (#1-#8) treated under conditions indicated in Table 6 is presented in FIG. 38C. The apparent diameter of the electrolyzed CNT networks grew by a significant amount only in the presence of phenol (#5 to #8). The acidic ethanol-water wash of an electrolyzed CNT network (#7) was able to remove a fraction of the polymer reducing the diameter by ~5 nm; however, the post-wash diameter was still 6 nm-7 nm greater than the initial diameter. It was also determined that after extended electrolysis of 20 h (#8), the apparent CNT diameter (~46 nm) grew even further to nearly 3-fold greater than the initial CNT diameter (~17 nm), indicating that the polymer coating did not completely passivate the anodic CNT network. As described in Example 13, in situ methods can be used for CNT electrode regeneration such as increasing anode potentials to >2.3 V[30] and chemical washing with non-aqueous solvent similar to the acidic ethanol-water removal of the precipitate.

To extend and optimize the lifetime of anodic CNT networks, the efficacy of undoped (C-CNT), boron-doped (B-CNT), and nitrogen-doped (N-CNT) networks towards the electrochemical filtration treatment of aromatic wastewaters using phenol as a model aromatic pollutant was evaluated herein. In terms of steady-state total organic carbon removal, all three CNT networks were able to remove a similar amount of the influent phenol, e.g., ~50% of 0.2 mM influent phenol at an anode potential of 1.6 V. The current as a function of time and voltage indicated that the B-CNT network was more resistant to electrochemical passivation and that the extent of passivation was inversely correlated to the CNT work function. The passivation of the anodic CNT networks was determined to occur through electrochemical formation of insulating precipitate and polymer coatings on the surface of the CNTs. SEM and TGA analysis of the electrolyzed CNT networks showed that the B-CNT network had a lower extent of electrochemical polymer and precipitate formation, thus being more resistant to electrochemical passivation. TGA and XPS analysis indicates that the predominant electrochemical precipitate can be a mixture of sodium persulfate and sodium carbonate, which can be removed with a simple acidic water-ethanol wash. SEM and TGA analysis indicates that the electrochemically-formed polymer can be either polyphenylene ether or polyphenylene oxide, which can be at least partially removed with the washing step.

Exemplary Materials and Methods for Example 14

Chemicals. Phenol (PhOH), hydrochloric acid (HCl; 36.5-38.0%), nitric acid (HNO$_3$; 69.8%), sulfuric acid (H$_2$SO$_4$; 95.0-98.0%), phosphoric acid (H$_3$PO$_4$; ≥85.0%), ethyl alcohol (EtOH; ≥95.0%), dimethylsulfoxide (DMSO; ≥99.9%), potassium hydrogen phthalate (KHP), sodium sulfate (Na$_2$SO$_4$), sodium persulfate (Na$_2$S$_2$O$_8$), sodium bicarbonate (NaHCO$_3$), and sodium carbonate (Na$_2$CO$_3$) were purchased from Sigma-Aldrich. All chemicals were reagent grade except DMSO, which was spectrophotometric grade.

CNT Selection. The undoped multiwalled carbon nanotubes (C-CNT), nitrogen-doped multiwalled carbon nanotubes (N-CNT) and boron-doped multiwalled carbon nanotubes (BCNT) were purchased from NanoTechLabs, Inc. (Yadkinville, N.C.). The CNTs were characterized in Table 6 below, and have a diameter distribution in agreement with the manufacturer specifications. In some embodiments, the CNTs were purified first by calcination and then with acid treatment prior to use.[24]

CNT Calcination. To remove any amorphous or other non-CNT carbon impurities, about 1 g of CNTs was first calcinated, e.g., in a tube furnace, by increasing from room temperature to ~400° C. (~300° C. for N-CNTs) for at a rate of 5° C. per min and holding for ~60 min (Thermolyne, 21100).

CNT Acid Treatment. To remove the metal impurities (e.g., metal catalyst impurities), ~0.5 g of calcinated CNT was placed into 0.5 L of concentrated hydrochloric acid and heated to ~70° C. in a round-bottom flask with stirring and a condenser for at least 12 hours. After heating, the sample was cooled to room temperature and vacuum filtered through a 5-μm PTFE membrane (Omnipore, Millipore) to collect the CNTs. The CNTs were then washed with MilliQ deionized water (DI) until the filter effluent pH was neutral. The sample was then oven dried at 100° C. before use.

Electrochemical CNT Filter Preparation. The CNT filters were produced by first dispersing the CNTs in DMSO at 0.5 mg/mL by probe sonication (Branson, Sonifier S450) for ~15 min at an applied power of 400 W/L. Then, 30 mL of the CNTs in DMSO were vacuum filtered onto a 5-μm PTFE membrane (Millipore, Omnipore, JMWP), resulting in filter loadings of 1.5 mg/cm$^2$ to 1.6 mg/cm$^2$. The CNT filters were washed with 100 mL EtOH, 100 mL 1:1 DI-H$_2$O: EtOH, and 250 mL DI-H$_2$O to remove DMSO. Finally, the prepared CNT filter was loaded into a filtration casing modified for electrochemistry as described in FIGS. 1A-1G and Refs. 6, 9, and 12.

Solution and Electrochemistry. Sodium sulfate (Na$_2$SO$_4$; 100 mM) was utilized as the background electrolyte for all experiments. Phenol (PhOH) was used as the model aromatic pollutant as phenol is a common industrial solvent and is present in petroleum industry wastewater. The influent (input fluid) phenol-electrolyte solution was peristaltically pumped (Masterflex) through the electrochemical CNT filter and the steady-state electrochemistry was driven by a DC power supply (Agilent). The volumetric flow rate was 1.5 mL·min$^{-1}$, which corresponds to a residence time in the electrochemical filter of ~1 s.[12] Bulk electrochemical filtration was first completed at a number of applied voltages over the range of ~0.5 to ~3.5 V. Then, the applied voltage was held at a point that corresponded to ~1.6 V anode potential for 3 hours to 5 hours. At every voltage or time point, at least 3 effluent samples (output fluid samples) were analyzed to ensure steady-state was achieved. A number of parameters including effluent pH (output fluid pH) (e.g., using Corning 345), effluent phenol concentration, total organic carbon (TOC) (e.g., using Shimadzu TOC-VW), steady-state current, anodic potential, and back pressure were all determined.

The apparent energy consumption ($EC_{app}$) of removing one kilogram TOC was calculated with the following equation:

$$EC_{app}(kWh/kgTOC) = (U*I*t/3.6*10^6)/(t*J*\Delta TOC_{app}),$$

where U and I are applied voltage and steady-state current, respectively, t is reaction time, J is flow rate, and $\Delta TOC_{app}$ is the apparent TOC removal.

The apparent mineralization current efficiency ($MCE_{app}$) was calculated with the following equation:

$$MCE_{app}(\%) = (\Delta TOC_{app}/\Delta TOC_{theor})*100,$$

where $\Delta TOC_{theor}$ is theoretical TOC removal assuming all anodic current goes towards this process and is calculated using the following equation:

$$\Delta TOC_{theor}(mgC/L) = ((I*t/n_e*F)*n_c*M*)/(V*t),$$

where F is Faraday's constant, F=96485 C mol$^{-1}$; $n_e$ is the number of electrons removed during phenol mineralization, $n_e$=28; $n_c$ is the phenol carbon number, $n_c$=6; and M is carbon's atomic weight, M=12 g mol$^{-1}$.

The CNT networks were also characterized using electrochemical methods (CHI Inc., CHI604D) such as double-layer capacitance and electrochemical impedance spectroscopy. The prepared CNT network was used as the working electrode, a stainless steel cathode was used as the counter electrode, and 1 M Ag/AgCl was used as the reference electrode in a flow cell configuration. Aqueous conditions were the same as bulk electrolysis.

SEM Analysis. Scanning electron microscopy was performed on a Zeiss FESEM Supra55VP. Micrographs were analyzed with ImageJ software to determine CNT diameter and aerial pore size. Measurements were the average of at least 100 measurements from at least 2 network images.

TGA Analysis. Thermogravimetric analysis was performed on a Q5000-IR Thermogravimetric Analyzer (TA Instruments). Samples were heated from room temperature to 150° C. at 10° C. min$^{-1}$, held at this temperature for 30 minutes, then heated to 1000° C. at 10° C. min$^{-1}$, and held at this temperature for 30 minutes. A second run was completed immediately after the first and used as a background. The % residual catalyst was determined using the initial mass and the mass remaining after a complete thermal cycle. The % polymer was determined by multiple Gaussian peak fitting to the dTG curve assuming the two highest temperature burn peaks were CNTs and using the areas to determine percent weight.

Example 15

Reactive Transport Mechanism for Organic Oxidation during Electrochemical Filtration: Mass-Transfer, Physical Adsorption, and Electron Transfer Due to a combination of unique electronic, mechanical, and chemical properties of the carbon nanotubes (CNTs),[1] CNT-based materials can be used in a variety of applications such as energy conversion,[2] biomedical devices,[3] adsorptive water treatment,[4] and CNT-based electrodes.[5-8] As compared to conventional carbon electrodes, CNTs are reported to have better electrocatalytic properties toward many electrochemical reactions.[9] For example, CNT modified glass carbon electrode were reported to exhibit significantly lower overpotential and higher peak current compared to bare glass carbon electrode for several molecules including ascorbic acid, uric acid, and dopamine.[10] These superior electrocatalytic properties can be attributed to the small dimensions of the tubes and channels in the tubes, the unique electronic structure, and the topological defects present on the tube surface.[11] In addition, as described herein, utilizing CNTs as either a bulk electrode or to modify a working electrode can increase electron transfer rates toward dyes[12]. The use of CNTs to increase electron transfer rates toward biomolecules has also been previously reported.[13] Thus, CNT-based electrodes can be used toward advanced environmental applications including wastewater treatment[14] and micropollutant sensors,[15] where minimal oxidative overpotentials are desired.

The general electrochemical reaction mechanism is generally composed of four primary steps: (1) mass transfer to the electrode, (2) adsorption to and desorption from the electrode, (3) direct electron transfer at the electrode, and (4) bulk chemical reactions preceding and/or following electron transfer.[16] While direct (3) or indirect (4) electron transfer is immediately responsible for electrochemical transformations, mass transfer (1) to the electrode surface is often found to limit the overall kinetics.[17-19] Electrochemical mass transfer limitations arise since convection becomes negligible near the electrode-water interface, and the relatively slow molecular diffusion to the electrode surface cannot complete kinetically with electron transfer.[16] Thus, developing methods and materials to increase mass transfer to the electrode surface can increase the extent of electrochemical transformation, and result in improved current efficiencies and reduced energy consumption. One strategy to overcome this limitation can include utilizing porous electrodes where the electrolytic solution flows through the electrode resulting in convection to the electrode surface (FIG. 39). For example, Yang et al.[14] reported that a seepage electrochemical reactor, i.e., where the solution to be treated convectively flows through the electrodes, resulted in a mass transfer improvement of 1.6-fold, a current efficiency improvement of 3-fold, and an energy consumption reduction of 20% as compared to conventional bipolar reactors. Accordingly, a convective mass transfer enhancement can also be active for an electrochemical CNT filter described herein, which can be used for the removal and electrochemical oxidation of aqueous dyes[12] and microorganisms[20] (FIG. 39, step 1).

Along with mass transfer, there are other processes that can be also important to the overall electrochemical reaction kinetics and mechanism such as adsorption and electron transfer (FIG. 39, steps 2 and 3), respectively. For example, physical and chemical adsorption of species to an electrode surface can significantly affect the electron transfer kinetics by altering its surface structure and chemistry resulting in a shift in the Gibbs free energy of reactants and/or products.[21,22] The adsorption-dependent reactivity is of importance to CNTs as they have a large specific surface area[23] and have been reported to adsorb many chemical species. For example, CNTs have been reported to strongly adsorb aromatic compounds[24] and natural organic matter[25] via a combination of strong $\pi$-$\pi$ interactions and hydrophobic interactions.[26] In turn, a CNT-based filter for adsorptive chemical removal has been proposed as a water treatment technology.[26] An electrochemical CNT filter described herein can not only adsorptively remove, but also electrochemically degrade the target contaminant.

Following molecular adsorption to the electrode, direct electron transfer can occur upon application of a sufficiently high potential. The electron transfer mechanism and kinetics can also be significantly affected by the electrode surface structure and chemistry. An accurate electrode model requires taking into account the total number and specific types of surface reactive sites because of their ability to substantially affect the electrochemical mechanism,[27] kinetics,[28] and overpotential.[29] In regards to CNTs, the electrochemically reactive sites have been reported to be the conjugated $sp^2$ surface defect sites, similar to other elemental carbon-based electrodes. Specifically, some of these electrochemically reactive sites can be the edge-plane-like sites,[30] which for CNTs are primarily located at the ends of the nanotubes, but can also be found on the tube sidewalls. For example, a stable carboxylic acid group redox couple was reported to be the electrochemically active site on a CNT electrode.[31] While specific surface chemistry effects on electrochemical processes are generally overlooked in kinetic modeling methods by assuming surface homogeneity and disregarding existence of specific reactive sites,[30] these kinetic methods can still provide insights into the maximum number of electrochemically active sites and their overpotentials.

To investigate the overall organic oxidative mechanism of an electrochemical CNT filter, the inventors proposed and evaluated a primary three-step electrochemical filtration reactive transport mechanism to describe the oxidation of the dyes methyl orange and methylene blue (FIG. 39): (1) mass transfer, (2) molecular adsorption, and (3) direct electron transfer. The hydrodynamically enhanced mass transfer of the electrochemical filtration system was studied by chronoamperometry and normal pulse voltammetry and was compared to a conventional batch bipolar electrochemical system. The physical adsorption of the dyes to the CNTs was investigated by temperature-dependent batch adsorption and electrochemical filtration experiments. The electron-transfer kinetics and mechanism during electrochemical filtration were studied by concentration- and voltage-dependent experiments. The electrochemical filtration oxidative efficiency was evaluated in terms of experimental parameters such as flow rate, temperature, and voltage that mediate the overall reaction kinetics.

Electrochemical Filter Design and Operation. All filtration experiments described in this Example were conducted with one or more embodiments of the filtration apparatuses as described herein[12] and depicted in FIGS. 1A-1G. Briefly, a 47-mm diameter carbon nanotube (CNT) network (Nano-TechLabs, Buckeye Composites) was placed on top of a wetted 5.0-μm pore PTFE membrane (Omnipore). The CNT network was utilized as an anode and connected to the DC power supply via mechanical contact to a titanium ring. A perforated piece of stainless steel shim was used as the cathode and an insulating silicone rubber O-ring was used to separate the electrodes and seal the device. A polycarbonate 47-mm filter casing (Whatman) was modified to incorporate both anode and cathode materials. Images of the electrochemical filtration device and the CNT networks are shown in FIGS. 1A-1G. An aerial SEM image of the CNT network is shown in FIG. 40. The macroporous filters had an average pore diameter of 90±40 nm and the pore shape was quite heterogeneous.

Porous CNT anodes were selected to study the reactive transport mechanism during electrochemical filtration as they have desirable physical chemical properties that can be useful for improved wastewater treatment performance. For example, an electrochemical CNT filter to operate with an energy efficiency of 4-16 kWh $kg^{-1}$ COD or <1 kWh$m^{-3}$ (Ref. 32) has been previously reported,[32] in addition to other state-of-the-art electrochemical oxidation processes.[14,15,17,19] Similar to black carbon electrode, CNTs have a high specific surface area[23] and are effective for the adsorptive removal of chemical contaminants.[4,24-26] However, without wishing to be bound by theory, CNTs can show improved electrochemical performance as compared to traditional carbon materials due to their extended $sp^2$ structure[1] and reduced edge-like sites resulting in excellent 1-D conductivity and increased corrosion resistance. In regards to electrochemical filtration, the high-aspect ratio CNTs can be easily formed into free-standing, thin-film, 3D networks of high porosity (85-90%), as shown in FIGS. 1A-1G and 40, with liquid flow rates, in some embodiments, similar to microfiltration devices at 500 LMH-bar to 2000 LMH-bar.[12,20,32] This porous microstructure can favor fast sorption and electrochemical oxidation due to the high number of easily accessible and reactive sites as compared to black carbon materials where many of the sites can be buried in the granules. Access to most or all of the surface sites within the anodic CNT network can be made by convectively flowing the liquid through the network. Thus, electrochemical filtration with porous CNT anodes can result in enhanced mass transfer and electrochemical energy efficiencies. As the liquid needs to be pumped through the filter, the pumping energy should also be considered to ensure overall improvement. If during electrochemical filtration V=2.0 V and I=5 mA, then the electrochemical energy necessary for 1 h of operation is 39 J. A common back pressure is 15 kPa[32] at a flow rate of 90 mL h$^{-1}$ and assuming a pump efficiency of 75%, the total energy cost for pumping is 1.5 J or 3.8% of the electrochemistry. Therefore, if the electrochemical efficiency is significantly increased during electrochemical filtration, the overall energy efficiency will also be significantly increased.

Mass Transfer: Hydrodynamic Enhancements during Electrochemical Filtration. The effect of hydrodynamically enhanced mass transfer, FIG. 39, step 1, on the current density in the electrochemical filtration system versus a conventional batch electrochemical system was first compared by chronoamperometry over a series of anode potentials. Representative current (mA) versus time (s) plots for the filtration (red) and batch (black) systems obtained under the conditions of anode potential=0.85 V, [MO]$_{in}$=300 µM, and [NaCl]=10 mM are shown in FIG. 41. The initial current of both filtration and batch systems was around 80 mA and decreased quickly over the first few seconds due to expansion of electrochemical diffusion layer.[16] After the initial sharp decline, the current of the filtration system leveled-off and reached a steady-state value of 5.5 mA. It is of note that there was a periodic oscillation to the filtration current that is likely due to electrolytic gas formation within the CNT network that can effectively passivate a fraction of the electrochemically active sites. In contrast to the filtration system, the current of the batch system continually decreased to 0.8 mA after 100 s of electrolysis. The current of the filtration system was greater than the batch system for t>10 s indicating a significantly greater molecular flux to the electrode surface. The increased flux in the filtration system can be explained by the non-negligible convective mass transfer to the electrode surface due to the hydrodynamic flow through the anode.[16]

The Cottrell equation, eq 1 below, describes the current-time relationship for diffusion-limited electrochemical systems such as the batch system in this Example and can be used to estimate the molecular diffusion coefficient.[33,34]

$$I = nFAD^{1/2}c\pi^{-1/2}t^{-1/2} \quad (1)$$

In eq 1, n is the number of electrons transferred, D is the diffusion coefficient (cm$^2$ s$^{-1}$), c is the bulk concentration of the molecule to be electrolyzed (mol cm$^{-3}$), A is the geometric electrode area (7.1 cm$^2$), and I is the current at time t. An estimation of the maximum number of electrons oxidized from MO, n in eq 1, can be made by comparing the MO molecular flux to the electron flux. It is assumed that anodic O$_2$ evolution is negligible at 0.85V vs. SCE, which is below the potential for the 4-electron water oxidation. This assumption is validated by normal pulse voltammetry, FIGS. 42A-42B, where oxygen evolution is observed at anode potentials ≥1 V. At an anode potential of 0.85 V and a flow rate of 1.5 mL min$^{-1}$, Δ[MO]=−130 µM and I$_{SS}$=5.5 mA corresponding to the oxidation of 3.3×10$^{-9}$ moles of MO per second and 5.5×10$^{-8}$ mol of electrons s$^{-1}$ flowing through the anode. Thus, a maximum of 17 electrons out of 80 total electrons could be oxidized from each MO molecule indicating incomplete oxidation. The current density versus time $^{-1/2}$ is plotted in the inset of FIG. 41 and exhibits a linear relationship (R$^2$=0.998) over an intermediate at intermediate time range, i.e., 20-40 s. From the slope of this line, the diffusion coefficient, D, was calculated to be 8.5×10$^{-5}$ cm$^2$ s$^{-1}$ for the batch system. An estimation of diffusion layer thickness, Δ, can be made using the following equation, eq 2 (Ref. 16)

$$\Delta = (2Dt)^{1/2} \quad (2)$$

After 100 s of electrolysis, the diffusion layer thickness in the batch system was estimated to be 1.3 mm. However, natural convection can arise and reduce this thickness. Thus, a calculation of the diffusion layer thickness under natural convection was carried out using eq 3 derived by Levich[35] for the mean value of diffusion layer thickness δ of a vertical plate electrode under natural convection.

$$\delta \approx \frac{Z^{1/4}}{0.7Sc^{1/4}\left(\frac{g\Delta C}{4v^2}\right)^{1/4}} \quad (3)$$

where h stands for electrode height, Sc=v/D is the Schmidt number, with v and D being the solution kinematic viscosity and molecular diffusion coefficient, respectively, g is gravitational acceleration, and ΔC is the numerical value of the concentration decrease across the diffusion layer in g cm$^{-3}$. For the batch system in the diffusion limited regime, the average MO concentration inside the CNT network is speculated to be near zero. Thus, the filter is acting like one planar electrode and eq 3 is applicable. The height of the electrode used herein is 3 cm, v=1×10$^{-4}$ cm$^2$ s$^{-1}$, D=8.5×10$^{-5}$ cm$^2$ s$^{-1}$, and ΔC=9.810$^{-5}$ g cm$^{-3}$, yielding a diffusion layer thickness from natural convection of δ=1.45 mm. Therefore, the 1.3 mm estimation of diffusion layer is reasonable and within the diffusion layer thickness limit associated with natural convection.

The thickness of diffusion layer in the filtration system is speculated to be lesser than batch system under the same experimental condition due to the hydrodynamic compression of the diffusion layer. In order to provide a quantitative estimation of the filtration system diffusion layer thickness, as it cannot be considered diffusion-limited, normal pulse voltammetry experiments was performed to provide more detailed and quantitative information about mass transfer in the filtration system. Accordingly, normal pulse voltammetry (NPV) was utilized to compare the mass transfer in the batch (square) and filtration (circle) systems as shown in FIGS. 42A-42B. For the NPV experiments, the current was recorded 100 s after each potential step over a range of anode potentials from 0.4 V to 1.3 V. FIG. 42A shows the NPV for the batch and filtration systems at an influent methyl orange (MO) concentration of 300 µM. In both systems, as the potential was increased, the current exhibited a sigmoid transition, i.e., at low potentials, <0.5 V, the current was near zero, then the current increased linearly with increasing potential from 0.5 V to 0.8 V, and finally the current achieved a potential-independent, mass transfer limited plateau at potentials >0.8 V. The linear increase in current with increasing potential is indicative of increasing direct electron transfer kinetics. Since MO electrooxidation is kinetically faster than MO diffusion, the CNT anode surface MO concentration can decrease resulting in the formation of a near surface concentration gradient. Eventually, the anode potential can increase to a point, in this case to >0.8 V, where the electrode surface MO concentration is zero and mass transfer to the interface becomes the limiting factor for MO electrooxidation. Thus, any further increase in anode potential should not lead to a further increase in current and a plateau should be observed due to mass transfer limitations.[16] The observed current increase at anode potentials >1.1 V vs SCE, can be, at least partially, attributed to oxygen evolution[36], rather than direct MO oxidation, as electrolytic gas bubbles are visibly observed on CNT anode.

The mass transfer limited current regime, i.e., the current plateau in FIG. 42A, begins at a greater potential in the filtration system, 0.8 V, as compared to the batch system, 0.6 V, indicating a hydrodynamic mass transfer enhancement likely due to the fluid flux through the electrode. Quantitatively, the mass transfer limited current density in the electrochemical filtration system is 6.1 mA m$^{-2}$, and for comparison the mass transfer limited current density of conventional batch system is 0.97 mA m$^{-2}$. Thus, at a liquid flow rate of 1.5 mL min$^{-1}$ the electrochemical filtration design described herein can improve the current density and thus mass transfer by 6-fold as compared to the classical batch design under similar aqueous conditions. The thickness of the diffusion layer in the filtration system can be estimated to be approximately ⅙ of the batch system value, 1.3 mm, so a lower limit for estimation of diffusion layer thickness in the filtration system is 216 μm, about 5 times the thickness of porous CNT anode. The mass transfer is determined to be significantly enhanced in the filtration system as evidenced by both the delay in mass transfer limited NPV regime from ~0.65 V anode potential in the batch system to >0.8 V in the filtration system and the 6-fold greater current density for the filtration system within the mass transfer limited regime (FIG. 42A).

The NPV for the electrochemical filtration (circle) system and the conventional batch (square) system at an MO concentration of 1,100 μM is shown in FIG. 42B. The current density of the batch system again exhibited a sigmoid transition from zero to the mass transfer limited value of 3.5 mA m$^{-2}$. The batch system mass transfer limited region was delayed from 0.65 V when $[MO]_{in}$=300 μM to 0.85 V when $[MO]_{in}$=1100 μM due to the increased diffusion rate at the higher MO concentration. In contrast, the current density of the electrochemical filtration system continually increased and did not appear to plateau and reach the mass transfer limited regime. This does not necessarily indicate the elimination of the mass-transfer limitation, just that the start of the regime was shifted past the oxygen evolution potential and masked by the $O_2$ current density. Thus for the 1100 μM case in FIG. 42B, the quantitative comparison was completed by using the current density values at 1.0 V, just prior to oxygen evolution. The current density at 1.0 V anode potential for the electrochemical filtration system is ~20 mA m$^{-2}$ and for the batch system is 3.2 mA m$^{-2}$. The current density and thus mass transfer is enhanced 6-fold for the filtration system as compared to the batch system due to convection through the electrode. However, even with such a large hydrodynamic enhancement, the anode potential can still be increased to a point where the electrochemical kinetics is significantly faster than the molecular flux.

An exemplary schematic scheme of electrochemical diffusion layer profile is shown in FIGS. 43A-43B to illustrate and explain the interaction between convection, the microstructure of CNT anode in the filtration system, and the resulting 6-fold increase in mass transfer as compared to batch system. In the batch system (FIG. 43A), the diffusion layer is thicker than the anode, the concentration gradient is very low, and the MO concentration is zero within and at the surface of the CNT network. In this case, the microstructure of the porous CNT anode becomes irrelevant and the CNT network acts as a planar electrode due to averaging of the microstructure within the expanding diffusion layer.[16] In contrast, during electrochemical filtration, the CNT anode microstructure is significant. As depicted in FIG. 43B, due to convective mass transfer through the CNT network, the average MO concentration at all of the filter cross sections is above zero, i.e., always above effluent (output fluid) concentration, even if the system is in mass transfer limited regime. The concentration gradient between pore center and CNT surface and thus mass transfer is expected to be high, since the characteristic length, the average pore radius, is only 45 nm. Therefore, the convective flow through the CNT network allows for electrochemical oxidation at both the surface and the inner CNT surfaces and produces a high local concentration gradient resulting in an observed 6-fold increase of target molecule mass transfer to electrode interface.

Physical Adsorption/Desorption: Temperature-Dependent Effects on Electrochemical Filtration. The nature of dye adsorption to the CNTs (FIG. 39, step 2), and the influence of adsorption on the electrooxidation kinetics were evaluated by temperature-dependent experiments as shown in FIG. 44. For the experiments indicated in FIG. 44, the temperature was maintained at 15 (blue), 25 (black), and 35° C. (red) and prior to electrolysis the CNT surface was first saturated with MO, i.e., 300 μM MO was flowed through the CNT network in the absence of applied potential until the effluent MO concentration was equivalent to the influent concentration. Then an applied voltage of 2.0 V corresponding to an anode potential of 0.8 V was applied to the electrochemical filtration cell until a steady-state effluent MO concentration was observed for 30 min. The steady-state $[MO]_{ef}/[MO]_{in}$ is determined to slightly decrease with decreasing temperature, indicating that the extent of electrochemical oxidation increases with decreasing temperature. However, according to the Arrhenius equation[37] or transition state theory[38], the reaction rate constant should generally increase with increasing temperature.

One possible explanation to this inverse reaction kinetics temperature dependence can lie in the temperature effect on MO adsorption and desorption to the CNT electrode surface. To investigate the nature of MO adsorption, batch temperature-dependent sorption experiments were conducted to investigate the adsorptive behavior of MO on CNTs. MO adsorption isotherms onto the CNTs at 15° C. (blue), 25° C. (black), and 35° C. (red) are shown in FIG. 44B. In all cases, the adsorption capacity increased with increasing MO concentration until a plateau is reached. The temperature-dependent MO adsorption to the CNTs is quantitatively examined using the Langmuir isotherm. The Langmuir adsorption isotherm model has been utilized to quantitatively describe monolayer sorption processes and determine sorption parameters such as the maximum sorption capacity, the partitioning coefficient and the adsorption thermodynamics via temperature-dependent isotherms.[39] Experiment data and fitting of data to the Langmuir isotherm are shown in FIG. 44B. In all cases, the Langmuir fitting had high correlation coefficients, i.e., $R^2$>0.97, and the corresponding fitting parameters are listed in Table 7 below. The maximum sorption capacity decreases by 10-20% for every 10° C. increase in temperature. Thermodynamic parameters for MO adsorption onto the CNTs were also calculated. The negative $\Delta G°$ values indicate that sorption of MO onto the CNTs can be a spontaneous process under the experimental conditions. The $\Delta S°$ and $\Delta H°$ are calculated to be 0.085 kJ mol$^{-1}$ K$^{-1}$ and −11.2 kJ mol$^{-1}$, respectively. The negative enthalpy value ($\Delta H°$) indicates that the MO sorption process onto the CNTs can be exothermic. Similar results were reported by Al-Johani et al.[40] on aniline adsorption to CNTs, where low temperature was reported to favor physical adsorption with a negative enthalpy of −24 kJ mol$^{-1}$. The dominate interaction between MO and the CNTs is speculated to be π-π interaction as π-π interaction has been recently reported to be the strongest intermolecular interaction between aqueous aromatic compounds and CNTs.[26]

TABLE 7

Langmuir Isotherm Parameters for MO Adsorption onto CNTs

| T (° C.) | Langmuir constants[A] | | | Thermodynamic parameters[B] | | |
|---|---|---|---|---|---|---|
| | b (L mg$^{-1}$) | q$_m$ (mg g$^{-1}$) | R$^2$ | ΔG° (kJ mol$^{-1}$) | ΔH° (kJ mol$^{-1}$) | ΔS° (kJ (mol · K)$^{-1}$) |
| 15 | 2.81 | 32.2 | 0.977 | −35.6 | | |
| 25 | 2.33 | 28.5 | 0.983 | −36.3 | −11.2 | 0.0845 |
| 35 | 2.07 | 25.3 | 0.996 | −37.2 | | |

[A] $q_e = q_m C_e/(1/b + C_e)$;
[B] ΔG° = −RTlnb  ΔG° = ΔH° − TΔS°[35]

According to the experimental adsorption isotherms and thermodynamic analysis, the equilibrium adsorption capacity decreases with temperature, in agreement with the determined results. However, electron transfer processes are too fast to assume equilibrium adsorption. Thus, an adsorption dynamics-based hypothesis can be used to provide a possible explanation. The equilibrium adsorption isotherm of methyl orange to CNTs (FIG. 44B) indicates an exothermic physical adsorption process. For physical adsorption processes, an increase in temperature generally results in an increase in desorption rate, thus reducing the residence time of molecules on the CNT surface and within the CNT network. Since the CNT electrocatalytic sites are predominantly found at the ends of the tubes,[30] not all sorption sites will be near electron transfer sites and an increased desorption rate will reduce the likelihood of an adsorbed molecule finding an electron transfer site. As a consequence, the overall rate of reaction is decreased. In summary, although temperature and adsorption effect the extent of oxidation during electrochemical filtration, the effect is relatively small at <10% per 10° C. as compared to the previously discussed hydrodynamic enhancement and the anode potential effects to be discussed below.

Electron Transfer: Concentration and Anode Potential Dependence. Although mass transfer and adsorption are important processes that affect the overall extent of oxidation during electrochemical filtration, the dye is ultimately transformed during the electron transfer step. Therefore, the nature and rate of electron transfer can be important. The effect of influent dye concentration and anode potential on the electrooxidation rate was investigated to determine the electron transfer kinetics and mechanism during electrochemical filtration. At high influent dye concentrations when the adsorption sites are saturated, the overall reaction rate can be limited by the electron transfer kinetics.

The concentration-dependent oxidation during electrochemical filtration of MO and MB at three different applied voltages; 1.0V/1.6V (black), 2.0V (red), and 3.0V (blue), are shown in FIGS. 45A and 45B, respectively. At each voltage, the electrochemical CNT filter was tested with a range of influent concentrations from 25 μM to 5500 μM for MO and from 7 μM to 1200 μM for MB at a flow rate of 1.5 mL min$^{-1}$. For each concentration and voltage combination, the steady-state effluent dye concentration was measured and the molecules oxidized per unit time was calculated and plotted against influent concentration. In FIG. 45A, the MO electrooxidation rate first increases with increasing influent concentration up to 110 μM for all three voltages. The voltage-independent increase in electrooxidation rate indicates that the reaction is mass transfer limited when [MO]$_{in}$ ≥110 μM. The electrooxidation rate at 1 V reaches a maximum of 0.05 mmol min$^{-1}$ as indicated by the sharp transition when influent concentration exceeds 110 μM. The sharp transition indicates a shift from the mass transfer limited regime to the electron transfer limited regime. The 2 V and 3 V curves stay in mass transfer limited regime until [MO]$_{in}$ >500 μM. The greater transition concentration at 2 V and 3 V as compared to 1 V indicates that a new and kinetically faster direct MO oxidation pathway has been activated. At [MO]$_{in}$=1000 μM the 2 V electrooxidation rate reaches a maximum of 0.37 mmol min$^{-1}$. The electrooxidation rate at 3 V did not achieve an upper limit over the experimental concentration range with a maximum oxidation rate of 1.04 μmol min$^{-1}$ at 5,500 μM MO. If it is assumed that each MO molecule were to transfer 17 electrons to the anode as previously estimated, the maximum electron transfer rate is calculated to be 8.5×10$^{15}$ e$^-$ per second at 1 V, 6.3×10$^{16}$ e$^-$ per second at 2 V. At 3 V, indirect oxidation pathways are activated such that the contribution of direct oxidation toward total oxidation needs to be determined. From FIG. 45B, at 3 V and an influent MO concentration of 300 μM, the Δ[MO]=190 μM and from FIG. 57 direct oxidation contributes 140 μM of this total or 74% of total oxidation. By challenging the filter with 5500 μM MO to remove mass transfer limitation and saturate direct oxidation, the contribution of direct oxidation in total oxidation rate can increase to >74%. Thus, by assuming 74% of the total is direct oxidation, a lower limit for the direct electron transfer rate can be estimated to be 1.3×10$^{17}$e$^-$ per second at 3 V, which is still greater than 8.5×10$^{15}$ e$^-$ per second at 1 V and 6.3×10$^{16}$ e$^-$ per second at 2 V. Accordingly, the electron transfer kinetics can increase with increasing potential.

The sharpness of the transition from mass transfer limited to electron transfer limited regimes yields insight into the electron transfer mechanism, i.e., direct versus indirect. A direct electrooxidation would be speculated to have a sharper threshold than indirect electrooxidation as the direct mechanism has a stronger surface site dependence. Thus, from the relative sharpness of the curves in FIGS. 45A and 45B, the contribution of indirect oxidation is determined to be minimal at 1 V and to increase with increasing voltage, becoming significant at 3 V where a plateau is not observed. More quantitatively, the applied voltages of 1 V, 2 V, and 3 V correspond to anode potentials of 0.35 V, 0.77 V, and 1.50 V vs SCE. At 3 V, the anode potential is 1.5 V, which is greater than the required potential for the 2$^-$ electron Cl$^-$ oxidation (E°=1.2 V vs SCE), producing reactive chlorine species that can indirectly oxidize MO.[41] The coexistence of direct and indirect oxidation is also in agreement with the increased electrooxidation at 3 V.

A similar trend of methylene blue oxidation rate versus influent MB concentration is observed in FIG. 45B. A sharp transition region appears as early as 25 μM when 1.6 V was applied with a maximum oxidation rate of 0.016 μmol min$^{-1}$. Increasing the applied voltage to 2 V elevates the maximum electrooxidation reaction rate to 0.072 μmol min$^{-1}$ and a further increase of applied voltage to 3 V results in a maximum rate greater than 0.233 μmol min$^{-1}$. Despite the similar voltage- and concentration-dependent electrooxidation rate trend of MB and MO, the absolute reaction rate of MB is significantly lower at a similar voltage. Quantitatively, the maximum electrooxidation rates for MB are 3.1, 5.1, and 4.5 times lower than the corresponding MO oxidation rates at 1 V, 2 V, and 3 V, respectively. Without wishing to be bound by theory, the significantly lower extent of MB oxidation can be attributed to either a difference in reduction potential, i.e., lower MO $E^0$ values and thus faster electron transfer rates, or the difference in molecular charge, i.e., MO is negatively charged and MB is positively charged and the resulting effects of electromigration on mass transfer. The $E^0$ for MO oxidation at influent pH 6.3 is reported to be 0.37 V,[42] lower than that of MB, 1.1 V,[43] indicating faster MO electron transfer kinetics at similar anode potentials. This is in agreement with the greater extent of MO oxidation at 1 V and 2 V where the anode potential is less than the MB redox potential. However, it does not agree with the 3 V results, since at an anode potential of 1.5 V, both MO and MB should be completely oxidized. This indicates that the difference in MO and MB oxidation can be due to electromigration since a positive potential applied to the anodic CNT network can result in the accumulation of positive surface charges.[44] Thus, the negatively charged MO can tend to diffuse more quickly to and be more favorably adsorbed onto the positively charged CNT anode than the positively charged MB molecule due to electromigration and electrostatic interactions, respectively. The electrostatic increase in MO diffusion and adsorption can increase the relative CNT electrode surface concentration of MO relative to MB and in turn increase the electron transfer rate. To investigate this further, voltage-dependent effects on MO and MB electrooxidation were performed and discussed below.

The voltage-dependent electrooxidation of low concentration MO and MB is shown in FIGS. 46A-46B, with the negatively charged methyl orange in FIG. 46A and the positively charged methylene blue in FIG. 46B. The influent concentration is 7 µM for both MB and MO and the minimum voltage applied is close to their reported $E^0$'s and increased by units of 0.2 V. In FIGS. 46A-46B, it is determined that as the voltage is increased the steady-state effluent concentration after 200 min of electrolysis is decreased. As the applied voltage is increased above $E^0$, the standard free energy gap between anode surface and molecules is increased, resulting in faster electron transfer between the electron donors, MO and MB, and the CNT anode.[16] It is of note that for the negatively charged MO, the extent of oxidation (FIG. 46A), grows more with increasing voltage. For example, the steady state concentration difference between 0.8 and 1.0 V is 2.2 µM and the difference between 1.0 V and 1.2 V is 4.0 µM. In contrast, the inverse relationship is determined for the positively charged MB as the extent of oxidation grows less with increasing voltage. For instance, the concentration difference between 1.0 and 1.2 V is 2.2 µM and the difference between 1.4 V and 1.6 V is 1.2 µM. The opposite trends of MB and MO indicate that electromigration and electrostatic interactions can be responsible for the large difference in electrooxidation rates. Even though the rate of electron transfer is increased with increasing applied voltage in both cases, the effect of electrostatic interactions between the charged molecules and the positively charged CNT anode can become more prominent with increasing voltage due to the increased positive-charge of the anode.[44] Thus, electromigration and electrostatics are, at least partly, responsible for the large difference in MO and MB oxidation rates as shown in FIGS. 45A-45B.

The effect of anode potential on anodic current and MO oxidation at an influent MO concentration of 300 µM is shown in FIG. 47. Such data can provide an insight of a predominant electron transfer pathway, i.e., direct electron transfer versus indirect electron transfer. The effluent MO concentration initially decreases with increasing anode potential until 0.8 V and reaches a plateau of 160 µM from 0.8 to 0.95 V. The current exhibits a corresponding increase until 0.8 V where it plateaus at a mass transfer limited current density of 6 mA m$^{-2}$ from 0.8 V to 1 V. Therefore, the findings indicate that the initial decrease of MO concentration up to 0.8 V is due to the increasing rate of direct electron transfer as there are negligible thermodynamically viable indirect pathways. The effluent concentration plateau from 0.8 V to 1.0 V, which overlaps with the mass transfer limited current plateau, is thus attributed to the mass transfer limited direct oxidation. In this regime, MO is oxidized only through direct oxidation pathway by CNT anode, eq 4.

$$MO^- + nh^+\text{-CNT} \rightarrow MO_{ox}(-nh^+) + CNT \quad (4)$$

If direct oxidation is the only electron transfer mechanism, then the effluent concentration will not decrease with increasing anodic potential >0.8 V. However, this is not the case. Once the anode potential is increased to >0.95 V, the effluent MO concentration begins to decrease with increasing potential indicating indirect and direct oxidation are occurring simultaneously. The activation of the indirect oxidation pathway negates the mass transfer limitation since the electrogenerated oxidants can diffuse to the bulk solution and react with MO molecules that are not directly oxidized. At 1.01 V vs SCE, the four electron water oxidation to produce oxygen, eq 5, can become viable.[41]

$$H_2O \rightarrow 4H^+ + O_2 + 4e^- \quad (5)$$

The $E^0$ of eq 5 is similar to the experimentally-determined anode potential, 0.95 V, at which indirect oxidation becomes active. The produced oxygen can immediately react with the radicals generated from direct oxidation of MO and form reactive oxygen species such as peroxy radicals that can indirectly oxidize MO.[45] At anode potentials >1.2 V vs SCE, the two-electron oxidation of Cl$^-$ to Cl$_2$ becomes thermodynamically viable resulting in another possible indirect oxidation pathway. The contribution of the direct and indirect oxidation pathways can be determined from FIG. 47. For example, at an anode potential 1.2 V, the total MO oxidized is 180 µM and the contribution from the direct electron transfer pathway is 140 µM or 78% and the contribution from the indirect electron transfer pathway is 40 µM or 22%. In summary, at low potentials, ≤0.8 V, direct oxidation can be the dominant pathway and as the anode potential is increased above 1.0 V, the contribution from indirect oxidation can increase proportionally as new indirect pathways become viable.

Presented herein is an exemplary overall reaction mechanism for organic oxidation during electrochemical filtration. The overall electrochemical filtration process is described by a reactive transport mechanism consisting of three primary steps: (1) hydrodynamically enhanced mass transfer, (2) temperature-dependent physical adsorption/desorption, and (3) voltage-dependent direct electron transfer. One of the keys to effective oxidation in the electrochemical filtration system includes the 6-fold increase in mass transfer due to convection of the target molecule through the electrode. Following mass transfer in the overall mechanism is physical adsorption onto the CNT anode, which was determined to be an exothermic process with enthalpy of −11.2 kJ mol$^{-1}$. Higher temperatures were determined to decrease the overall rate of organic oxidation during electrochemical filtration possibly due to increased desorption kinetics and thus a decreased likelihood for oxidation. Once sorbed to the CNT anode, direct oxidation of the organic can occur and the rate of electron transfer can be proportional to the applied voltage. The electrooxidation rate is also determined to be a function of the molecular charge due to electromigration.

Direct oxidation is determined to be the predominant electron transfer mechanism at all anode potentials evaluated with indirect oxidation making a fractional contribution at anode potentials ≥1.0V. The electrochemical filtration reactive transport mechanism presented herein provides an improved fundamental understanding of hydrodynamically enhanced electrochemical systems and can be utilized to optimize the design of the filtration apparatuses described herein and to construct an accurate model of the system. Effects of the liquid flow rate on the electrochemical diffusion layer can also be included in the design of the filtration apparatuses described herein.

Exemplary materials and methods for Example 15

CNT Selection. Multiwalled carbon nanotubes that had been made into preformed porous networks with an average depth of 40-50 μm (NanoTechLabs, Buckeye Composites, Yadinkville, N.C.) were utilized. The CNTs were characterized previously[12] (e.g., in earlier Examples) and have a diameter distribution that agrees with the manufacturer specifications of <d>=15 nm-20 nm. Thermogravimetric analysis of the CNTs showed they are composed of about 1-1.5% amorphous carbon and 4-5% residual metal catalyst, which was mostly Fe.[12]

SEM Analysis. Scanning electron microscopy (SEM) was performed on a Zeiss FESEM Supra55VP. ImageJ (NIH) software was used to analyze the obtained scanning electron micrographs. The average CNT diameter was the average of at least 100 measurements from at least 2 images.

Chemicals. NaCl (EMD Chemicals, AR grade, >99%) was chosen as the background electrolyte and used at a concentration of 10 mM for all experiments. Methyl orange hydrate (MO; >95%) and methylene blue hydrate (MB; >97%) were purchased from Sigma-Aldrich. Methylene blue was quantified by its absorption at $\lambda_{max}$=665 nm (∈=74 100 $M^{-1}$ $cm^{-1}$). Methyl orange was quantified by its absorption at $\lambda_{max}$=464 nm (∈=26 900 $M^{-1}$ $cm^{-1}$).

Electrochemical Filtration. The CNT networks were supported by 5-μm PTFE membranes (Omnipore) and placed into the electrochemistry-modified filtration casing (Whatman), FIGS. 1A-1G. The weight of CNTs anode used in the experiments was, about 10 mg. After sealing the filtration casing and priming with water, a peristaltic pump (Masterflex) was used to flow water through the filter at about 1.5±0.1 mL $min^{-1}$ to rinse and calibrate the CNT filter. The liquid flow rate was calibrated with a graduated cylinder. Once the water rinse and flow rate calibration was performed, the pump was primed with the appropriate influent solution and then the experiment was started. The electrochemistry was driven by an Agilent E3646A DC power supply and connected to the external electrode wires with alligator clips. Effluent aliquots were collected at various time-points and analyzed by spectrophotometer to determine the effluent (output fluid) concentration of the target molecule. The temperature-dependent experiments were carried out by putting the whole filtration set up including pump, filter, power supply, and influent container in an incubator set to the desired temperature. The temperature of influent (input fluid) was measured by a thermometer to confirm the temperature of solution consistent with experimental design.

Chronoamperometry and Normal Pulse Voltammetry. The chronoamperometry and normal pulse voltammetry experiments were performed with a CHI604D electrochemical workstation; Ag/AgCl was used as the reference electrode, the perforated stainless steel shim was used as the counter electrode, and the prepared CNT network was used as the working electrode. The time-dependent current was continuously recorded by the electrochemical analyzer. For the normal pulse voltammetry experiments, the current was recorded at 100 s after each potential step and this time period should be sufficient for the nonfaradaic current to become negligible. The electrochemical filtration system was operated at a flow rate of 1.5 mL $min^{-1}$ and the liquid flow was kept continuous for at least 5 min prior to a potential step. The batch system was operated in a beaker containing 0.5 L of 300 or 1000 μM methyl orange solution with 10 mM NaCl electrolyte. To ensure a consistent initial batch system state, the solution was stirred for at least 5 min prior to a potential step. The results were plotted as current density, which is calculated using the current recorded and the total surface area of CNT anode. The total CNT surface area is obtained by multiplying the mass of CNT anode by its specific surface area, 88 g $m^{-2}$ (Ref. 12).

Sorption Experiments. The sorption experiments were carried out in 250 mL glass Erlenmeyer flasks containing 100 mL of aqueous methyl orange solution, 5-250 μM, and 0.015 g CNT powder. The flasks were shaken at 150 rpm in an incubator (New Brunswick Scientific) at temperatures of 15° C., 25° C., and 35° C. for 24 h. Sample aliquots were filtered prior to analysis.

Example 16

Kinetics Modeling of Heterogeneous Electrocatalytic Dye Oxidation on Liquid-CNT Interface Some embodiments of the electrochemical filters using porous CNT anode described herein can be used in dye oxidation and pathogen disinfection[13, 14]. Presented herein is a combined experimental and simulation study on the coupling between convective-diffusive mass transfer and chemical reaction kinetics during methyl orange oxidation in a porous CNT anode. A steady state model was developed to resolve velocity and concentration spatial distribution, as well as spatially resolved reaction rate. Experimental and numerical simulation studies about reaction rate dependence on influent concentration and anode potential were performed and both results were compared for model accuracy. The mathematical model was further used to investigate mass transfer limited regime and oxidation kinetics limited regimes. Finally, the mathematical model was applied to a single cylinder CNT anode to study the reaction rate distribution around its perimeter.

Exemplary Mathematical Modeling Approach and Numerical Simulation

CNT Filter Geometric Models. The SEM aerial image of the CNT filter has been shown in earlier Examples, e.g., FIG. 40. The porous filter is consisted of randomly oriented CNTs with a diameter of 15 nm, forming a complex 3D matrix with a pore size of 90±40 nm. For simulation purposes, CNTs are modeled as cylinders aligned along the direction that is perpendicular to the flow. In addition, CNTs in the filter are modeled as periodic arrays in which the distance between each two tubes is determined such that the specific area in the model agrees with the experimental value, 88.5 $m^2$ $g^{-1}$. The calculated distance is 45 nm between two rows and 113.4 nm between two columns as shown in FIG. 48.

Oxidation Kinetics Models. Langmuir-Hinshelwood mechanism is generally used in studies of electro-oxidation reactions where adsorptive species is adsorbed onto electrode surface and oxidized by electrode surface holes or other oxidants[15]. The adsorption behavior is described by Langmuir isotherm as follows:

$$q_s = \frac{q_m C_s}{1/b + C_s} \quad (1)$$

where $q_s$ is the adsorption amount on electrode surface and $C_s$ is the MO concentration immediately near the electrode surface. $q_m$ is measured to be 0.0285 g g$^{-1}$CNT and b=2.33 L umol$^{-1}$.

The electron transfer and oxidation rate constant can be modeled by Butler-Volmer (BV)[1] relation using:

$$K = k_0 \exp[\alpha f(E-E_0)] \quad (2)$$

where $k_0$ is the standard rate constant, $\alpha$ is the transfer coefficient, f=F/RT in which F is faraday constant and R is gas constant. $E_0$ and E stand for standard electrode potential for the reaction and anodic potential, respectively. Therefore, the rate of oxidation r is $$r = K q_s = \frac{q_m C_s}{1/b + C_s} k_0 \exp[\alpha f(E-E_0)] \quad (3)$$

In the system studied herein, $k_0$ and $\alpha$ are unknown parameters. By challenging the CNT filter with extremely high concentration, $q_s = q_m$ and the logarithm of reaction rate measured in the experiment is linearly dependent on the anodic potential. Accordingly, both parameters can be estimated by linear fitting.

Hydraulic Models. In the 2D model, the 2D Navier-Stokes (eqn. 4) equation is solved, together with the mass conservation of incompressible fluid (eqn. 5).

$$\rho \frac{D\bar{u}}{Dt} = -\nabla p + \rho \bar{g} + \mu \nabla^2 \bar{u} \quad (4)$$

$$\nabla \cdot \bar{u} = 0 \quad (5)$$

where u is the velocity vector, $\rho$ is the density of the fluid, and p is the pressure. g is a body force term, representing gravity. $\mu$ denotes the dynamic viscosity of the influent solution. Due to the low mass fraction of MO in the solution (<3×10$^{-4}$), there is unlikely any substantial influence of the dissolved molecules on the fluid properties. Hence, the calculation of the flow field was based on the fluid properties of pure water. Because of the very small Reynolds number (~2×10$^{-7}$), the laminar flow model can be employed to calculate the velocity distribution. The average inlet flow rate of 35.4×10$^{-6}$ m s$^{-1}$ was based on the volumetric flow rate of the experiment.

Species transfer models. Both convective and diffusive mass transfers take place in the filtration system described herein. Steady state mass transfer in the filter is determined by the following convective-diffusion equations, in which the velocity field from hydraulic models is used:

$$D\nabla^2 C = \nabla C \cdot \bar{u} \text{ in the filter}$$

$$-D\nabla C \cdot \underline{n} = r \text{ in the electrode surface} \quad (6)$$

where D denotes the diffusion coefficient which is estimated to be 8.5×10$^{-5}$ cm$^2$ s$^{-1}$ for methyl orange and $\bar{n}$ is the normal vector of the cylinder surface. r is the oxidation rate on the CNT surface which is represented by eqn. 3. A finite element method can be applied to calculate the steady state velocity field and concentration field coupled with oxidation kinetics by COMSOL MULTIPHYSICS V 2.0. The overall model approach is shown in Table 8 below.

TABLE 8

An exemplary scheme of the model approach

1. Hydraulics: Velocity Field
   - Navier-Stokes equations and boundary conditions
   - $\nabla \cdot u = 0$
2. Mass Transfer
   - Convective-diffusion equations
   - $D\nabla^2 C(x,y) = \vec{u} \cdot \nabla C(x,y)$
3. Oxidation Kinetics
   - Inward flux on electrode surface equals to oxidation kinetics
   - $-D\nabla C_s \cdot \vec{n} = -k_0 \exp[\alpha f(E-E_0)] \left[\dfrac{q_m C_s}{1/b + C_s}\right]$ Results Oxidation Reaction Rate Coefficient. The measured overall reaction rates as a function of influent concentration is shown in FIG. 49. At high influent concentration the oxidation rate reaches a plateau which can be attributed to the saturation of surface reactive sites and a complete coverage by adsorbed molecules on the electrode surface.

Therefore, the experimental measurement indicates that the Langmuir-Hinshelwood mechanism can be applied where adsorptive species is adsorbed onto electrode surface and oxidized by electrode surface holes or other oxidants. The maximum reaction rates at the indicated anodic voltage were measured and plotted against the anodic voltage in a logarithm scale as shown in FIG. 50. The data obtained at 0.35 V, 0.6 V, 0.8 V, 1.2 V show a good linear relationship with $R^2$=0.988. According to eqn. 3, $k_0$=18.9 umol (s m')$^{-1}$ and $\alpha$f=5.43 V$^{-1}$. With the above oxidation reaction coefficient, the oxidation kinetics can be described and a numerical simulation of the overall reaction kinetics can be performed, taking into account mass transfer and oxidation kinetics on electrode surface.

Velocity and Concentration Field Simulation. The calculated velocity field is presented by velocity surface and velocity contour in FIGS. 51A and 51B. The red spots are areas with high velocity while blue spots are velocity minimums. The model correctly predicted the relative distribution of velocity field. As shown in FIG. 51A, the flow accelerates after entering the filter because of a shrink in cross-section area, and the flow is very slow near the CNT surface as well as walls of reactor. The velocity contour as shown in FIG. 51B also shows a trend that velocity decreases near the CNT surface. With the simulated velocity field, the concentration field can be resolved.

Overall Reaction Kinetics: Experimental Data and Simulation. A representative simulation concentration contour is shown in FIG. 52 and shows that that the model can qualitatively predict the spatial concentration distribution. The model correctly predicts a decreasing trend along the filtration depth. In addition, the model shows that the space between consecutive concentration contours becomes larger along filtration depth, indicating a decreasing concentration gradient and thus in turn a decreasing mass transfer rate and overall reaction rate.

While in the actual CNT filter total number of CNT rows is 1000, 20 rows of CNTs are incorporated in the model simulation. Therefore, the effluent concentration predicted by the model $C_p$ is actually the concentration at ⅟₅₀ of total length. Nevertheless, the total oxidation rate or the final effluent concentration $C_{out}$ can be estimated by modeling the filter as a porous plug flow reactor, which is reasonable for electrochemical filtration and can be verified by the parallel shape of concentration contour in FIG. 52. The $C_{out}$ can be calculated by solving eqn. 7 as follows:

$$C_p = C_0 e^{20k}$$

$$C_{out} = C_0 e^{1000k} \tag{7}$$

The accuracy of the model can be assessed and validated by influent concentration-dependent experiment (FIG. 53A) and potential-dependent experiment (FIG. 53B). The experimental data are represented by dots and simulation results are represented by lines in the figures. In FIG. 53A, effluent concentration is measured at the outlet after about 1.4 s of electrochemical filtration. FIG. 53A shows that the C[in-out] increases with influent concentration initially but gradually reaches a plateau. FIG. 53B shows that kinetics of reaction increases as anode potential rises due to faster electron transfer. In both cases the model can predict not only the general trend but also the absolute values at given condition. The maximum relative error of prediction during the experimental data range is about 15%.

Mass Transfer Limited and Oxidation Kinetics Limited Regimes. In heterogeneous reaction, the overall kinetics can be limited by mass transfer or electrode oxidation kinetics. Theoretically, the two different rate limiting regime can be distinguished by characteristics time calculation for each primary step. In the model presented herein, the mass transfer rate can be adjusted by changing influent concentration while the oxidation kinetics can be tuned by adjusting anodic potential. The simulation results for mass transfer limited regime and oxidation kinetics limited regime under representative conditions are shown in FIGS. 54A and 54B, respectively. In FIG. 54A, simulation is performed at very low influent concentration, 1 μM, and a high anodic voltage, 5 V. The resulting simulation gives a clear spatial concentration distribution which indicates overall kinetics is mass transfer limited. The concentration decreases sharply to almost zero after only the first row of CNTs electrode. Therefore, no or insignificant oxidation occurs in the remaining rows because of insufficient mass transfer to those electrodes, and thus overall kinetics is in mass transfer limited regime. In FIG. 54B, on the contrary, the influent concentration is as high as 300 μM, but the anodic potential E is 0.35 V, slightly higher than the standard electrode potential of methyl orange oxidation, 0.3 V. Under this condition, the mass transfer is sufficient but the slow oxidation kinetics can become the rate limiting step, as evidenced by the spatial concentration distribution showing a slight change along filtration depth and a high concentration at the electrode surface. Theoretically, characteristic time of mass transfer and oxidation kinetics can be calculated and compared to determine the rate limiting step. The characteristic time of mass transfer is given by the following eqn. 8 (Ref. 1), $$t_m = \frac{r_0^2 e^{\frac{\delta}{r_0}}}{4D} \tag{8}$$

where $t_m$ is the characteristic time for mass transfer, $r_o$ is the radius of cylinder electrode, D denotes the diffusion coefficient and δ is the diffusion layer thickness. δ is estimated to be 100 nm and 50 nm in FIGS. 54A and 54B, respectively.

The characteristic time of oxidation reaction can be derived by eqn. 9, $$t_0 = \frac{C}{\frac{dC}{dt}} = \frac{C + 1/b}{(Kq_m)h} \tag{9}$$

where $t_o$ stands for the characteristic time for oxidation, while other variables are the same as stated previously. Based on eqn. 8 and eqn. 9, in FIG. 54A, $t_m = 1$ ms $\gg t_o = 1 \times 10^{-7}$ s, indicating mass transfer limitation. In FIG. 54B, $t_m = 1 \times 10^{-6}$ s $\ll t_o = 9447$ s, indicating oxidation kinetics limitation. The model simulation results agree well with theoretical calculation.

Variation of Reaction Kinetics along Filtration Depth and CNT Perimeter. Along filtration depth, molecules in the solution are oxidized and the bulk concentration changes. This change in bulk concentration in turn can affect the oxidation kinetics, thus varying reaction kinetics along filtration depth. The steady-state spatial flux simulation in FIG. 55A can provide a quantitative description of steady-state spatial changes in reaction rates. While the flux does not equal to the surface oxidation rate everywhere in the solution, on the CNTs surface, the inward flux does equal to the rate of reaction. Therefore, the changes in flux magnitude on the CNTs surface can be used to estimate local oxidation rate. FIG. 55A indicates that the reaction rate is faster on CNTs at the top surface than those at the bottom surface of the filter. The decreasing average reaction rate along the filtration depth can be attributed to the decrease in average bulk concentration. FIG. 55A also shows that the reaction rate is not homogenous along the perimeter of a single CNT electrode which gives the red "ears" on left and right sides of each CNT.

To closely investigate this kinetics variation along CNT perimeter, the simulation for a single cylinder CNT anode is performed. The diffusional flux on the CNT surface is substantially equal to local reaction due to minimum convection near CNT surface as indicated in the velocity contour of FIG. 55B. The computed flux surface is plotted in FIG. 55C. FIG. 55C indicates that the fastest reaction kinetics occurs at the left and right sides of CNT and is perpendicular to the direction of flow; the slowest reaction kinetics takes place downstream of the CNT anode while the upstream side of CNT shows an intermediate reaction rate. This distribution of reaction rates can be explained in terms of mass transfer because the simulation condition falls into the mass transfer limited regime. On the left and right side of CNT, the convection is faster in the adjacent regions associated with faster velocity thus resulting in a thinner diffusion layer and higher mass transfer rate. On the downstream side of the cylinder, the concentration in the nearby region (as shown in FIG. 55D) is significantly lower which indicates a small diffusion rate. In addition, the average velocity and the convection rate is lower. Therefore, the overall mass transfer rate is the slowest at the bottom surface. On the upstream side of the cylinder, although convection rate is as slow as observed on the bottom surface, the concentration field nearby is the highest (as shown in FIG. 55D), leading to an intermediate mass transfer rate and overall reaction rate. Quantitatively, as shown in FIG. 55E, the rate of reaction on the left and right is $2.01 \times 10^{-7}$ mol (m² s)⁻¹, while the reaction rates on the upstream and downstream side are $1.72 \times 10^{-7}$ and $1.66 \times 10^{-7}$ mol (m² s)⁻¹. The rate of reaction varies 20% along the CNT anode perimeter.

The heterogeneous kinetics including electrocatalytical dye oxidation kinetics and mass transport in a porous carbon nanotubes (CNTs) anode is evaluated experimentally and numerically simulated. The numerical simulation resolves steady state concentration spatial distribution, velocities, flux, and spatial distribution of overall reaction rate. By concentration field and flux simulation, the mathematical model can qualitatively describe trend of reaction rate in both the mass transfer limited and oxidation kinetics limited regimes. The kinetic model is can also quantitatively agree with experiment data obtained from anode potential dependent and influent concentration dependent experiments. The model simulations shows that reaction rates vary along filtration depth. In a simulation of a single nanotube anode, the spatial distribution along the cylinder CNT perimeter shows that the maximum reaction rate occurs at which the direction is perpendicular to main stream flow whereas minimum reaction rate occurs on the downstream side of the cylinder due to mass transfer.

Exemplary Experimental Materials and Methods for Example 16

CNT Selection. As described earlier, multiwalled carbon nanotubes that had been made into preformed porous networks with an average depth of 40 to 50 μm (NanoTechLabs, Buckeye Composites, Yadinkville, N.C.) were utilized. Please see, e.g., Example 15, for additional details.

SEM Analysis. Scanning electron microscopy (SEM) was performed on a Zeiss FESEM Supra55VP. ImageJ (NIH) software was used to analyze the obtained scanning electron micrographs. The average CNT diameter was the average of at least 100 measurements from at least 2 images.

Electrochemical Filtration. As described earlier, the CNT networks were supported by 5-um PTFE membranes (Omnipore) and placed into the electrochemistry-modified filtration casing (Whatman) as shown in FIGS. 1A-1G. Please see, e.g., Example 15, for further details.

Example 17

Design and Construction of an Exemplary Carbon Nanotube Electrochemical Cross-flow Filter Device Presented herein is an exemplary carbon nanotube (CNT) cross-flow filter device designed to incorporate electrochemistry, which involved the addition of electrodes and the synthesis of a CNT-polymeric hybrid membrane. An exemplary application of the electrochemical cross-flow device can include point-of-use water filtration (e.g., treatment of drinking water at the point of consumption). A schematic diagram of an exemplary electrochemical cross-flow filter device is shown in FIG. 4, indicating how the electrochemical cross-flow device treats water to produce drinking water.

Preparation of a polymeric membrane. The polymeric membrane separating the anodic and catholic carbon nanotube membranes can be synthesized or obtained from a commercial source.

It was first sought to synthesize a PVDF membrane for use in the CNT-polymeric hybrid membrane, e.g., by phase inversion. The synthesis of membranes via phase inversion involves preparing and mixing a polymeric solution, spreading that solution on a flat surface, e.g., a glass plate, and then precipitating the polymeric membrane from that solution. The polymer used to prepare the polymer solution was polyvinylidene fluoride (PVDF) and the solvents used were N-methyl-2-pyrrolidone (NMP) and dimethyl acetamide (DMAc). A polymeric additive, polyvinylpyrrolidone (PVP), could be included in some casting solution compositions because of its ability to increase pore size. PVP is water soluble and can be removed when the membrane is immersed in a water bath, thus producing larger pores.

In one embodiment, the PVDF membranes were produced using the phase inversion process. Briefly, the polymeric solution was prepared by gradually adding the PVDF polymer to the solvent. A quarter of the total polymer was added to a beaker of 100 mL of solvent every 10 minutes. The polymer-solvent mixture was continuously stirred by a mechanical mixer. After all the polymer was added, the polymer solution was stirred, e.g., for another twenty-four hours. Once the mixing was complete, the beaker was placed in an ultrasound bath, e.g., for about 30 minutes to remove any bubbles/gas from solution. Then, the beaker was covered with a piece of aluminum foil and stored until ready to use. For example, the polymer solution was ready to be spread, e.g., about 24 hours later. An Elcometer 4340 Automatic Film Applicator was used to spread the polymer solution onto a 10×12 inch glass plate. The polymer solution was poured into a strip several millimeters from the glass plate and the spreading bar in order to avoid the formation of air bubbles. After the polymer solution was poured onto the glass plate, the film applicator was used to evenly spread the solution. After the solution was spread, it was allowed to sit for 30 seconds before being placed into a water bath at room temperature. In the water bath, the phase inversion took place and the polymer precipitated out of the solution forming a membrane.

The membrane casting solution compositions that were evaluated first consisted of 15% weight PVDF in NMP with and without a PVP additive (1% weight of PVDF). An example of calculation to prepare a polymer solution of PVDF by weight (e.g., 15% be weight) is shown below:

$$\frac{(100 \text{ mL solvent})\left(\frac{1.033 \text{ g}}{\text{mL } NMP}\right)}{0.85} = 121.5294 \text{ g}$$

$$121.5294(0.15) = 18.2294 \text{ g } PVDF$$

An example of calculation for addition of a PVP additive (e.g., 1% of PVDF weight) into the PVDF solution is shown herein: 18.2294(0.01)=0.18 g PVP for 15% weight PVDF The PVDF/NMP solution was spread into three thicknesses of 100 μm, 130 μm, and 175 μm. However, the PVDF/NMP/PVP solution congealed to a gelatinous form after sitting overnight and was unfit to spread. The permeate flow (e.g., a flow of fluid crossing through the CNT-polymer hybrid membrane filter) of the PVDF membrane was evaluated with ultrapure water in a flow filtration system (e.g., as shown in FIG. 1A). The evaluation demonstrated that the permeate flow of the synthesized membrane was ~50 LMH/bar (i.e., ~50 L/m²/h at 14.5 psi). Depending on the porosity of the CNT membranes, in some embodiments, this permeate flow could be too low for the PVDF membrane to act as the separator between the CNT films in the CNT-polymeric hybrid membrane because it could slow the flow of water through the carbon nanotubes. The results of the permeate flow evaluation under various conditions are shown in Appendix A.

However, the porosity and/or size of pores in a PVDF membrane can be increased to increase the permeate flow. For example, PVDF membranes can be modified through dissolution temperatures, solvent mixtures, low molecular weight additives, high molecular weight additives, and coagulation conditions. Increasing the dissolution temperature of the polymer-solvent solution had been reported to increase the size of pores in membranes (Liu F. et al. "Progress in the production and modification of PVDF membranes" Journal of Membrane Science (2011) 375: 1-27). Additionally, the solvent, dimethyl acetamide (DMAc), was previously reported to minimize the plane and thickness shrinkage ratio of the PVDF membrane (Wu L. et al. "Poly(vinylidene fluoride)/polythersulfone blend membranes: Effects of solvent sort, polyethersulfone and polyvinylpyrrolidone concentration on their properties and morphology" Journal of Membrane Science (2006) 285: 290-298). Certain mixtures of solvents, such as 60% weight trimethyl phosphate (TEP)-40% weight DMAc, that are used in producing the polymer-solvent solution were previously reported to increase the precipitation rate of the membrane which resulted in less membrane shrinkage, thus higher porosity (Li Q. et al. "Effects of mixed solvents and PVDF types on performances of PVDF microporous membranes." Journal of Applied Polymer Science (2010) 115: 2277-2287. It has also been reported that increasing the temperature of the coagulation bath resulted in larger pores (Lin D-J. et al. "Strong effect of precursor preparation on the morphology of semicrystalline phase inversion poly(vinylidene fluoride) membranes" Journal of Membrane Science (2006) 274: 64-72. Previous reports on polyvinylpyrrolidone (PVP) with molecular weights of 10K, 46K, and 360K indicates that with high molecular weight additives such as PVP, the higher the molecular weight, the larger the pores. However, as molecular weight increased, the amount of PVP washed out during membrane formation decreased. See, e.g., Jung B. et al. "Effect of molecular weight of polymeric additives on formation, permeation properties and hypochlorite treatment of asymmetric polyacrylonitrile membranes." Journal of Membrane Science (2004) 243: 45-57. Accordingly, in one embodiment, a PVP of 40K was selected use as an additive in the polymer-solvent mixture.

Another strategy to increase porosity can include the use of a lower percent weight of polymer. Without wishing to be bound by theory, a higher polymer weight percent in the polymer-solvent solution can generally result in a mechanically stronger membrane. Thus, decreasing the weight percent of PVDF in the polymer-solvent solution to 10% or 12% can result in a membrane with lower mechanical strength than the 15% weight PVDF solution, but potentially with higher permeate flow (Maximous N. et al. "Characterization and performance of $Al_2O_3$/PES membrane for wastewater filtration" Journal of Membrane Science (2009) 341: 67-75). However, weaker PVDF membrane can be compensated by supporting it on either side by a carbon nanotube membrane and an additional mesh support, if necessary, in a CNT-polymer hybrid membrane filter as described herein.

Evaporation time is another process parameter that can affect the membrane porosity. The evaporation time is the amount of time taken between spreading the polymer solution on the glass plate and then submerging it in the coagulation bath. It has been reported that a longer evaporation time resulted in decreased deionized water (DIW) permeation. Id. In the production of the 15% weight PVDF membrane, the evaporation time was about 30 seconds. It has also been reported that the DIW permeation of the membrane increased by a factor of two when the evaporation time was decreased from about 30 seconds to about 15 seconds. Thus, without wishing to be bound by theory, reduced evaporation times can result in larger pore size.

Accordingly, the membrane compositions consisted of a PVDF/DMAc solution with 15% weight PVDF and a PVDF/DMAc/PVP solution with 15% weight PVDF and a PVP additive (1% weight of PVDF) were next evaluated. Both solutions congealed during the mixing process. It was thus next sought to determine if decreasing the percent weight of polymer could reduce coagulation. To this end, the membrane compositions consisted of a PVDF/DMAc solution with 10% weight PVDF and a PVDF/DMAc/PVP solution with 10% weight PVDF and a PVP additive (1% weight of PVDF) were assessed. However, both solutions congealed during the mixing process.

In other embodiments, a commercial polymeric membrane can be selected for use in the hybrid membrane filter. The commercial PVDF membranes with Molecular Weight Cut-Offs (MWCO) of 100,000 and 120,000 Daltons were chosen for evaluation. MWCOs of 100,000 and 120,000 Daltons correspond to pore sizes of 0.05 and 0.1 micron, respectively. The permeate flows of the two membranes were evaluated. An example of permeate flow calculation is shown herein:

$$\frac{\text{vol. filled}}{\text{time} \times \text{area}} \times \frac{L}{1000 \text{ mL}} \times \frac{3600 \text{ s}}{\text{hr}} \times \frac{10^6 \text{ mm}^2}{\text{m}^2}$$

For example, the first measurement in Table 9 corresponds to a permeability of $$\frac{2 \text{ mL}}{33 \text{ s} \times \pi \left(\frac{43 \text{ mm}}{2}\right)^2} \times \frac{L}{1000 \text{ mL}} \times \frac{3600 \text{ s}}{\text{hr}} \times \frac{10^6 \text{ mm}^2}{\text{m}^2} \approx 150 \frac{L}{\text{m}^2 \text{h}}$$

*43 mm is the effective filtration area in the 47 mm dead-end flow device (e.g., as shown in FIG. 1A)

The results are recorded in Tables 9 and 10. The results indicated that the membrane with the MWCO of 120,000 Da, because of its higher permeate flow relative to the other PVDF membranes of lower MWCOs, was more appropriate for use as the separator between the two CNT films in the CNT-polymer-CNT hybrid membrane, as it did not significantly add resistance to water flux.

TABLE 9

Permeate Flux Evaluation of PVDF Membrane with 100,000 Dalton MWCO Volume

| Volume (mL) | Hour | Time (s) | Permeate Flow (L/m²h) | Pressure (psi) |
|---|---|---|---|---|
| 2 | 11:40 | 33 | 150 | 14.5 |
| 2 | 11:45 | 41 | 121 | 14.5 |
| 2 | 11:50 | 25 | 198 | 14.5 |
| 2 | 11:55 | 29 | 171 | 14.5 |
| 2 | 12:00 | 29 | 171 | 14.5 |
| 2 | 12:05 | 29 | 171 | 14.5 |
| 2 | 12:10 | 29 | 171 | 14.5 |
| 2 | 12:15 | 28 | 177 | 14.5 |
| 2 | 12:20 | 28 | 177 | 14.5 |
| 2 | 12:25 | 28 | 177 | 14.5 |
| 2 | 12:30 | 28 | 177 | 14.5 |
| 2 | 12:35 | 28 | 177 | 14.5 |
| 2 | 12:40 | 29 | 171 | 14.5 |
| Average | | 29.5 | 169.9 | 14.5 |

TABLE 10

Permeate Flux Evaluation of PVDF Membrane
with 120,000 Dalton MWCO Volume

| Volume (mL) | Hour | Time (s) | Permeate Flow (L/m²h) | Pressure (psi) |
|---|---|---|---|---|
| 5 | 1:40 | 10 | 1239 | 14.5 |
| 5 | 1:45 | 10 | 1239 | 14.5 |
| 5 | 1:50 | 11 | 1127 | 14.5 |
| 5 | 1:55 | 10 | 1239 | 14.5 |
| 5 | 2:00 | 10 | 1239 | 14.5 |
| 5 | 2:05 | 10 | 1239 | 14.5 |
| 5 | 2:10 | 10 | 1239 | 14.5 |
| 5 | 2:15 | 10 | 1239 | 14.5 |
| 5 | 2:20 | 10 | 1239 | 14.5 |
| 5 | 2:25 | 10 | 1239 | 14.5 |
| 5 | 2:30 | 11 | 1127 | 14.5 |
| 5 | 2:35 | 10 | 1239 | 14.5 |
| 5 | 2:40 | 10 | 1239 | 14.5 |
| Average | | 10.2 | 1222 | 14.5 |

In some embodiments, it can be desirable to have the PVDF membrane with pore sizes on the order of 1 µM. In other embodiments, the PVDF membrane can have a pore size and/or porosity that allows a flux greater than or equal to that of the CNT film in order to be an effective polymeric membrane in the CNT-polymer-CNT hybrid membrane. Without wishing to be bound by theory, a PVDF membrane with a comparable permeate flux to, or a greater permeate flux than the CNT film, can produce a smaller resistance to the flow through the CNT-polymeric hybrid membrane. The flux through the PVDF membrane and CNT film was evaluated with a driving pressure of 5 psi. The flux of the PVDF was determined to be only slightly lower than that of the CNT film as shown in Tables 11 and 12.

Table 11. Permeate Flux Evaluation of CNT film

Error! Objects Cannot be Created from Editing Field Codes.

TABLE 12

Permeate Flux Evaluation of PVDF Membrane
(120,000 Dalton MWCO)

| Volume (mL) | Hour | Time (s) | Permeate Flow (L/m²h) | Pressure (psi) |
|---|---|---|---|---|
| 1 | 1:40 | 6 | 413 | 5 |
| 1 | 1:45 | 6 | 413 | 5 |
| 1 | 1:50 | 5 | 496 | 5 |
| 1 | 1:55 | 6 | 413 | 5 |
| 1 | 2:00 | 6 | 413 | 5 |
| 1 | 2:05 | 6 | 413 | 5 |
| 1 | 2:10 | 6 | 413 | 5 |
| 1 | 2:15 | 5 | 496 | 5 |
| 1 | 2:20 | 5 | 496 | 5 |
| 1 | 2:25 | 6 | 413 | 5 |
| 1 | 2:30 | 6 | 413 | 5 |
| 1 | 2:35 | 5 | 496 | 5 |
| 1 | 2:40 | 6 | 413 | 5 |
| Average | | 5.7 | 439 | 5 |

Preparation of a CNT-polymer-CNT hybrid membrane filter. To produce the CNT-polymer-CNT hybrid membrane, an 11×17 cm CNT film 5616, 5618 was pressed onto both sides of a 12×18 cm PVDF membrane 5614. The pressed CNT-polymeric hybrid membrane can allow better and more efficient electrical conductivity. In some embodiments, the CNT films and PVDF membrane can remain separate without pressing and the O-rings in the cross-flow device can keep the separate membranes in place. A Carver laboratory press was used to press the CNT-polymer-CNT membrane, e.g., with parchment paper 5620 on either side to prevent the CNT films from sticking onto the press. FIG. 56C illustrates how the separate pieces of CNT film 5616, 5618, PVDF membrane 5614, and parchment paper 5620 were stacked before placement in the press.

The amount of force used to press the parchment paper-CNT-PVDF was evaluated. The CNT-PVDF-CNT was initially pressed with 1 metric ton for 5 minutes. When the parchment paper was removed from the CNT-polymeric hybrid membrane, a relatively thick layer of the CNT film remained on the parchment paper. To minimize the thickness of the CNT film left on the parchment paper, pressing was completed at 0.5 and 0.25 metric tons for 5 minutes. The 0.25 metric ton press resulted in a well-assembled CNT-polymer-CNT hybrid membrane and a negligible layer of CNT film left on the parchment paper. The results are described in Table 13 in FIG. 65.

The pressing force required to press a CNT-polymer-CNT hybrid membrane can vary with the size of the hybrid membrane and/or the level of moisture in the PVDF membrane. The optimal pressing force determined for the smaller samples was not applicable to larger samples. For example, the parchment paper and 11×17 cm sheets of CNT were placed on either side of a dry 12×18 cm PVDF membrane and pressed with 0.25 metric tons for 5 minutes. When the parchment paper, CNT film, and membrane were exposed to the force of 0.25 metric tons, the CNT did not press onto the PVDF membrane, but rather the parchment paper. Other than the size of the membranes and CNT sheets, another noted difference between the samples of different sizes was the level of moisture in the PVDF membrane. When the smaller samples were pressed, the PVDF membranes had just been removed from purified water and dried with a cloth. The PVDF membrane used in the larger samples was relatively dry. To determine if the level of moisture in the PVDF membrane affects the pressing outcome, a PVDF membrane used in the larger samples had been soaking in purified water and dried with a cloth immediately before pressing. Under 0.25 metric tons of force for 5 minutes, the CNT still did not press fully onto the PVDF membrane. The force was progressively increased until it was determined that 1 metric ton was adequate to press the larger CNT film onto the PVDF membrane, while allowing the parchment paper to be peeled cleanly from either side of the CNT-polymeric hybrid membrane. A thinner layer of CNT film was left on the parchment paper than observed in the smaller samples.

Incorporation of electrochemical components into a cross-flow filter device. The electrodes were designed in Solid Works and then produced by the Harvard Scientific Instrument Shop. Two identical electrodes were cut from titanium shim (~130 µm thick). The exemplary Solid Works drawing for the electrodes is shown in FIG. 57A. The electrodes were designed such that they were positioned between the O-rings on the one side of the cross flow device and press against the CNT surfaces on both sides of the CNT-polymer-CNT hybrid membrane. A tab 5702 from each of the two electrodes extends beyond the side of the device, allowing for DC power supply to be connected to the electrodes. It was evident that the electrodes made contact with the surface of the CNT-polymer-CNT hybrid membrane, because, in some embodiments, their shape was indented into the CNT film.

I. Leakage Prevention: When the original cross-flow device was developed, only four bolts were used (one in each of the corners) to fasten the device closed. However, the cross-flow device presented herein had been scaled-up from a smaller original model and although four bolts were sufficient to fasten the smaller device, the four bolts did not suffice in completely fastening the larger device for higher throughput. With only four bolts in the larger device, the slight gap in the middle of the longer sides of the device resulted in the observed leaks. Leakage is an issue in the original design of the cross-flow device because it affects the water pressure that the system exerts on the membrane. In order to resolve the issue, additional bolts were added in the center along each of the four sides of the device and operation of the device with a total of at least eight bolts along the four sides (including the corners) of the device did not have any leakage observed. FIG. 57B illustrates the positions of the bolts used to fasten the cross-flow device.

In some embodiments, to provide additional preventive measures against potential leakage, the electrodes were designed to disrupt the seal as minimally as possible by positioning between the O-rings, because, without wishing to be bound by theory, the O-rings can contain extra thickness created by the addition of the electrodes. Operation of the electrochemically modified device at a water pressure of at least 6 bars showed that the device did not leak, and the electrodes remained in place between the O-rings.

II. Short-Circuit Prevention: Another concern taken into account when adapting the cross flow device for electrochemistry is short-circuiting the electrodes. The electrodes were designed such that the insulating membrane placed between them could keep them separated. The original cross-flow device contained two metal cylindrical pegs in one half of the device that fit into two holes on the other half of the device to keep the halves aligned. The position of the metal pegs in the original cross-flow device can be observed in FIG. 57C as indicated by acrylic pegs therein. FIG. 57C is a schematic that shows the side view of an arrangement of the electrochemical cross-flow device, electrodes, and CNT-polymer-CNT hybrid membrane.

The original metal pegs can align the two sides of the device and hold the membrane in place in a simple cross-flow device without incorporation of electrochemistry. However, the original metal pegs caused the electrodes (for electrochemical reactions) to short circuit and thus were replaced with acrylic pegs. To evaluate if the electrodes were short-circuiting, the DC power supply was used to monitor the current flowing between the electrodes. Initially, the electrodes were short circuiting. It was speculated that the electrodes were short-circuiting at the point where the holes were punched in the membrane. The holes were slightly larger than the acrylic pegs and therefore permitted the titanium electrodes to touch.

To solve the short-circuiting issue, silicone washers were designed to separate the electrodes. The outer diameter of the washer was 7 mm and the inner diameter was 5 mm such that it fit snuggly around the acrylic peg. When the modified cross-flow device was operated with the silicone washers, no short-circuiting was detected. However, in some embodiments, at a pressure of 2 bars, the device began to leak around the electrode tabs 5702. Thus, the washers could be used in some embodiments of the device operating at a pressure lower than 2 bars. An alternative method to solve the short-circuiting issue can have the titanium coated with a thin layer of insulating material (e.g., nail polish) around the holes in the electrodes where the metal could potentially touch. Using such alternative method enabled operation of the device without issues of short-circuiting and leakage.

FIG. 58 shows an exemplary design of an electrochemical carbon nanotube cross-flow filter device. To operate an electrochemical cross-flow device, a cross-flow pumping and monitoring system, and a DC power supply are used together with the cross-flow device comprising the CNT-polymer-CNT hybrid membrane and the electrodes. The device, shown in FIG. 58, is operated with the anode contacting the feed solution (or the input fluid) and the cathode contacting the permeate solution (or the filtered fluid).

Example 18

An Exemplary Electrochemical Carbon-nanotube Cross-flow Filtration System

In one embodiment, a standard cross-flow filtration pumping and monitoring system was used in the electrochemical cross-flow filtration system. An exemplary filtration system presented herein includes an electrochemical cross-flow device (5) and one or more of the following components, e.g., but not limited to, water reservoir (1), water pump (2), influent tube (3), concentrate or recirculating tube (4), permeate tube (6), permeate flow meter (7), differential pressure sensor (8), pressure valve (9), and permeate flow sensor (10). The components of the system are labeled in FIG. 59 by numeric references. The system pumps the feed (or input fluid) from the reservoir to the electrochemical cross-flow device and recycles the fluid that does not permeate through the hybrid membrane filter back into the reservoir.

I. DC Power Supply: A standard DC power supply can be used to apply a voltage to the electrodes. The positive lead is clipped to the anodic Ti connector to the CNT film that is on the feed (input fluid) side of the membrane filter and the negative lead is clipped to the cathodic Ti connector to the CNT film that contacts the permeate (or filtrate) side of the membrane filter.

II. Electrochemical cross-flow device: The electrochemical cross-flow device, in one embodiment, consists of two pieces of acrylic that are designed for optimal cross-flow filtration and screwed together using 8 nuts and bolts. The device is designed such that a CNT-polymer-CNT membrane is positioned between the two pieces of acrylic and is sealed by O-rings after tightening the nuts and bolts, e.g., as shown in FIG. 57C. The feed water (or input fluid) enters the electrochemical cross-flow filter device through the inlet 5608 (e.g., via the influent tube) and either permeates through the membrane or is recycled back to the water reservoir through the first outlet 5610 (e.g., via the concentrate tube or the recirculating tube). Water that flows through the membrane exits the cross-flow device through the second outlet 5612 (e.g., via the permeate flow tube). The electrochemical cross-flow filtration device connected with one or more tubings is depicted in FIG. 60A. Exemplary SolidWorks drawings of a top half and a bottom half of a cross-flow device are shown in FIGS. 61A-61B.

III. CNT-Polymer-CNT Hybrid Membrane. The CNT-polymer-CNT hybrid membrane, in one embodiment, was made using a PVDF membrane with a 120,000 Dalton MWCO. This membrane was selected because its high permeate flow would not significantly reduce the flux of the feed (input fluid) through the CNT-polymer-CNT hybrid membrane. As shown earlier in Tables 11 and 12, the permeate flux evaluations for the PVDF membrane and CNT film at 5 psi indicated that the flux of the PVDF is only slightly lower than that of the CNT film.

In one embodiment, the CNT-polymer-CNT hybrid membrane was assembled with a laboratory press. An 11×17 cm rectangle of CNT film was attached to either side of a 12×18 cm rectangle of PVDF membrane. The parchment paper, CNT film, and PVDF membrane were stacked as depicted in FIG. 56C and pressed with ~1 metric ton for about 5 minutes. This ensured that the CNT film was firmly attached to both sides of the PVDF membrane without losing significant CNT film to the parchment paper. Two holes were punched in the membrane where the membrane fits around the acrylic pegs.

IV Electrodes: In one embodiment, titanium electrodes were used as an anodic connector and a cathodic connector. The cross-flow filtration device with the electrodes in place is depicted in FIG. 57B. The electrodes were cut from thin titanium foil (~130 μm thick) in order to reduce the likelihood of disturbing the seal created by the O-rings. It has been verified that the electrodes did not interfere with the seal and the electrodes made contact with the CNT surfaces of the membrane. Another important aspect of the electrode design is the filleting of the corners. The rounded corners not only enabled the electrodes to fit between the O-rings, but also allowed for easier electrode production. The Solid-Works drawing of an exemplary electrode design is shown in FIG. 57A.

Example 19

Evaluation of Fluxes Through an Electrochemical Carbon-nanotube Cross-flow Filtration Device Described Herein The electrochemical cross-flow water filtration device was evaluated with respect to the permeate flux, natural surface water treatment for drinking water production, and the fouling potential. To assess the impact of the electrochemistry, the cross-flow device was operated with the CNT-polymer-CNT hybrid membrane under applied voltages of 0, 1, 2, and 3 V. The device was evaluated with both ultrapure and natural water. The fluid flux was determined using permeate flow evaluations in the cross flow device. The efficacy of the water treatment process was assessed with a turbidity measurement to determine particle content, a total coliform measurement to determine microorganism content, and a UV-VIS analysis to determine organic content. The control of fouling was evaluated through a determination of the ratio of natural water to ultrapure water fluxes. For comparison, the flux, the treatment of natural water, and the level of fouling was evaluated for the PVDF membrane (with no CNT film attached) as well.

Flux Evaluation: Permeate flux evaluations in the cross-flow filtration system were used to determine the flux of the water through the electrochemical cross-flow device. The device was operated for 15 minutes at each voltage (0, 1, 2, and 3 V) in order to establish a permeate flux range for the CNT-polymer-CNT hybrid membrane within the electrochemical cross-flow device. Four CNT-polymer-CNT hybrid membranes, which are referred herein to as Membrane 1, Membrane 2, Membrane 3, and Membrane 4, were evaluated separately to determine the variability between the permeate flow of different membranes. The data from the permeate flow evaluations under various exemplary conditions are shown in Appendix B. Permeate flow at 0, 1, and 2 V was measured with a permeate flow scale that corresponded to a flow rate given in mL/hour. At 3 V, due to bubbles affecting the consistency of the permeate flow scale readings, the permeate flow was measured by hand using a graduated cylinder and stopwatch.

With Membrane 1 and ultrapure water, the cross-flow device achieved a flux of ~350 LMH/bar at 0 V, ~520 LMH/bar at 1 V, ~465 LMH/bar at 2 V, and ~115 LMH/bar at 3 V. With Membrane 2 and ultrapure water, the cross-flow device achieved a flux of ~110 LMH/bar at 0 V, ~120 LMH/bar at 1 V, ~115 LMH/bar at 2 V, and ~60 LMH/bar at 3 V. With Membrane 3 and ultrapure water, the cross-flow device achieved a flux of ~72 LMH/bar at 0 V, ~78 LMH/bar at 1 V, ~70 LMH/bar at 2 V, and ~42 LMH/bar at 3 V. With Membrane 4 and ultrapure water, the cross-flow device achieved a flux of ~260 LMH/bar at 0 V, ~285 LMH/bar at 1 V, ~262 LMH/bar at 2 V, and ~73 LMH/bar at 3 V. Although the absolute fluxes varied among the four membranes, the same trend of overall flux vs. applied voltage was observed. When a voltage of 1 V was applied to the electrodes, the flux in LMH/bar increased relative to 0V. When the voltage was increased to 2 V, the LMH/bar decreased slightly relative to IV and when the voltage was increased to 3 V, the LMH/bar decreased drastically. Without wishing to be bound by theory, the variability in the fluxes of the different membranes can be a function of the amount of ethanol used to pre-wet the CNT-polymer-CNT hybrid membrane, i.e., a lower flux indicates insufficient pre-wetting. Carbon nanotubes are hydrophobic and thus are generally need to be wetted with the lower surface tension ethanol before use to allow water to permeate into the CNT film pores. If not sufficiently pre-wetted with ethanol, capillary forces can strongly resist the flux of water.

The bubbles that were formed at 3 V led to determine whether reversing the anode and the cathode would decrease the production of bubbles. When a high enough voltage is applied to the electrodes, the anode potential increases past the thermodynamic limit for water oxidation and oxygen production yielding bubbles ($H_2O + 4h^+ \rightarrow 4H^+ + O_2$; $E°=1.23$ V). If the anodic CNT film was on the permeate side, the oxygen produced could be theoretically carried off with the permeate. However, such phenomenon was not observed. Reversing the anode and cathode decreased the flux of water at all voltages. With Membrane 1 and ultrapure water, the cross-flow device achieved a flux of ~235 LMH/bar at 1 V, ~235 LMH/bar at 2 V, and ~85 LMH/bar at 3 V with the anode and cathode reversed. This decreased flow rate at all potentials was likely due to the production of hydrogen at the cathode, and therefore bubble production, which can occur at lower applied voltages ($2H_2O + 2e^- \rightarrow H_2 + 2HO^-$; $E°=0$ V) than oxygen production. The exemplary data from these evaluations are shown in Appendix B.

The flux through the device was then evaluated with natural water from Fresh Pond and CNT-polymer-CNT Membrane 3. The exemplary data obtained from these evaluations are shown in Appendix C. With Membrane 3 and natural water, the cross-flow device achieved a flux of ~160 LMH/bar at 0 V, ~170 LMH/bar at 1 V, ~170 LMH/bar at 2 V, and ~75 LMH/bar at 3 V. The results indicate that the flux of the natural water through the CNT-polymer-CNT membrane was 180-240% of that of the ultrapure water through the membrane, which is surprising. The flow rate of natural water through a membrane is typically less than or equal to the flow rate of ultrapure water because natural water has more suspended particles than ultrapure water.

When Membrane 4 was evaluated, it was realized that the silicon in the pressure sensor could be piezoelectric, thus sensitive to the charge that was likely present in the water due to the electrochemistry. For this reason, the pressure was stabilized during the evaluation at 0 V and then kept constant throughout the rest of the experiment (at 1, 2, and 3 V). With Membrane 4 and natural water, the cross-flow device achieved a flux of ~377 LMH/bar at 0 V, ~400 LMH/bar at 1 V, ~406 LMH/bar at 2 V, and ~175 LMH/bar at 3 V. The results indicate that similar to Membrane 3, the flux of the natural water through the CNT-polymer-CNT membrane was 140-240% of that of the ultrapure water through the membrane (as shown in FIG. 63). The majority of suspended particles present in natural water may carry a negative charge (Hunter K. A and Liss P.S. "Organic Matter and the Surface Charge of Suspended Particles in Estuarine Waters," Limnology and Oceanography (1982) 27: 322-335). The increased flux can be a result of the charged anodic CNT film attracting the negative charges present in the natural water and effectively drawing the water into the membrane. It should be recognized that the flux of the hybrid membrane increased with natural water when no voltage was applied. This is likely due to residual charge left on the membrane from the evaluation with ultrapure water at 3 V.

Additionally or alternatively, the increase in flux observed between the ultrapure and natural water evaluations could be explained by the effect of the ethanol on wetting the CNT film. Membrane 3 was evaluated with natural water four days after it was evaluated with ultrapure water. The membrane was wetted with ethanol before the ultrapure water evaluation and was then placed in a water bath until it was evaluated with the natural water. It is possible that after the membrane was wetted with ethanol, the permeability of the membrane continued to increase over time due to the effects of the continued ethanol wetting. Accordingly, it was next sought to determine if pre-wetting of the membrane followed by placing in a water bath could increase the flux through the membrane, e.g., by having a membrane wetted 24 hours prior to the natural water permeate flux evaluation, initially evaluated, and then evaluated again with natural water 24 hours after the initial evaluation.

The evaluation of CNT-polymer-CNT Membrane 4 with natural water 24 hours after the initial evaluation indicated that the permeability of the membrane did increase with time, presumably due to continued ethanol wetting. The permeate flux of natural water through Membrane 4 during this evaluation was ~460 LMH/bar at 0 V, ~480 LMH/bar at 1 V, ~490 LMH/bar at 2 V, and ~345 LMH/bar at 3 V. The exemplary data obtained from these evaluations are shown in Appendix D. In the natural water evaluation of Membrane 3 and two natural water evaluations of Membrane 4, optimal fluxes are achieved through the CNT-polymer-CNT hybrid membrane at applied voltages of 1 and 2 V.

The flux of the unmodified PVDF 1 membrane (i.e., with no CNT attached on either side) and ultrapure water was determined to be ~1100 LMH/bar. The ratio of the LMH of natural water to the LMH of ultrapure water was determined to be 0.86.

In the second evaluation of the PVDF membrane (i.e., with no CNT attached on either side), the flux of ultrapure water through PVDF 2 was found to be ~650 LMH/bar. The flux of natural water through PVDF 2 was found to be ~530 LMH/bar. The ratio of the LMH/bar of natural water to the LMH/bar of ultrapure water was determined to be 0.82. The fouling ratio of the CNT-polymer-CNT hybrid membrane ranged from 1.41 to 2.40, higher than that of the PVDF membrane, which indicates that the CNT-polymer-CNT hybrid membrane controls fouling to a greater extent than the PVDF membrane alone.

In order for the electrochemical cross-flow filtration device to be feasible in producing sterilized drinking water, it is desirable to have a filtration device with a flux of at least 1 L per hour. As shown in FIG. 62A, the flow rate of natural water through the CNT-polymer-CNT hybrid Membrane 3 and Membrane 4 (at applied voltages of 0, 1, and 2 V) was ~1 L/hr or higher. This finding indicates that the electrochemical cross-flow filtration device described herein can be feasible to produce sterilized drinking water. In addition, the finding can also indicate that an even greater flux can be achieved with increased pressure.

Further, the flow rate demonstrated by one embodiment of the electrochemical cross-flow device is about 10 times greater than that achieved in the dead-end flow device (e.g., as shown in FIG. 1A), for example, of ~90 mL/hr.

Example 20

Evaluation of the Effectiveness of Treating Water with an Electrochemical Cross-flow Device Described Herein Samples of the effluent (filtered fluid) were obtained during operation of the device with two CNT-polymer-CNT hybrid membranes (Membrane 3 and 4) at 0, 1, 2, and 3 V. Samples were collected with an electrode configuration where anode contacts the feed solution and the cathode contacts the permeate solution. Samples of permeate solution (filtered solution) after filtration through the unmodified PVDF membranes (PVDF 1 and 2: with no CNT attached on either side) were also obtained. Turbidity, UV-VIS, and coliform evaluations were performed on all samples, as well as a sample of untreated natural water, for comparison.

Turbidity Measurement: Turbidity is a measure of the amount of light scattered by a fluid sample. The amount of scattered light reflects the amount of suspended particulate impurities in a sample. Particulate impurities must be removed from water in order to meet the first objective of water engineering, producing safe and aesthetically pleasing drinking water. Turbidity is also a surrogate measurement for suspended microorganisms such as bacteria and viruses, which can also be considered 'particles'. Turbidity is measured with a nephelometer, which is an instrument that irradiates the sample with visible light and detects the amount of light scattered. The units of turbidity are Nephelometric Turbidity Units (NTU). The Environmental Protection Agency (EPA) states that for drinking water, turbidity must be less than or equal to 0.3 NTU 95% of the time and must never exceed 1 NTU.

The turbidity was measured for the samples of natural water treated with the CNT-polymer-CNT hybrid membrane and the PVDF membrane (with no CNT attached on either side), as well as a sample of untreated natural water, for comparison. The results of the turbidity analysis are shown in Table 14 or FIG. 62B.

TABLE 14

Turbidity analysis results

| Sample | Turbidity (NTU) Membrane 3 | Turbidity (NTU) Membrane 4 |
| --- | --- | --- |
| Untreated Fresh Pond (natural water) | 1.007 | 0.610 |
| CNT-polymer-CNT hybrid effluent at 0 V | 0.143 | 0.107 |
| CNT-polymer-CNT hybrid effluent at 1 V | 0.097 | 0.093 |
| CNT-polymer-CNT hybrid effluent at 2 V | 0.130 | 0.083 |
| CNT-polymer-CNT hybrid effluent at 3 V | 0.353 | 0.236 |
| PVDF (no CNT attached on either side) effluent | 0.133 (PVDF 1) | .130 (PVDF 2) |

The results indicate that the CNT-polymer-CNT hybrid membrane coupled with a voltage of 1 V or 2 V reduces turbidity of the natural water to a greater extent than the PVDF membrane alone. Membrane 3 attained a 90.4% removal efficiency at 1 V and an 87.1% removal efficiency at 2 V, whereas PVDF 1 attained an 86.8% removal efficiency. The turbidity reduction of the CNT-polymer-CNT hybrid Membrane 3 increased by 5.4% from 0 V to 1V, decreased by 3.7% from 1 V to 2 V, and then decreased by 25.4% from 2 V to 3 V. Membrane 4 attained an 84.8% removal efficiency at 1 V and an 86.4% removal efficiency at 2 V, whereas PVDF 2 attained a 78.7% removal efficiency. The turbidity reduction of the CNT-polymer-CNT hybrid Membrane 4 increased by 2.7% from 0 V to 1V, increased by 1.9% from 1 V to 2 V, and then decreased by 29.1% from 2 V to 3 V. In comparing the results of the hybrid membrane (CNT-polymer-CNT) at 1V and 2 V to the results of the PVDF membrane (no CNT attached on either side) and the hybrid membrane at 0 V, it appears that the electrostatic attraction produced on the anodic carbon nanotube surface at 1 V and 2 V improves turbidity reduction. The removal of turbidity from the natural water with the hybrid membrane and an applied voltage of 3 V was lower than the removal with the hybrid membrane and applied voltages of 1 and 2 V. Without wishing to be bound by theory, this trend could be explained by the separation of carbon nanotube particles from the CNT-polymer-CNT hybrid membrane as the voltage is increased beyond 2 V.

As shown in FIG. 62B, the filtered water produced by the electrochemical cross-flow device comprising the CNT-polymer-CNT hybrid membrane can achieve the turbidity standard set forth by EPA for drinking water with voltages of about 0V, 1V or 2V.

Coliform Measurement: A coliform measurement gives an indication of the amount of potential pathogens in a sample of water. Preventing the transmission of waterborne pathogens is an important objective in water engineering. The coliform measurement was obtained with the IDEXX Quanti-Tray/2000 (IDEXX Laboratories Inc.). To take the coliform measurement, a 100 mL water sample is mixed with a specified reagent, poured into a 97-well tray and sealed, and then incubated overnight at 35° C. If coliform are present, they will partially metabolize the reagent resulting in the production of a colored indicator. The quantity of coliform is determined by the number of wells with a color change. The detection limit range of coliform quantification using this assay can span from one to 2,419 bacteria per 100 mL.

The coliform count was obtained for the samples of natural water treated with the CNT-polymer-CNT hybrid membrane (Membrane 3 and Membrane 4) and the PVDF membrane (PVDF 1 and PVDF 2), as well as a sample of untreated natural water, for comparison. The results of the coliform measurement are shown in Table 15.

TABLE 15

Coliform measurement results

| Sample | Total Coliform Count (per 100 mL) Membrane 3 | E. Coli Count (per 100 mL) Membrane 3 | Total Coliform Count (per 100 mL) Membrane 4 | E. Coli Count (per 100 mL) Membrane 4 |
|---|---|---|---|---|
| Untreated Fresh Pond (natural water) | 21.3 | 6.3 | 21.3 | 6.3 |
| Treated with CNT-polymer-CNT hybrid at 0 V | n/d | n/d | n/d | n/d |
| Treated with CNT-polymer-CNT hybrid at 1 V | n/d | n/d | n/d | n/d |
| Treated with CNT-polymer-CNT hybrid at 2 V | n/d | n/d | n/d | n/d |
| Treated with CNT-polymer-CNT hybrid at 3 V | n/d | n/d | n/d | n/d |
| Treated with PVDF at 0 V | n/d (PVDF 1) | n/d (PVDF 1) | n/d (PVDF 2) | n/d (PVDF 2) |

The coliform count in the natural water was determined to be ~21.3 coliform/100 mL, which included 6.3 E. Coli per 100 mL. In the samples of the treated natural water, the total coliform and E. Coli count was found to be <1 per 100 mL. Both the CNT-polymer-CNT hybrid membrane and PVDF membrane were able to reduce the total coliform and E. Coli count to an undetectable level. Accordingly, the treated water samples can satisfy the drinking water standards.

UV-VIS Analysis: The UV 254 measurement is a measure of the amount of natural organic matter (NOM) in a water sample. This measurement is obtained by measuring the amount of UV light absorbed by a water sample. The three most important species of NOM assessed herein include fulvic acids, humic acids, and humins. The UV 254 measurement is given as an absorbance value A, which relates to concentration of NOM and sample width by Beer's Law, $A = \epsilon cl$, where $\epsilon$ is the extinction coefficient, c is the concentration, and l is the width of the sample.

The UV 254 measurements were obtained for the samples of natural water treated with the CNT-polymer-CNT hybrid membrane (Membrane 3 and Membrane 4) and the PVDF membrane (PVDF 1 and PVDF 2), as well as a sample of untreated natural water, for comparison. The results of the UV 254 analysis are shown in Table 16 and FIG. 64.

TABLE 16

UV 254 Analysis Results

| Sample | UV 254 Measurement Membrane 3 | UV 254 Measurement Membrane 4 |
|---|---|---|
| Untreated Fresh Pond (natural water) | 0.142 | 0.141 |
| Treated with CNT-polymer-CNT hybrid at 0 V | 0.072 | 0.057 |
| Treated with CNT-polymer-CNT hybrid at 1 V | 0.092 | 0.063 |
| Treated with CNT-polymer-CNT hybrid at 2 V | 0.060 | 0.064 |

TABLE 16-continued

UV 254 Analysis Results

| Sample | UV 254 Measurement Membrane 3 | UV 254 Measurement Membrane 4 |
|---|---|---|
| Treated with CNT-polymer-CNT hybrid at 3 V | 0.118 | 0.111 |
| Treated with PVDF at 0 V | 0.136 (PVDF 1) | 0.119 (PVDF 2) |

Even without knowing the exact extinction coefficient of NOM used herein, the UV 254 measurement can be used to monitor trends in overall NOM removal. The results indicate that the CNT-polymer-CNT hybrid membrane (at all applied voltages) outperformed the PVDF membrane in NOM removal. In the evaluation with Membrane 3, the reduction in natural organic matter was highest with the hybrid membrane and a voltage of 2 V. This suggests that at 2 V, the in situ oxidant effectively functions to oxidize organic matter. With Membrane 4, the reduction in natural organic matter was highest with the hybrid membrane and no applied voltage, but essential equal at 0, 1, and 2 volts. This can indicate that a residual charge remained on the membrane from the previous evaluation with ultrapure water at 3 V that was completed immediately before, and/or that the NOM was being removed by adsorption to the high surface area CNTs and many of the adsorption sites were occupied after the previous use. An increase in the effluent UV absorption is determined when the CNT-polymer-CNT hybrid membrane is operated at 3 V, similar to the turbidity results. This can be explained by the separation or degradation of carbon nanotube particles from the CNT-polymer-CNT hybrid membrane as the electrodes are operated at the higher voltage of 3 V.

Regardless, the UV-VIS analysis indicated that at ~0V, ~1V, and ~2V, the CNT-polymer-CNT hybrid membrane can significantly reduce the level of natural organic matter present in the water.

Fouling Assessment. This assessment is a comparison of the ultrapure and natural water, which gives an indication of the extent of membrane fouling. The fouling ratio is obtained by dividing the steady-state flux of natural water through the membrane by the steady-state flux of ultrapure water through the membrane. The exemplary data obtained from these evaluations are shown in Appendix C.

The fouling ratio of the CNT-polymer-CNT hybrid Membrane 3 was found to be 2.21 at 0 V, 2.20 at 1 V, 2.41 at 2 V, and 1.80 at 3 V. The fouling ratio for a membrane is typically less than or equal to 1 because natural water has more suspended particles than ultrapure water and thus the flow of natural water through a membrane should be slower than or equal to the flow of ultrapure water. With Membrane 4, similar results were observed. The fouling ratio of Membrane 4 was found to be 1.45 at 0 V, 1.41 at 1 V, 1.55 at 2 V, and 2.4 at 3 V. Without wishing to be bound by theory, it could be speculated that the residual charge remained on the CNT-polymer-CNT hybrid membrane from the evaluation with ultrapure water at 3 V and thus with 0 V applied, the hybrid membrane was charged. The results indicate that the flux through the charged CNT-polymer-CNT membrane is in fact increased with natural water due to the electrostatic attraction of the negative suspended particles to the anodic CNT The ratio of the LMH of natural water to the LMH of ultrapure water was determined to be 0.86. However, the systems running with ultrapure water and natural water could be operated with different pressures. In the second evaluation of the PVDF membrane (PVDF 2), the ratio of the LMH/bar of natural water to the LMH/bar of ultrapure water was determined to be 0.82. This result indicates that the CNT-polymer-CNT hybrid membrane (fouling ratio of 1.41-2.40) can control fouling to a greater extent than the PVDF membrane alone. Furthermore, the CNT-polymer-CNT hybrid membrane may even be able to increase flow rates.

Various changes and modifications to the disclosed embodiments, which will be apparent to those of skill in the art, may be made without departing from the spirit and scope of the present invention. Further, all patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

REFERENCES FOR EXAMPLES 1 TO 6

(1) Carbon Nanotubes: Advanced Topics in the Synthesis, Structure, Properties and Applications; 111 ed.; Jorio, A.; Dresselhaus, M. S.; Dresselhaus, G., Eds.; Springer-Verlag: Berlin, 2008.
(2) Iijima, S, Nature 1991, 354, 56-58.
(3) Peigney, A.; Laurent, C.; Flahaut, E.; Bacsa, R. R.; Rousset, A. Carbon 2001, 39, 507-514.
(4) Pantano, A.; Parks, D. M.; Boyce, M. C. J. Mech. Phys. Solids 2004, 52, 789-821.
(5) Ebbesen, T. W.; Lezec, H. J.; Hiura, H.; Bennett, J. W.; Ghaemi, H. F.; Thio, T. Nature 1996, 382, 54-56.
(6) Pan, B.; Xing, B. S. Environ. Sci. Technol. 2008, 42, 9005-9013.
(7) Fugetsu, B.; Satoh, S.; Shiba, T.; Mizutani, T.; Lin, Y. B.; Terui, N.; Nodasaka, Y.; Sasa, K.; Shimizu, K.; Akasaka, R.et al. Environ. Sci. Technol. 2004, 38, 6890-6896.
(8) Cai, Y. Q.; Cai, Y. E.; Mou, S. F.; Lu, Y. Q. J. Chromatogr. A 2005, 1081, 245-247.
(9) Hyung, H.; Kim, J. H. Environ. Sci. Technol. 2008, 42, 4416-4421.
(10) Cho, H. H.; Wepasnick, K.; Smith, B. A.; Bangash, F. K.; Fairbrother, D. H.; Ball, W. P. Langmuir 2010, 26, 967-981.
(11) Di, Z. C.; Ding, J.; Peng, X. J.; Li, Y. H.; Luan, Z. K.; Liang, J. Chemosphere 2006, 62, 861-865.
(12) Peng, X. J.; Luan, Z. K.; Ding, J.; Di, Z. H.; Li, Y. H.; Tian, B. H. Mater. Lett. 2005, 59, 399-403.
(13) Wang, J. X.; Jiang, D. Q.; Gu, Z. Y.; Yan, X. P. J. Chromatogr. A 2006, 1137, 8-14.
(14) Brady-Estevez, A. S.; Kang, S.; Elimelech, M. Small 2008, 4, 481-484.
(15) Brady-Estevez, A. S.; Nguyen, T. H.; Gutierrez, L.; Elimelech, M. Water Res. 2010, 44, 3773-3780.
(16) Brady-Estevez, A. S.; Schnoor, M. H.; Vecitis, C. D.; Saleh, N. B.; Elimelech, M. Langmuir 2010, 14975-14982.

(17) Li, X. S.; Zhu, G. Y.; Dordick, J. S.; Ajayan, P. M. Small 2007, 3, 595-599.
(18) Gui, X. C.; Cao, A. Y.; Wei, J. Q.; Li, H. B.; Jia, Y.; Li, Z.; Fan, L. L.; Wang, K. L.; Zhu, H. W.; Wu, D. H. ACS Nano 2010, 4, 2320-2326.
(19) Srivastava, A.; Srivastava, O. N.; Talapatra, S.; Vajtai, R.; Ajayan, P. M. Nat. Mater. 2004, 3, 610-614.
(20) Hinds, B. J.; Chopra, N.; Rantell, T.; Andrews, R.; Gavalas, V.; Bachas, L. G. Science 2004, 303, 62-65.
(21) Wang, X.; Li, W. Z.; Chen, Z. W.; Waje, M.; Yan, Y. S. J. Power Sources 2006, 158, 154-159.
(22) Li, J.; Cassell, A.; Delzeit, L.; Han, J.; Meyyappan, M. J. Phys. Chem. B 2002, 106, 9299-9305.
(23) Gao, B.; Kleinhammes, A.; Tang, X. P.; Bower, C.; Fleming, L.; Wu, Y.; Zhou, O. Chem. Phys. Let. 1999, 307, 153-157.
(24) Li, W. Z.; Liang, C.H.; Zhou, W. J.; Qiu, J. S.; Zhou, Z. H.; Sun, G. Q.; Xin, Q. J. Phys. Chem. B 2003, 107, 6292-6299.
(25) Girishkumar, G.; Vinodgopal, K.; Kamat, P. V. J. Phys. Chem. B 2004, 108, 19960-19966.
(26) Kongkanand, A.; Dominguez, R. M.; Kamat, P. V. Nano Lett. 2007, 7, 676-680.
(27) Park, J.; Choi, W. J. Phys. Chem. C 2009, 113, 20974-20979.
(28) Gooding, J. J.; Wibowo, R.; Liu, J. Q.; Yang, W. R.; Losic, D.; Orbons, S.; Mearns, F. J.; Shapter, J. G.; Hibbert, D. B. J. Am. Chem. Soc. 2003, 125, 9006-9007.
(29) Han, H. Y.; Tachikawa, H. Front. Biosci. 2005, 10, 931-939.
(30) Yang, J.; Wang, J.; Jia, J. P. Environ. Sci. Technol. 2009, 43, 3796-3802.
(31) Wardman, P. J. Phys. Chem. Ref. Data 1989, 18, 1637-1755.
(32) Graham, D. J. Phys. Chem. 1955, 59, 896-900.
(33) Israelachvili, J. N. Intermolecular and Surface Forces, 2 ed.; San Diego Academic Press: London, 1992.
(34) Tizard, H. T. J. Chem. Soc. 1910, 97, 2477-2490.
(35) Tsai, Y. T.; Lin, A. Y. C.; Weng, Y. H.; Li, K. C. Environ. Sci. Technol. 2010, 44, 7914-7920.
(36) Mrowetz, M.; Balcerski, W.; Colussi, A. J.; Hoffmann, M. R. J. Phys. Chem. B 2004, 108, 17269-17273.
(37) Liu, L.; Li, F. B.; Feng, C. H.; Li, X. Z. Appl. Microbiol. Biotechnol. 2009, 85, 175-183.
(38) CRC Handbook of Chemistry and Physics; 79 ed.; Lide, D. R., Ed.; CRC Press LLC: Boston, 1998.
(39) Zhi, J. F.; Wang, H. B.; Nakashima, T.; Rao, T. N.; Fujishima, A. J. Phys. Chem. B 2003, 107, 13389-13395.
(40) Tong, X. L.; Zhao, G. H.; Liu, M. C.; Cao, T. C.; Liu, L.; Li, P. Q. J. Phys. Chem. C 2009, 113, 13787-13792.
(41) Zhao, G. H.; Li, P. Q.; Nong, F. Q.; Li, M. F.; Gao, J. X.; Li, D. M. J. Phys. Chem. C 2010, 114, 5906-5913.
(42) Li, P. Q.; Zhao, G. H.; Cui, X.; Zhang, Y. G.; Tang, Y. T. J. Phys. Chem. C 2009, 113, 2375-2383.
(43) Matyasovszky, N.; Tian, M.; Chen, A. C. J. Phys. Chem. A 2009, 113, 9348-9353.
(44) Park, H.; Vecitis, C. D.; Hoffmann, M. R. J. Phys. Chem. A 2008, 112, 7616-7626.
(45) Park, H.; Vecitis, C. D.; Hoffmann, M. R. J. Phys. Chem. C 2009, 113, 7935-7945.
(46) Gao, J. X.; Zhao, G. H.; Liu, M. C.; Li, D. M. J. Phys. Chem. A 2009, 113, 10466-10473.
(47) Liu, Z.; Zhang, X.; Nishimoto, S.; Jin, M.; Tryk, D. A.; Murakami, T.; Fujishima, A. J. Phys. Chem. C 2008, 112, 253-259.
(48) Vinodgopal, K.; Hotchandani, S.; Kamat, P. V. J. Phys. Chem. 1993, 97, 9040-9044.
(49) Oturan, N.; Panizza, M.; Oturan, M. A. J. Phys. Chem. A 2009, 113, 10988-10993.
(50) Oturan, N.; Zhou, M. H.; Oturan, M. A. J. Phys. Chem. A 2010, 114, 10605-10611.
(51) Borras, N.; Oliver, R.; Arias, C.; Brillas, E. J. Phys. Chem. A 2010, 114, 6613-6621.

REFERENCES FOR EXAMPLES 7 TO 10

[1] M. Elimelech, J. Water Supply Res Technol.-Aqua 2006, 55, 3.
[2] A. S. Brady-Estevez, M. H. Schnoor, C. D. Vecitis, N. B. Saleh, M. Elimelech, Langmuir 2010, 14975.
[3] A. S. Brady-Estevez, S. Kang, M. Elimelech, Small 2008, 4, 481.
[4] T. W. Ebbesen, H. J. Lezec, H. Hiura, J. W. Bennett, H. F. Ghaemi, T. Thio, Nature 1996, 382, 54.
[5] K. P. Drees, M. Abbaszadegan, R. M. Maier, Water Res. 2003, 37, 2291.
[6] Q. Fang, C. Shang, G. H. Chen, J. Environ. Eng.-ASCE 2006, 132, 13.
[7] C. Morita, K. Sano, S. Morimatsu, H. Kiura, T. Goto, T. Kohno, W. Hong, H. Miyoshi, A. Iwasawa, Y. Nakamura, M. Tagawa, O. Yokosuka, H. Saisho, T. Maeda, Y. Katsuoka, J. Virol. Methods 2000, 85, 163.
[8] W. Y. Liang, J. H. Qu, L. B. Chen, H. J. Liu, P. J. Lei, Environ. Sci. Technol. 2005, 39, 4633.
[9] C. A. Martinez-Huitle, E. Brillas, Angew. Chem.-Int. Edit. 2008, 47, 1998.
[10] J. Jeong, J. Y. Kim, J. Yoon, Environ. Sci. Technol. 2006, 40, 6117.
[11] A. M. Polcaro, A. Vacca, M. Mascia, S. Palmas, R. Pompei, S. Laconi, Electrochim. Acta 2007, 52, 2595.
[12] T. Matsunaga, S, Nakasono, T. Takamuku, J. G. Burgess, N. Nakamura, K. Sode, Appl. Environ. Microbiol. 1992, 58, 686.
[13] T. Matsunaga, S, Nakasono, Y. Kitajima, K. Horiguchi, Biotechnol. Bioeng. 1994, 43, 429.
[14] T. Matsunaga, S, Nakasono, S. Masuda, FEMS Microbiol. Lett. 1992, 93, 255.
[15] A. S. Brady-Estevez, T. H. Nguyen, L. Gutierrez, M. Elimelech, Wat. Res. 2010, 44, 3773.
[16] S. Kang, M. Pinault, L. D. Pfefferle, M. Elimelech, Langmuir 2007, 23, 8670.
[17] S. Kang, M. S. Mauter, M. Elimelech, Environ. Sci. Technol. 2008, 42, 7528.
[18] C. D. Vecitis, K. R. Zodrow, S. Kang, M. Elimelech, ACS Nano 2010, 5471.
[19] A. Kongkanand, R. M. Dominguez, P. V. Kamat, Nano Lett. 2007, 7, 676.
[20] Y. Ye, C. C. Ahn, C. Witham, B. Fultz, J. Liu, A. G. Rinzler, D. Colbert, K. A. Smith, R. E. Smalley, Appl. Phys. Lett. 1999, 74, 2307.
[21] W. Z. Li, C. 1-1. Liang, W. J. Zhou, J. S. Qiu, Z. H. Zhou, G. Q. Sun, Q. Xin, J. Phys. Chem. B 2003, 107, 6292.
[22] X. Wang, W. Z. Li, Z. W. Chen, M. Waje, Y. S. Yan, J. Power Sources 2006, 158, 154.
[23] A. Peigney, C. Laurent, E. Flahaut, R. R. Bacsa, A. Rousset, Carbon 2001, 39, 507.
[24] A. J. Bard, M. A. Fox, Accounts Chem. Res. 1995, 28, 141.
[25] H. Park, C. D. Vecitis, M. R. Hoffmann, J. Phys. Chem. C 2009, 113, 7935.
[26] H. Park, C. D. Vecitis, M. R. Hoffmann, J. Phys. Chem. A 2008, 112, 7616.

[27] A. Srivastava, 0. N. Srivastava, S. Talapatra, R. Vajtai, P. M. Ajayan, Nat. Mater. 2004, 3, 610.
[28] M. Elimelech, X. Jia, J. Gregory, R. Williams, Particle Deposition & Aggregation: Measurement, Modelling and Simulation, Reed Elsevier Group, Oxford, 1995.
[29] L. N. Csonka, Microbiol. Rev. 1989, 53, 121.
[30] S. Kang, M. Herzberg, D. F. Rodrigues, M. Elimelech, Langmuir 2008, 24, 6409.
[31] T. Matsunaga, Y. Namba, Anal. Chem. 1984, 56, 798.
[32] K. Magnuson, S. Jackowski, C. O. Rock, J. E. Cronan, Microbiol. Rev. 1993, 57, 522.
[33] N.J. Faergeman, J. Knudsen, Biochem. J. 1997, 323, 1.
[34] C. C. Winterbourn, D. Metodiewa, Free Radic. Biol. Med. 1999, 27, 322.
[35] P. Wardman, J. Phys. Chem. Ref. Data 1989, 18, 1637.
[36] S. B. Liu, L. Wei, L. Hao, N. Fang, M. W. Chang, R. Xu, Y. H. Yang, Y. Chen, ACS Nano 2009, 3, 3891.
[37] H. Y. Han, H. Tachikawa, Front. Biosci. 2005, 10, 931.
[38] I. Sondi, B. Salopek-Sondi, J. Colloid Interface Sci. 2004, 275, 177.
[39] D. T. Schoen, A. P. Schoen, L. B. Hu, H. S. Kim, S.C. Heilshorn, Y. Cui, Nano Lett. 2010, 10, 3628.
[40] W. Yuan, G. H. Jiang, J. F. Che, X. B. Qi, R. Xu, M. W. Chang, Y. Chen, S. Y. Lim, J. Dai, M. B. Chan-Park, J. Phys. Chem. C 2008, 112, 18754.
[41] K. Zodrow, L. Brunet, S. Mahendra, D. Li, A. Zhang, Q. L. Li, P. J. J. Alvarez, Water Res. 2009, 43, 715.
[42] J. Albert, J. Luoto, D. Levine, Environ. Sci. Technol. 2010, 44, 4426.
[43] J. Yang, J. Wang, J. P. Jia, Environ. Sci. Technol. 2009, 43, 3796.

REFERENCES FOR EXAMPLE 11

(1) Bard, A. J.; Faulkner, L. R. Electrochemical Methods: Fundamentals and Applications, 2nd ed.; John Wiley & Sons: New York, 2001; p 833.
(2) Rajeshwar, K.; Ibanez, J. G.; Swain, G. M. Electrochemistry and the environment. J. Appl. Electrochem. 1994, 24 (11), 1077-1091.
(3) Panizza, M.; Cerisola, G. Direct and mediated anodic oxidation of organic pollutants. Chem. Rev. 2009, 109 (12), 6541-6569.
(4) Martinez-Huitle, C. A.; Brillas, E. Electrochemical alternatives for drinking water disinfection. Angew. Chem., Int. Ed. 2008, 47 (11), 1998-2005.
(5) Park, H.; Vecitis, C. D.; Hoffmann, M. R. Solar-powered electrochemical oxidation of organic compounds coupled with the cathodic production of molecular hydrogen. J. Phys. Chem. A 2008, 112 (33), 7616-7626.
(6) Zhi, J. F.; Wang, H. B.; Nakashima, T.; Rao, T. N.; Fujishima, A. Electrochemical incineration of organic pollutants on boron-doped diamond electrode. Evidence for direct electrochemical oxidation pathway. J. Phys. Chem. B 2003, 107 (48), 1330-13395.
(7) Tong, X. L.; Zhao, G. H.; Liu, M. C.; Cao, T. C.; Liu, L.; Li, P. Q. Fabrication and high electrocatalytic activity of three-dimensional porous nanosheet pt/boron-doped diamond hybrid film. J. Phys. Chem. C 2009,113 (31), 13787-13792.
(8) Zhao, G. H.; Li, P. Q.; Nong, F. Q.; Li, M. F.; Gao, J. X.; Li, D. M. Construction and high performance of a novel modified boron-doped diamond film electrode endowed with superior electrocatalysis. J. Phys. Chem. C 2010,114 (13), 5906-5913.
(9) Li, P. Q.; Zhao, G. H.; Cui, X.; Zhang, Y. G.; Tang, Y. T. Constructing stake structured TiO2-NTs/Sb-doped SnO2 electrode simultaneously with high electrocatalytic and photocatalytic performance for complete mineralization of refractory aromatic acid. J. Phys. Chem. C 2009,113 (6), 2375-2383.
(10) Matyasovszky, N.; Tian, M.; Chen, A. C. Kinetic study of the electrochemical oxidation of salicylic acid and salicylaldehyde using UVN is spectroscopy and multivariate calibration. J. Phys. Chem. A 2009,113 (33), 9348-9353.
(11) Park, H.; Vecitis, C. D.; Hoffmann, M. R. Electrochemical water splitting coupled with organic compound oxidation: The role of active chlorine species. J. Phys. Chem. C 2009, 113 (18), 7935-7945.
(12) Borras, N.; Oliver, R.; Arias, C.; Brillas, E. Degradation of atrazine by electrochemical advanced oxidation processes using a borondoped diamond anode. J. Phys. Chem. A 2010, 114 (24), 6613-6621.
(13) Peigney, A.; Laurent, C.; Flahaut, E.; Bacsa, R. R.; Rousset, A. Specific surface area of carbon nanotubes and bundles of carbon nanotubes. Carbon 2001, 39 (4), 507-514.
(14) Ebbesen, T. W.; Lezec, H. J.; Hiura, H.; Bennett, J. W.; Ghaemi, H. F.; Thio, T. Electrical conductivity of individual carbon nanotubes. Nature 1996, 382 (6586), 54-56.
(15) Pantano, A.; Parks, D. M.; Boyce, M. C. Mechanics of deformation of single- and multi wall carbon nanotubes. J. Mech. Phys. Solids 2004, 52 (4), 789-821.
(16) Wang, X.; Li, W. Z.; Chen, Z. W.; Waje, M.; Yan, Y. S. Durability investigation of carbon nanotube as catalyst support for proton exchange membrane fuel cell. J. Power Sources 2006, 158 (1), 154-159.
(17) Li, J.; Cassell, A.; Delzeit, L.; Han, J.; Meyyappan, M. Novel three-dimensional electrodes: Electrochemical properties of carbon nanotube ensembles. J. Phys. Chem. B 2002, 106 (36), 9299-9305.
(18) Brady-Estevez, A. S.; Kang, S.; Elimelech, M. A single-walled carbon-nanotube filter for removal of viral and bacterial pathogens. Small 2008, 4 (4), 481-484.
(19) Vecitis, C. D.; Gao, G. D.; Liu, H. Electrochemical carbon nanotube filter for adsorption, desorption, and oxidation of aqueous dyes and anions. J. Phys. Chem. C 2011, 115 (9), 3621-3629.
(20) Vecitis, C. D.; Schnoor, M. H.; Rahaman, M. S.; Schiffman, J. D.; Elimelech, M. Electrochemical multi-walled carbon nanotube filter for viral and bacterial removal and inactivation. Environ. Sci. Technol. 2011, 45 (8), 3672-3679.
(21) Pan, B.; Xing, B. S. Adsorption mechanisms of organic chemicals on carbon nanotubes. Environ. Sci. Technol. 2008, 42 (24), 9005-9013.
(22) Smith, B.; Wepasnick, K.; Schrote, K. E.; Bertele, A. H.; Ball, W. P.; O'Melia, C.; Fairbrother, D. H. Colloidal properties of aqueous suspensions of acid-treated, multi-walled carbon nanotubes. Environ. Sci. Technol. 2009, 43 (3), 819-825.
(23) Kang, S.; Mauter, M. S.; Elimelech, M. Physicochemical determinants of multiwalled carbon nanotube bacterial cytotoxicity. Environ. Sci. Technol. 2008, 42 (19), 7528-7534.
(24) Wang, X. M.; Li, N.; Webb, J. A.; Pfefferle, L. D.; Haller, G. L. Effect of surface oxygen containing groups on the catalytic activity of multi-walled carbon nanotube supported Pt catalyst. Appl. Catal., B 2010, 101 (1 2), 21-30.
(25) Kim, Y. K.; Park, H. Light-harvesting multi-walled carbon nanotubes and CdS hybrids: Application to photocatalytic hydrogen production from water. Energy Environ. Sci. 2011, 4 (3), 685-694.
(26) Kang, S.; Herzberg, M.; Rodrigues, D. F.; Elimelech, M. Antibacterial effects of carbon nanotubes: Size does matter. Langmuir 2008, 24 (13), 6409-6413.
(27) Kim, U. J.; Furtado, C. A.; Liu, X. M.; Chen, G. G.; Eklund, P. C. Raman and IR spectroscopy of chemically processed single-walled carbon nanotubes. J. Am. Chem. Soc. 2005, 127 (44), 15437-15445.
(28) Cho, H. H.; Wepasnick, K.; Smith, B. A.; Bangash, F. K.; Fairbrother, D. H.; Ball, W. P. Sorption of aqueous Zn[II] and Cd[II] by multiwall carbon nanotubes: The relative roles of oxygen-containing functional groups and graphenic carbon. Langmuir 2010, 26 (2), 967-981.
(29) Fujihara, S.; Maeda, T.; Ohgi, H:; Hosono, E.; Imai, H.; Kim, S. H. Hydrothermal routes to prepare nanocrystalline mesoporous $SnO_2$ having high thermal stability. Langmuir 2004, 20 (15), 6476-6481.
(30) Wen, Z. H.; Wang, Q.; Zhang, Q.; Li, J. H. In situ growth of mesoporous $SnO_2$ on multiwalled carbon nanotubes: A novel composite with porous-tube structure as anode for lithium batteries. Adv. Funct. Mater. 2007, 17 (15), 2772-2778.
(31) Moon, J. M.; An, K. H.; Lee, Y. H.; Park, Y. S.; Bae, D. J.; Park, G. S. High-yield purification process of single-walled carbon nanotubes. J. Phys. Chem. B 2001, 105 (24), 5677-5681.
(32) Shi, Z. J.; Lian, Y. F.; Liao, F. H.; Zhou, X. H.; Gu, Z. N.; Zhang, Y. G.; Iijima, S. Purification of single-wall carbon nanotubes. Solid State Commun. 1999, 112 (1), 35-37.
(33) Briggs, D.; Seah, M. P. Practical Surface Analysis: Auger and X-ray Photoelectron Spectroscopy, 2nd ed.; John Wiley & Sons Limited: New York, 1990.
(34) Hu, H.; Zhao, B.; Itkis, M. E.; Haddon, R. C. Nitric acid purification of single-walled carbon nanotubes. J. Phys. Chem. B 2003, 107 (50), 13838-13842.
(35) Rinzler, A. G.; Liu, J.; Dai, H.; Nikolaev, P.; Huffman, C. B.; Rodriguez-Macias, F. J.; Boul, P. J.; Lu, A. H.; Heymann, D.; Colbert, D. T.; Lee, R. S.; Fischer, J. E.; Rao, A. M.; Eklund, P. C.; Smalley, R. E. Large-scale purification of single-wall carbon nanotube: Process, product, and characterization. Appl. Phys. A'1998, 67 (1), 29-37.
(36) Liu, L.; Li, F. B.; Feng, C. H.; Li, X. Z. Microbial fuel cell with an azo-dye-feeding cathode. Appl. Microbiol. Biotechnol. 2009, 85 (1), 175-183.
(37) McKenzie, K. J.; Marken, F. Direct electrochemistry of nano-particulate $Fe_2O_3$ in aqueous solution and adsorbed onto tin-doped indium oxide. Pure Appl. Chem. 2001, 73 (12), 1885-1894.
(38) Enami, S.; Hoffmann, M. R.; Colussi, A. J. Proton availability at the air/water interface. J. Phys. Chem. Lett. 2010, 1 (10), 1599-1604.
(39) Enami, S.; Stewart, L. A.; Hoffmann, M. R.; Colussi, A. J. Superacid chemistry on mildly acidic water. J. Phys Chem. Lett. 2010, 1 (24), 3488-3493.
(40) Conway, B. E.; Tilak, B. V. Interfacial processes involving electrocatalytic evolution and oxidation of H-2, and the role of chemisorbed H. Electrochim. Acta 2002, 47 (22 23), 3571-3594.
(41) Tilak, B. V.; Conway, B. E. Overpotential decay behavior 0.1. Complex electrode-reactions involving adsorption. Electrochim. Acta 1976, 21 (10), 745-752.
(42) Wardman, P. Reduction potentials of one-electron couples involving free-radicals in aqueous-solution. J. Phys. Chem. Ref. Data 1989, 18 (4), 1637-1755.
(43) Kotz, R.; Stucki, S.; Carcer, B. Electrochemical wastewater treatment using high overvoltage anodes 0.1. Physical and electrochemical properties of $SnO_2$ anodes. J. Appl. Electrochem. 1991, 21 (1), 14-20.
(44) Stucki, S.; Kotz, R.; Carcer, B.; Suter, W. Electrochemical wastewater treatment using high overvoltage anodes 0.2. Anode performance and applications. J. Appl. Electrochem. 1991, 21 (2), 99-104.
(45) Fan, Y. W.; Goldsmith, B. R.; Collins, P. G. Identifying and counting point defects in carbon nanotubes. Nat. Mater. 2005, 4 (12), 906-911.
(46) Cho, H. H.; Smith, B. A.; Wnuk, J. D.; Fairbrother, D. H.; Ball, W. P. Influence of surface oxides on the adsorption of naphthalene Onto multiwalled carbon nanotubes. Environ. Sci. Technol. 2008, 42 (8), 2899-2905.
(47) Yang, K.; Wu, W. H.; Jing, Q. F.; Jiang, W.; Xing, B. S. Competitive adsorption of naphthalene with 2,4-dichlorophenol and 4-chloroaniline on multiwalled carbon nanotubes. Environ. Sci. Technol. 2010, 44 (8), 3021-3027.
(48) Iniesta, J.; Michaud, P. A.; Panizza, M.; Cerisola, G.; Aldaz, A.; Comninellis, C. Electrochemical oxidation of phenol at boron-doped diamond electrode. Electrochim. Acta 2001, 46 (23), 3573-3578.
(49) Mrowetz, M.; Balcerski, W.; Colussi, A. J.; Hoffmann, M. R. Oxidative power of nitrogen-doped $TiO_2$ photocatalysts under visible illumination. J. Phys. Chem. B 2004, 108 (45), 17269-17273.
(50) Park, H.; Vecitis, C. D.; Choi, W.; Weres, O.; Hoffmann, M. R. Solar-powered production of molecular hydrogen from water. J. Phys. Chem. C 2008, 112 (4), 885-889.

REFERENCES FOR EXAMPLE 13

1. Cheng, I. F.; Fernando, Q.; Korte, N., Electrochemical dechlorination of 4-chlorophenol to phenol. *Environmental Science & Technology* 1997, 31, (4), 1074-1078.
2. Pelegrini, R. T.; Freire, R. S.; Duran, N.; Bertazzoli, R., Photoassisted electrochemical degradation of organic pollutants on a DSA type oxide electrode: Process test for a phenol synthetic solution and its application for the E1 bleach kraft mill effluent. *Environmental Science & Technology* 2001, 35, (13), 2849-2853.
3. Wu, Z. C.; Zhou, M. H., Partial degradation of phenol by advanced electrochemical oxidation process. *Environmental Science & Technology* 2001, 35, (13), 2698-2703.
4. Hu, B. X.; Chen, C. H.; Frueh, S. J.; Jin, L.; Joesten, R.; Suib, S. L., Removal of Aqueous Phenol by Adsorption and Oxidation with Doped Hydrophobic Cryptomelane-Type Manganese Oxide (K-OMS-2) Nanofibers. *Journal of Physical Chemistry C* 2010, 114, (21), 9835-9844.
5. Esplugas, S.; Gimenez, J.; Contreras, S.; Pascual, E.; Rodriguez, M., Comparison of different advanced oxidation processes for phenol degradation. *Water Research* 2002, 36, (4), 1034-1042.
6. Santos, A.; Yustos, P.; Durban, B.; Garcia-Ochoa, F., Catalytic wet oxidation of phenol: Kinetics of phenol uptake. *Environmental Science & Technology* 2001, 35, (13), 2828-2835.
7. Santos, A.; Yustos, P.; Quintanilla, A.; Garcia-Ochoa, F.; Casas, J. A.; Rodriguez, J. J., Evolution of toxicity upon wet catalytic oxidation of phenol. *Environmental Science & Technology* 2004, 38, (1), 133-138.
8. Carriazo, J.; Guelou, E.; Barrault, J.; Tatibouet, J. M.; Molina, R.; Moreno, S., Catalytic wet peroxide oxidation of phenol by pillared clays containing Al—Ce—Fe. *Water Research* 2005, 39, (16), 3891-3899.
9. Lin, S. S.; Chen, C. L.; Chang, D. J.; Chen, C. C., Catalytic wet air oxidation of phenol by various CeO2 catalysts. *Water Research* 2002, 36, (12), 3009-3014.
10. Canizares, P.; Lobato, J.; Garcia-Gomez, J.; Rodrigo, M. A., Combined adsorption and electrochemical processes for the treatment of acidic aqueous phenol wastes. *Journal of Applied Electrochemistry* 2004, 34, (1),111-117.
11. Krawczyk, P.; Skowronski, J. M., Modification of expanded graphite resulting in enhancement of electrochemical activity in the process of phenol oxidation. *Journal of Applied Electrochemistry* 2010, 40, (1), 91-98.
12. Weiss, E.; Groenen-Serrano, K.; Savall, A., A comparison of electrochemical degradation of phenol on boron doped diamond and lead dioxide anodes. *Journal of Applied Electrochemistry* 2008, 38, (3), 329-337.
13. Li, X. Y.; Cui, Y. H.; Feng, Y. J.; Xie, Z. M.; Gu, J. D., Reaction pathways and mechanisms of the electrochemical degradation of phenol on different electrodes. *Water Research* 2005, 39, (10), 1972-1981.
14. Tahar, N. B.; Savall, A., Electrochemical removal of phenol in alkaline solution. Contribution of the anodic polymerization on different electrode materials. *Electrochimica Acta* 2009, 54, (21), 4809-4816.
15. Tahar, N. B.; Abdelhedi, R.; Savall, A., Electrochemical polymerisation of phenol in aqueous solution on a Ta/PbO(2) anode. *Journal of Applied Electrochemistry* 2009, 39, (5), 663-669.
16. Finklea, H. O.; Snider, D. A.; Fedyk, J., Passivation of Pinholes in Octadecanethiol Monolayers on Gold Electrodes by Electrochemical Polymerization of Phenol. *Langmuir* 1990, 6, (2), 371-376.
17. Gattrell, M.; Kirk, D. W., A Study of Electrode Passivation during Aqueous Phenol Electrolysis. *Journal of the Electrochemical Society* 1993, 140, (4), 903-911.
18. Brady-Estevez, A. S.; Schnoor, M. H.; Vecitis, C. D.; Saleh, N. B.; Ehmelech, M., Multiwalled Carbon Nanotube Filter: Improving Viral Removal at Low Pressure. *Langmuir* 26, (18), 14975-14982.
19. Gao, G.; Vecitis, C. D., Electrochemical Carbon Nanotube Filter Oxidative Performance as a Function of Surface Chemistry. *Environmental Science & Technology* 45, (22), 9726-9734.
20. Tiraferri, A.; Vecitis, C. D.; Elimelech, M., Covalent Binding of Single-Walled Carbon Nanotubes to Polyamide Membranes for Antimicrobial Surface Properties. *ACS Appl. Mater. Interfaces* 3, (8), 2869-2877.
21. Vecitis, C. D.; Gao, G. D.; Liu, H., Electrochemical Carbon Nanotube Filter for Adsorption, Desorption, and Oxidation of Aqueous Dyes and Anions. *Journal of Physical Chemistry C* 115, (9), 3621-3629.
22. Vecitis, C. D.; Schnoor, M. H.; Rahaman, M. S.; Schiffman, J. D.; Elimelech, M., Electrochemical Multiwalled Carbon Nanotube Filter for Viral and Bacterial Removal and Inactivation. *Environmental Science & Technology* 45, (8), 3672-3679.
23. Vecitis, C. D.; Zodrow, K. R.; Kang, S.; Elimelech, M., Electronic-Structure-Dependent Bacterial Cytotoxicity of Single-Walled Carbon Nanotubes. *ACS Nano* 4, (9), 5471-5479.
24. Rauscher, A.; Kutsan, G.; Lukacs, Z., Effects of Hydrogen-Sulfide and Temperature on Passivation Behavior of Titanium. *Corrosion Science* 1990, 31, 255-260.
25. Fokin, M. N.; Danilov, A. M.; Timonin, V. A., Measurement of Coulombs Consumed in Formation of Oxide Film during Passivation of Titanium. *Doklady Akademii Nauk Sssr* 1964, 158, (3), 702-&.
26. Frayret, J. P.; Caprani, A., Anodic Behavior of Titanium in Acidic Chloride Containing Media (Hcl-Nacl)-Influence of the Constituents of the Medium 0.3. Analysis of the Electrochemical Impedance—General Dissolution-Passivation Mechanism. *Electrochimica Acta* 1982, 27, (3), 391-399.
27. Dafonseca, C.; Boudin, S.; Belo, M. D., Characterization of Titanium Passivation Films by in-Situ Ac-Impedance Measurements and Xps Analysis. *Journal of Electroanalytical Chemistry* 1994, 379, (1-2), 173-180.
28. Frayret, C.; Botella, P.; Jaszay, T.; Delville, M. H., Titanium dissolution-passivation in highly chloridic and oxygenated aqueous solutions—Reaction mechanism extended to supercritical water conditions. *Journal of the Electrochemical Society* 2004, 151, (10), B543-B550.
29. Kelly, E. J., Anodic-Dissolution and Passivation of Titanium in Acidic Media 0.3. Chloride Solutions. *Journal of the Electrochemical Society* 1979, 126, (12), 2064-2075.
30. Comninellis, C.; Pulgarin, C., Electrochemical Oxidation of Phenol for Waste-Water Treatment Using Sno2 Anodes. *Journal of Applied Electrochemistry* 1993, 23, (2), 108-112.
31. Enache, T. A.; Oliveira-Brett, A. M., Phenol and para-substituted phenols electrochemical oxidation pathways. *Journal of Electroanalytical Chemistry* 2011, 655, (1), 9-16.
32. Canizares, P.; Martinez, F.; Diaz, M.; Garcia-Gomez, J.; Rodrigo, M. A., Electrochemical oxidation of aqueous phenol wastes using active and nonactive electrodes. *Journal of the Electrochemical Society* 2002, 149, (8), DI 18-D124.
33. Hagans, P. L.; Natishan, P. M.; Stoner, B. R.; O'Grady, W. E., Electrochemical oxidation of phenol using boron-doped diamond electrodes. *Journal of the Electrochemical Society* 2001, 148, (7), E298-E301.
34. Sharifian, H.; Kirk, D. W., Electrochemical Oxidation of Phenol. *Journal of the Electrochemical Society* 1986, 133, (5), 921-924.
35. Tahar, N. B.; Savall, A., Mechanistic aspects of phenol electrochemical degradation by oxidation on a Ta/PbO2 anode. *Journal of the Electrochemical Society* 1998, 145, (10), 3427-3434.
36. Polcaro, A. M.; Vacca, A.; Palmas, S.; Masciaaa, M., Electrochemical treatment of wastewater containing phenolic compounds: oxidation at boron-doped diamond electrodes. *Journal of Applied Electrochemistry* 2003, 33, (10), 885-892.

REFERENCES FOR EXAMPLE 14

(1) Bard, A. J.; Faulkner, L. R., *Electrochemical methods: Fundamentals and applications*. 2nd ed.; John Wiley & Sons: New York, 2001; p 833.
(2) Yang, J.; Wang, J.; Jia, J. P., *Environ. Sci. Technol.* 2009, 43 (10), 3796-3802.
(3) Martinez-Huitle, C. A.; Brillas, E., *Angew. Chem.-Int. Edit.* 2008, 47 (11), 1998-2005.
(4) Panizza, M.; Cerisola, G., *Chem. Rev.* 2009, 109 (12), 6541-6569.
(5) Park, H.; Vecitis, C. D.; Choi, W.; Weres, O.; Hoffmann, M. R., *J. Phys. Chem. C* 2008, 112 (4), 885-889.
(6) Gao, G.; Vecitis, C. D., *Environ. Sci. Technol.* 2011, 45 (22), 9726-9734.
(7) Li, J.; Cassell, A.; Delzeit, L.; Han, J.; Meyyappan, M., *J. Phys. Chem. B* 2002, 106 (36), 9299-9305.
(8) Tong, X. L.; Zhao, G. H.; Liu, M. C.; Cao, T. C.; Liu, L.; Li, P. Q., *J. Phys. Chem. C* 2009, 113 (31), 13787-13792.
(9) Vecitis, C. D.; Schnoor, M. H.; Rahaman, M. S.; Schiffman, J. D.; Elimelech, M., *Environ. Sci. Tech.* 2011, 45 (8), 3672-3679.

(10) Hu, Y. S.; Adelhelm, P.; Smarsly, B. M.; Hore, S.; Antonietti, M.; Maier, J., *Adv. Funct. Mater.* 2007, 17 (12), 1873-1878.

(11) Brady-Estevez, A. S.; Schnoor, M. H.; Vecitis, C. D.; Saleh, N. B.; Elimelech, M., *Langmuir* 2010, 14975-14982.

(12) Vecitis, C. D.; Gao, G. D.; Liu, H., *J. Phys. Chem. C* 2011, 115 (9), 3621-3629.

(13) Bandow, S.; Numao, S.; Iijima, S., *J. Phys. Chem. C* 2007, 111 (32), 11763-11766.

(14) Carroll, D. L.; Redlich, P.; Blase, X.; Charlier, J. C.; Curran, S.; Ajayan, P. M.; Roth, S.; Ruhle, M., *Phys. Rev. Lett.* 1998, 81 (11), 2332-2335.

(15) Czerw, R.; Terrones, M.; Charlier, J. C.; Blase, X.; Foley, B.; Kamalakaran, R.; Grobert, N.; Terrones, H.; Tekleab, D.; Ajayan, P. M.; Blau, W.; Ruhle, M.; Carroll, D. L., *Nano Lett.* 2001, 1 (9), 457-460.

(16) Mukhopadhyay, I.; Hoshino, N.; Kawasaki, S.; Okino, F.; Hsu, W. K.; Touhara, H., *J. Electrochem. Soc.* 2002, 149 (1), A39-A44.

(17) Wiggins-Camacho, J. D.; Stevenson, K. J., *J. Phys. Chem. C* 2009, 113 (44), 19082-19090.

(18) Barone, V.; Peralta, J. E.; Uddin, J.; Scuseria, G. E., *J. Chem. Phys.* 2006, 124 (2), 1-5.

(19) Lee, J. M.; Park, J. S.; Lee, S. H.; Kim, H.; Yoo, S.; Kim, S. O., *Adv. Mater.* 2011, 23 (5), 629-631.

(20) Wang, R. X.; Zhang, D. J.; Zhang, Y. M.; Liu, C. B., *J. Phys. Chem. B* 2006, 110 (37), 18267-18271.

(21) Deng, C. Y.; Chen, J. H.; Chen, X. L.; Mao, C. H.; Nie, L. H.; Yao, S. Z., *Biosens. Bioelectron.* 2008, 23 (8), 1272-1277.

(22) Maldonado, S.; Morin, S.; Stevenson, K. J., *Carbon* 2006, 44 (8), 1429-1437. (23) Alexeyeva, N.; Shulga, E.; Kisand, V.; Kink, I.; Tammeveski, K., *J. Electroanal. Chem.* 2010, 648 (2), 169-175.

(24) Kim, U. J.; Furtado, C. A.; Liu, X. M.; Chen, G. G.; Eklund, P. C., *J. Am. Chem. Soc.* 2005, 127 (44), 15437-15445.

(25) Redlich, P.; Loeffler, J.; Ajayan, P. M.; Bill, J.; Aldinger, F.; Ruhle, M., *Chem. Phys. Lett.* 1996, 260 (3-4), 465-470.

(26) Cho, H. H.; Smith, B. A.; Wnuk, J. D.; Fairbrother, D. H.; Ball, W. P., *Environ. Sci. Technol.* 2008, 42 (8), 2899-2905.

(27) Pan, B.; Xing, B. S., *Environ. Sci. Technol.* 2008, 42 (24), 9005-9013.

(28) Ohnuki, Y.; Matsuda, H.; Ohsaka, T.; Oyama, N., *J. Electroanal. Chem.* 1983, 158 (1), 55-67.

(29) Comninellis, C.; Pulgarin, C., *J. Appl. Electrochem.* 1991, 21 (8), 703-708.

(30) Iniesta, J.; Michaud, P. A.; Panizza, M.; Cerisola, G.; Aldaz, A.; Comninellis, C., *Electrochim. Acta* 2001, 46 (23), 3573-3578.

(31) Mengoli, G.; Musiani, M. M., *Electrochim. Acta* 1986, 31 (2), 201-210. (32) Wardman, P., *J. Phys. Chem. Ref. Data* 1989, 18 (4), 1637-1755.

(33) Park, H.; Vecitis, C. D.; Hoffmann, *J. Phys. Chem. C* 2009, 113 (18), 7935-7945.

(34) Datsyuk, V.; Kalyva, M.; Papagelis, K.; Parthenios, J.; Tasis, D.; Siokou, A.; Kallitsis, I.; Galiotis, C., *Carbon* 2008, 46 (6), 833-840.

(35) Neta, P.; Huie, R. E.; Ross, A. B., *J. Phys. Chem. Ref. Data* 1988, 17 (3), 1027-1284.

(36) Lim, M.; Han, G. C.; Ahn, J. W.; You, K. S., *Int. J. Environ. Res. Public Health* 2010, 7 (1), 203-228.

(37) *CRC Handbook of Chemistry and Physics*. 91 ed.; CRC Press: Boca Raton, 2011.

REFERENCES FOR EXAMPLE 15

(1) Iijima, S. *Nature* 1991, 354 (6348), 56-58.

(2) Guldi, D. M.; Rahman, G. M. A.; Sgobba, V.; Kotov, N. A.; Bonifazi, D.; Prato, M. *J. Am. Chem. Soc.* 2006, 128 (7), 2315-2323.

(3) Sinha, N.; Yeow, J. T. W. *IEEE Trans. Nanobiosci.* 2005, 4 (2), 180-195.

(4) Lin, D. H.; Xing, B. S. *Environ. Sci. Technol.* 2008, 42 (19), 7254-7259.

(5) Girishkumar, G.; Vinodgopal, K.; Kamat, P. V. *J. Phys. Chem. B* 2004, 108 (52), 19960-19966.

(6) Hu, C. G.; Zhang, Y. Y.; Bao, G.; Zhang, Y. L.; Liu, M. L.; Wang, Z. L. *J. Phys. Chem. B* 2005, 109 (43), 20072-20076.

(7) Kundu, S.; Nagaiah, T. C.; Xia, W.; Wang, Y. M.; Van Dommele, S.; Bitter, J. H.; Santa, M.; Grundmeier, G.; Bron, M.; Schuhmann, W.; Muhler, M. *J. Phys. Chem. C* 2009, 113 (32), 14302-14310.

(8) Li, J.; Cassell, A.; Delzeit, L.; Han, J.; Meyyappan, M. *J. Phys. Chem. B* 2002, 106 (36), 9299-9305.

(9) Katz, E.; Willner, I. *ChemPhysChem* 2004, 5 (8), 1085-1104.

(10) Wang, J. X.; Li, M. X.; Shi, Z. J.; Li, N. Q.; Gu, Z. N. *Electroanal.* 2002, 14 (3), 225-230.

(11) Britto, P. J.; Santhanam, K. S. V.; Ajayan, P. M. *Bioelectrochem. Bioenerg.* 1996, 41 (1), 121-125.

(12) Vecitis, C. D.; Gao, G. D.; Liu, H. *J. Phys. Chem. C* 2011, 115 (9), 3621-3629.

(13) Wang, J.; Musameh, M. *Anal. Chem.* 2003, 75 (9), 2075-2079.

(14) Yang, J.; Wang, J.; Jia, J. P. *Environ. Sci. Technol.* 2009, 43 (10), 3796-3802.

(15) Rajeshwar, K.; Ibanez, J. G.; Swain, G. M. *J. Appl. Electrochem.* 1994, 24 (11), 1077-1091.

(16) Bard, A. J., *Electrochemical methods: Fundamentals and application*, 2nd ed.; John Wiley & Sons, Inc.: New York, 2001.

(17) Rodrigo, M. A.; Canizares, P.; Sanchez-Carretero, A.; Saez, C. *Catal. Today* 2010, 151 (1-2), 173-177.

(18) Tahar, N. B.; Savall, A. *Electrochim. Acta* 2009, 54 (21), 4809-4816.

(19) Panizza, M.; Cerisola, G. *J. Hazard. Mater.* 2008, 153 (1-2), 83-88.

(20) Vecitis, C. D. V. C. D.; Schnoor, M. H.; Rahaman, M. S.; Schiffman, J. D.; Elimelech, M. *Environ. Sci. Technol.* 2011, 45 (8), 3672-3679.

(21) Brett, C. M. A.; Brett, A. M. O.; Serrano, S. H. P. *J. Electroanal. Chem.* 1994, 366 (1-2), 225-231.

(22) Colmati, F.; Tremiliosi-Filho, G.; Gonzalez, E. R.; Berna, A.; Herrero, E.; Feliu, J. M. *Faraday Discuss.* 2008, 140, 379-397.

(23) Peigney, A.; Laurent, C.; Flahaut, E.; Bacsa, R. R.; Rousset, A. *Carbon* 2001, 39 (4), 507-514.

(24) Zhang, S. J.; Shao, T.; Kose, H. S.; Karanfil, T. *Environ. Sci. Technol.* 2010, 44 (16), 6377-6383.

(25) Hyung, H.; Kim, J. H. *Environ. Sci. Technol.* 2008, 42 (12), 4416-4421.

(26) Pan, B.; Xing, B. S. *Environ. Sci. Technol.* 2008, 42 (24), 9005-9013.

(27) Koep, E.; Compson, C.; Liu, M. L.; Zhou, Z. P. *Solid State Ion.* 2005, 176 (1-2), 1-8.

(28) Masheter, A. T.; Abiman, P.; Wildgoose, G. G.; Wong, E.; Xiao, L.; Rees, N. V.; Taylor, R.; Attard, G. A.; Baron, R. *J. Mater. Chem.* 2007, 17 (25), 2616-2626.

(29) Kim, Y. H.; Kim, T.; Ryu, J. H.; Yoo, Y. J. *Biosens. Bioelectron.* 2010, 25 (5), 1160-1165.

(30) Banks, C. E.; Davies, T. J.; Wildgoose, G. G.; Compton, R. G. *Chem. Commun.* 2005, 7, 829-841.

(31) Luo, H. X.; Shi, Z. J.; Li, N. Q.; Gu, Z. N.; Zhuang, Q. K. *Anal. Chem.* 2001, 73 (5), 915-920.

(32) Gao, G.; Vecitis, C. D. Environ. Sci. Technol. 2011, 45 (22), 9726-9734.
(33) Zhang, Y. F.; Bo, X. J.; Luhana, C.; Guo, L. P. Electrochim. Acta 2011, 56 (17), 5849-5854.
(34) Welch, T. W.; Corbett, A. H.; Thorp, H. H. J. Phys. Chem. 1995, 99 (30), 11757-11763.
(35) Levich, V. G., Physicochemical hydrodynamics; Prentice-Hall: Englewood Cliffs, N.J., 1962.
(36) Zhang, D. S.; Pan, C. S.; Shi, L. Y.; Mai, H. L.; Gao, X. H. Appl. Surf. Sci. 2009, 255 (9), 4907-4912.
(37) Bermejo, M. R.; Gomez, J.; Martinez, A. M.; Barrado, E.; Castrillejo, Y. Electrochim. Acta 2008, 53 (16), 5106-5112.
(38) H. Eyring, S. H. L., Lin, S. M., Basic chemical kinetics; Wiley: New York, 1980.
(39) Liu, H.; Deng, S. B.; Li, Z. J.; Yu, G.; Huang, J. J. Hazard. Mater. 2010, 179 (1-3), 424-430.
(40) Al-Johani, H.; Salam, M. A. J. Colloid Interface Sci. 2011, 360 (2), 760-767.
(41) Lide, D. R., CRC handbook of chemistry and physics, 85th ed.; CRC Press: Boca Raton, Fla., 2004.
(42) Liu, L.; Li, F. B.; Feng, C. H.; Li, X. Z. Appl. Microbiol. Biotechnol. 2009, 85 (1), 175-183.
(43) Mrowetz, M.; Balcerski, W.; Colussi, A. J.; Hoffmann, M. R. J. Phys. Chem. B 2004, 108 (45), 17269-17273.
(44) Aider, M.; Arul, J.; Mateescu, A. M.; Brunet, S.; Bazinet, L. J. Agric. Food Chem. 2006, 54 (17), 6352-6357.
(45) Chen, L. C.; Chou, T. C. Ind. Eng. Chem. Res. 1993, 32 (7), 1520-1527.

REFERENCES FOR EXAMPLE 16

(1) Bard, A. J., *Electrochemical methods: Fundamentals and application*. 2nd ed.; John Wiley & Sons, Inc.: 2001.
(2) Rodrigo, M. A.; Canizares, P.; Sanchez-Carretero, A.; Saez, C., Use of conductive-diamond electrochemical oxidation for wastewater treatment. 2010, 151 (1-2), 173-177.
(3) Tahar, N. B.; Savall, A., Electrochemical removal of phenol in alkaline solution. Contribution of the anodic polymerization on different electrode materials. *Electrochim. Acta* 2009, 54 (21), 4809-4816.
(4) Panizza, M.; Cerisola, G., Removal of colour and cod from wastewater containing acid blue 22 by electrochemical oxidation. *J. Hazard. Mater.* 2008, 153 (1-2), 83-88.
(5) Iijima, S., Helical microtubules of graphitic carbon. *Nature* 1991, 354 (6348), 56-58.
(6) Guldi, D. M.; Rahman, G. M. A.; Sgobba, V.; Kotov, N. A.; Bonifazi, D.; Prato, M., Cnt-cdte versatile donor-acceptor nanohybrids. *J. Am. Chem. Soc.* 2006, 128 (7), 2315-2323.
(7) Sinha, N.; Yeow, J. T. W., Carbon nanotubes for biomedical applications. *IEEE Trans. Nanobiosci.* 2005, 4 (2), 180-195.
(8) Lin, D. H.; Xing, B. S., Adsorption of phenolic compounds by carbon nanotubes: Role of aromaticity and substitution of hydroxyl groups. *Environ. Sci. Technol.* 2008, 42 (19), 7254-7259.
(9) Girishkumar, G.; Vinodgopal, K.; Kamat, P. V., Carbon nanostructures in portable fuel cells: Single-walled carbon nanotube electrodes for methanol oxidation and oxygen reduction. *J. Phys. Chem. B* 2004, 108 (52), 19960-19966.
(10) Hu, C. G.; Zhang, Y. Y.; Bao, G.; Zhang, Y. L.; Liu, M. L.; Wang, Z. L., DNA functionalized single-walled carbon nanotubes for electrochemical detection. *J. Phys. Chem. B* 2005, 109 (43), 20072-20076.
(11) Kundu, S.; Nagaiah, T. C.; Xia, W.; Wang, Y. M.; Van Dommele, S.; Bitter, J. H.; Santa, M.; Grundmeier, G.; Bron, M.; Schuhmann, W.; Muhler, M., Electrocatalytic activity and stability of nitrogen-containing carbon nanotubes in the oxygen reduction reaction. *J. Phys. Chem. C* 2009, 113 (32), 14302-14310.
(12) Li, J.; Cassell, A.; Delzeit, L.; Han, J.; Meyyappan, M., Novel three-dimensional electrodes: Electrochemical properties of carbon nanotube ensembles. 2002, 106 (36), 9299-9305.
(13) Vecitis, C. D. V. C. D.; Schnoor, M. H.; Rahaman, M. S.; Schiffman, J. D.; Elimelech, M., Electrochemical multiwalled carbon nanotube filter for viral and bacterial removal and inactivation. 2011, 45 (8), 3672-3679.
(14) Vecitis, C. D.; Gao, G. D.; Liu, H., Electrochemical carbon nanotube filter for adsorption, desorption, and oxidation of aqueous dyes and anions. *J. Phys. Chem. C* 2011, 115 (9), 3621-3629.
(15) Zhang, D.; Deutschmann, O.; Seidel, Y. E.; Behm, R. J., Interaction of mass transport and reaction kinetics during electrocatalytic co oxidation in a thin-layer flow cell. 2011, 115 (2), 468-478.

It is understood that the foregoing detailed description and example are illustrative only and are not to be taken as limitations upon the scope of the invention. Various changes and modifications to the disclosed embodiments, which will be apparent to those of skill in the art, may be made without departing from the spirit and scope of the present invention. Further, all patents and other publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Appendix A

Permeate Flow Evaluation of 72 μm PVDF Membrane

| Volume (mL) | Hour | Time (s) | Permeate Flow (L/m$^2$h) | Pressure (psi) |
|---|---|---|---|---|
| 5 | 11:40 | 94 | 132 | 14.5 |
| 5 | 11:45 | 117 | 106 | 14.5 |
| 5 | 11:50 | 138 | 90 | 14.5 |
| 5 | 11:55 | 154 | 80 | 14.5 |
| 5 | 12:00 | 167 | 74 | 14.5 |
| 2 | 12:05 | 72 | 69 | 14.5 |
| 2 | 12:10 | 76 | 65 | 14.5 |
| 2 | 12:15 | 83 | 60 | 14.5 |
| 2 | 12:20 | 88 | 56 | 14.5 |
| 2 | 12:25 | 88 | 56 | 14.5 |
| 2 | 12:30 | 92 | 54 | 14.5 |
| 2 | 12:35 | 95 | 52 | 14.5 |
| 2 | 12:40 | 100 | 50 | 14.5 |
| Average | | 104.9 | 73 | 14.5 |

Appendix B

Flow Cell Test—Permeate Flow Evaluation CNT-Polymer-CNT Hybrid Membrane at 0 V

| Membrane area: | 140 cm$^2$ |
|---|---|

Results for ultrapure water w/Membrane 1.
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:40 | 0 | 18.14 | 49 | 899.6 | 24.3 | 0.183 | 351.14 |
| 2:45 | 5 | 18.06 | 49 | 899.6 | 24.3 | 0.201 | 319.69 |
| 2:50 | 10 | 18.1 | 53 | 985.7 | 24.4 | 0.188 | 374.52 |
| 2:55 | 15 | 18.14 | 52 | 964.1 | 24.4 | 0.184 | 374.26 |
|  | Average |  | 50.75 | 937.26 | 24.35 | 0.19 | 354.90 |

Results for ultrapure water w/Membrane 2
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 5:20 | 0 | 17.96 | 48 | 878.3 | 25 | 0.531 | 118.14 |
| 5:25 | 5 | 18 | 45 | 814.6 | 25 | 0.546 | 106.57 |
| 5:30 | 10 | 17.91 | 45 | 814.6 | 24.9 | 0.548 | 106.18 |
| 5:35 | 15 | 18.02 | 45 | 814.6 | 25.1 | 0.542 | 107.36 |
|  | Average |  | 45.75 | 830.55 | 25.00 | 0.54 | 109.56 |

Results for ultrapure water w/Membrane 3
Date Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:00 | 0 | 17.26 | 40 | 710.2 | 24.4 | 0.698 | 72.68 |
| 2:05 | 5 | 17.34 | 40 | 710.2 | 24.2 | 0.658 | 77.09 |
| 2:10 | 10 | 17.31 | 40 | 710.2 | 24.5 | 0.726 | 69.87 |
| 2:15 | 15 | 17.35 | 40 | 710.2 | 24.6 | 0.724 | 70.07 |
|  | Average |  | 40.00 | 710.19 | 24.43 | 0.70 | 72.43 |

Results for ultrapure water w/Membrane 4
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:00 | 0 | 18.45 | 55 | 1029.2 | 23.3 | 0.298 | 246.69 |
| 11:05 | 5 | 18.45 | 55 | 1029.2 | 23.4 | 0.283 | 259.77 |
| 11:10 | 10 | 18.51 | 56 | 1051.0 | 23.5 | 0.267 | 281.18 |
| 11:15 | 15 | 18.46 | 56.5 | 1062.0 | 23.5 | 0.298 | 254.55 |
|  | Average |  | 55.63 | 1042.85 | 23.43 | 0.29 | 260.55 |

Flow Cell Test—Permeate Flow Evaluation CNT-Polymer-CNT Hybrid Membrane at 1 V

| Membrane area: | 140 cm$^2$ |
|---|---|

Results for ultrapure water w/Membrane 1
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:00 | 0 | 18.18 | 52 | 964.1 | 24.5 | 0.133 | 517.78 |
| 3:05 | 5 | 18.12 | 48 | 878.3 | 24.5 | 0.134 | 468.16 |
| 3:10 | 10 | 18.15 | 45 | 814.6 | 24.3 | 0.105 | 554.18 |
| 3:15 | 15 | 18.15 | 45 | 814.6 | 24.3 | 0.109 | 533.84 |
|  | Average |  | 47.50 | 867.91 | 24.40 | 0.12 | 518.49 |

Results for ultrapure water w/Membrane 2
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 5:40 | 0 | 17.95 | 42 | 751.7 | 25.1 | 0.483 | 111.17 |
| 5:45 | 5 | 17.92 | 43 | 772.6 | 25.1 | 0.447 | 123.46 |
| 5:50 | 10 | 18.04 | 42 | 751.7 | 25.1 | 0.451 | 119.06 |
| 5:55 | 15 | 18.03 | 42 | 751.7 | 25.1 | 0.442 | 121.48 |
|  | Average |  | 42.25 | 756.95 | 25.10 | 0.46 | 118.79 |

Results for ultrapure water w/Membrane 1 and Anode/Cathode reversed
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 4:00 | 0 | 18.04 | 52 | 964.1 | 24.5 | 0.28 | 245.94 |
| 4:05 | 5 | 17.99 | 52 | 964.1 | 24.5 | 0.326 | 211.24 |
| 4:10 | 10 | 18.09 | 52 | 964.1 | 24.5 | 0.298 | 231.09 |
| 4:15 | 15 | 18.12 | 52 | 964.1 | 24.5 | 0.275 | 250.41 |
|  | Average |  | 52.00 | 964.10 | 24.50 | 0.29 | 234.67 |

Results for ultrapure water w/Membrane 3
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:25 | 0 | 17.31 | 40 | 710.2 | 24.7 | 0.656 | 77.33 |
| 2:30 | 5 | 17.33 | 40 | 710.2 | 24.8 | 0.703 | 72.16 |
| 2:35 | 10 | 17.27 | 40 | 710.2 | 24.7 | 0.636 | 79.76 |
| 2:40 | 15 | 17.30 | 40 | 710.2 | 24.7 | 0.621 | 81.69 |
|  | Average |  | 40.00 | 710.19 | 24.73 | 0.65 | 77.73 |

Results for ultrapure water w/Membrane 4
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:25 | 0 | 18.39 | 56 | 1051.0 | 23.8 | 0.266 | 282.23 |
| 11:30 | 5 | 18.49 | 59 | 1116.9 | 23.7 | 0.309 | 258.19 |
| 11:35 | 10 | 18.43 | 59 | 1116.9 | 23.8 | 0.25 | 319.12 |
| 11:40 | 15 | 18.4 | 59 | 1116.9 | 23.8 | 0.29 | 275.10 |
|  | Average |  | 58.25 | 1100.44 | 23.78 | 0.28 | 283.66 |

Flow Cell Test—Permeate Flow Evaluation CNT-Polymer-CNT Hybrid Membrane at 2V

| Membrane area: | 140 cm$^2$ |
|---|---|

Results for ultrapure water w/Membrane 1
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:20 | 0 | 18.01 | 51 | 942.5 | 24.2 | 0.171 | 393.71 |
| 3:25 | 5 | 18.08 | 55 | 1029.2 | 24.3 | 0.141 | 521.38 |
| 3:30 | 10 | 18.01 | 55 | 1029.2 | 24.3 | 0.147 | 500.10 |
| 3:35 | 15 | 18.08 | 55 | 1029.2 | 24.2 | 0.165 | 445.54 |
| | Average | | 54.00 | 1007.53 | 24.25 | 0.16 | 465.18 |

Results for ultrapure water w/Membrane 2
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 6:00 | 0 | 17.97 | 42 | 751.7 | 25 | 0.448 | 119.86 |
| 6:05 | 5 | 18.11 | 42 | 751.7 | 25 | 0.473 | 113.52 |
| 6:10 | 10 | 17.97 | 42 | 751.7 | 25.1 | 0.447 | 120.12 |
| 6:15 | 15 | 18.07 | 41 | 730.9 | 25.1 | 0.459 | 113.74 |
| | Average | | 41.75 | 746.53 | 25.05 | 0.46 | 116.81 |

Results for ultrapure water w/Membrane 1 and Anode/Cathode reversed
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 4:20 | 0 | 18.11 | 55 | 1029.2 | 24.5 | 0.297 | 247.52 |
| 4:25 | 5 | 18.09 | 55 | 1029.2 | 24.5 | 0.312 | 235.62 |
| 4:30 | 10 | 18.07 | 54 | 1007.4 | 24.7 | 0.317 | 227.00 |
| 4:35 | 15 | 18.13 | 56 | 1051.0 | 24.7 | 0.337 | 222.77 |
| | Average | | 55.00 | 1029.22 | 24.60 | 0.32 | 233.23 |

Results fa ultrapure water w/Membrane 3
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:45 | 0 | 17.18 | 40 | 710.2 | 25.0 | 0.612 | 82.89 |
| 2:50 | 5 | 17.23 | 40 | 710.2 | 25.0 | 0.790 | 64.21 |
| 2:55 | 10 | 17.20 | 40 | 710.2 | 25.1 | 0.763 | 66.49 |
| 3:00 | 15 | 17.18 | 40 | 710.2 | 25.0 | 0.766 | 66.22 |
| | Average | | 40.00 | 710.19 | 25.03 | 0.73 | 69.95 |

Results for ultrapure water w/Membrane 4
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:50 | 0 | 18.39 | 59 | 1116.9 | 24 | 0.332 | 240.30 |
| 11:55 | 5 | 18.37 | 60.5 | 1150.1 | 24.2 | 0.338 | 243.04 |
| 12:00 | 10 | 18.29 | 60.5 | 1150.1 | 24.1 | 0.316 | 259.96 |
| 12:05 | 15 | 18.35 | 60.5 | 1150.1 | 24.2 | 0.27 | 304.25 |
| | Average | | 60.13 | 1141.78 | 24.13 | 0.31 | 261.89 |

Flow Cell Test—Permeate Flow Evaluation CNT-Polymer-CNT Hybrid Membrane at 3 V

| Membrane area: | 140 cm$^2$ |
|---|---|

Results for ultrapure water w/Membrane 1
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:40 | 0 | 17.92 | N/A | 666.7 | 24.5 | 0.395 | 120.56 |
| 3:45 | 5 | 17.93 | N/A | 642.9 | 24.5 | 0.405 | 113.39 |
| 3:50 | 10 | 17.88 | N/A | 642.9 | 24.5 | 0.401 | 114.52 |
| 3:55 | 15 | 17.84 | N/A | 620.7 | 24.5 | 0.392 | 113.10 |
| | Average | | N/A | 643.30 | 24.50 | 0.40 | 115.39 |

Results for ultrapure water w/Membrane 2
Date: Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 6:20 | 0 | 17.85 | N/A | 547.6 | 24.9 | 0.459 | 85.22 |
| 6:25 | 5 | 17.84 | N/A | 372.7 | 25 | 0.463 | 57.50 |
| 6:30 | 10 | 17.83 | N/A | 372.2 | 25 | 0.464 | 57.30 |
| 6:35 | 15 | 17.86 | N/A | 317.6 | 25 | 0.458 | 49.53 |
| | Average | | N/A | 402.53 | 24.98 | 0.46 | 62.39 |

Results for ultrapure water w/Membrane 1 and Anode/Cathode reversed
Date Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 4:40 | 0 | 18.09 | N/A | 439.0 | 24.5 | 0.321 | 97.69 |
| 4:45 | 5 | 18.01 | N/A | 409.1 | 24.5 | 0.371 | 78.76 |
| 4:50 | 10 | 18.07 | N/A | 400.0 | 24.5 | 0.309 | 92.46 |
| 4:55 | 15 | 18.08 | N/A | 310.3 | 24.5 | 0.335 | 66.16 |
| | Average | | N/A | 389.61 | 24.50 | 0.33 | 83.77 |

Results for ultrapure water w/Membrane 3
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:10 | 0 | 17.85 | N/A | 547.6 | 25.1 | 0.769 | 50.86 |
| 3:15 | 5 | 17.94 | N/A | 450.0 | 25.1 | 0.780 | 41.21 |
| 3:20 | 10 | 17.83 | N/A | 400.0 | 25.1 | 0.776 | 36.82 |
| 3:25 | 15 | 17.89 | N/A | 400.0 | 25.2 | 0.768 | 37.20 |
| | Average | | N/A | 449.40 | 25.13 | 0.77 | 41.52 |

Results for ultrapure water w/Membrane 4
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 12:15 | 0 | 18.28 | N/A | 587.7 | 24.4 | 0.314 | 133.69 |
| 12:20 | 5 | 18.27 | N/A | 316.7 | 24.4 | 0.353 | 64.08 |
| 12:25 | 10 | 18.26 | N/A | 280.1 | 24.4 | 0.372 | 53.78 |
| 12:30 | 15 | 18.28 | N/A | 280.1 | 24.3 | 0.49 | 40.83 |
| | Average | | N/A | 366.15 | 24.38 | 0.38 | 73.10 |

Appendix C
Flow Cell Test—Permeate Flow Evaluation CNT-Polymer-CNT Hybrid Membrane Ultrapure Vs. Natural Water

| Membrane area: | 140 cm$^2$ |
|---|---|

Results for ultrapure water w/Membrane 3 at 0 V
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:00 | 0 | 17.26 | 40 | 710.2 | 24.4 | 0.698 | 72.68 |
| 2:05 | 5 | 17.34 | 40 | 710.2 | 24.2 | 0.658 | 77.09 |
| 2:10 | 10 | 17.31 | 40 | 710.2 | 24.5 | 0.726 | 69.87 |
| 2:15 | 15 | 17.35 | 40 | 710.2 | 24.6 | 0.724 | 70.07 |
| | Average | | 40.00 | 710.19 | 24.43 | 0.70 | 72.43 |

Results for natural water w/Membrane 3 at 0 V
Date: Feb. 27, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 5:05 | 0 | 17.21 | 56 | 1051.0 | 23.1 | 0.441 | 170.24 |
| 5:10 | 5 | 17.47 | 54 | 1007.4 | 23.7 | 0.465 | 154.75 |
| 5:15 | 10 | 17.45 | 56 | 1051.0 | 23.8 | 0.453 | 165.73 |
| 5:20 | 15 | 17.41 | 53 | 985.7 | 24.1 | 0.471 | 149.49 |
| | Average | | 54.75 | 1023.81 | 23.68 | 0.46 | 160.05 |

Results for ultrapure water w/Membrane 3 at 1 V
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:25 | 0 | 17.31 | 40 | 710.2 | 24.7 | 0.656 | 77.33 |
| 2:30 | 5 | 17.33 | 40 | 710.2 | 24.8 | 0.703 | 72.16 |
| 2:35 | 10 | 17.27 | 40 | 710.2 | 24.7 | 0.636 | 79.76 |
| 2:40 | 15 | 17.30 | 40 | 710.2 | 24.7 | 0.621 | 81.69 |
| | Average | | 40.00 | 710.19 | 24.73 | 0.65 | 77.73 |

Results for natural water w/Membrane 3 at 1 V
Date Feb. 27, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 5:30 | 0 | 17.51 | 53 | 985.7 | 25.2 | 0.386 | 182.41 |
| 5:35 | 5 | 17.50 | 54 | 1007.4 | 25.4 | 0.442 | 162.80 |
| 5:40 | 10 | 17.61 | 53 | 985.7 | 25.6 | 0.418 | 168.44 |
| 5:45 | 15 | 17.54 | 52 | 964.1 | 25.6 | 0.405 | 170.03 |
| | Average | | 53.00 | 985.75 | 25.45 | 0.41 | 170.92 |

Results for ultrapure water w/Membrane 3 at 2 V
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:45 | 0 | 17.18 | 40 | 710.2 | 25.0 | 0.612 | 82.89 |
| 2:50 | 5 | 17.23 | 40 | 710.2 | 25.0 | 0.790 | 64.21 |
| 2:55 | 10 | 17.20 | 40 | 710.2 | 25.1 | 0.763 | 66.49 |
| 3:00 | 15 | 17.18 | 40 | 710.2 | 25.0 | 0.766 | 66.22 |
| | Average | | 40.00 | 710.19 | 25.03 | 0.73 | 69.95 |

Results for natural water w/Membrane 3 at 2 V
Date: Feb. 27, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 5:50 | 0 | 17.50 | 55 | 1029.2 | 25.7 | 0.435 | 169.00 |
| 5:55 | 5 | 17.59 | 56 | 1051.0 | 25.7 | 0.496 | 151.36 |
| 6:00 | 10 | 17.57 | 56 | 1051.0 | 25.9 | 0.435 | 172.58 |
| 6:05 | 15 | 17.64 | 56 | 1051.0 | 25.9 | 0.414 | 181.34 |
| | Average | | 55.75 | 1045.57 | 25.80 | 0.45 | 168.57 |

Results for ultrapure water w/Membrane 3 at 3V
Date: Feb. 23, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:10 | 0 | 17.85 | N/A | 547.6 | 25.1 | 0.769 | 50.86 |
| 3:15 | 5 | 17.94 | N/A | 450.0 | 25.1 | 0.780 | 41.21 |
| 3:20 | 10 | 17.83 | N/A | 400.0 | 25.1 | 0.776 | 36.82 |
| 3:25 | 15 | 17.89 | N/A | 400.0 | 25.2 | 0.768 | 37.20 |
| | Average | | N/A | 449.40 | 25.13 | 0.77 | 41.52 |

Results for natural water w/Membrane 3 at 3V Date Feb. 27, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 6:10 | 0 | 17.57 | N/A | 428.6 | 25.8 | 0.400 | 76.54 |
| 6:15 | 5 | 17.53 | N/A | 428.6 | 26.0 | 0.385 | 79.52 |
| 6:20 | 10 | 17.60 | N/A | 428.6 | 25.8 | 0.440 | 69.58 |
| 6:25 | 15 | 17.62 | N/A | 428.6 | 25.9 | 0.414 | 73.95 |
| | Average | | N/A | 428.60 | 25.88 | 0.41 | 74.89 |

Comparison of Membrane 3 for Ultrapure and Natural Water

| Voltage | Flux (L · h − 1 · m − 2 · bar − 1) | | Relative Flux |
|---|---|---|---|
| | Ultrapure | Natural | |
| 0 V | 72.43 | 160.05 | 2.21 |
| 1 V | 77.73 | 170.92 | 2.20 |
| 2 V | 69.95 | 168.57 | 2.41 |
| 3 V | 41.53 | 74.89 | 1.80 |

Results for ultrapure water w/Membrane 4 at 0 V
Date Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:00 | 0 | 18.45 | 55 | 1029.2 | 23.3 | 0.298 | 246.69 |
| 11:05 | 5 | 18.45 | 55 | 1029.2 | 23.4 | 0.283 | 259.77 |
| 11:10 | 10 | 18.51 | 56 | 1051.0 | 23.5 | 0.267 | 281.18 |
| 11:15 | 15 | 18.46 | 56.5 | 1062.0 | 23.5 | 0.298 | 254.55 |
| | Average | | 55.63 | 1042.85 | 23.43 | 0.29 | 260.55 |

Results for natural water w/Membrane 4 at 0 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 1:30 | 0 | 18.67 | 60.5 | 1150.1 | 26.3 | 0.224 | 366.73 |
| 1:35 | 5 | 18.71 | 60.5 | 1150.1 | 26.1 | 0.198 | 414.89 |
| 1:40 | 10 | 18.64 | 62 | 1183.4 | 26.1 | 0.228 | 370.72 |
| 1:45 | 15 | 18.7 | 62 | 1183.4 | 26.1 | 0.237 | 356.65 |
| | Average | | 61.25 | 1166.71 | 26.15 | 0.22 | 377.25 |

Results for ultrapure water w/Membrane 4 at 1V
Date Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:25 | 0 | 18.39 | 56 | 1051.0 | 23.8 | 0.266 | 282.23 |
| 11:30 | 5 | 18.49 | 59 | 1116.9 | 23.7 | 0.309 | 258.19 |
| 11:35 | 10 | 18.43 | 59 | 1116.9 | 23.8 | 0.25 | 319.12 |
| 11:40 | 15 | 18.4 | 59 | 1116.9 | 23.8 | 0.29 | 275.10 |
| | Average | | 58.25 | 1100.44 | 23.78 | 0.28 | 283.66 |

Results for natural water w/Membrane 4 at 1 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 1:50 | 0 | 18.49 | 63 | 1205.6 | 26.2 | 0.22 | 391.43 |
| 1:55 | 5 | 18.52 | 64 | 1227.9 | 26.2 | 0.22 | 398.68 |
| 2:00 | 10 | 18.45 | 65 | 1250.3 | 26.1 | 0.22 | 405.95 |
| 2:05 | 15 | 18.5 | 65 | 1250.3 | 26.1 | 0.22 | 405.95 |
| | Average | | 64.25 | 1233.55 | 26.15 | 0.22 | 400.50 |

Results for ultrapure water w/Membrane 4 at 2V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 11:50 | 0 | 18.39 | 59 | 1116.9 | 24 | 0.332 | 240.30 |
| 11:55 | 5 | 18.37 | 60.5 | 1150.1 | 24.2 | 0.338 | 243.04 |
| 12:00 | 10 | 18.29 | 60.5 | 1150.1 | 24.1 | 0.316 | 259.96 |
| 12:05 | 15 | 18.35 | 60.5 | 1150.1 | 24.2 | 0.27 | 304.25 |
| | Average | | 60.13 | 1141.78 | 24.13 | 0.31 | 261.89 |

Results for natural water w/Membrane 4 at 2 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:15 | 0 | 18.51 | 65 | 1250.3 | 26 | 0.22 | 405.95 |
| 2:20 | 5 | 18.56 | 65 | 1250.3 | 26.1 | 0.22 | 405.95 |
| 2:25 | 10 | 18.52 | 65 | 1250.3 | 25.7 | 0.22 | 405.95 |
| 2:30 | 15 | 18.5 | 65 | 1250.3 | 25.8 | 0.22 | 405.95 |
| | Average | | 65.00 | 1250.32 | 25.90 | 0.22 | 405.95 |

Results for ultrapure water w/Membrane 4 at 3V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 12:15 | 0 | 18.28 | N/A | 587.7 | 24.4 | 0.314 | 133.69 |
| 12:20 | 5 | 18.27 | N/A | 316.7 | 24.4 | 0.353 | 64.08 |
| 12:25 | 10 | 18.26 | N/A | 280.1 | 24.4 | 0.372 | 53.78 |
| 12:30 | 15 | 18.28 | N/A | 280.1 | 24.3 | 0.49 | 40.83 |
| | Average | | N/A | 366.15 | 24.38 | 0.38 | 73.10 |

Results for natural water w/Membrane 4 at 3V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:40 | 0 | 19.07 | N/A | 540.0 | 26 | 0.22 | 175.32 |
| 2:45 | 5 | 19 | N/A | 540.0 | 26.1 | 0.22 | 175.32 |
| 2:50 | 10 | 19.1 | N/A | 540.0 | 25.7 | 0.22 | 175.32 |
| 2:55 | 15 | 19.09 | N/A | 540.0 | 25.8 | 0.22 | 175.32 |
| | Average | | N/A | 540.00 | 25.90 | 0.22 | 175.32 |

Comparison Membrane 4 for Ultrapure and Natural Water

| Voltage | Flux (L · h⁻¹ · m⁻² · bar⁻¹) | | Relative Flux |
|---|---|---|---|
| | Ultrapure | Natural | |
| 0 V | 260.55 | 377.25 | 1.45 |
| 1 V | 283.66 | 400.5 | 1.41 |
| 2 V | 261.89 | 405.95 | 1.55 |
| 3 V | 73.1 | 175.32 | 2.40 |

Flow Cell Test—Permeate Flow Evaluation PVDF Membrane

| Membrane area: | 140 cm² |
|---|---|

Results for ultrapure water w/PVDF Membrane
Date Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h⁻¹ · m⁻² · bar⁻¹) |
|---|---|---|---|---|---|---|---|
| 3:40 | 0 | 17.95 | N/A | 3600.0 | 22.1 | 0.21 | 1224.49 |
| 3:45 | 5 | 17.95 | N/A | 3000.0 | 22.1 | 0.215 | 996.68 |
| 3:50 | 10 | 17.83 | N/A | 3000.0 | 22.5 | 0.206 | 1040.22 |
| 3:55 | 15 | 17.96 | N/A | 3600.0 | 22.5 | 0.23 | 1118.01 |
| | Average | | N/A | 3300.00 | 22.30 | 0.22 | 1094.85 |

Results for natural water w/PVDF Membrane
Date Feb. 26, 2012

| Hour | Operation time (minutes) | Feed Flow (L/h) | Permeate Flowmeter value | Permeate Flow (mL/h) | Temperature (° C.) | Pressure (bar) | Flux (L · h⁻¹ · m⁻² · bar⁻¹) |
|---|---|---|---|---|---|---|---|
| 6:20 | 0 | 18.22 | N/A | 3050.8 | 22.4 | N/A | N/A |
| 6:25 | 5 | 18.16 | N/A | 2903.2 | 22.4 | N/A | N/A |
| 6:30 | 10 | 18.18 | N/A | 2727.3 | 22.4 | N/A | N/A |
| 6:35 | 15 | 18.12 | N/A | 2647.1 | 22.7 | N/A | N/A |
| | Average | | N/A | 2832.10 | 22.48 | N/A | N/A |

Results for ultrapure water w/PVDF 2
Date: Mar. 14, 2012

| Hour | Operation time (minutes) | Feed Flow (L/h) | Permeate Flowmeter value | Permeate Flow (mL/h) | Temperature (° C.) | Pressure (bar) | Flux (L · h⁻¹ · m⁻² · bar⁻¹) |
|---|---|---|---|---|---|---|---|
| 3:15 | 0 | 18.64 | N/A | 2000.0 | 20.6 | 0.208 | 686.81 |
| 3:20 | 5 | 18.54 | N/A | 2000.0 | 20.8 | 0.23 | 621.12 |
| 3:25 | 10 | 18.7 | N/A | 2057.1 | 21.3 | 0.232 | 633.34 |
| 3:30 | 15 | 18.62 | N/A | 2057.1 | 21.4 | 0.225 | 653.05 |
| | Average | | N/A | 2028.55 | 21.03 | 0.22 | 648.58 |

Results for natural water w/PVDF 2
Date: Mar. 14, 2012

| Hour | Operation time (minutes) | Feed Flow (L/h) | Permeate Flowmeter value | Permeate Flow (mL/h) | Temperature (° C.) | Pressure (bar) | Flux (L · h⁻¹ · m⁻² · bar⁻¹) |
|---|---|---|---|---|---|---|---|
| 3:40 | 0 | 19.1 | N/A | 2057.1 | 23 | 0.25 | 587.74 |
| 3:45 | 5 | 19.07 | N/A | 2057.1 | 23 | 0.287 | 511.97 |
| 3:50 | 10 | 19.02 | N/A | 2000.0 | 23.1 | 0.281 | 508.39 |

-continued

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 3:55 | 15 | 19.07 | N/A | 2000.0 | 23.1 | 0.273 | 523.29 |
|  | Average |  | N/A | 2028.55 | 23.05 | 0.27 | 532.85 |

Comparison of PVDF Membrane 1 for Ultrapure and Natural Water

| Membrane | Flux (L · h − 1 · m − 2 · bar − 1) | | Relative Flux |
|---|---|---|---|
|  | Ultrapure | Natural |  |
| PVDF 1 | 1094.85 | N/A | N/A |
| PVDF 2 | 648.58 | 532.85 | 0.82156403 |

Appendix D

Flow Cell Test—Permeate Flow Evaluation CNT-Polymer-CNT Hybrid Membrane w/Natural Water 24 Hrs after Initial Evaluation

| Membrane area: | 140 cm$^2$ |
|---|---|

Results for natural water w/Membrane 4 at 0 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 1:30 | 0 | 18.67 | 60.5 | 1150.1 | 26.3 | 0.224 | 366.73 |
| 1:35 | 5 | 18.71 | 60.5 | 1150.1 | 26.1 | 0.198 | 414.89 |
| 1:40 | 10 | 18.64 | 62 | 1183.4 | 26.1 | 0.228 | 370.72 |
| 1:45 | 15 | 18.7 | 62 | 1183.4 | 26.1 | 0.237 | 356.65 |
|  | Average |  | 61.25 | 1166.71 | 26.15 | 0.22 | 377.25 |

Results for natural water w/Membrane 4 at 0V
Date: Mar. 9, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 2:40 | 0 | 18.14 | N/A | 1333.3 | 22.6 | 0.214 | 445.03 |
| 2:45 | 5 | 18.16 | 65 | 1250.3 | 22.9 | 0.200 | 446.54 |
| 2:50 | 10 | 18.09 | N/A | 1295.0 | 23.3 | 0.173 | 534.68 |
| 2:55 | 15 | 18.10 | 65 | 1250.3 | 23.7 | 0.220 | 405.95 |
|  | Average |  | 65.00 | 1282.24 | 23.13 | 0.20 | 458.05 |

Results for natural water w/Membrane 4 at 1 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L · h$^{-1}$ · m$^{-2}$ · bar$^{-1}$) |
|---|---|---|---|---|---|---|---|
| 1:50 | 0 | 18.49 | 63 | 1205.6 | 26.2 | 0.22 | 391.43 |
| 1:55 | 5 | 18.52 | 64 | 1227.9 | 26.2 | 0.22 | 398.68 |
| 2:00 | 10 | 18.45 | 65 | 1250.3 | 26.1 | 0.22 | 405.95 |
| 2:05 | 15 | 18.5 | 65 | 1250.3 | 26.1 | 0.22 | 405.95 |
|  | Average |  | 64.25 | 1233.55 | 26.15 | 0.22 | 400.50 |

Results for natural water w/Membrane 4 at 1 V
Date Mar. 9, 2012

| Hour | Operation time (minutes) | Feed Flow (L/h) | Permeate Flowmeter value | Permeate Flow (mL/h) | Temperature (° C.) | Pressure (bar) | Flux (L·$h^{-1}$·$m^{-2}$·$bar^{-1}$) |
|---|---|---|---|---|---|---|---|
| 3:05 | 0 | 18.13 | N/A | 1358.5 | 24.4 | 0.2 | 485.18 |
| 3:10 | 5 | 18.11 | N/A | 1333.3 | 24.8 | 0.2 | 476.18 |
| 3:15 | 10 | 18.07 | N/A | 1323.5 | 24.9 | 0.2 | 472.68 |
| 3:20 | 15 | 18.27 | N/A | 1350.0 | 25.0 | 0.2 | 482.14 |
|  | Average |  | N/A | 1341.33 | 24.78 | 0.20 | 479.04 |

Results for natural water w/Membrane 4 at 2 V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L·$h^{-1}$·$m^{-2}$·$bar^{-1}$) |
|---|---|---|---|---|---|---|---|
| 2:15 | 0 | 18.51 | 65 | 1250.3 | 26 | 0.22 | 405.95 |
| 2:20 | 5 | 18.56 | 65 | 1250.3 | 26.1 | 0.22 | 405.95 |
| 2:25 | 10 | 18.52 | 65 | 1250.3 | 25.7 | 0.22 | 405.95 |
| 2:30 | 15 | 18.5 | 65 | 1250.3 | 25.8 | 0.22 | 405.95 |
|  | Average |  | 65.00 | 1250.32 | 25.90 | 0.22 | 405.95 |

Results for natural water w/Membrane 4 at 2V
Date: Mar. 9, 2012

| Hour | Operation time (minutes) | Feed Flow (L/h) | Permeate Flowmeter value | Permeate Flow (mL/h) | Temperature (° C.) | Pressure (bar) | Flux (L·$h^{-1}$·$m^{-2}$·$bar^{-1}$) |
|---|---|---|---|---|---|---|---|
| 3:25 | 0 | 18.31 | N/A | 1363.6 | 25.0 | 0.2 | 487.00 |
| 3:30 | 5 | 18.41 | N/A | 1384.6 | 25.3 | 0.2 | 494.50 |
| 3:35 | 10 | 18.39 | N/A | 1402.6 | 25.5 | 0.2 | 500.93 |
| 3:40 | 15 | 18.38 | N/A | 1354.8 | 25.6 | 0.2 | 483.86 |
|  | Average |  | N/A | 1376.40 | 25.35 | 0.20 | 491.57 |

Results for natural water w/Membrane 4 at 3V
Date: Mar. 8, 2012

| Hour | Operation time (minutes) | Feed Flow (L/h) | Permeate Flowmeter value | Permeate Flow (mL/h) | Temperature (° C.) | Pressure (bar) | Flux (L·$h^{-1}$·$m^{-2}$·$bar^{-1}$) |
|---|---|---|---|---|---|---|---|
| 2:40 | 0 | 19.07 | N/A | 540.0 | 26 | 0.22 | 175.32 |
| 2:45 | 5 | 19 | N/A | 540.0 | 26.1 | 0.22 | 175.32 |
| 2:50 | 10 | 19.1 | N/A | 540.0 | 25.7 | 0.22 | 175.32 |
| 2:55 | 15 | 19.09 | N/A | 540.0 | 25.8 | 0.22 | 175.32 |
|  | Average |  | N/A | 540.00 | 25.90 | 0.22 | 175.32 |

Results for natural water w/Membrane 4 at 3V
Date: Mar. 9, 2012

| Hour | Operation time (minutes) | Feed Flow (L/h) | Permeate Flowmeter value | Permeate Flow (mL/h) | Temperature (° C.) | Pressure (bar) | Flux (L·$h^{-1}$·$m^{-2}$·$bar^{-1}$) |
|---|---|---|---|---|---|---|---|
| 3:45 | 0 | 18.33 | N/A | 1017.0 | 25.7 | 0.2 | 363.21 |
| 3:50 | 5 | 18.38 | N/A | 973.0 | 25.8 | 0.2 | 347.50 |
| 3:55 | 10 | 18.35 | N/A | 931.0 | 25.7 | 0.2 | 332.50 |
| 4:00 | 15 | 18.39 | N/A | 937.5 | 25.6 | 0.2 | 334.82 |
|  | Average |  | N/A | 964.63 | 25.70 | 0.20 | 344.51 |

What is claimed:

1. A filtration apparatus, comprising:
a housing forming a chamber having a plane, the chamber including an inlet for receiving an input fluid, a first outlet for releasing fluid, and a second outlet for releasing filtered fluid, wherein the inlet and the first outlet are disposed on a first side of the plane, and the second outlet is disposed on a second side of the plane;
a filter positioned along the plane between the inlet and the second outlet, the filter comprising at least one porous polymer layer disposed between a first porous carbon nanotube filter material and a second porous carbon nanotube filter material;
a first conducting connector positioned along the plane between the inlet and the carbon nanotube-based filter; and
a second conducting connector positioned along the plane between the carbon nanotube-based filter and the second outlet;
wherein the first and the second porous carbon nanotube filter material have an average pore size of at least about 0.5 nm; and
wherein the first and the second porous carbon nanotube filter material have a specific surface area of about 80 $m^2/g$ to about 120 $m^2/g$.

2. The apparatus of claim 1, wherein the first conducting connector is in contact with a portion of the first porous carbon nanotube filter material.

3. The apparatus of claim 1, wherein the second conducting connector is in contact with a portion of the second porous carbon nanotube filter material.

4. The apparatus of claim 1, wherein at least one of the first conducting connector and the second conducting connector has a thickness of about 100 µm to about 150 µm.

5. The apparatus of claim 1, wherein the first conducting connector and the second conducting connector are electrically separated from each other to prevent a short circuit.

6. The apparatus of claim 5, wherein the first conducting connector and the second conducting connector each comprises at least one hole designed for a peg to align the first conducting connector and the second conducting connector with the filter.

7. The apparatus of claim 6, wherein a rim of the hole is coated with an electrically insulating layer.

8. The apparatus of claim 6, wherein the peg is an electrically-insulating peg.

9. The apparatus of claim 1, wherein at least one of the first conducting connector and the second conducting connector includes titanium.

10. The apparatus of claim 1, wherein a flux through the porous polymer layer is at least 70% of a flux through the first porous carbon nanotube filter material or the second porous carbon nanotube filter material.

11. The apparatus of claim 10, wherein the porous polymer layer has a pore size of about 0.01 µm to about 5 µm.

12. The filtration apparatus of claim 1, wherein the first and the second porous carbon nanotube filter materials comprise undoped carbon nanotubes, nitrogen-doped carbon nanotubes, boron-doped carbon nanotubes, fluorine-doped carbon nanotubes or any combinations thereof.

13. The filtration apparatus of claim 12, wherein the carbon nanotubes are multi-walled carbon nanotubes.

14. The filtration apparatus of claim 1, wherein the first conducting connector and the second conducting connector are connected to an electrical power source and produce an electric potential of 3 volts or less between the first porous carbon nanotube filter material and the first porous carbon nanotube filter material.

* * * * *